US007991694B2

(12) United States Patent
Takayama

(10) Patent No.: US 7,991,694 B2
(45) Date of Patent: Aug. 2, 2011

(54) MOBILE ELECTRONIC COMMERCE SYSTEM

(75) Inventor: Hisashi Takayama, Setagaya-Ku (JP)

(73) Assignee: Matsushita Electric Industrial Co., Ltd., Kadoma-shi (JP)

( * ) Notice: Subject to any disclaimer, the term of this patent is extended or adjusted under 35 U.S.C. 154(b) by 94 days.

(21) Appl. No.: 12/318,419

(22) Filed: Dec. 29, 2008

(65) Prior Publication Data

US 2009/0125429 A1 May 14, 2009

Related U.S. Application Data

(63) Continuation of application No. 09/284,339, filed on Apr. 13, 1999, now abandoned.

(51) Int. Cl.
*G06Q 40/00* (2006.01)

(52) U.S. Cl. .......................................... 705/41; 705/50

(58) Field of Classification Search .................... 705/26, 705/41

See application file for complete search history.

(56) References Cited

U.S. PATENT DOCUMENTS

| | | | | |
|---|---|---|---|---|
| 5,221,838 | A * | 6/1993 | Gutman et al. | 235/379 |
| 5,225,664 | A * | 7/1993 | Iijima | 235/380 |
| 5,288,978 | A * | 2/1994 | Iijima | 235/380 |
| 5,608,778 | A * | 3/1997 | Partridge, III | 455/411 |
| 5,790,677 | A * | 8/1998 | Fox et al. | 705/78 |
| 5,887,266 | A * | 3/1999 | Heinonen et al. | 455/558 |
| 5,995,626 | A * | 11/1999 | Nishioka et al. | 705/76 |
| 6,003,014 | A * | 12/1999 | Lee et al. | 705/13 |
| 6,189,782 | B1 * | 2/2001 | Takami et al. | 235/375 |
| 6,247,129 | B1 * | 6/2001 | Keathley et al. | 713/156 |
| 6,282,522 | B1 * | 8/2001 | Davis et al. | 705/41 |
| 6,332,133 | B1 * | 12/2001 | Takayama | 705/39 |
| 6,415,271 | B1 * | 7/2002 | Turk et al. | 705/39 |

OTHER PUBLICATIONS

Entrust ScotiaBank: Entrust Technologiees and Scotiabank Enter Strategic alliance to Develop Global Information Security Protection, Jul. 16, 1997, Business Editors, Ottawa.*

O'Higgins, Bryan, Certification Authorities: Beyond intranet firewalls, Jul. 21, 1997, Network World, vol. 14 No. 29, pp. s7-s8.*

* cited by examiner

*Primary Examiner* — Matthew S Gart
*Assistant Examiner* — Talia Crawley
(74) *Attorney, Agent, or Firm* — Connolly Bove Lodge & Hutz LLP

(57) ABSTRACT

The objective of the present invention is to provide a mobile electronic commerce system that is superior in safety and usability. The mobile electronic commerce system comprises an electronic wallet 100, supply sides 101, 102, 103, 104 and 105, and a service providing means 110 that is connected by communication means. The service providing means installs a program for an electronic ticket, an electronic payment card, or an electronic telephone card. The electronic wallet employs the installed card to obtain a product or a service or entrance permission. The settlement process is performed by the electronic wallet and the supply side via the communication means, and data obtained during the settlement process are managed by being transmitted to the service providing means at a specific time. A negotiable card can be easily obtained, and when the negotiable card is used the settlement process can be quickly and precisely performed.

4 Claims, 170 Drawing Sheets

MOBILE USER TERMINAL

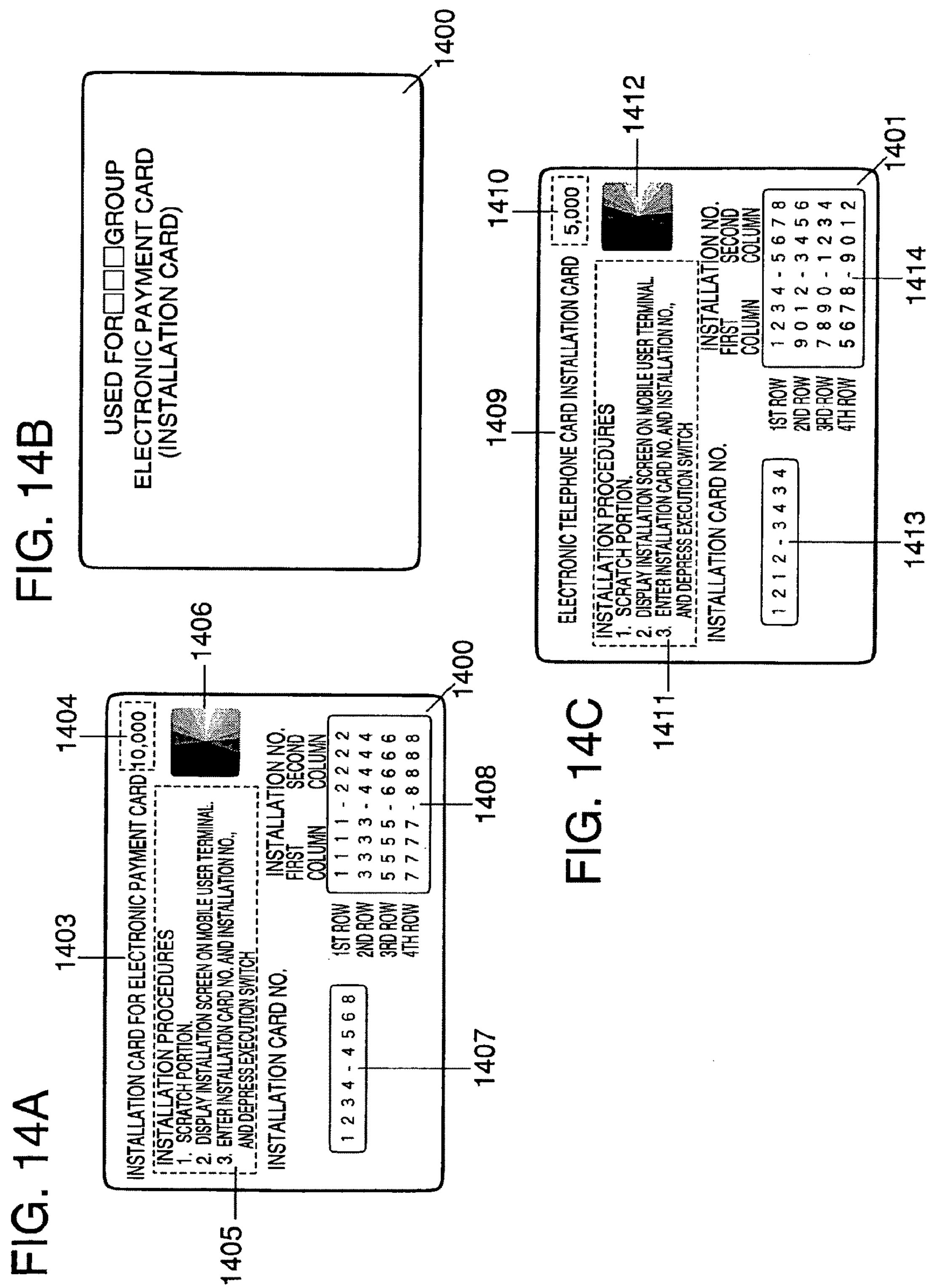

FIG. 14A
INSTALLATION CARD FOR ELECTRONIC PAYMENT CARD
10,000
INSTALLATION PROCEDURES
1. SCRATCH PORTION.
2. DISPLAY INSTALLATION SCREEN ON MOBILE USER TERMINAL.
3. ENTER INSTALLATION CARD NO. AND INSTALLATION NO., AND DEPRESS EXECUTION SWITCH
INSTALLATION CARD NO.
1234-4568
INSTALLATION NO.
FIRST COLUMN
SECOND COLUMN
1ST ROW 1111-2222
2ND ROW 3333-4444
3RD ROW 5555-6666
4TH ROW 7777-8888
1400
1403
1404
1405
1406
1407
1408
FIG. 14B
USED FOR□□□GROUP
ELECTRONIC PAYMENT CARD
(INSTALLATION CARD)
1400
FIG. 14C
ELECTRONIC TELEPHONE CARD INSTALLATION CARD
5,000
INSTALLATION PROCEDURES
1. SCRATCH PORTION.
2. DISPLAY INSTALLATION SCREEN ON MOBILE USER TERMINAL
3. ENTER INSTALLATION CARD NO. AND INSTALLATION NO., AND DEPRESS EXECUTION SWITCH
INSTALLATION CARD NO.
1212-3434
INSTALLATION NO.
FIRST COLUMN
SECOND COLUMN
1ST ROW 1234-5678
2ND ROW 9012-3456
3RD ROW 7890-1234
4TH ROW 5678-9012
1401
1409
1410
1411
1412
1413
1414

FIG. 16B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | POWER DISPLAY | WIRELESS TELEPHONE DISPLAY | FRAME INTERRUPT | CALL RECEPTION INTERRUPT | DATA RECEPTION INTERRUPT | UPDATE INTERRUPT | BATTERY INTERRUPT | KEY INTERRUPT | | | | "END" | "SPEECH" | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| INT | "F 4" | "F 3" | "F 2" | "F 1" | "#" | "*" | "9" | "8" | "7" | "6" | "5" | "4" | "3" | "2" | "1" | "0" |

FIG. 23B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | POWER DISPLAY | PHONE SPEECH DISPLAY | TOUCH PANEL INTERRUPT | INFRARED RECEPTION INTERRUPT | DATA RECEPTION INTERRUPT | UPDATE INTERRUPT | EXTERNAL IF INTERRUPT | KEY INTERRUPT | | | | | | "MENU" | "LOCK" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| INT | "F 4" | "F 3" | "F 2" | "F 1" | "#" | "*" | "9" | "8" | "7" | "6" | "5" | "4" | "3" | "2" | "1" | "0" |

FIG. 27B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | POWER DISPLAY | TELEPHONE DISPLAY | | CALL RECEPTION INTERRUPT | DATA RECEPTION INTERRUPT | UPDATE INTERRUPT | EXTERNAL IF INTERRUPT | KEY INTERRUPT | | | | "HOOK" | | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| INT | "F 4" | "F 3" | "F 2" | "F 1" | "#" | "*" | "9" | "8" | "7" | "6" | "5" | "4" | "3" | "2" | "1" | "0" |

FIG. 31B

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| INT | POWER DISPLAY | WIRELESS TELEPHONE DISPLAY | FRAME INTERRUPT | CALL RECEPTION INTERRUPT | DATA RECEPTION INTERRUPT | UPDATE INTERRUPT | BATTERY INTERRUPT | KEY INTERRUPT | | | | | | | | |

FIG. 31C

| | 31 | 30 | 29 | 28 | 27 | 26 | 25 | 24 | 23 | 22 | 21 | 20 | 19 | 18 | 17 | 16 |
|---|---|---|---|---|---|---|---|---|---|---|---|---|---|---|---|---|
| KEY | "=" | "+" | "−" | "×" | "÷" | "." | "SUM" | | | | | "END" | "SPEECH" | "MODE" | "EXECUTE" | "POWER" |

| | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| KEY | "F 4" | "F 3" | "F 2" | "F 1" | "#" | "*" | "9" | "8" | "7" | "6" | "5" | "4" | "3" | "2" | "1" | "0" |

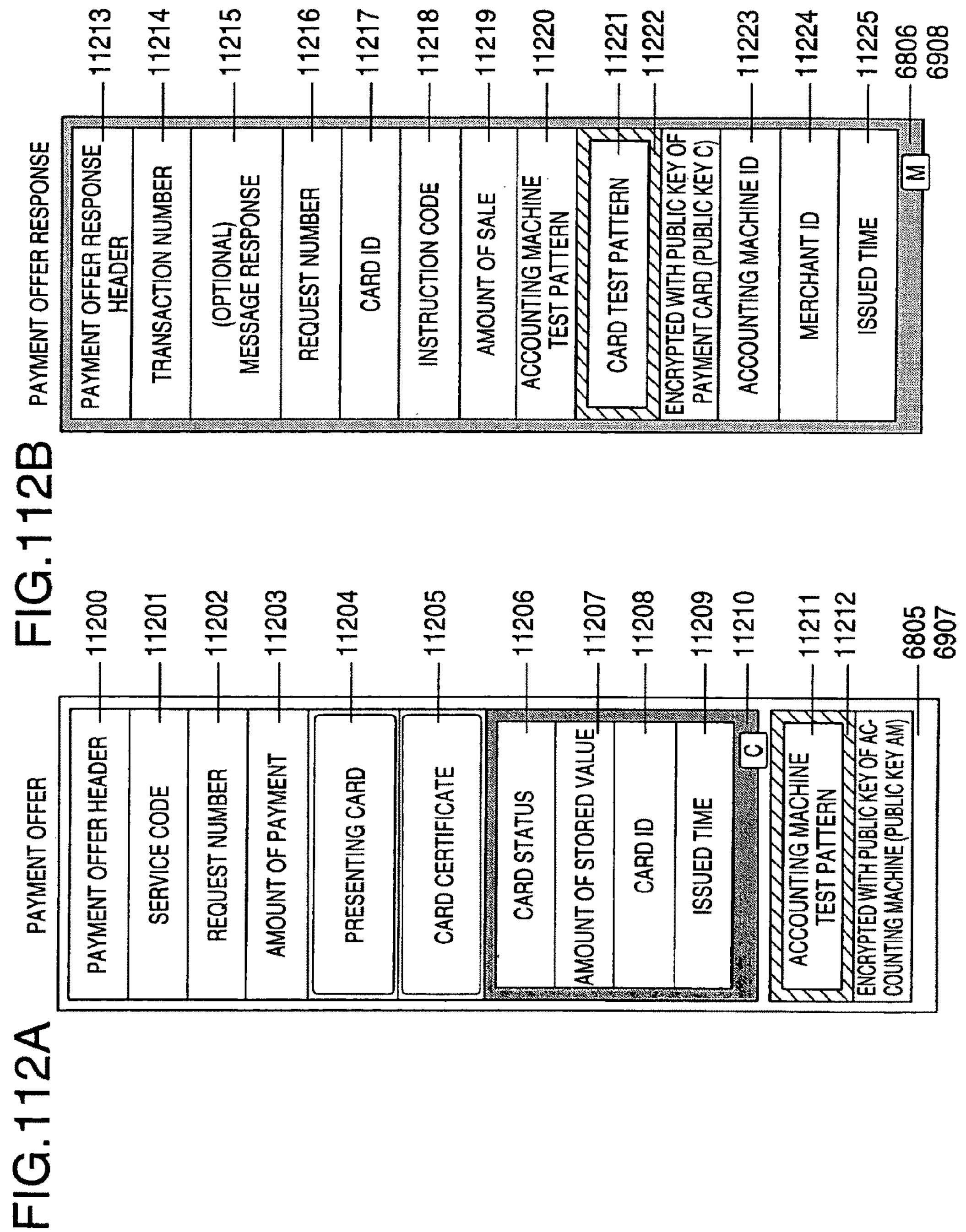
FIG.112A
PAYMENT OFFER
PAYMENT OFFER HEADER
SERVICE CODE
REQUEST NUMBER
AMOUNT OF PAYMENT
PRESENTING CARD
CARD CERTIFICATE
CARD STATUS
AMOUNT OF STORED VALUE
CARD ID
ISSUED TIME
C
ACCOUNTING MACHINE TEST PATTERN
ENCRYPTED WITH PUBLIC KEY OF ACCOUNTING MACHINE (PUBLIC KEY AM)
11200
11201
11202
11203
11204
11205
11206
11207
11208
11209
11210
11211
11212
6805
6907
FIG.112B
PAYMENT OFFER RESPONSE
PAYMENT OFFER RESPONSE HEADER
TRANSACTION NUMBER
(OPTIONAL) MESSAGE RESPONSE
REQUEST NUMBER
CARD ID
INSTRUCTION CODE
AMOUNT OF SALE
ACCOUNTING MACHINE TEST PATTERN
CARD TEST PATTERN
ENCRYPTED WITH PUBLIC KEY OF PAYMENT CARD (PUBLIC KEY C)
ACCOUNTING MACHINE ID
MERCHANT ID
ISSUED TIME
M
11213
11214
11215
11216
11217
11218
11219
11220
11221
11222
11223
11224
11225
6806
6908

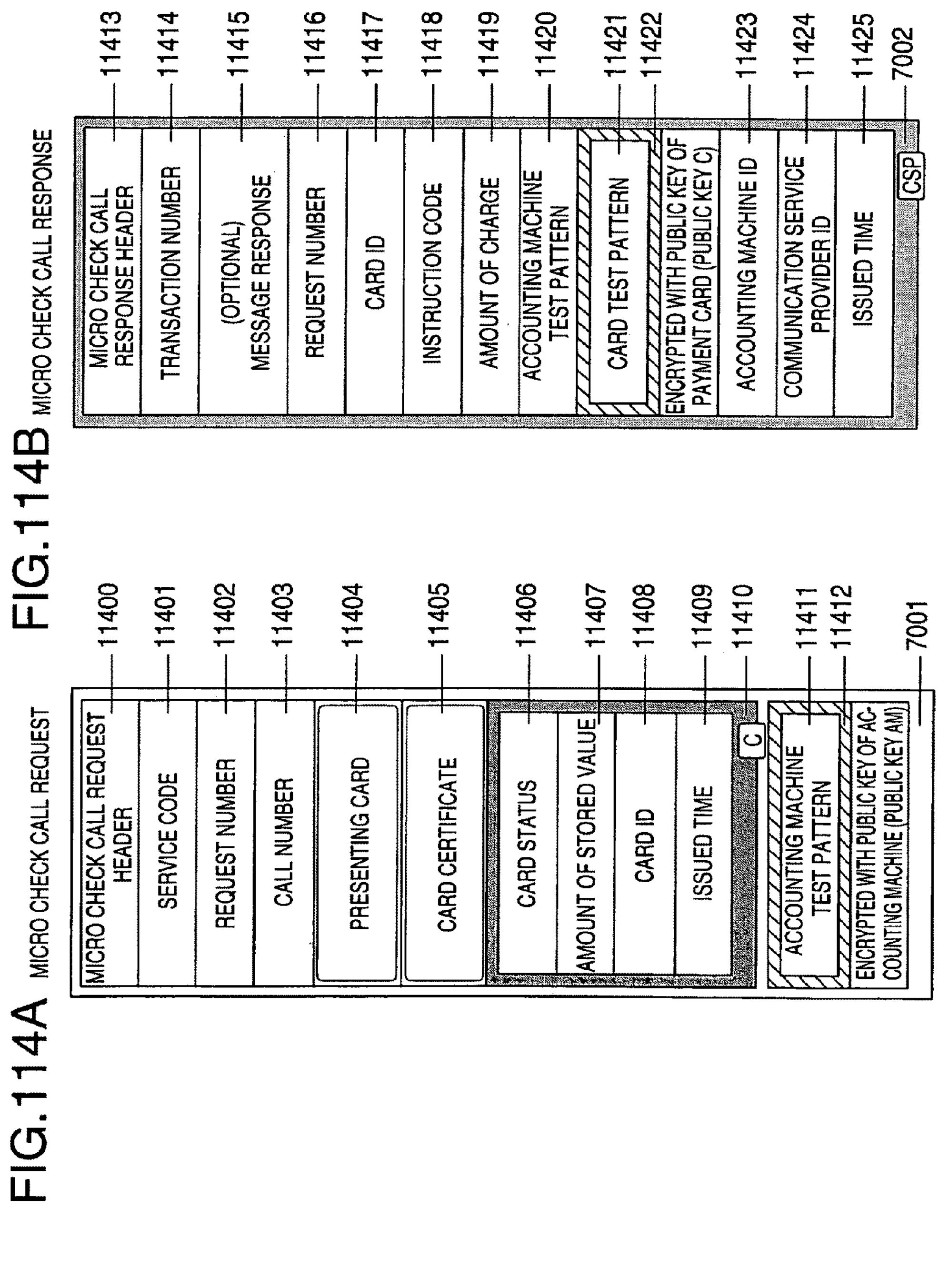
FIG.114A
MICRO CHECK CALL REQUEST
MICRO CHECK CALL REQUEST HEADER
SERVICE CODE
REQUEST NUMBER
CALL NUMBER
PRESENTING CARD
CARD CERTIFICATE
CARD STATUS
AMOUNT OF STORED VALUE
CARD ID
ISSUED TIME
C
ACCOUNTING MACHINE TEST PATTERN
ENCRYPTED WITH PUBLIC KEY OF ACCOUNTING MACHINE (PUBLIC KEY AM)
11400
11401
11402
11403
11404
11405
11406
11407
11408
11409
11410
11411
11412
7001
FIG.114B
MICRO CHECK CALL RESPONSE
MICRO CHECK CALL RESPONSE HEADER
TRANSACTION NUMBER
(OPTIONAL) MESSAGE RESPONSE
REQUEST NUMBER
CARD ID
INSTRUCTION CODE
AMOUNT OF CHARGE
ACCOUNTING MACHINE TEST PATTERN
CARD TEST PATTERN
ENCRYPTED WITH PUBLIC KEY OF PAYMENT CARD (PUBLIC KEY C)
ACCOUNTING MACHINE ID
COMMUNICATION SERVICE PROVIDER ID
ISSUED TIME
CSP
11413
11414
11415
11416
11417
11418
11419
11420
11421
11422
11423
11424
11425
7002

MOBILE ELECTRONIC COMMERCE SYSTEM

This application is a Continuation of application Ser. No. 09/284,339, filed on Apr. 13, 1999 now abandoned, and for which priority is claimed under 35 U.S.C. §120; and this application claims priority of Application No. 9-230564 filed in Japan on Aug. 13, 1997 under 35 U.S.C. §119; the entire contents of all are hereby incorporated by reference.

FIELD OF THE INVENTION

The present invention relates to an electronic commerce system that provides a settlement function for retail sales transactions involving the use of payment cards or credit cards (bank cards), a settlement function that provides for the employment of telephone cards for paying communication fees incurred through the use of mobile telephones, an examination function for verifying tickets issued for admission to various events, including concerts and movies, and a sales and distribution function for these payment cards, telephone cards and tickets. In particular, the present invention pertains to the maintenance of the usability and the safety of settlements, and to the facilitation of efficient and smooth business transactions.

BACKGROUND OF THE INVENTION

As the employment of telephone cards and payment cards, such as pinball game prepaid cards, has spread, prepaid systems for which magnetic cards are used to settle debts have become common. However, since there has been a corresponding increase in attendant problems, such as the illegal use of altered cards and excess charges imposed by retail shops, there is a demand that the safety of settlement systems be improved. Recently, an IC payment card has appeared that provides one countermeasure to illegal applications.

An explanation will now be given for the organization of a prepaid settlement system employing a conventional, general payment card.

In FIG. 138A is shown the organization of a prepaid settlement system using a conventional, common payment card.

In FIG. 138A, a payment card terminal 13801 is installed in a retail store 13806 and is used in the store for settlements for which payment cards are used. The payment card terminal 13801 is connected across a communication line 13804 to a central system 13802 operated by a payment card issuer 13807. At some stores, payment card terminals 13801 are connected via a POS system at the store and the communication line 13804 to the central system 13802 operated by a payment card issuer 13807.

To use a payment card to purchase a product at the retail store 13806, first, a consumer 13805 pays cash at the payment card store 13803, whereat payment cards are sold (13808), and purchases a payment card 1800 (13809). The sale of the payment card at this time is transmitted from the payment card store 13803 to the payment card issuer 13807 (13810).

Then, the consumer 13805 hands the payment card 13800 to a clerk at the retail store 13806 (13811) and requests that the payment card be used when processing the settlement.

Thereafter, the clerk inserts the payment card 13800 into the card reader of the payment card terminal 13801 and initiates the payment card settlement processing. In consequence, the payment card terminal 13801 reads current balance information from the payment card 13800, subtracts the price of the product from the available balance, and writes new balance information to the payment card. The payment card terminal 13801 also uses a printer to output a statement of account in which the price and the new payment card balance are specified.

The clerk hands the consumer 13805 the product, the payment card and the statement of account (13813 and 13812), and thus terminates the settlement processing using the payment card.

Following this, the payment card 13801 transmits the amount of the payment that was subtracted from the balance on the payment card 13800 across the communication line 13804 to the central system 13802 of the payment card issuer 13807 (13814). In response, the payment card issuer 13807 performs a transaction to transfer money to the retail store 13806 (13815).

A payment card may be purchased from an automatic vending machine that is set up to sell payment cards. Further, the same basic arrangement is employed for a payment card terminal 1380 that is constituted by an automatic vending machine and a public telephone that has a settlement function for which a payment card is used.

In addition, as is disclosed in Japanese Examined Patent Publication No. Hei 6-103426, a system is proposed wherein a payment card and a card reader/writer authenticate each other by employing a digital signature as a safety countermeasure.

Now, consider the sale and use of tickets for various events, including concerts and movies, for which prepaid settlement processing is performed in addition to that performed by using a payment card. The tickets are sold on line, while when presented, they are visually examined by ushers.

In FIG. 138B is shown the arrangement of a conventional, common ticket vending system.

In FIG. 138B, for ticket sales a ticket vending terminal 13817 is installed in a ticket retail store 13820. The ticket vending terminal 13817 is connected via a communication line 13819 to a central system 13818 for a ticket issuer 13821.

To purchase a ticket for an event, a concert or a movie, first, the consumer 13805 calls the central system 13818 of the ticket issuer 13821 and makes a reservation for a desired ticket (13824). The center system 13818 reserves the ticket applied for, and issues a reservation number to the consumer 13805 (13825).

After the reservation number is received, at a ticket retail store 13820 the consumer 13805 gives a clerk the number and asks that a ticket be issued.

To issue the ticket, the clerk inputs the reservation number at the ticket vending terminal 13817. The ticket vending terminal 13817 transmits the reservation number to the central system 13818 of the ticket issuer 13821 (13827) via the communication line 13819. In response, the center system 13818 transmits the ticket information for the reserved ticket to the ticket vending terminal 13817 (13828).

Subsequently, the ticket vending terminal 13817 prints the received ticket information on a specific pasteboard blank designated by the ticket issuer 13821, and outputs the result as a ticket 13816. The clerk then delivers the ticket 13816 to the consumer 13805 (13830) in exchange for cash (13829) and the ticket vending process is terminated.

Then, following the subtraction of its commission, the ticket retail store 13820 transmits a record of the receipts for the sale of the ticket to the ticket issuer 13821, which, in turn, subtracts its commission from the record of receipts and transmits the result to the promoter of the event for which the ticket was sold (13834).

Later, the consumer 13805 presents the ticket 13816 to an usher 13822 at an event hall 13823 (13832), and after the usher 13822 visually examines the contents of the ticket and determines that all entries are correct, the consumer 13805 is permitted to enter.

Since according to the prepaid settlement system for which a conventional payment card is employed the settlement process is primarily performed by a retail store, it is possible for a retail store to cheat a consumer when performing the settlement process by charging a higher than authorized price for a product.

In addition, in the conventional settlement system it is possible for a retail store to so alter a payment card terminal that the price charged during a settlement process is higher than is that which is displayed on a cash register or is printed on the statement of account.

Furthermore, since basically, in a conventional settlement system, the balance information held by a payment card is rewritten by the payment card terminal, the retail store may modify the payment card terminal so that the central system is charged a higher price than that which is actually subtracted from the balance recorded on the payment card.

Also, since in a conventional settlement system a payment card is loaded directly into a payment card terminal installed in a store, the retail store could modify the payment card terminal so that it alters the information stored on the card, or so that it illegally reads personal information other than that required for a settlement.

In order to prevent such an illegal modification of a payment card terminal, a physical countermeasure is required, such as the sealing of the terminal to prevent its disassembly, and this has constituted a barrier to a reduction in the size of a payment card terminal and to a reduction in the manufacturing costs.

Moreover, for a conventional settlement system, the capacity of the memory provided on a payment card is limited, and a consumer can not directly confirm an amount that has been subtracted from the payment card. Therefore, when a settlement is processed, a retail shop must deliver to a consumer a statement on which the price of a product and the remaining payment card balance is specified. This requirement constitutes a barrier to sales efficiency and to resource conservation.

According to a conventional ticket vending system, when buying a ticket a consumer must visit a ticket retail store, and this is inconvenient.

Also, as established by a conventional ticket vending system, the validation of a ticket is effected by examining the ticket visually, and such a process is not only inaccurate and inadequate but can be a contributing factor to the commission of an illegal act, such as the use of a counterfeit ticket.

Furthermore, according to the conventional ticket vending system, when a concert, for example, is canceled after a ticket is issued, to receive a refund the consumer must return to the ticket retail store, an additional inconvenient requirement.

And then, in accordance with a conventional settlement system and a conventional ticket vending system, when a consumer wishes to transfer to a friend, etc., a payment card or a ticket that has been purchased, the article must be physically delivered or mailed to the intended recipient, which constitutes one more inconvenience.

DISCLOSURE OF THE INVENTION

To resolve the above shortcomings of the conventional settlement system, it is one objective of the present invention to provide a mobile electronic commerce system that provides superior safety and usability.

According to the present invention, in a mobile electronic commerce system for paying, via wireless communication means, a required amount using an electronic wallet that includes wireless communication means, and for receiving, from a supply side, a product or a service, or a required permission, service means is provided for connecting the electronic wallet and the supply side via the communication means. The service means installs in the electronic wallet, via the communication means, a program for an electronic negotiable card. The electronic wallet employs the installed electronic negotiable card to obtain a product or a service, or a required permission, from the supply side. The settlement process using the negotiable card is performed by the electronic wallet and the supply side via the communication means. The data that are stored in the electronic wallet and at the supply side, in association with the settlement process, are transmitted to the service means at a predetermined time, and are managed by the service means.

In addition, the electronic wallet stores a program for an electronic payment card. The electronic wallet employs the payment card to pay an amount charged for a product or a service received from the supply side. The settlement process that takes place in conjunction with this payment is performed by the electronic wallet and the supply side via the wireless communication means.

Further, the electronic wallet also stores a program for an electronic telephone card. The electronic wallet employs the telephone card to pay an amount that is charged by the supply side for voice communications carried by an exchange service operating via the wireless communication means. The settlement process that takes place in conjunction with this payment is performed by the electronic wallet and the supply side via the wireless communication means.

Furthermore, the electronic wallet stores an electronic ticket. By presenting the information held by the ticket, the electronic wallet and the supply side can engage in an examination process, via the wireless communication means, for the granting, by the supply side, of permission for the ticket to be used for admission.

According to this system, an electronic negotiable card, such as a payment card, a telephone card or a ticket, can be downloaded to the electronic wallet using the communication means and can thus be easily acquired. When the electronic payment card is used to purchase a product or to obtain a service, when the electronic telephone card is used to pay a communication fee, or when the electronic ticket is used to permit a person to pass through an entrance, a settlement process or an examination process is performed through the exchange of data by the electronic wallet and the supply side, so that rapid and accurate processing is enabled.

Since the data that are stored following the completion of a process, both in the electronic wallet and at the supply side, are periodically referred to/managed by the service means, an illegal act can be prevented.

According to an aspect of the invention, a mobile electronic commerce system for paying, via wireless communication means, a required amount from an electronic wallet that includes the wireless communication means and for receiving a product or a service, or a required permission, from a supply side, comprises:

service means for connecting the electronic wallet and the supply side via the communication means, wherein the service means installs, via the communication means, a program for an electronic negotiable card in the electronic wallet;

wherein the electronic negotiable card that is installed is employed to receive a product or a service, or a required permission, from the supply side;

wherein based on a program for the electronic negotiable card a settlement process for which the electronic negotiable card is used, is performed by the electronic wallet and the supply side via the communication means; and wherein, in association with the settlement process, the data that are stored in the electronic wallet and at the supply side are transmitted to the service means at a predetermined time, and are managed thereat.

Thus, an electronic negotiable card can be easily purchased anywhere, and a settlement process performed for the electronic negotiable card is rapid and accurate.

According to an aspect of the invention, provided is a mobile electronic commerce system for paying, via wireless communication means, a required amount using an electronic wallet that includes the wireless communication means and for receiving a product or a service, or a required permission, from a supply side, wherein, via the wireless communication means, the electronic wallet applies the purchase of a program for an electronic negotiable card to service means for issuing the program for the electronic negotiable card;

wherein the service means receives from electronic negotiable card issuing means data concerning the electronic negotiable card, and with settlement means performs a settlement that is associated with the purchase of the electronic negotiable card;

wherein, via the wireless communication means, the program for the electronic negotiable card is installed in the electronic wallet;

wherein the electronic negotiable card that is installed is employed for receiving a product or a service, or a required permission, from the supply side; and wherein, based on the program for the negotiable card, a settlement process based on the use of the negotiable card is performed by the electronic wallet and the supply side via the communication means.

Therefore, the electronic negotiable card can be easily acquired anywhere, and its usability is improved.

According to an aspect of the invention, in the settlement process for which the negotiable card is used, the electronic wallet generates an electronic check corresponding to a payment amount based on the program provided for the negotiable card, and transmits the electronic check to the supply side via the wireless communication means. Then, the supply side, upon receiving the electronic check, transmits an electronic receipt to the electronic wallet. Thereafter, the electronic wallet and the supply side respectively store the electronic receipt and the electronic check as data concerning the settlement process.

Thus, the settlement process for the negotiable card is more accurately performed.

According to an aspect of the invention, in the settlement process for which the electronic negotiable card is used, based on the program provided for the electronic negotiable card the electronic wallet transmits data for the electronic negotiable card to the supply side via the wireless communication means. Then, the supply side, upon receiving the data for the electronic negotiable card, transmits to the electronic wallet an electronic certificate required for the granting of entrance permission and the admission of the owner of the electronic wallet. Thereafter, the electronic wallet and the supply side respectively store the electronic certificate and the data for the electronic negotiable card as data concerning the settlement process.

As a result, an examination process for tickets, etc., can be mechanically performed.

According to an aspect of the invention, in order to transfer the electronic negotiable card that is installed in the electronic wallet to a different electronic wallet, the electronic wallet generates a transfer message using the electronic negotiable card and transmits the message to the different electronic wallet. Then, the electronic wallet deletes the stored electronic negotiable card, and the different electronic wallet transmits, to the service means, the transfer message for the negotiable card. Thereafter, the service means installs a program for the electronic negotiable card in the different electronic wallet.

As a result, an electronic negotiable card can be transferred.

According to an aspect of the invention, the electronic wallet transmits to the service means, via the wireless communication means, an installation number to be recorded on or in a distribution medium, such as printed matter or a recording medium. Then, the service means receives, from negotiable card issuing means, data concerning an electronic negotiable card that is to be issued, and through wireless communication installs a program for an electronic negotiable card corresponding to the installation number.

As a result, while the printed matter on which the installation number has been printed is employed as a distribution medium, the program for the electronic negotiable card can be transmitted along the distribution route as a gift product.

According to an aspect of the invention, the service means manages a template program that is a model of a program for an electronic negotiable card, and based on the template program generates the program for the electronic negotiable card and installs the program in the electronic wallet.

As a result, based on the template program a variety of different types of electronic negotiable cards can be easily issued.

According to an aspect of the invention, a program for an electronic negotiable card includes an inherent private key. When an electronic wallet employs the negotiable card, the private key is employed to add a digital signature to data that are to be transmitted to a supply side via communication means.

As a result, the electronic wallet can confirm for the supply side that the data are valid that are generated based on the program provided for the negotiable card, and the alteration of the data by the supply side can be prevented.

According to an aspect of the invention, provided is a mobile electronic commerce system for paying, via wireless communication means, a required amount from an electronic wallet that includes the wireless communication means, and for receiving a product or a service, or a required permission, from a supply side, wherein the electronic wallet holds an electronic payment card that serves as an electronic payment card program, and employs the electronic payment card when paying the required amount for the product or the service that is received from the supply side; and wherein, via the wireless communication means, the electronic wallet and the supply side perform a settlement process that is associated with the payment.

As a result, the performance of a business transaction involving the use of the electronic payment card is possible.

According to an aspect of the invention, an electronic payment card settlement means for making a payment using the electronic payment card is provided for the supply side.

As a result, the settlement process for the electronic payment card is performed between the electronic wallet and the electronic payment card settlement means.

According to an aspect of the invention, service means is provided to connect, via the communication means, the electronic wallet and the electronic payment card settlement means and to connect, via the communication means, the payment card issuing means and the settlement means, so that the electronic wallet can purchase the electronic payment card through the service means.

As a result, the electronic payment card can be purchased via the service means, and for use can be downloaded into the electronic wallet. Usability can therefore be improved.

According to an aspect of, the electronic wallet, the electronic payment card settlement means, and the service means individually include a plurality of types of communication means. The electronic wallet, the electronic payment card settlement means, and the service means employ different communication means when communication among the three is conducted.

Therefore, smooth communication among the three is possible, and communication secrecy can be maintained.

According to an aspect of the invention, provided is a mobile electronic commerce system for paying, via wireless communication means, a required amount from an electronic wallet that includes the wireless communication means and for receiving a product or a service, or a required permission, from a supply side, wherein the electronic wallet holds an electronic telephone card that serves as an electronic telephone card program, and employs the electronic telephone card when paying a required mount for a communication that is performed via wireless communication means using an exchange service provided by the supply side; and wherein the electronic wallet and the supply side perform, via the wireless communication means, a settlement process that accompanies the payment.

As a result, communication can be performed using the electronic telephone card.

According to an aspect of the invention, the supply side includes communication line exchange means and electronic telephone card settlement means for settling the payment using the electronic telephone card.

Thus, the settlement process for the electronic telephone card is performed by the electronic wallet and the electronic telephone card settlement means.

According to an aspect of the invention, service means is provided for connecting, via the communication means, the electronic wallet and the electronic payment card settlement means, and for connecting, via the communication means, the payment card issuing means and the settlement means, so that the electronic wallet can purchase the electronic telephone card through the service means.

As a result, the electronic telephone card can be purchased via the service means, and for use can be downloaded into the electronic wallet. Usability can therefore be improved.

According to an aspect of the invention, the electronic wallet, the electronic telephone card settlement means, and the service means individually include a plurality of types of communication means. The electronic wallet, the electronic telephone card settlement means, and the service means employ different communication means when communication among the three is conducted.

Therefore, smooth communication among the three is possible, and communication secrecy can be maintained.

According to an aspect of the invention, provided is a mobile electronic commerce system for paying, via wireless communication means, a required amount from an electronic wallet that includes the wireless communication means and for receiving a product or a service, or a required permission, from a supply side, wherein the electronic wallet holds an electronic ticket that is electronically constituted, and provides information concerning the electronic ticket; and wherein the electronic wallet and the supply side perform, via the wireless communication means, an examination process for the electronic ticket for granting permission for an admission.

As a result, the mechanical examination of an electronic ticket can be automated.

According to an aspect of the invention, electronic ticket examination means for examining the electronic ticket is provided for the supply side.

Thus, the examination process can be initiated by communication between the electronic wallet and the electronic ticket examination means.

According to an aspect of the invention, service means is provided for connecting, via the communication means, the electronic wallet and the electronic ticket examination means, and for connecting, via the communication means, the ticket issuing means and the settlement means, so that the electronic wallet can purchase the electronic ticket through the service means.

As a result, the electronic ticket can be purchased via the service means, and for use can be downloaded into the electronic wallet. Usability can therefore be improved.

According to an aspect of the invention, the electronic wallet, the electronic ticket examination means, and the service means individually include a plurality of types of communication means. The electronic wallet, the electronic ticket examination means, and the service means employ different communication means when communication among the three is performed.

According to an aspect of the invention, a mobile electronic commerce system comprises:

an electronic wallet;

electronic payment card settlement means;

electronic telephone card settlement means;

electronic ticket examination means;

service provision means;

settlement processing means;

payment card issuing means;

telephone card issuing means; and ticket issuing means.

Therefore, an electronic payment card, an electronic telephone card, and an electronic ticket can be purchased through the service providing means, and for use can be downloaded into the electronic wallet. Thus, usability is improved.

According to an aspect of the invention, the electronic wallet holds an electronic credit card and employs the electronic credit card to purchase the electronic payment card, the electronic telephone card or the electronic ticket.

Thus, a settlement that is accompanied by the purchase of an electronic payment card, an electronic telephone card or an electronic ticket is performed between the service providing means and the settlement processing means.

According to an aspect of the invention, the electronic wallet includes a plurality of kinds of wireless communication means as the plurality of types of communication means.

Usability in a mobile environment can therefore be improved.

According to an aspect of the invention, as means for engaging in wireless communication with the electronic payment card settlement means or the electronic ticket examination means, the electronic wallet includes wireless communication means that has a shorter communication distance and a higher directivity than has the wireless communication means employed for the electronic telephone card settlement or for the service providing means.

Since the distance between the electronic wallet and the electronic payment card settlement means, or between the electronic wallet and the electronic ticket examination means is at most 1 to 2 meters, the above described wireless communication means is selected, and thus a system can be obtained that is adequate for the environment in which it is used.

According to an aspect of the invention, as means for engaging in wireless communication with the electronic payment card settlement means or the electronic ticket examination means, the electronic wallet includes optical communication means and radio communication means for engaging in wireless communication with the electronic telephone card settlement means or the service providing means.

Thus, the optical communication means, such as infrared communication means, is employed for short distance communication between the electronic wallet and the electronic payment card settlement means, or for communication between the electronic wallet and the electronic ticket examination means, while the radio communication means is employed for long distance communication between the electronic wallet and the service providing means. As a result, a system can be obtained that is adequate for the environment in which it is used.

According to an aspect of the invention, the electronic payment card settlement means includes wireless communication means for engaging in communication with the service providing means.

Therefore, the settlement process can be performed in a mobile environment, and usability is improved.

According to an aspect of the invention, the electronic payment card settlement means is an automatic vending machine that includes automatic product or service providing means.

Thus, a product can be purchased at the automatic vending machine without any cash being required, and usability is improved.

According to an aspect of the invention, the electronic wallet comprises:

input means for entering a numerical value and for performing a selection operation;

a central processing unit for generating data to be transmitted via the wireless communication means, and for processing data received via the wireless communication means;

first storage means for storing a control program for controlling an operation performed by the central processing unit;

display means for displaying data processed by the central processing unit; and second storage means for storing the data processed by the central processing unit, wherein the electronic ticket, the electronic payment card or the electronic telephone card is stored in the second storage means.

As a result, the owner of the electronic wallet can operate the electronic wallet, and the electronic ticket, the electronic payment card or the electronic telephone card stored in the electronic wallet can be made available for use by the owner. Thus, usability of the electronic wallet is improved.

According to an aspect of the invention, the electronic payment card settlement means includes:

optical communication means for communicating with the electronic wallet;

communication means for communicating with the service providing means;

input means for entering a numerical value and performing a selection operation;

a central processing unit for generating data to be transmitted via the optical communication means and the communication means, and for processing data received via the optical communication means and the communication means;

first storage means for storing a control program for controlling an operation performed by the central processing unit;

display means for displaying data processed by the central processing unit; and second storage means for storing the data processed by the central processing unit, wherein a settlement process program module for the electronic payment card is stored in the second storage means.

As a result, an operator can operate the electronic payment card settlement means, and the data stored in the electronic payment card settlement means can be made available to the person in charge. Thus, usability of the electronic payment card settlement means is improved.

According to an aspect of the invention, the electronic payment card settlement means comprises:

optical communication means for communicating with the electronic wallet;

radio communication means for communicating with the service providing means;

product identification means for identifying a product type;

input means for entering a numerical value and for performing a selection operation;

a central processing unit for calculating a charge for the product, for generating data to be transmitted via the optical communication means and the radio communication means, and for processing data received via the optical communication means and the radio communication means;

first storage means for storing a control program for controlling an operation performed by the central processing unit;

display means for displaying data processed by the central processing unit;

second storage means for storing the data processed by the central processing unit; and third storage means for storing value information for the product, wherein a settlement process program module for the electronic payment card is stored in the second storage means.

Therefore, the calculation of the payment for the product, and the settlement process can be performed in a mobile environment, so that usability is improved.

According to an aspect of the invention, the automatic vending machine comprises:

optical communication means for communicating with the electronic wallet;

radio communication means for communicating with the service providing means;

selection means for selecting a product to be purchased or a service;

automatic providing means for providing the product or the service;

a central processing unit for generating data to be transmitted via the optical communication means and the radio communication means, and for processing data received via the optical communication means and the radio communication means;

first storage means for storing a control program for controlling an operation performed by the central processing unit;

display means for displaying data processed by the central processing unit;

second storage means for storing the data processed by the central processing unit;

third storage means for storing value information and stock information for the product; and fourth storage means for storing promotion information for the product or for the service, wherein a settlement process program module for the electronic payment card is stored in the second storage means.

Therefore, the process extending from the time a product is promoted until it is sold can be automated, and usability is improved.

According to an aspect of the invention, the electronic telephone card settlement means comprises:

radio communication means for communicating with the electronic wallet;

communication means for communicating with the service providing means;

communication line exchange means for exchanging a plurality of communication lines;

a central processing unit for generating data to be transmitted via the radio communication means and the communication means, and for processing data received via the radio communication means and the communication means;

first storage means for storing a control program for controlling an operation performed by the central processing unit; and second storage means for storing the data processed by the central processing unit, wherein a settlement process program module for the electronic telephone card is stored in the second storage means.

Thus, the provision of the communication service and the collection of communication charges can be performed at the same time, and the rate at which the communication charges are collected can be improved.

According to an aspect of the invention, the electronic ticket examination means comprises:

optical communication means for communicating with the electronic wallet;

communication means for communicating with the service providing means;

input means for entering a numerical value and for performing a selection operation;

a central processing unit for generating data to be transmitted via the optical communication means and the communication means, and for processing data received via the optical communication means and the communication means;

first storage means for storing a control program for controlling an operation performed by the central processing unit;

display means for displaying data processed by the central processing unit; and second storage means for storing the data processed by the central processing unit, wherein an examination program module for the electronic ticket is stored in the second storage means.

As a result, the operator can operate the electronic ticket means, and the data stored in the electronic ticket means can be made available to the person in charge of the data, so that usability of the electronic ticket means is improved.

According to an aspect of the invention, the service providing means comprises:

user information storage means for storing information concerning the electronic wallet and information concerning a settlement contract concluded with an owner of the electronic wallet;

merchant information storage means for storing information concerning the electronic payment card settlement means, the electronic telephone card settlement means and the electronic ticket examination means, and information concerning a settlement contracts concluded with owners of electronic payment cards, electronic telephone cards and electronic tickets;

settlement processor information storage means for storing information concerning the settlement processing means;

payment card issuer information storage means for storing information concerning the payment card issuing means, and information concerning a settlement contract concluded with an owner of the payment card issuing means;

telephone card issuer information storage means for storing information concerning the telephone card issuing means, and information concerning a settlement contract concluded with an owner of the telephone card issuing means;

ticket issuer information storage means for storing information concerning the ticket issuing means, and information concerning a settlement contract concluded with an owner of the ticket issuing means;

service director information storage means for storing list information for the electronic wallet, the electronic payment card settlement means, the electronic telephone card settlement means, the electronic ticket examination means, the settlement processing means, the payment card issuing means, the telephone card issuing means and the ticket issuing means, and information concerning the electronic ticket, the electronic payment card and the electronic telephone card; and a computer system for processing data in a service provision process for selling, issuing and managing the electronic ticket, the electronic payment card and the electronic telephone card.

As a result, the service providing means can efficiently manage the electronic wallet, the electronic payment card settlement means, etc., and provide the electronic payment card service, the electronic telephone card service and the electronic ticket service.

According to an aspect of the invention, the settlement processing means comprises:

communication means for communicating with the service providing means;

subscriber information storage means for storing information concerning a settlement contract concluded with an owner of the electronic wallet;

member shop information storage means for storing information concerning settlement contracts concluded with owners of electronic payment card settlement means, electronic telephone card settlement means, electronic ticket examination means, payment card issuing means, telephone card issuing means, and ticket issuing means; and a computer system for processing data employed in a settlement process.

As a result, the settlement processing means can efficiently perform a settlement.

According to an aspect of the invention, the payment card issuing means comprises:

communication means for communicating with the service providing means;

customer information storage means for storing information concerning the purchase history of a customer;

payment card issuance information storage means for storing information concerning a payment card that has been issued;

payment card information storage means for storing information concerning the stock of payment cards; and a computer system for processing data during a payment card issuing transaction process.

As a result, the payment card issuing means can efficiently issue payment cards.

According to an aspect of the invention, the telephone card issuing means comprises:

communication means for communicating with the service providing means;

customer information storage means for storing information concerning the purchase history of a customer;

telephone card issuance information storage means for storing information concerning a telephone card that has been issued;

telephone card information storage means for storing information concerning the stock of telephone cards; and a computer system for processing data concerning a telephone card issuing transaction process.

As a result, the telephone card issuing means can efficiently issue telephone cards.

According to an aspect of the invention, the ticket issuing means comprises:

communication means for communicating with the service providing means;

customer information storage means for storing information concerning the purchase history of a customer;

ticket issuance information storage means for storing information concerning a ticket that has been issued;

ticket information storage means for storing information concerning the stock of tickets; and a computer system for processing data concerning a ticket issuing transaction process.

As a result, the ticket issuing means can efficiently issue tickets.

According to an aspect of the invention, the electronic wallet generates and then transmits, to the service providing means, a payment card application message for the purchase of an electronic payment card; the service providing means, upon receiving the payment card application message, communicates with the payment card issuing means and receives therefrom an electronic payment card issuance request message requesting that the service providing means perform an electronic payment card issuing process and an electronic payment card charge settlement process; the service providing means, upon receiving the request message, communicates with the settlement processing means to perform the settlement process for the charge for the payment card, generates an electronic payment card from payment card information that is generated by the payment card issuing means and is included in the electronic payment card issuance request message, and transmits the electronic payment card to the electronic wallet; and the electronic wallet, upon receiving the electronic payment card, stores the electronic payment card in the second storage means thereof.

Therefore, the owner of the electronic wallet can purchase anywhere, as an electronic payment card, a payment card that is issued by the payment card issuing means, and for use, can download it to the electronic wallet. As a result, usability is improved.

According to an aspect of the invention, a micro-check message, generated by an electronic payment card stored in the second storage means, is transmitted to the electronic payment card settlement means in order to confirm the submission of a payment that is the equivalent of an amount entered by the input means.

Since the payment amount is designated by the owner of the electronic wallet, the performance of an illegal act by a retail shop can be prevented.

According to an aspect of the invention, the electronic payment card settlement means, upon receiving the micro-check message, generates and then transmits, to the electronic wallet, the reception message to acknowledge that the micro-check message has been received.

Since the owner of the electronic wallet can confirm the contents of a transaction, the exchange of a printed receipt, such as a statement of account, is not required, and a sale can be performed more efficiently.

According to an aspect of the invention, the electronic wallet generates and then transmits, to the service providing means, a telephone card application message requesting the purchase of an electronic telephone card; the service providing means, upon receiving the telephone card application message, communicates with the telephone card issuing means and receives therefrom an electronic telephone card issuance request message indicating the service providing means has been requested to perform an electronic telephone card issuing process and an electronic telephone card charge settlement process; the service providing means, upon receiving the request message, communicates with the settlement processing means to perform the settlement for the charge for the telephone card, generates an electronic telephone card using telephone card information that is generated by the telephone card issuing means and is included in the electronic telephone card issuance request message, and transmits the electronic telephone card to the electronic wallet; and the electronic wallet, upon receiving the electronic telephone card, stores the electronic telephone card in the second storage means thereof.

Therefore, the owner of the electronic wallet can purchase anywhere, as an electronic telephone card, a telephone card that is issued by the telephone card issuing means, and for use can download it to the electronic wallet. As a result, usability is improved.

According to an aspect of the invention, a telephone micro-check message is generated by an electronic telephone card stored in the second storage means and is transmitted to the electronic telephone card settlement means in order to confirm the submission of a payment that is equivalent to an amount charged by the electronic telephone settlement means.

Therefore, wireless communication service using the prepaid settlement system can be obtained, and usability is improved.

According to an aspect of the invention, the electronic telephone card settlement means, upon receiving the telephone micro-check message, generates and then transmits, to the electronic wallet, a receipt message acknowledging that the telephone micro-check message has been received.

Thus, the owner of the electronic wallet can confirm the contents of a wireless communication service that is provided.

According to an aspect of the invention, the electronic wallet generates and then transmits, to the service providing means, a ticket application message requesting the purchase of an electronic ticket; the service providing means, upon receiving the ticket application message, communicates with the ticket issuing means, and receives therefrom an electronic ticket issuance request message that indicates the service providing means has been requested to perform an electronic ticket issuing process and an electronic ticket charge settlement process; the service providing means, upon receiving the request message, communicates with the settlement processing means to perform the settlement of the charge for the ticket, generates an electronic ticket from ticket information that is generated by the ticket issuing means and is included in the electronic ticket issuance request message, and transmits the electronic ticket to the electronic wallet; and the electronic wallet, upon receiving the electronic ticket stores the electronic ticket in the second storage means thereof.

Therefore, the owner of the electronic wallet can purchase anywhere, as an electronic ticket, a ticket that is issued by the ticket issuing means, and for use, can download it to the electronic wallet. As a result, usability is improved.

According to an aspect of the invention, the electronic wallet generates a ticket presenting message that describes the contents of the electronic ticket stored in the second storage means, and transmits the ticket presenting message to the electronic ticket examination means.

Therefore, tickets can be efficiently examined.

According to an aspect of the invention, the electronic wallet, upon receiving a command message from the electronic ticket examination means, changes the electronic ticket to a post-examined state, and generates and then transmits, to the electronic ticket examination means, a ticket examination response message that describes the contents of the electronic ticket that has been changed.

As a result, the tickets can be precisely and efficiently examined.

According to an aspect of the invention, the electronic ticket examination means, upon receiving the ticket examination response message, generates and then transmits, to the electronic wallet, an examination certificate message that verifies the electronic ticket has been examined.

Thus, the tickets can be more precisely examined.

According to an aspect of the invention, a first electronic wallet generates a payment card transfer certificate message verifying that the electronic payment card stored in the second storage means is to be transferred to a second electronic wallet, and transmits the payment card transfer certificate message via wireless communication means to the second electronic wallet; the second electronic wallet transmits, to the service providing means, the payment card transfer certificate message that is received; the service providing means performs an examination to establish the validity of the payment card transfer certificate message that is received, and transmits, to the second electronic wallet, the electronic payment card that is described in the payment card transfer certificate message; and the second electronic wallet stores, in the second storage means thereof, the electronic payment card that is received.

Therefore, the electronic payment card can be transferred to another person, and usability is improved.

According to an aspect of the invention, the second electronic wallet, upon receiving the payment card transfer certificate message, generates a payment card receipt message confirming that the payment card transfer certificate message has been received, and transmits the payment card receipt message via the wireless communication means to the first electronic wallet; and the first electronic wallet, upon receiving the payment card receipt message, deletes the electronic payment card stored in the second storage means thereof.

Therefore, the electronic payment card can be precisely transferred, and the problems that may accompany such a transfer can be avoided.

According to an aspect of the invention, a first electronic wallet generates a telephone card transfer certificate message confirming that the electronic telephone card stored in the second storage means is to be transferred to a second electronic wallet, and transmits the telephone card transfer certificate message via wireless communication means to the second electronic wallet; the second electronic wallet transmits, to the service providing means, the telephone card transfer certificate message that is received; the service providing means performs an examination to establish the validity of the telephone card transfer certificate message that is received, and transmits, to the second electronic wallet, the electronic telephone card that is described in the telephone card transfer certificate message; and the second electronic wallet stores, in the second storage means thereof, the electronic telephone card that is received.

Therefore, the electronic telephone card can be transferred to another person, and usability is improved.

According to an aspect of the invention, the second electronic wallet, upon receiving the telephone card transfer certificate message, generates a telephone card receipt message confirming that the telephone card transfer certificate message has been received, and transmits the telephone card receipt message via the wireless communication means to the first electronic wallet; and the first electronic wallet, upon receiving the telephone card receipt message, deletes the electronic telephone card stored in the second storage means thereof.

Therefore, the electronic telephone card can be precisely transferred, and the problems that may accompany such a transfer can be avoided.

According to an aspect of the invention, a first electronic wallet generates a ticket transfer certificate message confirming that the electronic ticket stored in the second storage means is to be transferred to a second electronic wallet, and transmits the ticket transfer certificate message via wireless communication means to the second electronic wallet; the second electronic wallet transmits, to the service providing means, the ticket transfer certificate message that is received; the service providing means performs an examination to establish the validity of the ticket transfer certificate message that is received, and transmits, to the second electronic wallet, an electronic ticket that is described in the ticket transfer certificate message; and the second electronic wallet stores, in the second storage means thereof, the electronic ticket that is received.

Therefore, the electronic ticket can be transferred to another person, and usability is improved.

According to an aspect of the invention, the second electronic wallet, upon receiving the ticket transfer certificate message, generates a ticket receipt message confirming that the ticket transfer certificate message has been received, and transmits the ticket receipt message via the wireless communication means to the first electronic wallet; and the first electronic wallet, upon receiving the ticket receipt message, deletes the electronic ticket stored in the second storage means thereof. Therefore, the electronic ticket can be precisely transferred, and the problems that may accompany such a transfer can be avoided.

According to an aspect of the invention, the electronic wallet generates and then transmits, to the service providing means, an electronic payment card installation request message requesting the installation of an electronic payment card; the service providing means, upon receiving the payment card installation request message, communicates with the payment card issuing means and receives therefrom an electronic payment card installation request message indicating that the service providing means is requested to install an electronic payment card; the service providing means, upon receiving the request message, generates an electronic payment card using payment card information that is generated by the payment card issuing means and is included in the electronic payment card installation request message, and transmits the electronic payment card to the electronic wallet; and the electronic wallet, upon receiving the electronic payment card stores the electronic payment card in the second storage means thereof.

Therefore, the owner of the electronic wallet can install an electronic payment card in the electronic wallet anywhere.

According to an aspect of the invention, the electronic payment card installation request message includes electronic payment card installation information that is entered by input means for the electronic wallet and that uniquely describes an electronic payment card that is to be installed.

Therefore, the owner of the electronic wallet can install a desired electronic payment card in the electronic wallet.

According to an aspect of the invention, the electronic wallet generates and then transmits, to the service providing means, an electronic telephone card installation request message for requesting the installation of an electronic telephone card; the service providing means, upon receiving the telephone card installation request message, communicates with the telephone card issuing means, and receives therefrom an electronic telephone card installation request message indicating that the service providing means is to install an electronic telephone card; the service providing means, upon receiving the request message, generates an electronic telephone card using telephone card information that is generated by the telephone card issuing means and that is included in the electronic telephone card installation request message, and transmits the electronic telephone card to the electronic wallet; and the electronic wallet, upon receiving the electronic telephone card, stores the electronic telephone card in the second storage means thereof.

Therefore, the owner of the electronic wallet can install an electronic telephone card in the electronic wallet anywhere.

According to an aspect of the invention, the electronic telephone card installation request message includes the electronic telephone card installation information that is entered by input means for the electronic wallet and that uniquely describes an electronic telephone card that is to be installed.

Therefore, the owner of the electronic wallet can install a desired electronic telephone card in the electronic wallet.

According to an aspect of the invention, the electronic wallet generates and then transmits, to the service providing means, an electronic ticket installation request message requesting the installation of an electronic ticket; the service providing means, upon receiving the ticket installation request message, communicates with the ticket issuing means, and receives therefrom an electronic ticket installation request message indicating that the service providing means is to install an electronic ticket; the service providing means, upon receiving the request message, generates an electronic ticket using ticket information that is generated by the ticket issuing means and is included in the electronic ticket installation request message, and transmits the electronic ticket to the electronic wallet; and the electronic wallet, upon receiving the electronic ticket, stores the electronic ticket in the second storage means thereof.

Therefore, the owner of the electronic wallet can install an electronic ticket in the electronic wallet anywhere.

According to an aspect of the invention, the electronic ticket installation request message includes the electronic ticket installation information that is entered by input means for the electronic wallet and that uniquely describes an electronic ticket that is to be installed.

Therefore, the owner of the electronic wallet can install a desired electronic ticket in the electronic wallet.

According to an aspect of the invention, the electronic payment card installation information, the electronic telephone card installation information or the electronic ticket installation information consists of first identification information describing a type of electronic payment card, a type of electronic telephone card or a type of electronic ticket, and second identification information that uniquely describes an electronic payment card, an electronic telephone card or an electronic ticket, of a type described using the first identification information, that is to be installed. The second identification information is information generated at random.

Thus, an illegal installation that is performed for amusement can be prevented.

According to an aspect of the invention, the first identification information and the second identification information are represented by 8-digit numerals and 32-digit numerals.

As a result, using a simple numerical entry, a maximum of 100 million types of electronic payment cards, electronic telephone cards or electronic tickets, and a $10^{32}$ assortment of a single type can be designated.

According to an aspect of the invention, an object whereon or wherein the electronic payment card installation information, the electronic telephone installation information or the electronic ticket installation information is printed or engraved is employed as sales distribution means or transfer means for the electronic payment card, the electronic telephone card or the electronic ticket.

Therefore, the owner of the electronic wallet can reduce the communication costs involved in the purchase of such a card or a ticket, while he or she can use it as a gift. Thus, the distribution and the utilization of electronic payment cards, electronic telephone cards and electronic tickets can be improved.

According to an aspect of the invention, a recording medium on which the electronic payment card installation information, the electronic telephone installation information or the electronic ticket installation information is stored is employed as sales distribution means or transfer means for an electronic payment card, an electronic telephone card or an electronic ticket.

Therefore, the distribution and the utilization of electronic payment cards, electronic telephone cards and electronic tickets can be improved.

According to an aspect of the invention, the service providing means generates and then transmits, to the electronic wallet, a modification command message for the modification of the contents of the electronic ticket; and the electronic wallet, upon receiving the modification command message, updates the electronic ticket stored in the second storage means to provide a new electronic ticket as is described in the modification command message.

As a result, the contents of a ticket that has been issued can be changed at a low cost.

According to an aspect of the invention, the service providing means generates and then transmits, to the electronic wallet, a modification notification message for the modification of the contents of the electronic ticket; the electronic wallet, upon receiving the modification notification message, generates and then transmits, to the service providing means, a reaction selection message acknowledging receipt of the message for the modification of the contents of the electronic ticket; the service providing means, upon receiving the reaction selection message, generates and then transmits, to the electronic wallet, a modification command message instructing the modification of the contents of the electronic ticket;

and the electronic wallet, upon receiving the modification command message, updates the electronic ticket stored in the second storage means to provide a new electronic ticket that is described in the modification command message.

As a result, the owner of the electronic ticket can be notified when there is a change in the contents of a concert, and can update the electronic ticket.

According to an aspect of the invention, the service providing means generates and then transmits, to the electronic wallet, a modification notification message for the modification of the contents of the electronic ticket; the electronic wallet, upon receiving the modification notification message, generates and then transmits, to the service providing means, a reaction selection message requesting a refund for the electronic ticket; the service providing means, upon receiving the reaction selection message, communicates with the settlement processing means to issue a refund for the electronic ticket, and generates and then transmits, to the electronic wallet, a refund receipt message indicating that a refund process has been completed; and the electronic wallet, upon receiving the refund receipt message, deletes the electronic ticket from the second storage means.

Therefore, the owner of the electronic ticket does not have to visit a ticket retail shop to obtain a refund, and can request and receive a refund anywhere.

According to an aspect of the invention, a computer system in the service providing means comprises:

user information processing means for communicating with the electronic wallet and for processing information stored in user information storage means;

merchant information processing means for communicating with the electronic payment card settlement means, the electronic telephone card settlement means or the electronic ticket examination means, and for processing information stored in merchant information storage means;

settlement processor information processing means for communicating with the electronic settlement processing means, and for processing information stored in settlement processor information storage means;

payment card issuer information processing means for communicating with the payment card issuing means, and for processing information stored in payment card issuer information storage means;

telephone card issuer information processing means for communicating with the telephone card issuing means, and for processing information stored in telephone card issuer information storage means;

ticket issuer information processing means for communicating with the ticket issuing means, and for processing information stored in ticket issuer information storage means;

service director information processing means for communicating with the user information processing means, the merchant information processing means, the settlement processor information processing means, the payment card issuer information processing means, the telephone card issuer information processing means and the ticket issuer information processing means, and for interacting with those means while processing data during a service providing process; and service manager information processing means for controlling the generation and the deletion of the user information processing means, the merchant information processing means, the settlement processor information processing means, the payment card issuer information processing means, the telephone card issuer information processing means, the ticket issuer information processing means and the service director information processing means.

Thus, the calculation function of the computer system can be efficiently distributed among the individual information processing means.

According to an aspect of the invention, the electronic wallet generates and then transmits, to the service providing means, a payment card registration request message requesting that the service providing means register, as an electronic payment card that is to be used by the owner of the electronic wallet, an electronic payment card that is stored in the second storage means; and the service providing means, upon receiving the payment card registration request message, registers the electronic payment card for use in the service director information storage means.

Therefore, an electronic payment card to be used and a sleeping electronic payment card can be managed separately, and an efficient service operation is possible.

According to an aspect of the invention, the service providing means, upon receiving the payment card registration request message, generates and then transmits, to the electronic wallet, a registered card certificate confirming that the electronic payment card has been registered for use; and the electronic wallet stores, in the second storage means, the registered card certificate that is received and changes the state of the electronic payment card to the usable state.

Since an electronic payment card must be registered before it can be used, if a sleeping electronic payment card that is not registered for use is stolen, it can not be used illegally.

According to an aspect of the invention, the electronic wallet generates and then transmits, to the service providing means, a telephone card registration request message requesting that service providing means register, as an electronic telephone card that is to be used by the owner of the electronic wallet, an electronic telephone card that is stored in the second storage means; and the service providing means, upon receiving the telephone card registration request message, registers the electronic telephone card for use in the service director information storage means.

Therefore, an electronic telephone card to be used and a sleeping electronic telephone card can be managed separately, and an efficient service operation is possible.

According to an aspect of the invention, the service providing means, upon receiving the telephone card registration request message, generates and then transmits, to the electronic wallet, a registered card certificate confirming that the electronic telephone card has been registered for use; and the electronic wallet stores, in the second storage means, the registered card certificate that is received and changes the state of the electronic telephone card to the usable state.

Since an electronic payment card must be registered before it can be used, if a sleeping electronic payment card that is not registered for use is stolen, it can not be used illegally.

According to an aspect of the invention, the electronic wallet generates and then transmits, to the service providing means, a ticket registration request message requesting that the second storage means register, as an electronic ticket that is to be used by the owner of the electronic wallet, an electronic ticket that is stored in the second storage means; and the service providing means, upon receiving the ticket registration request message, registers the electronic ticket for use in the service director information storage means.

Therefore, an electronic ticket to be used and a sleeping electronic ticket can be separately managed, and efficient service operation is possible.

According to an aspect of the invention, the service providing means, upon receiving the ticket registration request message, generates and then transmits, to the electronic wallet, a registered ticket certificate that verifies the electronic ticket has been registered for use; and the electronic wallet stores, in the second storage means, the registered ticket certificate that is received, and changes the state of the electronic ticket to the usable state.

Since an electronic payment card must be registered before it can be used, if a sleeping electronic payment card that is not registered for use is stolen, it can not be used illegally.

According to an aspect of the invention, the electronic payment card comprises:

a payment card program;

presented card information describing the contents of the electronic payment card when issued; and a card certificate indicating that the electronic payment card is authentic. The payment card program includes:

electronic payment card state management information; and payment card program data for specifying an operation to be performed by the electronic payment card. The digital signature of the owner of the service providing means is provided for the presented card information.

As a result, a settlement performed with and a transfer of the electronic payment card can be safely effected.

According to an aspect of the invention, the payment card program includes a card signature private key that is employed for a digital signature provided for the electronic payment card. The card certificate is a public key certificate verifying that a card signature public key that is paired with the card signature private key is authentic.

Thus, a digital signature for the electronic payment card can be provided for a message generated by the electronic payment card, and the validity of the message can be verified. According to an aspect of the invention, a settlement program module for the electronic payment card includes two cryptographic keys, an accounting device authentication private key and a card authentication public key. The payment card program includes an accounting device authentication public key, which is paired with the accounting device authentication private key, and a card authentication private key, which is paired with the card authentication public key.

Therefore, the electronic wallet and the electronic payment card settlement means can mutually perform the authentication process, and the safety of a settlement performed with the payment card is improved.

According to an aspect of the invention, the payment card program data includes:

a transaction module program for specifying the procedures to be used for message data that are exchanged by the electronic wallet and the electronic payment card settlement means;

a display module program for specifying the manner in which the electronic payment card is to be displayed; and representative component information for the electronic payment card. A central processing unit in the electronic wallet processes, in accordance with the transaction module program for the electronic payment card, the message data that are exchanged with the electronic payment card settlement means, and displays the representative component information in accordance with the display module program of the electronic payment card, so that on display means the electronic payment card is displayed in the electronic wallet.

Various types of electronic payment cards can be safely issued by employing together the transaction module program, the display module program and the representative component information.

According to an aspect of the invention, a template program that constitutes a model for the electronic payment card is stored in the payment card issuer information storage means for the service providing means.

Thus, various types of electronic payment cards can be safely issued by individual payment card issuers.

According to an aspect of the invention, the template program for the electronic payment card includes:

a transaction module program for the electronic payment card;

a display module program; and representative component information.

Therefore, various types of electronic payment cards can be safely issued.

According to an aspect of the invention, the electronic telephone card comprises:

a telephone card program;

presented card information describing the contents of the electronic telephone card when issued; and a card certificate indicating that the electronic telephone card is authentic. The telephone card program includes:

electronic telephone card state management information; and telephone card program data for specifying an operation to be performed by the electronic telephone card. The digital signature of the owner of the service providing means is provided for the presented card information.

As a result, the settlement of a communication fee by using the telephone card and the transfer of the telephone card can be performed safely.

According to an aspect of the invention, the telephone card program includes a card signature private key that is employed for a digital signature provided for the electronic telephone card. The card certificate is a public key certificate verifying that a card signature public key that is paired with the card signature private key is authentic.

Thus, a digital signature for the electronic telephone card can be provided for a message generated by the electronic telephone card, and the validity of the message can be verified.

According to an aspect of the invention, a settlement program module for the electronic telephone card includes two cryptographic keys, an accounting device authentication private key and a card authentication public key. The telephone card program includes an accounting device authentication public key, which is paired with the accounting device authentication private key, and a card authentication private key, which is paired with the card authentication public key.

Therefore, the electronic wallet and the electronic telephone card settlement means can mutually perform the authentication process, and the safety of a settlement performed with the telephone card is improved.

According to an aspect of the invention, the telephone card program data includes:

a transaction module program for specifying the procedures to be used for message data that are exchanged by the electronic wallet and the electronic telephone card settlement means;

a display module program for specifying the manner in which the electronic telephone card is to be displayed; and representative component information for the electronic telephone card. A central processing unit in the electronic wallet processes, in accordance with the transaction module program for the electronic telephone card, the message data that are exchanged with the electronic telephone card settlement means, and displays the representative component information in accordance with the display module program for the electronic telephone card, so that on display means the electronic telephone card is displayed in the electronic wallet.

Various types of electronic telephone cards can be safely issued by employing together the transaction module program, the display module program, and the representative component information.

According to an aspect of the invention, a template program that constitutes a model for the electronic telephone card is stored in the telephone card issuer information storage means for the service providing means.

Thus, various types of electronic telephone cards can be safely issued by individual telephone card issuers.

According to an aspect of the invention, the template program for the electronic telephone card includes:

a transaction module program for the electronic telephone card;

a display module program; and representative component information.

Therefore, various types of electronic telephone cards can be safely issued.

According to an aspect of the invention, the electronic ticket comprises:

a ticket program;

presented ticket information describing the contents of the electronic ticket when issued; and a ticket certificate indicating that the electronic ticket is authentic. The ticket program includes:

electronic ticket state management information; and ticket program data for specifying an operation to be performed by the electronic ticket. The digital signature of the owner of the service providing means is provided for the presented ticket information.

As a result, the examination and the transfer of the electronic telephone card can be performed safely.

According to an aspect of the invention, the ticket program includes a ticket signature private key that is employed for a digital signature provided for the electronic ticket. The ticket certificate is a public key certificate verifying that a ticket signature public key that is paired with the ticket signature private key is authentic.

Thus, a digital signature for the electronic ticket can be provided for a message generated by the electronic ticket, and the validity of the message can be verified.

According to an aspect of the invention, an examination program module for the electronic ticket includes two cryptographic keys, a gate authentication private key and a ticket authentication public key. The ticket card program includes a gate authentication public key, which is paired with the gate authentication private key, and a ticket authentication private key, which is paired with the ticket authentication public key.

Therefore, the electronic wallet and the electronic ticket examination means can mutually perform the authentication process, and the safety of the examination performed for the ticket is improved.

According to an aspect of the invention, the ticket program data includes:

a transaction module program for specifying the procedures to be used for message data that are exchanged by the electronic wallet and the electronic ticket examination means;

a display module program for specifying the manner in which the electronic ticket is to be displayed; and representative component information for the electronic ticket. A central processing unit in the electronic wallet processes, in accordance with the transaction module program for the electronic ticket, the message data that are exchanged with the electronic ticket examination means, and displays the representative component information in accordance with the display module program for the electronic ticket, so that on display means the electronic ticket is displayed in the electronic wallet.

Various types of electronic tickets can be safely issued by employing together the transaction module program, the display module program, and the representative component information.

According to an aspect of the invention, a template program that constitutes a model for the electronic ticket is stored in the ticket issuer information storage means for the service providing means.

Thus, various types of electronic tickets can be safely issued by individual ticket issuers.

According to an aspect of the invention, the template program for the electronic ticket includes:

a transaction module program for the electronic ticket;

a display module program; and representative component information.

Therefore, various types of electronic tickets can be safely issued.

According to an aspect of the invention, identification information that describes a payment method selected by the input means for the electronic wallet is included in the payment card application message issued by the electronic wallet when requesting the purchase of an electronic payment card.

Therefore, the payment method can be selected when an electronic payment card is purchased, and usability is improved.

According to an aspect of the invention, the electronic payment card issuance request message or the electronic payment card installation request message includes template program identification information for designating, in the order to be used for the generation of an electronic payment card, one of a plurality of template programs that are stored in the payment card issuer information storage means.

Therefore, the payment card issuing means can designate a template program to be used for the electronic payment card, and can issue various types of electronic payment cards.

According to an aspect of the invention, the electronic payment card issuance request message or the electronic payment card installation request message includes representative component information describing the representative component information to be used for an electronic payment card that is to be generated.

Therefore, selected representative component information can be employed when an electronic payment card is issued, and a high degree of freedom can be exercised in the selection of the type of electronic payment card that is to be issued.

According to an aspect of the invention, the electronic wallet generates and then transmits, to the service providing means, a payment card registration request message requesting that the service providing means register, as an electronic payment card that is to be used by the owner of the electronic wallet, the electronic payment card stored in the second storage means for the electronic wallet; the service providing means, upon receiving the payment card registration request message, newly generates, for the electronic payment card, a card signature private key, a card signature public key and a registered card certificate for authenticating the card signature public key, registers the electronic payment card for use in the service director information storage means, and then transmits, to the electronic wallet, the card signature private key and the registered card certificate; and the electronic wallet updates the card signature private key and the registered card certificate that are in storage by replacing them with those that have newly been received, and changes the state management information for the electronic payment card to a usable state.

Since the signature key for the electronic payment card is updated for use by the registration, safety is improved.

According to an aspect of the invention, the electronic wallet employs an electronic payment card, which is selected by input means for the electronic wallet from among those stored in the second storage means, to generate a micro-check message that verifies a payment corresponding to an amount entered by the input means, and transmits the micro-check message to the electronic payment card settlement means.

Therefore, an electronic payment card to be used can be selected, and usability can be improved.

According to an aspect of the invention, the electronic wallet employs an electronic payment card, which is selected by input means of the electronic wallet from among those stored in the second storage means, to generate a payment offer message that offers a payment corresponding to an amount entered by the input means, and transmits the payment offer message to the electronic payment card settlement means; the electronic payment card settlement means, upon receiving the payment offer message, generates and then transmits, to the electronic wallet, a payment offer response message that assesses a charge corresponding to an amount entered by input means for the electronic payment card settlement means; the electronic wallet, upon receiving the payment offer response message and if the assessed charge is equal to or smaller than an amount entered by the input means for the electronic wallet, subtracts the assessed charge from a remaining amount stored on the electronic payment card, and generates and then transmits, to the electronic payment card settlement means, a micro-check message validating a payment corresponding to the assessed charge; the electronic payment card settlement means stores the received micro-check message in the second storage means for the electronic payment card settlement means, and generates and then transmits, to the electronic wallet, a receipt message confirming that the micro-check message has been received; and the electronic wallet stores the received receipt message in the second storage means for the electronic wallet.

Since an amount higher than that designated by the owner of the electronic wallet is not paid, safety can be improved.

According to an aspect of the invention, the payment offer message includes:

a payment amount entered by the input means of the electronic wallet;

presented card information and a registered card certificate for the electronic payment card; and state management information to which a digital signature has been added using the card signature private key.

Therefore, the contents of the electronic payment card to be used for the payment are concisely presented to the electronic payment card settlement means, so that the electronic payment card settlement means can determine whether the card is a valid electronic payment card.

According to an aspect of the invention, the micro-check message includes:

a payment amount;

an amount remaining stored on the electronic payment card;

identification information for the electronic payment card settlement means; and identification information for the owner of the electronic payment card settlement means. Further, a digital signature is provided for the micro-check message by using the card signature private key for the electronic payment card.

As a result, the amount of the payment and the person making the payment are verified, and the imposition of an illegal charge by a retail shop can be prevented.

According to an aspect of the invention, the digital signature of the owner of the electronic wallet is also provided for the micro-check message.

Since a determination is made as to whether or not the micro-check was issued by the owner of the electronic payment card, an examination of the validity of the micro-check can be precisely performed.

According to an aspect of the invention, the micro-check message includes a micro-check issuing number representing the order in which micro-check messages are generated by the electronic payment card.

Since the matching of the order of generation of the micro-check and the amount remaining can be determined, an examination of the validity of the micro-check can be more precisely performed.

According to an aspect of the invention, at a time designated by the service providing means, the electronic payment card settlement means generates an upload data message that includes data stored in the second storage means for the electronic payment card settlement means, and then transmits the upload data message to the service providing means; the service providing means, upon receiving the upload data message, examines the validity of a micro-check that is included in the upload data message by comparing the micro-check with registration information for the electronic payment card that is registered in the service director information storage means, and generates and then transmits, to the electronic payment card settlement means, an update data message that includes update data for the second storage means for the electronic payment card settlement means; and the electronic payment card settlement means extracts the update data from the update data message that is received, and updates data stored in the second storage means.

Therefore, the micro-check that has been used can be automatically collected, and can be examined to determine its validity.

According to an aspect of the invention, a first electronic wallet generates a payment card transfer offer message containing an offer to transfer, to a second electronic wallet, an electronic payment card that is stored in the second storage means, and then transmits the payment card transfer offer message, via the wireless communication means, to the second electronic wallet; the second electronic wallet, upon receiving the payment card transfer offer message, generates a payment card transfer offer response message indicating that the contents of the payment card transfer offer message are accepted, and then transmits the payment card transfer offer response message, via the wireless communication means, to the first electronic wallet; and the first electronic wallet, upon receiving the payment card transfer offer response message, generates and then transmits, to the second electronic wallet, a payment card transfer certificate message confirming the transfer of the electronic payment card to the second electronic wallet.

Therefore, the side that is to transfer the electronic payment card and the side that is to receive the electronic payment card can perform negotiations concerning the contents.

According to an aspect of the invention, the payment card transfer offer message includes:

presented card information, and a card certificate or a registered card certificate for the electronic payment card; and state management information having an added digital signature prepared using a card signature private key.

Thus, the side to which the electronic payment card is to be transferred can confirm its contents in advance.

According to an aspect of the invention, the payment card transfer offer message includes a public key certificate for the owner of the first electronic wallet; a digital signature of the owner of the first electronic wallet is provided for the payment card transfer offer message; the payment card transfer offer response message includes a public key certificate for the owner of the second electronic wallet; a digital signature of the owner of the second electronic wallet is provided for the payment card transfer offer message; the payment card transfer certificate message includes identification information for the public key certificate of the owner of the first electronic wallet and identification information for the public key certificate of the owner of the second electronic wallet; and a digital signature using a card signature private key for the electronic payment card and a digital signature of the owner of the first electronic wallet are provided for the payment card transfer certificate message.

Thus, the person to whom the electronic payment card is to be transferred is guaranteed, and even when the payment card transfer certificate is stolen, the unauthorized use of card can be prevented.

According to an aspect of the invention, identification information that describes a payment method selected by the input means of the electronic wallet is included in the telephone card application message issued by the electronic wallet when requesting the purchase of an electronic telephone card.

Therefore, the payment method can be selected when an electronic telephone card is purchased, and usability is improved.

According to an aspect of the invention, the electronic telephone card issuance request message or the electronic telephone card installation request message includes template program identification information for designating, following the order that is to be used for the generation of electronic telephone cards, one of a plurality of template programs that are stored in the telephone card issuer information storage means.

Therefore, the telephone card issuing means can designate a template program to be used for the electronic telephone card, and can issue various types of electronic telephone cards.

According to an aspect of the invention, the electronic telephone card issuance request message or the electronic telephone card installation request message includes representative component information describing representative component information to be used for an electronic telephone card that is to be generated.

Therefore, selected representative component information can be employed when an electronic telephone card is issued, and a high degree of freedom can be exercised in the selection of the type of electronic telephone cards that is to be issued.

According to an aspect of the invention, the electronic wallet generates and then transmits, to the service providing means, a telephone card registration request message requesting that the service providing means register, as an electronic telephone card that is to be used by the owner of the electronic wallet, the electronic telephone card stored in the second storage means for the electronic wallet; the service providing means, upon receiving the telephone card registration request message, newly generates, for the electronic telephone card, a card signature private key, a card signature public key and a registered card certificate for confirming the card signature public key, registers for use the electronic telephone card in the service director information storage means, and then transmits, to the electronic wallet, the card signature private key and the registered card certificate; and the electronic wallet updates the card signature private key and the registered card certificate that are in storage by replacing them with those that have newly been received, and changes the state management information for the electronic telephone card to a usable state.

Since the signature key for the electronic telephone card is updated for use by the registration, safety is improved.

According to an aspect of the invention, the electronic wallet employs an electronic telephone card, which is selected by input means for the electronic wallet from among those stored in the second storage means, to generate a micro-check message verifying a payment corresponding to an amount entered by the input means, and transmits the micro-check message to the electronic telephone card settlement means.

Therefore, an electronic telephone card that is to be used can be selected, and usability can be improved.

According to an aspect of the invention, the electronic wallet employs an electronic telephone card, which is selected by input means for the electronic wallet from among those stored in the second storage means, to generate a micro-check call request message requesting a radio communication service in order to communicate with a side that is designated by the input means, and transmits the micro-check call request message to the electronic telephone card settlement means; the electronic telephone card settlement means, upon receiving the micro-check call request message, generates and then transmits, to the electronic wallet, a micro-check call response message for an amount charged that corresponds to a communication fee; the electronic wallet, upon receiving the micro-check call response message, subtracts the amount charged from the remaining amount stored on the electronic telephone card, and generates and then transmits, to the electronic telephone card settlement means, a telephone micro-check message verifying the payment of an amount corresponding to the amount charged; the electronic telephone card settlement means, upon receiving the telephone micro-check message, generates and then transmits, to the electronic wallet, a receipt message confirming the receipt of the telephone micro-check message; and the electronic wallet stores the received receipt message in the second storage means for the electronic wallet.

Therefore, the communication service provider can charge an amount that corresponds to a fee for a provided wireless communication service.

According to an aspect of the invention, the electronic telephone card settlement means, when radio wireless communication service is provided, generates and then transmits, to the electronic wallet, a communication fee charge message for an amount charged that corresponds to an additional communication fee; the electronic wallet, upon receiving the communication fee charge message, subtracts the amount that is charged from an amount remaining on the electronic telephone card, and generates and then transmits, to the electronic telephone card settlement means, a new telephone micro-check message verifying payment of the total amount charged; the electronic telephone card settlement means generates and then transmits, to the electronic wallet, a receipt message confirming that the telephone micro-check message has been received; the electronic wallet updates a receipt message stored in the second storage means for the electronic wallet by storing therein the receipt message that is newly received; and the electronic telephone card settlement means, when provision of the radio wireless communication service is terminated, stores the latest telephone micro-check message in the second storage means for the electronic telephone card settlement means.

Therefore, the amount of history information is not increased very much even though the payment of additional fees is effected many times during the communication process.

According to an aspect of the invention, the micro-check call request message includes:

identification information for the side that is designated by the input means of the electronic wallet;

presented card information and a registered card certificate for the electronic telephone card; and state management information accompanied by a digital signature that is provided by using a card signature private key.

Therefore, the contents of the electronic telephone card that are to be used for payments are presented exactly to the electronic telephone card settlement means, so that the electronic telephone card settlement means can determine whether the card is a valid electronic telephone card.

According to an aspect of the invention, the telephone micro-check message includes:

a payment amount;

a amount remaining stored on the electronic telephone card;

identification information for the electronic telephone card settlement means; and identification information for the owner of the electronic telephone card settlement means. Further, a digital signature is provided for the telephone micro-check message by using the card signature private key of the electronic telephone card.

As a result, the amount of the payment and the person making the payment are verified, and the imposition of an illegal charge by the owner of the electronic telephone card settlement means can be prevented.

According to an aspect of the invention, not only the digital signature using the card signature private key for the electronic telephone card, but also the digital signature of the owner of the electronic wallet is provided for the telephone micro-check message.

Since whether or not the telephone micro-check has been issued is determined by the owner of the electronic telephone card, a precise examination of the validity of the telephone micro-check can be performed.

According to an aspect of the invention, the telephone micro-check message includes a telephone micro-check issuing number representing the order in which telephone micro-check messages are generated by the electronic telephone card.

Since the matching of the generation order for the telephone micro-check and the amount remaining can be determined, a more precise examination of the validity of the telephone micro-check can be performed.

According to an aspect of the invention, at a time designated by the service providing means, the electronic telephone card settlement means generates an upload data message that includes data stored in the second storage means for the electronic telephone card settlement means, and then transmits the upload data message to the service providing means; the service providing means, upon receiving the upload data message, examines the validity of a telephone micro-check that is included in the upload data message by comparing the telephone micro-check with registration information for the electronic telephone card that is registered in the service director information storage means, and generates and then transmits, to the electronic telephone card settlement means, an update data message that includes update data for the second storage means for the electronic telephone card settlement means; and the electronic telephone card settlement means extracts the update data from the update data message that is received, and updates data stored in the second storage means.

Therefore, the telephone micro-check that has been used can be automatically collected, and an examination of its validity can be performed.

According to an aspect of the invention, a first electronic wallet generates a telephone card transfer offer message offering to transfer, to a second electronic wallet, an electronic telephone card that is stored in the second storage means, and transmits the telephone card transfer offer message via the wireless communication means to the second electronic wallet; the second electronic wallet, upon receiving the telephone card transfer offer message, generates a telephone card transfer offer response message indicating that the contents of the telephone card transfer offer message are accepted, and then transmits the telephone card transfer offer response message via the wireless communication means to the first electronic wallet; and the first electronic wallet, upon receiving the telephone card transfer offer response message, generates and then transmits, to the second electronic wallet, a telephone card transfer certificate message confirming the transfer of the electronic telephone card to the second electronic wallet.

Therefore, the side that is to transfer the electronic telephone card and the side that is to receive the electronic telephone card can negotiate the provisions of the transfer.

According to an aspect of the invention, the telephone card transfer offer message includes:

presented card information and a card certificate or a registered card certificate for the electronic telephone card; and state management information accompanied by a digital signature added by using a card signature private key.

Thus, the side to which the electronic telephone card is to be transferred can confirm its contents in advance.

According to an aspect of the invention, the telephone card transfer offer message includes a public key certificate for the owner of the first electronic wallet; the digital signature of the owner of the first electronic wallet is provided for the telephone card transfer offer message; the telephone card transfer offer response message includes a public key certificate for the owner of the second electronic wallet; the digital signature of the owner of the second electronic wallet is provided for the telephone card transfer offer message; the telephone card transfer certificate message includes identification information for the public key certificate for the owner of the first electronic wallet and identification information for the public key certificate for the owner of the second electronic wallet; and a digital signature using a card signature private key for the electronic telephone card and the digital signature of the owner of the first electronic wallet are provided for the telephone card transfer certificate message. Thus, the person to whom the electronic telephone card is to be transferred is identified, and even if the telephone card transfer certificate is stolen, the unauthorized use of that card can be prevented.

According to an aspect of the invention, identification information that describes a payment method selected by the input means of the electronic wallet is included in the ticket application message issued by the electronic wallet when requesting the purchase of an electronic ticket.

Therefore, the payment method can be selected when an electronic ticket is purchased, and usability is improved.

According to an aspect of the invention, the electronic ticket issuance request message or the electronic ticket installation request message includes template program identification information for designating, following the order that is to be used for the generation of electronic tickets, one of a plurality of template programs that are stored in the ticket issuer information storage means.

Therefore, the ticket issuing means can designate a template program to be used for the electronic ticket, and can issue various types of electronic tickets.

According to an aspect of the invention, the electronic ticket issuance request message or the electronic ticket installation request message includes representative component information describing representative component information for an electronic ticket that is to be generated.

Therefore, selected representative component information can be employed when an electronic ticket is issued, and a high degree of freedom can be exercised in the selection of the type of electronic ticket that is to be issued.

According to an aspect of the invention, the electronic wallet generates and then transmits, to the service providing means, a ticket registration request message requesting that the service providing means register, as an electronic ticket that is to be used by the owner of the electronic wallet the electronic ticket stored in the second storage means for the electronic wallet; the service providing means, upon receiving the ticket registration request message, newly generates, for the electronic ticket, a ticket signature private key, a ticket signature public key and a registered ticket certificate for verifying the ticket signature public key, registers the electronic ticket for use in the service director information storage means, and then transmits, to the electronic wallet, the ticket signature private key and the registered ticket certificate; and the electronic wallet updates the ticket signature private key and the registered ticket certificate that are stored by replacing them with those that have been newly received, and changes the state management information for the electronic ticket to a usable state.

Since for use the signature key for the electronic ticket is updated by the registration, safety is improved.

According to an aspect of the invention, the electronic wallet generates a ticket presenting message in which is designated an electronic ticket that is selected, from among those stored in the second storage means, by input means for the electronic wallet, and transmits the ticket presenting message to the electronic ticket examination means.

Therefore, an electronic ticket that is to be used can be selected, and usability can be improved.

According to an aspect of the invention, the electronic ticket examination means, upon receiving the ticket presenting message, generates and then transmits, to the electronic wallet, a ticket examination message instructing the modification of the electronic ticket to a post-examined state; the electronic wallet, upon receiving the ticket examination message, changes the electronic ticket to the post-examined state, and generates and then transmits, to the electronic ticket examination means, a ticket examination response message that describes the contents of the modified electronic ticket; the electronic ticket examination means stores the received ticket examination response message in the second storage means for the electronic ticket examination means, and generates and then transmits, to the electronic wallet, an examination certificate message certifying that the electronic ticket has been examined; and the electronic wallet stores the received examination certificate message in the second storage means for the electronic wallet. Therefore, the electronic ticket examination means can perform the examination process in consonance with the contents of the ticket that is presented.

According to an aspect of the invention, the ticket presenting message includes:

presented ticket information and a registered ticket certificate for the electronic ticket; and state management information accompanied by a digital signature provided by using a ticket signature private key.

Therefore, the contents of the electronic ticket to be used for payment are precisely presented to the electronic ticket examination means, so that the electronic ticket examination means can determine whether the ticket is a valid electronic ticket.

According to an aspect of the invention, the ticket examination response message includes:

state management information for the electronic ticket;

identification information for the electronic ticket examination means; and identification information for the owner of the electronic ticket examination means. Further, a digital signature is provided for the ticket examination response message by using the ticket signature private key for the electronic ticket.

As a result, the contents of the electronic ticket that is examined are verified, and an illegal charge imposed by the owner of the electronic ticket examination means can be prevented.

According to an aspect of the invention, the ticket examination response message includes identification information for the electronic ticket examination means and identification information for the owner of the electronic ticket examination means. Further, the digital signature prepared using the ticket signature private key for the electronic ticket and the digital signature of the owner of the electronic wallet are provided for the ticket examination response message.

Since it can be determined whether or not the ticket examination response message has been issued by the owner of the electronic ticket, a precise examination of the validity of the ticket examination response can be performed.

According to an aspect of the invention, the ticket examination response message includes a ticket examination number representing the order in which ticket examination response messages are generated by the electronic ticket.

Since the matching of the generation order for the ticket examination response message and the remaining amount can be determined, a more precise examination of the validity of the ticket examination response message can be performed.

According to an aspect of the invention, at a time designated by the service providing means, the electronic ticket examination means generates an upload data message that includes data stored in the second storage means for the electronic ticket examination means, and then transmits the upload data message to the service providing means; the service providing means, upon receiving the upload data message, determines the validity of a ticket examination response that is included in the upload data message by comparing the ticket examination response with registration information for the electronic ticket that is registered in the service director information storage means, and generates and then transmits, to the electronic ticket examination means, an update data message that includes update data for the second storage means for the electronic ticket examination means; the electronic ticket examination means extracts the update data from the update data message that is received, and updates data stored in the second storage means.

Therefore, the ticket examination response can be automatically compiled, and its validity can be examined.

According to an aspect of the invention, a first electronic wallet generates a ticket transfer offer message offering to transfer, to a second electronic wallet, an electronic ticket that is stored in the second storage means, and then transmits the ticket transfer offer message via the wireless communication means to the second electronic wallet; the second electronic wallet, upon receiving the ticket transfer offer message, generates a ticket transfer offer response message indicating the contents of the ticket transfer offer message are acceptable, and then transmits the ticket transfer offer response message via the wireless communication means to the first electronic wallet; and the first electronic wallet, upon receiving the ticket transfer offer response message, generates and then transmits, to the second electronic wallet, a ticket transfer certificate message confirming the transfer of the electronic ticket to the second electronic wallet. Therefore, the side that is to transfer the electronic ticket and the side that is to receive the electronic ticket can perform negotiations concerning the contents.

According to an aspect of the invention, the ticket transfer offer message includes:

presented ticket information and a ticket certificate or a registered ticket certificate for the electronic ticket; and state management information accompanied by a digital signature that is added by using a ticket signature private key.

Thus, the side to which the electronic ticket is to be transferred can confirm the ticket contents in advance.

According to an aspect of the invention, the ticket transfer offer message includes a public key certificate for the owner of the first electronic wallet; the digital signature of the owner of the first electronic wallet is provided for the ticket transfer offer message; the ticket transfer offer response message includes a public key certificate for the owner of the second electronic wallet; the digital signature of the owner of the second electronic wallet is provided for the ticket transfer offer message; the ticket transfer certificate message includes identification information for the public key certificate for the owner of the first electronic wallet and identification information for the public key certificate for the owner of the second electronic wallet; and a digital signature using a ticket signature private key for the electronic ticket and the digital signature of the owner of the first electronic wallet are provided for the ticket transfer certificate message.

Thus, the person to whom the electronic ticket is to be transferred is verified, and even if the ticket transfer certificate is stolen, the unauthorized use of that ticket can be prevented.

According to an aspect of the invention, settlement option information for deciding which procedures to use for settlement is included in the electronic payment card issuance request message, in the electronic telephone card issuance request message or in the electronic ticket issuance request message.

Thus, the payment card issuer, the telephone card issuer and the ticket issuer can establish procedures to be used for the settlement.

According to an aspect of the invention, the service providing means, upon receiving the electronic payment card issuance request message, the electronic telephone card issuance request message or the electronic ticket issuance request message, generates and then transmits, to the electronic wallet, an electronic payment card, an electronic telephone card or an electronic ticket before performing a price settlement in accordance with the settlement option information.

Thus, the electronic payment card, the electronic telephone card or the electronic ticket can be issued without the purchaser being delayed.

According to an aspect of the invention, the service providing means, upon receiving the electronic payment card issuance request message, the electronic telephone card issuance request message or the electronic ticket issuance request message, generates and then transmits, to the electronic wallet, an electronic payment card, an electronic telephone card or an electronic ticket, and a temporary receipt message describing the contents of a settlement before performing a price settlement in accordance with the settlement option information.

Thus, the electronic payment card, the electronic telephone card or the electronic ticket can be issued without the purchaser being delayed.

According to an aspect of the invention, data concerning the electronic payment card, the electronic telephone card and the electronic ticket belonging to the owner of the electronic wallet, and data processed by the central processing unit of the electronic wallet are stored in the second storage means for the electronic wallet or in the user information storage means for the service providing means; the data are managed by describing, in the second storage means for the electronic wallet, identification information for the data, and addresses of the data in the corresponding storage means; when data at an address in the user information storage means are to be processed, the electronic wallet generates and then transmits, to the service providing means, a remote access request message requesting address data; the service providing means, upon receiving the remote access request message, generates and then transmits, to the electronic wallet, a remote access data message in which the requested data are included; and the electronic wallet, upon receiving the remote access data message, extracts the requested data from the message.

Therefore, a plurality of electronic payment cards, electronic telephone cards and electronic tickets, and multiple sets of history information can be managed for the electronic, even in a memory having only a limited capacity.

According to an aspect of the invention, the electronic wallet employs a ferroelectric nonvolatile memory as storage means.

Therefore, the service life of the battery of the electronic wallet can be extended.

According to an aspect of the invention, a ferroelectric nonvolatile memory is employed as storage means for the electronic payment card settlement means.

Therefore, the service life of the battery for the electronic payment card settlement means can be extended.

According to an aspect of the invention, the object is one whereon or wherein electronic payment card installation information, electronic telephone card installation information, or electronic ticket installation information is printed or engraved in a form readable by a person or reading means.

Therefore, the electronic payment card, the electronic telephone card or the electronic ticket can be physically distributed along a distribution route.

According to an aspect of the invention, a coating is applied to a portion of the object whereon or wherein the electronic payment card installation information, the electronic telephone card installation information or the electronic ticket installation information is printed or engraved in order to disable the reading of the electronic payment card installation information, the electronic telephone card installation information or the electronic ticket installation information. The coating is removable.

Thus, the unauthorized dissemination of installation information occurring prior to a purchase can be prevented.

According to an aspect of the invention, to prevent holographic counterfeiting, a micro-character or a micro-pattern is printed on or etched in the object.

Therefore, the counterfeiting can be prevented.

According to an aspect of the invention, on the recording medium, electronic payment card installation information, electronic telephone card installation information, or electronic ticket installation information is recorded using a form that can be read by recording/reproduction means.

Therefore, the electronic payment card, the electronic telephone card or the electronic ticket can be physically distributed along a distribution route.

According to an aspect of the invention, on the recording medium, a control program for the central processing unit of the electronic wallet is stored in a form readable by a computer. Thus, the program can be distributed in a portable form.

According to an aspect of the invention, on the recording medium, a control program for the central processing unit of the electronic payment card settlement means is recorded in a form readable by a computer. Thus, the program can be distributed in a portable form.

According to an aspect of the invention, on the recording medium, a control program for the central processing unit of the electronic telephone card settlement means is recorded in a form readable by a computer. Thus, the program can be distributed in a portable form.

According to an aspect of the invention, on the recording medium, a control program for the central processing unit of the electronic ticket examination means is recorded in a form readable by a computer. Thus, the program can be distributed in a portable form.

According to an aspect of the invention, on the recording medium, a processing program for the computer system of the service providing means is recorded in a form readable by a computer. Thus, the program can be distributed in a portable form.

According to an aspect of the invention, on the recording medium, a processing program for the computer system of the settlement processing means is recorded in a form readable by a computer. Thus, the program can be distributed in a portable form.

According to an aspect of the invention, on the recording medium, a processing program for the computer system of the payment card issuing means is recorded in a form readable by a computer. Thus, the program can be distributed in a portable form.

According to an aspect of the invention on the recording medium, a processing program for the computer system of the telephone card issuing means is recorded in a form readable by a computer. Thus, the program can be distributed in a portable form.

According to an aspect of the invention, on the recording medium, a processing program for the computer system of the ticket issuing means is recorded in a form readable by a computer. Thus, the program can be distributed in a portable form.

BRIEF DESCRIPTION OF THE DRAWINGS

FIGS. 14A and 14B are schematic diagrams illustrating an electronic payment card installation card according to the embodiment of the present invention;

FIGS. 14C and 14D are schematic diagrams illustrating an electronic telephone card installation card according to the embodiment of the present invention;

FIG. 16B is a diagram showing the bit field structure of an interrupt register in the mobile user terminal according to the embodiment of the present invention;

FIG. 23B is a diagram showing the bit field structure of an interrupt register in the gate terminal according to the embodiment of the present invention;

FIG. 27B is a diagram showing the bit field structure of an interrupt register in the merchant terminal according to the embodiment of the present invention;

FIG. 31B is a diagram showing the bit field structure of an interrupt register in the merchant terminal (digital wireless telephone type) according to the embodiment of the present invention;

FIG. 31C is a diagram showing the bit field structure of a key display register in the merchant terminal (digital wireless telephone type) according to the embodiment of the present invention;

FIG. 87D is a specific diagram showing the structure of update data that are exchanged between the mobile user terminal and the user processor according to the embodiment of the present invention;

FIG. 87E is a specific diagram showing the data structure of a mandatory expiration that is exchanged between the mobile user terminal and the user processor according to the embodiment of the present invention;

FIG. 87F is a specific diagram showing the data structure of a data update instruction that is exchanged between the mobile user terminal and the user processor according to the embodiment of the present invention;

FIG. 88A is a specific diagram showing the data structure of a data update request that is exchanged between the gate terminal (the merchant terminal 102 or 103, the accounting device, or the electronic telephone accounting device) and the merchant processor according to the embodiment of the present invention;

FIG. 88B is a specific diagram showing the data structure of a data update response that is exchanged between the gate terminal (the merchant terminal 102 or 103, the accounting device, or the electronic telephone card accounting device) and the merchant processor according to the embodiment of the present invention;

FIG. 88C is a specific diagram showing the structure of upload data that are exchanged between the gate terminal (the merchant terminal 102 or 103, the accounting device, or the electronic telephone accounting device) and the merchant processor according to the embodiment of the present invention;

FIG. 88D is a specific diagram showing the structure of update data that are exchanged between the gate terminal (the merchant terminal 102 or 103, the accounting device, or the electronic telephone card accounting device) and the merchant processor according to the embodiment of the present invention;

FIG. 88E is a specific diagram showing the data structure of a mandatory expiration that is exchanged between the gate terminal (the merchant terminal 102 or 103, the accounting device, or the electronic telephone accounting device) and the merchant processor according to the embodiment of the present invention;

FIG. 88F is a specific diagram showing the data structure of a data update instruction that is exchanged between the gate terminal (the merchant terminal 102 or 103, the accounting device, or the electronic telephone card accounting device) and the merchant processor according to the embodiment of the present invention;

FIG. 89A is a specific diagram showing the data structure of a ticket order that is transmitted, during the ticket order processing, from the mobile user terminal to the service system according to the embodiment of the present invention;

FIG. 89B is a specific diagram showing the data structure of a ticket order that is transmitted, during the ticket order processing, from the service system to the ticket issuing system according to the embodiment of the present invention;

FIG. 90A is a specific diagram showing the data structure of a ticket order response that is transmitted, during the ticket order processing, from the ticket issuing system to the service system according to the embodiment of the present invention;

Figure 90B:
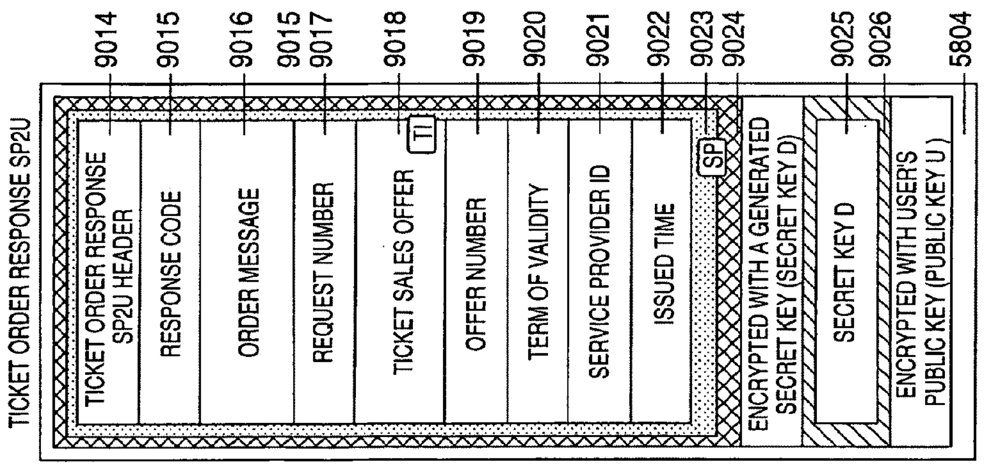
Figure 91A:
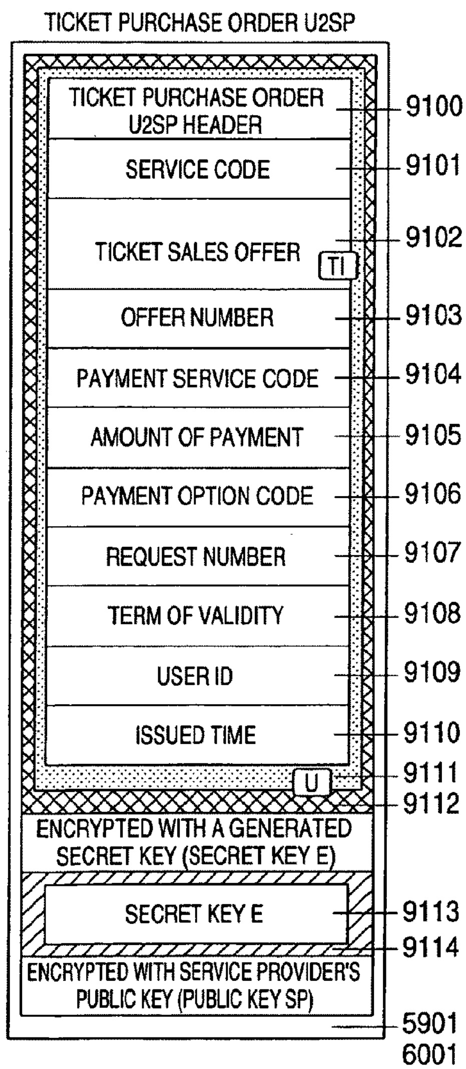
Figure 91B:
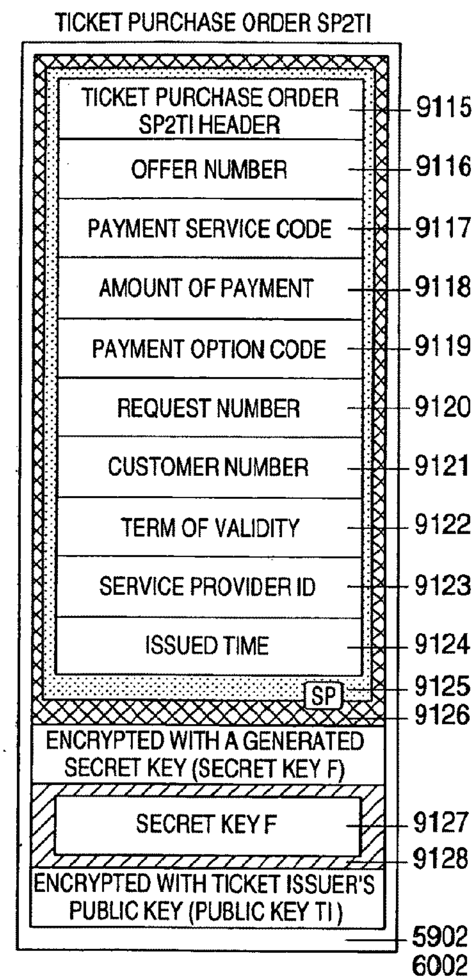
Figure 92A:
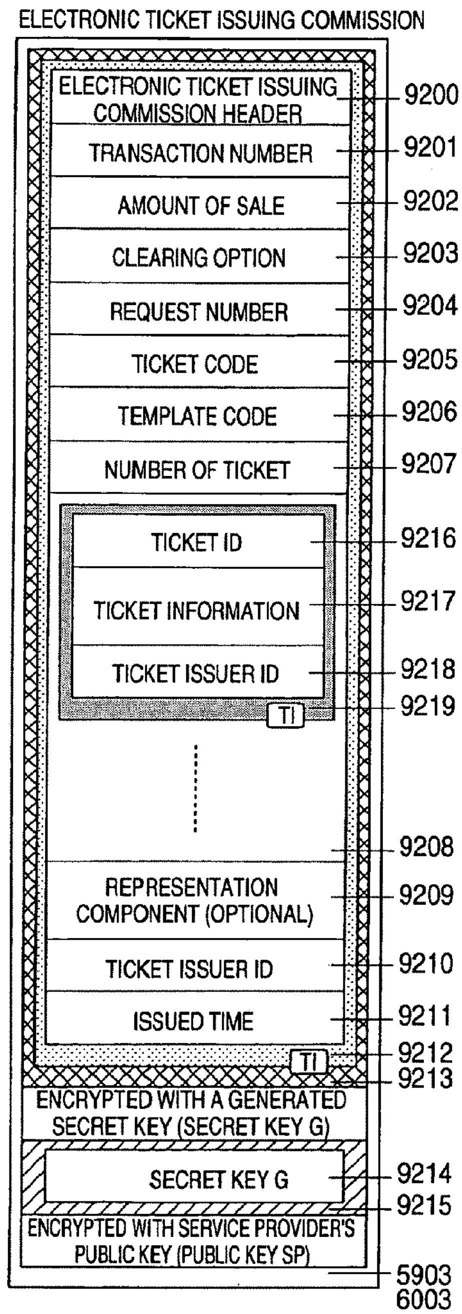
Figure 92B:
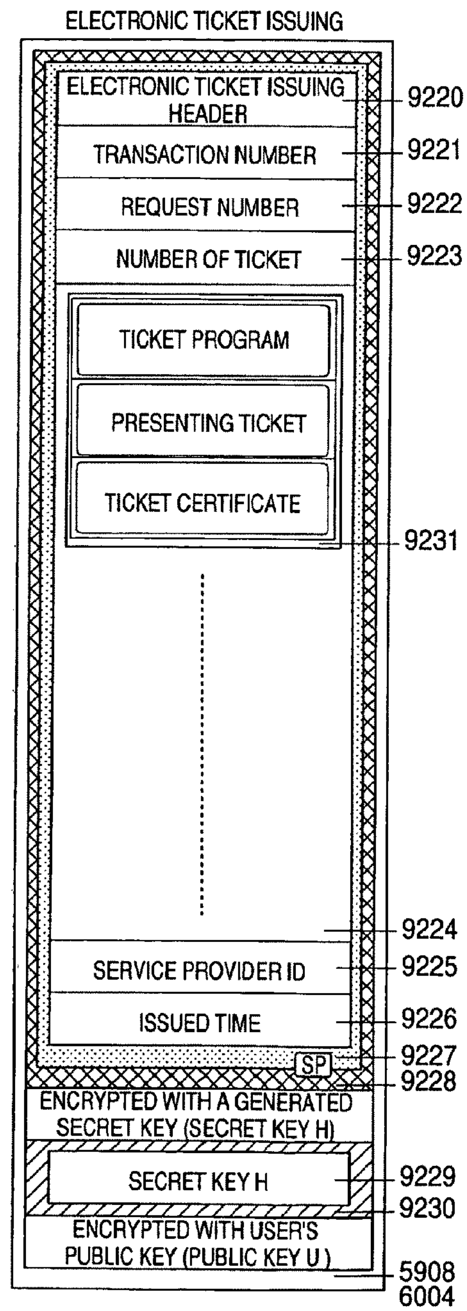
Figure 93A:
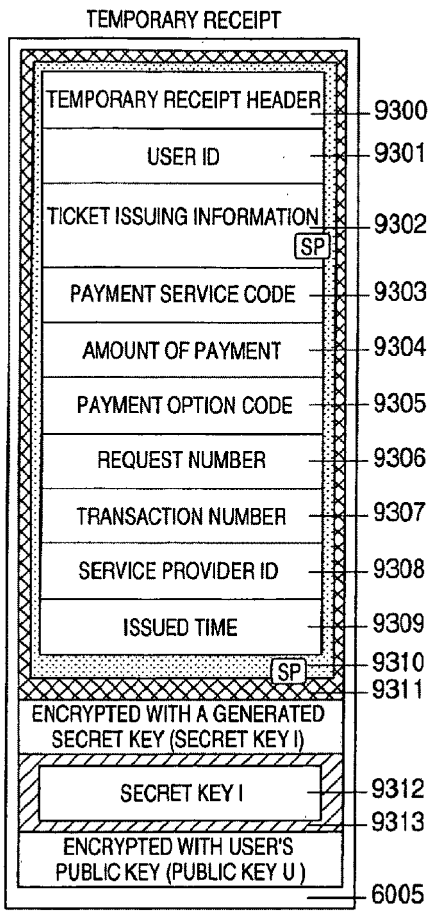
Figure 93B:
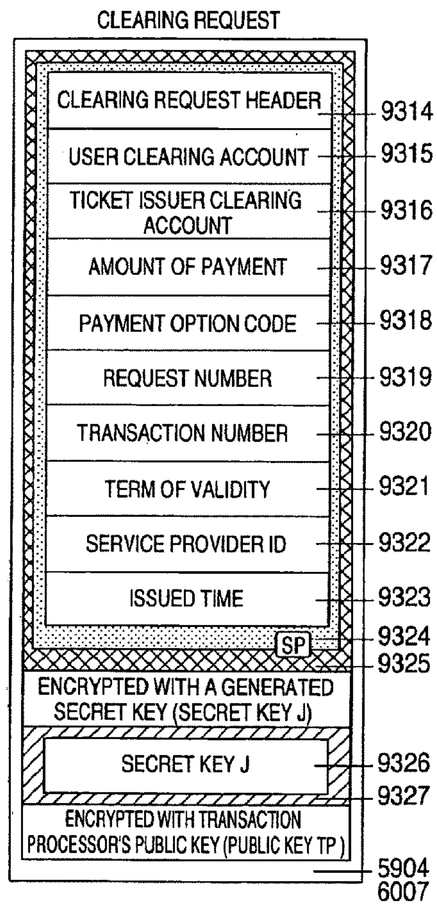
Figure 94A:
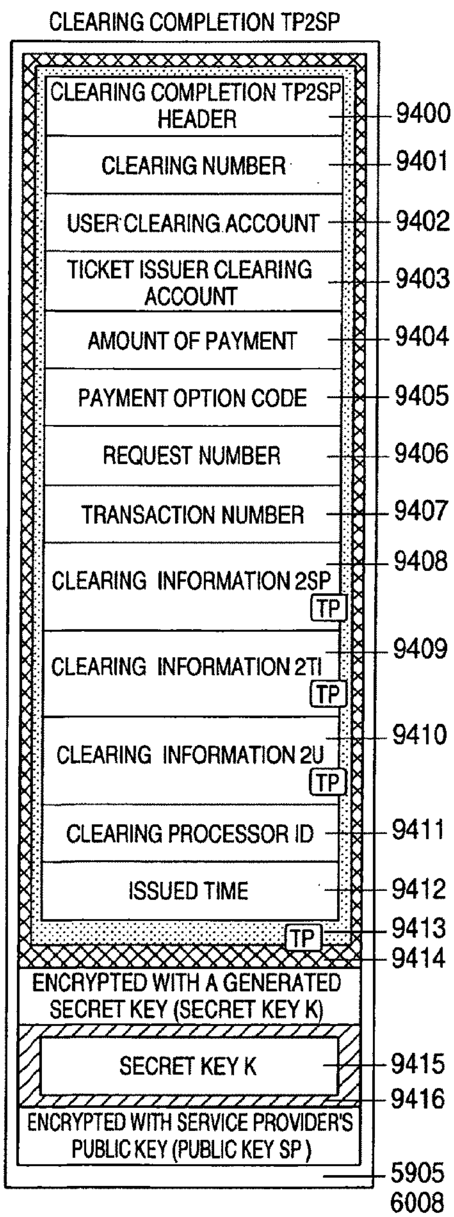
Figure 94B:
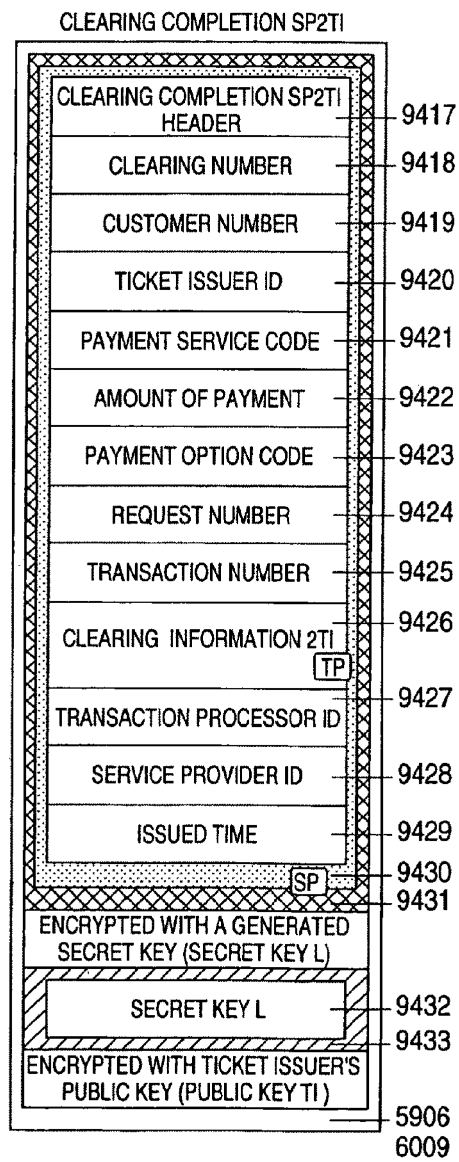
Figure 95A:
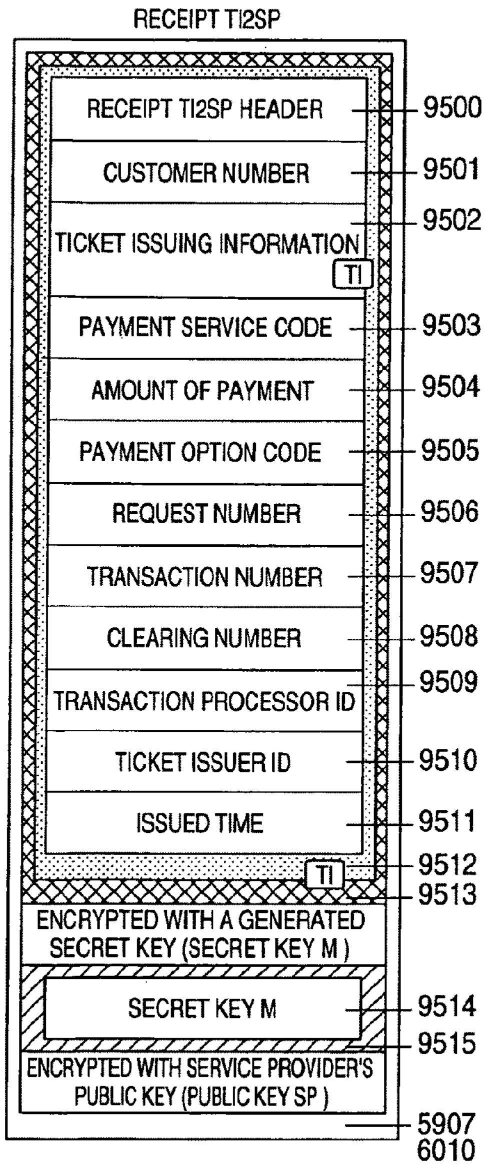
Figure 95B:
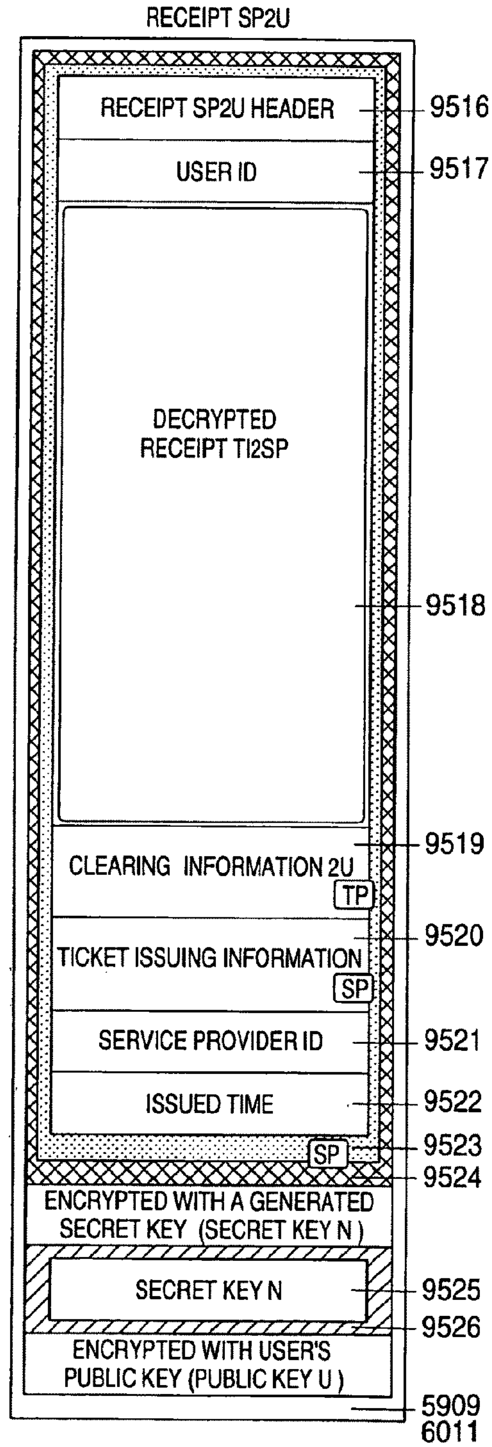
Figure 96A:
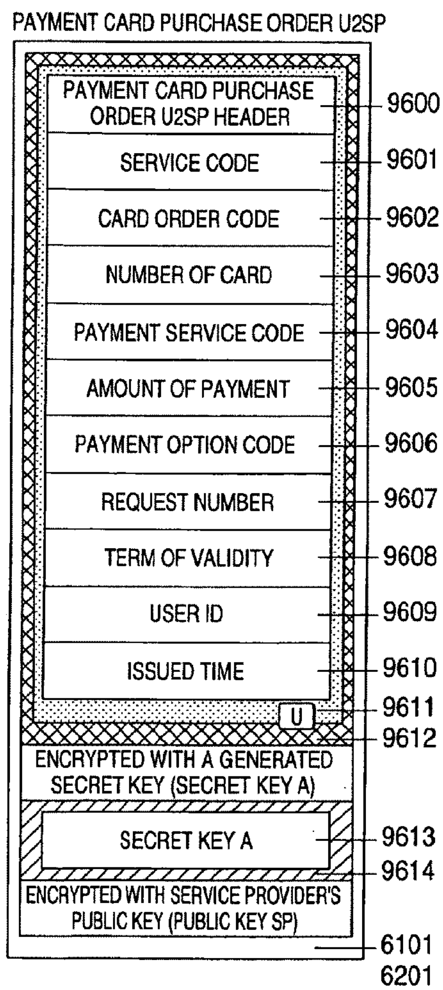
Figure 96B:
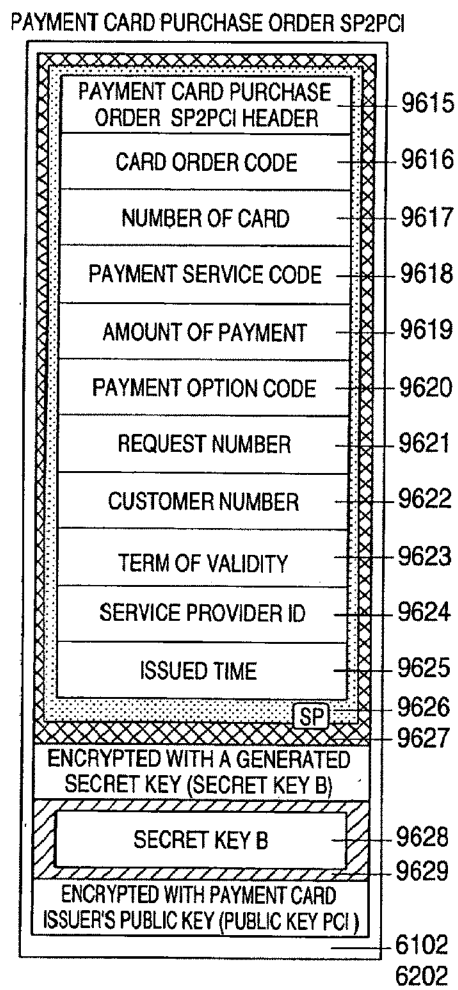
Figure 97A:
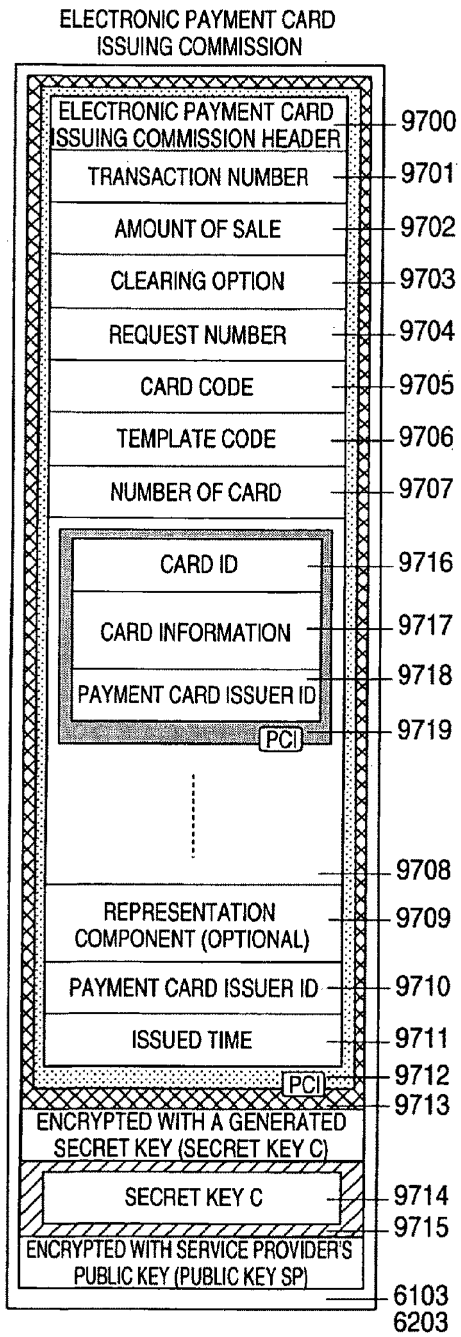
Figure 97B:
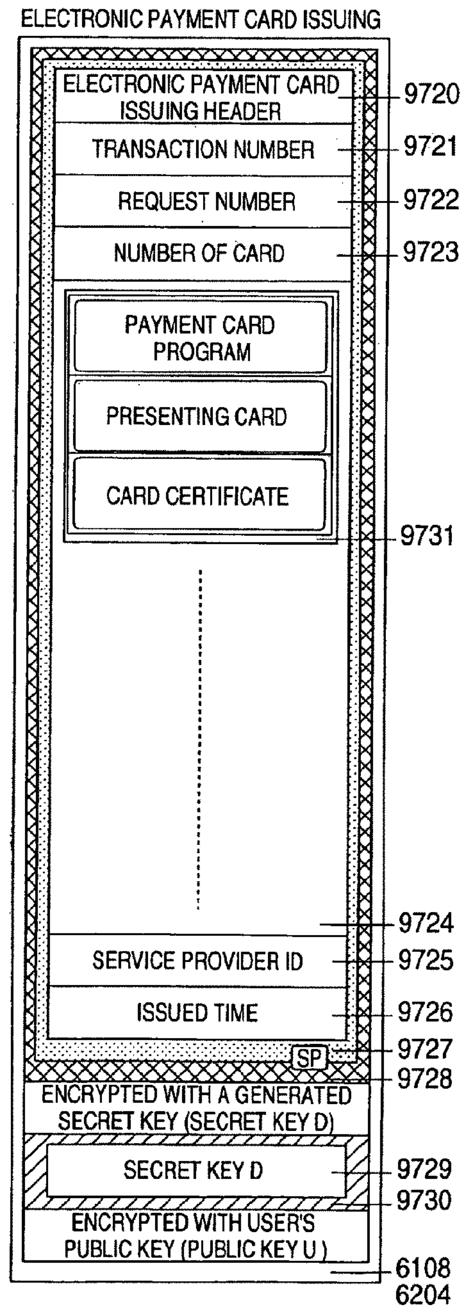
Figure 98A:
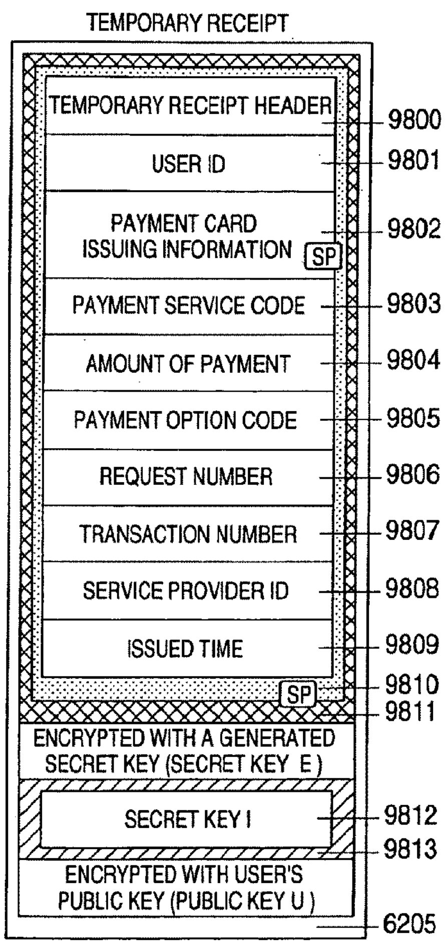
Figure 98B:
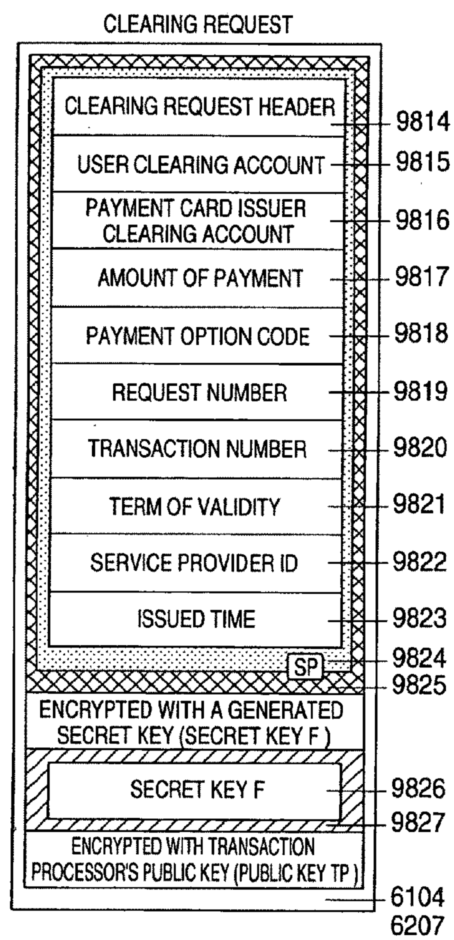
Figure 99A:
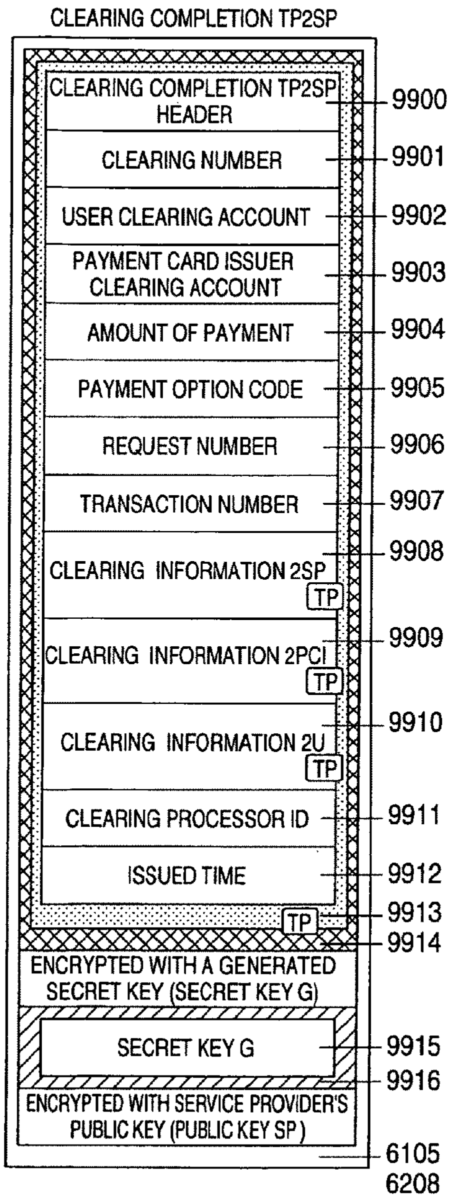
Figure 99B:
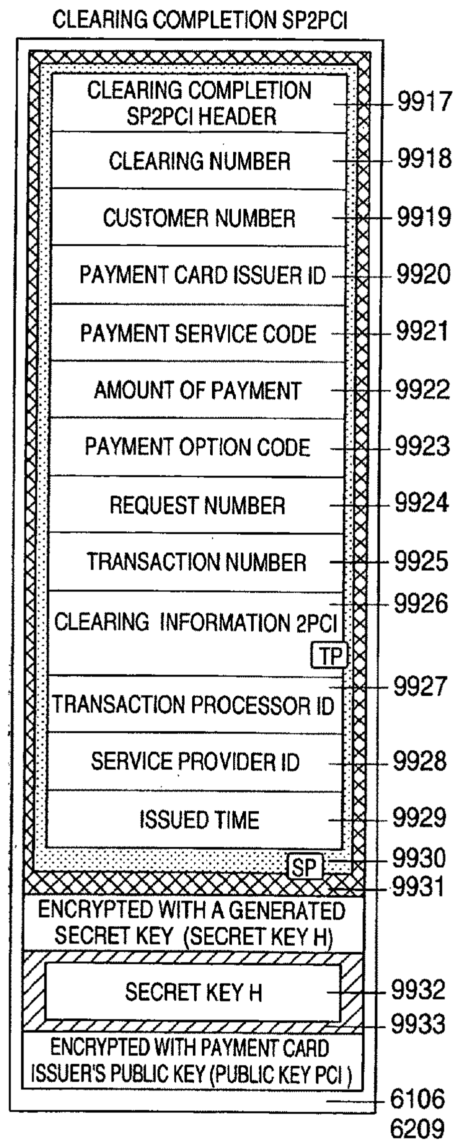
Figure 100A:
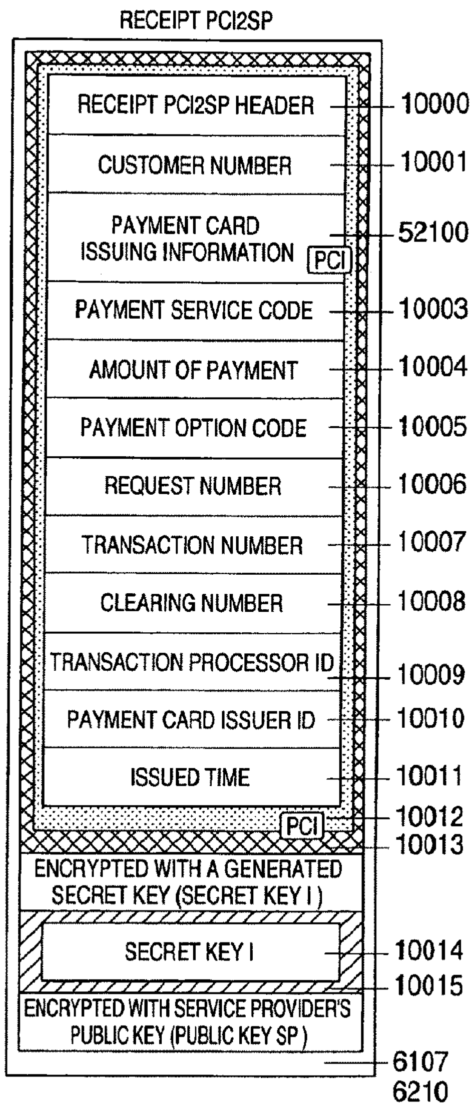
Figure 100B:
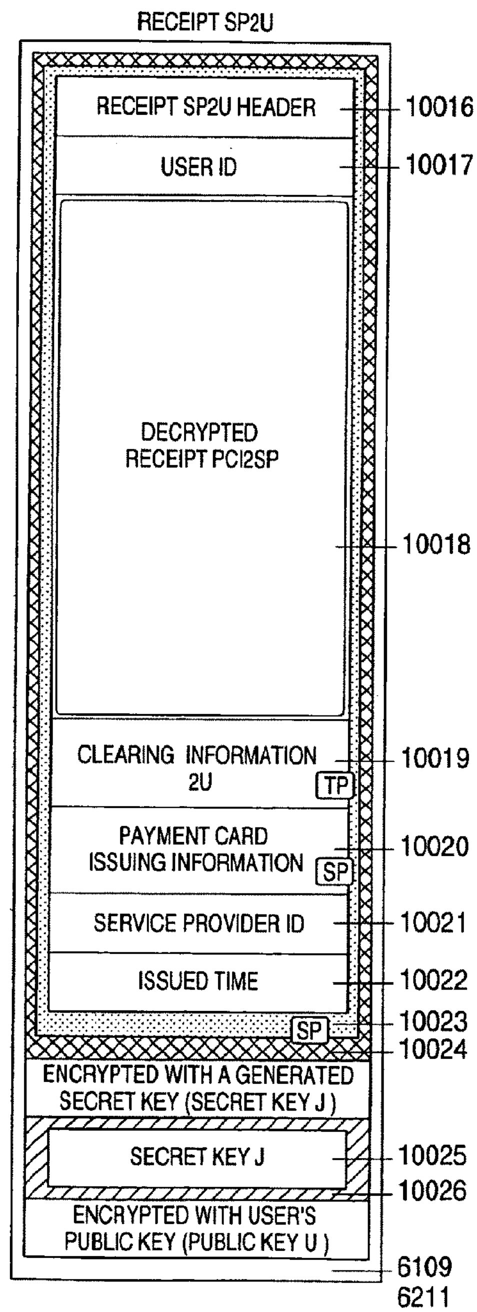
Figure 101A:
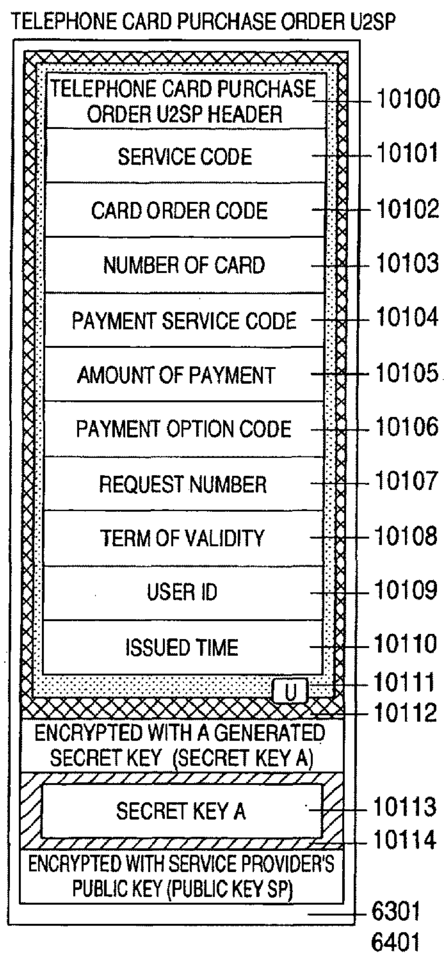
Figure 101B:
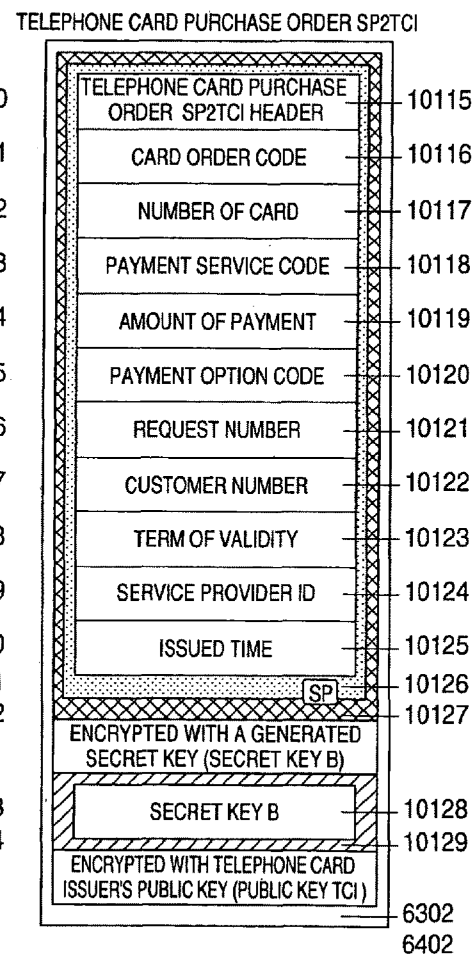
Figure 102A:
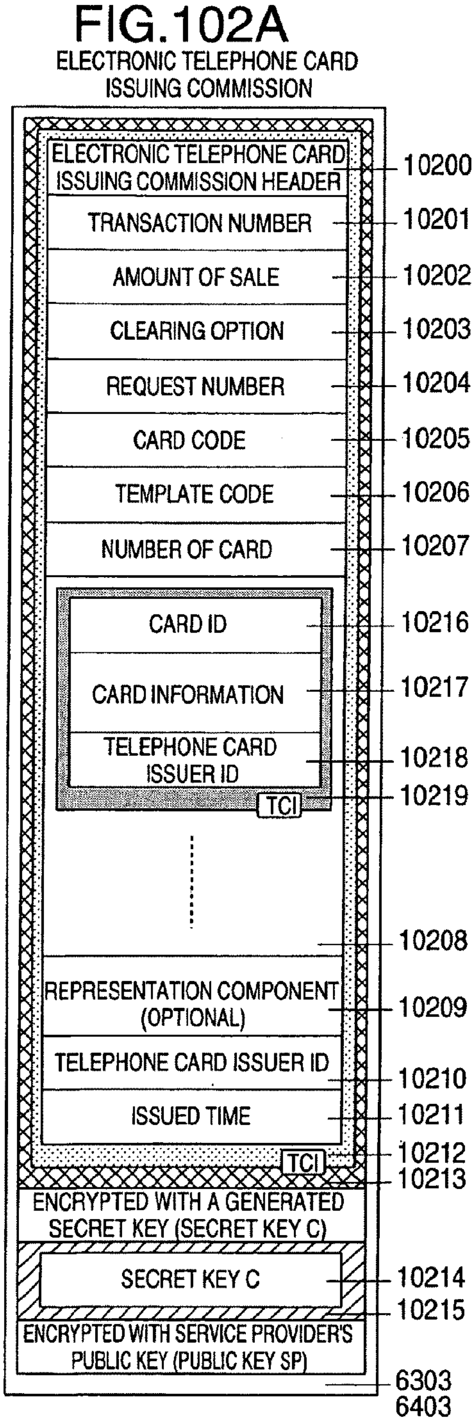
Figure 103A:
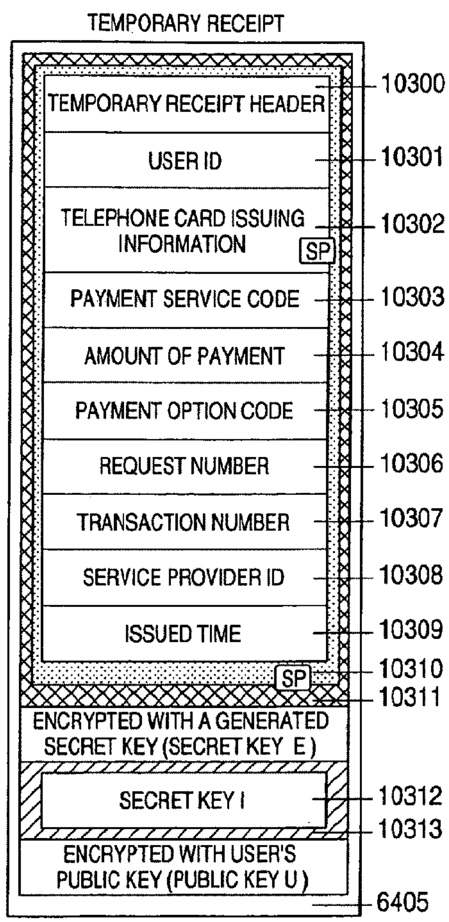
Figure 103B:
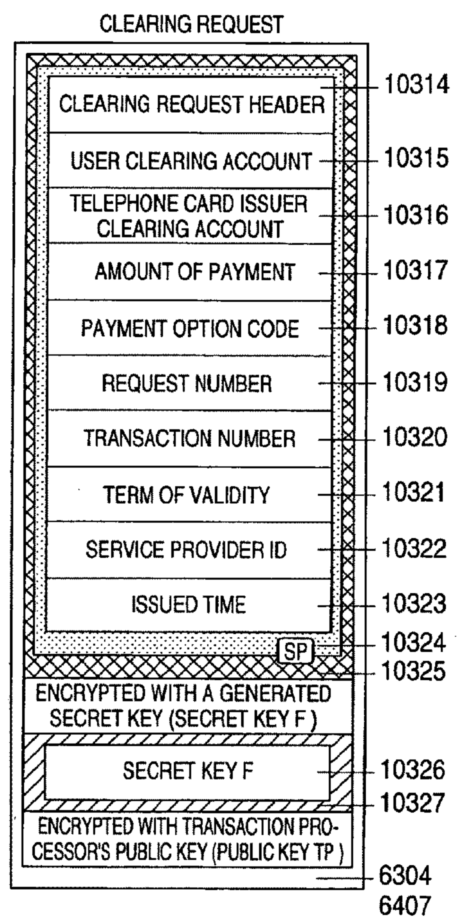
Figure 104A:
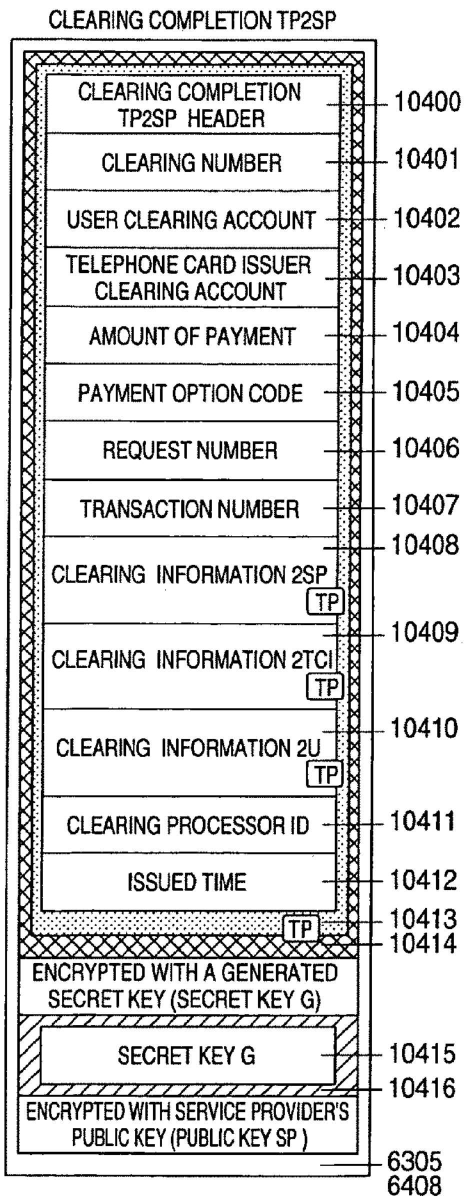
Figure 104B:
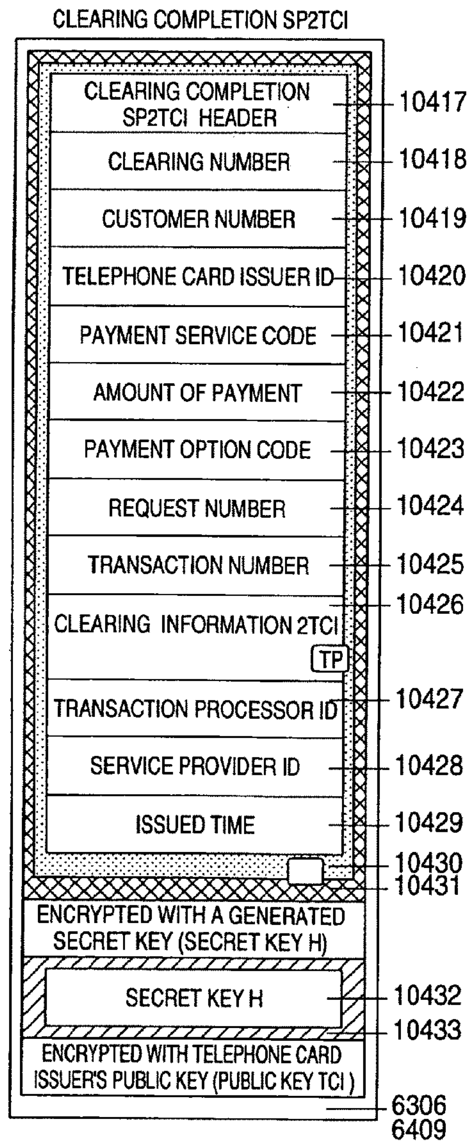
Figure 105A:
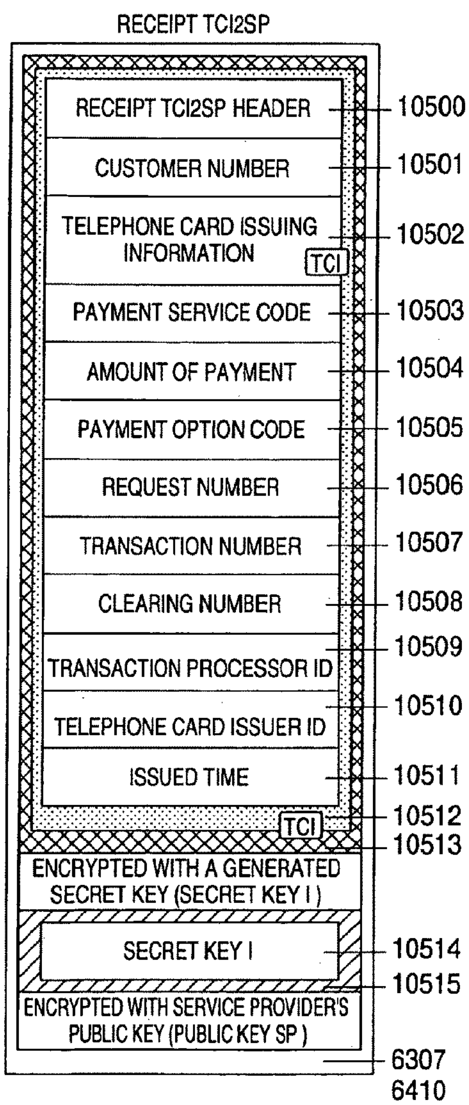
Figure 105B:
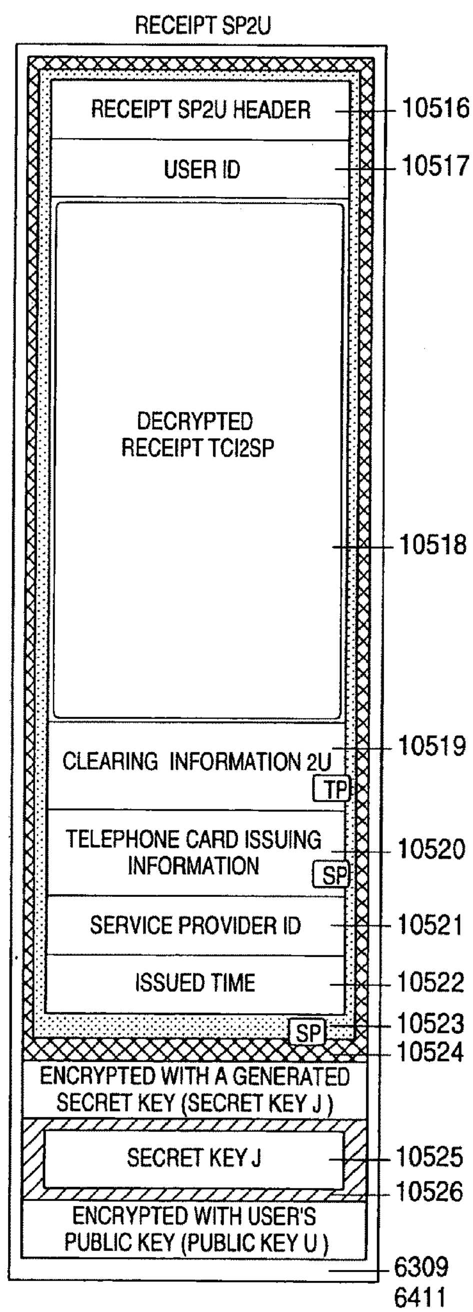
Figure 106A:
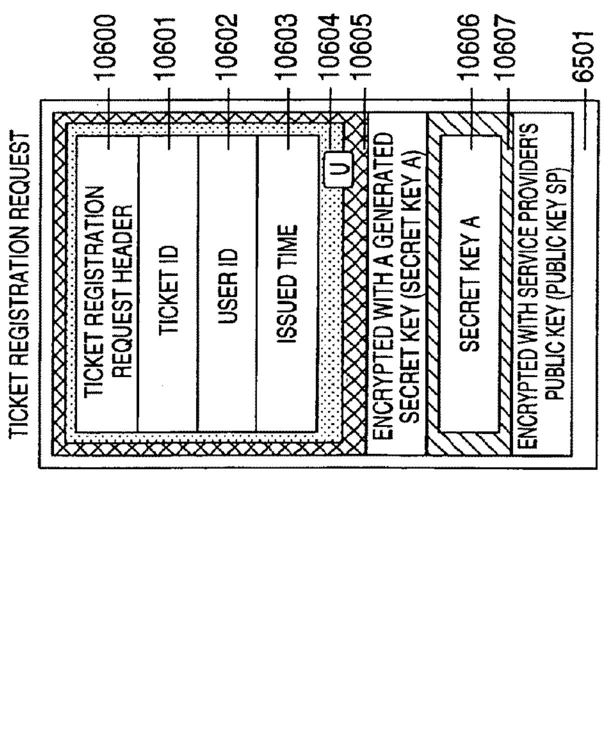
Figure 106B:
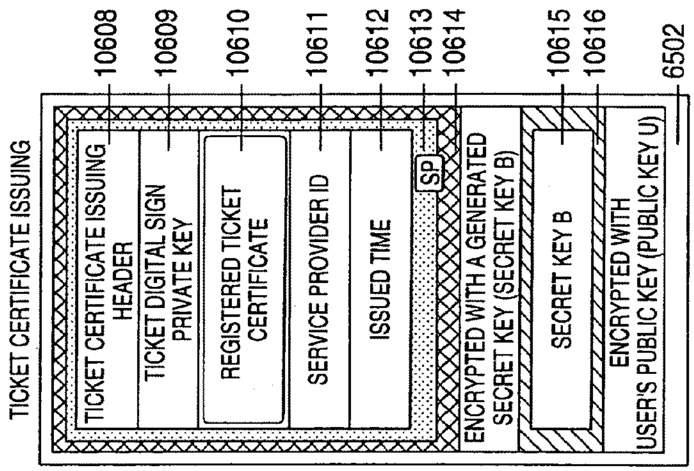
Figure 107B:
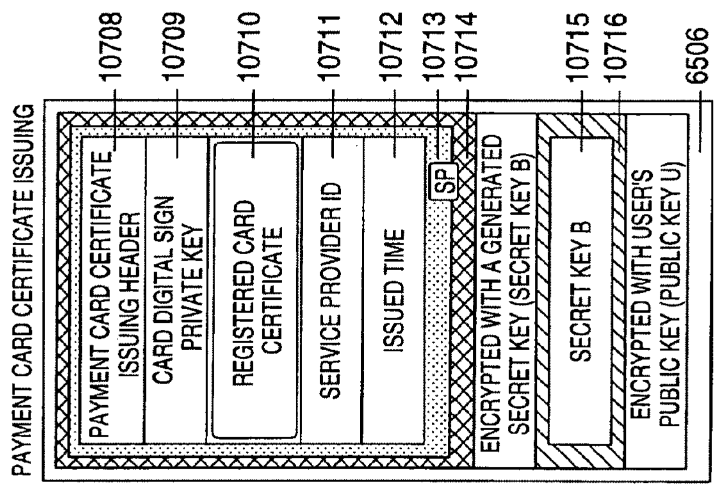
Figure 107A:
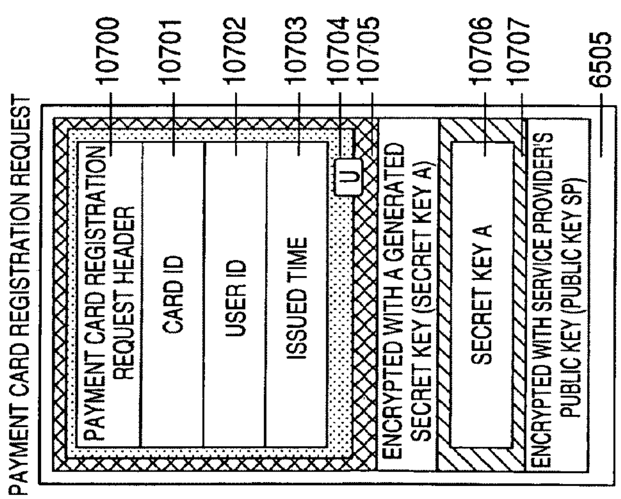
Figure 108A:
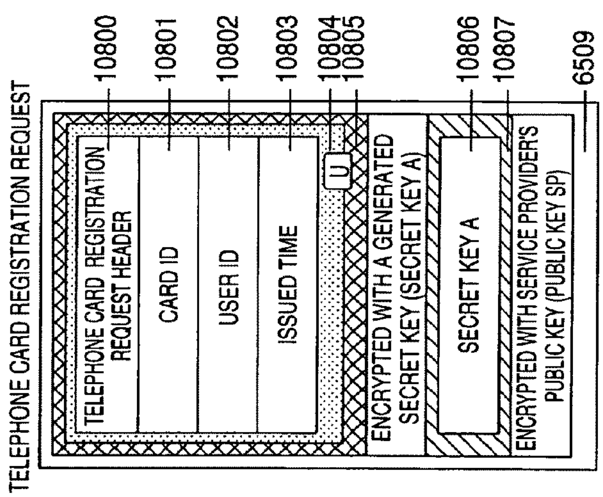
Figure 108B:
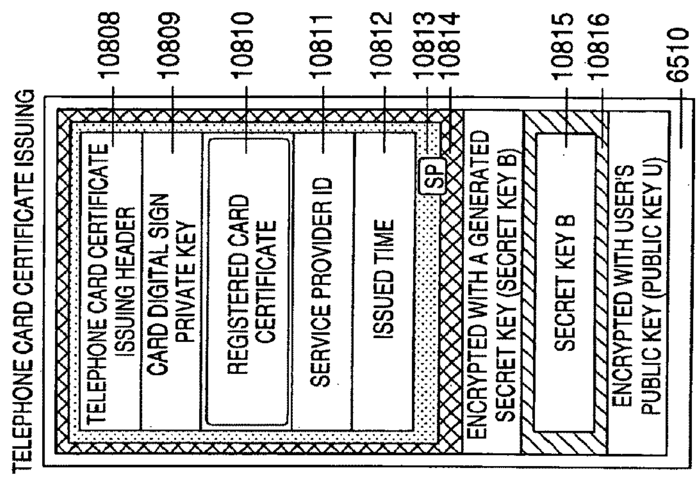
Figure 109A:
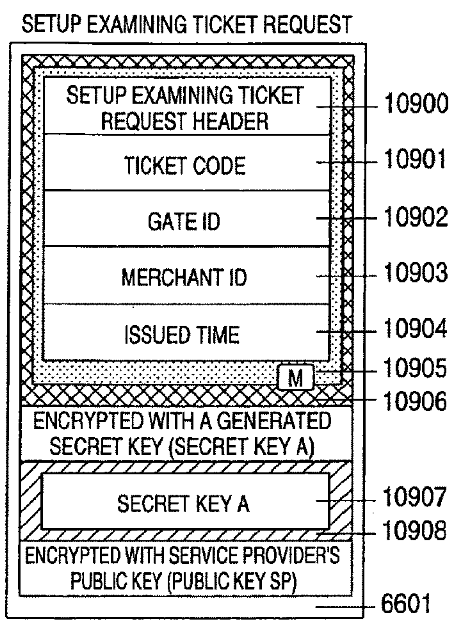
Figure 109B:
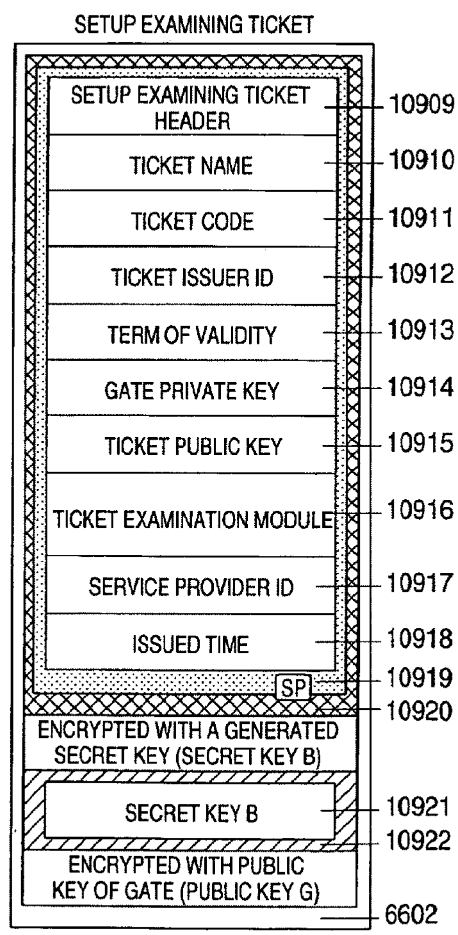
Figure 110A:
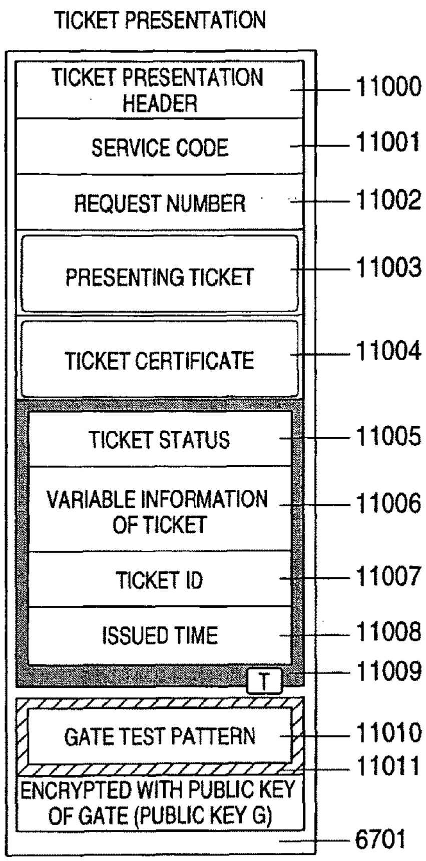
Figure 110B:
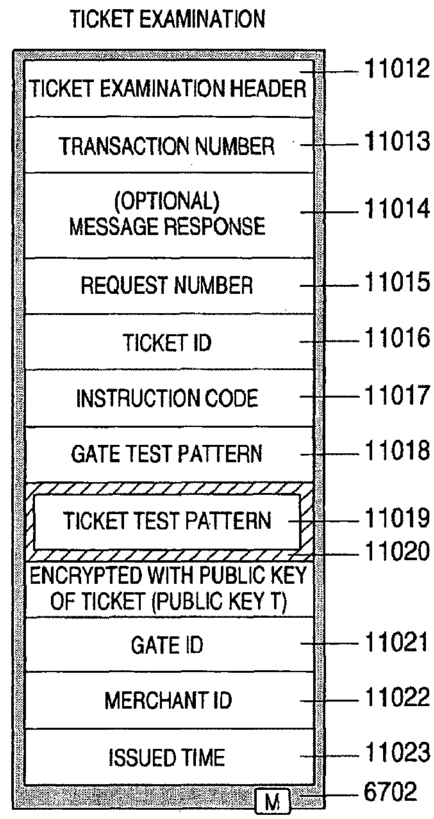
Figure 111A:
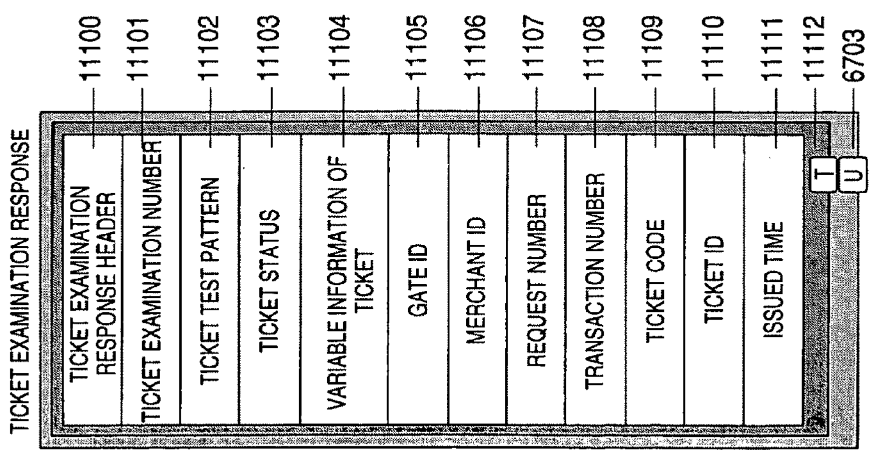
Figure 111B:
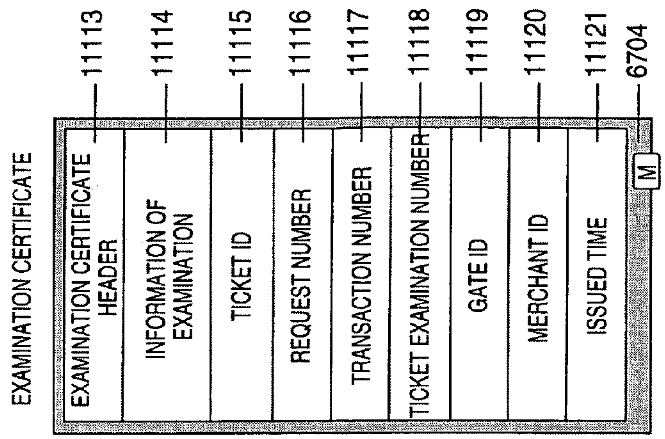
Figure 113A:
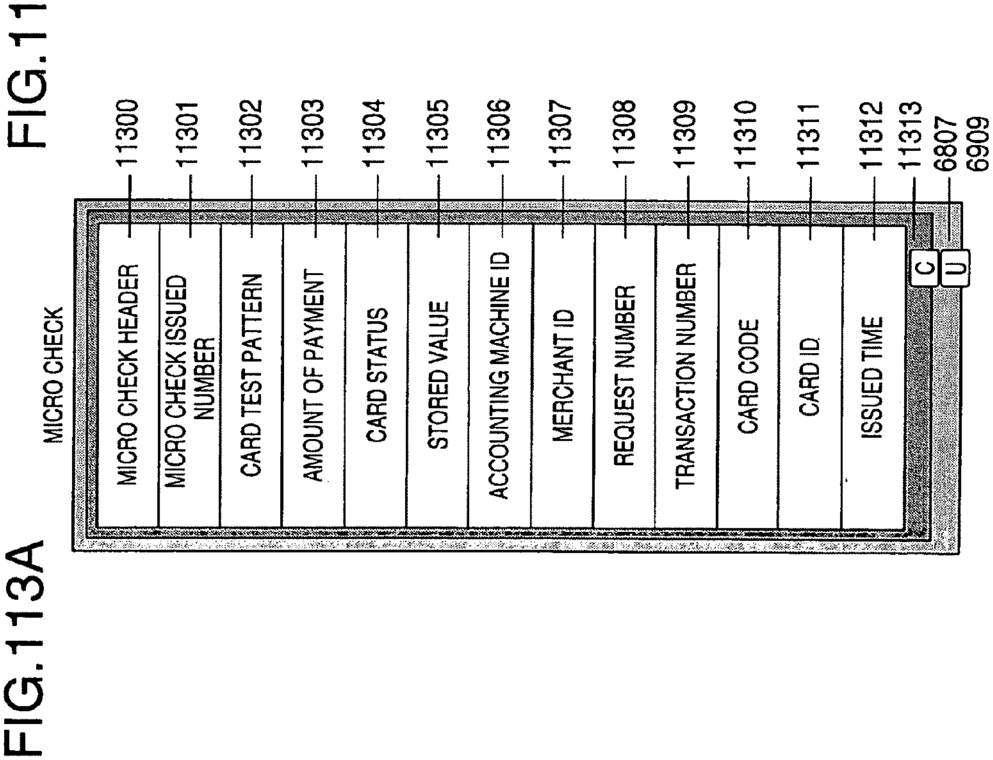
Figure 113B:
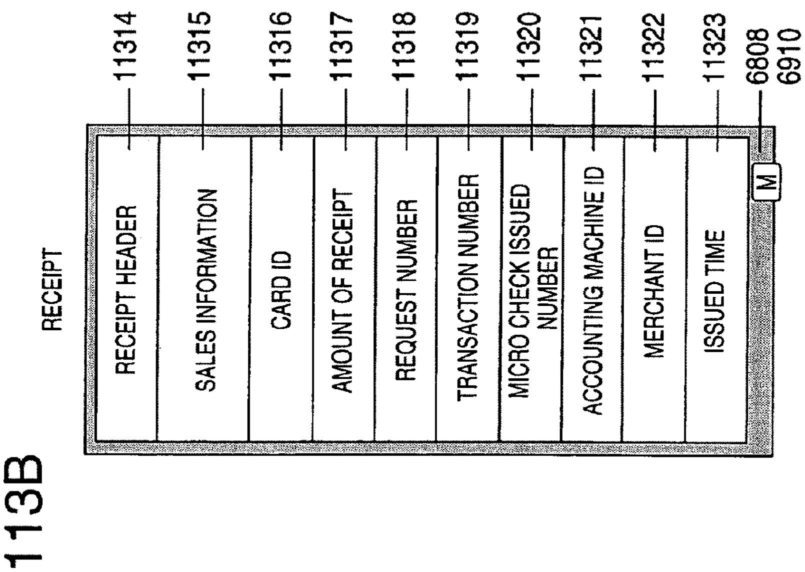
Figure 115A:
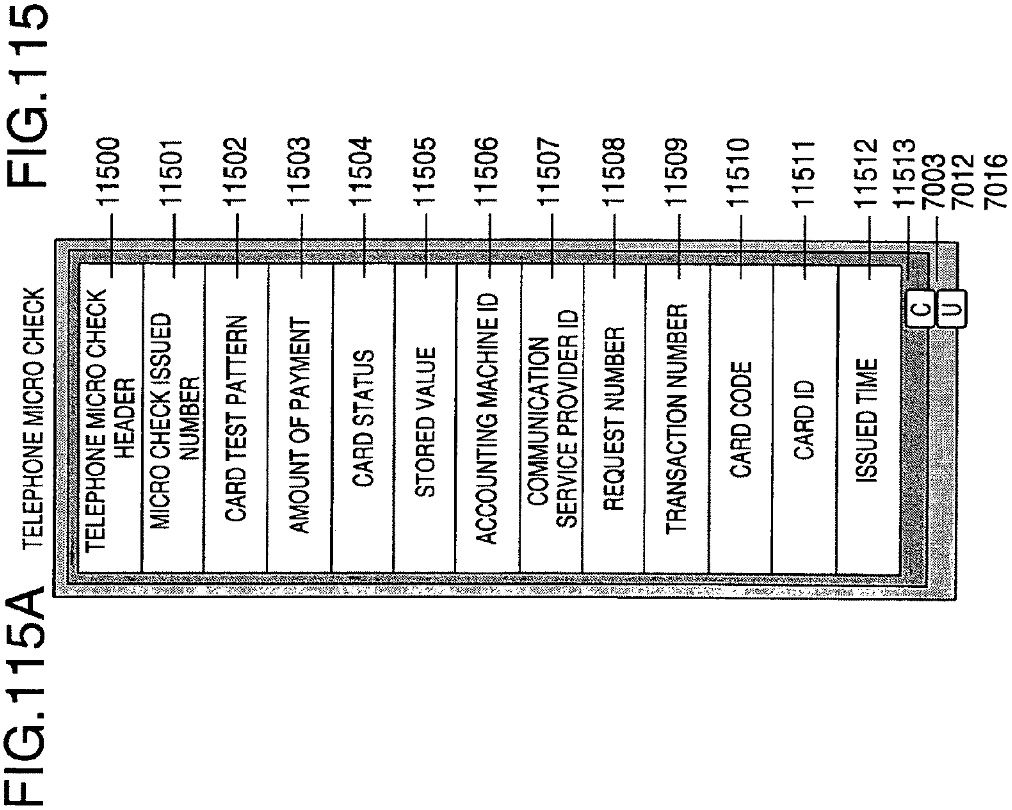
Figure 115B:
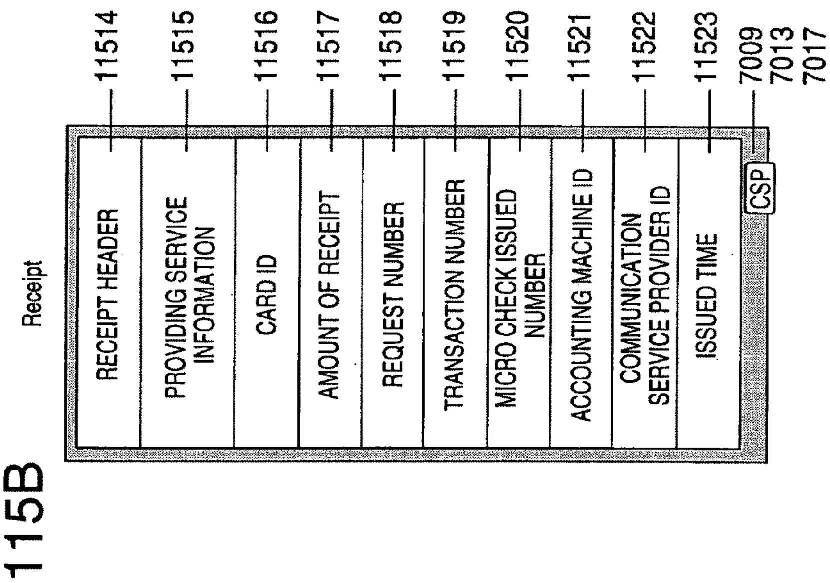
Figure 115C:
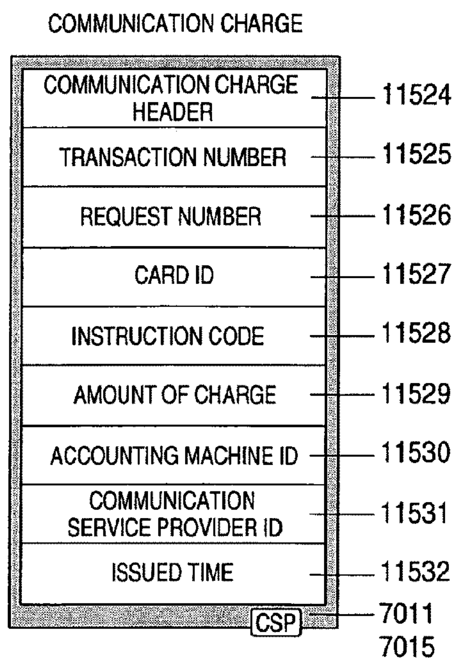
Figure 116A:
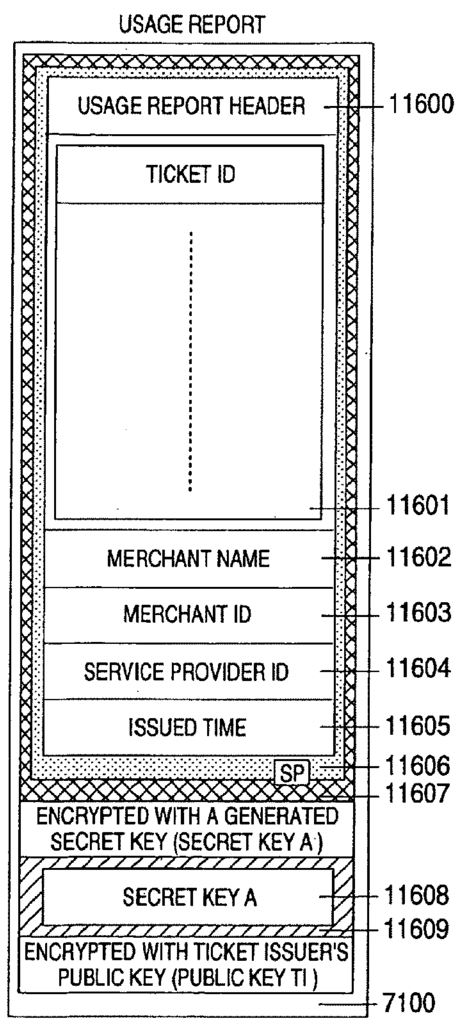
Figure 116B:
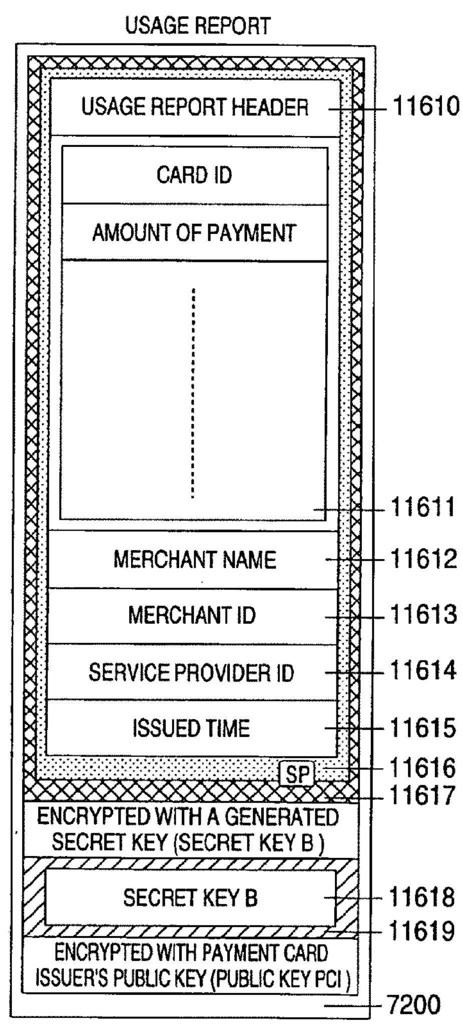
Figure 116C:
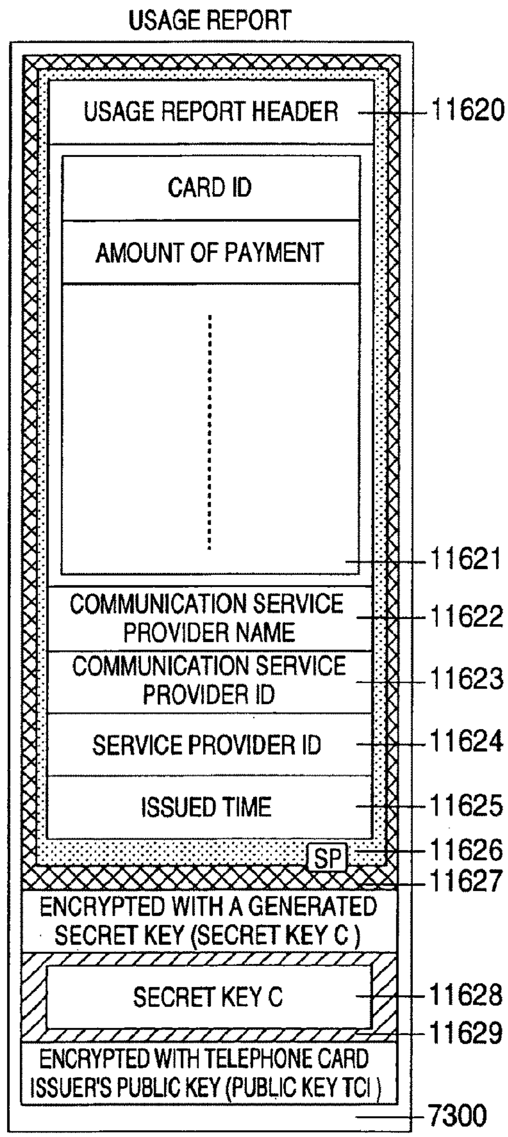
Figure 117A:
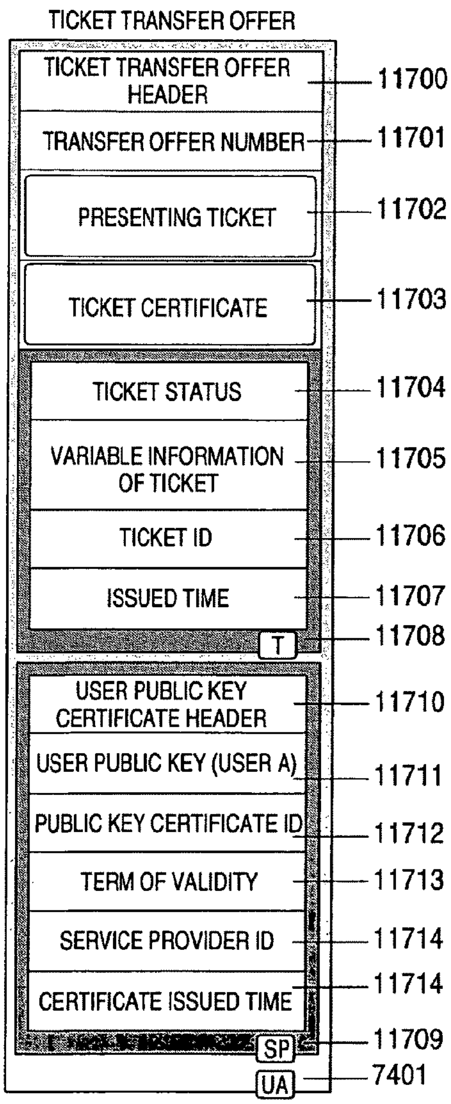
Figure 117B:
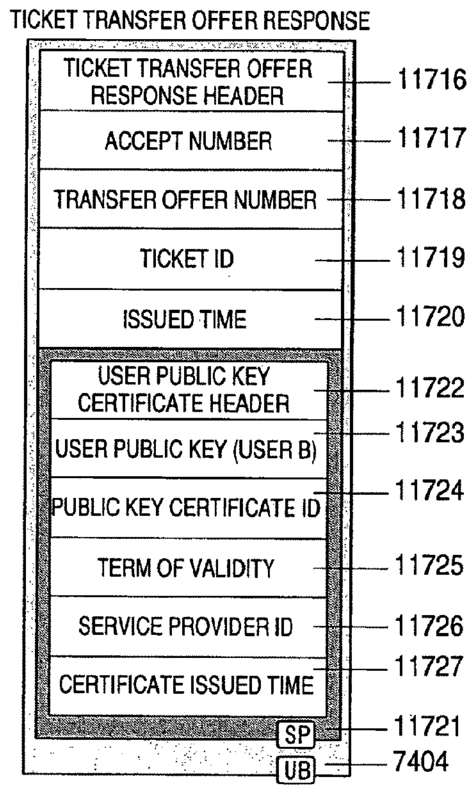
Figure 118A:
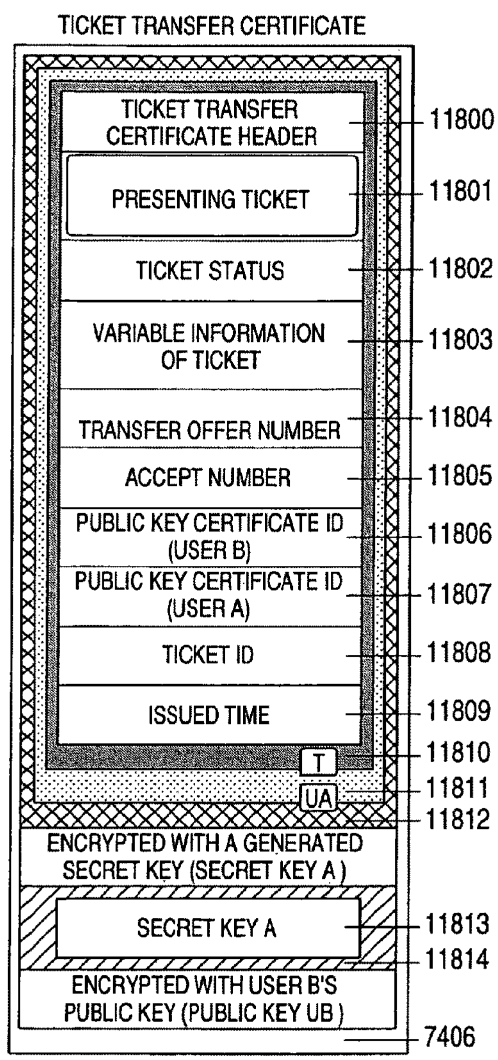
Figure 118B:
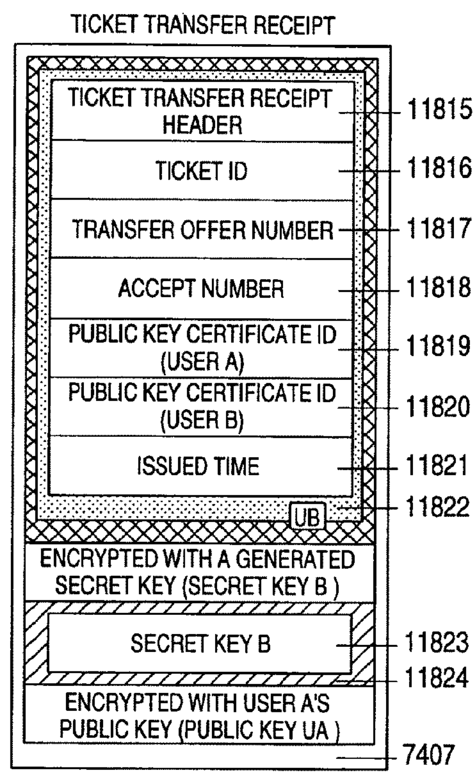
Figure 119A:
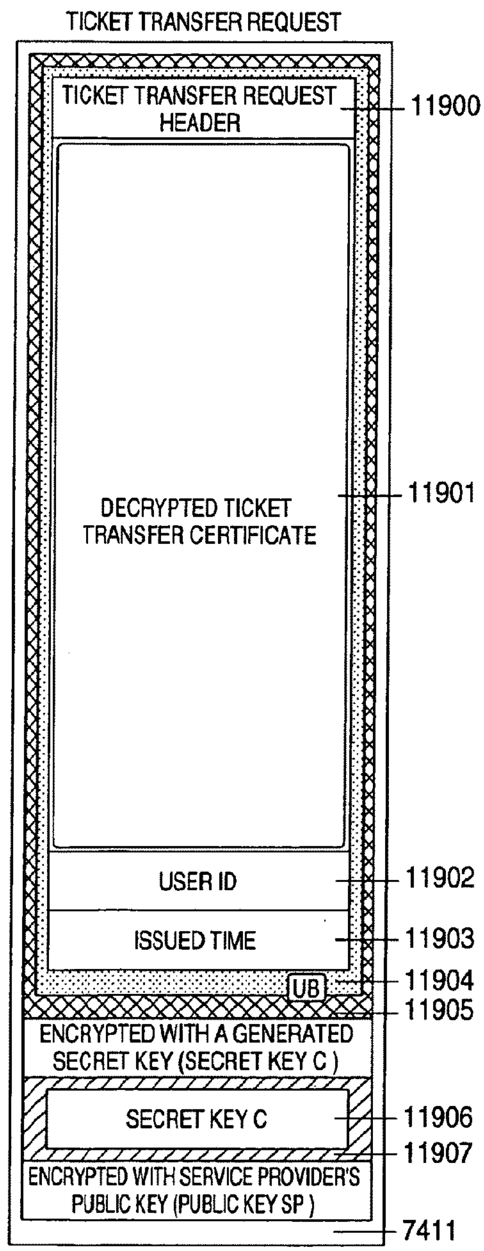
Figure 119B:
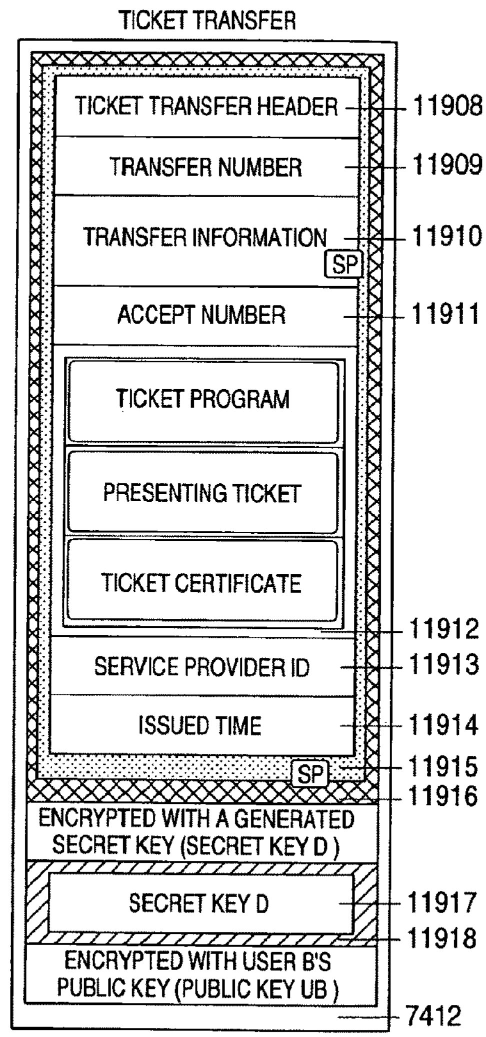
Figure 120A:
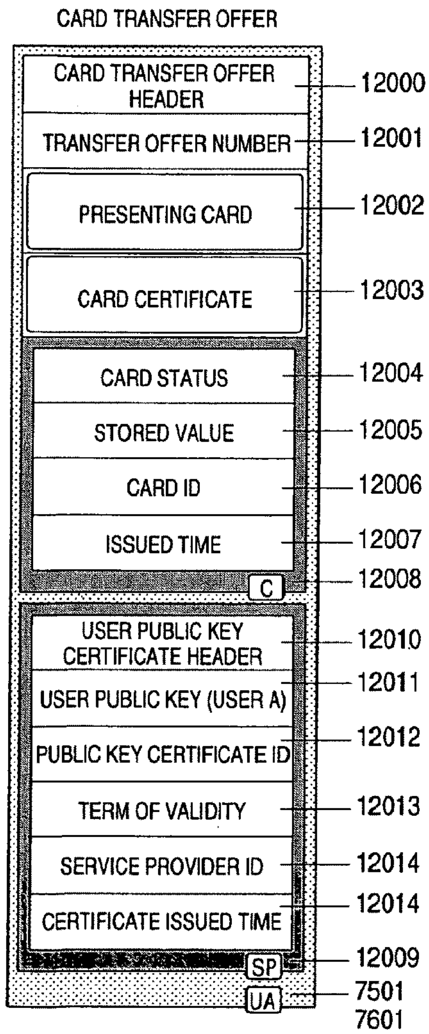
Figure 120B:
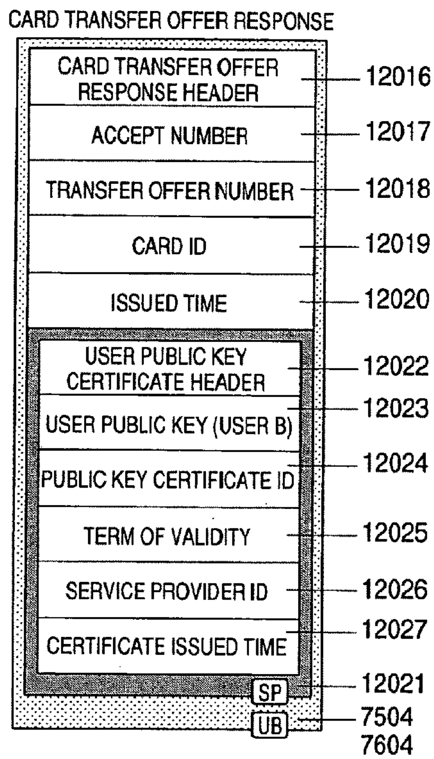
Figure 121A:
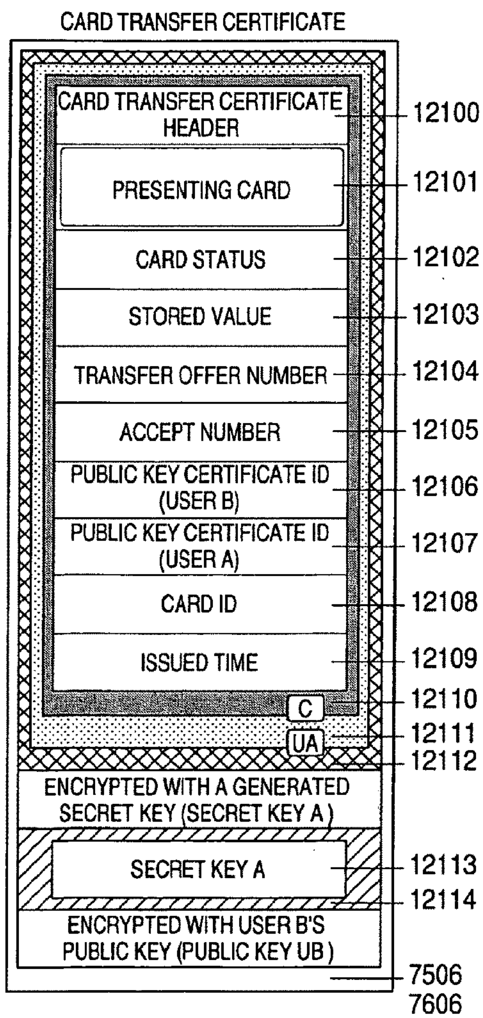
Figure 121B:
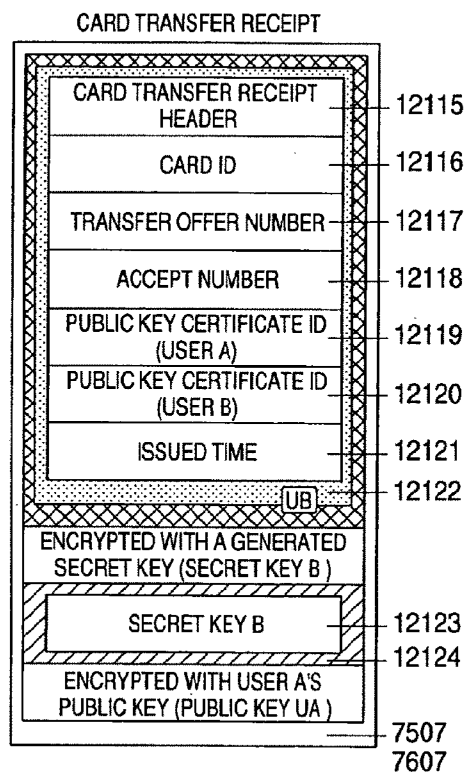
Figure 122A:
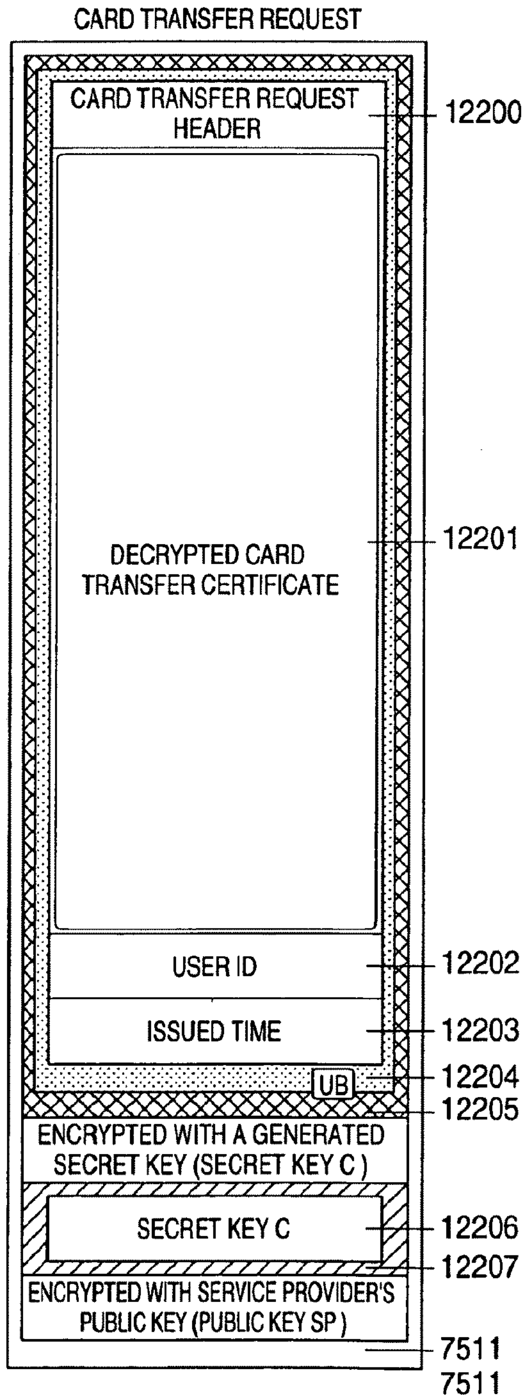
Figure 122B:
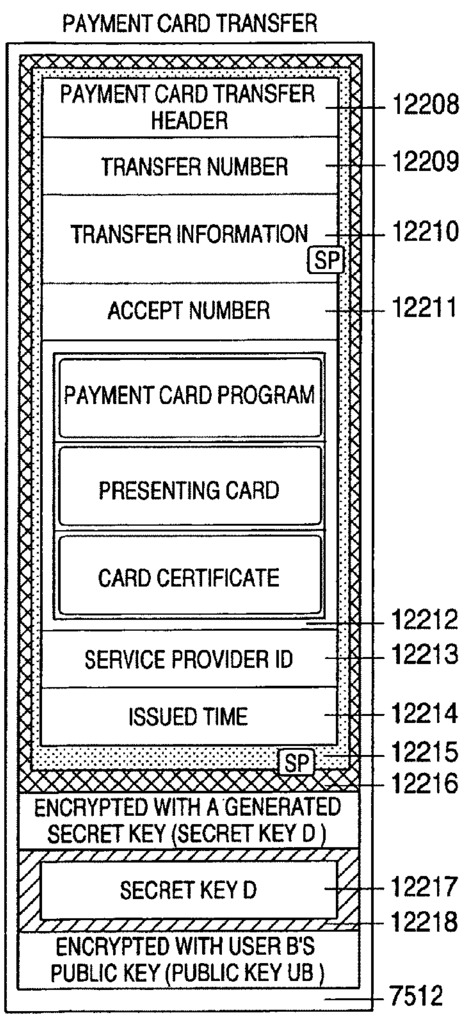
Figure 122C:
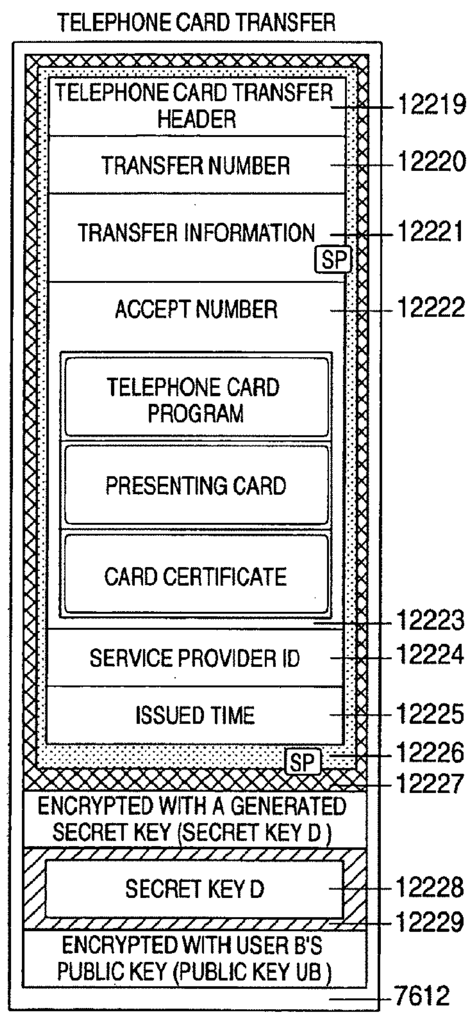
Figure 123B:
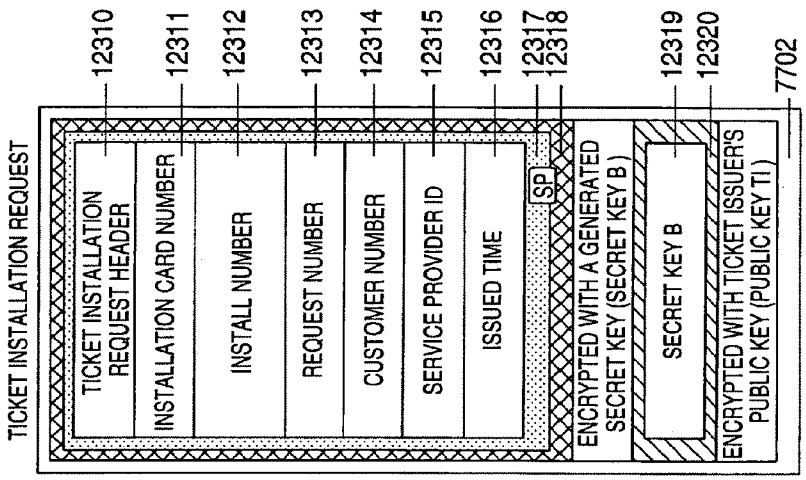
Figure 123A:
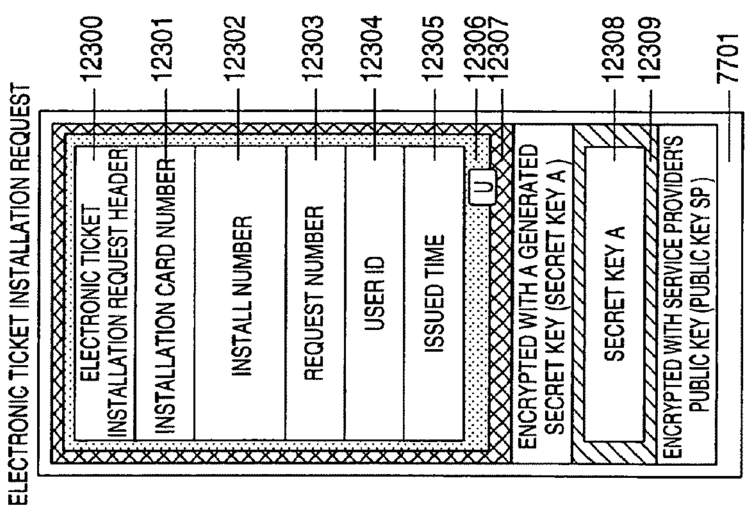
Figure 124A:
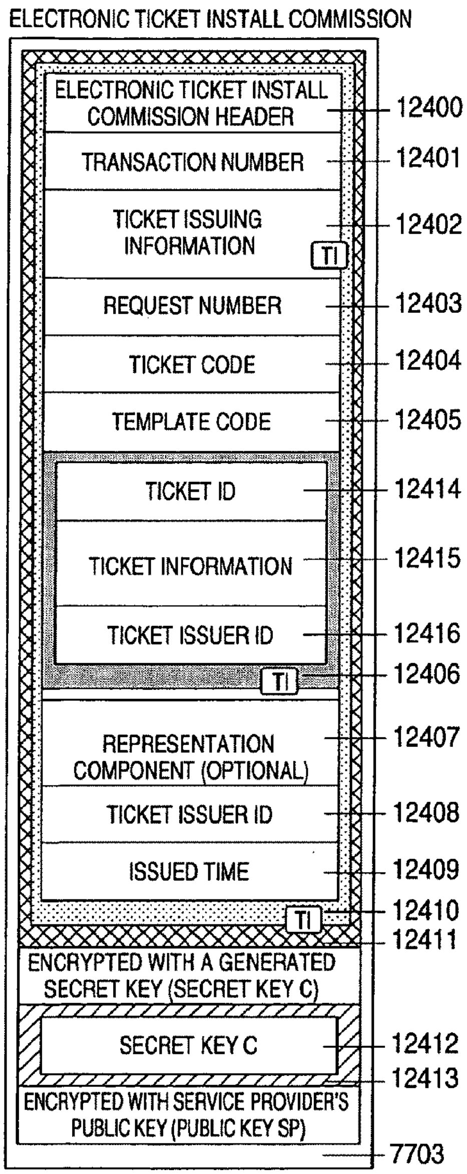
Figure 124B:
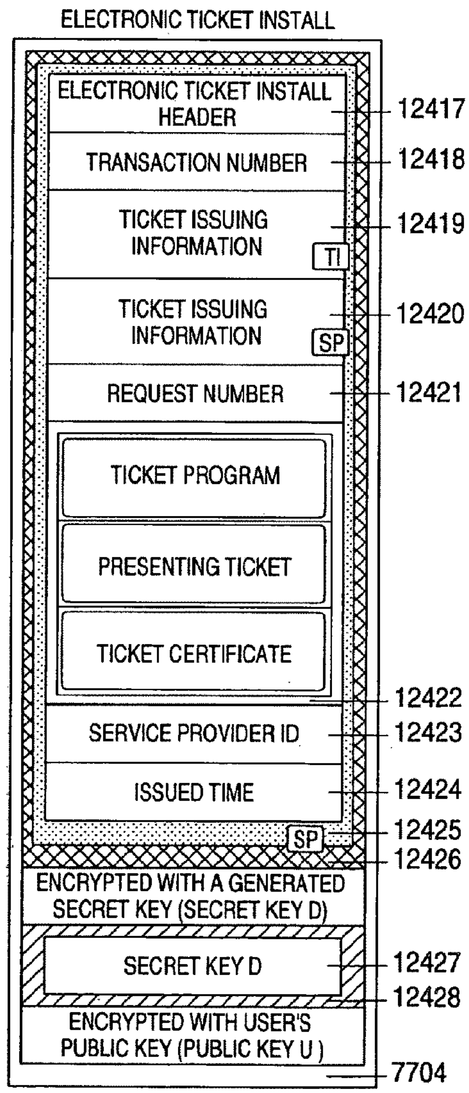
Figure 125A:
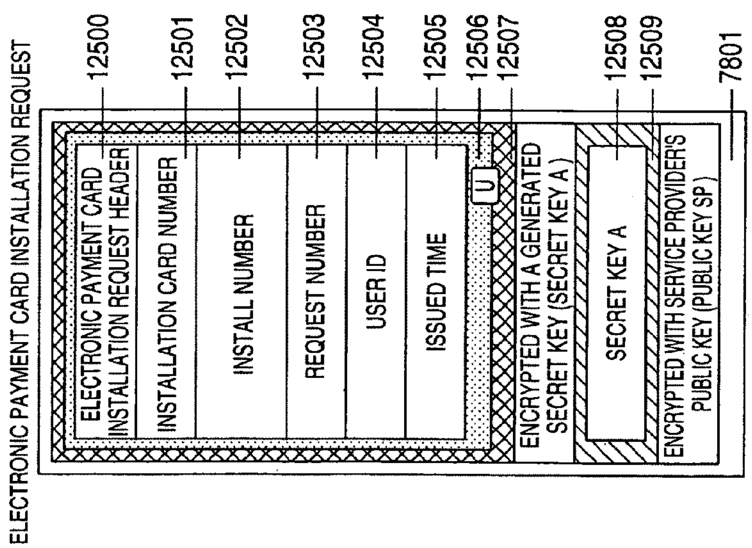
Figure 125B:
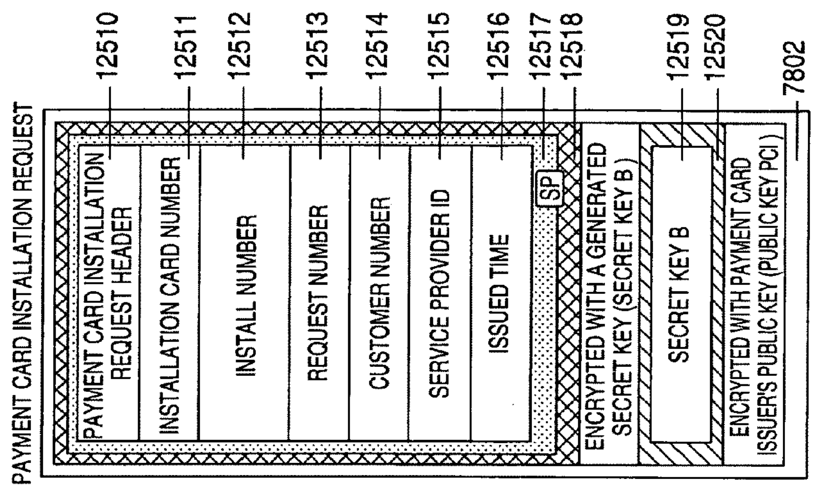
Figure 126A:
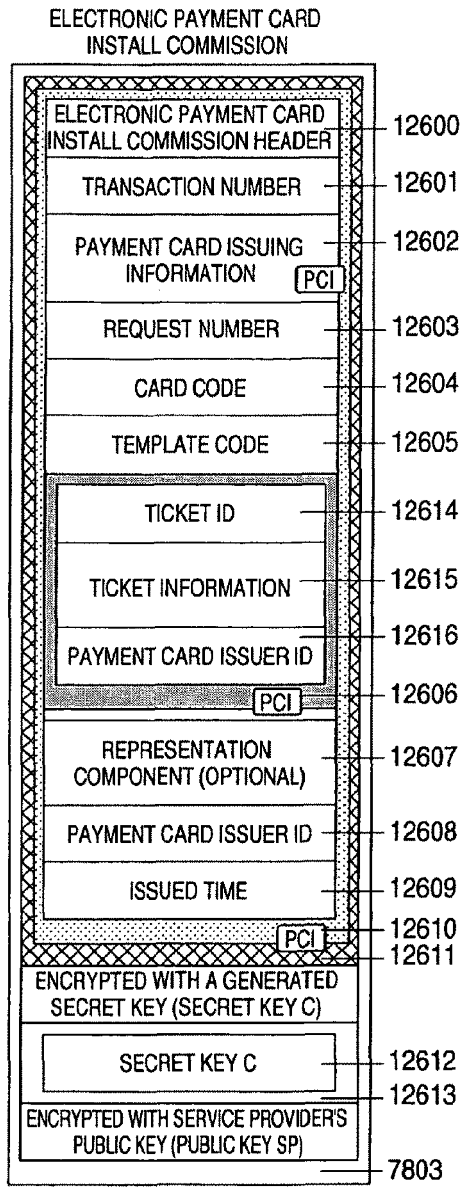
Figure 126B:
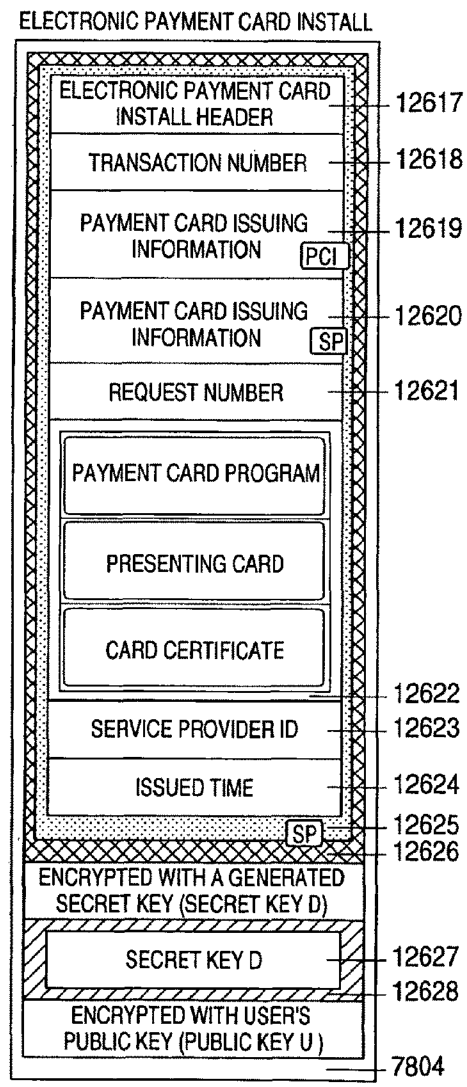
Figure 127B:
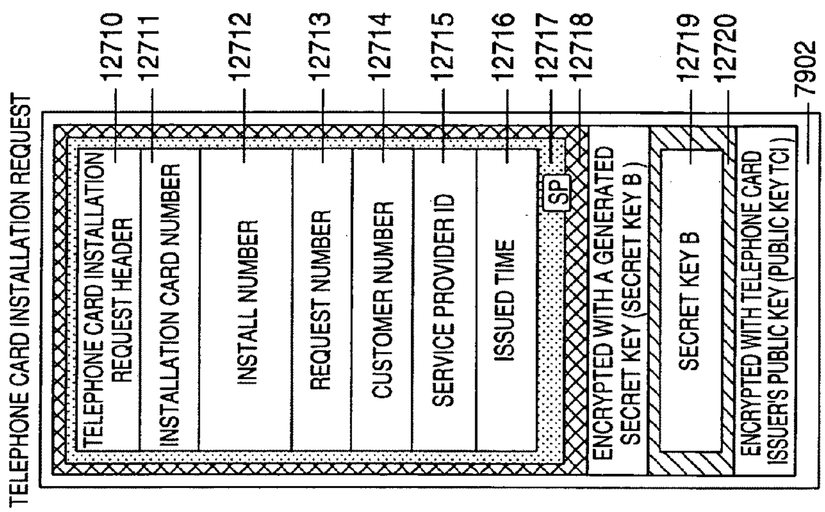
Figure 127A:
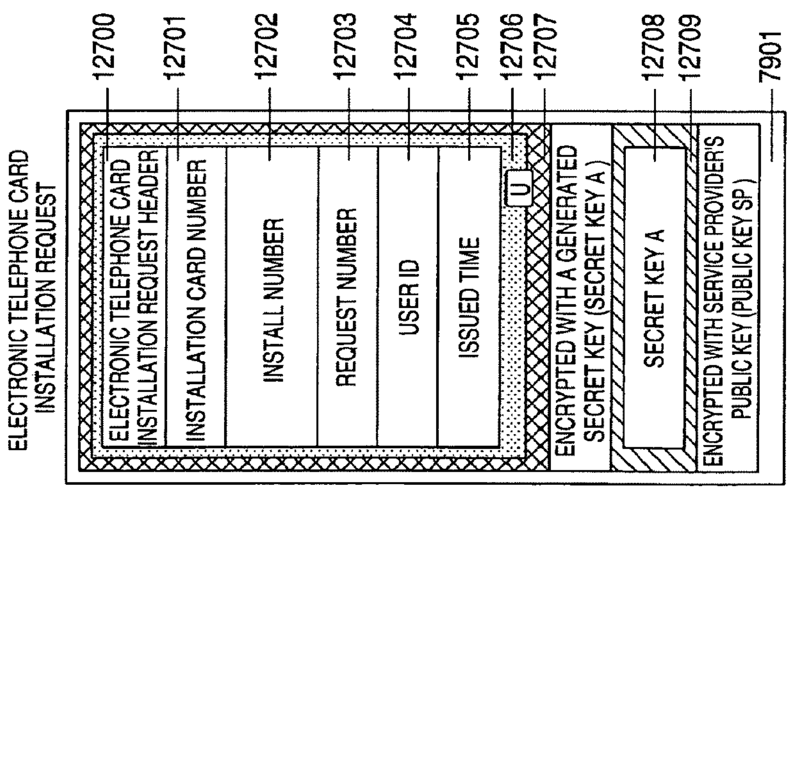
Figure 128A:
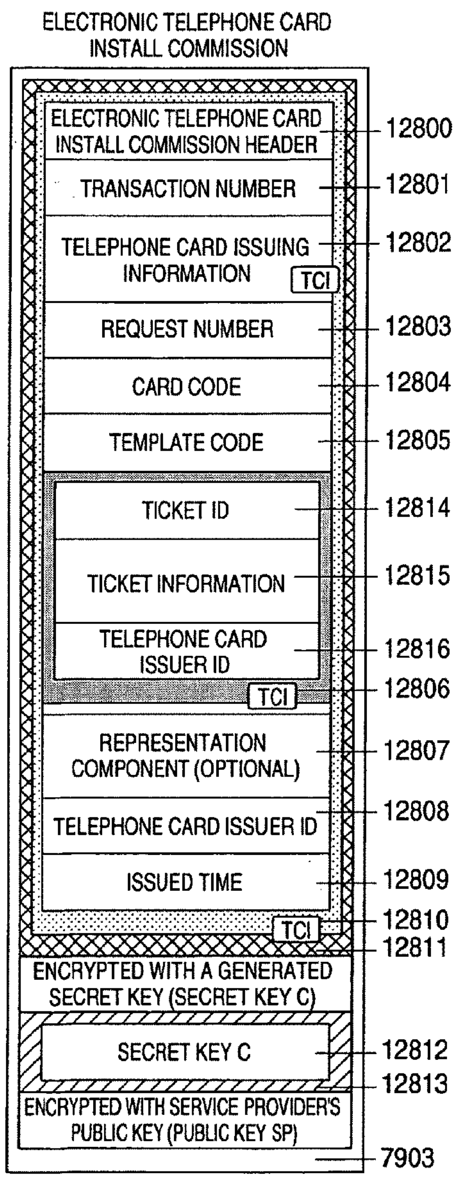
Figure 128B:
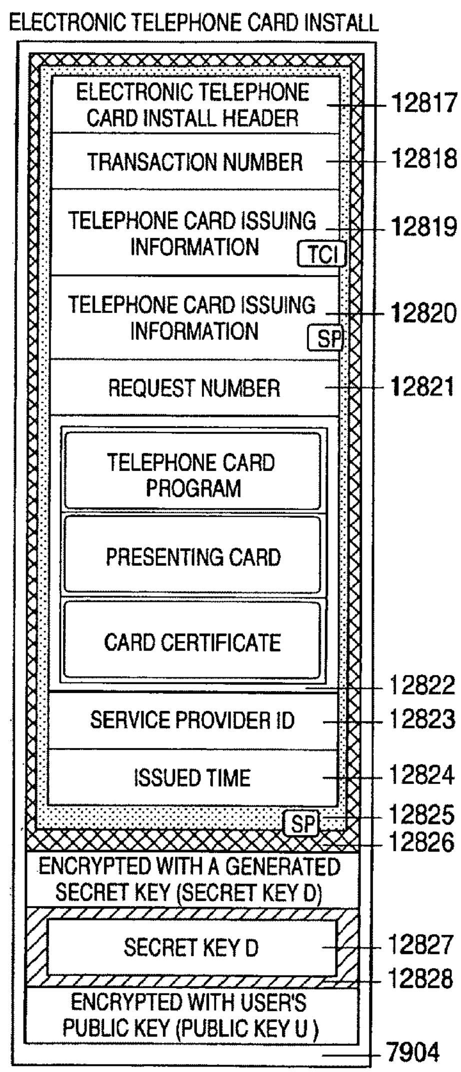
Figure 129A:
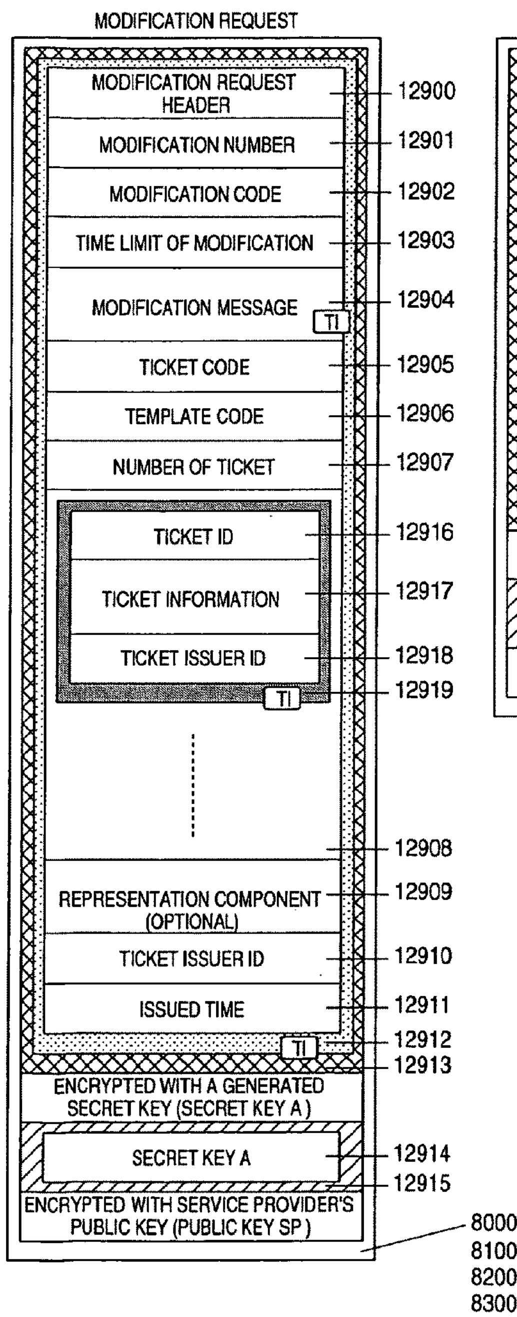
Figure 129B:
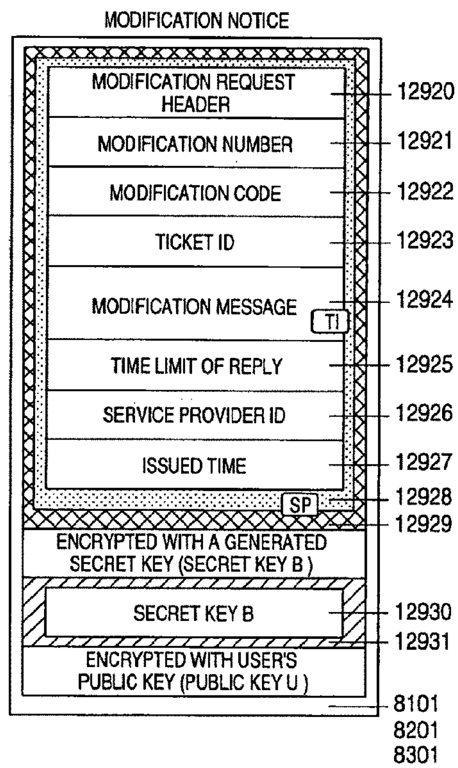
Figure 130A:
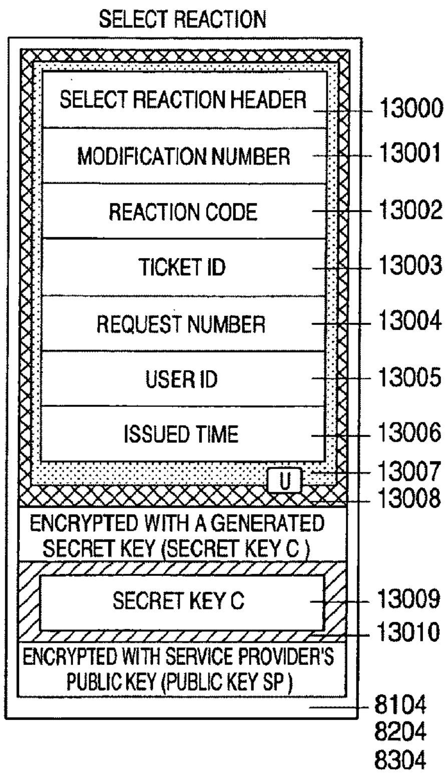
Figure 130B:
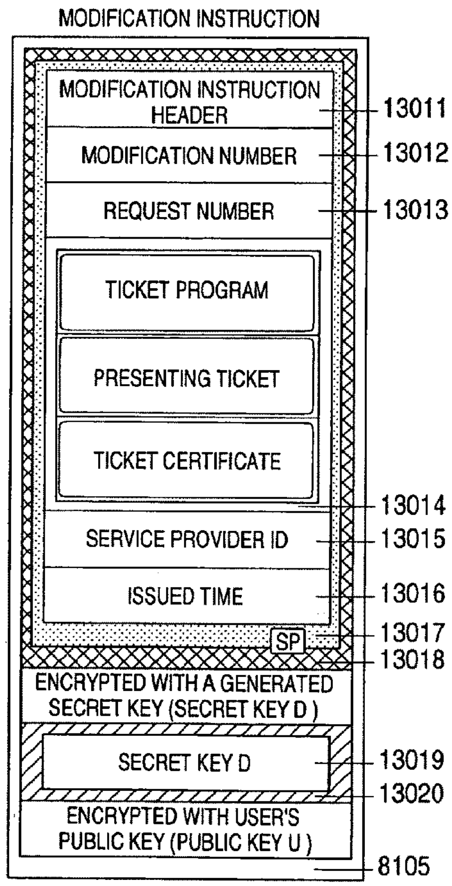
Figure 131B:
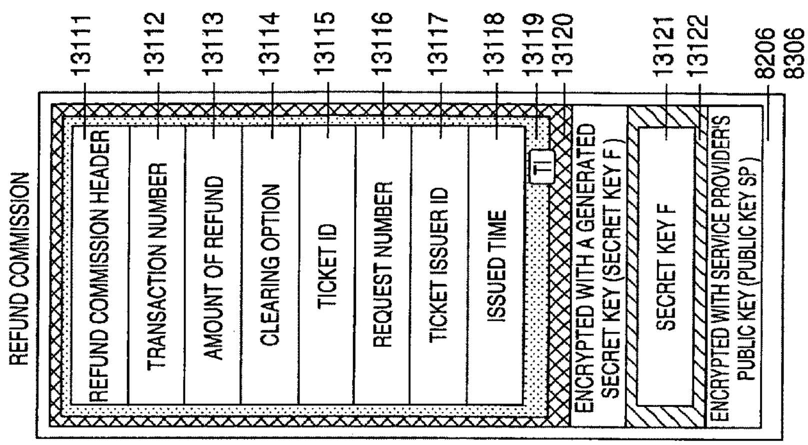
Figure 131A:
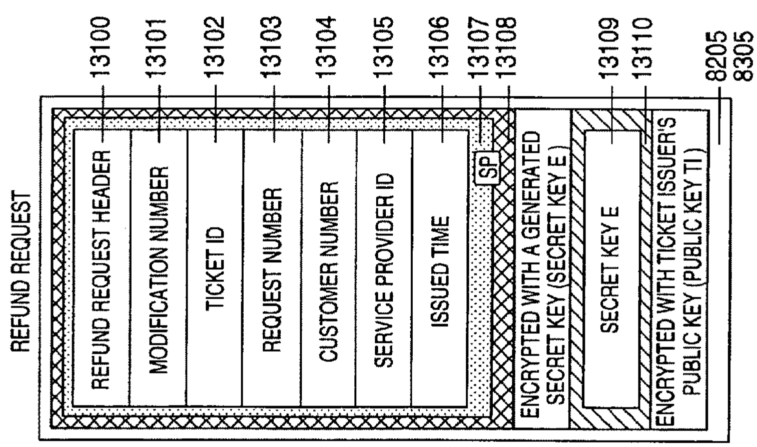
Figure 132A:
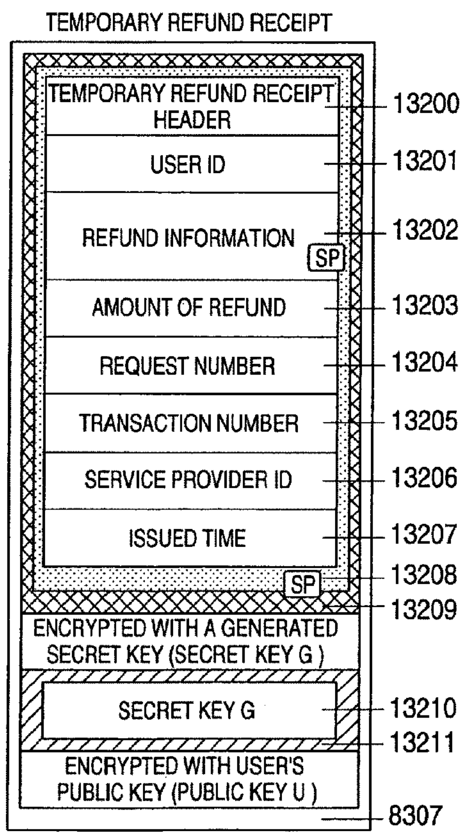
Figure 132B:
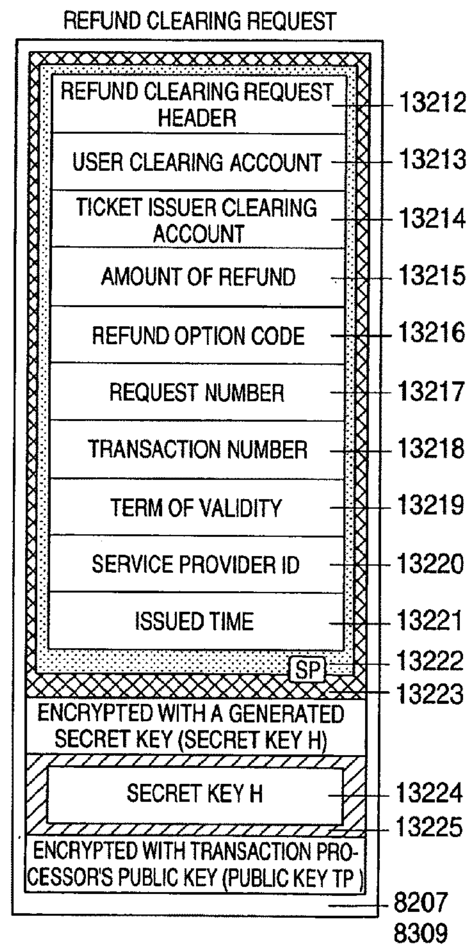
Figure 133A:
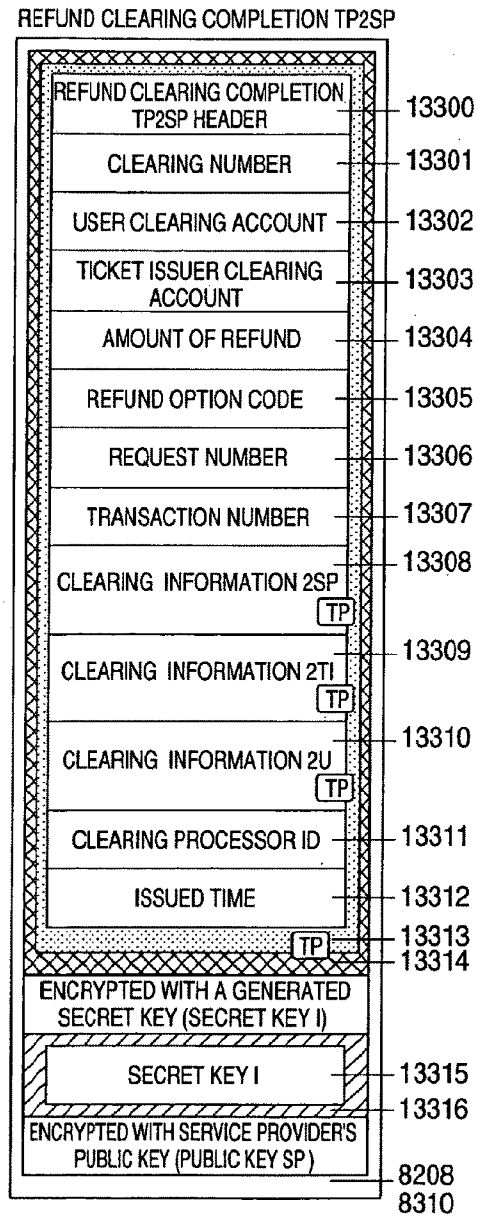
Figure 133B:
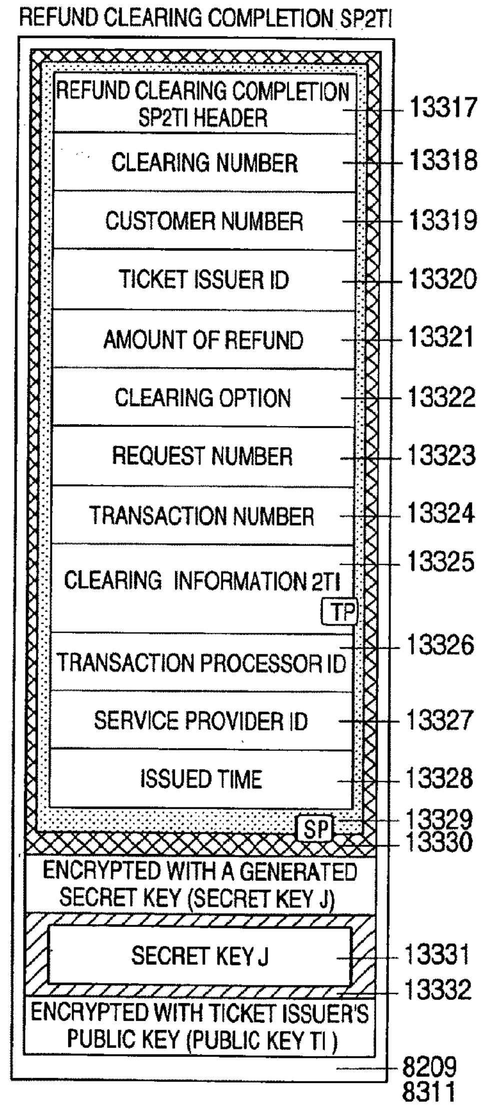
Figure 134A:
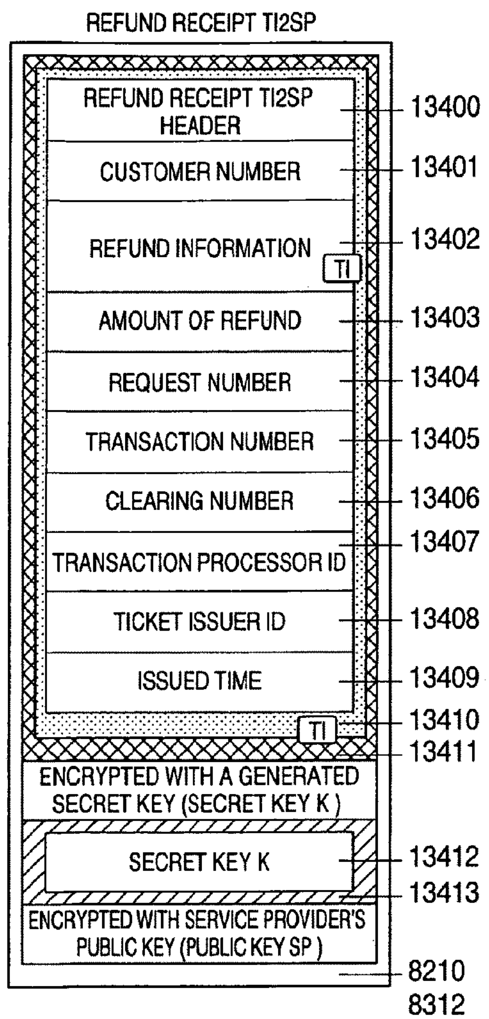
Figure 134B:
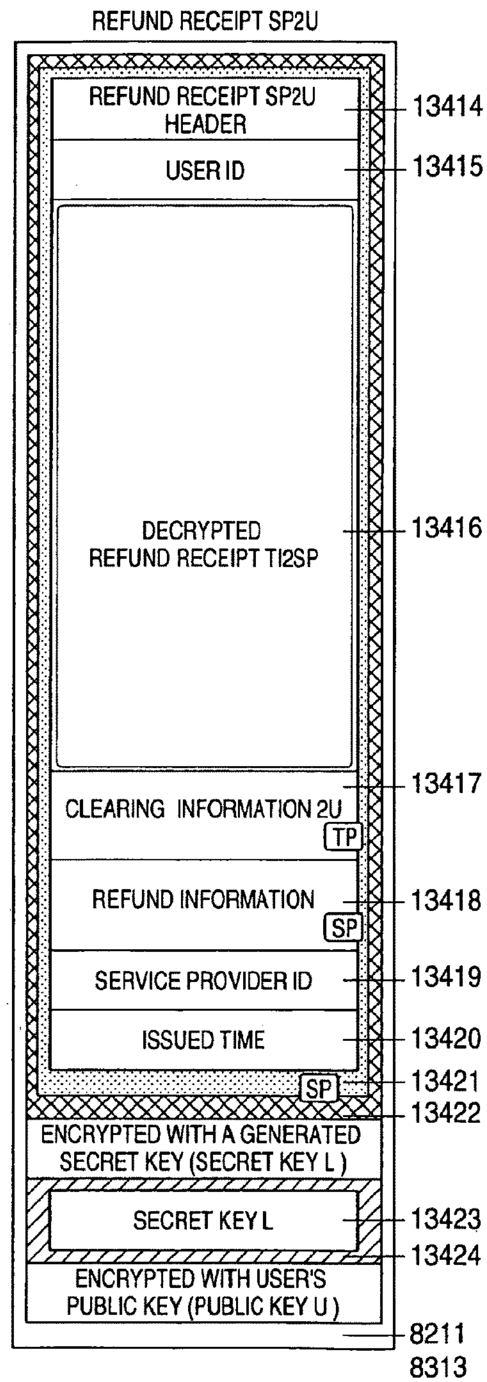
Figure 135C:
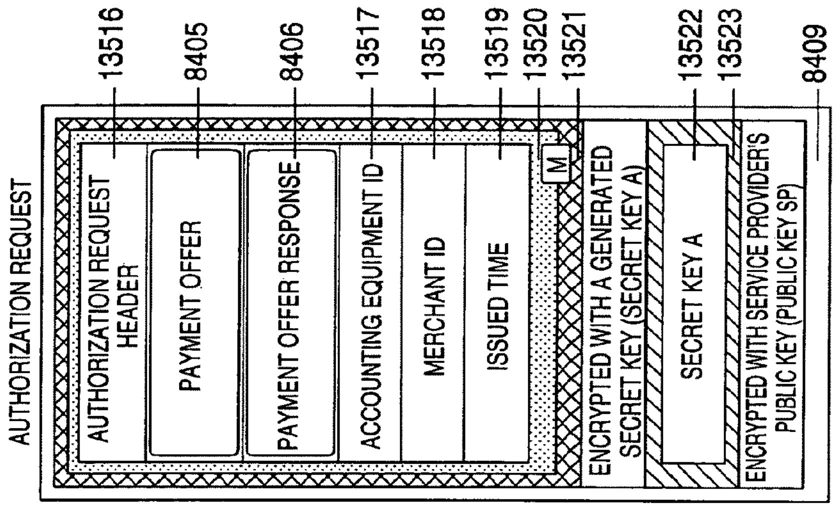
Figure 135B:
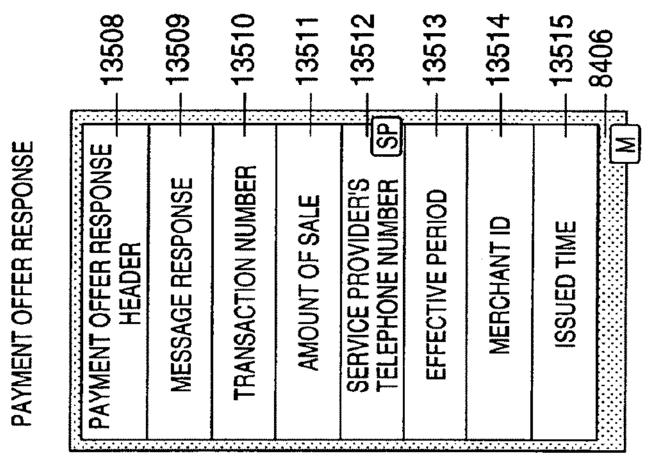
Figure 135A:
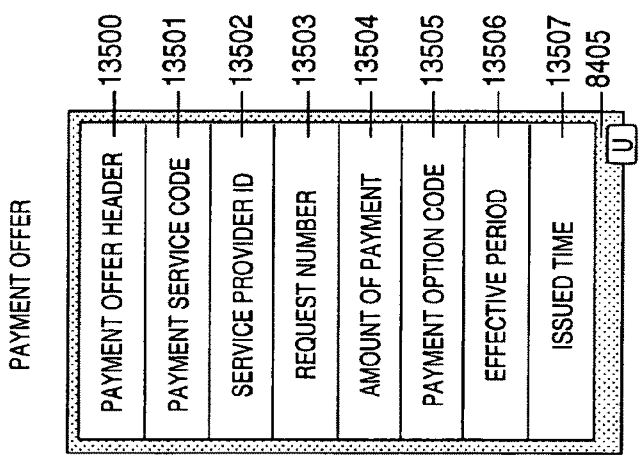
Figure 135F:
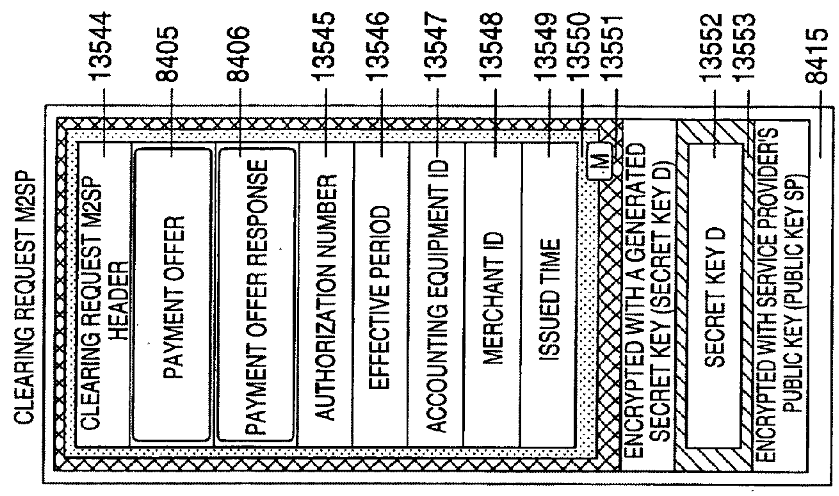
Figure 135E:
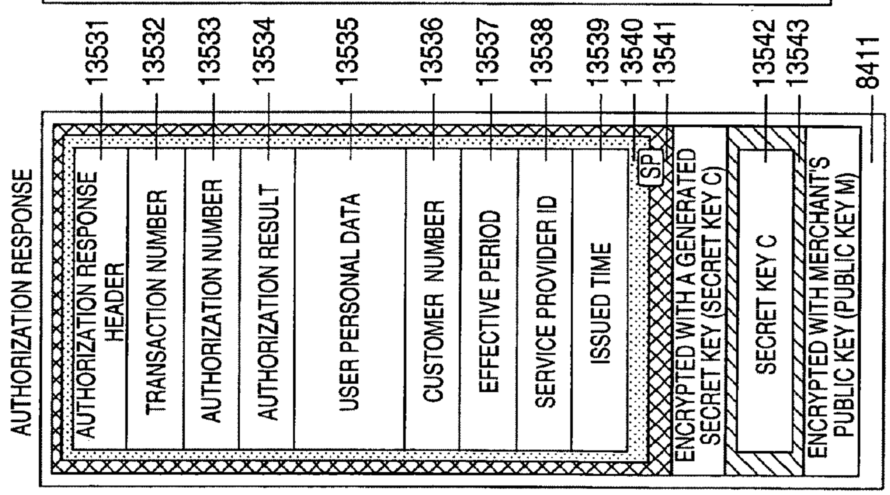
Figure 135D:
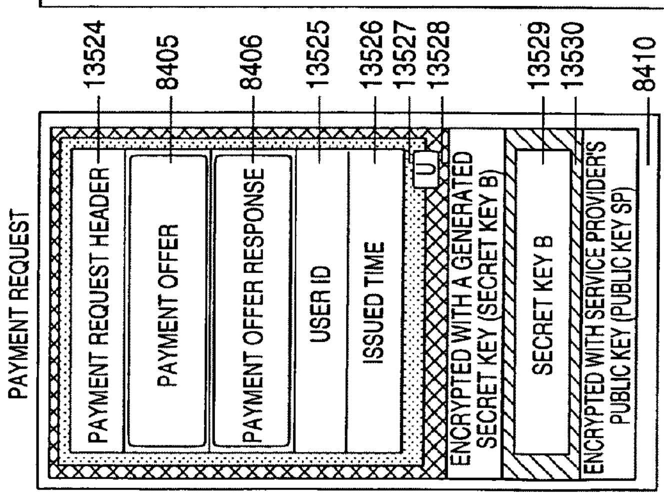
Figure 136A:
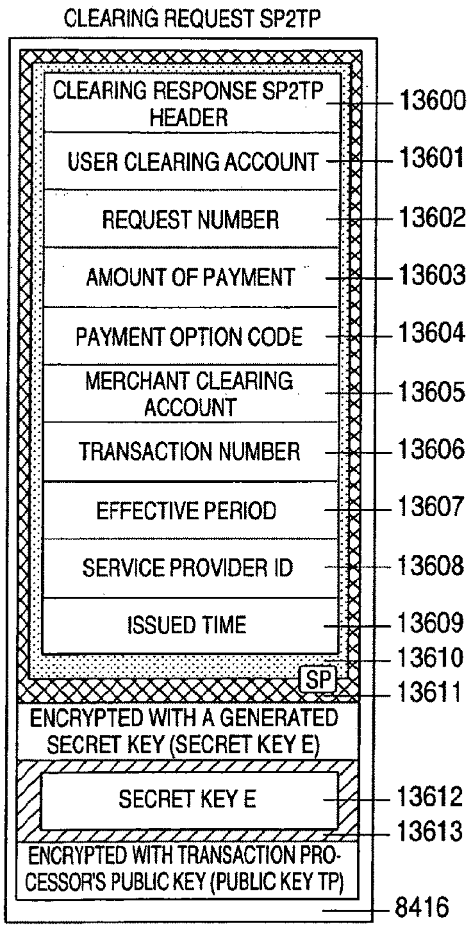
Figure 136B:
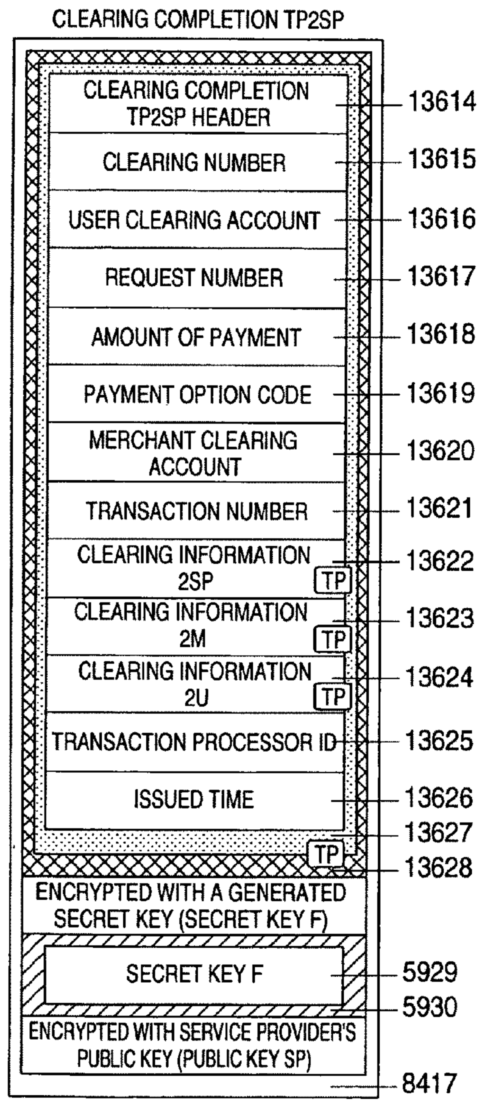
Figure 136C:
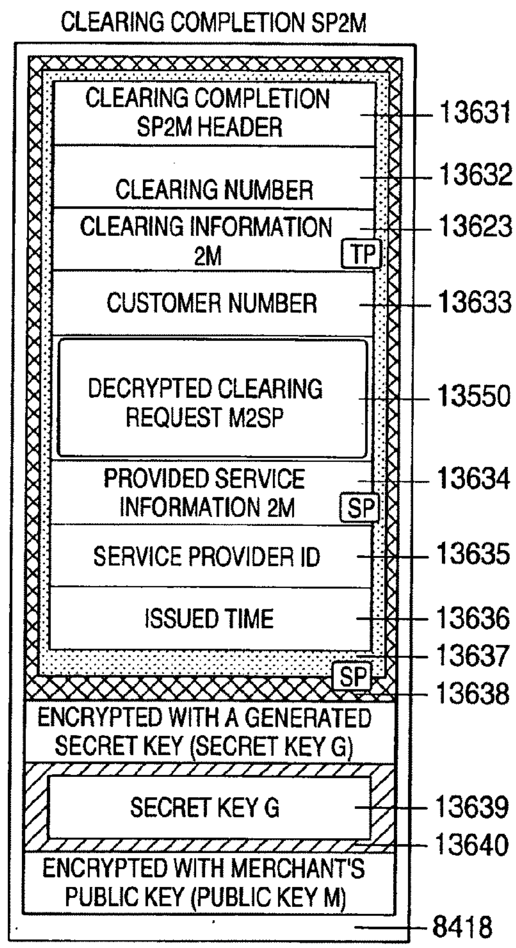
Figure 137B:
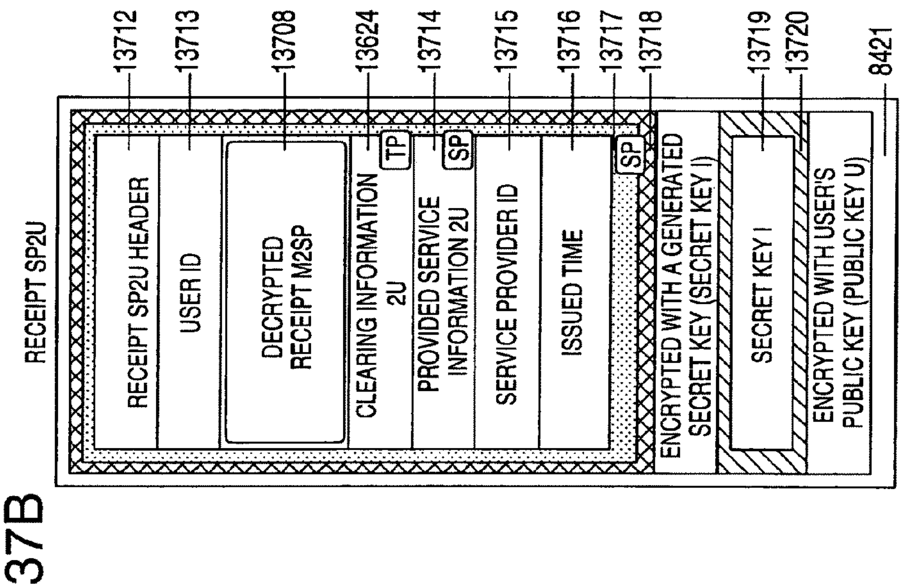
Figure 137A:
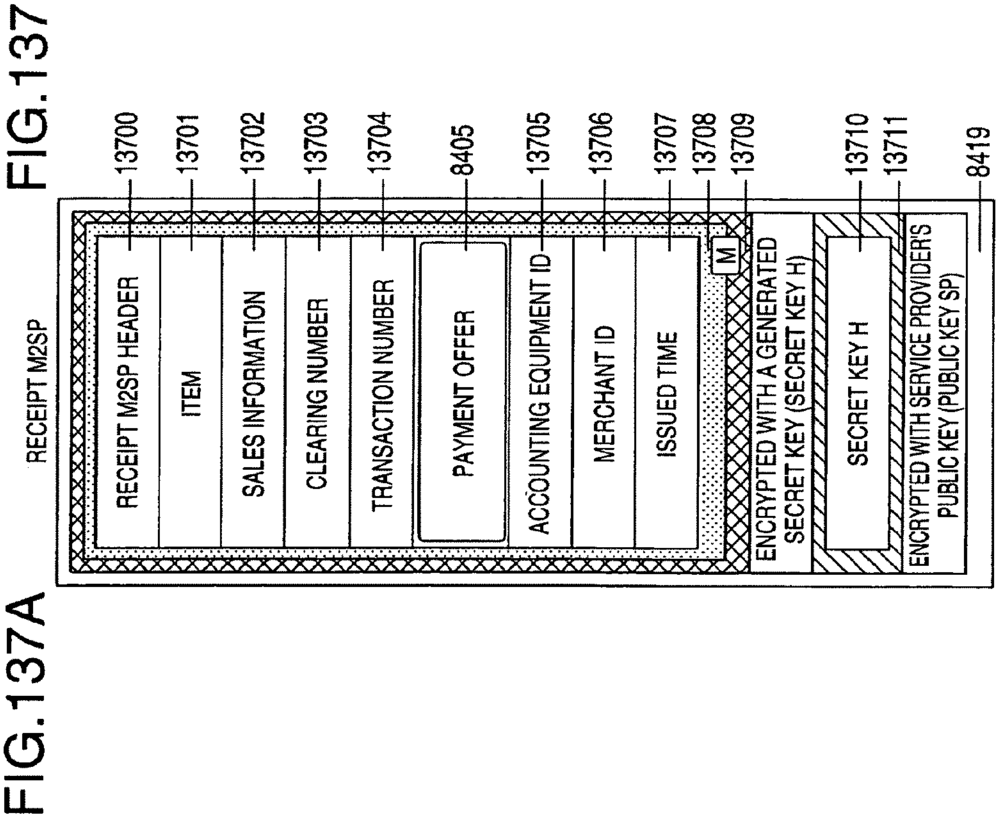
Figure 138A:
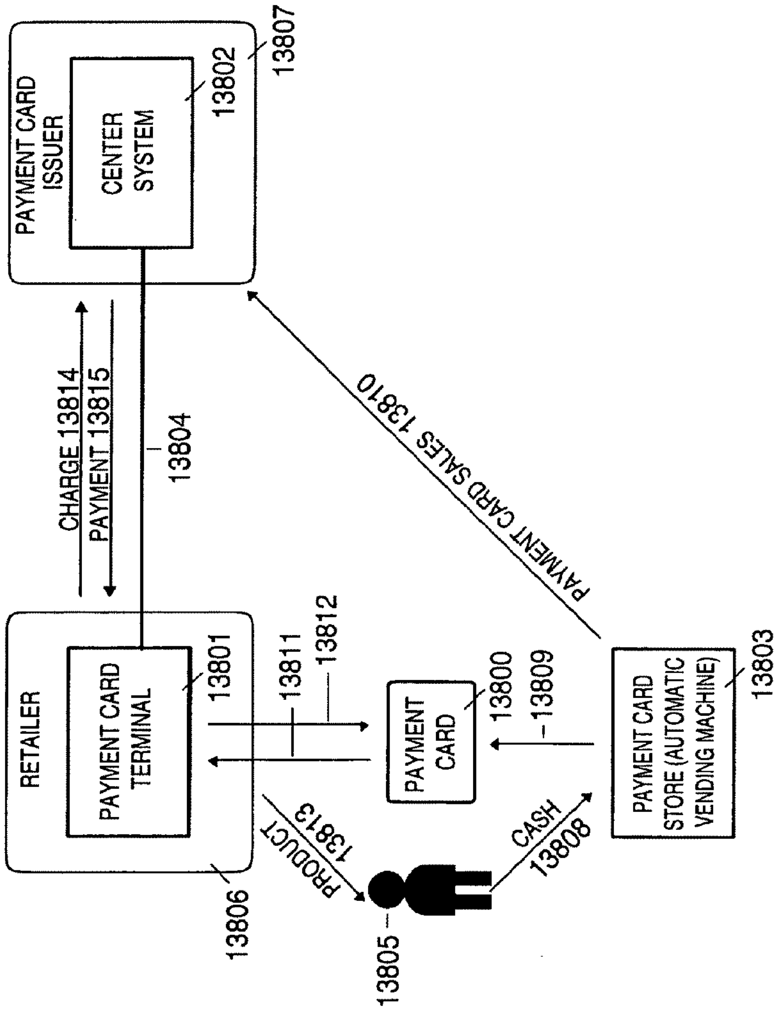
Figure 138B:
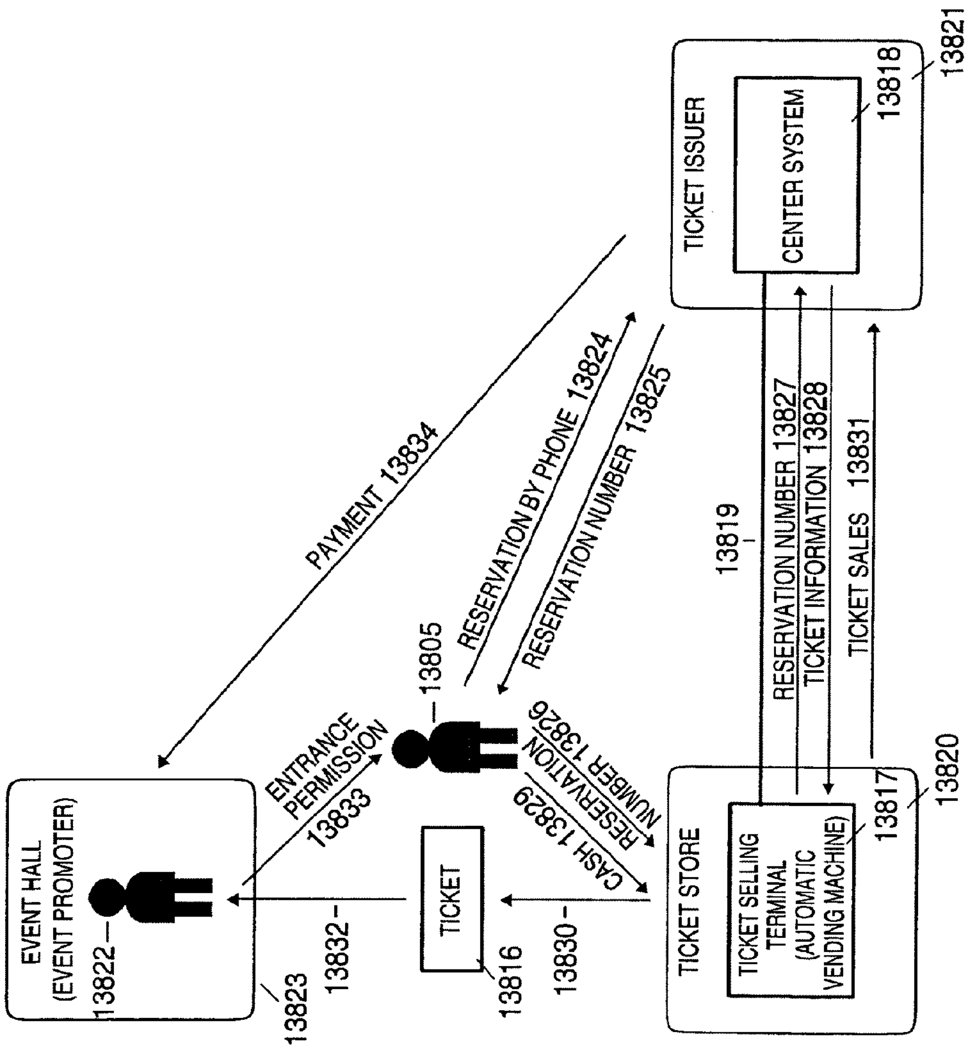
Figure 139B:
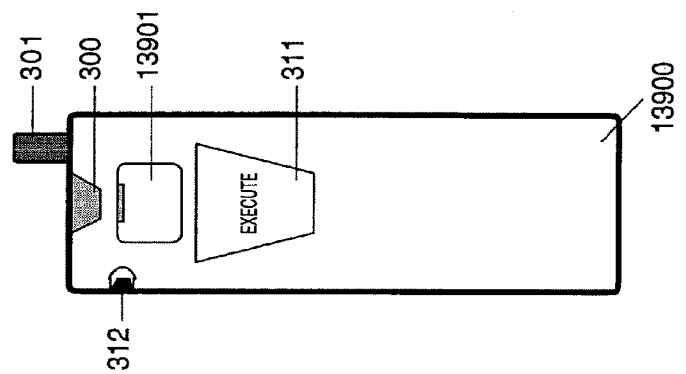
Figure 139A:
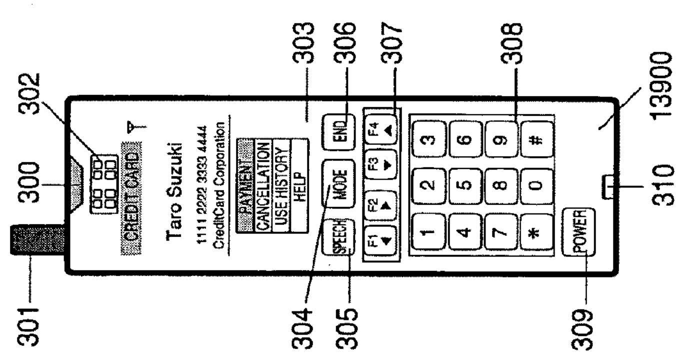
Figure 140:
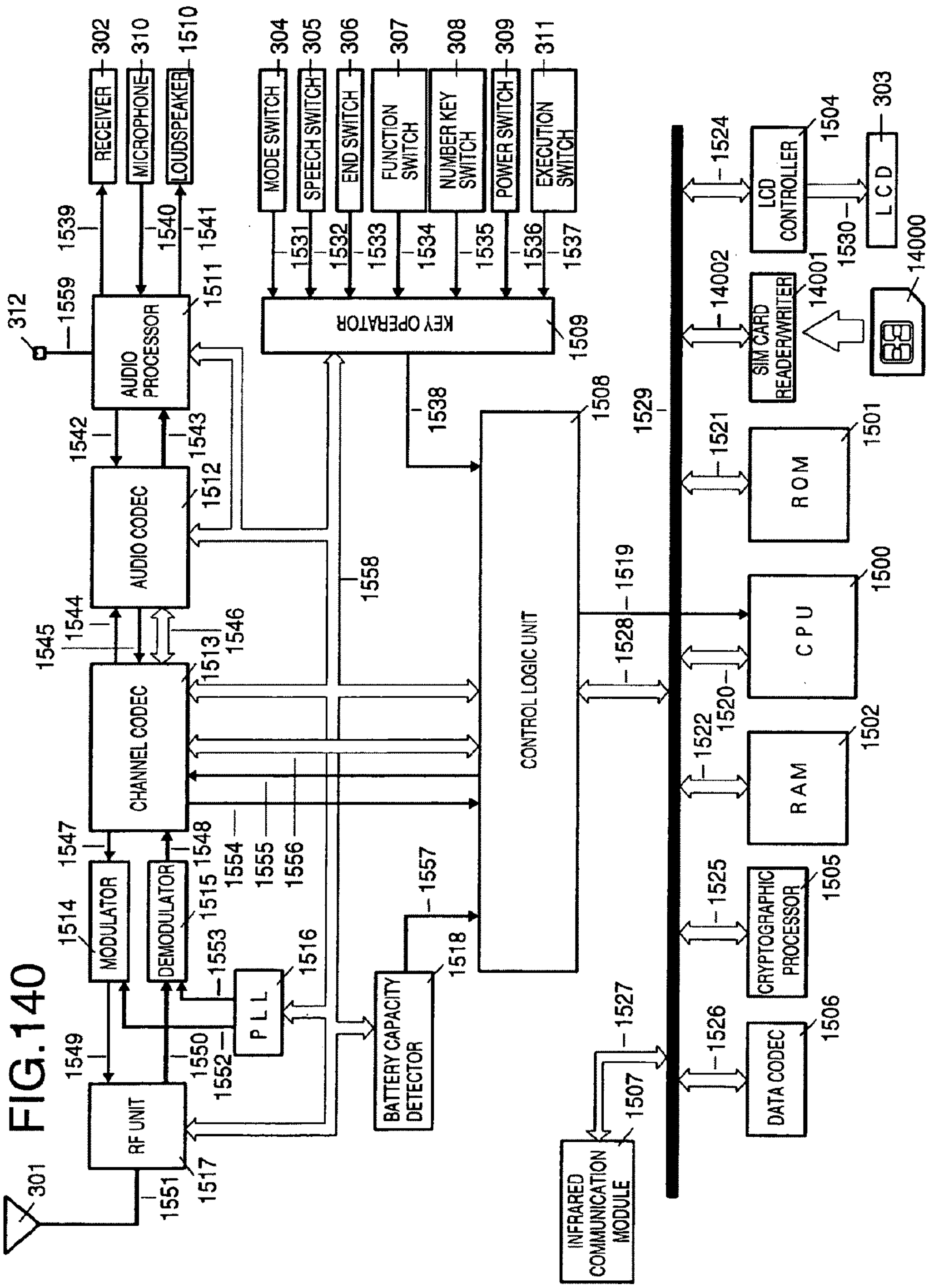
Figure 141A:
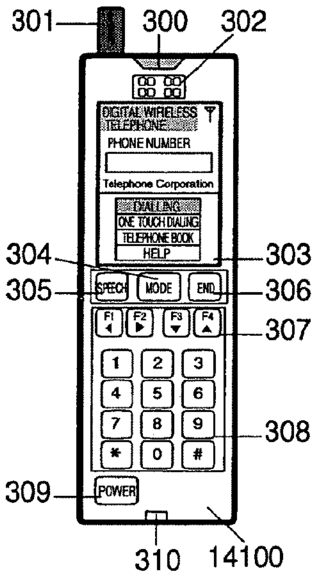
Figure 141B:
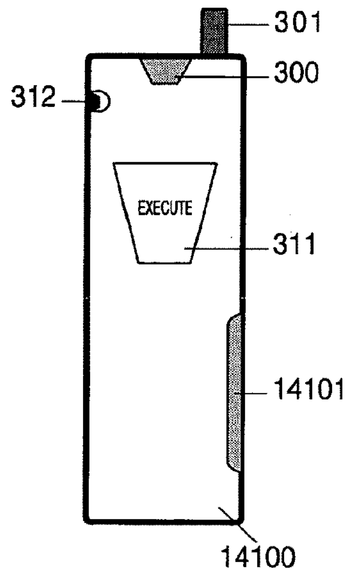
Figure 141C:
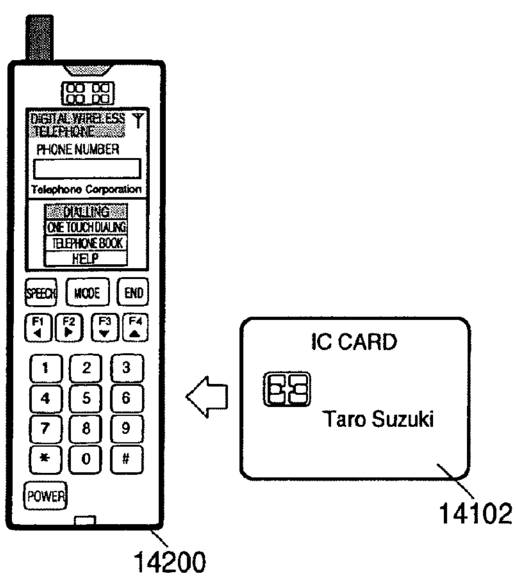
Figure 141D:
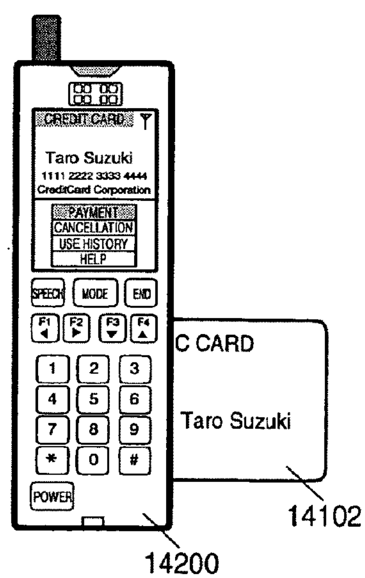
Figure 142:
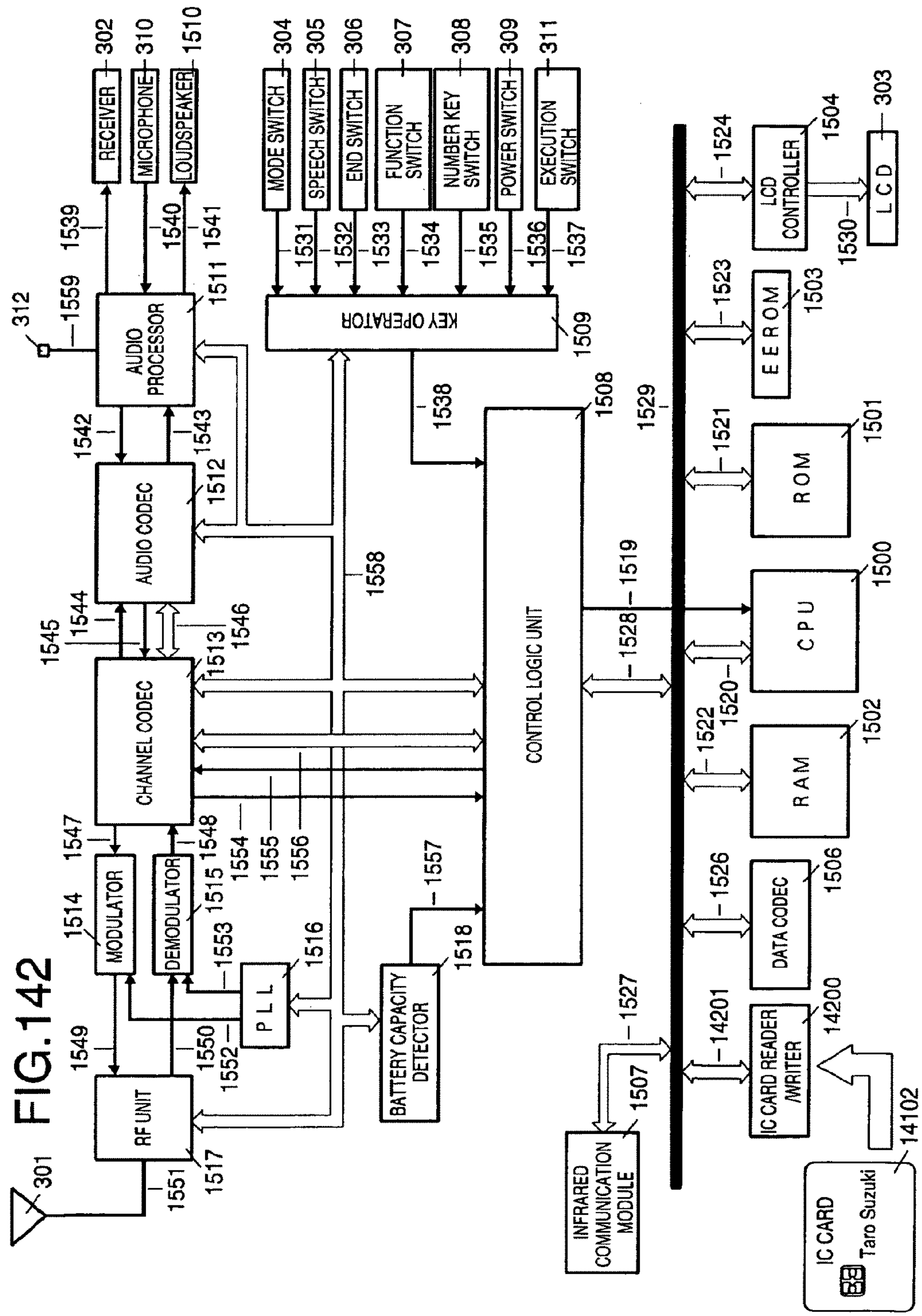
Figure 143:
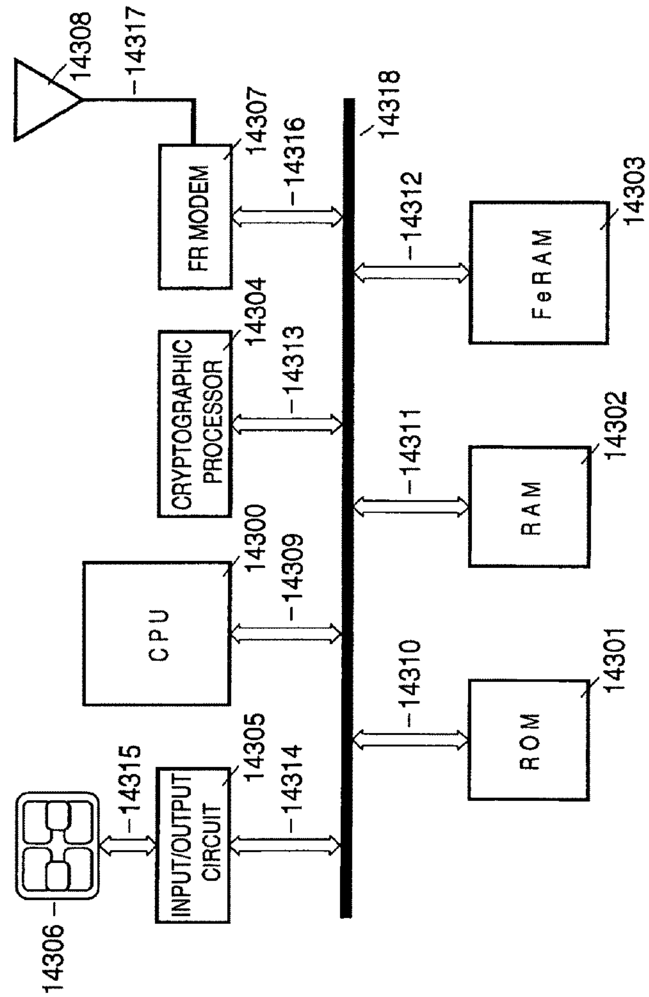
Figure 144:
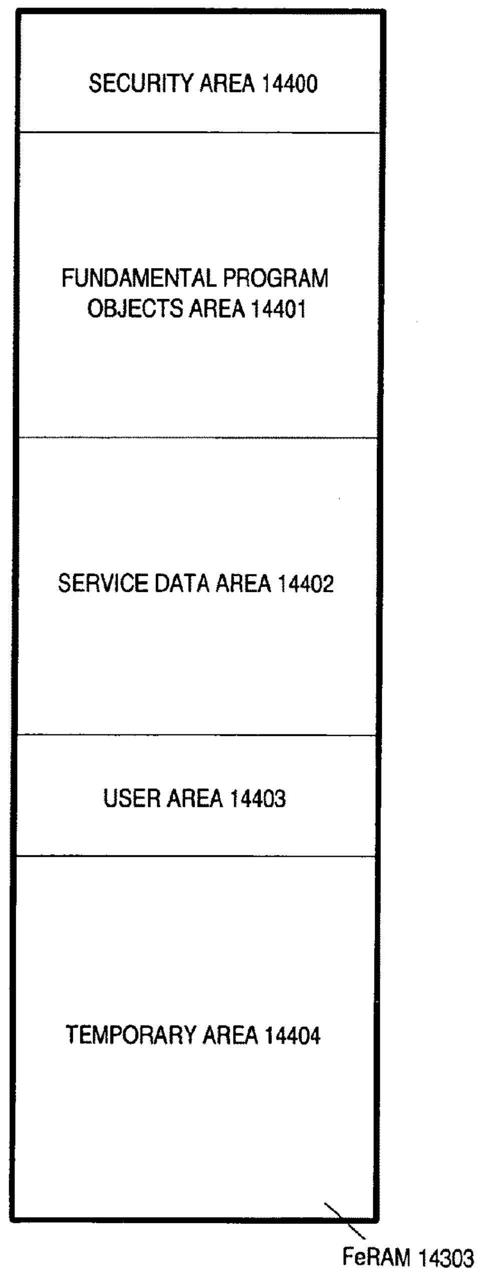

FIG. 90B is a specific diagram showing the data structure of a ticket order response that is transmitted, during the ticket order processing, from the service system to the mobile user terminal according to the embodiment of the present invention;

FIG. 91A is a specific diagram showing the data structure of a ticket purchase order that is transmitted, during the ticket purchase processing, from the mobile user terminal to the service system according to the embodiment of the present invention;

FIG. 91B is a specific diagram showing the data structure of a ticket purchase order that is transmitted, during the ticket purchase processing, from the service system to the ticket issuing system according to the embodiment of the present invention;

FIG. 92A is a specific diagram showing the data structure of an electronic ticket issuing commission for the ticket purchase processing according to the embodiment of the present invention;

FIG. 92B is a specific diagram showing the data structure for an electronic ticket issuing in the ticket purchase processing according to the embodiment of the present invention;

FIG. 93A is a specific diagram showing the data structure of a temporary receipt for the ticket purchase processing according to the embodiment of the present invention;

FIG. 93B is a specific diagram showing the data structure of a clearing request in the ticket purchase processing according to the embodiment of the present invention;

FIG. 94A is a specific diagram showing the data structure of a clearing completion notification that is transmitted, in the ticket purchase processing, from the settlement system to the service system according to the embodiment of the present invention;

FIG. 94B is a specific diagram showing the data structure of a clearing completion notification that is transmitted, in the ticket purchase processing, from the service system to the ticket issuing system according to the embodiment of the present invention;

FIG. 95A is a specific diagram showing the data structure of a receipt that is transmitted, in the ticket purchase processing, from the ticket issuing system to the service system according to the embodiment of the present invention;

FIG. 95B is a specific diagram showing the data structure of a receipt that is transmitted, in the ticket purchase processing, from the service system to the mobile user terminal according to the embodiment of the present invention;

FIG. 96A is a specific diagram showing the data structure of a payment card purchase order that is transmitted from the mobile user terminal to the service system according to the embodiment of the present invention;

FIG. 96B is a specific diagram showing the data structure of a payment card purchase order that is transmitted, during the payment card purchase processing, from the service system to the payment card issuing system according to the embodiment of the present invention;

FIG. 97A is a specific diagram showing the data structure of an electronic payment card issuing commission for the payment card purchase processing according to the embodiment of the present invention;

FIG. 97B is a specific diagram showing the data structure of electronic payment card issuing data for the payment card purchase processing according to the embodiment of the present invention;

FIG. 98A is a specific diagram showing the data structure of a temporary receipt for the payment card purchase processing according to the embodiment of the present invention;

FIG. 98B is a specific diagram showing the data structure of a clearing request in the payment card purchase processing according to the embodiment of the present invention;

FIG. 99A is a specific diagram showing the data structure of a clearing completion notification that is transmitted, in the payment card purchase processing, from the settlement system to the service system according to the embodiment of the present invention;

FIG. 99B is a specific diagram showing the data structure of a clearing completion notification that is transmitted, in the payment card purchase processing, from the service system to the payment card issuing system according to the embodiment of the present invention;

FIG. 100A is a specific diagram showing the data structure of a receipt that is transmitted, in the payment card purchase processing, from the payment card issuing system to the service system according to the embodiment of the present invention;

FIG. 100B is a specific diagram showing the data structure of a receipt that is transmitted, in the payment card purchase processing, from the service system to the mobile user terminal according to the embodiment of the present invention;

FIG. 101A is a specific diagram showing the data structure of a telephone card purchase order that is transmitted from the mobile user terminal to the service system according to the embodiment of the present invention;

FIG. 101B is a specific diagram showing the data structure of a telephone card purchase order that is transmitted, during the payment card purchase processing, from the service system to the telephone card issuing system according to the embodiment of the present invention;

FIG. 102A is a specific diagram showing the data structure of an electronic telephone card issuing commission for the telephone card purchase processing according to the embodiment of the present invention;

FIG. 103B is a specific diagram showing the data structure of an electronic telephone issuing in the telephone card purchase processing according to the embodiment of the present invention;

FIG. 104A is a specific diagram showing the data structure of a temporary receipt for the telephone card purchase processing according to the embodiment of the present invention;

FIG. 103B is a specific diagram showing the data structure of a clearing request in the telephone card purchase processing according to the embodiment of the present invention;

FIG. 105A is a specific diagram showing the data structure of a clearing completion notification that is transmitted, in the telephone card purchase processing, from the settlement system to the service system according to the embodiment of the present invention;

FIG. 104B is a specific diagram showing the data structure of a clearing completion notification that is transmitted, in the telephone card purchase processing, from the service system to the telephone card issuing system according to the embodiment of the present invention;

FIG. 106A is a specific diagram showing the data structure of a receipt that is transmitted, in the telephone card purchase processing, from the telephone card issuing system to the service system according to the embodiment of the present invention;

FIG. 105B is a specific diagram showing the data structure of a receipt that is transmitted, in the telephone card purchase processing, from the service system to the mobile user terminal according to the embodiment of the present invention;

FIG. 107A is a specific diagram showing the data structure of a ticket registration request for the ticket registration processing according to the embodiment of the present invention;

FIG. 106B is a specific diagram showing the data structure of a ticket certificate issuing in the ticket registration processing according to the embodiment of the present invention;

FIG. 108A is a specific diagram showing the data structure of a payment card registration request for the payment card registration processing according to the embodiment of the present invention;

FIG. 107B is a specific diagram showing the data structure of payment card certificate issuing in the payment card registration processing according to the embodiment of the present invention;

FIG. 109A is a specific diagram showing the data structure of a telephone card registration request for the telephone card registration processing according to the embodiment of the present invention;

FIG. 108B is a specific diagram showing the data structure of telephone card certificate issuing in the telephone card registration processing according to the embodiment of the present invention;

FIG. 110A is a specific diagram showing the data structure of an examination object ticket request for the ticket setup processing according to the embodiment of the present invention;

FIG. 109B is a specific diagram showing the data structure of an examination object ticket for the ticket setup processing according to the embodiment of the present invention;

FIG. 111A is a specific diagram showing the data structure of a ticket presentation for the ticket examination processing according to the embodiment of the present invention;

FIG. 110B is a specific diagram showing the structure of ticket examination data for the ticket examination processing according to the embodiment of the present invention;

FIG. 112A is a specific diagram showing the data structure of a ticket examination response for the ticket examination processing according to the embodiment of the present invention;

FIG. 111B is a specific diagram showing the data structure of an examination certificate for the ticket examination processing according to the embodiment of the present invention;

FIG. 113A is a specific diagram showing the data structure of a payment offer for the payment card settlement processing according to the embodiment of the present invention;

FIG. 112B is a specific diagram showing the data structure of a payment offer response for the payment card settlement processing according to the embodiment of the present invention;

FIG. 114A is a specific diagram showing the data structure of a micro-check for the payment card settlement processing according to the embodiment of the present invention;

FIG. 113B is a specific diagram showing the data structure of a receipt for the payment card settlement processing according to the embodiment of the present invention;

FIG. 115A is a specific diagram showing the data structure of a micro-check call request for the telephone card settlement processing according to the embodiment of the present invention;

FIG. 114B is a specific diagram showing the data structure of a micro-check call response for the telephone card settlement processing according to the embodiment of the present invention;

FIG. 116A is a specific diagram showing the data structure of a telephone micro-check for the telephone card settlement processing according to the embodiment of the present invention;

FIG. 115B is a specific diagram showing the data structure of a receipt for the telephone card settlement processing according to the embodiment of the present invention;

FIG. 115C is a specific diagram showing the data structure of a communication charge for the telephone card settlement processing according to the embodiment of the present invention;

FIG. 117A is a specific diagram showing the data structure of a usage report for the ticket reference processing according to the embodiment of the present invention;

FIG. 116B is a specific diagram showing the data structure of a usage report for the payment card reference processing according to the embodiment of the present invention;

FIG. 116C is a specific diagram showing the data structure of a usage report for the telephone card reference processing according to the embodiment of the present invention;

FIG. 118A is a specific diagram showing the data structure of a ticket transfer offer for the ticket transfer processing according to the embodiment of the present invention;

FIG. 117B is a specific diagram showing the data structure of a ticket transfer offer response for the ticket transfer processing according to the embodiment of the present invention;

FIG. 119A is a specific diagram showing the data structure of a ticket transfer certificate for the ticket transfer processing according to the embodiment of the present invention;

FIG. 118B is a specific diagram showing the data structure of a ticket transfer receipt for the ticket transfer processing according to the embodiment of the present invention;

FIG. 120A is a specific diagram showing the data structure of a ticket transfer request for the ticket transfer processing according to the embodiment of the present invention;

FIG. 119B is a specific diagram showing the data structure of a ticket transfer for the ticket transfer processing according to the embodiment of the present invention;

FIG. 121A is a specific diagram showing the data structure of a card transfer offer for the payment card or the telephone card transfer processing according to the embodiment of the present invention;

FIG. 120B is a specific diagram showing the data structure of a card transfer offer response for the payment card or the telephone card transfer processing according to the embodiment of the present invention;

FIG. 122A is a specific diagram showing the data structure of a card transfer certificate for the ticket transfer processing according to the embodiment of the present invention;

FIG. 121B is a specific diagram showing the data structure of a card transfer receipt for the ticket transfer processing according to the embodiment of the present invention;

FIG. 123A is a specific diagram showing the data structure of a card transfer request for the payment card or the telephone card transfer processing according to the embodiment of the present invention;

FIG. 122B is a specific diagram showing the data structure of a payment card transfer for the payment card transfer processing according to the embodiment of the present invention;

FIG. 122C is a specific diagram showing the data structure of a telephone card transfer for the telephone card transfer processing according to the embodiment of the present invention;

FIG. 124A is a specific diagram showing the data structure of an electronic ticket installation commission for the electronic ticket installation processing according to the embodiment of the present invention;

FIG. 123B is a specific diagram showing the data structure of a ticket installation commission for the electronic ticket installation processing according to the embodiment of the present invention;

FIG. 125A is a specific diagram showing the data structure of an electronic ticket installation commission for the electronic ticket installation processing according to the embodiment of the present invention;

FIG. 124B is a specific diagram showing the structure of electronic ticket installation data for the electronic ticket installation processing according to the embodiment of the present invention;

FIG. 126A is a specific diagram showing the data structure of an electronic payment card installation commission for the electronic payment card installation processing according to the embodiment of the present invention;

FIG. 125B is a specific diagram showing the data structure of a payment card installation commission request for the electronic payment card installation processing according to the embodiment of the present invention;

FIG. 127A is a specific diagram showing the data structure of an electronic payment card installation commission for the electronic payment card installation processing according to the embodiment of the present invention;

FIG. 126B is a specific diagram showing the structure of electronic payment card installation data for the electronic payment card installation processing according to the embodiment of the present invention;

FIG. 128A is a specific diagram showing the data structure of an electronic telephone card installation commission for the electronic telephone card installation processing according to the embodiment of the present invention;

FIG. 127B is a specific diagram showing the data structure of a telephone card installation commission request for the electronic telephone card installation processing according to the embodiment of the present invention;

FIG. 129A is a specific diagram showing the data structure of an electronic telephone card installation commission for the electronic telephone card installation processing according to the embodiment of the present invention;

FIG. 128B is a specific diagram showing the data structure of electronic telephone card installation data;

FIG. 130A is a specific diagram showing the data structure of a modification request for the electronic telephone card installation processing according to the embodiment of the present invention;

FIG. 129B is a specific diagram showing the data structure of a modification notification according to the embodiment of the present invention;

FIG. 131A is a specific diagram showing the structure of reaction selection data according to the embodiment of the present invention;

FIG. 130B is a specific diagram showing the data structure of a modification instruction according to the embodiment of the present invention;

FIG. 132A is a specific diagram showing the data structure of a refund request according to the embodiment of the present invention;

FIG. 131B is a specific diagram showing the data structure of a refund commission according to the embodiment of the present invention;

FIG. 133A is a specific diagram showing the data structure of a temporary refund receipt according to the embodiment of the present invention;

FIG. 132B is a specific diagram showing the data structure of a refund clearing receipt according to the embodiment of the present invention;

FIG. 134A is a specific diagram showing the data structure of a refund clearing completion notification that is transmitted from the settlement system to the service system according to the embodiment of the present invention;

FIG. 133B is a specific diagram showing the data structure of a refund clearing completion notification that is transmitted from the service system to the ticket issuing system according to the embodiment of the present invention;

FIG. 135A is a specific diagram showing the data structure of a refund receipt that is transmitted from the ticket issuing system to the service system according to the embodiment of the present invention;

FIG. 134B is a specific diagram showing the data structure of a refund receipt that is transmitted from the service system to the mobile user terminal according to the embodiment of the present invention;

FIG. 136A is a specific diagram showing the data structure of a payment offer for the real credit settlement processing according to the embodiment of the present invention;

FIG. 135B is a specific diagram showing the data structure of a payment offer response for the real credit settlement processing according to the embodiment of the present invention;

FIG. 135C is a specific diagram showing the data structure of an authorization request for the real credit settlement processing according to the embodiment of the present invention;

FIG. 135D is a specific diagram showing the data structure of a payment request for the real credit settlement processing according to the embodiment of the present invention;

FIG. 135E is a specific diagram showing the data structure of an authorization response for the real credit settlement processing according to the embodiment of the present invention;

FIG. 135F is a specific diagram showing the data structure of a clearing request that is transmitted, in the real credit settlement processing, from the merchant terminal to the service system according to the embodiment of the present invention;

FIG. 137A is a specific diagram showing the data structure of a clearing request that is transmitted, in the real credit settlement processing, from the service system to the transaction processing system according to the embodiment of the present invention;

FIG. 136B is a specific diagram showing the data structure of a clearing completion notification that is transmitted, in the real credit settlement processing, from the transaction processing system to the service system according to the embodiment of the present invention;

FIG. 136C is a specific diagram showing the data structure of a clearing completion notification that is transmitted, in the real credit settlement processing, from the service system to the merchant terminal according to the embodiment of the present invention;

FIG. 138A is a specific diagram showing the data structure of a receipt that is transmitted, in the real credit settlement processing, from the merchant terminal to the service system according to the embodiment of the present invention;

FIG. 137B is a specific diagram showing the data structure of a receipt that is transmitted, in the real credit settlement processing, from the service system to the mobile user terminal according to the embodiment of the present invention;

FIG. 139A is a diagram for explaining a conventional settlement system that employs a prepayment method using a payment card;

FIG. 138B is a diagram for explaining a conventional ticket selling system;

FIG. 139A is a front view of a mobile user terminal according to a second embodiment of the present invention;

FIG. 139B is a rear view of the mobile user terminal according to the second embodiment of the present invention;

FIG. 140 is a block diagram illustrating the arrangement of the mobile user terminal according to the second embodiment of the present invention;

FIG. 141A is a front view of a mobile user terminal according to a third embodiment of the present invention;

FIG. 141B is a rear view of the mobile user terminal according to the third embodiment of the present invention;

FIG. 141C is a front view of the mobile user terminal in a digital telephone mode where an IC card is not attached to the mobile user terminal according to the third embodiment of the present invention, and a schematic diagram for the IC card;

FIG. 141D is a front view of the mobile user terminal in a credit card mode where the IC card is attached to the mobile user terminal according to the third embodiment of the present invention;

FIG. 142 is a block diagram illustrating the arrangement of the mobile user terminal according to the third embodiment of the present invention;

FIG. 143 is a block diagram illustrating the arrangement of the IC card according to the third embodiment of the present invention; and FIG. 144 is a specific diagram showing an FeRAM memory map for the IC card according to the third embodiment of the present invention.

The reference numerals used in the drawings are as follows:

| | |
|---|---|
| 100, 200: | mobile user terminal |
| 101: | gate terminal |
| 102: | merchant terminal |
| 103: | merchant terminal |
| 104: | automatic vending machine |
| 105, 202: | switching center |
| 106: | settlement system |

-continued

| | |
|---|---|
| 107: | ticket issuing system |
| 108: | payment card issuing system |
| 109: | telephone card issuing system |
| 110: | service system |
| 111: | digital public line network |
| 112, 113, 114, 201: | base station |
| 115: | telephone terminal |
| 207: | installation card |
| 300, 400, 501, 60, 700: | infrared communication module (infrared communication port) |
| 301, 601, 701: | antenna |
| 302, 602: | receiver/loudspeaker |
| 303, 502, 603: | LCD |
| 304, 504, 604: | mode switch |
| 305, 605: | speech switch |
| 306, 606: | end switch |
| 307, 506, 607; | function switch |
| 308, 403, 507, 608: | number key switch |
| 309, 402, 509, 611: | power switch |
| 310, 609: | microphone |
| 311, 508, 612: | execution switch |
| 312, 613: | headphone jack |
| 313, 314, 315: | image display portion |
| 401, 702: | touch panel LCD |
| 404: | menu switch |
| 405: | lock switch |
| 406, 510: | serial cable |
| 503: | telephone handset |
| 505: | hook switch |
| 511: | cash register |
| 512: | payment card settlement switch |
| 513: | credit clearing switch |
| 514: | RS-232C cable |
| 610: | bar code reader |
| 614: | card slot |
| 703: | discharge port |
| 704: | product selection switch |
| 705: | sold out display (LED) |
| 706: | sample |
| 800: | electronic telephone card accounting device |
| 801: | switch |
| 802: | data processor |
| 803: | modulator/demodulator |
| 804: | base station controller |
| 900: | service server |
| 901: | server director information server |
| 902: | user information server |
| 903: | merchant information server |
| 904: | transaction processor information server |
| 905: | ticket issuer information server |
| 906: | payment card issuer information server |
| 907: | telephone card issuer information server |
| 908, 1006, 1106, 1206, 1306: | management system |
| 909, 910, 1004, 1007, 1104, 1107, 1204, 1207, 1304, 1307: | ATM-LAN switch |
| 911, 1005, 1105, 1205, 1305: | ATM switch |
| 1000: | transaction server |
| 1001: | subscriber information server |
| 1002: | member store information server |
| 1003: | transaction information server |
| 1100: | ticket issuing server |
| 1101, 1201, 1301: | customer information server |
| 1102: | ticket issuing information server |
| 1103: | ticket information server |
| 1200: | payment card issuing server |
| 1202: | payment card issuing information server |
| 1203: | payment card information server |
| 1300: | telephone card issuing server |
| 1302: | telephone card issuing information server |
| 1303: | telephone card information server |
| 1400: | electronic payment card installation card |
| 1401: | electronic telephone card installation card |

-continued

| | |
|---|---|
| 1402: | electronic ticket installation card |
| 1406, 1412, 1418: | holographic logo |
| 1407, 1413, 1419: | installation card number |
| 1408, 1414, 1420: | installation number |
| 1500, 2200, 2600, 3000, 3400, 3800: | CPU |
| 1501, 2201, 2601, 3001, 3401, 3801: | ROM |
| 1502, 2202, 2602, 3002, 3402, 3802: | RAM |
| 1503, 2204, 2604, 3003, 3403, 3804: | EEPROM |
| 1504, 2605, 3004: | LCD controller |
| 1505, 2205, 2606, 3005, 3404, 3805: | cryptographic processor |
| 1506, 2206, 2607, 3006, 3405, 3806: | data codec |
| 1508, 2214, 2610, 3008, 3407: | control logic unit |
| 1509, 2212, 2611, 3009: | key operator |
| 1510, 2211, 2612, 3010, 3415: | loudspeaker |
| 1511, 2413, 2613, 3011: | audio processor |
| 1512, 2414, 2614, 3012: | audio codec |
| 1513, 2415, 2615, 3013, 3408: | channel codec |
| 1514, 3014, 3409: | modulator |
| 1515, 3015, 3410: | demodulator |
| 1516, 3016, 3412: | PLL |
| 1517, 3017, 3411: | RF unit |
| 1518, 3018: | battery capacity detector |
| 1600, 3100, 3500: | frame counter |
| 1601, 3101, 3501: | start frame counter |
| 1602, 2300, 2700, 3102, 3502: | clock counter |
| 1603, 2301, 2701, 3103, 3503: | update time register |
| 1604, 2302, 2702, 3104, 3504: | interrupt register |
| 1605, 2307, 2703, 3105, 3505: | ID register , |
| 1606, 2704, 3106, 3506: | channel codec control register |
| 1607, 2705, 3107: | audio transmission buffer |
| 1608, 2706, 3108: | audio reception buffer |
| 1609, 2707, 3109, 3507: | data transmission buffer |
| 1610, 2708, 3110, 3508: | data reception buffer |
| 1611, 2303, 2709, 3111: | audio processor control register |
| 1612, 2306, 2710, 3112: | key operator control register |
| 1613, 2711, 3113: | audio data encryption key register |
| 2203, 2603, 3803: | hard disk |
| 2207: | digital telephone communication unit |
| 2208, 2608: | serial/parallel converter |
| 2209, 2609: | serial port |
| 2210: | sound controller |
| 2213: | external interface |
| 2304: | X coordinate register |
| 2305: | Y coordinate register |
| 2308: | phone communication control register |
| 2616: | digital communication adaptor |
| 2617: | RS-232C interface |
| 3059: | memory card |
| 3114: | key display register |
| 3413, 3807: | external interface |
| 3414: | control logic unit |
| 3416: | price calculator |
| 3417: | product manager |
| 3418: | product output mechanism |
| 3419: | CD-ROM drive |
| 3456: | sales mechanism |
| 3455: | accounting equipment |
| 13800: | payment card |
| 13801: | payment card terminal |
| 13802, 13818: | center system |
| 13816: | ticket |
| 13817: | ticket selling terminal |

BEST MODES FOR CARRYING OUT THE INVENTION

The best mode of the present invention will now be described while referring to FIGS. 1 to 137.

In an electronic commerce system according to one embodiment of the present invention, a user (individual consumer) purchases, as electronic information, various types of tickets, payment cards or telephone cards through a network. Thereafter, wireless communication is employed for the examination of a ticket when the user enters a hall, for a transaction when the user employs a payment card to purchase a product or to obtain a service, or for a settlement process when the user employs a telephone card to settle a charge incurred by the use of the wireless telephone communication service. Therefore, this system does not require that a ticket be submitted to an usher for examination, or that cash and a receipt be directly exchanged with a clerk at a retail shop when a product is purchased, or that a SIM Card (Subscriber Identify Module Card) be installed in a wireless telephone terminal, such as a portable telephone or a PHS, to monitor calls initiated at the wireless telephone terminal.

In this specification, this system is called an "electronic commerce system," and the various types of services that can be provided by this system are generally called "mobile electronic commerce services."

Figure 1:
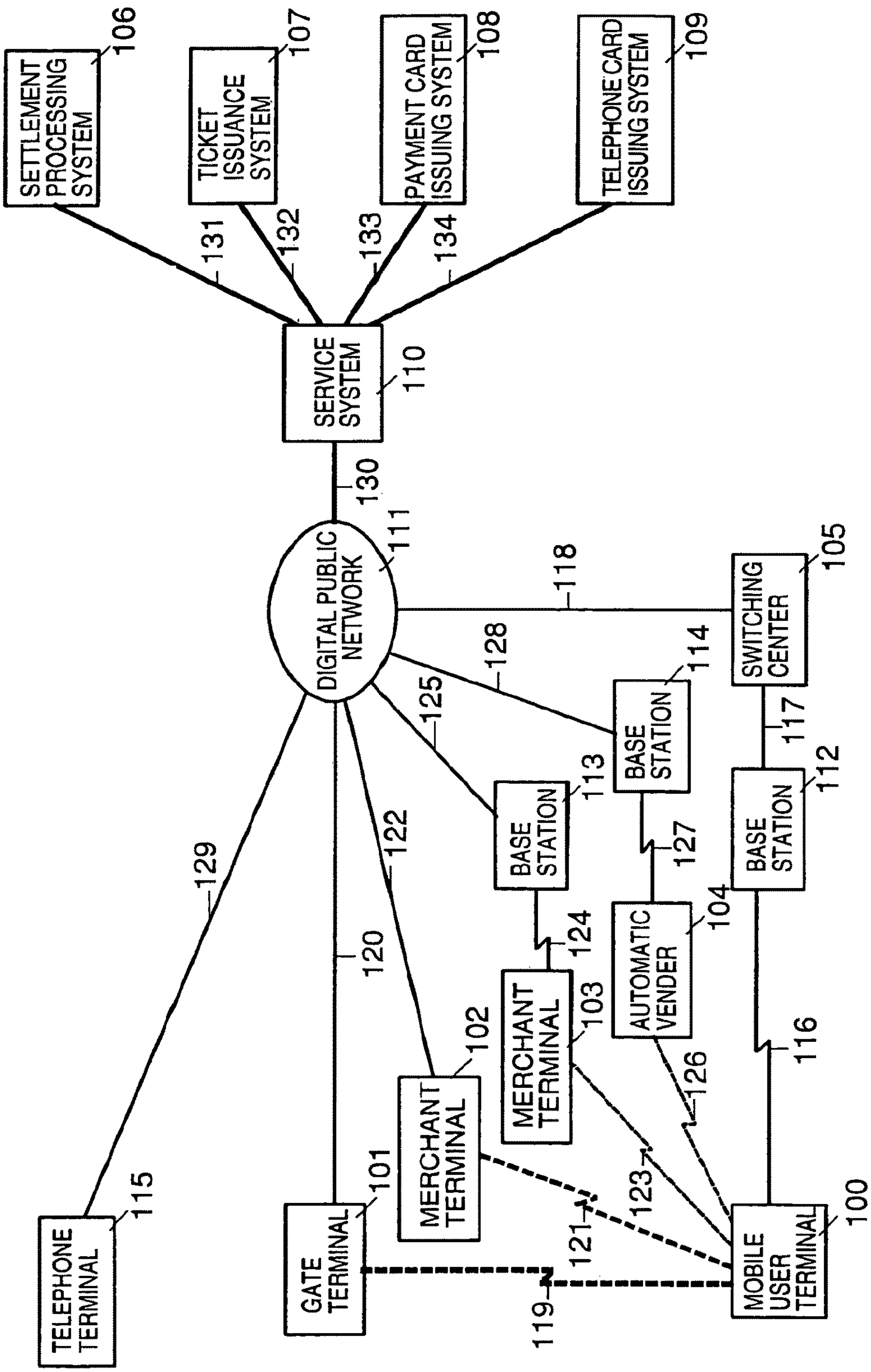
FIG. 1 is a block diagram illustrating the arrangement of a mobile electronic commerce system according to one embodiment of the present invention.

As is shown in the system arrangement diagram in FIG. 1, the mobile electronic commerce service, which provides two types of bi-directional wireless communication functions, comprises: a mobile user terminal 100, which can function as an electronic ticket, an electronic payment card, an electronic telephone card and an electronic credit card (bank card); a gate terminal 101, which can perform an automatic examination process for a ticket; a merchant terminal 102, which can be used for a payment settlement process or a credit settlement process performed at a cash register counter in a retail shop; a merchant terminal 103, which can be used for a payment settlement process or a credit settlement process performed in a mobile environment; an automatic vending machine 104, which has a payment settlement function; a switching center 105 for a digital wireless telephone, which has a payment settlement function that is used for wireless telephone communications; a transaction processing system 106, which can be used to perform a credit settlement process at a credit service company or a settlement company; a ticket issuing system 107, which is used for issuing a ticket at an event company or a ticket issuance company; a payment card issuing system 108, which is used for issuing a payment card at a retail sales company or at a payment card issuance company; a telephone card issuing system 109, which is used for issuing a telephone card for wireless telephone communication at a wireless telephone communication company or a telephone card issuance company; a service system 110, which constitutes the center of a communication network that connects together the mobile user terminal 100, the gate terminal 101, the merchant terminals 102 and 103, the automatic vending machine 14, the switching center 105, the transaction processing system 106, the ticket issuing system 107, the payment card issuing system 108 and the telephone card issuing system 109, and which provides a mobile electronic commerce service; a digital public line network 111, which provides a data transmission path for the network; a wireless telephone base station 112, which connects the mobile user terminal 100 to the switching center 105; a wireless telephone base station 113, which connects the merchant terminal 103 to the digital public line network 111; a wireless telephone base station 114, which connects the automatic vending machine 104 to the digital public line network 111; and a destination telephone terminal 115, which is connected to the digital public line network 111 when in use.

The mobile user terminal 100 is a portable, wireless telephone terminal that has two types of bi-directional wireless communication functions, infrared communication and digital wireless telephone communication; an electronic ticket function; an electronic payment card function; an electronic telephone card function; and an electronic credit card function.

The merchant terminal 103 and the automatic vending machine 104 also have two types of bi-directional wireless communication functions. And the gate terminal 101 and the merchant terminal 102 also have the two types of bi-directional communication functions, infrared communication and digital wireless telephone communication.

The base station 112 has a function, for which a control channel extending to the mobile user terminal 100 is employed, involving the transmission of settlement information that is exchanged by the mobile user terminal 100 and the switching center 105.

The telephone terminal 115 is an arbitrary telephone terminal to which a connection can be made across the digital public line network 111, and can be either a fixed telephone terminal or a mobile wireless telephone terminal.

In FIG. 1, reference numeral 116 denotes a transmission path for digital wireless telephone communication between the mobile user terminal 100 and the base station 112; 117, a digital communication line for connecting the base station 112 to the switching center 105; 118, a digital communication line for connecting the switching center 105 and the digital public line network 111; 119, a transmission path for infrared communication conducted between the mobile user terminal 100 and the gate terminal 101; 120, a digital telephone communication line for connecting the gate terminal 101 and the digital public line network 111; 121, a transmission path for infrared communication conducted between the mobile user terminal 100 and the merchant terminal 102; 122, a digital telephone communication line for connecting the merchant 102 and the digital public line network 111; 123, a transmission path for infrared communication conducted between the merchant terminal 103 and the base station 113; 125, a digital communication line for connecting the base station 113 to the digital public line network 111; 126, a transmission path for infrared communication conducted between the mobile user terminal 100 and the automatic vending machine 104; 127, a transmission path for digital wireless communication conducted between the automatic vending machine 104 and the base station 114; 128, a digital communication line for connecting the base station 114 to the digital public line network 111; 129, a telephone communication line for connecting the telephone terminal 115 to the digital public line network 111; 130, a digital communication line for connecting the digital public line network 111 to the service system 110; 131, a digital communication line for connecting the service system 110 and the transaction processing system 106; 132, a digital communication line for connecting the service system 110 and the ticket issuing system 107; 133, a digital communication line for connecting the service system 110 and the payment card issuing system 108; and 134, a digital communication line for connecting the service system 110 and the telephone card issuing system 109. Through multiplexing, the digital communication lines 130 to 134 especially can serve as multiple communication lines.

The following system is employed as the normal operating system for the mobile electronic commerce service.

The transaction processing system 106 is installed at a credit card company, a bank, or a settlement processing company. The ticket issuing system 107 is installed at an event company or a ticket issuance company. The payment card issuing system 108 is installed at a retail sale company or a payment card issuance company. The telephone card issuing system 109 is installed at a wireless telephone communication company or a telephone card issuance company.

The gate terminal 101 is installed at the entrance to a movie theater or to an event hall, and the merchant terminal 102 is installed at a cash register counter in a retail shop. The merchant terminal 103 is carried by a sales clerk or a person in charge of collecting money, and the mobile user terminal 100 is carried by a consumer. The service system 110 is installed at a company that provides the mobile electronic commerce service.

Further, the following relationship is assumed as constituting a social relationship among the individual devices that form the mobile electronic commerce system and among the owners of the individual systems.

A consumer who owns a mobile user terminal 100 enters into a credit service membership contract with a credit card company or a bank, a mobile electronic commerce service membership contract with a company that provides the mobile electronic commerce service, and a wireless telephone communication service contract with a wireless telephone communication company.

The owner of the gate terminal 101, for example, a manager of a movie theater or an event hall, has entered into a contract with the owner of the ticket issuing system 107 for handling tickets issued by the ticket issuing system, a mobile electronic commerce service member store contract with a company that provides the mobile electronic commerce service, and a digital telephone communication service contract with a telephone communication company. The owner of the gate terminal 101 may be the same individual who owns the ticket issuing system 107.

The retail shop that owns the merchant terminal 102 has entered into a contract with the owner of the payment card issuing system 108 for the handling of the payment cards issued by the payment card issuing system, a credit card member store contract with a credit card company or a bank, a mobile electronic commerce service member store contract with a company that provides the mobile electronic commerce service, and a digital telephone communication service contract with a telephone communication company. The owner of the merchant terminal 102 may be the same individual who owns the payment card issuing system 108.

The owner of the merchant terminal 103 has entered into a contract with the owner of the payment card issuing system 108 for the handling of the payment cards issued by the payment card issuing system, a credit card member store contract with a credit card company or a bank, a mobile electronic commerce service member store contract with a company that provides the mobile electronic commerce service, and a digital telephone communication service contract with a telephone communication company. The owner of the merchant terminal 103 may be the same individual who owns the payment card issuing system 108.

The owner of the automatic vending machine 104 has entered into a contract with the owner of the payment card issuing system 108 for the handling of the payment cards issued by the payment card issuing system, a mobile electronic commerce service member store contract with a company that provides the mobile electronic commerce service, and a digital telephone communication service contract with a telephone communication company. The owner of the automatic vending machine 104 may be the same individual who owns the payment card issuing system 108.

The wireless telephone communication company, which is the owner of the switching center 105, has entered in a contract with the owner of the telephone card issuing system 109 for the handling of the telephone cards issued by the telephone card issuing system, and a mobile electronic commerce service member store contract with a company that provides the mobile electronic commerce service. The wireless telephone communication company may be the owner of the telephone card issuing system 109.

The owner of the ticket issuing system 107 enters into a credit service member store contract with a credit card company or a bank, a mobile electronic commerce service ticket issuer contract with a company that provides the mobile electronic commerce service, and a digital communication service contract with a communication service company. The company that provides the mobile electronic commerce service may own the ticket issuing system 107.

The owner of the payment card issuing system 108 enters into a credit service member store contract with a credit card company or a bank, a mobile electronic commerce service ticket issuer contract with a company that provides the mobile electronic commerce service, and a digital communication service contract with a communication service company. The company that provides the mobile electronic commerce service may own the payment card issuing system 108.

The owner of the telephone card issuing system 109 has entered into a credit service member store contract with a credit card company or a bank, a mobile electronic commerce service ticket issuer contract with a company that provides the mobile electronic commerce service, and a digital communication service contract with a communication service company. The company that provides the mobile electronic commerce service may own the telephone card issuing system 109.

The company that provides the mobile electronic commerce service has entered into a contract with one or more credit card companies, or banks acting for the credit card companies, or a bank to issue electronic credit cards (bank cards) and to provide a credit card service for a member store who has entered into a contract for the credit service. The mobile electronic commerce service company also has entered into a contract with the owner of the ticket issuing system 107 to act for the ticket issuing system and to issue electronic tickets and to provide a ticket card service; has entered into a contract with the owner of the payment card issuing system 108 to act for the payment card issuing system and to issue electronic payment cards and to provide a payment settlement service; and has entered into a contract with the owner of the telephone card issuing system 109 to act for the telephone card issuing system and to issue electronic telephone cards and to provide a wireless telephone payment settlement service.

To perform credit settlements using the transaction processing system 106, the settlement processing company has entered into a contract with one or more credit card companies or banks to act for them and to perform the credit settlements.

When the transaction processing system used to perform credit settlements differs from that for credit cards, a plurality of transaction processing systems having the same form as the transaction processing system 106 in FIG. 1 are connected to the service system 110 via digital communication lines.

Similarly, when the ticket issuing system differs, depending on the ticket type, a plurality of ticket issuing systems having the same form as the ticket issuing system 107 in FIG. 1 are connected to the service system 110 via digital communication lines. Also, when the payment card issuing system differs, depending on the payment card type, a plurality of payment card issuing systems having the same form as the payment card issuing system 108 in FIG. 1 are connected to the service system via digital communication lines. And when the telephone card issuing system differs, depending on the telephone card type, a plurality of telephone card issuing systems having the same form as the telephone card issuing system 109 in FIG. 1 are connected to the service system 110 via digital communication lines.

In order to simplify the following explanation of the system of the present invention, a consumer who owns a mobile user terminal 100 is called a user; a person who owns a merchant terminal 103 or an automatic vending machine 104 for the provision and sale of products and services is called a merchant; a wireless telephone communication company that owns a switching center 105 and provides a wireless telephone communication service is called a communication service provider; a company that owns a service system 110 and provides a mobile electronic commerce service is called a service provider; a credit card company or a settlement processing company that owns a transaction processing system 106 and performs a credit settlement process is called a transaction processor; a person who owns a ticket issuing system 107 and sells tickets is called a ticket issuer; a person who owns a payment card issuing system 108 and sells payment cards is called a payment card issuer; and a person who owns a telephone card issuing system 109 and sells telephone cards is called a telephone card issuer.

The mobile electronic commerce services that are provided by the system of this invention are generally broken down into four main types: an electronic ticket service, an electronic payment card service, an electronic telephone card service and an electronic credit card service.

The electronic ticket service is a complete electronic service for the vending of a ticket via a network, the delivery of a ticket that is accomplished subsequent to its purchase, and the use of the ticket.

Specifically, a user employs the mobile user terminal 100 to purchase a ticket from the ticket issuing system 107. The user receives, from the service system, an electronic ticket consisting of electronic information, and stores and manages the ticket in the mobile user terminal.

Then, to use the electronic ticket stored in the mobile user terminal the user presents the mobile user terminal to the gate terminal 101, whereat the electronic ticket information is extracted and examined.

The electronic payment card service is a complete electronic service for the vending of a payment card via a network, the delivery of a payment card that is accomplished subsequent to its purchase, and a charge settlement process performed with the payment card.

Specifically, a user, through the service system 110, employs the mobile user terminal 100 to purchase a payment card from the payment card issuing system 108. Thereafter, the user receives, from the service system, an electronic payment card consisting of electronic information, and stores and manages it in the mobile user terminal. To use the electronic payment card, while in communication with the merchant terminal 102 (or the merchant terminal 103 or the automatic vending machine 104) the user presents the mobile user terminal, in which the electronic payment card is stored, to the merchant terminal 102, and charge settlement information provided by the electronic payment card is extracted in order to perform a charge settlement process.

The electronic telephone card service is a complete electronic service for the vending of a telephone card via a network, the delivery of a telephone card that is accomplished subsequent to its purchase, and the use of the telephone card to settle a charge incurred through wireless telephone communication.

Specifically, a user, through the service system 110, employs the mobile user terminal 100 to purchase a telephone card from the telephone card issuing system 109. Thereafter, the user receives, from the service system, an electronic telephone card consisting of electronic information, and stores and manages it in the mobile user terminal. To use the electronic telephone card, while in communication with the switching center 105 the user presents the mobile user terminal, in which the electronic telephone card is stored, and information is extracted to settle a charge for wireless telephone communication incurred while the electronic telephone card is in use.

The electronic credit card service is a complete electronic service for which a credit card is used to settle the cost of a ticket, a payment card, or a telephone card that is purchased via a network, and to settle charges incurred at a normal retail shop.

Specifically, an electronic credit card, which consists of electronic information, is stored in advance and managed in the mobile user terminal 100 and the service system 110. When a user purchases a ticket, a payment card or a telephone card using the service system, through the exchange of data with the transaction processing system 106 the service system presents the card number of the credit card that is designated by the user, and provides credit settlement information to be used to perform a credit settlement process for the purchase cost. To perform a credit settlement process with the merchant terminal 102 (or the merchant terminal 103) at a retail shop, settlement information is exchanged by the mobile user terminal and the merchant terminal 102 (or the merchant terminal 103), by the merchant terminal 102 (or the merchant terminal 103) and the service system 110, and by the service system 110 and the mobile user terminal 100. Also, through data communication with the transaction processing system 106, the service system 110 presents the card number of the credit card designated by the user and provides the credit settlement information required to settle an accessed charge.

A detailed explanation will be given later for the electronic ticket service, the electronic payment card service, the electronic telephone card service and the electronic credit card service.

For these four services, transmission paths or communication lines are constantly employed for data communication by the individual devices of the system.

First, the mobile user terminal 100 uses a digital wireless telephone to communicate with the switching center 105 via the transmission path 116, the base station 112 and the digital communication line 117, and with the service system 110 via the digital communication line 118, the digital public line network 111 and the digital communication line 130; and uses infrared communication to communicate with the gate terminal 101 via the transmission path 119, with the merchant terminal 102 via the transmission path 121, with the merchant terminal 103 via the transmission path 123, and with the automatic vending machine 104 via the transmission path 126.

The gate terminal 101 employs digital telephone communication to communicate with the service system 110 via the digital telephone communication line 120, the digital public line network 111 and the digital communication line 130.

The merchant terminal 102 employs digital telephone communication to communicate with the service system 110 via the digital telephone communication line 122, the digital public line network 111 and the digital communication line 130.

The merchant terminal 103 employs digital telephone communication to communicate with the service system 110 via the transmission path 124, the base station 113, the digital communication line 125, the digital public line network 111 and the digital communication line 130.

The automatic vending machine 104 employs digital telephone communication to communicate with the service system 110 via the transmission path 127, the base station 114, the digital communication line 128, the digital public line network 111 and the digital communication line 130.

Digital data are exchanged by the service system 110 and the transaction processing system 106 via the digital communication line 131, by the service system 110 and the ticket issuing system 107 via the digital communication line 132, by the service system 110 and the payment card issuing system 108 via the digital communication line 133, and by the service system 110 and the telephone card issuing system 109 via the digital communication line 134.

All the information to be exchanged is first encrypted and is then exchanged through communication conducted between the mobile user terminal 100 and the service system 110, between the gate terminal 101 and the service system 110, between the merchant terminal 102 and the service system 110, between the merchant terminal 103 and the service system 110, between the automatic vending machine 104 and the service system 110, between the switching center 105 and the service system 110, between the service system 110 and the transaction processing system 106, between the service system 110 and the ticket issuing system 107, between the service system 110 and the payment card issuing system 108, and between the service system 110 and the telephone card issuing system 109. A secret key and a public key are employed for encrypting the information, and the encrypted information is electronically closed and transmitted.

In this system, an electronic ticket, an electronic payment card, or an electronic telephone card stored in the mobile user terminal 100 can be transferred to a different user who owns a mobile user terminal. With this function, multiple tickets can be purchased and transferred to friends, etc., or an electronic payment card or an electronic telephone card can be provided as a gift, so that the usage range can be expanded.

Figure 2A:
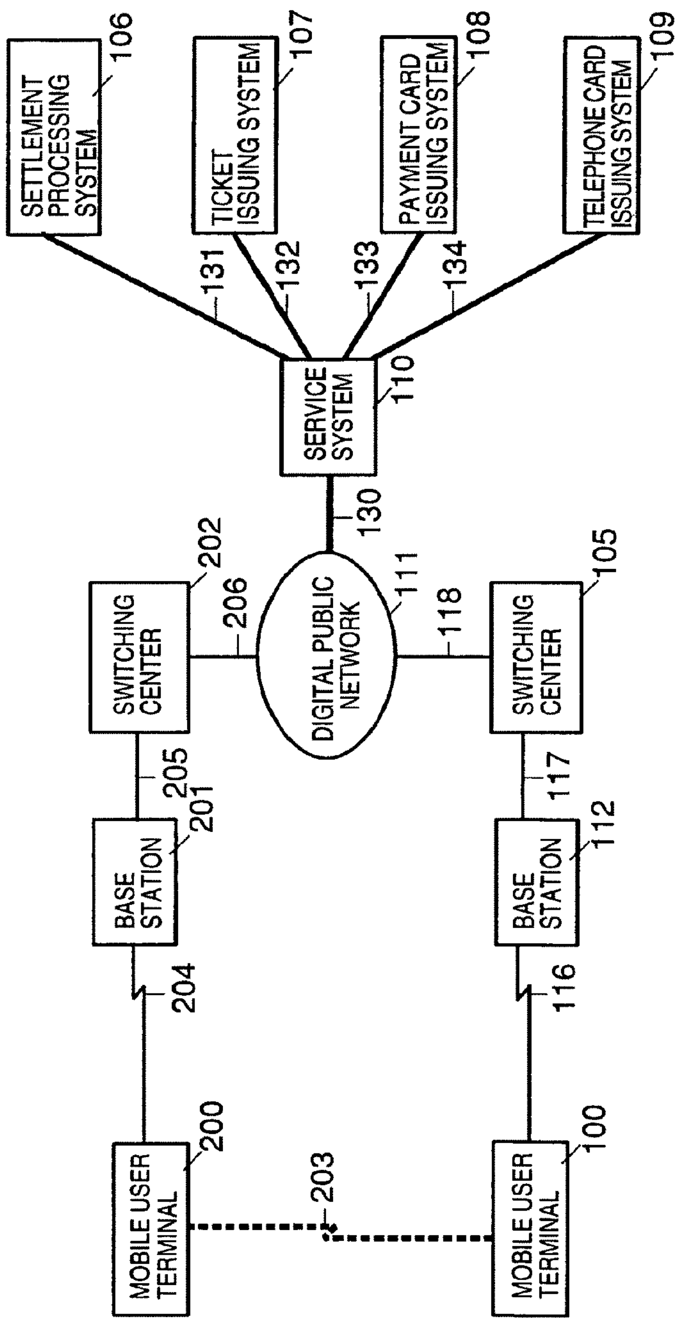
FIG. 2A is a diagram for explaining a transfer function according to the embodiment of the present invention.

In FIG. 2A is shown the system configuration where an electronic ticket, an electronic payment card or an electronic telephone card is transferred between mobile user terminals 100 and 200.

Figure 2B:
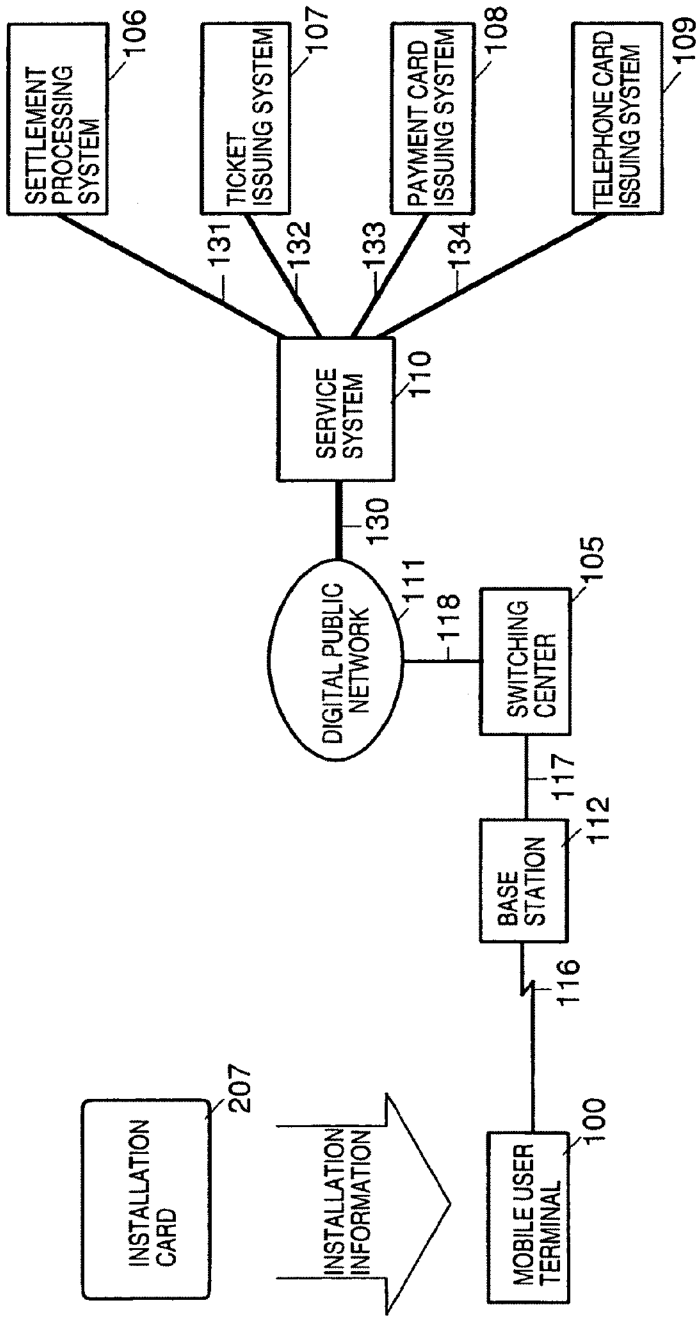
FIG. 2B is a diagram for explaining the function of an installed card according to the embodiment of the present invention.

In FIG. 2, reference numeral 203 denotes a transmission path used for infrared communication between the mobile user terminals 100 and 200. The mobile user terminal 200 is connected to the digital public line network 111 via a base station 201 for a digital wireless telephone, a digital communication line 205, a switching center 202 for a digital wireless telephone, and a digital communication line 206.

Basically, transfer information is exchanged by the mobile user terminals 100 and 200 when transferring an electronic ticket, an electronic payment card or an electronic telephone card. For the exchange of transfer information, infrared communication or digital wireless telephone communication is employed by the mobile user terminals 100 and 200. Generally, when the user of the mobile user terminal 100 and the user of the mobile user terminal 200 are very near each other (within a distance of approximately 1 meter), infrared communication is employed for a transfer process. But when the two users are distant from each other, digital wireless telephone communication is employed for the transfer process.

To perform the transfer process by employing digital wireless telephone communication, the mobile user terminal 100 communicates with the mobile user terminal 200 via the transmission path 116, the base station 112, the digital communication line 117, the switching center 105, the digital communication line 118, the digital public line network 111, the digital communication line 206, the switching center 202, the digital communication line 205, the base station 201 and the transmission path 204.

Actually, the base station 112 and the base station 201, or the switching center 105 and the switching center 202, may be identical to each other in accordance with the geographical positional relationship existing between the mobile user terminals 100 and 200.

A detailed explanation will be given later for the transfer process employed for an electronic ticket, an electronic payment card or an electronic telephone card.

In this system, an electronic payment card, an electronic telephone card or an electronic ticket can be procured as a common retail purchase for installation in the mobile user terminal 100.

Specifically, an installation card 207 (see FIG. 2B) made of a comparatively low cost material, such as paper, plastic or vinyl chloride, is employed as a distribution medium for the electronic payment card, the electronic telephone card or the electronic ticket.

For an electronic payment card, for example, the payment card issuer issues an installation card 207 on which is printed identification information (installation information) for a payment card to be issued, and makes the installation card 207 available for sale at a retail sales outlet, such as a convenience store or a kiosk at a station. When a user purchases an installation card or receives one as a gift, he or she employs the mobile user terminal 100, through the service system 110, to request that the payment card issuing system 108 install the electronic payment card. The user then receives the electronic payment card from the service system and installs the electronic payment card in the mobile user terminal 100.

Similarly, for an electronic telephone card, the telephone card issuer issues an installation card 207 on which identification information (installation information) for a telephone card to be issued is printed, and makes the installation card 207 available for sale at a retail sales outlet. When a user purchases an installation card or receives one as a gift, he or she employs the mobile user terminal 100, through the service system 110, to request that the telephone card issuing system 109 install the electronic telephone card. The user then receives the electronic telephone card from the service system and installs the electronic telephone card in the mobile user terminal 100.

In the same manner, for an electronic ticket, the ticket issuer issues an installation card 207 on which identification information (installation information) for a ticket to be issued is printed, and makes the installation card 207 available for sale at a retail sales outlet, such as a convenience store or a theater ticket agency. When a user purchases the installation card or receives it as a gift, he or she employs the mobile user terminal 100, through the service system 110, to request that the ticket issuing system 107 install the electronic ticket. The user then receives the electronic ticket from the service system and installs the electronic telephone card in the mobile user terminal 100.

The merits of an installation card are that no communication fee is required to purchase an electronic payment card, an electronic telephone card or an electronic ticket, and that actually the installation card can be held in one's hand. In particular, the demand for the installation card for the electronic payment card or for the electronic telephone card can be increased as a gift or a collection item, and this results in the expansion of the range of the usage of the electronic payment card and the electronic telephone card. In addition, the installation card for the electronic ticket adequately provides for the purchase non-seat-reserved tickets, such as those for movies and art exhibitions.

A detailed explanation of the installation process will be given later using the installation card for the electronic payment card, the electronic telephone card or the electronic ticket.

The individual components of the system will now be described.

First, the mobile user terminal 100 will be described.

Figures 3A, 3B, 3C:
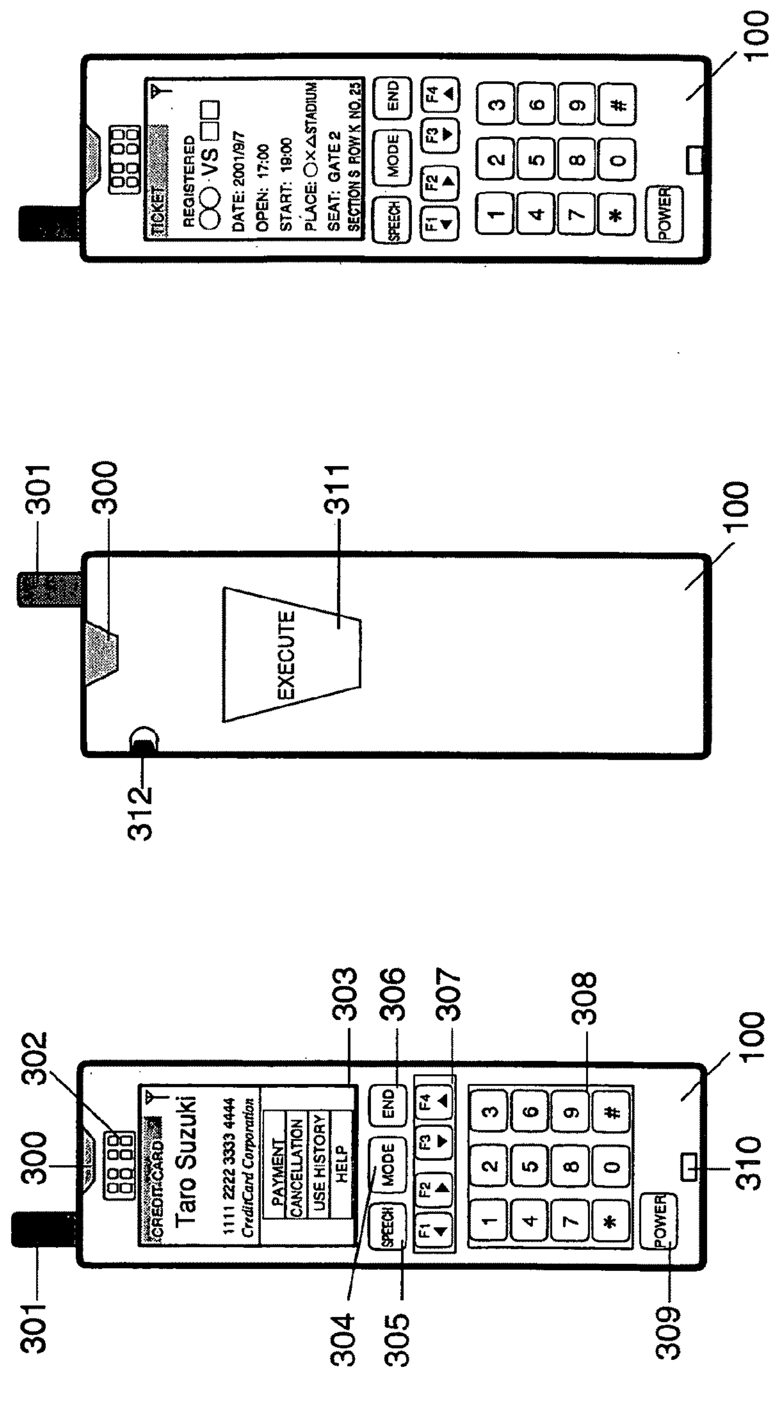
FIG. 3A is a schematic front view of a mobile user terminal in a credit card mode according to the embodiment of the present invention.
FIG. 3B is a schematic rear view of a mobile user terminal in a credit card mode according to the embodiment of the present invention.
FIG. 3C is a schematic front view of a mobile user terminal in a ticket mode according to the embodiment of the present invention.

FIGS. 3A and 3B are a front view and a rear view of the mobile user terminal 100.

In FIG. 3A, reference numeral 300 denotes an infrared communication port (infrared communication module) used when engaging in infrared communication with the merchant terminal 101; 301, an antenna for receiving and transmitting radio signals for a digital wireless telephone; 302, a receiver loudspeaker; 303, a 120×160 pixel color liquid crystal display (LCD); 304, a mode switch for changing the operating mode of the mobile user terminal 100; 305, a speech switch for the digital wireless telephone; 306, an end switch for the digital wireless telephone; 307, a function switch; 308, number key switches; 309, a power switch; and 310, a microphone.

In FIG. 3B, reference numeral 311 denotes an execution switch used to permit processing when confirmation by a user is required, such as confirmation of the payment of a quoted price and confirmation of the terms agreed to for a settlement; and 312, a headphone jack used for connecting a headphone set.

The mobile user terminal 100 has six operating modes: a digital wireless telephone mode, a telephone card mode, a payment card mode, a credit card mode, a ticket mode, and a personal information management mode. The mode switch 304 is used to select these modes.

Figure 3D:
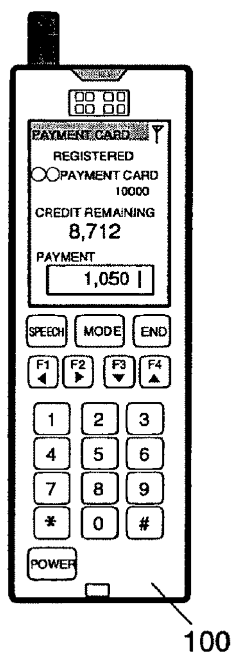
FIG. 3D is a schematic front view of a mobile user terminal in a payment card mode according to the embodiment of the present invention.

In FIGS. 3A, 3C, 3D and 3E are shown the respective screens displayed on the LCD 303 in the credit card mode, the ticket mode, the payment card mode and the telephone card mode. In FIGS. 3F, 3G and 3H are shown other example screens displayed on the LCD 303 in the ticket mode, the payment card mode and the telephone card mode. While in FIGS. 3A, 3C, 3D and 3E only characters are displayed on the screens, in FIGS. 3F, 3G and 3H image information, such as the images 313, 314 and 315, is also displayed. In the electronic ticket mode, as in the other modes, the image information is included in the representative component information for an electronic ticket program, which will be described later while referring to FIGS. 19, 20 and 21.

In the digital wireless telephone mode, the mobile user terminal 100 serves as a digital wireless telephone based on the contract with the communication service provider that provides the digital wireless telephone service. In the telephone card mode, the mobile user terminal 100 serves as a digital wireless telephone that employs the electronic telephone card for the payment of a communication charge. Further, the mobile user terminal 100 serves as an electronic payment card in the payment card mode, serves as an electronic credit card in the credit card mode, and serves as an electronic ticket in the ticket mode.

The personal information management mode is the operating mode used for managing the personal information for a user that is stored in the mobile user terminal 100. In the personal information management mode, the user refers to the personal information and portrait data that are stored, and sets the user setup information.

Multiple payment cards, telephone cards and electronic tickets can be registered in the mobile user terminal 100 using the purchase and transfer process available on the network, or during the installation process using the installation card.

The electronic credit card is registered in the mobile user terminal 100 on the assumption that a subject user is a party to a membership contract for credit servicing entered into with a credit card company. When a subject user is a party to multiple credit service membership contracts, multiple credit cards are registered in the mobile user terminal 100.

When, for example, a user places a call using the mobile user terminal 100, first, he or she manipulates the mode switch 304 and sets the operating mode to the digital wireless telephone mode. Then, the user enters a phone number using the number key switches 308 and depresses the speech switch 305. By employing the above operation, the user can place a call to a destination corresponding to the telephone number that was entered.

To receive a call at the mobile user terminal 100, the mobile user terminal 100 generates a call reception tone, regardless of the current operating mode. Then, the operating mode can be automatically changed to the digital wireless telephone mode simply by the depression of the speech switch 305 and the user can answer the call.

Figure 3E:
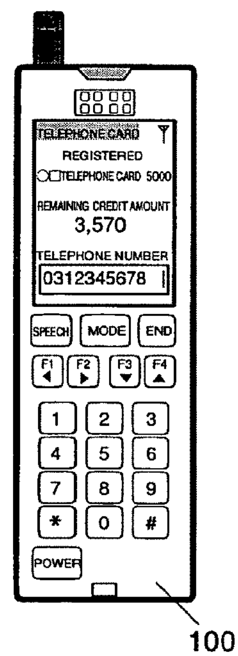
FIG. 3E is a schematic front view of a mobile user terminal in a telephone card mode according to the embodiment of the present invention.
Figure 3F:
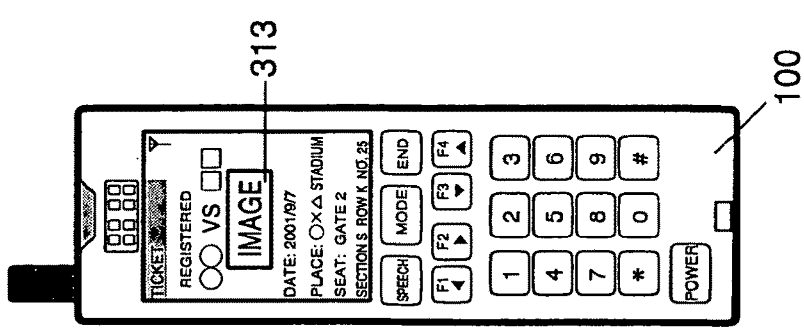
FIG. 3F is a schematic front view of a mobile user terminal in the ticket mode according to a modification of the embodiment of the present invention.
Figure 3G:
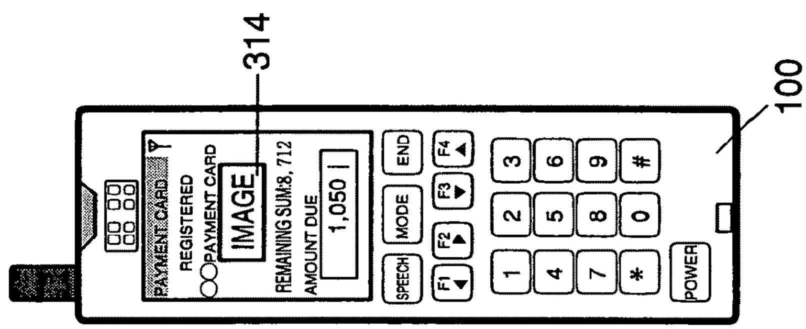
FIG. 3G is a schematic front view of a mobile user terminal in the payment card mode according to a modification of the embodiment of the present invention.
Figure 3H:
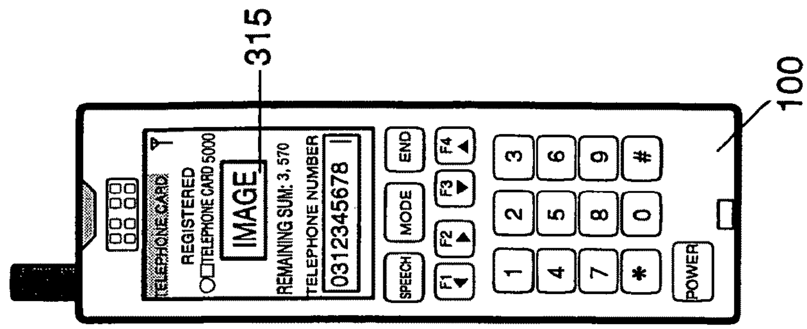
FIG. 3H is a schematic front view of a mobile user terminal in the telephone card mode according to a modification of the embodiment of the present invention.

To place a call using the electronic telephone card, first, a user sets the operating mode to the telephone card mode by manipulating the mode switch 304, and employs the function switch 307 (F1 or F2) to select an electronic telephone card to be used to make the payment for the communication charge (to display on the LCD the electronic telephone card to be used for the payment: see FIG. 3E). Then, the user enters the telephone number using the number key switches 308 and depresses the speech switch 305. By employing this operation, the user can place a call to the destination that corresponds to the telephone number that was entered, while the communication charge is subtracted from the credit total held by the electronic telephone card.

To pay a quoted price using the electronic payment card, first, the user manipulates the mode switch 304 to set the operating mode to the payment card mode, and employs the function switch 307 (F1 or F2) to select a payment card to be used for the payment (to display on the LCD the electronic payment card to be used for the payment: see FIG. 3D). Then, the user enters the payment value using number key switches 308 and depresses the execution switch 311, while directing the infrared communication port 300 toward the merchant terminal 102 of the merchant (or the merchant terminal 103 or the automatic vending machine 104). Through this operation, the mobile user terminal 100 is enabled to engage in infrared communication with the merchant terminal 102 (or the merchant terminal 103 or the automatic vending machine 104), and can exchange settlement information for setting the terms for the payment to be made using the electronic payment card.

To pay a quoted price to a merchant using credit, first, a user manipulates the mode switch 304 to set the operating mode to the credit card mode, and then employs the function switch 307 (F1 or F2) to select a credit card to be used for payment (to display on the LCD the electronic credit card to be used for the payment: see FIG. 3A). Then, the user enters the amount of the payment using the number key switches 308 and depresses the execution switch 311, while directing the infrared communication port 300 toward the merchant terminal 102 of the merchant (or the merchant terminal 103). Through this operation, the mobile user terminal 100 is enabled to engage in infrared communication with the merchant terminal 102 (or the merchant terminal 103). The mobile user terminal also participates in digital wireless telephone communication with the service system 100 and transmits the settlement information for credit clearance.

To present an electronic ticket for electronic ticket examination, first, a user manipulates the mode switch 304 to set the operating mode to the ticket mode, and employs the function switch 307 (F1 or F2) to select a ticket to be presented (to display on the LCD the electronic ticket to be used: see FIG. 3C). Then, the user depresses the execution switch 311, while directing the infrared communication port 300 toward the gate terminal 101 that is installed at the entrance to a movie theater or an event hall. Through this operation, the mobile user terminal 100 is enabled to engage in infrared communication with the gate terminal 101, and to provide information for the examination of the electronic ticket.

A detailed explanation will be given later to describe the internal structure and the operation of the mobile user terminal 100.

The gate terminal 101 will now be explained.

Figure 4:
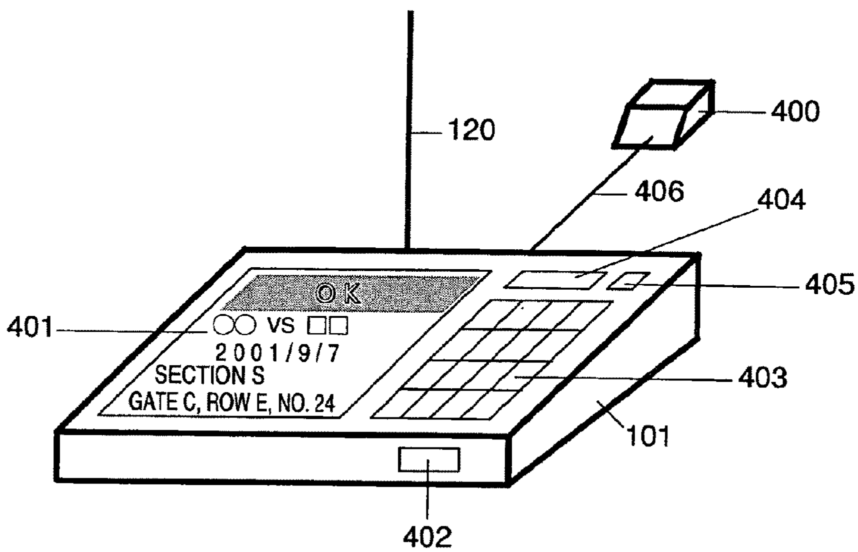
FIG. 4 is a schematic diagram illustrating a gate terminal according to the embodiment of the present invention.

FIG. 4 is a diagram showing the external appearance of the gate terminal 101. In FIG. 4, reference numeral 400 denotes an infrared communication module for infrared communication with a mobile user terminal 100; 401, a 6440×480 pixel touch panel liquid crystal display (touch panel LCD); 402, a power switch; 403, number key switches; 404, a menu switch for changing the display on the touch panel LCD 401 to the menu screen; 405, a lock switch for locking the display on the touch panel LCD 401 and the operation of the gate terminal; and 406, a serial cable used to connect the infrared module 400 to the gate terminal. In addition, at the rear of the gate terminal an RS-232C interface is provided for the connection of an external device, such as a gate opening/closing device.

The gate terminal 101 has two primary operating modes: a ticket examination mode for examining an electronic ticket and a ticket setup mode for setting up an electronic ticket to be examined. To change the operating mode of the gate terminal 101, the menu switch 404 is depressed, which changes the display on the tough panel LCD 401 to the menu screen, and a mode is selected by touching the screen.

In the ticket examination mode, the gate terminal 101 waits until, using infrared communication, an electronic ticket is presented. When a user employs the mobile user terminal 100 to present an electronic ticket, the gate terminal 101 examines that electronic ticket, exchanges examination information with the mobile user terminal, and displays the results on the screen. The operator (merchant) of the gate terminal permits or bars the entry of the user in accordance with the results displayed on the screen. When a gate opening/closing device is connected as an external device, the gate is opened or closed in accordance with the results of the examination.

The lock switch 405 is used when the operator (merchant) leaves the gate terminal 101. The operator locks the screen display and the operation of the gate terminal to prevent the illegal operation of the gate terminal. Once the gate terminal has been locked using the lock switch, it can not be unlocked until a password that was set previously is entered.

In the ticket setup mode, when code information for designating an electronic ticket is entered using the number key switches 403, a program module (ticket examination module) for examining the designated electronic ticket is downloaded from the service system 100, and the electronic ticket to be examined is set up.

A detailed explanation of the internal structure and the operation of the gate terminal 101 will be given later.

The merchant terminal 102 will now be described.

Figure 5:
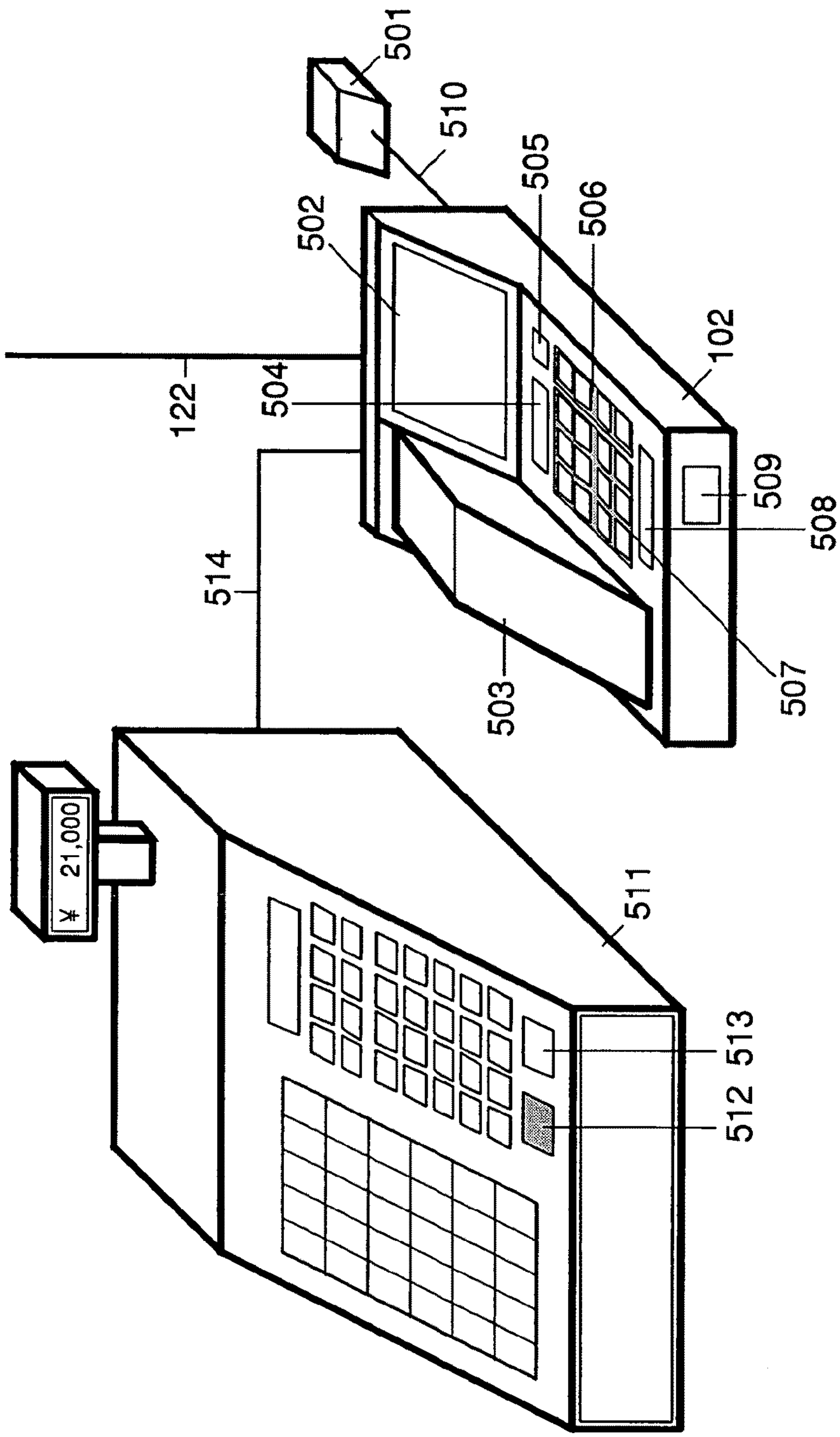
FIG. 5 is a schematic diagram illustrating a merchant terminal according to the embodiment of the present invention.

FIG. 5 is a diagram showing the external appearance of the merchant terminal 102 when, for calculating the price of a product, it is connected by an RS-232C cable 514 to a cash register 511.

In FIG. 5, reference numeral 501 denotes an infrared communication module for engaging in infrared communication with the mobile user terminal 100; 502, a 320×240 pixel color liquid crystal display (LCD); 503, a telephone handset; 504, a mode switch used for changing the operating mode of the merchant terminal 102; 506, a function switch; 507, number key switches; 508, an execution switch for permitting the execution of processing for which confirmation by the merchant is required, such as confirmation of the terms of a settlement and confirmation of the reference results obtained; 509, a power switch; 512, a payment card settlement switch for the cash register 511 for designating a settlement process using a payment card; and 513, a credit settlement switch for designating a the settlement process using credit.

The merchant terminal includes three operating modes: a digital telephone mode, a merchant mode and a merchant information management mode. These modes are changed by manipulating the mode switch 504. The merchant terminal 102 serves as a digital telephone in the digital telephone mode, and as a settlement terminal for an electronic payment card and electronic credit card in the merchant mode. The merchant information management mode is the operating mode for managing merchant information that is stored in the merchant terminal 102. In the merchant information management mode, the merchant refers to the stored merchant information and sets merchant setup information.

To make a call from the merchant terminal 102, first, the operator (merchant) of the merchant terminal manipulates the mode switch 304 and sets the operating mode to the digital telephone mode, and then enters a phone number using the number key switches 507. Through the above operation, the operator (merchant) can place a call to a destination corresponding to the telephone number that was entered.

To receive a call at the merchant terminal 102, the merchant terminal 102 generates a call reception tone, regardless of the current operating mode. Then, simply by raising the telephone handset 503 or depressing the hook switch 505 the operating mode is automatically changed to the telephone mode and the operator (merchant) can answer the call, To perform the settlement process, first, the operator (merchant) of the merchant terminal calculates the total charge by adding the price of a product and the tax and transmits it to the user. When the user desires to employ the electronic payment card to make the payment, the operator depresses the payment card settlement switch 512 on the cash register 511. When the user desires to employ the electronic credit card to make the payment, the operator depresses the credit card settlement switch 513 and waits for the user to perform the payment operation at the mobile user terminal 100.

For the electronic payment card, when the user has performed the payment operation, a message indicating completion of the settlement preparation is displayed on the LCD 502. At this time, the merchant terminal 102 uses infrared communication to exchange settlement information with the mobile user terminal 100, and performs the settlement process using the electronic payment card.

For the electronic credit card, when the user performs the payment operation, a payment amount entered by the user is displayed on the LCD 502, and then the credit authorization results obtained for the user are displayed. The operator (merchant) confirms the contents and depresses the execution switch 508. Then, a message indicating completion of the settlement setup is displayed on the LCD 502. At this time, the merchant terminal 102 exchanges settlement information with the mobile user terminal 100 and the service system 110, and performs the settlement process using the electronic credit card.

A detailed explanation of the internal structure and the operation of the merchant terminal 102 will be given later.

The merchant terminal 103 will now be described.

Figure 6A:
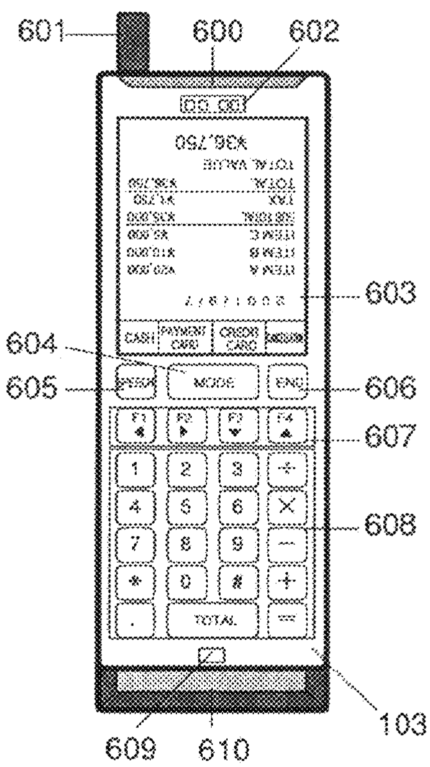
FIGS. 6A and 6B are schematic diagrams showing merchant terminals (digital wireless telephone type) according to the embodiment of the present invention.
Figure 6B:
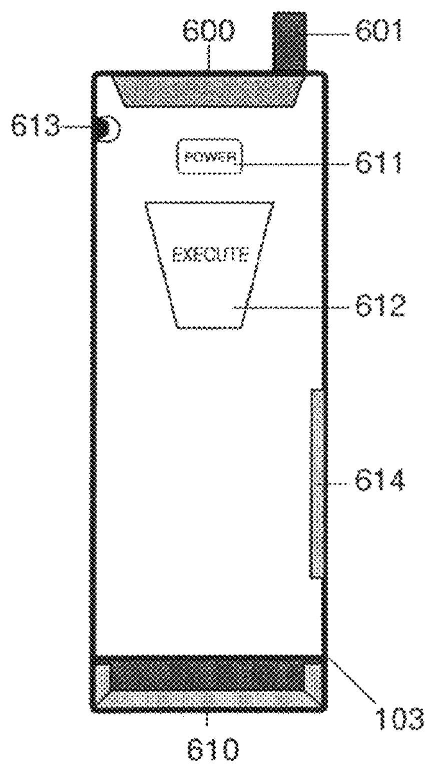

FIGS. 6A and 6B are a front view and a rear view of the merchant terminal 103.

In FIG. 6A, reference numeral 600 denotes an infrared communication port (infrared communication module) used when engaging in infrared communication with the mobile user terminal 100; 601, an antenna for receiving and transmitting radio signals for a digital wireless telephone; 602, a receiver loudspeaker; 603, a 180×240 pixel color liquid crystal display (LCD); 604, a mode switch for changing the operating mode of the merchant terminal 103; 605, a speech switch for the digital wireless telephone; 606, an end switch for the digital wireless telephone; 607, function switches; 608, number key switches; 609, a microphone; and 610, a bar code reader.

In FIG. 6B, reference numeral 611 denotes a power switch; 612, an execution switch for permitting the execution of processing that requires the confirmation of the merchant, such as confirmation of the terms of a settlement and confirmation of the results of a credit authorization process; 613, a headphone jack used to connect a headphone set; and 614, a card slot into which is inserted a memory card on which product information is recorded.

The merchant terminal 103 has three operating modes: a digital wireless telephone mode, a merchant mode, and a merchant information management mode. These modes are changed by manipulating the mode switch 604. The merchant terminal 103 serves as a digital wireless telephone in the digital wireless telephone mode, and as a settlement terminal for an electronic payment card and as an electronic credit card in the merchant mode. The merchant information management mode is the operating mode used for managing merchant information that is stored in the merchant terminal 103. In the merchant information management mode, the merchant refers to the stored merchant information and sets merchant setup information.

To make a call from the merchant terminal 103, first, the operator (merchant) of the merchant terminal manipulates the mode switch 604 to set the operating mode to the digital telephone mode and enters a phone number using the number key switches 608. Through the above operation, the operator (merchant) can place a call to a destination corresponding to the telephone number that was entered.

To receive a call at the merchant terminal 103, regardless of the current operating mode, the merchant terminal 102 generates a call reception tone. Then, the operating mode is automatically changed to the telephone mode simply by the depression of the speech switch 605 and the operator (merchant) can answer the call.

To perform the settlement process, first, the operator (merchant) of the merchant terminal manipulates the mode switch 604 to set the operating mode to the merchant mode. The operator reads the bar code for a product using the bar code reader 610, and depresses the total switch in the number key switches 608 to calculate the total charge. The operator depresses the total switch again to display the results upside down on the LCD 603, so that the total charge is transmitted and is also provided for the user. When the user desires to make payment using the electronic payment card, the operator depresses the F2 switch of the function switches 607. When the user desires to make payment using the electronic credit card, the operator depresses the F3 switch and waits for the user to perform the payment operation at the mobile user terminal 100.

For the electronic payment card, when the user has performed the payment operation, a message indicating the completion of the settlement preparation is displayed on the LCD 603. At this time, the merchant terminal 103 exchanges settlement information with the mobile user terminal 100 by using infrared communication, and performs the settlement process using the electronic payment card.

For the electronic credit card, when the user has performed the payment operation, a payment amount entered by the user is displayed on the LCD 603, and then the credit authorization results obtained for the user are displayed. The operator (merchant) confirms the contents and depresses the execution switch 612. Then, a message indicating the completion of the settlement setup is displayed on the LCD 603. At this time, the merchant terminal 103 exchanges settlement information with the mobile user terminal 100 and the service system 110, and performs the settlement process using the electronic credit card.

A detailed explanation of the internal structure and the operation of the merchant terminal 103 will be given later.

The automatic vending machine 104 will now be described.

Figure 7:
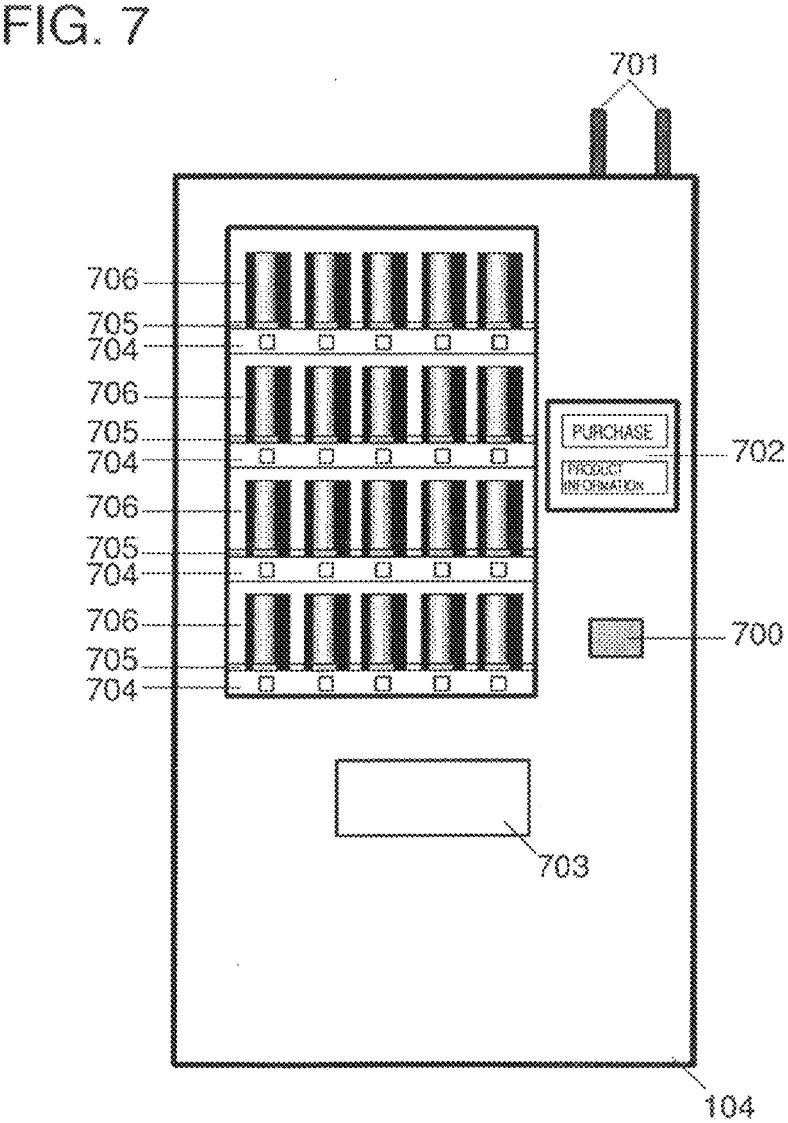
FIG. 7 is a schematic diagram illustrating an automatic vending machine according to the embodiment of the present invention.

FIG. 7 is a diagram showing the external appearance of the automatic vending machine 104. In FIG. 7, reference numeral 700 denotes an infrared communication port (infrared communication module) used when engaging in infrared communication with the mobile user terminal 100; 701, an antenna used for receiving and transmitting radio signals for a digital wireless telephone; 702, a 640×480 pixel color liquid crystal display touch panel (touch panel LCD); 703, a product discharge port; 704, product selection switches; 705, a sold out display (LED); and 706, a sample.

To purchase a product from the automatic vending machine 104, a user who owns a mobile user terminal touches "purchase" in the operating menu displayed on the touch panel LCD 702, and then depresses a product selection switch 704 to select a desired product. The automatic vending machine counts the number of products selected, and each time a product selection switch 704 is depressed the product count is increased by one, the total charge is calculated, and the names, the volumes and the total charge for the selected products are displayed, along with a button used to signal the start of a payment operation. When the user touches the button signaling the start of a payment operation, the automatic vending machine 104 displays a message on the touch panel LCD requesting payment using the electronic payment card. Then, when the user pays the amount charged using the mobile user terminal, the product is discharged at the discharge port 703 and a message indicating that the settlement preparation has been completed is displayed on the touch panel LCD. After a short pause, the operating menu is again displayed. At this time, the automatic vending machine 104 uses infrared communication to exchanged settlement information with the mobile user terminal 100, and uses the electronic payment card to perform the settlement process.

When the user touches "product information" in the operating menu that is displayed on the touch panel LCD 702 and selects a product using a product selection switch 704, the information concerning the selected product is displayed on the touch panel LCD. The information concerning the product is multimedia information, including text, images, video and sound, and sound is output through a loudspeaker that is incorporated in the automatic vending machine 104. Therefore, a CF (Commercial Film) for the product may be output as information concerning the product. Further, when the product is a video, a music CD (Compact Disk) or a packaged media product, such as a software game program, sample information concerning the product may be output on the touch panel LCD and through the loudspeaker.

A detailed explanation of the internal structure and the operation of the automatic vending machine 104 will be given later.

The switching center 105 will now be explained.

Figure 8:
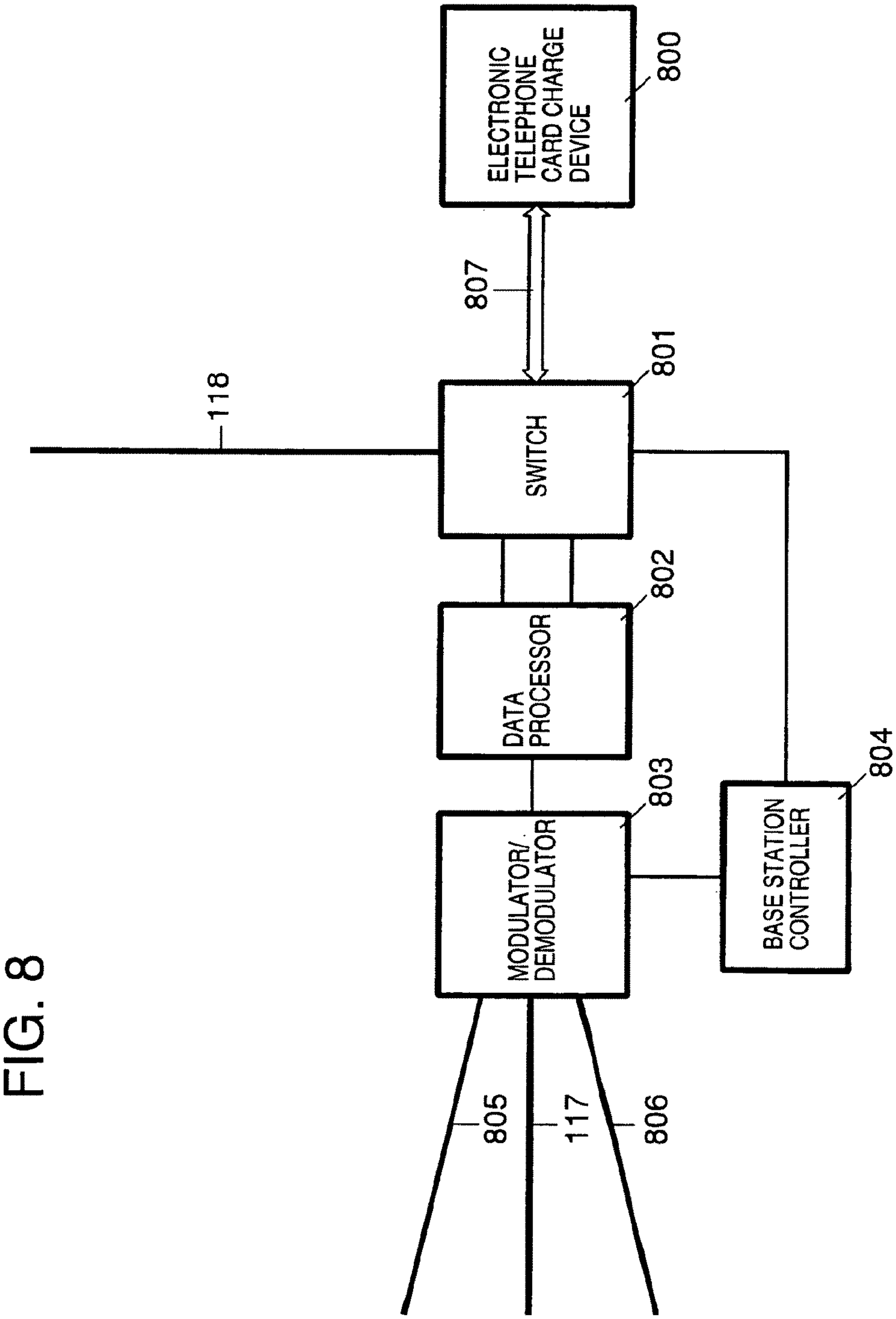
FIG. 8 is a block diagram illustrating the arrangement of a switching center according to the embodiment of the present invention.

FIG. 8 is a block diagram illustrating the arrangement of the switching center 105. In FIG. 8, reference numeral 800 denotes an electronic telephone card accounting device that uses the electronic telephone card to perform the accounting for telephone communication; 801, a switch for performing the switching for a digital wireless telephone network, and the switching for the digital wireless telephone network and the digital public line network 111; 802, a data processor for encoding and decoding sound and data; 803, a modulator/demodulator for performing a multiplexing process and a modulation/demodulation process; and 804, a base station controller for controlling the base station. The digital communication line 117 is used to connect the switching center 105 to the base station 112. Actually, however, multiple base stations are connected to the switching center 105, and reference numerals 805 and 806 denote digital communication lines that are used to connect to the switching center 105 base stations other than the base station 112. Reference numeral 807 denotes a control signal and a data signal exchanged by the electronic telephone card accounting device 800 and the switch 801.

The electronic telephone card accounting device 800 is operated in response to the initiation of a communication using the electronic telephone card. When the line connection is established, and while the line is connected (during the communication process), the electronic telephone card accounting device employs accounting information received from the switch 801 to exchange settlement information with the mobile user terminal 100 and to use the electronic telephone card to perform the settlement process. At this time, the switch 801 switches the lines in accordance with the terms of the settlement process that is performed by the electronic telephone card accounting device 800.

A detailed explanation of the internal structure and the operation of the electronic telephone card accounting device 800 will be given later.

The service system 110 will now be described.

Figure 9:
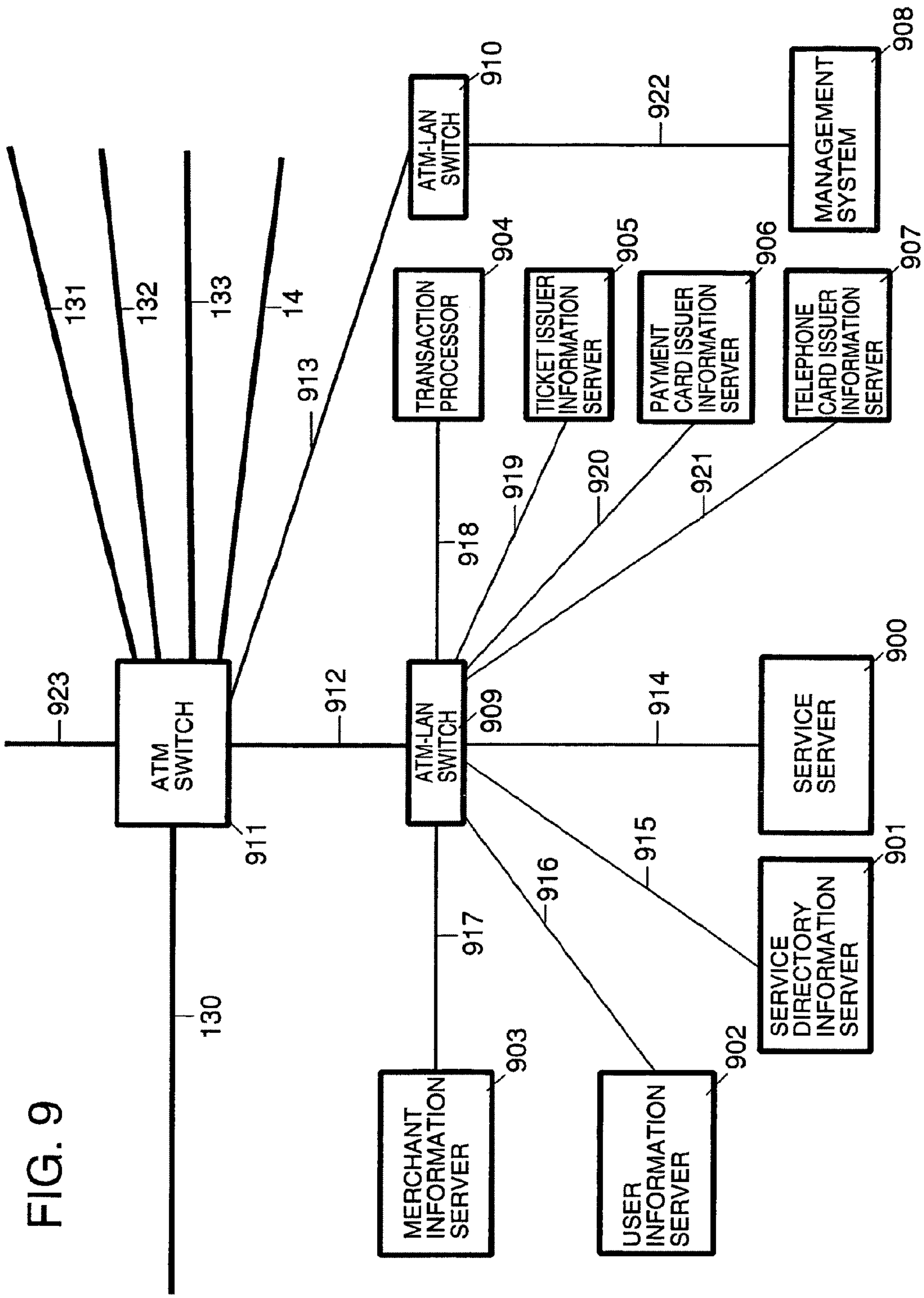
FIG. 9 is a block diagram illustrating the arrangement of a service system according to the embodiment of the present invention.

FIG. 9 is a block diagram illustrating the arrangement of the service system 110. For the mobile electronic commerce service, the service system 110 processes various types of transaction information that is exchanged with the mobile user terminal 100, the gate terminal 101, the merchant terminal 102, the merchant terminal 103, the automatic vending machine 104, the switching center 105 (the electronic telephone card accounting device 800), the transaction processing system 106, the ticket issuing system 107, the payment card issuing system 108, and the telephone card issuing system 109. The service system 100 comprises: a service server 900, for controlling data communication; a service director information server 901, for managing attribute information that concerns the user, the merchant, the communication provider, the transaction processor, the ticket issuer, the payment card issuer and the telephone card issuer and for managing the history information for the service provided by the service system 110; a user information server 902, for managing the user attribute information and the data stored in the mobile user terminal 100; a merchant information server 903, for managing the attribute information for the merchant and the communication provider and for managing data that are stored in the gate terminal 101, the merchant terminals 102 and 103, the automatic vending machine 104 and the electronic telephone card accounting device 800; a transaction processor information server 904, for managing the attribute information for the transaction processor and the history information of the settlement process; a ticket issuer information server 905, for managing the attribute information of the ticket issuer, the history information of the ticket issuing process and a template program for the electronic ticket; a payment card issuer information server 906, for managing the attribute information for the payment card issuer, the history information for the payment card issuing process and a template program for the electronic payment card; a telephone card issuer information server 907, for managing the attribute information for the telephone card issuer, the history information for the telephone card issuing process and a template program for the electronic telephone card; and a management system 908, with which the service provider manages the operation of the service system 110. The servers 900 to 907 and the management system 908 are constituted by one or more computers.

The service server 900, the service director information server 901, the user information server 902, the merchant information server 903, the transaction processor information server 904, the ticket issuer information server 905, the payment card issuer information server 906, and the telephone card issuer information server 907 are respectively connected to an ATM-LAN switch 909 by ATM-LAN cables 914, 915, 916, 917, 918, 919, 920 and 921. The service server 900 accesses, through the ATM-LAN switch 909, the service director information server 901, the user information server 902, the merchant information server 903, the transaction processor information server 904, the ticket issuer information server 905, the payment card issuer information server 906, and the telephone card issuer information server 907.

The ATM-LAN switch 909 is connected to an ATM switch 911 by an ATM-LAN cable 912. The digital communication line 130 for connecting the digital public line network 111, the digital communication line 131 for connecting the transaction processing system 106, the digital communication line 132 for connecting the ticket issuing system 107, the digital communication line 133 for connecting the payment card issuing system 108, and the digital communication line 134 for connecting the telephone card issuing system 108 are extended to the ATM switch 911. The service server 900 communicates, via the ATM-LAN switch 909 and the ATM switch 911, with the mobile user terminal 100, the gate terminal 101, the merchant terminal 102, the merchant terminal 103, the automatic vending machine 104, the electronic telephone card accounting device 800, the transaction processing system 106, the ticket issuing system, the payment card issuing system and the telephone card issuing system.

The management system 908 is connected to the ATM-LAN switch 910 by an ATM-LAN cable 922, and also connected to the ATM switch 911 by an ATM-LAN cable 913. In order to manage the operation of the service system 110, the management system 908 accesses the service server 900, the service director information server 901, the user information server 902, the merchant information server 903, the transaction processor information server 904, the ticket issuer information server 905, the payment card issuer information server 906 and the telephone card issuer information server 907 through the ATM-LAN switch 910, the ATM switch 911 and the ATM-LAN switch 909.

The ATM switch 911 serves as a data communication switch (router) for communication between the outside and the inside of the service system 110, and for service system 110 intercommunication. In addition, the ATM switch 911 serves as a communication adaptor for handling multiple communication systems. For example, when communication is established between the service server 900 and the merchant terminal 102, the merchant terminal 102 and the ATM switch 911 exchange ISDN data packets. The ATM switch 911 converts the ISDN data packets to ATM packets, or vice versa, and exchanges the ATM packets with the service server 900. Similarly, when communication is established between the service server 900 and the mobile user terminal 100, between the service server 900 and the merchant terminal 103, between the service server 900 and the automatic vending machine 104, between the service server 900 and the electronic telephone card accounting device 800, between the service server 900 and the transaction processing system 106, between the service server 900 and the ticket issuing system 107, between the service server 900 and the telephone card issuing system 109, and between the service server 900 and the payment card issuing system 108, the ATM switch 911 performs communication data conversions in accordance with the individual communication systems.

In order to reduce the communication charges incurred by the service system 110 when communicating with the mobile user terminal 100, the gate terminal 101, the merchant terminal 102 or 103, the automatic vending machine 104 or the electronic telephone card accounting device 800, generally the service system 110 is installed in each area (service area) wherein the mobile electronic commerce service is provided. Therefore, a special digital communication line 923 is connected to the ATM switch 911 to establish a connection with a service system in another area. In this case, the service systems share the data and interact with each other for data processing.

The transaction processing system 106 will now be explained.

Figure 10:
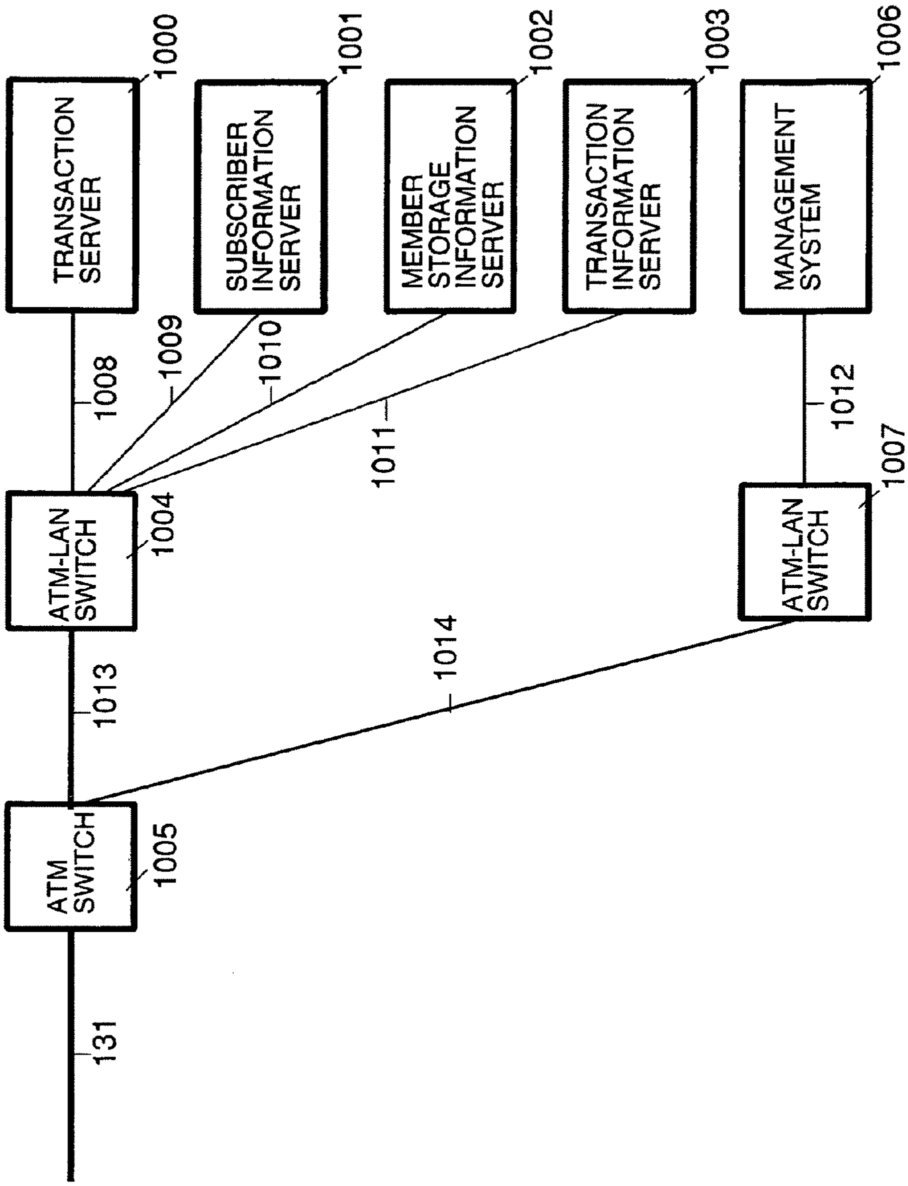
FIG. 10 is a block diagram illustrating a settlement system according to the present invention.

FIG. 10 is a block diagram illustrating the arrangement of the transaction processing system 106. The transaction processing system 106 comprises: a transaction process server 1000 for processing settlement information that is exchanged with the service system 110 for an electronic credit card service; a subscriber information server 1001, for managing personal information for a subscriber to the credit service; a member store information server 1002, for managing the information for a store that is a member of the credit service; a transaction information server 1003, for managing the transaction information for a credit settlement; and a management system 1006, with which the transaction processor manages the operation of the transaction processing system 106. The servers 1000 to 1003 and the management system 1006 are constituted by one or more computers.

The transaction server 1000, the subscriber information server 1001, the member store information server 1002, and the transaction information server 1003 are respectively connected to an ATM-LAN switch 1004 by ATM-LAN cables 1008, 1009, 1010 and 1011. The transaction server accesses, via the ATM-LAN switch 1004, the subscriber information server 1001, the member store information server 1002, or the transaction information server 1003.

The ATM-LAN switch 1004 is connected to an ATM switch 1005 by an ATM-LAN cable 1013. The digital communication line 131 for establishing a connection with the service system 110 is connected to the ATM switch 1005. The transaction server communicates with the service system 110 via the ATM-LAN switch 1004 and the ATM switch 1005.

In the electronic credit card service, the credit settlement process performed by the transaction processing system 106 is established when, upon receiving a settlement request from the service system 110, the transaction server 1000 updates information for the subscriber information server 1001, the member store information server 1002 and the transaction information server 1003.

The ATM switch 1005 is extended not only to the digital communication line 131 for effecting a connection with the service system 110, but also a bank dedicated line 1015 for connecting a bank on-line system, and a dedicated digital line 1016 for connecting the transaction processing system of another transaction processor. The transaction processing system 106 communicates with the bank on-line system and the transaction processing system of another transaction processor, and performs a settlement process between financial institutions.

The management system 1006 is connected to the ATM-LAN switch 1007 by an ATM-LAN cable 1012, and is also connected to the ATM switch 1005 by an ATM-LAN cable 1014. In order to manage the operation of the service system 110, the management system 1006 accesses the transaction server 1000, the subscriber information server 1001, the member store information server 1002, or the transaction information server 1003 via the ATM-LAN switch 1007, the ATM switch 1005 and the ATM-LAN switch 1004.

The ATM switch 1005 serves as a data communication switch (router) for communication between the outside and the inside of the transaction processing system 106, and for transaction processing system 106 intercommunication. In addition, the ATM switch 1005 serves as a communication adaptor for handling multiple communication systems. For communication between the transaction server 1000 and the service system 110, between the transaction server 1000 and the bank on-line system, and between the transaction server 1000 and the transaction processing system of another transaction processor, the ATM switch 1005 converts communication data in accordance with the individual communication systems.

The ticket issuing system 107 will now be explained.

Figure 11:
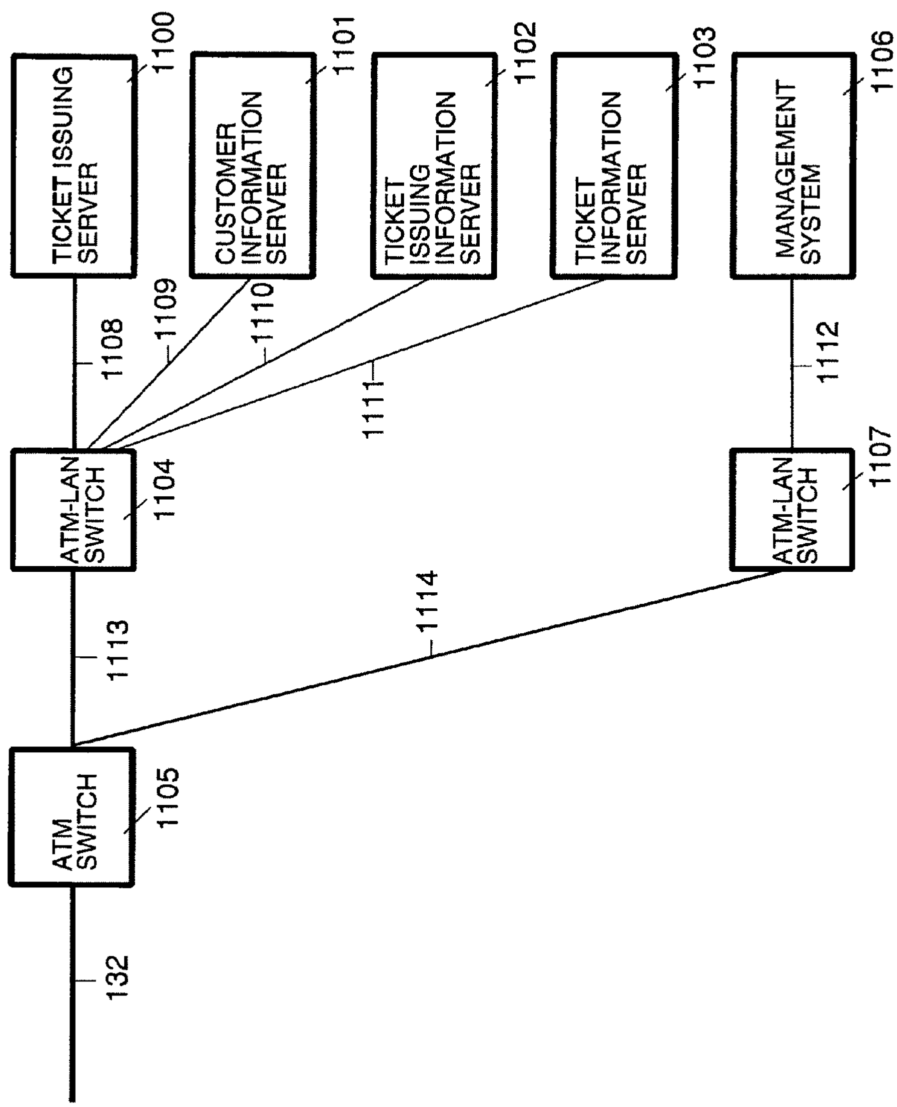
FIG. 11 is a block diagram illustrating a ticket issuing system according to the present invention.

FIG. 11 is a block diagram illustrating the arrangement of the ticket issuing system 107. The ticket issuing system 107 comprises: a ticket issuing server 1100, for processing settlement information (transaction information) that is exchanged with the service system 110 of the electronic ticket service; a customer information server 1101, for managing the purchase history information for a customer; a ticket issuing information server 1102, for managing information concerning a ticket that has been issued and an installation card; a ticket information server 1103, for managing ticket stock information; and a management system 1106, with which the ticket issuer manages the operation of the ticket issuing system 107. The servers 1100 to 1103 and the management system 1106 are constituted by one or more computers.

The ticket issuing server 1100, the customer information server 1101, the ticket issuing information server 1102, and the ticket information server 1103 are respectively connected to an ATM-LAN switch 1104 by ATM-LAN cables 1108, 1109, 1110 and 1111. The ticket issuing server accesses, via the ATM-LAN switch 1104, the customer information server 1101, the ticket information server 1102, or the ticket information server 1103.

The ATM-LAN switch 1104 is connected to an ATM switch 1105 by an ATM-LAN cable 1113. The digital communication line 132 for connecting the service system 110 is connected to the ATM switch 1105. The ticket issuing server communicates with the service system 110 via the ATM-LAN switch 1104 and the ATM switch 1105.

In the electronic ticket service, the ticket issuing process performed by the ticket issuing system 107 is established when, upon receiving a request from the service system 110, the ticket issuing server 1100 updates information for the customer information server 1101, the ticket issuing information server 1102 and the ticket information server 1103, and transmits to the service system 110 the ticket information that is to be issued.

The management system 1106 is connected to the ATM-LAN switch 1107 by an ATM-LAN cable 1112, and is also connected to the ATM switch 1105 by an ATM-LAN cable 1114. In order to manage the operation of the ticket issuing system 107, the management system 1106 accesses the ticket issuing server 1100, the customer information server 1101, the ticket issuing information server 1102, or the ticket issuing information server 1103 via the ATM-LAN switch 1107, the ATM switch 1105 and the ATM-LAN switch 1104.

The ATM switch 1105 serves as a data communication switch (router) for communication between the outside and the inside of the ticket issuing system 107 and for ticket issuing system 107 intercommunication.

The payment card issuing system 108 will now be explained.

Figure 12:
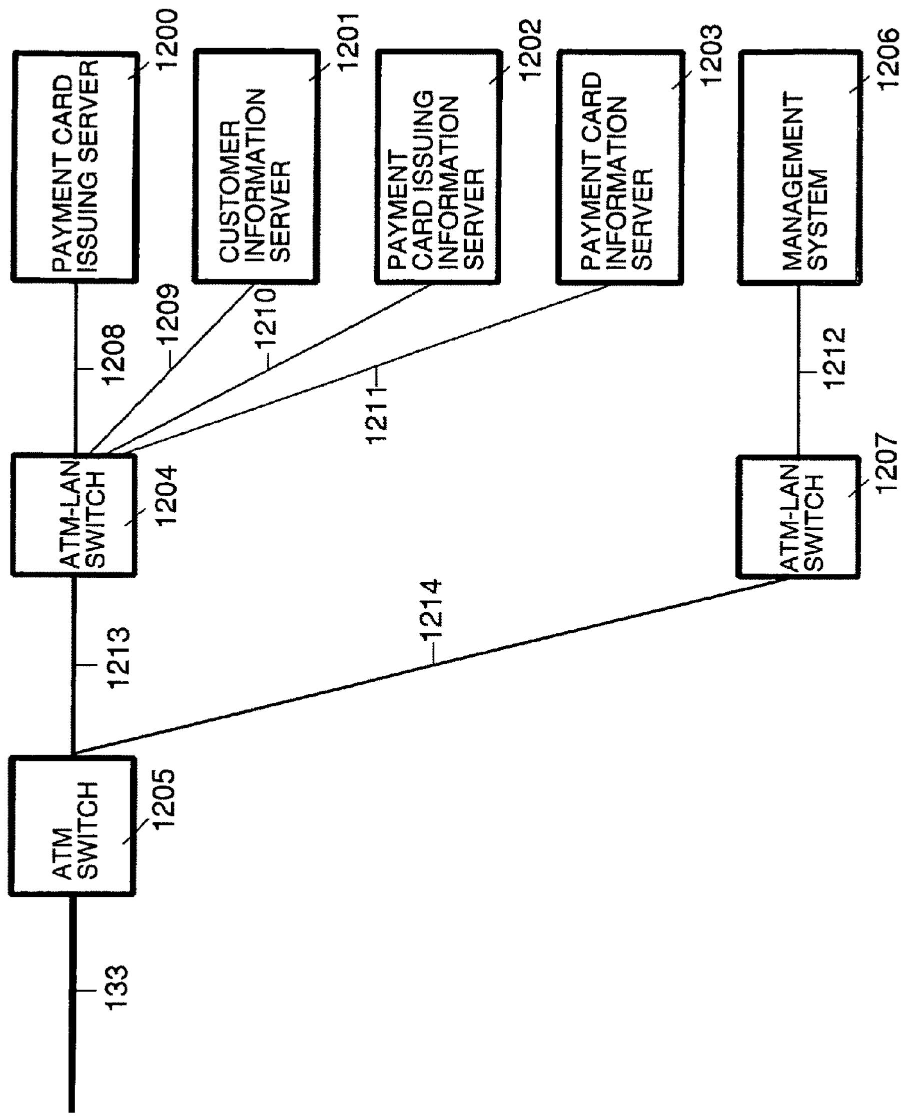
FIG. 12 is a block diagram illustrating a payment card issuing system according to the present invention.

FIG. 12 is a block diagram illustrating the arrangement of the payment card issuing system 108. The payment card issuing system 108 comprises: a payment card issuing server 1200, for processing settlement information (transaction information) that is exchanged with the service system 110 of the electronic payment card service; a customer information server 1201, for managing the purchase history information for a customer; a payment card issuing information server 1202, for managing information concerning a payment card that has been issued and an installation card; a payment card information server 1203, for managing payment card stock information; and a management system 1206, with which the payment card issuer manages the operation of the payment card issuing system 108. The servers 1200 to 1203 and the management system 1206 are constituted by one or more computers.

The payment card issuing server 1200, the customer information server 1201, the payment card issuing information server 1202, and the payment card information server 1203 are respectively connected to an ATM-LAN switch 1204 by ATM-LAN cables 1208, 1209, 1210 and 1211. The payment card issuing server accesses, via the ATM-LAN switch 1204, the customer information server 1201, the payment card information server 1202, or the payment card information server 1203.

The ATM-LAN switch 1204 is connected to an ATM switch 1205 by an ATM-LAN cable 1213. The digital communication line 133 for connecting the service system 110 is connected to the ATM switch 1205. The payment card issuing server communicates with the service system 110 via the ATM-LAN switch 1204 and the ATM switch 1205.

In the electronic payment card service, the payment card issuing process performed by the payment card issuing system 108 is established when, upon receiving a request from the service system 110, the payment card issuing server 1200 updates information for the customer information server 1201, the payment card issuing information server 1202 and the payment card information server 1203, and transmits the payment card information that is to be issued to the service system 110.

The management system 1206 is connected to the ATM-LAN switch 1207 by an ATM-LAN cable 1212, and is also connected to the ATM switch 1205 by an ATM-LAN cable 1214. In order to manage the operation of the payment card issuing system 108, the management system 1206 accesses the payment card issuing server 1200, the customer information server 1201, the payment card issuing information server 1202, or the payment card issuing information server 1203 via the ATM-LAN switch 1207, the ATM switch 1205 and the ATM-LAN switch 1204.

The ATM switch 1205 serves as a data communication switch (router) for communication between the outside and the inside of the payment card issuing system 108 and for payment card issuing system 108 intercommunication.

The telephone card issuing system 109 will now be explained.

Figure 13:
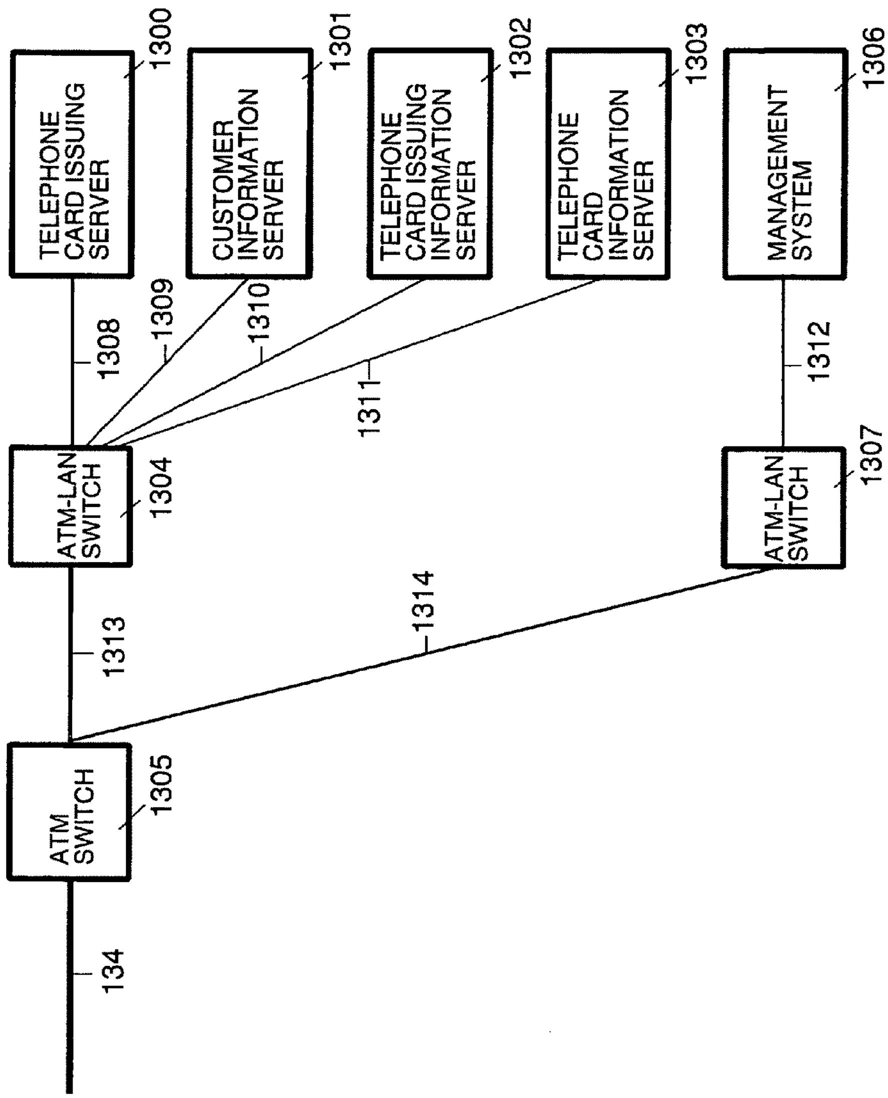
FIG. 13 is a block diagram illustrating a telephone card issuing system according to the present invention.

FIG. 13 is a block diagram illustrating the arrangement of the telephone card issuing system 109. The telephone card issuing system 109 comprises: a telephone card issuing server 1300, for processing settlement information (transaction information) that is exchanged with the service system 110 of the electronic telephone card service; a customer information server 1301, for managing the purchase history information for a customer; a telephone card issuing information server 1302, for managing information concerning a telephone card that has been issued and an installation card; a telephone card information server 1303, for managing telephone card stock information; and a management system 1306, with which the telephone card issuer manages the operation of the telephone card issuing system 109. The servers 1300 to 1303 and the management system 1306 are constituted by one or more computers.

The telephone card issuing server 1300, the customer information server 1301, the telephone card issuing information server 1302 and the telephone card information server 1303 are respectively connected to an ATM-LAN switch 1304 by ATM-LAN cables 1308, 1309, 1310 and 1311. The telephone card issuing server accesses, via the ATM-LAN switch 1304, the customer information server 1301, the telephone card information server 1302, or the telephone card information server 1303.

The ATM-LAN switch 1304 is connected to an ATM switch 1305 by an ATM-LAN cable 1313. The digital communication line 134 for connecting the service system 110 is connected to the ATM switch 1305. The telephone card issuing server communicates with the service system 110 via the ATM-LAN switch 1304 and the ATM switch 1305.

In the electronic telephone card service, the telephone card issuing process performed by the telephone card issuing system 109 is established when, upon receiving a request from the service system 110, the telephone card issuing server 1300 updates information for the customer information server 1301, the telephone card issuing information server 1302 and the telephone card information server 1303, and transmits the telephone card information that is to be issued to the service system 110.

The management system 1306 is connected to the ATM-LAN switch 1307 by an ATM-LAN cable 1312, and is also connected to the ATM switch 1305 by an ATM-LAN cable 1314. In order to manage the operation of the telephone card issuing system 109, the management system 1306 accesses the telephone card issuing server 1300, the customer information server 1301, the telephone card issuing information server 1302, or the telephone card issuing information server 1303 via the ATM-LAN switch 1307, the ATM switch 1305 and the ATM-LAN switch 1304.

The ATM switch 1305 serves as a data communication switch (router) for communication between the outside and the inside of the telephone card issuing system 109 and for telephone card issuing system 109 intercommunication.

Figure 14E:
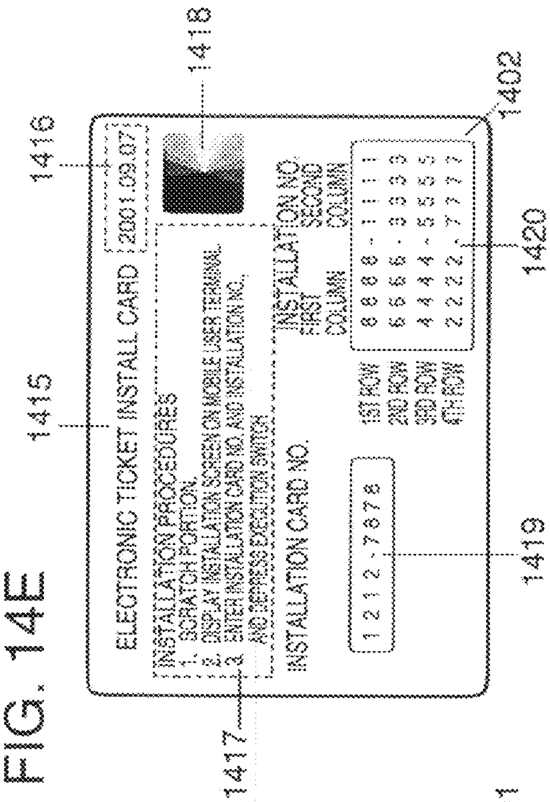
FIGS. 14E and 14F are schematic diagrams illustrating an electronic ticket installation card according to the embodiment of the present invention.
Figure 14D:
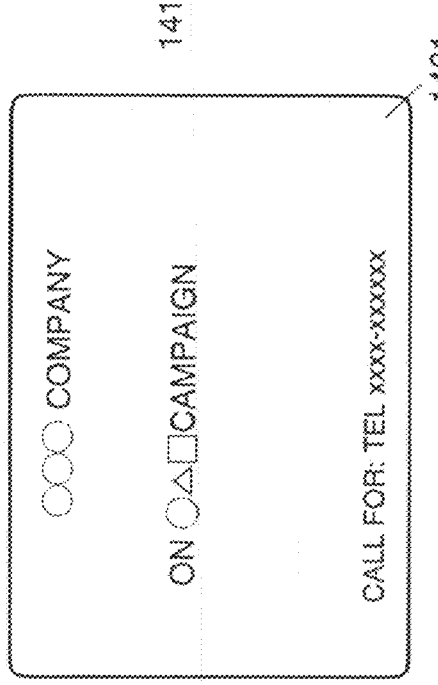
Figure 14F:
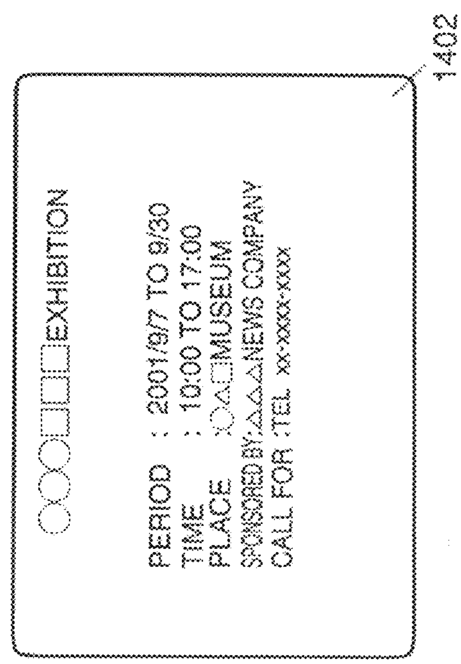

FIG. 14 is a schematic diagram for an installation card for an electronic payment card, an electronic telephone card, or an electronic ticket. FIGS. 14A and 14B are diagrams showing the reverse side and the obverse side of an installation card 1400 for an electronic payment card; FIGS. 14C and 14D are diagrams showing the reverse side and the obverse side of an installation card 1400 for an electronic telephone card; and FIGS. 14E and 14F are diagrams showing the reverse side and the obverse side of an installation card 1400 for an electronic ticket.

Basically, installation information and information required for installation, such as installation procedures, are printed on the reverse side of the installation card, and a desired design is printed on the obverse side.

For example, the installation card 1400 for the electronic payment card represents a value of 10,000 (a currency unit, or a unit or a product, or a service to be provided).

On the reverse side are printed an installation card type 1403, a numerical value 1404 representing the worth of an electronic payment card to be installed; installation procedures 1405; a holographic logo 1406; an installation card number 1407, which represents the type of electronic payment card that is to be installed; and an installation number 1408, which corresponds to an identification number in the same type of electronic payment card.

The holographic logo 1406, which is difficult to copy, is provided not only for the design but also to prevent the counterfeiting of the installation card. Therefore, to prevent counterfeiting, a micro character or a micro pattern may be printed instead of the holographic logo 1406.

The installation card number 1407 consists of an arbitrary 8-digit number that represents the electronic payment card type, and is printed as two sets of four numerals each. The installation number 1408 consists of an arbitrary 32-digit number that is selected at random, and is printed as sets of four numerals each that are arranged in four rows and two columns. The combination of the installation card number 1407 and the installation number 1408 constitutes the relevant identification information for the electronic payment card that is to be installed. In order to prevent the leakage of identification information during distribution, a coating is applied to the portion whereon the installation card number 1407 and the installation number 1408 are printed, and the coating must be scratched off before the numbers can be seen. That is, when the installation card is sold or transferred the applied coating is intact, and the coating is not scratched off until the electronic payment card is installed in the mobile user terminal 100.

During the installation procedures, first, the coating (scratch portion) is removed. Then, the mobile user terminal 100 is set to the payment card mode and the operating menu for the payment card mode is displayed using the function switch (F4). When the menu is selected, the installation screen is displayed. Following this, the installation card number and the installation number are entered and the execution switch is pressed. Through the performance of this operation, installation information is exchanged by the mobile user terminal 100 and the service system 110, and the electronic payment card is installed in the mobile user terminal 100.

For the installation card 1401 for the electronic telephone card a value of 5,000 (a currency unit, or a unit of the wireless telephone communication service that is to be provided) is indicated. In the same manner as for the installation card 1400 for the electronic payment card, on the reverse side are printed an installation card type 1409, a numerical value 1410 that represents the worth of an electronic telephone card to be installed; installation procedures 1411; a holographic logo 1412; an 8-digit installation card number 1413 that represents the type of electronic telephone card that is to be installed; and a 32-digit installation number 1414 that corresponds to an identification number for the same type of electronic telephone card. The coating is applied to the portion whereon the installation card number 1413 and the installation card number 1414 are printed.

During the installation procedures, first, the coating (scratch portion) is removed. Then the mobile user terminal is set to the telephone card mode and the operating menu of the telephone card mode is displayed by using the function switch (F4). When the menu is selected, the installation screen is displayed. Following this, the installation card number and the installation number are entered, and the execution switch is pressed. Through the performance of this operation, installation information is exchanged by the mobile user terminal 100 and the service system 110, and the electronic telephone card is installed in the mobile user terminal 100.

For an installation card 1402 for an electronic ticket, information concerning the contents of an electronic ticket to be installed, such as the date and place of an event, is printed on the obverse side. And as for the installation card 1400 for the electronic payment card, on the reverse side are printed an installation card type 1415; installation procedures 1417; a holographic logo 1418; an 8-digit installation card number 1419 that represents the type of an electronic ticket to be installed; and a 32-digit installation number 1420 that corresponds to an identification number for the same type of electronic ticket. The coating is applied to the portion whereon the installation card number 1419 and the installation card number 1420 are printed. In addition, an installation limit 1416 for an electronic ticket is printed on the reverse side of the installation card 1402 for the electronic ticket.

During the installation procedures, first, the coating (scratch portion) is removed. Then, the mobile user terminal is set to the ticket mode and the operating menu for the ticket mode is displayed by using the function switch (F4). When the menu is selected, the installation screen is displayed. Following this, the installation card number and the installation number are entered and the execution switch is depressed. Through the performance of this operation, installation information is exchanged by the mobile user terminal 100 and the service system 110, and the electronic ticket is installed in the mobile user terminal 100.

In the above description, the installation card has the shape of a card composed of paper, plastic or vinyl chloride. However, any shape can be employed so long as it can be handled by normal distribution channels and so long as installation information that corresponds to the installation card number and the installation number can be recorded thereon. A desired form can be employed to record the installation information. For example, in printed material, such as a book or a magazine, installation information may be recorded on one of the pages, or installation information may be printed on the surface or the label of a three-dimensional product, such as a beverage can. Further, the installation information may be recorded as electronic information in a software package, such as a computer software program.

When an installation card and another product are combined, the two can be employed as a lottery prize, or can be distributed and sold as a composite product. Further, the distribution costs for the installation card can be reduced, its range of usage can be expanded, and its popularity can be increased.

An explanation will now be given for the hierarchical data management function performed between the service system 110 and the mobile user terminal 100, the gate terminal 101, the merchant terminal 102, the merchant terminal 103, the automatic vending machine 104, or the electronic telephone card accounting device 800.

Since the system of the invention handles information concerning a money transaction, such as the purchase of an electronic payment card and the settlement process performed using that card, high security is required. It is one object of this system to provide a simple operation that makes it possible for an ordinary user to handle information at a high level of security and in a mobile environment.

To implement this system function, the service system 110 manages the data stored in the mobile user terminal 100, the gate terminal 101, the merchant terminals 102 and 103, the automatic vending machine 104, and the electronic telephone card accounting device 800. The service system 110 stores master data for the data stored in the mobile user terminal 100, the gate terminal 101, the merchant terminals 102 and 103, the automatic vending machine 104, and the electronic telephone card accounting device 800. Periodically, the data are mutually updated by the mobile user terminal 100, the gate terminal 101, the merchant terminals 102 and 103, the automatic vending machine 104 and the electronic telephone card accounting device 800, and the service system 110. At this time, the service system 110 compares the master data with the data stored in the mobile user terminal 100, the gate terminal 101, the merchant terminals 102 and 103, the automatic vending machine 104 and the electronic telephone card accounting device 800, and determines whether an illegal alteration has been performed. The internal data are updated so that information that is frequently accessed, or comparatively new information is stored on the local storage medium (a RAM or a hard disk) belonging to the mobile user terminal 100, the gate terminal 101, the merchant terminals 102 and 103, the automatic vending machine 104, or the electronic telephone card accounting device 800.

With this function, an illegal act by a user or a merchant can be prevented, and the loss of data due to an accident can be prevented, thereby increasing the safety of the system. In addition, the owners of the mobile user terminal 100, the gate terminal 101, the merchant terminals 102 and 103, the automatic vending machine 104, and the electronic telephone card accounting device 800 do not have to back up internally stored data, and only a small memory capacity is required for the local storage medium for the mobile user terminal 100, the gate terminal 101, the merchant terminals 102 and 103, the automatic vending machine 104, or the electronic telephone card accounting device 800. As a result, the manufacturing costs and the sizes of these devices can be reduced. Hereinafter, this function is called a network hierarchical storage and management function.

When the mobile user terminal 100, the gate terminal 101 and the merchant terminals 102 and 103 access the data stored in the service system 110, the network hierarchical storage and management function downloads the data from the service system 110. The data updating process is a process whereby the mobile user terminal 100, the gate terminal 101, the merchant terminals 102 and 103, the automatic vending machine 104, or the electronic telephone card accounting device 800 periodically accesses the service system to update internally stored data. The forcible data updating process is a process whereby the service system forcibly updates the data stored in the mobile user terminal 100, the gate terminal 101, the merchant terminals 102 and 103, the automatic vending machine 104, or the electronic telephone card accounting device 800. The data backup process is a process whereby the mobile user terminal 100 or the merchant terminal 103 automatically makes a backup of the internal data in the service system when the remaining battery power is reduced to a specific level.

Figure 56B:
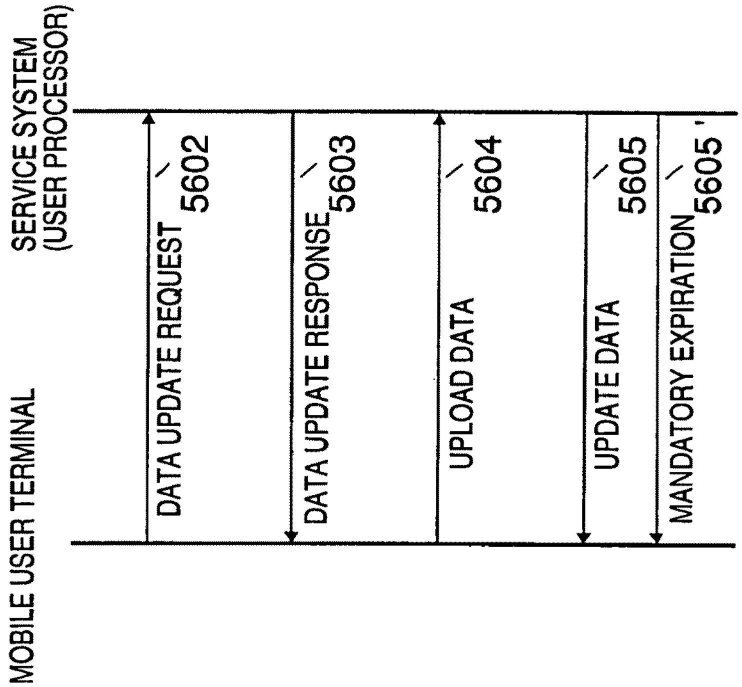
FIG. 56B is a flowchart showing a data update process performed by the mobile user terminal and the user processor according to the embodiment of the present invention.
Figure 56A:
FIG. 56A is a flowchart showing a remote access process performed by the mobile user terminal and the user processor according to the embodiment of the present invention.

In FIG. 56A is shown the remote access processing performed by the mobile user terminal 100 and the service system 110.

To access data in the service system, the mobile user terminal 100 transmits to the service system a remote access request 5600, which is a data request message. Upon receiving the remote access request 5600, the service system generates remote access data 5601, which is a message that includes the requested data, and transmits it to the mobile user terminal 100. The mobile user terminal 100 then accesses the received data.

Figure 57A:
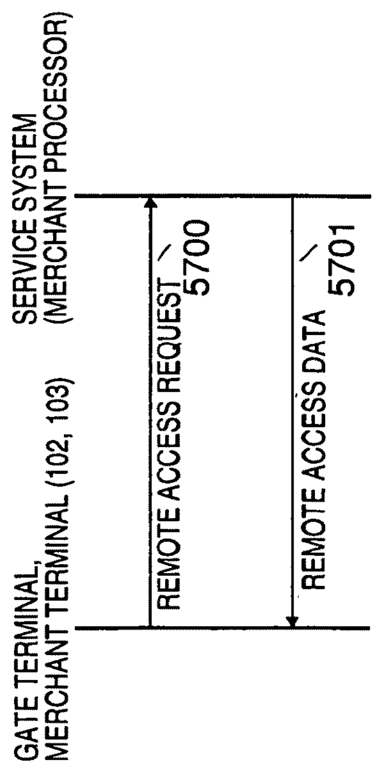
FIG. 57A is a flowchart showing a remote access process performed by the gate terminal (or the merchant terminal 102 or 103, the accounting device, or the electronic telephone card accounting device) and the merchant processor.

Similarly, in FIG. 57A is shown the remote access processing performed by the service system 110 and the gate terminal 101, or the merchant terminal 102 or 103.

To access data in the service system, the gate terminal 101 (or the merchant terminal 102 or 103) transmits to the service system a remote access request 5700, which is a data request message. Upon receiving the remote access request 5700, the service system generates remote access data 5701, which is a message that includes the requested data, and transmits it to the gate terminal 101 (the merchant terminal 102 or 103). The gate terminal 101 (the merchant terminal 102 or 103) then accesses the received data.

In FIG. 56B is shown the data update processing performed by the mobile user terminal 100 and the service system 110.

When a time designated in advance by the service system is reached, the mobile user terminal 100 transmits to the service system 110 a data update request 5602, which is a message requesting the performance of a process for updating the internal data. The service system 110 generates a data update response 5603, which is a message indicating the range of the data that is to be uploaded to the service system, and transmits it to the mobile user terminal 100.

The mobile user terminal 100 generates the data to be uploaded to the service system, and transmits to the service system upload data 5604, which is a message for the uploading of the internal data of the mobile user terminal to the service system.

The service system examines the received data, generates data to update the internal data of the mobile user terminal 100, and transmits to the mobile user terminal 100 update data 5605, which is a message for the updating of the internal data held by the mobile user terminal 100. Upon receiving the update data 5605, the mobile user terminal 100 updates the internal data.

When the service system discovers an illegal alteration in the downloaded data, instead of the update data 5605 the service system transmits a mandatory expiration 5605', which is a message for the halting of the function of the mobile user terminal.

Figure 57B:
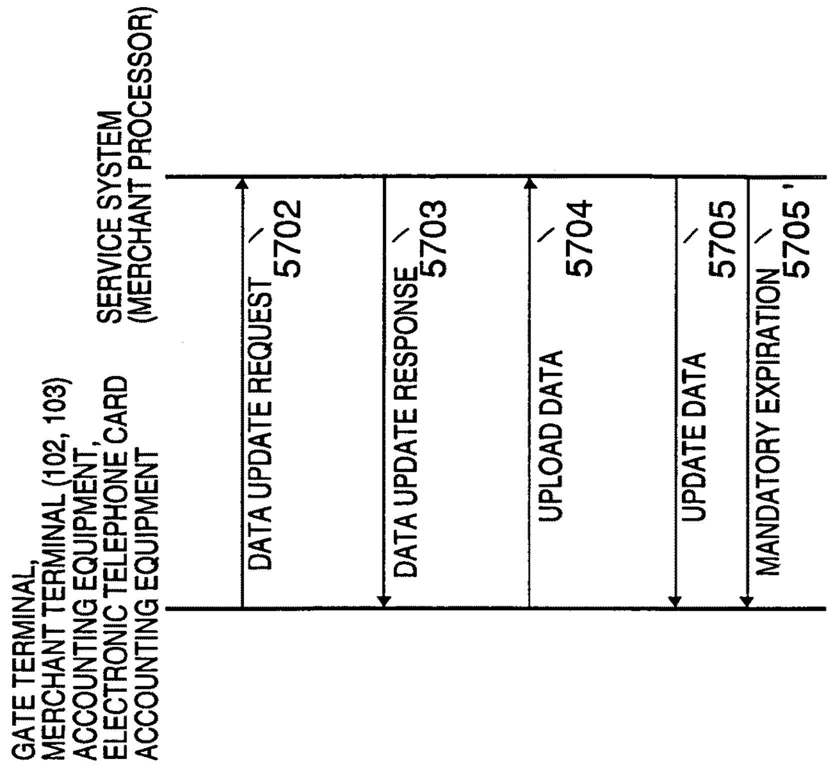
FIG. 57B is a flowchart showing a data update process performed by the gate terminal (or the merchant terminal 102 or 103, the accounting device, or the electronic telephone card accounting device) and the merchant processor.

Likewise, in FIG. 57B is shown the data updating processing performed by the service system 110 and the gate terminal 101, the merchant terminal 102 or 103, the automatic vending machine 104, or the electronic telephone card accounting device 800.

When the time designated in advance by the service system is reached, the gate terminal 101 (the merchant terminal 102 or 103, the automatic vending machine 104, or the electronic telephone card accounting device 800) transmits to the service system 110 a data update request 5702, which is a message requesting the performance of the process for updating the internal data. The service system 110 generates a data update response 5703, which is a message indicating the range of the data to be uploaded to the service system, and transmits it to the gate terminal 101 (the merchant terminal 102 or 103, the automatic vending machine 104, or the electronic telephone card accounting device 800).

The gate terminal 101 (the merchant terminal 102 or 103, the automatic vending machine 104, or the electronic telephone card accounting device 800) generates the data to be uploaded to the service system, and transmits to the service system upload data 5704, which is a message for the uploading of the internal data to the service system 110.

The service system examines the downloaded data, generates data to update the internal data of the gate terminal 101

(the merchant terminal 102 or 103, the automatic vending machine 104, or the electronic telephone card accounting device 800), and transmits update data 5705, which is a message for the updating of the internal data, to the gate terminal 101 (the merchant terminal 102 or 103, the automatic vending machine 104, or the electronic telephone card accounting device 800). Upon receiving the update data 5705, the gate terminal 101 (the merchant terminal 102 or 103, the automatic vending machine 104, or the electronic telephone card accounting device 800) updates the internal data.

When the service system discovers an illegal alteration in the downloaded data, instead of the update data 5705 the service system transmits a mandatory expiration 5705', which is a message for the halting of the function of the gate terminal 101 (the merchant terminal 102 or 103, the automatic vending machine 104, or the electronic telephone card accounting device 800).

Figure 56C:
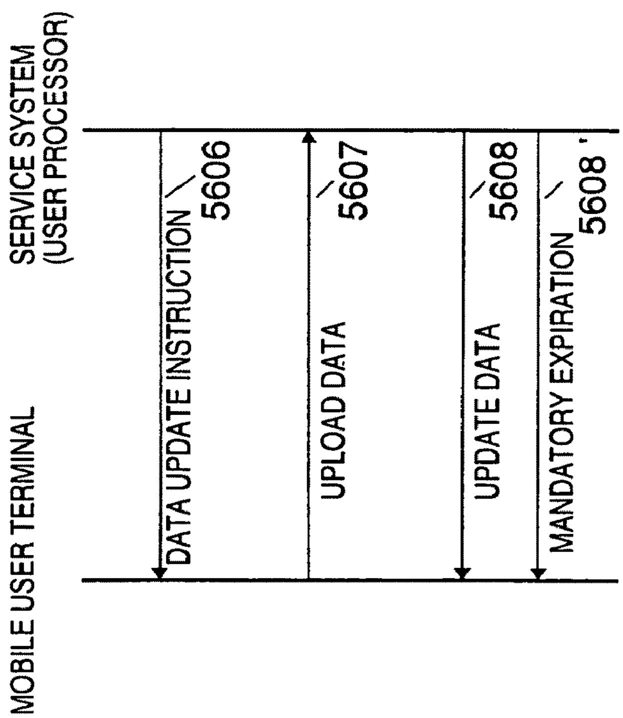
FIG. 56C is a flowchart showing a forcible data update process performed by the mobile user terminal and the user processor according to the embodiment of the present invention.

In FIG. 56C is shown the forcible data updating processing performed by the mobile user terminal 100 and the service system 110.

When internal data belonging to the mobile user terminal 100 must be updated quickly because, for example, the terms of a contract with a user have been changed, first, the service system 110 generates a data update instruction 5606, which is a message instructing the mobile user terminal 100 to perform the forcible data updating process, and transmits it to the mobile user terminal 100.

The mobile user terminal 100 generates data to be uploaded to the service system, and transmits, to the service providing system, upload data 5607, which is a message directing the uploading of the internal data held by the mobile user terminal.

The service system examines the downloaded data, generates data for updating the mobile user terminal 100 and transmits to the mobile user terminal 100 update data 5608, which is a message directing the updating of the data held by the mobile user terminal 100. Upon receiving the update data 5608 the mobile user terminal 100 updates the internal data.

When the service system discovers an illegal alteration in the downloaded data, instead of the update data 5608 the service system transmits a mandatory expiration 5608', which is a message for the halting of the function of the mobile user terminal.

Figure 57C:
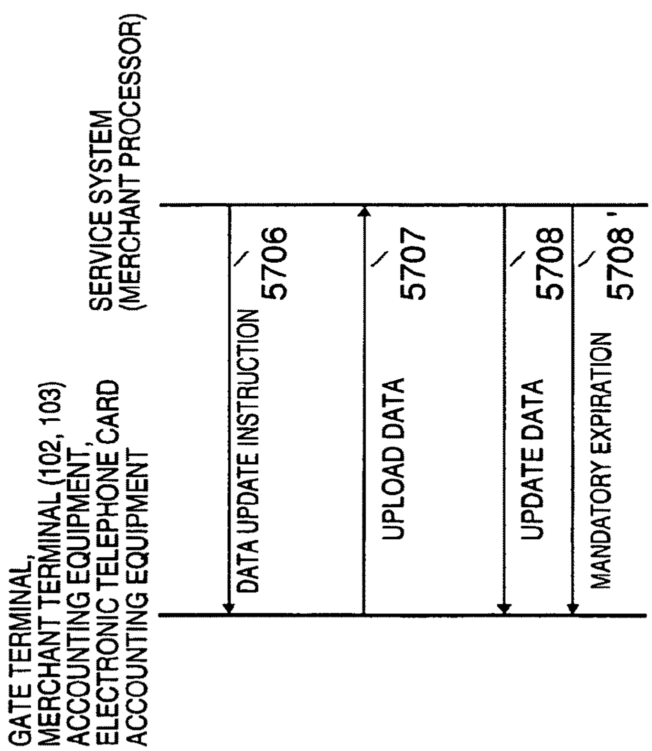
FIG. 57C is a flowchart showing a forcible data update process performed by the gate terminal (or the merchant terminal 102 or 103, the accounting device, or the electronic telephone card accounting device) and the merchant processor.

In FIG. 57C is shown the forcible data updating processing performed by the service system 110 and the gate terminal 101 (the merchant terminal 102 or 103, the automatic vending machine 104, or the electronic telephone card accounting device 800).

When the data held by the gate terminal 101 (the merchant terminal 102 or 103, the automatic vending machine 104, or the electronic telephone card accounting device 800) must be updated quickly because, for example, the terms of a contract with a user have been changed, first, the service system 110 generates a data update instruction 5706, which is a message instructing the performance of the forcible data updating process by the gate terminal 101 (the merchant terminal 102 or 103, the automatic vending machine 104, or the electronic telephone card accounting device 800), and transmits it to the mobile user terminal 100.

The gate terminal 101 (the merchant terminal 102 or 103, the automatic vending machine 104 or the electronic telephone card accounting device 800), generates data to be uploaded to the service system, and transmits upload data 5707, which is a message for uploading the internal data to the service system 100, and transmits it to the service system.

The service system examines the downloaded data, generates data for updating the gate terminal 101 (the merchant terminal 102 or 103, the automatic vending machine 104 or the electronic telephone card accounting device 800), and transmits update data 5708, which is a message for updating the data held by the mobile user terminal 100, to the gate terminal 101 (the merchant terminal 102 or 103, the automatic vending machine 104 or the electronic telephone card accounting device 800). The gate terminal 101 (the merchant terminal 102 or 103, the automatic vending machine 104 or the electronic telephone card accounting device 800) receives the update data 5708 and updates the internal data.

When the service system discovers an illegal alteration in the downloaded data, instead of the update data 5708 the service system transmits a mandatory expiration 5708', which is a message for the halting of the function of the gate terminal 101 (the merchant terminal 102 or 103, the automatic vending machine 104 or the electronic telephone card accounting device 800).

Figure 56D:
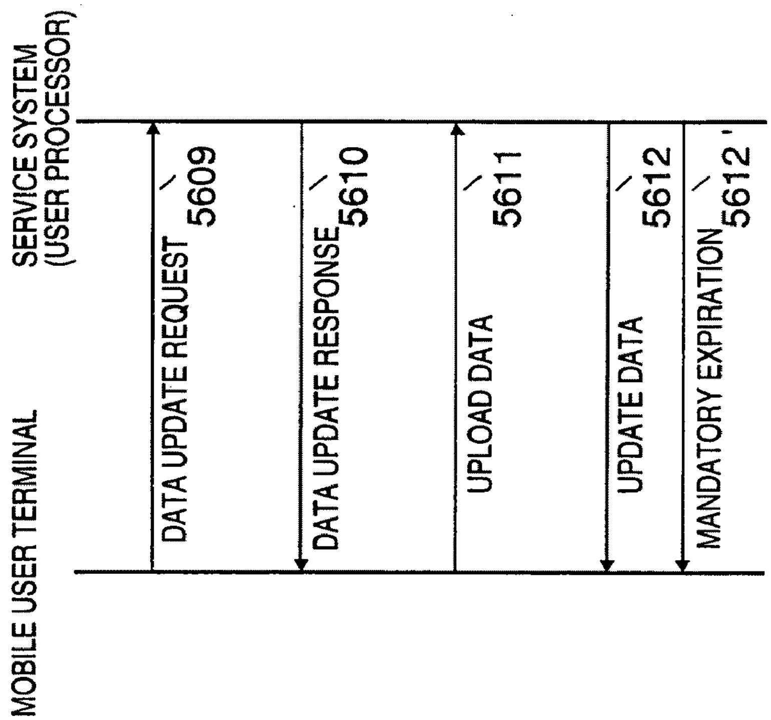
FIG. 56D is a flowchart showing a data backup process performed by the mobile user terminal and the user processor according to the embodiment of the present invention.

In FIG. 56D is shown the data backup processing performed by the mobile user terminal 100 and the service system 110. The data backup process is performed substantially in the same manner as for the data updating process. It should be noted, however, that the mobile user terminal 100 begins the data backup process when the remaining battery capacity is reduced until it is equal to or lower than Q, and further, that after the mobile user terminal 100 receives update data 5612 and updates the internal data, the mobile user terminal 100 prohibits the entry of new data until an adequate battery capacity has been attained.

Figure 57D:
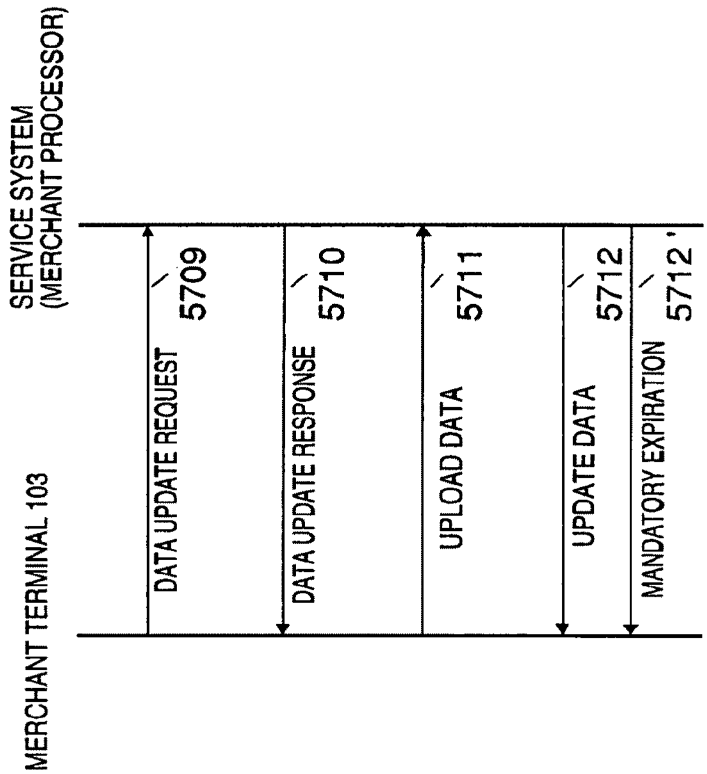
FIG. 57D is a flowchart showing a data backup process performed by the gate terminal (or the merchant terminal 102 or 103, the accounting device, or the electronic telephone card accounting device) and the merchant processor.

Similarly, in FIG. 57D is shown the data backup processing performed by the merchant terminal 103 and the service system 110. The data backup process is also performed substantially in the same manner as is the data updating process. It should be noted, however, that the merchant terminal 103 begins the data backup process when the remaining battery capacity is reduced until it is equal to or lower than Q, and further, that after the merchant terminal 103 receives update data 5712 and updates the internal data, the merchant terminal 103 prohibits the entry of new data until an adequate battery capacity has been attained.

A detailed explanation will be given later for the contents of the messages that are exchanged by the devices during the individual processes performed by the above network hierarchical storing and management function.

An explanation will now be given for the management of an electronic ticket, an electronic payment card, and an electronic telephone card that are issued.

In this system, the electronic ticket, the electronic payment card, and the electronic telephone card are managed separately, since while one will be registered another will not. Registration in this case means that a user registers, with the service system, an electronic ticket, an electronic payment card, or an electronic telephone card that he or she will use personally.

Since in this system an electronic ticket, an electronic payment card, or an electronic telephone card that has been purchased can be transferred to another user, a purchaser does not always use what he or she has bought. In particular, a large number of electronic payment cards or electronic telephone cards, such as magnetic telephone cards, are expected to be maintained in the sleeping state and not used.

If an unused electronic ticket, an unused electronic payment card and an unused electronic telephone card are managed in the same manner as those that are to be used, the system operation is very wasteful. Therefore, this system manages the tickets or cards that are to be used and those that are not to be used separately.

Specifically, the electronic ticket, electronic payment card or electronic telephone card that is purchased or transferred is managed by the user information server 902 of the service system 110, while it is regarded as being owned by the user. Before the user employs the electronic ticket, electronic payment card or electronic telephone card, he or she registers it with the service system. The service system registers, in the service director information server 901, the electronic ticket, electronic payment card or electronic telephone card as one that is being used by the user. The registration process can be performed any time and anywhere by employing digital wireless telephone communication.

A detailed explanation will be given later for the registration of an electronic ticket, an electronic payment card, or an electronic telephone card.

The mobile electronic commerce services provided by the system of the invention will now be explained.

Of the four services, an electronic ticket service will be described first.

The electronic ticket service mainly includes ten different processes: ticket order, ticket purchase, ticket registration, ticket setup, ticket examination, ticket reference, ticket transfer, electronic ticket installation, ticket modification, and ticket refund.

The ticket order process is a process whereby a user applies for an electronic ticket to the ticket issuer. The ticket purchase process is a process whereby the user purchases the electronic ticket applied for through the ticket order. The ticket registration process is a process whereby a user registers, with the service system, a ticket that he or she has purchased or has been given. The ticket setup process is a process whereby an operator (merchant) of a gate terminal 101 sets up a ticket for examination at the gate terminal. The ticket reference process is a process whereby the gate terminal queries the service system concerning the validity of an electronic ticket that is examined. The ticket transfer process is a process whereby an electronic ticket is transferred. The electronic ticket installation process is a process whereby an electronic ticket is installed in the mobile user terminal 100 using an electronic ticket installation card. The ticket modification process is a process whereby the ticket issuer changes the contents of a ticket that has been issued. And the ticket refund process is a process whereby the cost of a ticket, calculated while taking into consideration any alterations to the ticket, is refunded.

Figure 58:
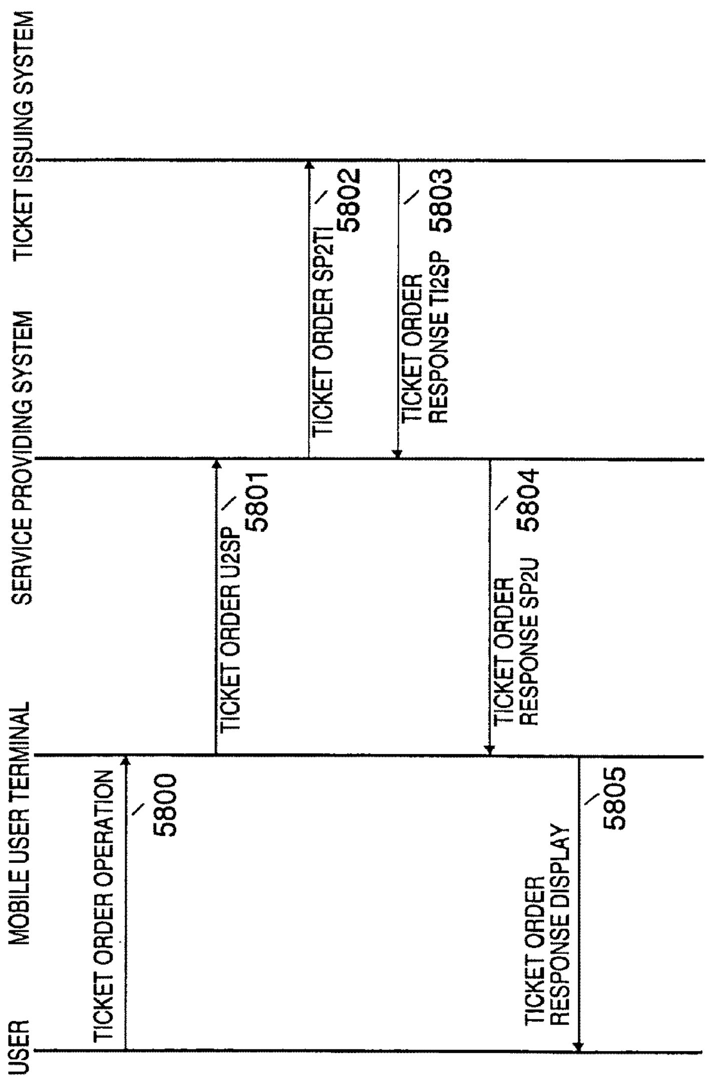
FIG. 58 is a flowchart showing ticket order processing according to the embodiment of the present invention.

In FIG. 58 is shown the ticket order processing.

First, the user sets the mobile user terminal 100 to the ticket mode and uses the function switch (F4) to display the operating menu for the ticket mode. The user then selects "ticket purchase," and the ticker order screen is displayed on the LCD. Following this, the user employs the function switch 307 and the number key switch 308 to select a ticket issuer and to enter an order code for a desired ticket, a desired date and a desired number of tickets, and depresses the execution switch 311 (ticket order operation 5800). The mobile user terminal transmits, to the service system, a ticket order 5801, which is a message used to apply for an electronic ticket. Upon receiving the ticket order 5801, the service system transmits, to the ticket issuing system 107, a ticket order 5802, which is a message for applying for a ticket.

Upon receiving the ticket order 5802 at the ticket issuing system, the ticket issuing server 1100 employs the customer information in the customer information server 1101 and the information concerning the ticket issuance condition in the ticket information server 1103, and generates a ticket order response 5803, which is a response message for the ticket order 5802. Thereafter, the ticket order response 5803 is transmitted to the service system.

When the ticket that the user desires can be issued, the ticket order response 5803 includes a seat number for the ticket to be issued and a ticket sales offer (ticket sales offer), which conveys the price quoted for the ticket. When the ticket that the user desires can not be issued, the ticket sales offer is not included.

Upon receiving the ticket order response 5803, the service system generates a ticket order response 5804, which is a response message for the ticket order 5801, and transmits it to the mobile user terminal.

Upon receiving the ticket order response 5804, the mobile user terminal displays the contents of the ticket order response 5804 on the LCD 303 (display of the ticket order response: 5805). When the ticket sales offer is included in the ticket order response 58034, the ticket sales offer is displayed on the LCD. When the ticket sales offer is not included, a message indicating the ticket can not be issued (response message 9016: FIG. 90B) is displayed on the LCD.

Figure 59:
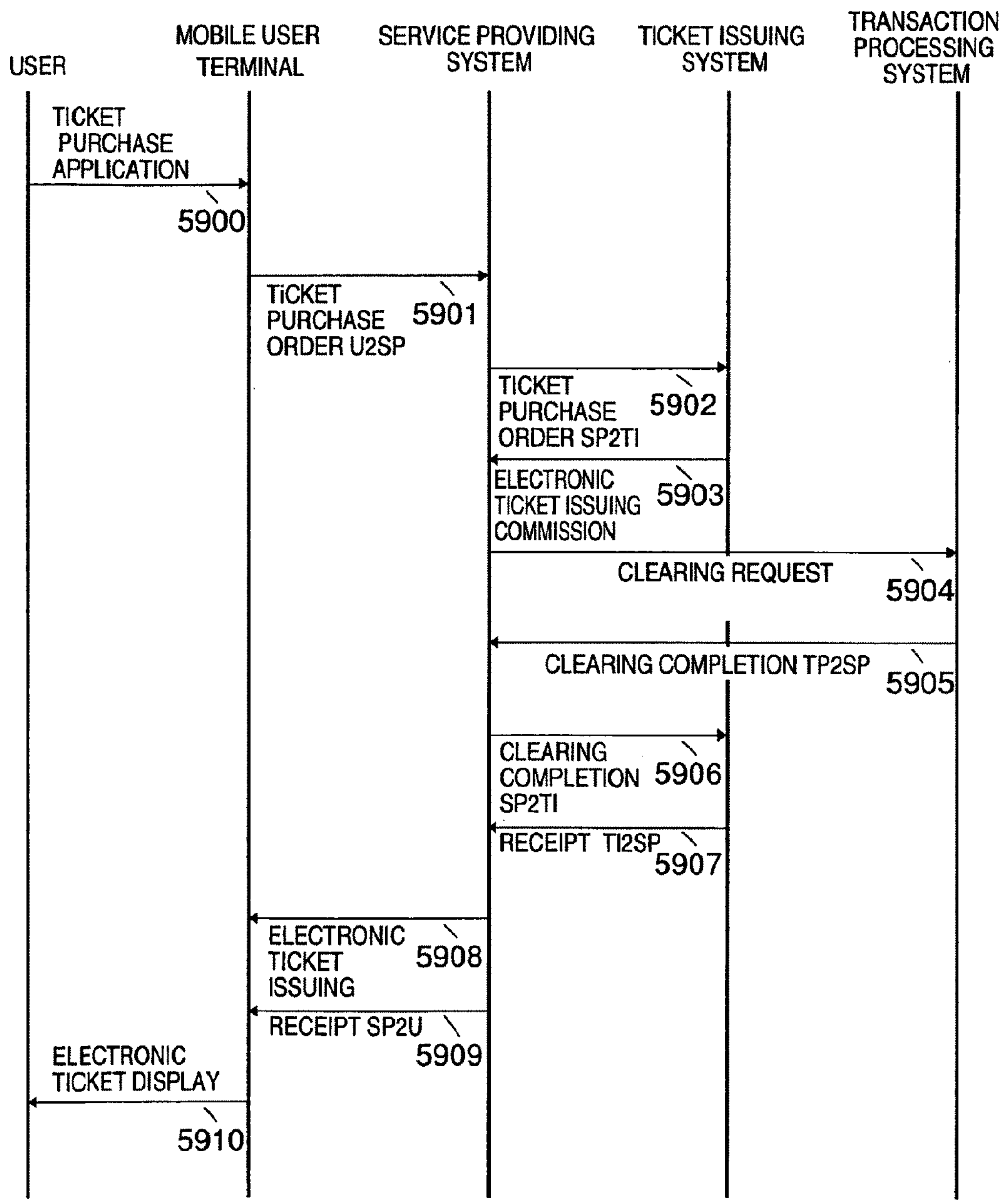
FIG. 59 is a flowchart showing ticket purchase processing (spontaneous settlement) according to the embodiment of the present invention.

In FIG. 59 is shown the ticket purchase processing.

The ticket purchase processing is initiated when the ticket sales offer is displayed on the LCD as the result of the ticket order process.

The ticket sales offer includes two operating menus: "purchase" and "cancel." When "cancel" is selected, the ticket sales offer is canceled. When "purchase" is selected, the purchase order screen appears on the LCD. On the purchase order screen the user designates a credit card to be used for payment and the number of payments, enters a code number, and depresses the execution switch 311 (ticket purchase order operation 5900). Then, the mobile user terminal transmits, to the service providing system, a ticket purchase order 5901, which is an order message for the purchase of an electronic ticket. Upon receiving the ticket purchase order 5901, the service providing system transmits, to the ticket issuing system 107, a ticket purchase order 5902, which is an order message for the purchase of a ticket.

Upon the ticket purchase order 5902 being received by the ticket issuing system, the ticket issuing server 1100 updates the data in the customer information server 1101, in the ticket issuing information server 1102, and in the ticket information server 1103. The ticket issuing server 1100 generates ticket data for the ordered ticket, and transmits, to the service providing system, an electronic ticket issuing commission 5903, which is a message requesting the issuance of a corresponding electronic ticket and the establishment of a ticket price.

Upon receiving the electronic ticket issuing commission 5903, the service providing system transmits, to the transaction processing system, a clearing request 5904, which is a message requesting the clearance of the price of the ticket.

Upon the clearing request 5904 being received by the transaction processing system, the transaction server 1000 updates data in the subscriber information server 1001, in the member store information server 1002 and in the transaction information server 1003, performs a clearing process for the credit card, and transmits to the service providing system a clearing completion notification 5905, which is a message indicating the clearing process has been completed.

Upon receiving the clearing completion notification 5905, the service providing system generates a clearing completion notification 5906, which is a message indicating the clearing process has been completed, and transmits it to the ticket issuing system. In addition, the service providing system generates an electronic ticket to be issued to the user.

Upon receiving the clearing completion notification 5906, the ticket issuing system generates and transmits to the service providing system a receipt 5907, which is a message corresponding to the receipt of the ticket sale.

Based on the received receipt 5907, the service providing system generates a receipt 5909, which is a receipt message for the user, and transmits it to the mobile user terminal, together with an electronic ticket issuance message 5908 that includes the electronic ticket that is generated.

Upon receiving the electronic ticket issuance message 5908 and the receipt 5909, the mobile user terminal displays the purchased electronic ticket on the LCD (display the electronic ticket: 5910). At this time, a dialogue message is also displayed on the LCD to register the electronic ticket that has been purchased. When the user selects "register," the mobile user terminal initiates the ticket registration process.

Figure 65A:
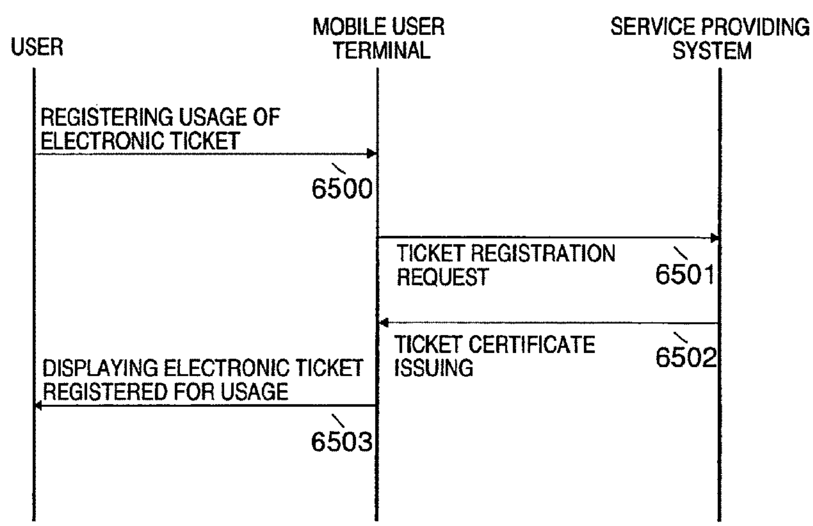
FIG. 65A is a flowchart showing ticket registration processing according to the embodiment of the present invention.

The ticket registration processing is shown in FIG. 65A.

The ticket registration process is begun when the dialogue message is displayed on the LCD to register an electronic ticket for use. To display the dialogue message for the registration for use, the execution switch 311 is depressed immediately after the electronic ticket is purchased, or while an electronic ticket that has not yet been registered is displayed ("unregistered" is displayed for the state of the ticket).

The dialogue message for registration has two operating menus: "register" and "cancel."

When the user selects "cancel," the ticket registration process is canceled. When the user selects "register" (registration operation for an electronic ticket: 6500), the mobile user terminal transmits, to the service providing system, a ticket registration request 6501, which is a message requesting the registration of an electronic ticket. In the service providing system, the service server 900 compares the contents of the received ticket registration request 6501 with the user information in the user information server 902. The service server 900 updates the management information that is stored in the service director information server 901 for an electronic ticket that has been registered. The service server 900 registers the electronic ticket, and transmits, to the mobile user terminal, a ticket certificate issuance message 6502 that includes a certificate for the registered electronic ticket.

Upon receiving the ticket certificate 6502, the mobile user terminal displays the registered electronic ticket on the LCD ("registered" is displayed as the state of the ticket) (display a registered ticket: 6503).

Figure 66:
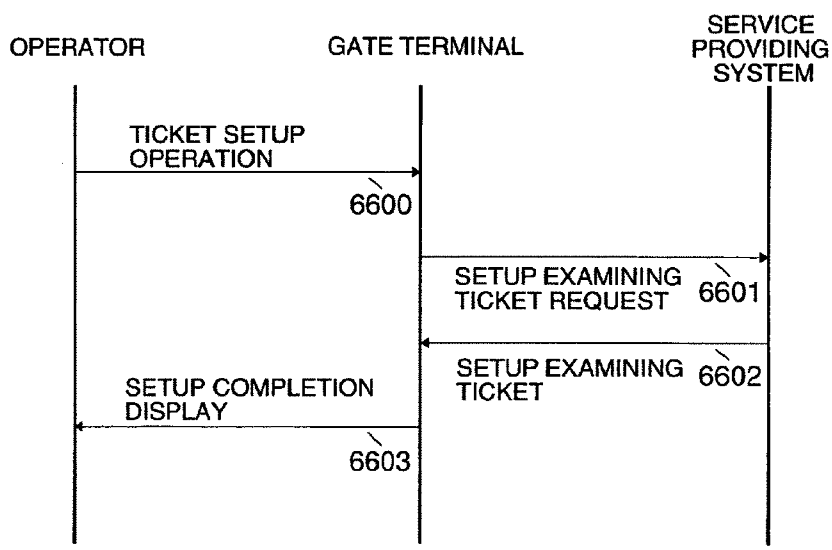
FIG. 66 is a flowchart showing ticket setup processing according to the embodiment of the present invention.

The examination target ticket processing is shown in FIG. 66.

The gate terminal 101 may perform the data updating processing to set up an electronic ticket for examination. In this embodiment, however, the merchant sets up a target ticket.

First, the operator (merchant) of the gate terminal 101 sets the gate terminal to the ticket setup mode, and displays the setup screen on the touch panel LCD 401. The operator (merchant) then employs the number key switch 403 to enter the ticket code that designates the electronic ticket that is to be set up for the gate terminal, and presses the "set" button on the screen (ticket setup operation 6600). Then, the gate terminal transmits, to the service providing system, a ticket setup request 6601, which is a message requesting the setup of the designated electronic ticket.

Upon receiving the ticket setup request 6601, the service providing system transmits, to the mobile user terminal, a ticket setup message 6602 that includes an examination program module for the designated electronic ticket.

Upon receiving the ticket setup message 6602, the mobile user terminal displays, on the touch panel LCD, a message indicating that the ticket setup processing has been completed (setup completion display 6603).

Figure 67:
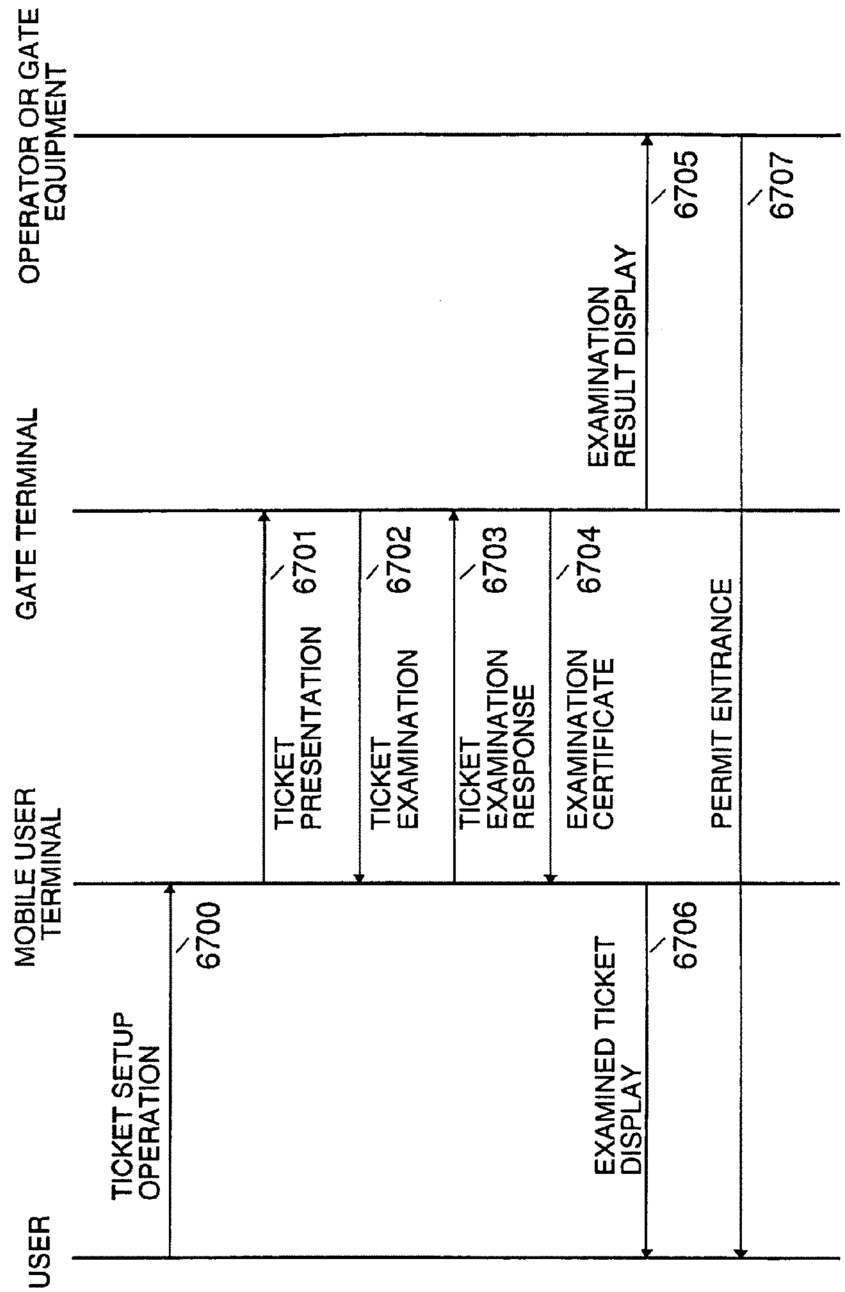
FIG. 67 is a flowchart showing ticket examination processing according to the embodiment of the present invention.

The ticket examination processing is shown in FIG. 67.

First, the user sets the mobile user terminal to the ticket mode and employs the function switch (F1 or F2) to display a ticket that is to be examined. The user depresses the execution switch 311, while directing the infrared communication port 300 toward the infrared communication module of the gate terminal (ticket presentation operation 6700). Then, through infrared communication, the mobile user terminal transmits, to the gate terminal, a ticket presentation message 6701 for presenting the contents of the ticket to the gate terminal.

Upon receiving the ticket presentation message 6701, the gate terminal examines the ticket type and transmits to the mobile user terminal, via infrared communication, a ticket examination message 6702 that includes a command for changing the state of the electronic ticket to the examined state.

Upon receiving the ticket examination message 6702, the mobile user terminal changes the state of the electronic ticket to the examined state, and transmits a ticket examination response 6703, which is a message indicating the changed state of the electronic ticket, to the gate terminal via the infrared communication.

Upon receiving the ticket examination response 6703, the gate terminal examines the contents of the ticket examination response 6703, and transmits an examination certificate 6704, which is a message indicating the electronic ticket has been examined, to the mobile user terminal via infrared communication. The results of the examination are displayed on the touch panel LCD (display examination results: 6705).

Upon receiving the examination certificate 6704, the mobile user terminal displays the examined ticket on the LCD ("examined" is displayed as the state of the ticket) (display the examined ticket: 6706).

Then, the operator (merchant) of the gate terminal permits the entrance of the user in accordance with the examination results that are displayed on the touch panel LCD (entrance permission 6707). When the gate opening/closing device is connected to the gate terminal, the gate is automatically opened (entrance permission 6707).

Figure 71:
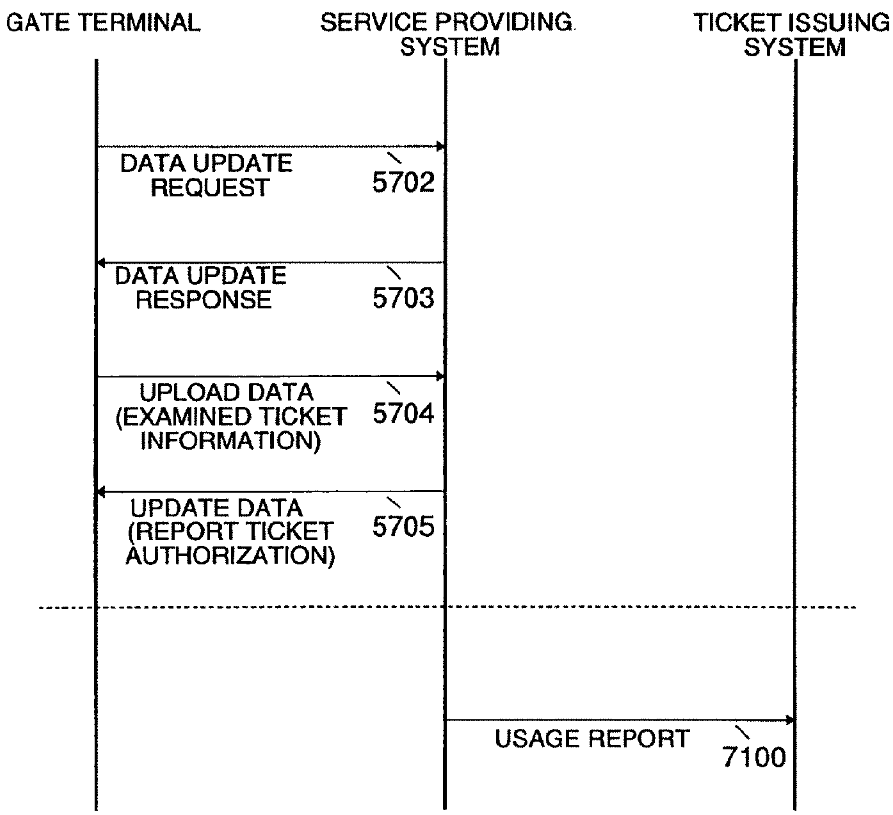
FIG. 71 is a flowchart showing ticket reference processing according to the embodiment of the present invention.

The ticket reference processing is shown in FIG. 71.

The ticket reference process is not performed in accordance with a special processing sequence, but is performed during the data updating processing during which the service providing system updates the data in the gate terminal.

When a time that has been set in advance is reached, the gate terminal automatically initiates the data updating process, and transmits, to the service providing system, a data update request 5702, which is a message requesting that the data updating process be performed.

The service providing system thereafter transmits, to the gate terminal, a data update response 5703, which is a message transmitted as a reply to the data update request 5702 that was received.

Figures 88A, 88B, 88C:
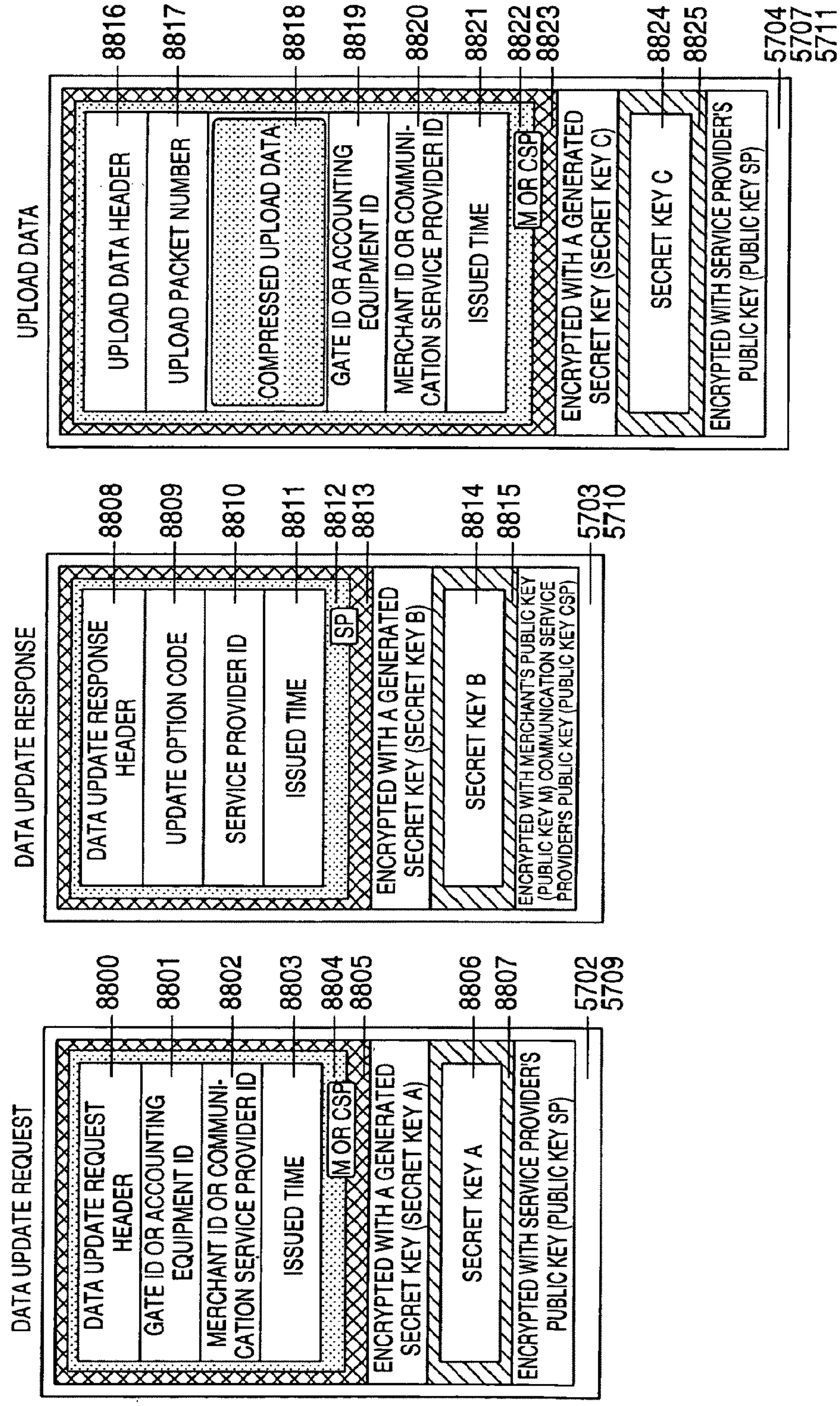

The data update response 5703 includes information indicating the range of the data that is to be uploaded (update option code 8809: FIG. 88B). Upon receiving the data update response 5703, the gate terminal generates and transmits, to the service providing system, upload data 5704, which is a message in which is included the data that is to be uploaded to the service providing system. At this time, the upload data 5704 includes information for a new electronic ticket that is being examined by the gate terminal.

In the service providing system, the service server 900 compares the received upload data 5704 with the data in the merchant information server 903, and generates data for updating the gate terminal. At this time, the service server 900 also compares information for the electronic ticket that is being examined by the gate terminal with the management information that is stored in the service director information server 901 for the registered electronic ticket, and examines the electronic ticket to determine whether it is valid. Then, the service server 900 transmits, to the gate terminal, an update data message 5705 that includes the data for updating the gate terminal. The update data for the gate terminal includes as information ticket reference results that indicate what results were obtained when the electronic ticket was examined to determine whether it was valid.

The gate terminal develops the update data that is included in the received update data message 5705, and updates the internal data. At this time, the ticket reference results are also stored on the hard disk at of the gate terminal. In accordance with the contract agreed to by the merchant and the service providing system, the ticket reference results may be transmitted to the merchant by electronic mail or by regular mail, instead of being included in the update data for the gate terminal.

If the firm represented by the merchant differs from that represented by the ticket issuer, and a payment for the merchant who handles the ticket is made by the ticket issuer, or if the usage of the ticket is periodically reported to the ticket issuer in accordance with the terms of a contract, in accordance with the results that are obtained by the ticket reference process, the service providing system, for example, weekly generates a usage condition notification 7100, which is a message notifying the ticket issuer of the ticket usage condition, and transmits it to the ticket issuing system 107.

Figure 74:
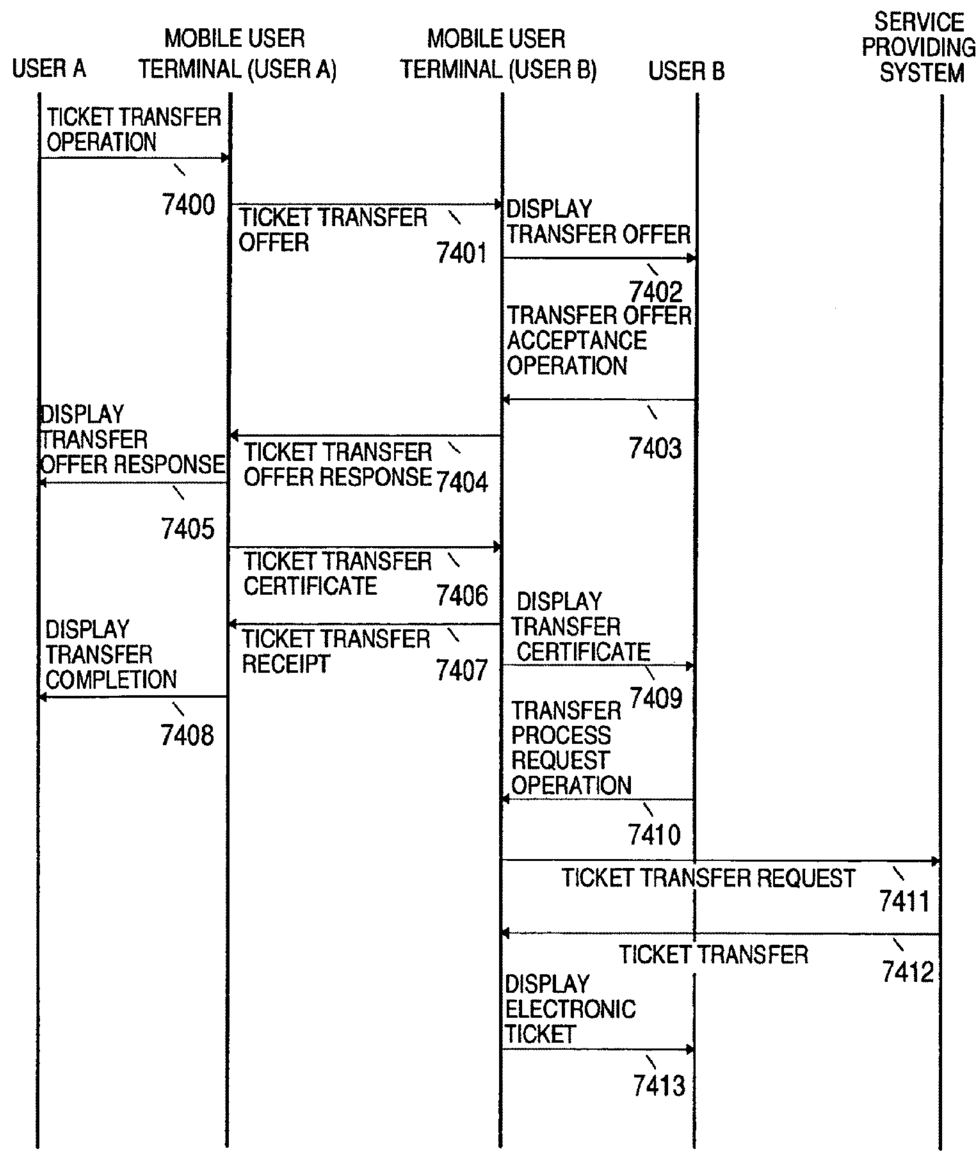
FIG. 74 is a flowchart showing ticket transfer processing according to the embodiment of the present invention.

In FIG. 74 is shown the ticket transfer processing.

In FIG. 74 is shown a case where user A transfers an electronic ticket to user B. The basic processing is the same whether infrared communication or digital wireless communication is employed by the users A and B.

First, an explanation will be given when infrared communication is employed between the users A and B.

The ticket transfer process is initiated when the users A and B orally agree to the transfer of an electronic ticket.

First, user A sets the mobile user terminal to the ticket mode, and employs the function switch (F1 or F2) to display on the LCD a ticket that is to be transferred. User A depresses the function switch (F3) to display the operating menu for the electronic ticket, and selects "ticket transfer." Thereafter, the user A depresses the execution switch while directing the infrared communication port toward the infrared communication port of the mobile user terminal of user B (ticket transfer operation 7400). Then, via infrared communication, the mobile user terminal belonging to user A transmits, to the mobile user terminal belonging to user B, a ticket transfer offer 7401, which is a message offering to transfer an electronic ticket.

Upon receiving the ticket transfer offer 7401, the mobile user terminal belonging to user B examines the contents of the ticket transfer offer 7401, and displays on the LCD the contents of the electronic ticket that is to be transferred (display transfer offer: 7402).

User B confirms the contents displayed on the LCD, and depresses the execution switch, while directing the infrared communication port toward the infrared communication port of the mobile user terminal belonging to user A (transfer offer acceptance operation 7403). Then, via infrared communication, the mobile user terminal belonging to user B transmits, to the mobile user terminal belonging to user A, a ticket transfer offer response 7404, which is a message transmitted in response to the ticket transfer offer 7401.

The mobile user terminal of user A displays on the LCD the contents of the ticket transfer offer response 7404 (display the transfer offer response: 7405) that has been received. In addition, via infrared communication, the mobile user terminal of user A transmits to the mobile user terminal of user B a ticket transfer certificate 7406, which is a message corresponding to a certificate for the transfer of the electronic ticket to user B.

The mobile user terminal of user B examines the ticket transfer certificate 7406 that has been received, and via infrared communication transmits a ticket receipt 7407, which is a message stating that the electronic ticket has been transferred, to the mobile user terminal of user A.

Upon receiving the ticket receipt 7407, the mobile user terminal of user A displays on the LCD a transfer completion message (display transfer completion: 7408). The processing for the mobile user terminal of user A (sender) is thereafter terminated.

After transmitting the ticket receipt 7407, the mobile user terminal of user B displays on the LCD the ticket transfer certificate 7406 that has been received. The mobile user terminal also displays a dialogue message to ask the user whether the transfer process with the service server (the process for downloading a transferred electronic ticket from the service providing system) should be performed immediately (display the transfer certificate: 7409).

The dialogue message includes two operating menus: "transfer request" and "cancel." When "cancel" is selected, the current transfer process being performed with the service providing system is canceled. During the process (data updating process) wherein the service providing system updates the data in the mobile user terminal of user B, the electronic ticket that has been transferred is set up as a part of the update data for the mobile user terminal of user B.

When user B selects "transfer request" (transfer request operation 7410), the mobile user terminal employs the ticket transfer certificate 7406 to generate a ticket transfer request 7411, which is a message requesting the transfer process be performed with the service providing system, and transmits the request 7411 to the service providing system via digital wireless telephone communication.

The service providing system examines the contents of the ticket transfer request 7411 that has been received, and via digital wireless telephone communication, transmits to the mobile user terminal of user B a ticket transfer message 7412 that includes the electronic ticket that was transferred by user A.

Upon receiving the ticket transfer message 7412, the mobile user terminal of user B displays the electronic ticket on the LCD (display the electronic ticket: 7413). The ticket transfer processing is thereafter terminated.

Next, an explanation will be given for digital wireless telephone communication between users A and B.

For this type of communication, the ticket transfer process is also initiated when users A and B orally agree on the transfer of an electronic ticket. At this time, users A and B are using digital wireless telephones to communicate with each other.

First, user A sets the mobile user terminal to the ticket mode and employs the function switch (F1 or F2) to display on the LCD a ticket to be transferred. User A then depresses the function switch (F3) to display the operating menu for the electronic ticket. The user selects "ticket transfer" and depresses the execution switch (ticket transfer operation 7400). Then, via digital wireless telephone communication, the mobile user terminal of user A transmits, to the mobile user terminal of user B, a ticket transfer offer 7401, which is a message offering to transfer an electronic ticket.

Upon receiving the ticket transfer offer 7401, the mobile user terminal of user B examines the contents of the ticket transfer offer 7401, and displays on the LCD the contents of the electronic ticket that is to be transferred (display transfer offer: 7402).

The user B confirms the contents displayed on the LCD, and depresses the execution switch (transfer offer acceptance operation 7403). Then, through digital wireless telephone communication, the mobile user terminal of user B transmits, to the mobile user terminal of user A, a ticket transfer offer response 7404, which is a response message for the ticket transfer offer 7401.

The mobile user terminal of user A displays on the LCD the contents of the received ticket transfer offer response 7404 (display the transfer offer response: 7405). Thereafter, via digital wireless telephone communication, the mobile user terminal transmits to the mobile user terminal of user B a ticket transfer certificate 7406, which is a message corresponding to a certificate for the transfer of the electronic ticket to user B.

The mobile user terminal of user B examines the received ticket transfer certificate 7406 and via digital wireless telephone communication transmits a ticket receipt 7407, which is a message stating that the electronic ticket has been transferred to user B, to the mobile user terminal of user A.

Upon receiving the ticket receipt 7407, the mobile user terminal of user A displays a transfer completion message on the LCD (display transfer completion: 7408). The processing for the mobile user terminal of user A (sender) is thereafter terminated.

After transmitting the ticket receipt 7407, the mobile user terminal of user B displays on the LCD the received ticket transfer certificate 7406. Also, the mobile user terminal displays a dialogue message asking the user whether the transfer process with the service server (the process for downloading a transferred electronic ticket from the service providing system) should be performed immediately (display the transfer certificate: 7409).

Included in the dialogue message are two operating menus: "transfer request" and "cancel." When "cancel" is selected, the current transfer process that is being conducted with the service providing system is canceled. During the process (data updating process) whereby the service providing system updates the data in the mobile user terminal of user B, the electronic ticket that has been transferred is set in the mobile user terminal of user B as a part of the update data.

When the user B selects "transfer request" (transfer request operation 7410), the mobile user terminal disconnects the communication line leading from user A and connects the digital wireless telephone communication line with the service providing system. Then, the mobile user terminal employs the ticket transfer certificate 7406 to generate a ticket transfer request 7411, which is a message requesting the transfer process be performed with the service providing system, and transmits the request 7411 to the service providing system via digital wireless telephone communication.

The service providing system examines the contents of the received ticket transfer request 7411, and via digital wireless telephone communication, transmits to the mobile user terminal of user B a ticket transfer message 7412 that includes the electronic ticket that is being transferred by user A.

Upon receiving the ticket transfer message 7412, the mobile user terminal of user B displays the electronic ticket on the LCD (display the electronic ticket: 7413). The ticket transfer processing is thereafter terminated.

Figure 77:
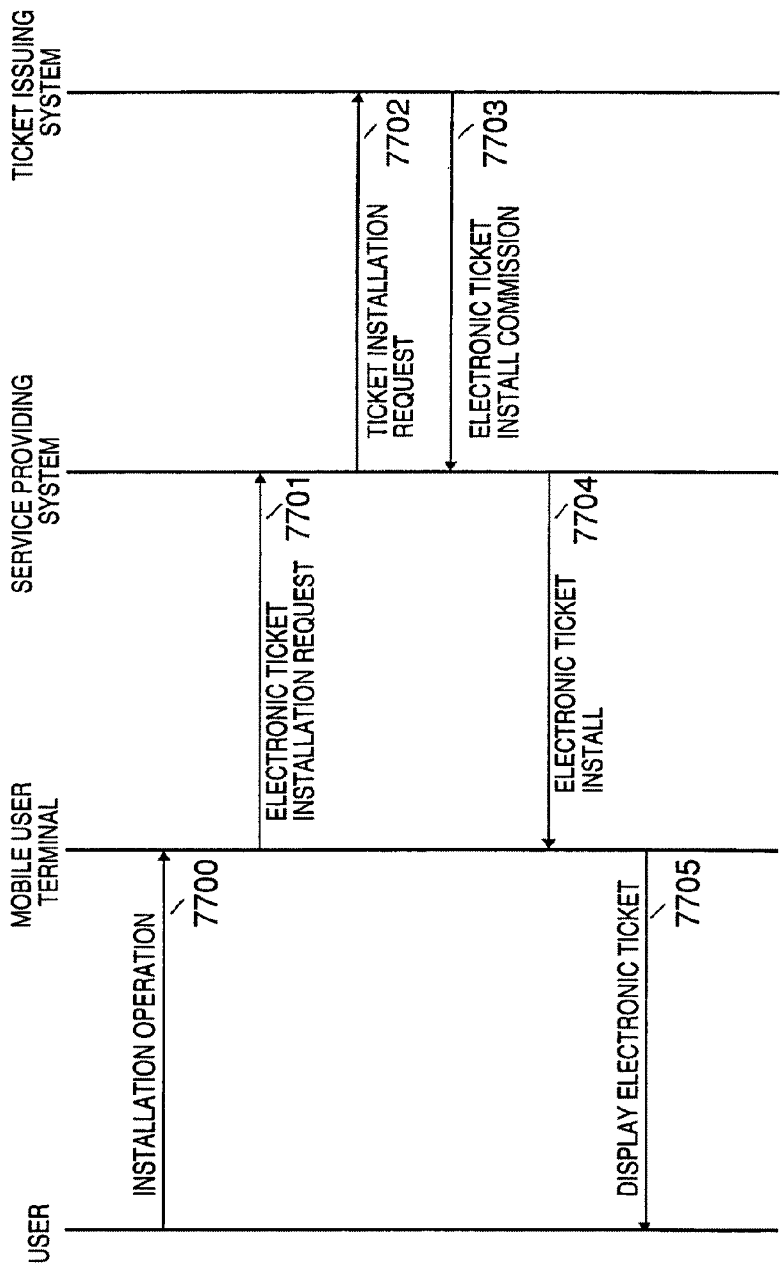
FIG. 77 is a flowchart showing electronic ticket installation processing according to the embodiment of the present invention.

In FIG. 77 is shown the electronic ticket installation processing.

First, the user sets the mobile user terminal to the ticket mode and employs the function switch (F4) to display the operating menu for the ticket mode. The user then selects "install" and displays the installation screen on the LCD. Thereafter, the user employs the number key switches to enter the installation card number and the installation number that are printed on the electronic ticket installation card, and depresses the execution switch 311 (installation operation 7700). The mobile user terminal then transmits to the service providing system 110 an installation request 7701, which is a message requesting the installation of an electronic ticket.

The service providing system 10 specifies an installation card issuer by referring to the installation card number that is included in the received electronic ticket installation request 7701, and transmits to the ticket issuing system of that issuer a ticket installation request 7702, which is a message requesting that a ticket be issued.

In the ticket issuing system, the ticket issuing server 1100 compares the installation card number and the installation number, which are included in the ticket installation request 7702 that has been received, with the management information that is stored in the ticket issuing information server 1102 for the electronic ticket installation cards that have been issued. In addition, the ticket issuing server 1100 updates the data in the customer information server 1101 in the ticket issuing information server 1102, and in the ticket information server 1103. The ticket issuing server 1100 then generates the data for the requested ticket, and transmits to the service providing system an electronic ticket installation commission 7703, which is a message requesting the installation of an electronic ticket that corresponds to the ticket that has been requested.

Upon receiving the electronic ticket installation commission 7703, the service providing system generates an electronic ticket, and to install the electronic ticket in the mobile user terminal, transmits to the mobile user terminal an electronic ticket installation message 7704.

The mobile user terminal installs the electronic ticket that is included in the received electronic ticket installation message 7704, and displays on the LCD the installed electronic ticket (display the electronic ticket: 7705).

The ticket modification processing will now be described.

In the ticket modification process, the ticket issuer changes the contents of a ticket that has been issued. In accordance with that change, a program employed by the gate terminal for the examination of electronic tickets (ticket examination program) may be updated or an electronic ticket stored in the mobile user terminal may be changed, or both the program and the ticket may be changed.

First, an explanation will be given for a case wherein the ticket examination program of the gate terminal is updated.

Figure 80:
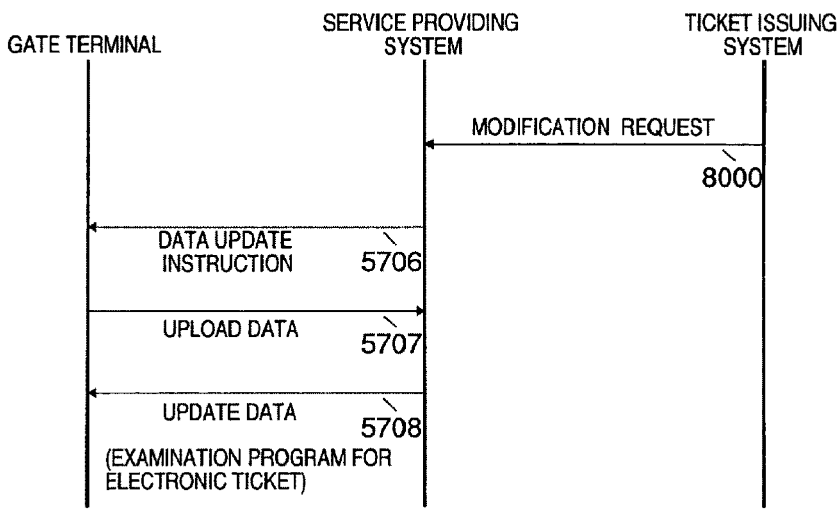
FIG. 80 is a flowchart showing ticket modification processing for the gate terminal according to the embodiment of the present invention.

In FIG. 80 is shown the ticket modification processing for the gate terminal. First, the ticket issuing system transmits to the service providing system a modification request 8000, which is a message requesting that the contents of a ticket that was issued be changed.

Upon receiving the modification request 8000, the service providing system performs the ticket modification processing for the gate terminal when the ticket examination program that is stored in the gate terminal has to be changed.

The ticket modification processing for the gate terminal is not performed in accordance with a special operating sequence, but by using a forcible data updating process during which the data held by the gate terminal is forcibly updated by the service providing system.

For the forcible data updating process, first, the service providing system transmits to the gate terminal a data update instruction 5706, which is a message instructing the updating of the data.

The data update instruction 5706 includes information describing the range of the data to be uploaded (update option code 8843: FIG. 88F). Upon receiving the data update instruction 5706, the gate terminal generates and transmits to the service providing system upload data 5707, which is a message in which is included data that is to be uploaded to the service providing system.

In the service providing system, the service server 900 compares the upload data 5707 that is received with the data in the merchant information server 903, and generates data for updating the gate terminal. At this time, the ticket examination program that has been changed is installed as data for the updating of the gate terminal. The service server 900 generates and transmits to the gate terminal an update data message 5708 that includes the data for updating the gate terminal.

The gate terminal develops the update data that is included in the update data message 5708 that has been received and updates the internal data. At this time, the ticket examination program is also updated.

Figure 81:
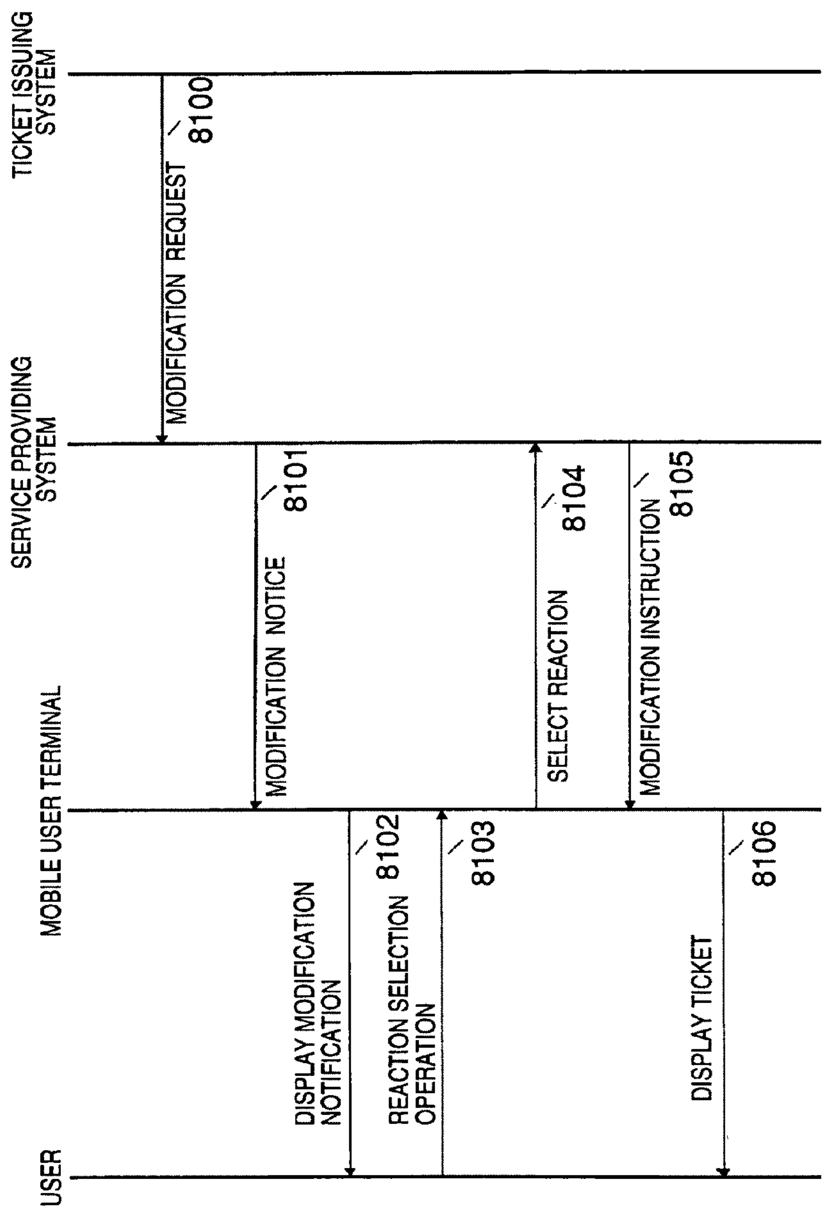
FIG. 81 is a flowchart showing ticket modification processing for the mobile user terminal according to the embodiment of the present invention.

An explanation will now be given for a case in which an electronic ticket held by the mobile user terminal is changed. In FIG. 81 is shown the ticket modification processing for the mobile user terminal. First, the ticket issuing system transmits to the service providing system a modification request 8100, which is a message requesting the changing of the contents of a ticket that has been issued. Upon receiving the modification request 8100, the service providing system performs the ticket modification process for the mobile user terminal of a user who owns an electronic ticket that must be altered. Using the modification request 8100, the service providing system generates, and transmits to the mobile user terminal, a modification notification 8101, which is a message employed to notify the user that the contents of the electronic ticket have been changed.

Upon receiving the modification notification 8101, the mobile user terminal outputs an audible signal to alert the user, and displays on the LCD a message featuring the altered contents of the electronic ticket and a message permitting the user to perform a complementary operation (display modification notification: 8102). When the date is changed, for example, a message describing the date change and a message permitting the user to select a complementary operation for the modification, "accept," "refuse" or "refund," are displayed.

Based on the messages displayed on the LCD, the user selects a complementary operation using the number key switches (reaction selection operation 8103). Then, the mobile user terminal generates a reaction selection message 8104, which conveys the reaction of the user to the modification notification 8101, and transmits it to the service providing system. When the user selects "refuse" or "refund," the mobile user terminal changes the state of the electronic ticket to the disabled state.

When the reaction selection message 8104 is received, and when "accept" is selected as the user's reaction to the modification notification 8101, the service providing system transmits to the mobile user terminal a modification instruction 8105, which is a message in which is included a new electronic ticket. When "refund" is selected, the service providing system initiates the ticket refund processing. When "refuse" is selected, the service providing system changes, to the disabled state, the state of the electronic ticket belonging to the pertinent user that is stored in the user information server 902, and terminates the ticket modification processing.

Upon receiving the modification instruction 8105, the mobile user terminal updates the electronic ticket that must be changed to an electronic ticket that is included in the modification instruction 8105, and displays the updated electronic ticket on the LCD (ticket display 8106).

Figure 82:
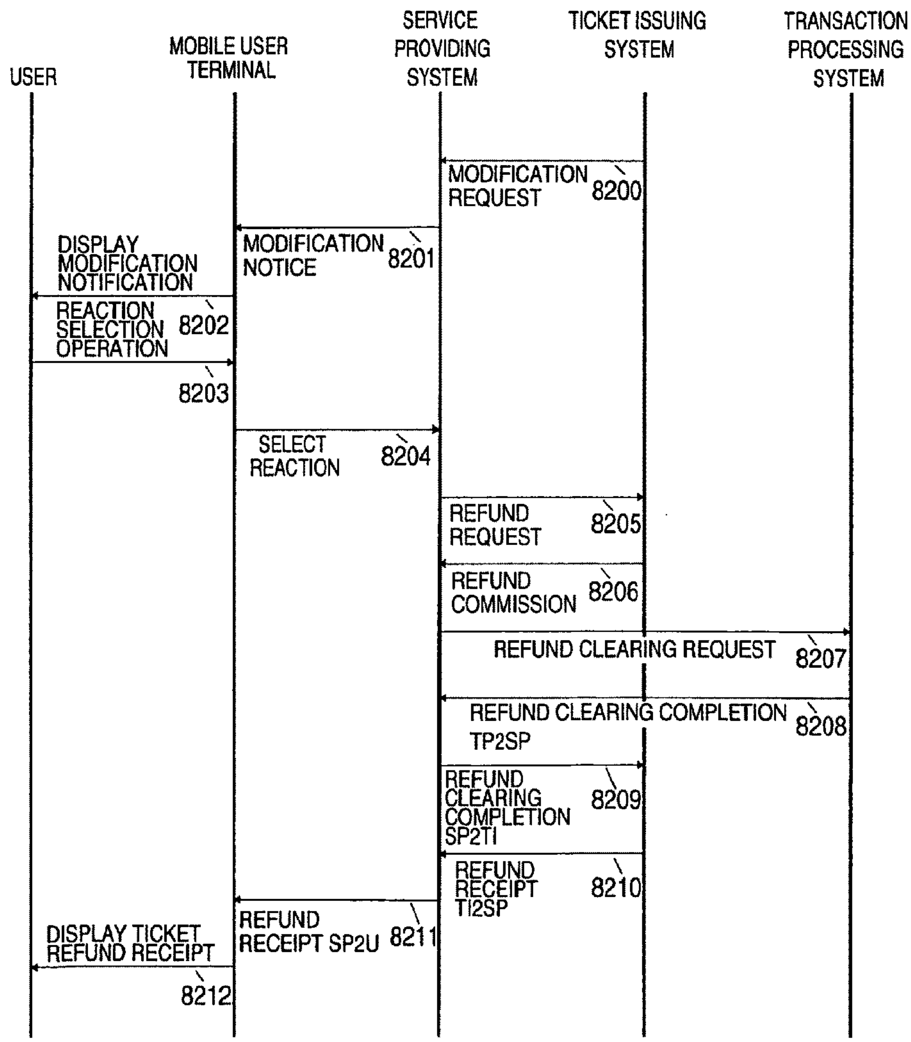
FIG. 82 is a flowchart showing ticket refund processing (spontaneous settlement) according to the embodiment of the present invention.

The ticket refund processing is shown in FIG. 82.

In the ticket refund processing, the procedures in the ticket modification processing (FIG. 81) are also performed until the mobile user terminal transmits a reaction selection message 8204 (8104) to the service providing system.

Upon receiving the reaction selection message 8204, the service providing system notes that the user's reaction to the modification notification 8101 is "refund," and transmits to the ticket issuing system a refund request 8205, which is a message requesting that the ticket issuer refund the amount charged for the ticket.

Upon the refund request 8205 being received by the ticket issuing system, the ticket issuing server 1100 updates the data in the customer information server 1101, the ticket issuing information server 1102 and the ticket information server 1103, and cancels the ticket that was issued. Then, the ticket issuing server 1100 generates a refund commission 8206, which is a message requesting that the service providing system refund the amount charged for the electronic ticket, and transmits the refund commission 8206 to the service providing system. Upon receiving the refund commission 8206, the service providing system transmits to the transaction processing system 106 a refund clearing request 8207, which is a message requesting that the ticket refund clearing process be performed.

Upon the refund clearing request 8207 being received at the transaction processing system, the transaction server 1000 updates the data in the subscriber information server 1001, the member store information server 1002 and the transaction information server 1103, and performs the refund clearing process. The transaction server 1000 then transmits to the service providing system a refund clearing completion notification 8208, which is a message stating that the refund clearing process has been completed.

In accordance with the received refund clearing completion notification 8208, the service providing system generates a refund clearing completion notification 8209, which is a message stating that the refund clearing process has been completed, and transmits it to the ticket issuing system. Upon receiving the refund clearing completion notification 8209, the ticket issuing system generates and transmits to the service providing system a refund receipt 8210 that corresponds to a receipt for the refund of the amount charged for the ticket.

The service providing system employs the refund receipt 8210 to generate a refund receipt 8211, which is a receipt message for a user, and transmits it to the mobile user terminal.

The mobile user terminal displays on the LCD 303 the received refund receipt 8211 (display the refund receipt: 8212). The ticket refund processing is thereafter terminated.

A detailed explanation will be given later for the contents of the messages that are exchanged by the devices during the above electronic ticket service processing.

The electronic payment card service will now be described.

The electronic payment card service mainly includes seven types of processes: an electronic payment card purchase process, an electronic payment card registration process, an electronic payment card setup process, an electronic payment card settlement process, an electronic payment card reference process, an electronic payment card transfer process, and an electronic payment card installation process.

The payment card purchase process is a process whereby the user purchases an electronic payment card from a payment card issuer. The payment card registration process is a process whereby, in the service providing system, the user registers for his or her own use a purchased payment card or one received as a gift. The payment card setup process is a process whereby the service provider determines the process to be employed for the electronic payment card at the merchant terminal 102 or 103 or at the automatic vending machine in accordance with a contract entered into with a merchant. The payment card settlement process is a process whereby the user employs the electronic payment card for a settlement process with the merchant terminal 102 or 103, or the automatic vending machine 104. The payment card reference process is a process whereby the merchant terminal 102 or 103 or the automatic vending machine 104 asks the service providing system whether the electronic payment card that is employed is valid. The payment card transfer process is a process for transferring an electronic payment card. And the electronic payment card installation process is a process for installing an electronic payment card in the mobile user terminal 100 using an electronic payment card installation card.

Figure 61:
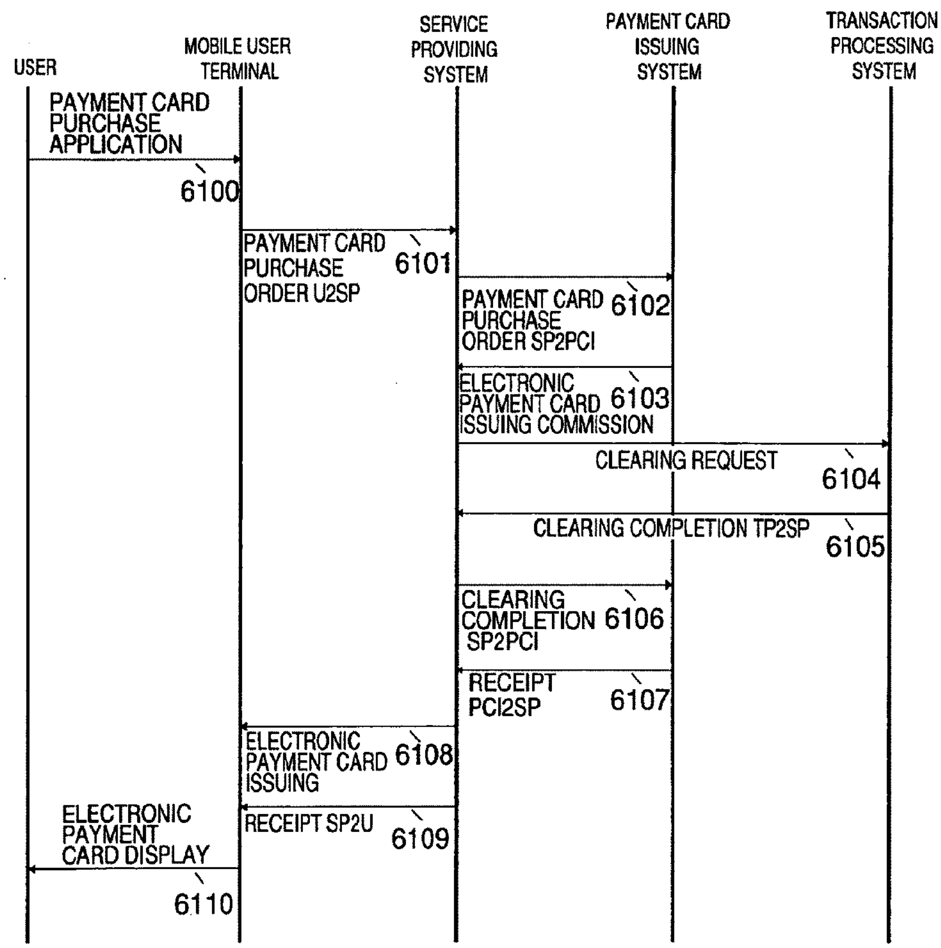
FIG. 61 is a flowchart showing payment card purchase processing (spontaneous settlement) according to the embodiment of the present invention.

In FIG. 61 is shown the payment card purchase processing.

First, the user sets the mobile user terminal 100 to the payment card mode, and uses the function switch (F4) to display the operating menu for the payment card mode. Thereafter, the user selects "payment card purchase," and the payment card order screen is displayed on the LCD. Then, by using the function switch 307 and the number key switches 308, the user selects a payment card issuer, enters the order code for a desired payment card and a desired number of payment cards, designates a credit card to be used for payment and the number of payments, and enters the code number. The user then depresses the execution switch 311 (payment card order operation 6100), and the mobile user terminal transmits, to the service providing system, a payment card order 6101, which is a message for applying for an electronic payment card. Upon receiving the payment card order 6101, the service providing system transmits, to the payment card issuing system 108, a payment card order 6102, which is a message used to apply for a payment card.

Upon the payment card order 6102 being received at the payment card issuing system, the payment card issuing server 1200 updates the data in the customer information server 1201, the payment card issuing information server 1202 and the payment card information server 1203. The payment card issuing server 1200 generates payment card data for the ordered payment card, and transmits, to the service providing system, an electronic payment card issuing commission 6103, which is a message requesting that a corresponding electronic payment card be issued and that the settlement process be performed for the price of the payment card.

Upon receiving the electronic payment card issuing commission 6103, the service providing system transmits, to the transaction processing system 106, a clearing request 6104, which is a message requesting that the price of the payment card be cleared.

Upon the clearing request 6104 being received at the transaction processing system, the transaction server 1000 updates data in the subscriber information server 1001, in the member store information server 1002 and in the transaction information server 1003, performs the clearing of the credit card, and transmits to the service providing system a clearing completion notification 6105, which is a message stating that the clearing process has been completed.

Upon receiving the clearing completion notification 6105, the service providing system generates a clearing completion notification 6106, which is a message stating that the clearing process has been completed, and transmits it to the payment card issuing system. In addition, the service providing system generates an electronic payment card to be issued to the user.

Upon receiving the clearing completion notification 6106, the payment card issuing system generates, and transmits to the service providing system, a receipt 6107, which is a message corresponding to the receipt for the sale of the payment card.

Based on the received receipt 6107, the service providing system generates a receipt 6109, which is a receipt message for the user, and transmits it to the mobile user terminal, together with an electronic payment issuance message 6108 that includes the electronic payment card that has been generated.

Upon receiving the electronic payment card issuance message 6108 and the receipt 6109, the mobile user terminal displays the purchased electronic payment card on the LCD (display the electronic payment card: 6110). At this time, a dialogue message is also displayed on the LCD for registering the electronic payment card that has been purchased. Then, when the user selects "register," the mobile user terminal initiates the payment card registration process.

Figure 65B:
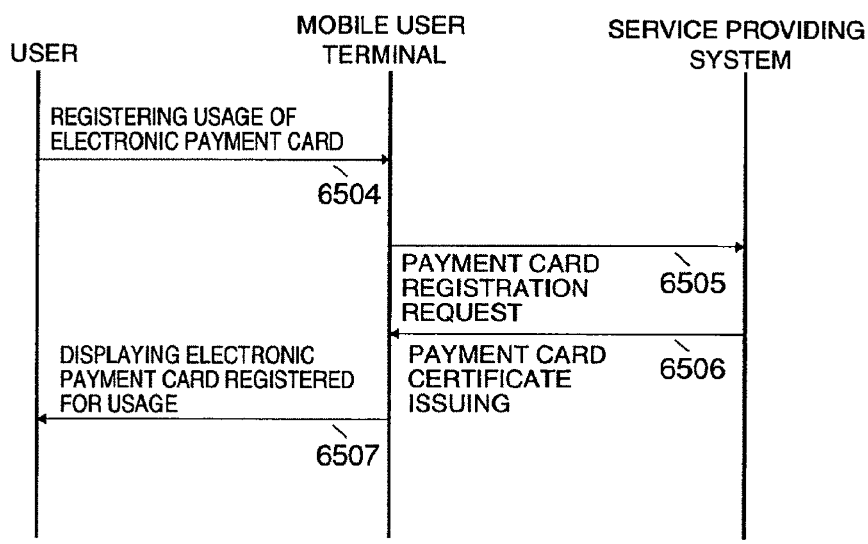
FIG. 65B is a flowchart showing payment card registration processing according to the embodiment of the present invention.

The payment card registration processing is shown in FIG. 65B.

The payment card registration process is begun when the dialogue message for registering an electronic payment card for use is displayed on the LCD. To display the dialogue message for the use registration, the execution switch 311 is depressed immediately after the electronic payment card is purchased, or while an electronic payment card that has not yet been registered is displayed ("unregistered" is displayed as the state of the payment card).

The dialogue message for registration has two operating menus: "register" and "cancel." When the user selects "cancel," the payment card registration process is canceled. When the user selects "register" (registration operation of an electronic payment card: 6504), the mobile user terminal transmits, to the service providing system, a payment card registration request 6505, which is a message requesting the registration of an electronic payment card. In the service providing system, the service server 900 compares the contents of the received payment card registration request 6505 with the user information in the user information server 902. The service server 900 updates the management information that is stored in the service director information server 901 for an electronic payment card that has been registered. The service server 900 registers the electronic payment card, and transmits, to the mobile user terminal, a payment card certificate issuance message 6506, which includes a certificate for the registered electronic payment card.

Upon receiving the payment card certificate 6506, the mobile user terminal displays the registered electronic payment card on the LCD ("registered" is displayed as the state of the payment card) (display a registered payment card: 6507).

The payment card setup processing will now be described.

The payment card setup process is a process for, in accordance with a contract entered into by the service provider and the merchant, setting and updating an electronic payment card that is to be processed by the merchant terminal 102 or 103 or the automatic vending machine 104.

The payment card setup process is not performed according to a special processing sequence, but is performed during the data updating processing (FIG. 57B) when the service providing system updates the data in the merchant terminal 102 or 103 and the automatic vending machine 104.

When a time that has been set in advance is reached, the merchant terminal 102 or 103, or the automatic vending machine 104 automatically initiates the data updating process, and transmits, to the service providing system, a data update request 5702, which is a message requesting the performance of the data updating process.

The service providing system transmits, to the merchant terminal 102 or 103 or the automatic vending machine 104, a data update response 5703, which is a message dispatched in response to the receipt of the data update request 5702.

Upon receiving the data update response 5703, the merchant terminal 102 or 103 or the automatic vending machine 104 generates and transmits, to the service providing system, upload data 5704, which is a message in which is included data to be uploaded to the service providing system.

The service providing system compares the received upload data 5704 with the data in the merchant information server 903 and generates update data. At this time, an electronic payment card that is to be processed is updated, and information for the update is included in the update data.

Then, the service providing system transmits, to the merchant terminal 102 or 103 or the automatic vending machine 104, an update data message 5705 that includes the update data that has been generated. The merchant terminal 102 or 103 or the automatic vending machine 104 develops the update data that is included in the received update data message 5705, and updates the internal data. At this time, the electronic payment card that is processed by the merchant 102 or 103 or the automatic vending machine 104 is also updated.

Figure 68:
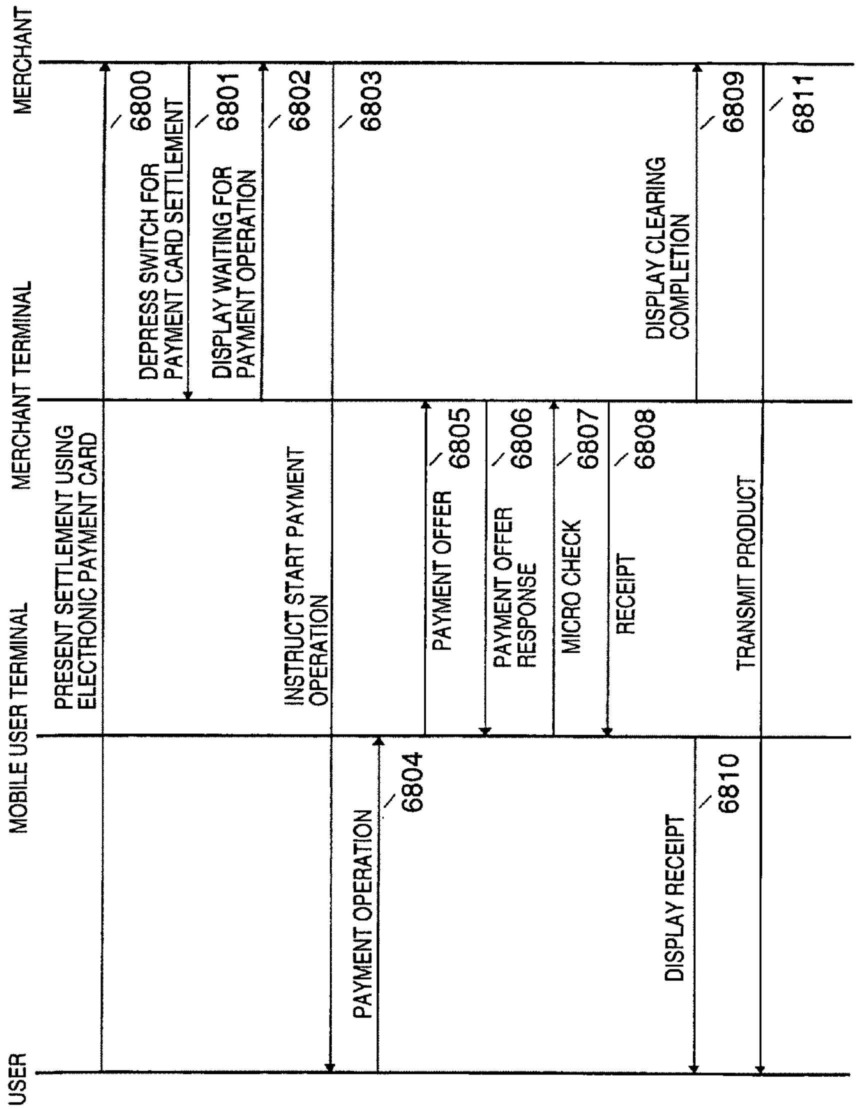
FIG. 68 is a flowchart showing payment card settlement processing performed by the mobile user terminal and the merchant terminal 102 (or the merchant terminal 103) according to the embodiment of the present invention.

In FIG. 68 is shown the payment card settlement processing performed by the mobile user terminal 100 and the merchant terminal 102 or 103.

First, the user notifies the merchant that an electronic payment card will be employed for the payment (instruct settlement to be made with an electronic payment card: 6800).

The merchant thereafter depresses the payment card settlement switch 512 (the function switch F2 for the merchant terminal 102) (depress the payment card settlement switch: 6801), and permits the user to start the payment operation (instruct the start of the payment operation: 6803). At this time, the total charge and a message indicating that the merchant terminal is waiting for the user to initiate the payment operation are displayed on the LCD of the merchant terminal 102 or 103 (display "waiting for payment operation": 6802).

The user sets the mobile user terminal to the payment card mode, employs the function switch (F1 or F2) to display a payment card to be used for the payment, and enters the payment amount using the number key switches. Then, while directing the infrared communication port 300 toward the infrared communication module of the merchant terminal (the infrared communication port for the merchant terminal 103), the user depresses the execution switch 311, (payment operation 6804). The amount entered by the user may be equal to or greater than the charge.

The mobile user terminal generates a payment offer 6805 that includes the payment amount entered by the user and information regarding the electronic payment card designated by the user, and that is a message offering to pay the merchant an amount equal to the price. The payment offer 6805 is transmitted to the merchant terminal via infrared communication.

Upon receiving the payment offer 6805, the merchant terminal examines the type of payment card, the payment amount and the remaining amount, and via infrared communication, transmits to the mobile user terminal a payment offer response 6806, which is a response message for the payment offer 6805. The payment offer response 6806 includes information regarding the amount charged.

Upon receiving the payment offer response 6806, the mobile user terminal confirms that the amount charged is equal to or lower than the payment amount entered by the user. The user subtracts the amount charged from the total remaining amount held by the electronic payment card, and generates a micro-check 6807, which is a message corresponding to a check on which the amount charged is given as the face value. The micro-check 6807 is transmitted to the merchant terminal via infrared communication.

The merchant terminal examines the contents of the received micro-check 6807 and generates a receipt 6808, which is a message corresponding to a message for the micro-check 6807 that has been paid. The merchant terminal transmits the receipt 6808 to the mobile user terminal via infrared communication, and displays, on the LCD, a message indicating that the payment card clearing process has been completed (display clearing completion: 6810).

A product is thereafter delivered by the merchant to the user (delivery of a product: 6811).

Figure 69:
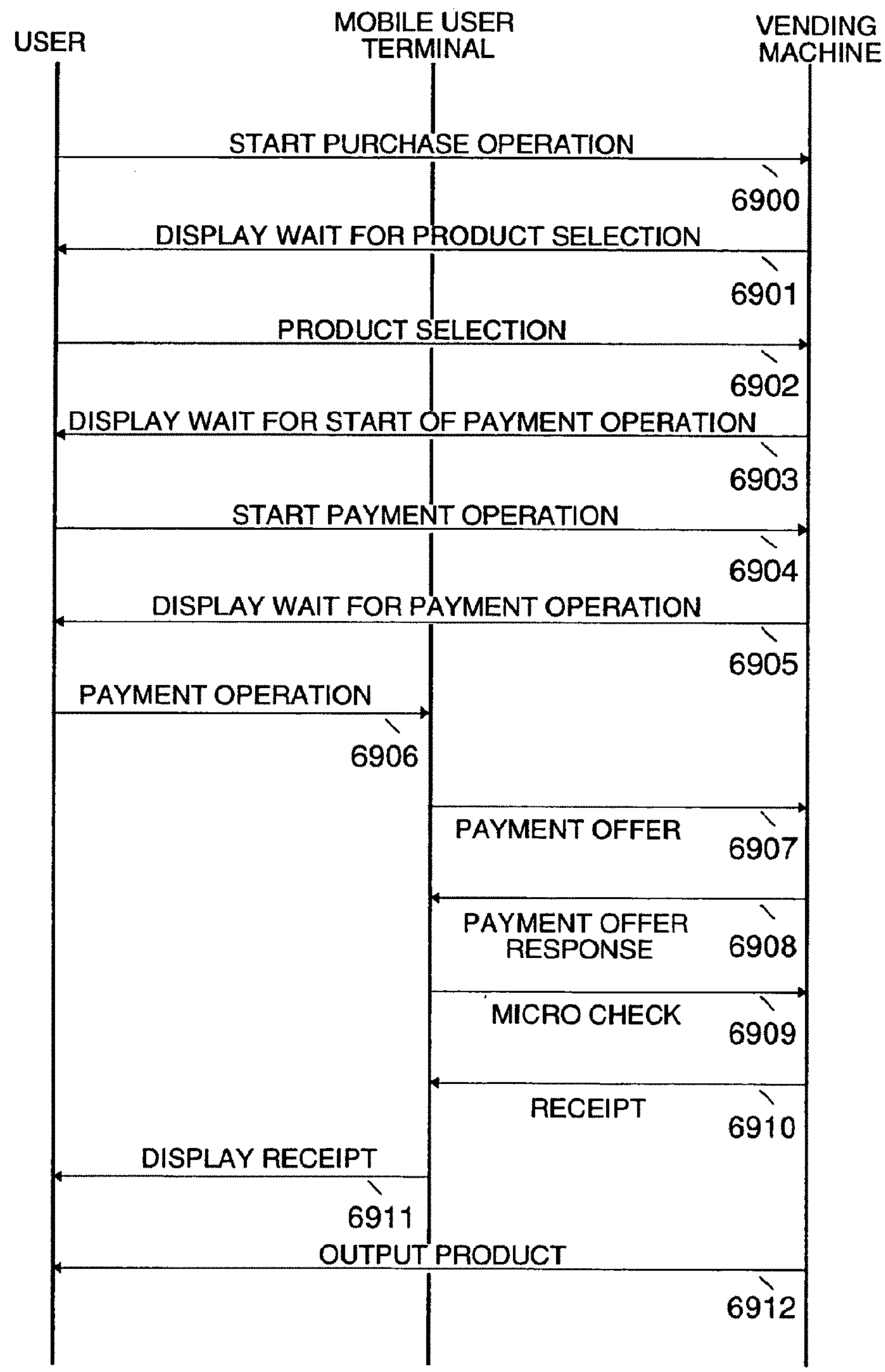
FIG. 69 is a flowchart showing payment card settlement processing performed by the mobile user terminal and the automatic vending machine according to the embodiment of the present invention.

In FIG. 69 is shown the payment settlement processing performed by the mobile user terminal 100 and the automatic vending machine 104.

First, the user selects "purchase" from the operating menu that is displayed on the touch panel LCD of the automatic vending machine (purchase start operation 6900). The automatic vending machine then displays, on the touch panel LCD, a message permitting the user to select a product (display "waiting for product selection operation": 6901).

When the user depresses the product selection switches 704 for desired products (product selection operation 6902), the automatic vending machine counts the number of selected products, calculates the total charge, and displays, on the touch panel LCD, the names, the volumes and the total amount charged for the selected products, and a button for starting the payment operation (display "waiting for the payment start operation": 6903). Furthermore, when the user depresses the selection switch 704 for other desired products (product selection operation 6902), similarly, the automatic vending machine counts the number of selected products, calculates the total charge, and displays, on the touch panel LCD, the names, the volumes and the total amount charged for the selected products, and the button for starting the payment operation (display "waiting for the payment start operation": 6903).

When the user presses the payment operation start button (payment start operation 6904), the automatic vending machine displays, on the LCD, a message permitting the user to start the payment operation using the electronic payment card (display "waiting for the payment operation": 6905).

The user sets the mobile user terminal to the payment card mode, employs the function switch (F1 or F2) to display a payment card to be used for the payment, and enters the amount of the payment using the number key switches (the amount to be paid entered by the user may be equal to or greater than the total value of the products). Then, while directing the infrared communication port 300 toward the infrared communication port of the automatic vending machine (payment operation 6906), the user depresses the execution switch 311. The mobile user terminal generates a payment offer 6907 that includes the amount of the payment entered by the user and the information for the electronic payment card (card type or the remaining total amount) and that is a message to the automatic vending machine (merchant) offering to pay the amount represented by the price. The payment offer 6907 is then transmitted to the automatic vending machine via infrared communication.

Upon receiving the payment offer 6907, the automatic vending machine examines the type of payment card and the remaining amount, and via infrared communication, transmits to the mobile user terminal a payment offer response 6908, which is a response message for the payment offer 6907. The payment offer response 6908 includes information expressing the amount charged (the total value of the products).

Upon receiving the payment offer response 6908, the mobile user terminal confirms that the charge amount is equal to or lower than the amount of the payment entered by the user. The user subtracts the charge amount from the total remaining amount held by the electronic payment card, and generates a micro-check 6909, which is a message corresponding to a check on which the amount charged is given as the face value. The micro-check 6909 is thereafter transmitted to the automatic vending machine via infrared communication. The automatic vending machine examines the contents of the received micro-check 6909, and generates a receipt 6910, which is a message corresponding to the message for the micro-check 6909 that has been paid. The automatic vending machine transmits the receipt 6910 to the mobile user terminal via infrared communication and discharges products through the discharge port 703.

The mobile user terminal displays the contents of the receipt 6910 on the LCD (display the receipt: 6911), and thereafter, the payment card settlement processing at the mobile user terminal is terminated.

Figure 72:
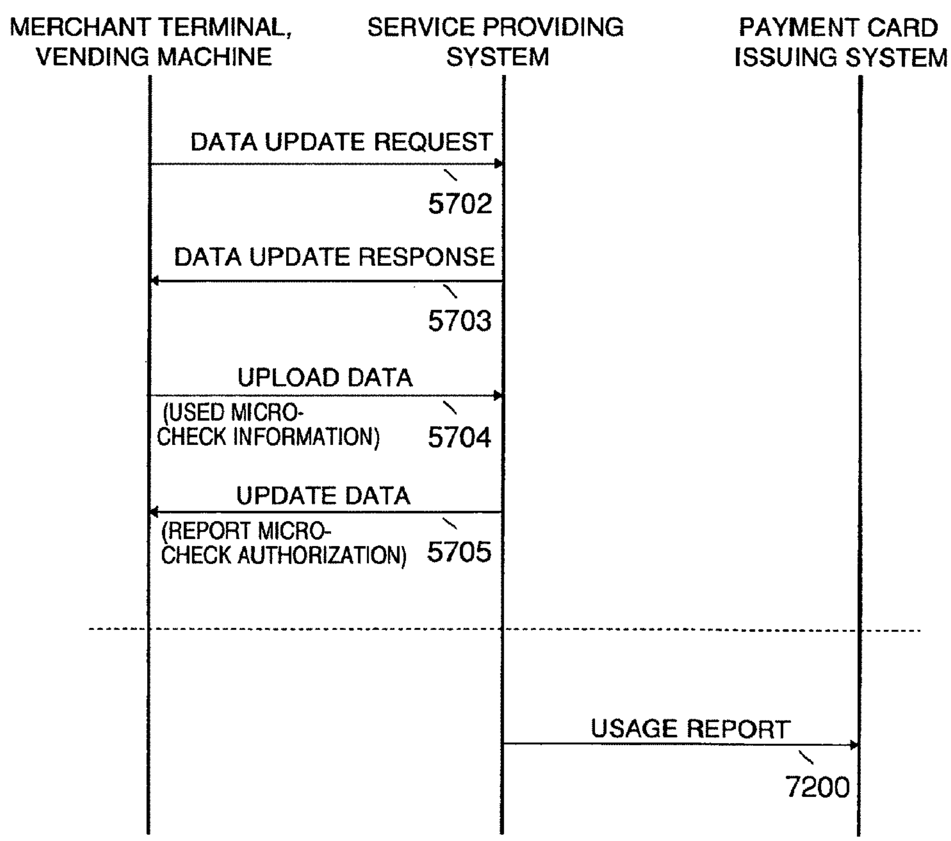
FIG. 72 is a flowchart showing payment card reference processing according to the embodiment of the present invention.

The payment card reference processing is shown in FIG. 72.

The payment card reference process is not performed in accordance with a special processing sequence, but is performed during the data updating processing, when the service providing system updates the data in the merchant terminal 102 or 103 or in the automatic vending machine 104.

When a time that has been set in advance is reached, the merchant terminal 102 or 103 or the automatic vending machine 104 automatically initiates the data updating process, and transmits, to the service providing system, a data update request 5702, which is a message requesting that the data updating process be performed.

The service providing system thereafter transmits, to the merchant terminal 102 or 103 or the automatic vending machine 104, a data update response 5703, which is a message transmitted as a reply to the data update request 5702 that was received.

The data update response 5703 includes information indicating the range of the data that is to be uploaded (update option code 8809: FIG. 88B). Upon receiving the data update response 5703, the merchant terminal 102 or 103 or the automatic vending machine 104 generates and transmits, to the service providing system, upload data 5704, which is a message in which is included the data that is to be uploaded to the service providing system. At this time, the upload data 5704 includes information for a new micro-check that is processed during the payment card clearing process.

In the service providing system, the service server 900 compares the received upload data 5704 with the data in the merchant information server 903, and generates update data. At this time, the service server 900 also compares information for the micro-check with the management information that is stored in the service director information server 901 for the registered electronic payment card, and examines the micro-check to determine whether it is valid. Then, the service server 900 transmits, to the merchant terminal 102 or 103 or the automatic vending machine 104, an update data message 5705 that includes the data for updating the merchant terminal 102 or 103 or the automatic vending machine 104. The update data for the merchant terminal 102 or 103 or the automatic vending machine 104 includes as information payment card reference results that indicate what results were obtained when the micro-check was examined to determine whether it was valid.

The merchant terminal 102 or 103 or the automatic vending machine 104 develops the update data that is included in the received update data message 5705, and updates the internal data. At this time, the payment card reference results are also stored as internal data for the merchant terminal 102 or 103. For the automatic vending machine 104, the payment card reference results are transmitted to a merchant by electronic mail or by regular mail.

Also for the merchant terminal 102 or 103, in accordance with the contract agreed to by the merchant and the service providing system, the payment card reference results may be transmitted to the merchant by electronic mail or by regular mail, instead of being included in the update data for the merchant terminal.

If the firm represented by the merchant differs from that represented by the payment card issuer, and a payment for the merchant who handles the micro-check is made by the payment card issuer, or if the usage of the payment card is periodically reported to the payment card issuer in accordance with the terms of a contract, in accordance with the results that are obtained by the payment card reference process, the service providing system, for example, weekly generates a usage condition notification 7200, which is a message notifying the payment card issuer of the payment card usage condition, and transmits it to the payment card issuing system 108.

Figure 75:
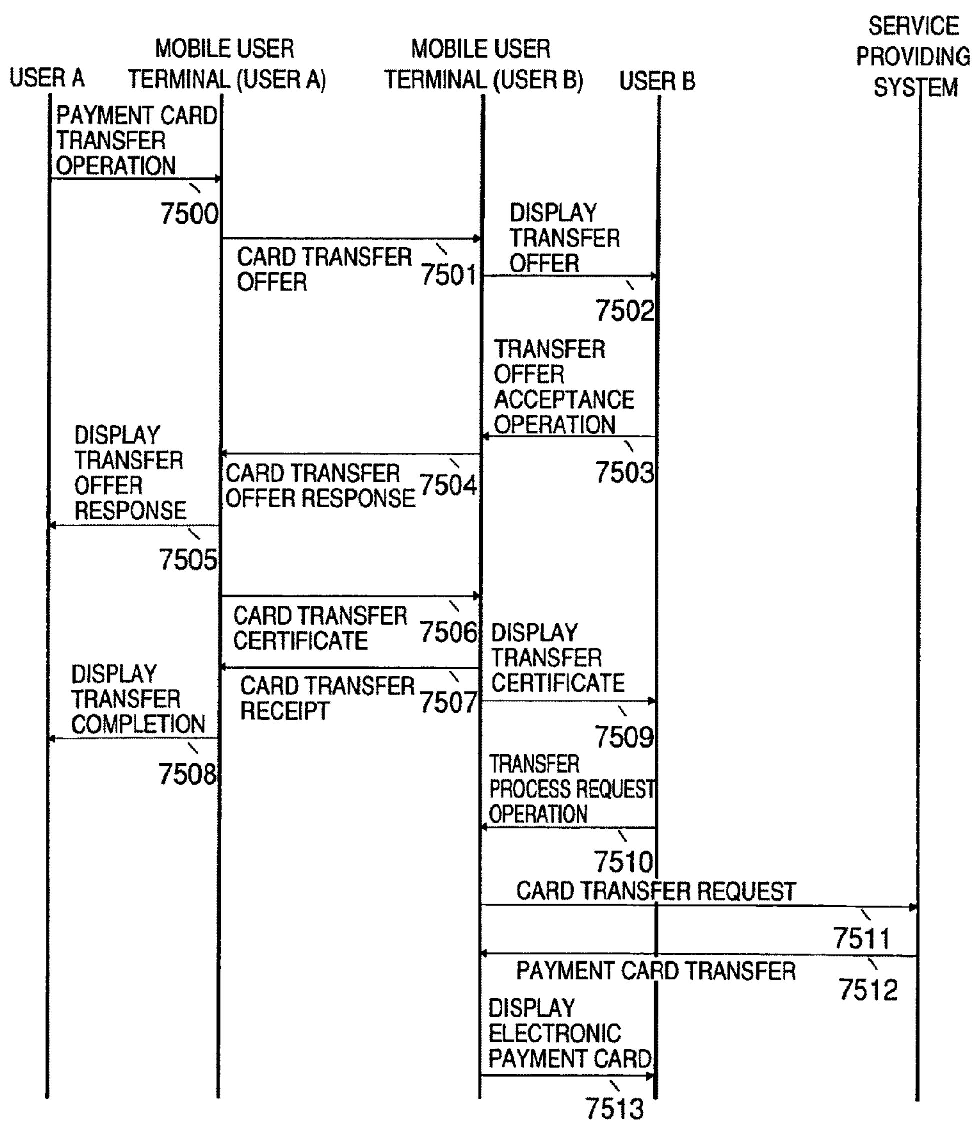
FIG. 75 is a flowchart showing payment card transfer processing according to the embodiment of the present invention.

In FIG. 75 is shown the payment card transfer processing.

In FIG. 75 is shown a case where user A transfers an electronic payment card to user B. The basic processing is the same whether infrared communication or digital wireless communication is employed by the users A and B.

First, an explanation will be given when infrared communication is employed between the users A and B.

The payment card transfer process is initiated when the users A and B orally agree to the transfer of an electronic payment card.

First, user A sets the mobile user terminal to the payment card mode, and employs the function switch (F1 or F2) to display on the LCD a payment card that is to be transferred. User A depresses the function switch (F3) to display the operating menu for the electronic payment card, and selects "payment card transfer." Thereafter, the user A depresses the execution switch while directing the infrared communication port toward the infrared communication port of the mobile user terminal of user B (payment card transfer operation 7500). Then, via infrared communication, the mobile user terminal belonging to user A transmits, to the mobile user terminal belonging to user B, a payment card transfer offer 7501, which is a message offering to transfer an electronic payment card.

Upon receiving the payment card transfer offer 7501, the mobile user terminal belonging to user B examines the contents of the payment card transfer offer 7501, and displays on the LCD the contents of the electronic payment card that is to be transferred (display transfer offer: 7502).

User B confirms the contents displayed on the LCD, and depresses the execution switch, while directing the infrared communication port toward the infrared communication port of the mobile user terminal belonging to user A (transfer offer acceptance operation 7503). Then, via infrared communication, the mobile user terminal belonging to user B transmits, to the mobile user terminal belonging to user A, a payment card transfer offer response 7504, which is a message transmitted in response to the payment card transfer offer 7501.

The mobile user terminal of user A displays on the LCD the contents of the payment card transfer offer response 7504 (display the transfer offer response: 7505) that has been received. In addition, via infrared communication, the mobile user terminal of user A transmits to the mobile user terminal of user B a payment card transfer certificate 7506, which is a message corresponding to a certificate for the transfer of the electronic payment card to user B.

The mobile user terminal of user B examines the payment card transfer certificate 7506 that has been received, and via infrared communication transmits a payment card receipt 7507, which is a message stating that the electronic payment card has been transferred, to the mobile user terminal of user A.

Upon receiving the payment card receipt 7507, the mobile user terminal of user A displays on the LCD a transfer completion message (display transfer completion: 7508). The processing for the mobile user terminal of user A (sender) is thereafter terminated.

After transmitting the payment card receipt 7507, the mobile user terminal of user B displays on the LCD the payment card transfer certificate 7506 that has been received. The mobile user terminal also displays a dialogue message to ask the user whether the transfer process with the service server (the process for downloading a transferred electronic payment card from the service providing system) should be performed immediately (display the transfer certificate: 7509).

The dialogue message includes two operating menus: "transfer request" and "cancel." When "cancel" is selected, the current transfer process being performed with the service providing system is canceled. During the process (data updating process) wherein the service providing system updates the data in the mobile user terminal of user B, the electronic payment card that has been transferred is set up as a part of the update data for the mobile user terminal of user B.

When user B selects "transfer request" (transfer request operation 7510), the mobile user terminal employs the payment card transfer certificate 7506 to generate a payment card transfer request 7511, which is a message requesting the transfer process be performed with the service providing system, and transmits the request 7511 to the service providing system 110 via digital wireless telephone communication.

The service providing system examines the contents of the payment card transfer request 7511 that has been received, and via digital wireless telephone communication, transmits to the mobile user terminal of user B a payment card transfer message 7512 that includes the electronic payment card that was transferred by user A.

Upon receiving the payment card transfer message 7512, the mobile user terminal of user B displays the electronic payment card on the LCD (display the electronic payment card: 7513). The payment card transfer processing is thereafter terminated.

Next, an explanation will be given for digital wireless telephone communication between users A and B.

For this type of communication, the payment card transfer process is also initiated when users A and B orally agree on the transfer of an electronic payment card. At this time, users A and B are using digital wireless telephones to communicate with each other.

First, user A sets the mobile user terminal to the payment card mode and employs the function switch (F1 or F2) to display on the LCD a payment card to be transferred. User A then depresses the function switch (F3) to display the operating menu for the electronic payment card. The user selects "payment card transfer" and depresses the execution switch (payment card transfer operation 7500). Then, via digital wireless telephone communication, the mobile user terminal of user A transmits, to the mobile user terminal of user B, a payment card transfer offer 7501, which is a message offering to transfer an electronic payment card.

Upon receiving the payment card transfer offer 7501, the mobile user terminal of user B examines the contents of the payment card transfer offer 7501, and displays on the LCD the contents of the electronic payment card that is to be transferred (display transfer offer: 7502).

The user B confirms the contents displayed on the LCD, and depresses the execution switch (transfer offer acceptance operation 7503). Then, through digital wireless telephone communication, the mobile user terminal of user B transmits, to the mobile user terminal of user A, a payment card transfer offer response 7504, which is a response message for the payment card transfer offer 7501.

The mobile user terminal of user A displays on the LCD the contents of the received payment card transfer offer response 7504 (display the transfer offer response: 7505). Thereafter, via digital wireless telephone communication, the mobile user terminal transmits to the mobile user terminal of user B a payment card transfer certificate 7506, which is a message corresponding to a certificate for the transfer of the electronic payment card to user B.

The mobile user terminal of user B examines the received payment card transfer certificate 7506 and via digital wireless telephone communication transmits a payment card receipt 7507, which is a message stating that the electronic payment card has been transferred to user B, to the mobile user terminal of user A.

Upon receiving the payment card receipt 7507, the mobile user terminal of user A displays a transfer completion message on the LCD (display transfer completion: 7508). The processing for the mobile user terminal of user A (sender) is thereafter terminated.

After transmitting the payment card receipt 7507, the mobile user terminal of user B displays on the LCD the received payment card transfer certificate 7506. Also, the mobile user terminal displays a dialogue message asking the user whether the transfer process with the service server (the process for downloading a transferred electronic payment card from the service providing system) should be performed immediately (display the transfer certificate: 7509).

Included in the dialogue message are two operating menus: "transfer request" and "cancel." When "cancel" is selected, the current transfer process that is being conducted with the service providing system is canceled. During the process (data updating process) whereby the service providing system updates the data in the mobile user terminal of user B, the electronic payment card that has been transferred is set in the mobile user terminal of user B as a part of the update data.

When the user B selects "transfer request" (transfer request operation 7510), the mobile user terminal disconnects the communication line leading from user A and connects the digital wireless telephone communication line with the service providing system. Then, the mobile user terminal employs the payment card transfer certificate 7506 to generate a payment card transfer request 7511, which is a message requesting the transfer process be performed with the service providing system, and transmits the request 7511 to the service providing system via digital wireless telephone communication.

The service providing system examines the contents of the received payment card transfer request 7511, and via digital wireless telephone communication, transmits to the mobile user terminal of user B a payment card transfer message 7512 that includes the electronic payment card that is being transferred by user A.

Upon receiving the payment card transfer message 7512, the mobile user terminal of user B displays the electronic payment card on the LCD (display the electronic payment card: 7513). The payment card transfer processing is thereafter terminated.

Figure 78:
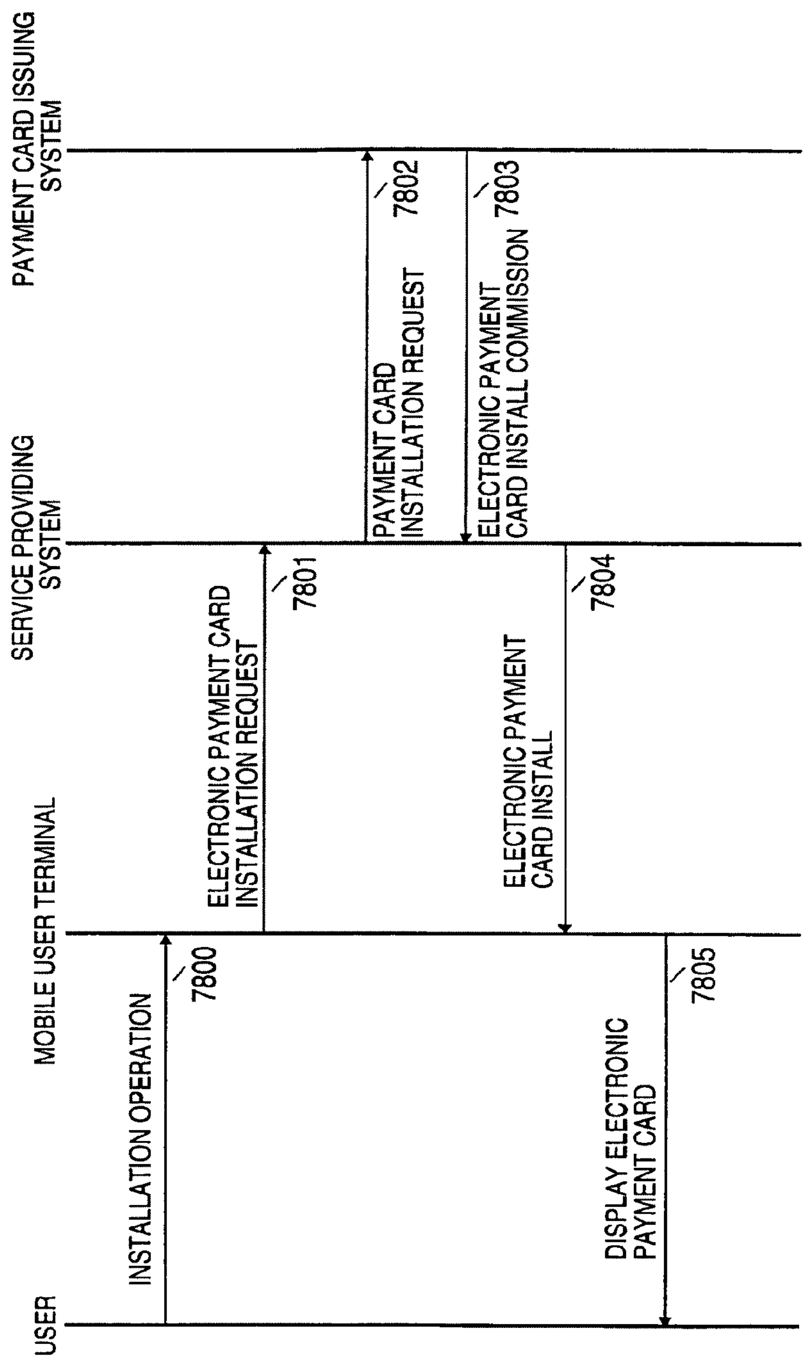
FIG. 78 is a flowchart showing electronic payment card installation processing according to the embodiment of the present invention.

In FIG. 78 is shown the electronic payment card installation processing.

First, the user sets the mobile user terminal to the payment card mode and employs the function switch (F4) to display the operating menu for the payment card mode. The user then selects "install" and displays the installation screen on the LCD. Thereafter, the user employs the number key switches to enter the installation card number and the installation number that are printed on the electronic payment card installation card, and depresses the execution switch 311 (installation operation 7800). The mobile user terminal then transmits to the service providing system 110 an installation request 7801, which is a message requesting the installation of an electronic payment card.

The service providing system 110 specifies an installation card issuer by referring to the installation card number that is included in the received electronic payment card installation request 7801, and transmits to the payment card issuing system of that issuer a payment card installation request 7802, which is a message requesting that a payment card be issued.

In the payment card issuing system, the payment card issuing server 1200 compares the installation card number and the installation number, which are included in the payment card installation request 7802 that has been received, with the management information that is stored in the payment card issuing information server 1202 for the electronic payment card installation cards that have been issued. In addition, the payment card issuing server 1200 updates the data in the customer information server 1201, in the payment card issuing information server 1202, and in the payment card information server 1203. The payment card issuing server 1200 then generates the data for the requested payment card, and transmits to the service providing system an electronic payment card installation commission 7803, which is a message requesting the installation of an electronic payment card that corresponds to the payment card that has been requested.

Upon receiving the electronic payment card installation commission 7803, the service providing system generates an electronic payment card, and to install the electronic payment card in the mobile user terminal, transmits to the mobile user terminal an electronic payment card installation message 7804.

The mobile user terminal installs the electronic payment card that is included in the received electronic payment card installation message 7804, and displays on the LCD the installed electronic payment card (display the electronic payment card: 7805).

A detailed explanation will be given later for the contents of the messages that are exchanged by the devices during the above electronic payment card service processing.

The electronic telephone card service will now be described.

The electronic telephone card service mainly includes seven types of processes: an electronic telephone card purchase process, an electronic telephone card registration process, an electronic telephone card setup process, an electronic telephone card settlement process, an electronic telephone card reference process, an electronic telephone card transfer process, and an electronic telephone card installation process.

The telephone card purchase process is a process whereby the user purchases an electronic telephone card from a telephone card issuer. The telephone card registration process is a process whereby, in the service providing system, the user registers for his or her own use a purchased telephone card or one received as a gift. The telephone card setup process is a process whereby the service provider determines the process to be employed for the electronic telephone card at the electronic telephone card accounting machine 800 of the switching center 105 in accordance with a contract entered into with a communication service provider. The telephone card settlement process is a process whereby the user employs the electronic telephone card for communication. The telephone card reference process is a process whereby the electronic telephone card accounting machine 800 asks the service providing system whether the electronic telephone card that is employed is valid. The telephone card transfer process is a process for transferring an electronic telephone card. And the electronic telephone card installation process is a process for installing an electronic telephone card in the mobile user terminal 100 using an electronic telephone card installation card.

Figure 63:
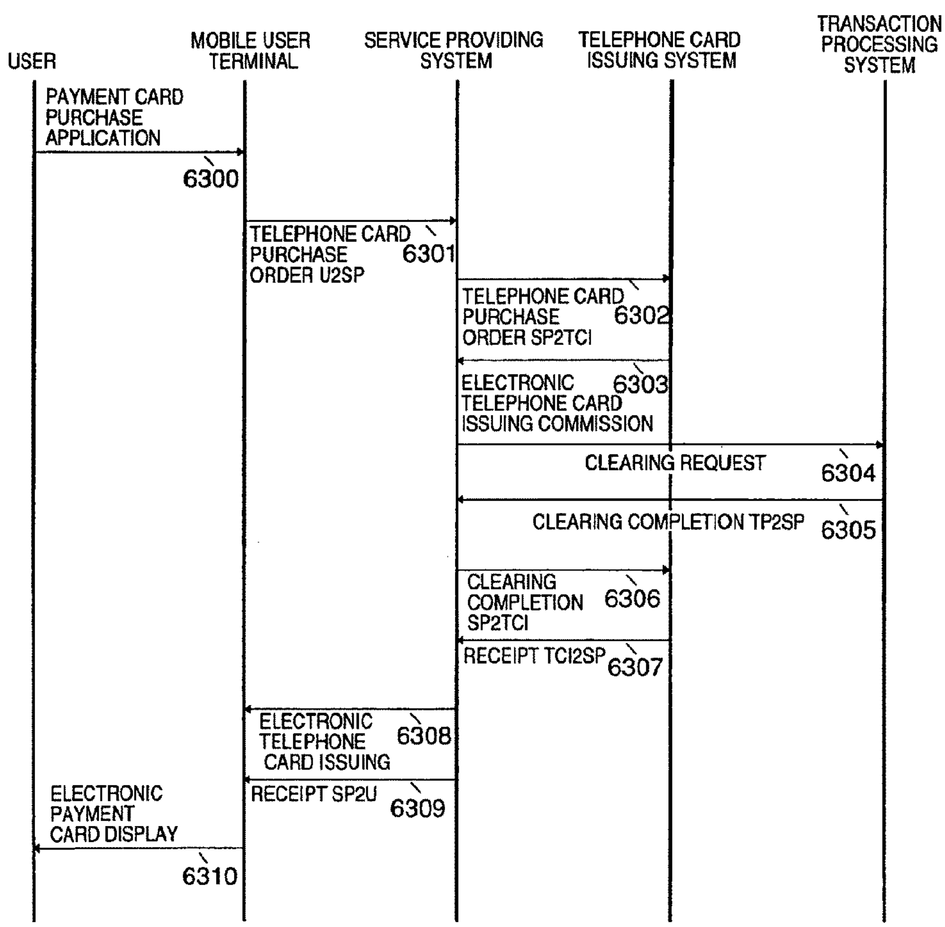
FIG. 63 is a flowchart showing telephone card purchase processing (spontaneous settlement) according to the embodiment of the present invention.

In FIG. 63 is shown the telephone card purchase processing.

First, the user sets the mobile user terminal 100 to the telephone card mode, and uses the function switch (F4) to display the operating menu for the telephone card mode. Thereafter, the user selects "telephone card purchase," and the telephone card order screen is displayed on the LCD. Then, by using the function switch 307 and the number key switches 308, the user selects a telephone card issuer, enters the order code for a desired telephone card and a desired number of telephone cards, designates a credit card to be used for payment and the number of payments, and enters the code number. The user then depresses the execution switch 311 (telephone card order operation 6300), and the mobile user terminal transmits, to the service providing system, a telephone card order 6301, which is a message for applying for an electronic telephone card. Upon receiving the telephone card order 6301, the service providing system transmits, to the telephone card issuing system 109, a telephone card order 6302, which is a message used to apply for a telephone card.

Upon the telephone card order 6302 being received at the telephone card issuing system, the telephone card issuing server 1300 updates the data in the customer information server 1301, the telephone card issuing information server 1302 and the telephone card information server 1303. The telephone card issuing server 1300 generates telephone card data for the ordered telephone card, and transmits, to the service providing system, an electronic telephone card issuing commission 6303, which is a message requesting that a corresponding electronic telephone card be issued and that the settlement process be performed for the price of the telephone card.

Upon receiving the electronic telephone card issuing commission 6303, the service providing system transmits, to the transaction processing system 106, a clearing request 6304, which is a message requesting that the price of the telephone card be cleared.

Upon the clearing request 6304 being received at the transaction processing system, the transaction server 1000 updates data in the subscriber information server 1001, in the member store information server 1002 and in the transaction information server 1003, performs the clearing of the credit card, and transmits to the service providing system a clearing completion notification 6305, which is a message stating that the clearing process has been completed.

Upon receiving the clearing completion notification 6305, the service providing system generates a clearing completion notification 6306, which is a message stating that the clearing process has been completed, and transmits it to the telephone card issuing system. In addition, the service providing system generates an electronic telephone card to be issued to the user.

Upon receiving the clearing completion notification 6306, the telephone card issuing system generates, and transmits to the service providing system, a receipt 6307, which is a message corresponding to the receipt for the sale of the telephone card.

Based on the received receipt 6307, the service providing system generates a receipt 6309, which is a receipt message for the user, and transmits it to the mobile user terminal, together with an electronic telephone issuance message 6308 that includes the electronic telephone card that has been generated.

Upon receiving the electronic telephone card issuance message 6308 and the receipt 6309, the mobile user terminal displays the purchased electronic telephone card on the LCD (display the electronic telephone card: 6310). At this time, a dialogue message is also displayed on the LCD for registering the electronic telephone card that has been purchased. Then, when the user selects "register," the mobile user terminal initiates the telephone card registration process.

Figure 65C:
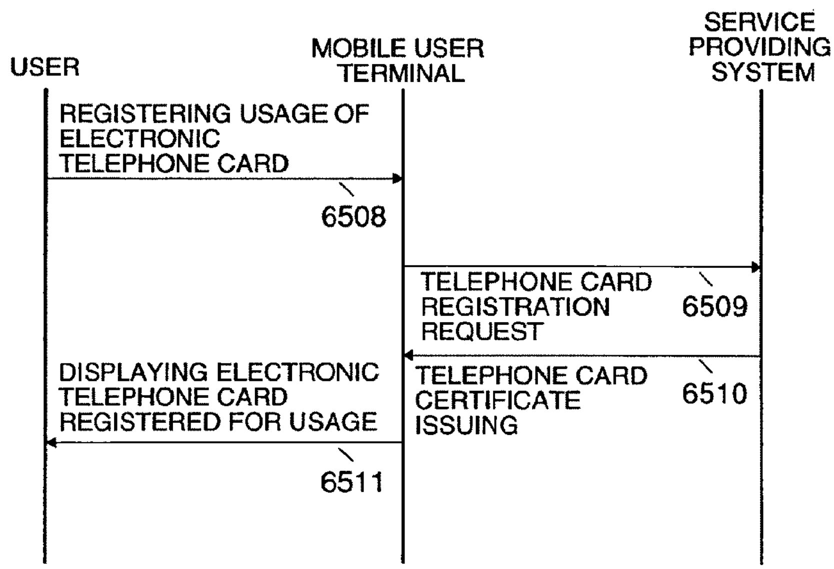
FIG. 65C is a flowchart showing the telephone card registration processing according to the embodiment of the present invention.

The telephone card registration processing is shown in FIG. 65C. The telephone card registration process is begun when the dialogue message for registering an electronic telephone card for use is displayed on the LCD. To display the dialogue message for the use registration, the execution switch 311 is depressed immediately after the electronic telephone card is purchased, or while an electronic telephone card that has not yet been registered is displayed ("unregistered" is displayed as the state of the telephone card).

The dialogue message for registration has two operating menus: "register" and "cancel." When the user selects "cancel," the telephone card registration process is canceled. When the user selects "register" (registration operation of an electronic telephone card: 6508), the mobile user terminal transmits, to the service providing system, a telephone card registration request 6509, which is a message requesting the registration of an electronic telephone card. In the service providing system, the service server 900 compares the contents of the received telephone card registration request 6509 with the user information in the user information server 902. The service server 900 updates the management information that is stored in the service director information server 901 for an electronic telephone card that has been registered. The service server 900 registers the electronic telephone card, and transmits, to the mobile user terminal, a telephone card certificate issuance message 6510, which includes a certificate for the registered electronic telephone card.

Upon receiving the telephone card certificate 6510, the mobile user terminal displays the registered electronic telephone card on the LCD ("registered" is displayed as the state of the telephone card) (display a registered telephone card: 6511).

The telephone card setup processing will now be described.

The telephone card setup process is a process for, in accordance with a contract entered into by the service provider and the communication service provider, setting and updating an electronic telephone card that is to be processed by the electronic telephone card accounting machine 800 of the switching center 105.

The telephone card setup process is not performed according to a special processing sequence, but is performed during the data updating processing (FIG. 57B) when the service providing system updates the data in the electronic telephone card accounting machine 800 of the switching center 105.

When a time that has been set in advance is reached, the electronic telephone card accounting machine 800 automatically initiates the data updating process, and transmits, to the service providing system, a data update request 5702, which is a message requesting the performance of the data updating process.

The service providing system transmits, to the electronic telephone card accounting machine 800, a data update response 5703, which is a message dispatched in response to the receipt of the data update request 5702.

Upon receiving the data update response 5703, the electronic telephone card accounting machine 800 generates and transmits, to the service providing system, upload data 5704, which is a message in which is included data to be uploaded to the service providing system.

The service providing system compares the received upload data 5704 with the data in the merchant information server 903 and generates update data. At this time, an electronic telephone card that is to be processed is updated, and information for the update is included in the update data.

Then, the service providing system transmits, to the electronic telephone card accounting machine 800, an update data message 5705 that includes the update data that has been generated. The electronic telephone card accounting machine 800 develops the update data that is included in the received update data message 5705, and updates the internal data. At this time, the electronic telephone card that is processed by the electronic telephone card accounting machine 800 is also updated.

Figure 70:
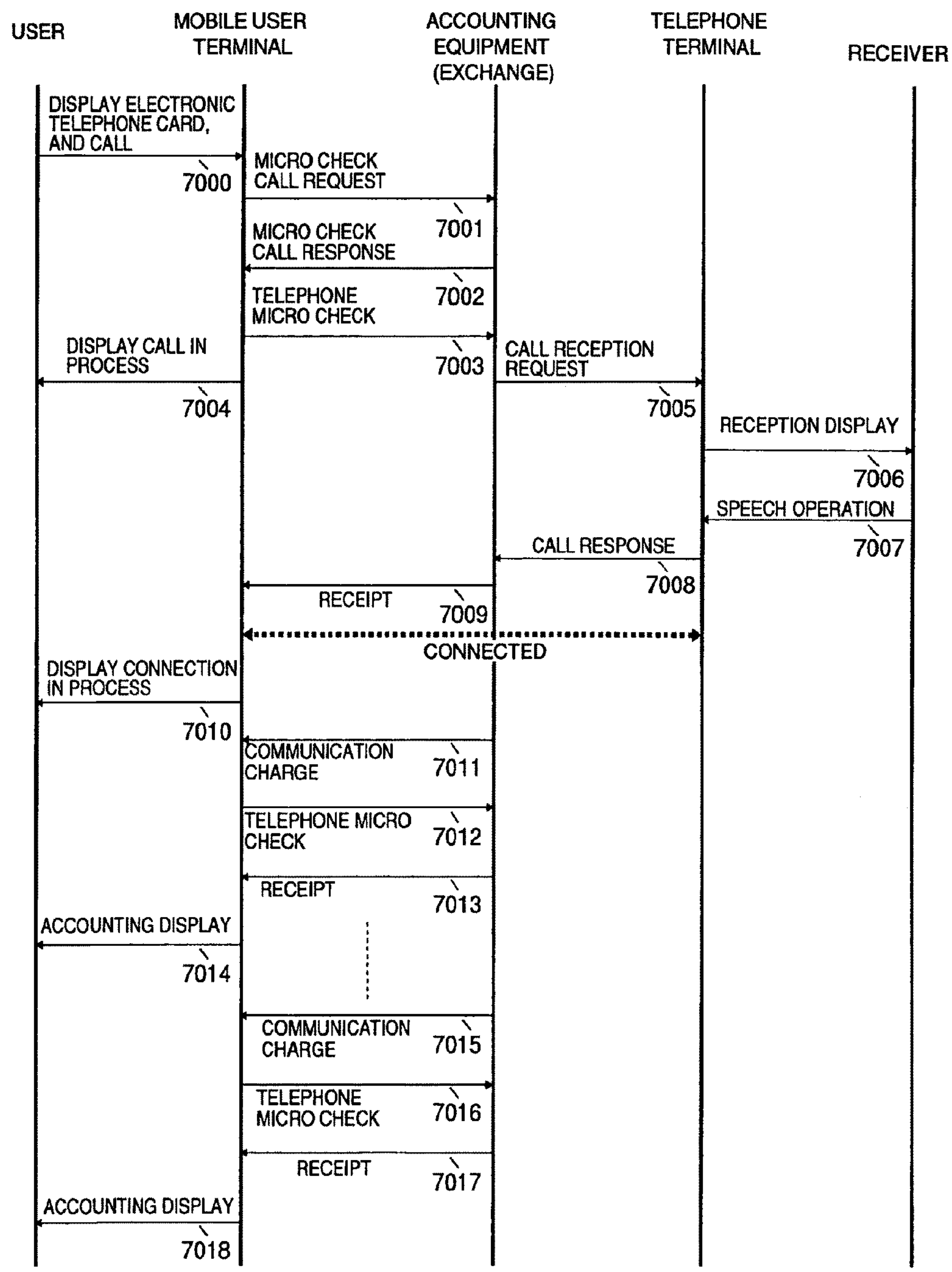
FIG. 70 is a flowchart showing telephone card settlement processing according to the embodiment of the present invention.

In FIG. 70 is shown the telephone card settlement processing.

First, the user sets the mobile user terminal to the telephone card mode, employs the function switch (F1 or F2) to display a telephone card to be used for the payment of a communication charge, enters the telephone number using the number key switches 308, and depresses the speech switch 305 (display an electronic telephone card and make a call: 7000). The mobile user terminal transmits, to the switching center 105, a micro-check call request 7001, which is a message used to request communication, using the electronic telephone card, with a destination indicated by the telephone number that is entered by the user.

In the switching center, the electronic telephone card accounting machine 800 examines the contents of the micro-check call request 7001 that has been received, and transmits, to the mobile user terminal, a micro-check call response 7002, which is a message for charging a communication fee V (V>0) for a specific communication time T (T>0).

Upon receiving the micro-check call response 7002, the mobile user terminal subtracts the communication fee V from the total remaining amount held by the electronic telephone card, and generates and transmits, to the switching center, a telephone micro-check 7003, which is a message corresponding to a check on which the communication fee is entered as the face value. Further, the mobile user terminal displays, on the LCD, a message indicating that a call is in process (display "call in process": 7004).

At the switching center, first, the electronic telephone card accounting machine examines the contents of the telephone micro-check 7003 that has been received. Then, the switch 801 transmits, to the telephone terminal 115, a call reception request 7005, which is message for the calling of the telephone terminal 115 indicated by the telephone number entered by the user.

Upon receiving the call reception request 7005, the telephone terminal 115 outputs a call tone to notify the owner of the telephone terminal 115 (receiver) that a call has been received (display "call reception": 7006). When the receiver answers the phone (speech operation 7007), the telephone terminal 115 transmits, to the switch 801, a call reception response 7008, which a message stating that the call is permitted.

When the switch 801 receives the call reception response 7008, first, the electronic telephone card accounting machine generates and transmits, to the mobile user terminal, a receipt 7009, which is a message corresponding to a receipt for the telephone micro-check 7003 that has been issued. Then, the switch 801 establishes the connection between the mobile user terminal and the telephone terminal, so that the user can communicate with the caller. At this time, the display on the LCD of the mobile user terminal is changed to one related to the connected state (telephone number for the current communication, the elapsed time and the total remaining amount held by the electronic telephone card) (display "line is connected": 7010).

When the period of communication time exceeds T, instead of transmitting the telephone micro-check 7003 having the face value V, the electronic telephone card accounting machine transmits, to the mobile user terminal, a communication charge message 7011 for an electronic micro-check for an amount charged that has a face value that equals a communication fee 2V for a communication time 2T, Upon receiving the communication charge 7011, the mobile user terminal further subtracts the communication fee V from the total remaining amount held by the electronic telephone card, and generates and transmits, to the switching center, a telephone micro-check 7012 for which the communication fee 2V is entered as the face value.

The electronic telephone card accounting machine examines the contents of the electronic telephone micro-check 7012 that is received, and generates and transmits, to the mobile user terminal, a receipt 7013, which is a message corresponding to a receipt for the electronic micro-check 7012.

Upon receiving the receipt 7013, the mobile user terminal updates the total remaining amount held by the electronic telephone card that is displayed on the LCD (display accounting 7014).

Thereafter, each time the communication time exceeds NT (N is a natural number), the electronic telephone card accounting machine transmits, to the mobile user terminal 100, a communication charge message 7015 for an electronic micro-check for which the face value is the amount charged for the communication fee (N+1)V for the communication time (N+1)T, instead of transmitting the telephone micro-check having a face value NV. The mobile user terminal thereafter further subtracts the communication fee V from the total remaining amount held by the electronic telephone card, and generates and transmits, to the switching center, a telephone micro-check 7016 for which the communication fee (N+1)V is entered as the face value. The electronic telephone card accounting machine examines the contents of the electronic telephone micro-check 7016 that is received, and generates and transmits, to the mobile user terminal, a receipt 7017, which is a message corresponding to a receipt for the electronic micro-check 7016. Upon receiving the receipt 7017, the mobile user terminal updates the total remaining amount held by the electronic telephone card that is displayed on the LCD (display accounting 7018).

The messages, such as the call reception request 7005 and the call reception response 7008, that are exchanged by the switching center 105 and the telephone terminal 115 depend on the protocol established for the line connection between the switching center 105 and the telephone terminal 115.

Figure 73:
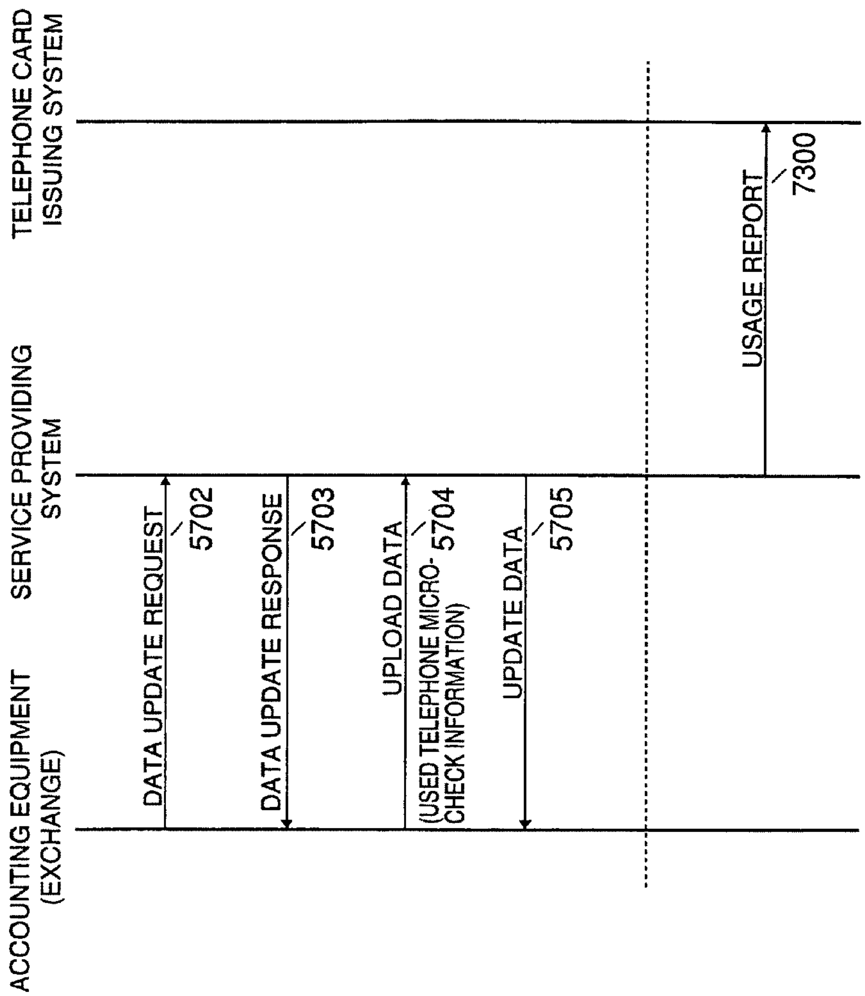
FIG. 73 is a flowchart showing telephone card reference processing according to the embodiment of the present invention.

The payment card reference processing is shown in FIG. 73.

The telephone card reference process is not performed in accordance with a special processing sequence, but is performed during the data updating processing, when the service providing system updates the data in the electronic telephone card accounting machine.

When a time that has been set in advance is reached, the electronic telephone card accounting machine automatically initiates the data updating process, and transmits, to the service providing system, a data update request 5702, which is a message requesting that the data updating process be performed.

The service providing system thereafter transmits, to the electronic telephone card accounting machine, a data update response 5703, which is a message transmitted as a reply to the data update request 5702 that was received.

The data update response 5703 includes information indicating the range of the data that is to be uploaded (update option code 8809: FIG. 88B). Upon receiving the data update response 5703, the electronic telephone card accounting machine generates and transmits, to the service providing system, upload data 5704, which is a message in which is included the data that is to be uploaded to the service providing system. At this time, the upload data 5704 includes information for a new telephone micro-check that is processed during the telephone card clearing process.

In the service providing system, the service server 900 compares the received upload data 5704 with the data in the merchant information server 903, and generates data for updating the electronic telephone card accounting machine. Then, the service server 900 transmits, to the electronic telephone card accounting machine, an update data message 5705 that includes the data for updating the electronic telephone card accounting machine.

The electronic telephone accounting machine develops the update data that is included in the received update data message 5705, and updates the internal data.

The service providing system also compares information for the telephone micro-check with the management information that is stored in the service director information server 901 for the registered electronic telephone card, and examines the telephone micro-check to determine whether it is valid. The telephone card reference results are transmitted to a communication service provider by electronic mail or by regular mail.

If the firm represented by the communication service provider differs from that represented by the telephone card issuer, and a payment for the communication service provider who handles the telephone micro-check is made by the telephone card issuer, or if the usage of the telephone card is periodically reported to the telephone card issuer in accordance with the terms of a contract, in accordance with the results that are obtained by the telephone card reference process, the service providing system, for example, weekly generates a usage condition notification 7300, which is a message notifying the telephone card issuer of the telephone card usage condition, and transmits it to the telephone card issuing system 109.

Figure 76:
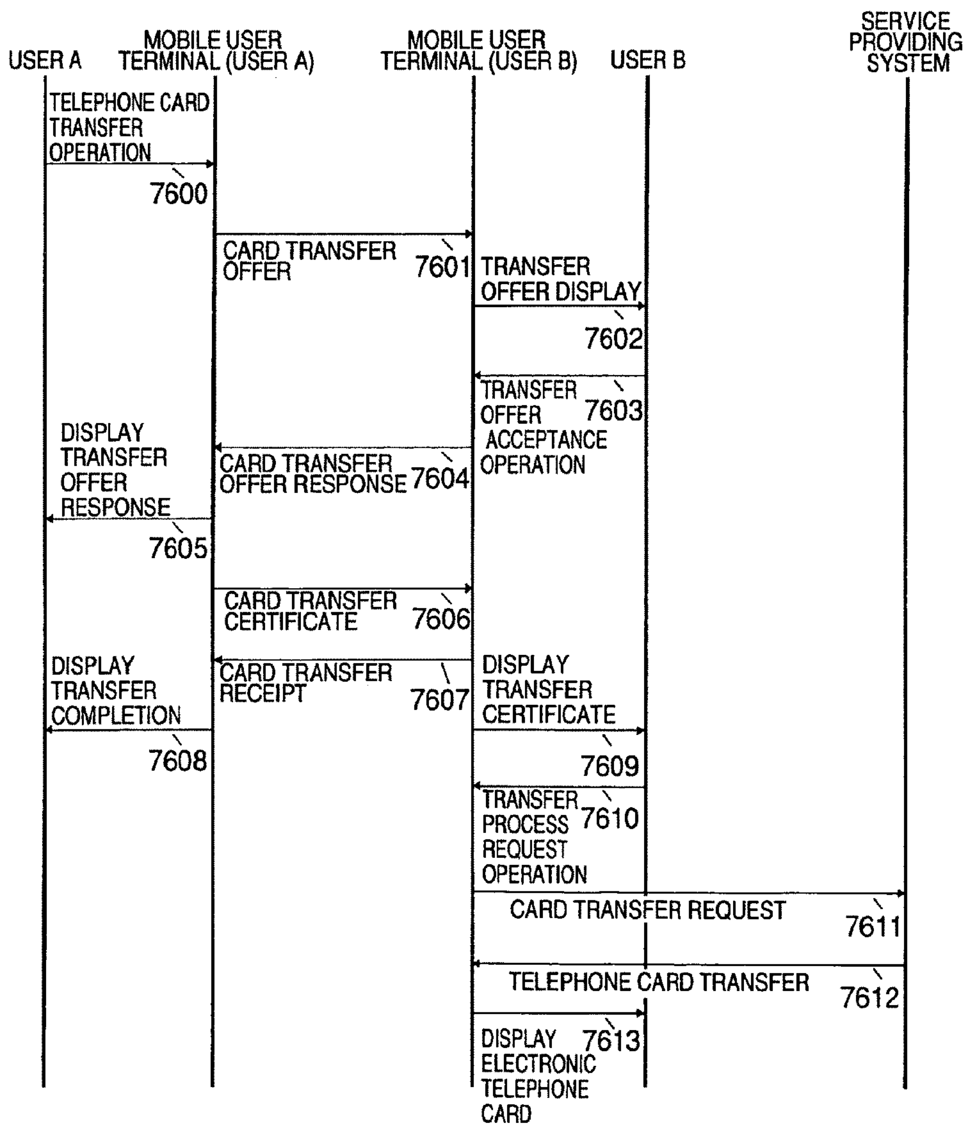
FIG. 76 is a flowchart showing telephone card transfer processing according to the embodiment of the present invention.

In FIG. 76 is shown the telephone card transfer processing.

In FIG. 76 is shown a case where user A transfers an electronic telephone card to user B. The basic processing is the same whether infrared communication or digital wireless communication is employed by the users A and B.

First, an explanation will be given when infrared communication is employed between the users A and B.

The telephone card transfer process is initiated when the users A and B orally agree to the transfer of an electronic telephone card.

First, user A sets the mobile user terminal to the telephone card mode, and employs the function switch (F1 or F2) to display on the LCD a telephone card that is to be transferred. User A depresses the function switch (F3) to display the operating menu for the electronic telephone card, and selects “telephone card transfer.” Thereafter, the user A depresses the execution switch while directing the infrared communication port toward the infrared communication port of the mobile user terminal of user B (telephone card transfer operation 7600). Then, via infrared communication, the mobile user terminal belonging to user A transmits, to the mobile user terminal belonging to user B, a telephone card transfer offer 7601, which is a message offering to transfer an electronic telephone card.

Upon receiving the telephone card transfer offer 7501, the mobile user terminal belonging to user B examines the contents of the telephone card transfer offer 7601, and displays on the LCD the contents of the electronic telephone card that is to be transferred (display transfer offer: 7602).

User B confirms the contents displayed on the LCD, and depresses the execution switch, while directing the infrared communication port toward the infrared communication port of the mobile user terminal belonging to user A (transfer offer acceptance operation 7603). Then, via infrared communication, the mobile user terminal belonging to user B transmits, to the mobile user terminal belonging to user A, a telephone card transfer offer response 7604, which is a message transmitted in response to the telephone card transfer offer 7601. The mobile user terminal of user A displays on the LCD the contents of the telephone card transfer offer response 7604 (display the transfer offer response: 7605) that has been received. In addition, via infrared communication, the mobile user terminal of user A transmits to the mobile user terminal of user B a telephone card transfer certificate 7606, which is a message corresponding to a certificate for the transfer of the electronic telephone card to user B.

The mobile user terminal of user B examines the telephone card transfer certificate 7606 that has been received, and via infrared communication transmits a telephone card receipt 7607, which is a message stating that the electronic telephone card has been transferred, to the mobile user terminal of user A.

Upon receiving the telephone card receipt 7607, the mobile user terminal of user A displays on the LCD a transfer completion message (display transfer completion: 7608). The processing for the mobile user terminal of user A (sender) is thereafter terminated.

After transmitting the telephone card receipt 7607, the mobile user terminal of user B displays on the LCD the telephone card transfer certificate 7606 that has been received. The mobile user terminal also displays a dialogue message to ask the user whether the transfer process with the service server (the process for downloading a transferred electronic telephone card from the service providing system) should be performed immediately (display the transfer certificate: 7609).

The dialogue message includes two operating menus: “transfer request” and “cancel.” When “cancel” is selected, the current transfer process being performed with the service providing system is canceled. During the process (data updating process) wherein the service providing system updates the data in the mobile user terminal of user B, the electronic telephone card that has been transferred is set up as a part of the update data for the mobile user terminal of user B.

When user B selects “transfer request” (transfer request operation 7610), the mobile user terminal employs the telephone card transfer certificate 7606 to generate a telephone card transfer request 7611, which is a message requesting the transfer process be performed with the service providing system, and transmits the request 7611 to the service providing system via digital wireless telephone communication.

The service providing system examines the contents of the telephone card transfer request 7611 that has been received, and via digital wireless telephone communication, transmits to the mobile user terminal of user B a telephone card transfer message 7612 that includes the electronic telephone card that was transferred by user A.

Upon receiving the telephone card transfer message 7612, the mobile user terminal of user B displays the electronic telephone card on the LCD (display the electronic telephone card: 7613). The telephone card transfer processing is thereafter terminated.

Next, an explanation will be given for digital wireless telephone communication between users A and B.

For this type of communication, the telephone card transfer process is also initiated when users A and B orally agree on the transfer of an electronic telephone card. At this time, users A and B are using digital wireless telephones to communicate with each other.

First, user A sets the mobile user terminal to the telephone card mode and employs the function switch (F1 or F2) to display on the LCD a telephone card to be transferred. User A then depresses the function switch (F3) to display the operating menu for the electronic telephone card. The user selects “telephone card transfer” and depresses the execution switch (telephone card transfer operation 7600). Then, via digital wireless telephone communication, the mobile user terminal of user A transmits, to the mobile user terminal of user B, a telephone card transfer offer 7601, which is a message offering to transfer an electronic telephone card.

Upon receiving the telephone card transfer offer 7601, the mobile user terminal of user B examines the contents of the telephone card transfer offer 7601, and displays on the LCD the contents of the electronic telephone card that is to be transferred (display transfer offer: 7602).

The user B confirms the contents displayed on the LCD, and depresses the execution switch (transfer offer acceptance operation 7603). Then, through digital wireless telephone communication, the mobile user terminal of user B transmits, to the mobile user terminal of user A, a telephone card transfer offer response 7604, which is a response message for the telephone card transfer offer 7601.

The mobile user terminal of user A displays on the LCD the contents of the received telephone card transfer offer response 7604 (display the transfer offer response: 7605). Thereafter, via digital wireless telephone communication, the mobile user terminal transmits to the mobile user terminal of user B a telephone card transfer certificate 7606, which is a message corresponding to a certificate for the transfer of the electronic telephone card to user B.

The mobile user terminal of user B examines the received telephone card transfer certificate 7606 and via digital wireless telephone communication transmits a telephone card receipt 7607, which is a message stating that the electronic telephone card has been transferred to user B, to the mobile user terminal of user A.

Upon receiving the telephone card receipt 7607, the mobile user terminal of user A displays a transfer completion message on the LCD (display transfer completion: 7608). The processing for the mobile user terminal of user A (sender) is thereafter terminated.

After transmitting the telephone card receipt 7607, the mobile user terminal of user B displays on the LCD the received telephone card transfer certificate 7606. Also, the mobile user terminal displays a dialogue message asking the user whether the transfer process with the service server (the process for downloading a transferred electronic telephone card from the service providing system) should be performed immediately (display the transfer certificate: 7609).

Included in the dialogue message are two operating menus: "transfer request" and "cancel." When "cancel" is selected, the current transfer process that is being conducted with the service providing system is canceled. During the process (data updating process) whereby the service providing system updates the data in the mobile user terminal of user B, the electronic telephone card that has been transferred is set in the mobile user terminal of user B as a part of the update data.

When the user B selects "transfer request" (transfer request operation 7610), the mobile user terminal disconnects the communication line leading from user A and connects the digital wireless telephone communication line with the service providing system. Then, the mobile user terminal employs the telephone card transfer certificate 7606 to generate a telephone card transfer request 7611, which is a message requesting the transfer process be performed with the service providing system, and transmits the request 7611 to the service providing system via digital wireless telephone communication.

The service providing system examines the contents of the received telephone card transfer request 7611, and via digital wireless telephone communication, transmits to the mobile user terminal of user B a telephone card transfer message 7612 that includes the electronic telephone card that is being transferred by user A.

Upon receiving the telephone card transfer message 7612, the mobile user terminal of user B displays the electronic telephone card on the LCD (display the electronic telephone card: 7613). The telephone card transfer processing is thereafter terminated.

Figure 79:
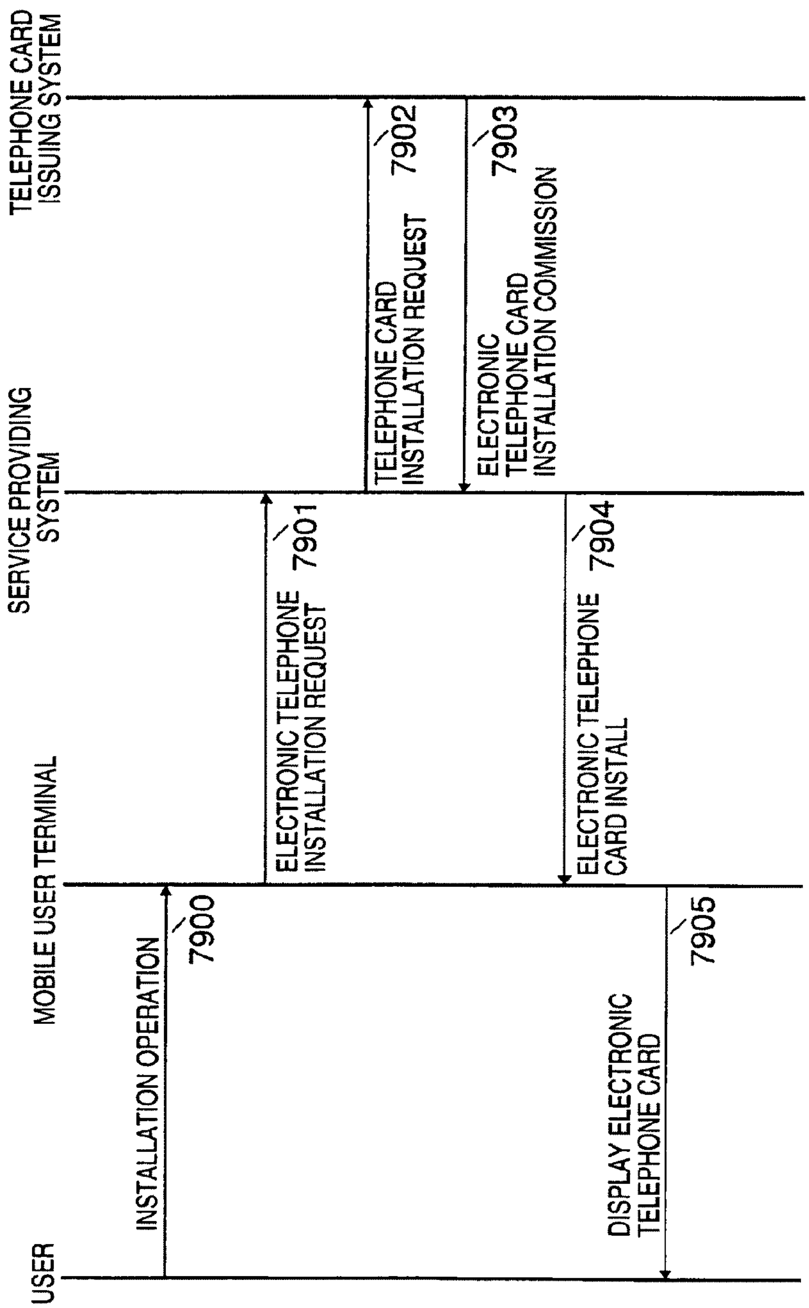
FIG. 79 is a flowchart showing electronic telephone card installation processing according to the embodiment of the present invention.

In FIG. 79 is shown the electronic telephone card installation processing.

First, the user sets the mobile user terminal to the telephone card mode and employs the function switch (F4) to display the operating menu for the telephone card mode. The user then selects "install" and displays the installation screen on the LCD. Thereafter, the user employs the number key switches to enter the installation card number and the installation number that are printed on the electronic telephone card installation card, and depresses the execution switch 311 (installation operation 7900). The mobile user terminal then transmits to the service providing system 110 an installation request 7901, which is a message requesting the installation of an electronic telephone card.

The service providing system 110 specifies an installation card issuer by referring to the installation card number that is included in the received electronic telephone card installation request 7901, and transmits to the telephone card issuing system of that issuer a telephone card installation request 7902, which is a message requesting that a telephone card be issued.

In the telephone card issuing system, the telephone card issuing server 1300 compares the installation card number and the installation number, which are included in the telephone card installation request 7902 that has been received, with the management information that is stored in the telephone card issuing information server 1302 for the electronic telephone card installation cards that have been issued. In addition, the telephone card issuing server 1300 updates the data in the customer information server 1301, in the telephone card issuing information server 1302, and in the telephone card information server 1303. The telephone card issuing server 1300 then generates the data for the requested telephone card, and transmits to the service providing system an electronic telephone card installation commission 7903, which is a message requesting the installation of an electronic telephone card that corresponds to the telephone card that has been requested.

Upon receiving the electronic telephone card installation commission 7903, the service providing system generates an electronic telephone card, and to install the electronic telephone card in the mobile user terminal, transmits to the mobile user terminal an electronic telephone card installation message 7904.

The mobile user terminal installs the electronic telephone card that is included in the received electronic telephone card installation message 7904, and displays on the LCD the installed electronic telephone card (display the electronic telephone card: 7905).

A detailed explanation will be given later for the contents of the messages that are exchanged by the devices during the above electronic telephone card service processing.

The electronic credit card service will now be described.

The electronic credit card service includes two settlement processes: a network credit settlement process, for a credit clearance for the price of a product for the purchase of a ticket, for a payment card purchase and for telephone card processes; and a real credit settlement process for a credit clearance at a common retail shop, etc. Since the network credit settlement processing has been described for the purpose of a ticket purchase, for a payment card purchase and for telephone card purchase processes, the real credit settlement processing will now be described.

Figure 84:
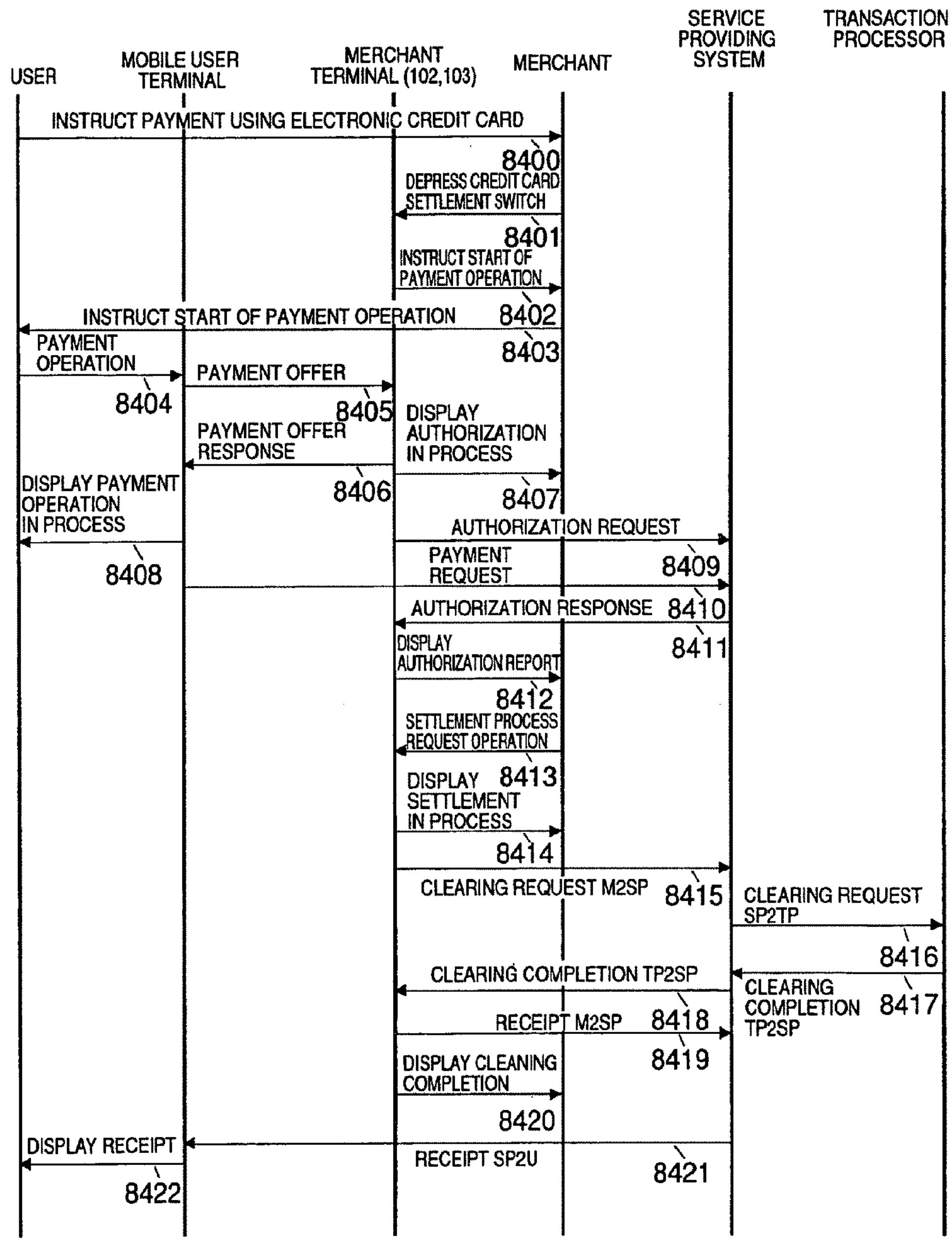
FIG. 84 is a flowchart showing real credit settlement processing according to the embodiment of the present invention.

In FIG. 84 is shown the real credit settlement processing.

First, the user notifies the merchant that an electronic credit card will be employed for the payment (instruct settlement to be made with an electronic credit card: 8400).

The merchant depresses the credit card settlement switch 513 (the function switch F3 for the merchant terminal 103) (depress the credit card settlement switch: 8401), and permits the user to start the payment operation (instruct the start of the payment operation: 8403). At this time, the total charge and a message indicating that the merchant terminal is waiting for the user to initiate the payment operation to be performed by the user are displayed on the LCD of the merchant terminal 102 or 103 (display "waiting for the payment operation": 8402).

The user sets the mobile user terminal to the credit card mode, employs the function switch (F1 or F2) to display a payment card to be used for the payment, and enters the amount to be paid and the number of payments. Then, while directing the infrared communication port 300 to the infrared communication module of the merchant terminal (the infrared communication port for the merchant terminal 103) (payment operation 8404), the user depresses the execution switch 311.

The mobile user terminal generates a payment offer 8405 that includes the credit card type, the amount to be paid and the number of payments that are entered by the user, and that is a message offering to pay the merchant the quoted price. The payment offer 8405 is transmitted to the merchant terminal via infrared communication.

Upon receiving the payment offer 8405, the merchant terminal examines the type of credit card and the amount of the payment, and via infrared communication, transmits to the mobile user terminal a payment offer response 8406, which is a response message for the payment offer 8405. In addition, via digital telephone communication the merchant terminal transmits, to the service providing system 110, an authorization request 8409, which is a message requesting an authorization for the user. At this time, the message indicating that the authorization process is in progress is displayed on the LCD of the merchant terminal (display "authorization process in progress": 8407).

The mobile user terminal 100 receives the payment offer response 8406 from the infrared communication port 300, and compares the amount charged included in the response 8406 with the amount of the payment. Then, via digital wireless telephone communication, the mobile user terminal transmits, to the service providing system 110, a payment request 8410, which is a message requesting that the payment of a price using credit be permitted. At this time, a message indicating the payment process is in progress is displayed on the LCD of the mobile user terminal (display "payment process in progress": 8408).

The service providing system 110 receives the authorization request 8409 from the merchant terminal and the payment request 8410 from the mobile user terminal 100, and compares the two. In addition, the service providing system 110 examines the credit state of the user, and generates and transmits, to the merchant terminal, an authorization response 8411, which is a response message for the authorization request.

Upon receiving the authorization response 8411 from the service providing system 110, the merchant terminal displays, on the LCD, the contents of the authorization response 8411, and notifies the operator (merchant) of the authorization results (display the authorization results 8412).

The operator (merchant) confirms the contents of the authorization, depresses the execution switch of the merchant terminal, and instructs the start of the settlement process (settlement process request operation 8413). Then, via digital telephone communication, the merchant terminal transmits, to the service providing system 110, a clearance request 8415, which is a message requesting the settlement, and displays on the LCD a message indicating the settlement is in process (display "settlement process in progress": 8414).

The service providing system 110 receives the clearance request 8415 from the merchant terminal, and transmits, to the transaction processing system 106, a clearance request 8416, which is a message requesting the performance of the credit settlement process by the transaction processing system 106.

Upon receiving the clearing request 8416 at the transaction processing system, the transaction server 1000 updates the data in the subscriber information server 1001, in the member store information server 1002 and in the transaction information server 1003, and performs the credit settlement process. Then, a clearing completion notification 8417. which is a message stating that the settlement process has been completed is transmitted to the service providing system.

Upon receiving the clearing completion notification 8417, the service providing system generates a clearing completion notification 8418, which is a message stating that the settlement process has been completed, and transmits it to the merchant terminal.

Upon receiving the clearing completion notification 8418, the merchant terminal generates a receipt message 8419, which corresponds to a receipt, and transmits it to the service providing system. The merchant terminal also displays on the LCD the contents of the clearing completion notification 8419 in order to notify the operator (merchant) that the settlement process has been completed (display clearing completion: 8420).

Upon receiving the receipt message 8419, the service providing system generates a receipt message 8421, and transmits it to the mobile user terminal.

The mobile user terminal 100 displays, on the LCD, the contents of the receipt 8421 that has been received, and notifies the user of the completion of the settlement process (display the receipt: 8422).

A detailed explanation will be given later for the messages that are exchanged by the devices during the above electronic credit card service process.

The internal structure of the mobile user terminal 100 will now be described.

Figure 15:
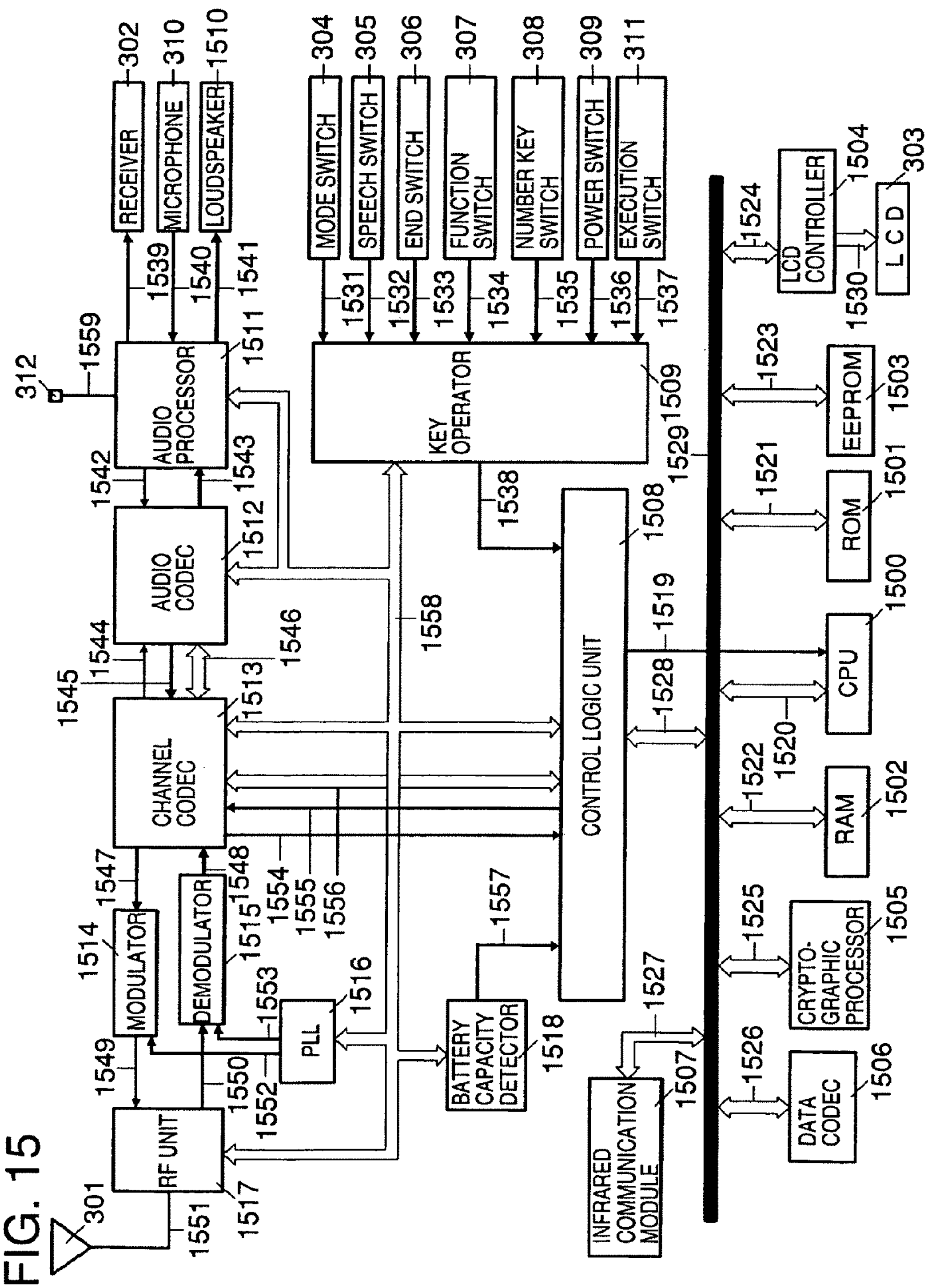
FIG. 15 is a block diagram illustrating the arrangement of a mobile user terminal according to the embodiment of the present invention.

FIG. 15 is a block diagram illustrating the arrangement of the mobile user terminal 100. This terminal 100 comprises: a CPU (Central Processing Unit) 1500, which employs a program stored in a ROM (Read Only Memory) 1501 to process data for transmission and for reception, and to control the other components via a bus 1529; a RAM (Random Access Memory) 1502, in which are stored data that are processed and that are to be processed by the CPU 1500; a EEPROM (Electric Erasable Programmable Read Only Memory) 1503, in which are stored a terminal ID and a telephone number for the mobile user terminal 100 when used as a wireless telephone terminal, a user ID, a code number for a user, a private key and a public key for a digital signature, a service provider ID, and the telephone number and the public key of the service providing system 110 (the digital signature of the service provider is accompanied by the telephone number of the service providing system); an LCD controller 1504, which operates the LCD 303 under the control of the CPU 1500, and which displays on the LCD an image that is set up by the CPU 1500; a cryptographic processor 1505, which encrypts and decrypts data under the control of the CPU 1500; a data codec 1506, which under the control of the CPU 1500 encodes data to be transmitted and decodes data that is received; an infrared communication module 1507, which transmits and receives infrared rays during infrared communication; a key operator 1509, which detects the manipulation by the user of the mode switch 304, the speech switch 305, the end switch 306, the function switch 307, the number key switch 308, the power switch 309 and the execution switch 311; an audio processor 1511, which drives a loudspeaker 1510, a receiver 302 or a headphone set that is connected to a headphone jack 312, and amplifies an analog audio signal that is input through the microphone 310 or the headphone head; an audio codec 1512, which encodes an analog audio signal 1542 to provide digital audio data, and decodes digital audio data to provide an analog audio signal 1543; a channel codec 1513, which generates data to be transmitted along a radio channel, and which extracts, from received data, data that is addressed to the mobile user terminal 100; a modulator 1514, which modulates a serial digital signal 1547 input by the channel codec 1513 to obtain an analog transmission signal 1549 that employs as a baseband an electric signal 1552 that is transmitted by a PLL 1516; a demodulator 1515, which, to obtain a serial digital signal 1548, demodulates a received analog signal 1550 while employing as a baseband an electric signal 1553 that is supplied by the PLL 1516, and which transmits the serial digital signal 1548 to the channel codec 1513; an RF unit 1517, which changes the analog transmission signal 1549 received from the modulator 1514 into a radio wave and outputs it through an antenna 301, and which, upon receiving a radio wave through the antenna 301, transmits an analog reception signal 1550 to the demodulator 1515; a battery capacity detector 1518, which detects the capacity of the battery of the mobile user terminal 100; and a control logic unit 1508, which activates the channel codec 1513, the PLL 1516 and the RF unit 1517, and which processes interrupt signals, transmitted by the key operator 1509, the channel codec 1513 and the battery capacity detector 1518, and serves as an interface when the CPU 1500 accesses the internal registers of the key operator 1509, the audio processor 1511, the audio codec 1512 and the channel codec.

The cryptographic processor 1505 includes a secret key encryption and decryption function and a public key encryption and decryption function. The cryptographic processor 1505 employs a cryptography method determined by the CPU 1500 and the keys to encrypt or decrypt data set by the CPU 1500. The encryption and decryption functions of the cryptographic processor 1505 are employed to perform a digital signature process or a closing process for a message, and to decrypt a closed and encrypted message or to verify a digital signature accompanying a message. A detailed explanation will be given later for the digital signature process, the closing process, the decryption process, and the digital signature verification process.

The data codec 1506 encodes data to be transmitted or decodes data that is received under the control of the CPU 1500. In this case, the encoding is a process for generating data to be transmitted that includes communication control information and error correction information, and the decoding is a process for performing error correction for the received data and for removing extra communication control information in order to obtain the data that a sender was originally to transmit. The data codec 1506 has a function for encoding or decoding data during data communication performed using a digital wireless telephone, and a function for encoding or decoding data during infrared communication. The data codec 1506 performs encoding or decoding, as determined by the CPU 1500, for data that are set by the CPU 1500.

When, for example, a closed message accompanied by a digital signature is to be transmitted via digital wireless telephone communication, the CPU 1500 employs the cryptographic processor 1505 to perform a digital signature process and a closing process for a message, employs the data codec 1506 to encode the obtained message to provide a data communication form for a digital wireless telephone, and transmits the resultant message via the control logic unit 1508 to the channel codec 1513.

When a closed message accompanied by a digital signature is received via digital wireless telephone communication, the CPU 1500 reads that message from the channel codec 1513 through the control logic unit 1508, employs the data codec 1506 to decode the received message, and permits the cryptographic processor 1505 to decrypt the closed and encrypted message and to verify the digital signature accompanying the message.

Similarly, when a closed message accompanied by a digital signature is to be transmitted via infrared communication, the CPU 1500 employs the cryptographic processor 1505 to provide a digital signature for the message and to close the message, and employs the data codec 1506 to encode the obtained message to provide a data form suitable for infrared communication. Then, the resultant message is transmitted to the infrared communication module 1507.

When a closed message accompanied by a digital signature is received via infrared communication, the CPU 1500 reads that message from the infrared communication module 1507, employs the data codec 1506 to decode the received message, and permits the cryptographic processor 1505 to decrypt the closed and encrypted message and to verify the digital signature accompanying the message.

Figure 16A:
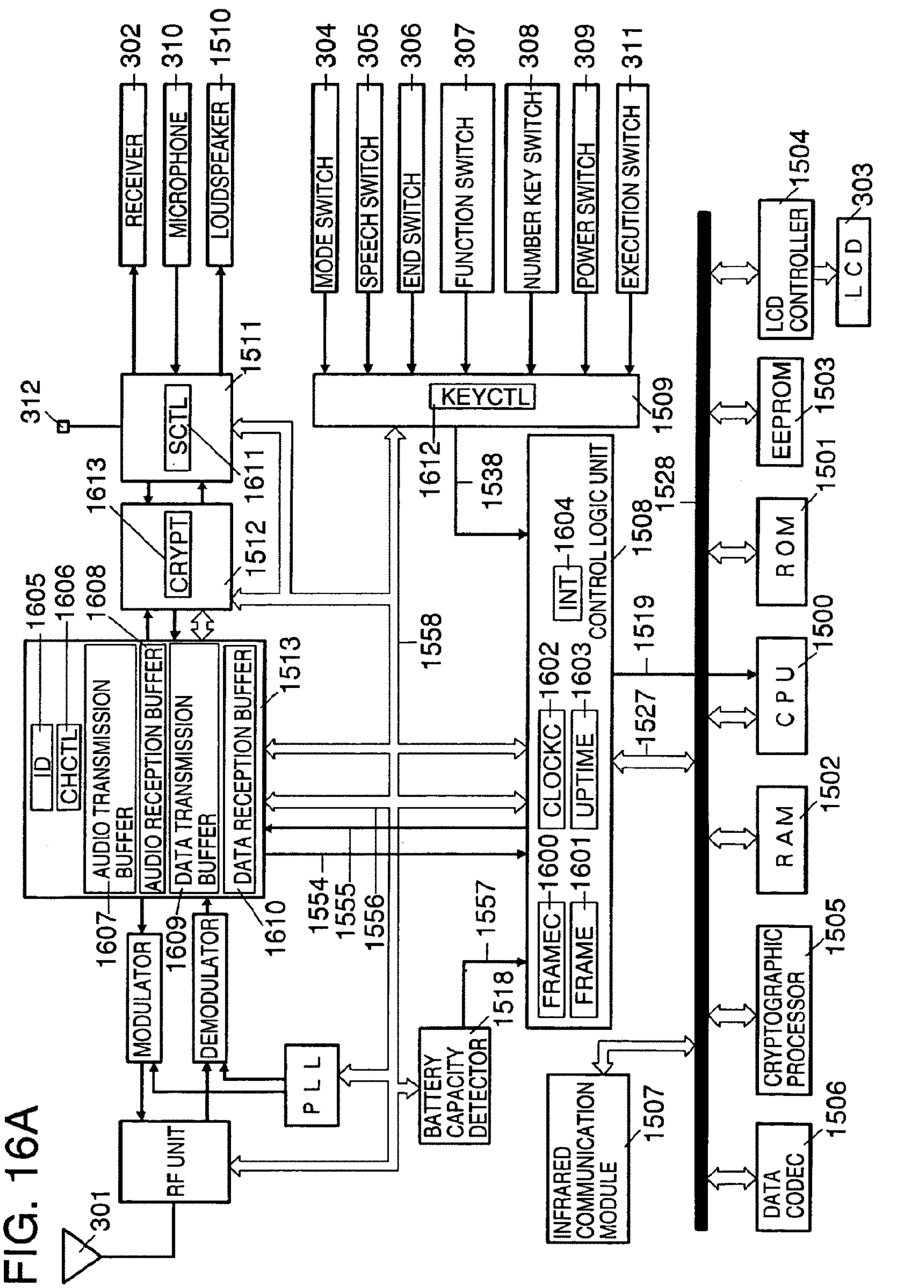
FIG. 16A is a diagram illustrating the arrangement of an internal register in the mobile user terminal according to the embodiment of the present invention.

When the user depresses either the mode switch 304, the speech switch 305, the end switch 306, the function switch 307, the number key switch 308, the power switch 309, or the execution switch 311 the key operator 1509 detects the switch manipulation by the user and asserts an interrupt signal 1538 requesting the performance of a process corresponding to the switch that was manipulated. As is shown in FIG. 16A, the key operator 1509 includes a key control register (KEYCTL) 1612 for setting the valid/invalid state of each switch. The CPU 1500 accesses the key control register (KEYCTL) 1612 to set the valid/invalid state of each switch.

The audio processor 1511 includes an audio control register (SCTL) 1611 for controlling the audio process, as is shown in FIG. 16A. The CPU 1500 accesses the audio control register (SCTL) 1611 to control the audio processor 1511. When, for example, a call request over a digital wireless telephone is received, the CPU 1500 accesses the audio control register (SCTL) 1611 to output a call tone for a digital wireless telephone. As a result, the audio processor 1511 drives the loudspeaker 1510 to release the call tone for a digital wireless telephone. It should be noted that when a call request is from the service providing system 110, no call arrival tone is output, and the CPU 1500 initiates a process for establishing a communication session with the service providing system.

The audio codec 1512 encodes an analog audio signal 1542 received from the audio processor 1511 to provide digital audio data, and decodes digital audio data received from the channel codec 1513 to provide an analog audio signal 1543. The analog audio signal 1543 is transmitted to the audio processor 1511, which amplifies the signal 1543 and drives the receiver 302 to produce sounds. The encoded digital audio data are transmitted as a digital audio signal 1546 to the channel codec 1513, which converts the data into data that can be transmitted across the radio channel.

In addition, the audio codec 1512 includes an audio data encryption key register (CRYPT) 1613 in which is stored an encryption key for the secret key cryptography method that is employed for encryption and decryption of audio data. When the audio data encryption key is set to the audio data encryption key register (CRYPT) 1613 by the CPU 1500, the audio codec 1512 encodes the analog audio signal 1542 to provide digital audio data, and at the same time encrypts the digital audio data, or decodes the digital audio data to provide an analog audio signal 1543 while simultaneously decrypting the audio data.

Two types of data to be transmitted are received by the channel codec 1513: one type is digital audio data originating at the audio codec 1512 as a digital audio signal 1546, and the other type is data-communication data originating at the CPU 1500 that pass through the control logic unit 1508 as a digital signal 1556.

The channel codec 1513 adds identification data, as header information, to digital audio data and data-communication data, then converts the data into a serial digital signal 1547 having a data format that is suitable for a digital wireless telephone, and transmits the signal 1547 to the modulator 1514.

In addition, upon receiving a serial digital signal 1548 from the demodulator 1515, the channel codec 1513 examines a terminal ID and extracts only such data as is addressed to the channel codec 1513, removes the communication control information for the digital wireless telephone, identifies the digital audio data and the data-communication data in the header information, and transmits these data as a digital audio signal 1546 and a digital signal 1556 to the audio codec 1512 and the control logic unit 1508 respectively.

Further, upon receiving a digital wireless call or data-communication data, the channel codec 1513 asserts an interrupt signal 1554, and upon receiving digital audio data, brings the control signal 1544 low. The interrupt signal 1554 is a signal requesting that the CPU 1500 perform a process for a received digital wireless phone communication and a process for data-communication data. The control signal 1544 is a low-active signal for requesting that the audio codec 1512 process the received digital audio data.

In order to perform these processes, as is shown in FIG. 16A, the channel codec 1513 includes: an ID register (ID) 1605, in which is stored a terminal ID; a channel codec control register (CHCTL) 1606, which controls the operation of the channel codec 1513; an audio transmission buffer 1607, in which are stored digital audio data received from the audio codec 1512; an audio reception buffer 1608, in which are stored digital audio data extracted from received data; a data transmission buffer 1609, in which are stored data-communication data received from the control logic unit 1508; and a data reception buffer 1610, in which are stored data-communication data extracted from received data.

A control signal 1545 is a control signal directing the audio codec 1512 to write data to the data transmission buffer 1607 and to read data from the data reception buffer 1608. When the control signal 1545 goes low, the digital audio data are written to the data transmission buffer 1607, and when the control signal 1545 goes high, the digital audio data are read from the data reception buffer 1609.

A control signal 1555 is a control signal with which the CPU 1500 directs the channel codec 1513, via the control logic unit 1508, to write data to the data transmission buffer 1609 and to read data from the data reception buffer 1610. When the control signal 1555 goes low, the data-communication data are written to the data transmission buffer 1609, and when the control signal 1555 goes high, the data-communication data are read from the data reception buffer 1610.

The modulator 1514 modulates a serial digital signal 1547 received from the channel codec 1513 to provide an analog transmission signal 1549, which is employed as a baseband for an electric signal 1552 that is supplied by the PLL 1516, and transmits the signal 1549 to the RF unit 1517. The analog transmission signal 1549 received by the RF unit 1517 is output as a radio wave through the antenna 301.

When a radio wave is received at the antenna 301, an analog reception signal 1550 is transmitted by the RF unit 1517 to the demodulator 1515. The demodulator 1515 demodulates the analog signal 1550, while employing as its baseband an electric signal 1553 that is supplied by the PLL 1516, and transmits an obtained serial digital signal 1548 to the channel codec 1513.

The battery capacity detector 1518, for detecting the capacity of a battery, asserts an interrupt signal 1557 when the remaining capacity of the battery of the mobile user terminal 100 is equal to or less than a value Q (Q>0) that is set by the CPU 1500. The interrupt signal 1557 is a signal for requesting that the CPU 1500 perform a data backup process for the RAM 1502. The value Q is large enough to enable the mobile user terminal 100 to communicate with the service providing system 110 in order to back up data in the RAM 1502 for the service providing system 110 (data backup process).

The control logic unit 1508, as is shown in FIG. 16A, includes five internal registers: a frame counter (FRAMEC) 1600, a start frame register (FRAME) 1601, a clock counter (CLOCKC) 1602, an update time register (UPTIME) 1603, and an interrupt register (INT) 1604.

The frame counter 1600 is employed to count the number of frames for the digital wireless telephone; the start frame register 1601 is employed to store the frame number of the frame that is to be activated next; the clock counter 1602 is employed to measure the current time; the update time register 1603 is employed to store the time at which the mobile user terminal 100 will communicate with the service providing system 110 to update data in the RAM 1502 (data updating process); and the interrupt register 1604 is employed to indicate the reason an interrupt was generated for the CPU 1500.

Generally, to receive a call the digital wireless telephone intermittently acquires control data for a control channel and compares it with the terminal ID. The mobile user terminal 100 employs the frame counter 1600 and the start frame register 1601 to intermittently acquire control data. First, the frame number of the frame to be activated next is stored in advance in the start frame register 1601, and when the count value of the frame counter 1600 equals the amount held by the start frame register 1601, to acquire control data the control logic unit 1508 activates the channel codec 1513, the PLL 1516 and the RF unit 1517 via an address data signal line 1558.

When the value of the clock counter 1602 matches the amount in the update time register 1603, or when one of the interrupt signals 1558, 1554 and 1557 is asserted, the control logic unit 1508 writes the reason for the interrupt in the interrupt register (INT) 1604, and asserts an interrupt signal 1519 requesting that the CPU 1500 perform an interrupt process. For the interrupt processing, the CPU 1500 reads the reason stored in the interrupt register (INT) 1604 and then performs a corresponding process.

The individual bit fields of the interrupt register (INT) 1604 are defined as is shown in FIG. 16B.

Bit 31 represents the state of the power switch 309. When the bit value is 0, it indicates the state is the power-OFF state, and when the bit value is 1, it indicates the state is the power-ON state.

Bit 30 represents the digital wireless telephone communication state. When the bit value is 0, it indicates the state is one wherein no digital wireless telephone communication is being performed, and when the bit value is 1, it indicates the state is one wherein digital wireless telephone communication is in progress.

Bit 29 represents the generation of a frame interrupt requesting the intermittent acquisition of control data. When the bit value is 1, it indicates a condition that exists when a frame interruption has occurred. In this bit field, a 1 is set when the amount in the frame counter 1600 equals the amount held in the start frame register 1601.

Bit 28 represents the generation of a call arrival interrupt. When the bit value is 1, it indicates that a digital wireless call has arrived. In this bit field, a 1 is set when the terminal ID is matched and the interrupt signal 1554 is asserted during the intermittent acquisition of control data for the digital wireless phone.

Bit 27 represents the generation of a data reception interrupt. When the bit value is 1, it indicates that data is being received. In this bit field, a 1 is set when the data-communication data are received and the interrupt signal 1554 is asserted during the course of digital wireless telephone communication.

Bit 26 represents the generation of an update interrupt requesting the performance of a data updating process. When the bit value is 1, it indicates the generation of the update interrupt. In this bit field, a 1 is set when the amount in the clock counter 1602 matches the amount in the update time register 1603.

Bit 25 represents the generation of a battery interrupt requesting a backup process. When the bit value is 1, it represents the generation of the battery interrupt. In this bit field, a 1 is set when the interrupt signal 1557 received from the battery capacity detector 1518 is asserted.

Bit 24 represents the generation of a key interrupt by the manipulation of the switch. When the bit value is 1, it represents the generation of the key interrupt.

Bits 0 to 9 correspond to switches 0 to 9 for the number key switch 208. Bit 10 and bit 11 correspond to number key switches "*" and "#" and bits 12 to 15 corresponds to function switches F1 to F4. Bits 16 to 20 respectively correspond to the power switch 309, the execution switch 311, the mode switch 304, the speech switch 305, and the end switch 306. When the amount of a bit is 1, it indicates that a switch corresponding to that bit has been depressed.

Data stored in the RAM 1502 will now be described.

Figure 17:
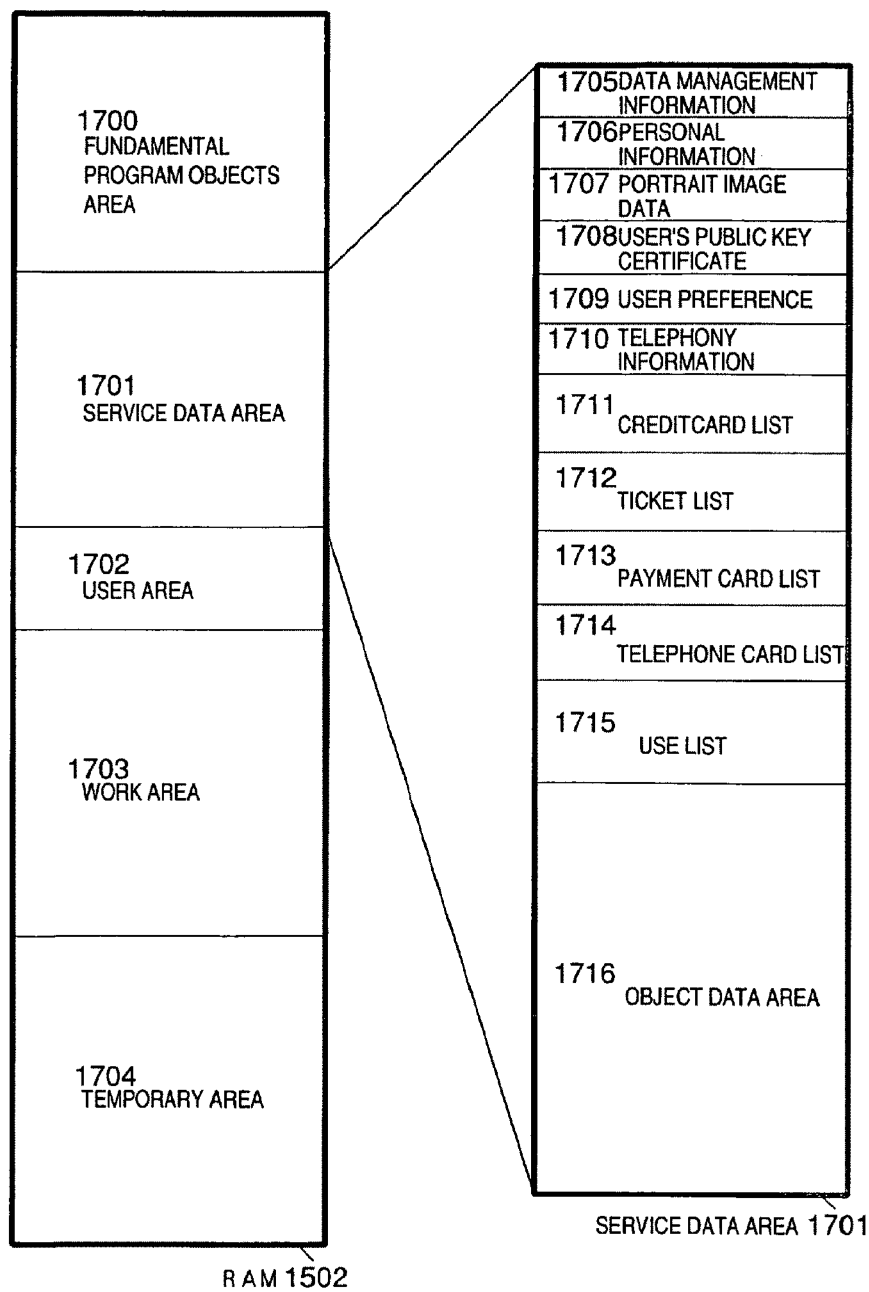
FIG. 17 is a specific diagram showing a RAM map for the mobile user terminal according to the embodiment of the present invention.

FIG. 17 is a specific diagram showing a RAM map for data stored in the RAM 1502.

The RAM 1502 is constituted by five areas: a fundamental program objects area 1700, a service data area 1701, a user area 1702, a work area 1703, and a temporary area 1704. In the fundamental program objects area 1700 are stored an upgraded module for a program stored in the ROM 1501, a patch program, and an additional program.

The user area 1702 is an area that can be freely used by a user, the work area 1703 is a work area that the CPU 1500 employs when executing a program, and the temporary area 1704 is an area in which information received by the mobile user terminal 100 is stored temporarily. The service data area 1701 is an area in which is stored contract information for the mobile electronic commerce service, electronic ticket information, electronic payment card information, electronic telephone card information, electronic credit card information, and history information; the data in this area are managed by the service providing system 110.

The service data area 1701 is constituted by 12 sub-areas: a data management information area 1705, a personal information area 1706, a portrait image data area 1707, a user public key certificate area 1708, a user preference area 1709, a telephony information area 1710, a credit card list area 1711, a ticket list area 1712, a payment card list area 1713, a telephone card list area 1714, a use history area 1715, and an object data area 1716. The data management information area 1705 is an area in which is stored management information for data stored in the service data area 1701; the personal information area 1706 is an area in which are stored the name, age and gender of a user; the portrait image data area 1707 is an area in which the portrait image data for the face of a user are stored; the user public key certificate area 1708 is an area in which a public key certificate for a user is stored; the user preference area 1709 is an area in which is stored preference information for a user concerning the mobile electronic commerce service; the telephony information area 1710 is an area in which information concerning a digital wireless telephone is stored; the credit card list area 1711 is an area in which is stored list information for credit cards registered by a user; the ticket list area 1712 is an area in which is stored list information for electronic tickets owned by a user; the payment card list area 1713 is an area in which is stored list information for electronic payment cards owned by a user; the telephone card list area 1714 is an area in which is stored list information for electronic telephone cards owned by a user; the use list area 1715 is an area in which is stored use history information for the mobile electronic commerce service; and the object data area 1716 is an area in which are stored object data for information managed in the other eleven areas.

The private key and the public key that are used for the digital signature of a user are updated periodically, or semi-periodically. At this time, the public key certificate for the user stored in the user public key certificate area 1708 is also updated.

The information stored in the service data area 1701 will now be described in detail.

Figure 18:
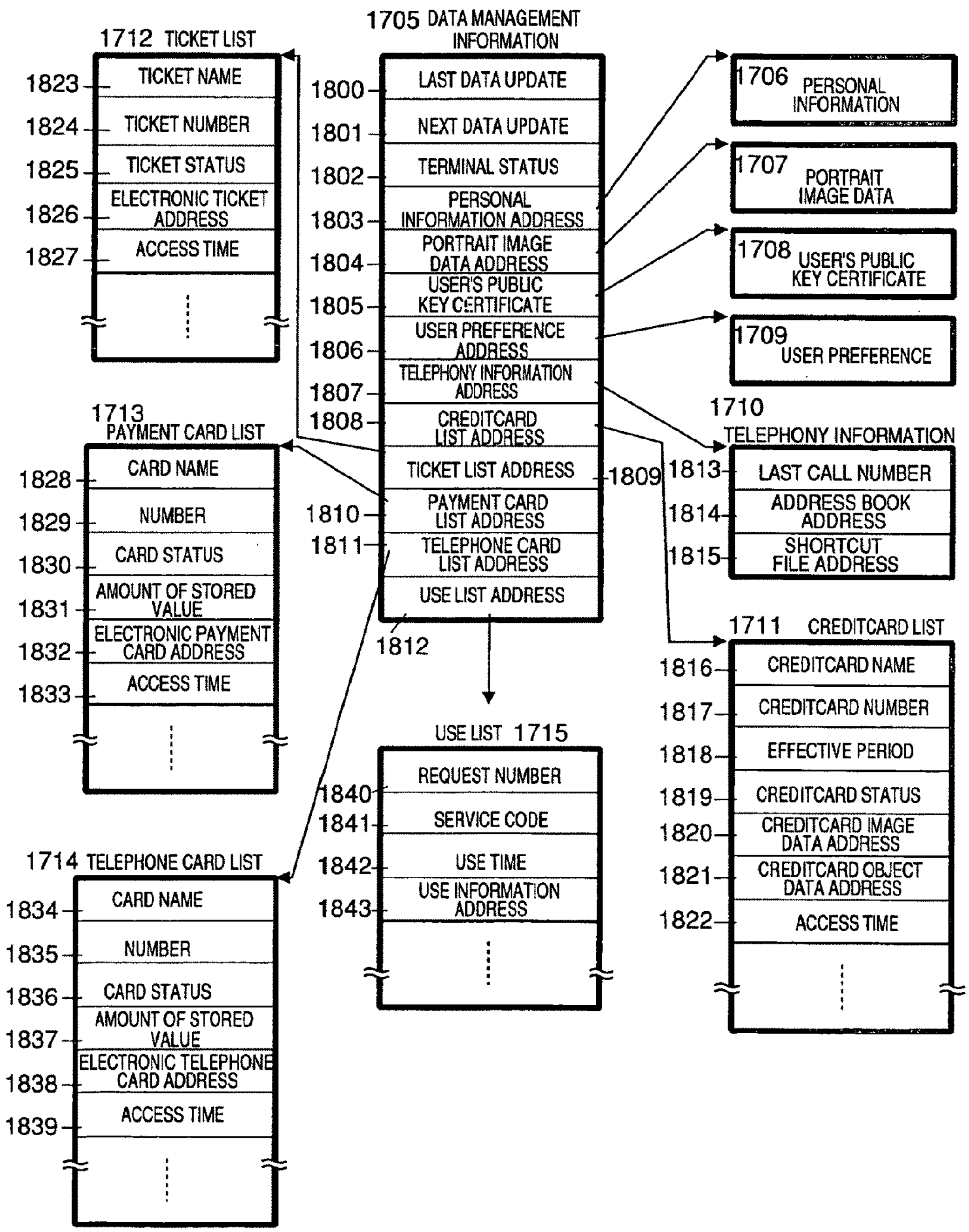
FIG. 18 is a specific diagram showing data that are stored in the service data area of the mobile user terminal according to the embodiment of the present invention.

FIG. 18 is a detailed, specific diagram showing the relationship existing between information stored in the service data area 1701.

The data management information 1705 consists of thirteen types of information: a last data update date 1800, a next data update date 1801, a terminal status 1802, a personal information address 1803, a portrait image data address 1804, a user public key certificate address 1805, a user preference address 1806, a telephony information address 1807, a credit card list address 1808, a ticket list address 1809, a payment card list address 1810, a telephone card list address 1811, and a use list address 1812.

The last data update date 1800 represents the date on which the service providing system 110 last updated the data in the RAM 1502, and the next data update date 1801 represents the date on which the service providing system 110 will next update data in the service data area 1701.

The amount of the next data update date 1801 is set in the update time register 1603. When the next data update date 1801 is reached, the mobile user terminal 100 initiates the data updating process. During the data updating process, the service providing system 110 updates data stored in the RAM 1502. This process is performed daily during a period (e.g., late at night) in which communication traffic is not very heavy. The data updating process will be described in detail later.

The terminal status 1802 represents the status of the mobile user terminal 100; and the personal information address 1803, the portrait image data address 1804, the user public key certificate address 1805, the user preference address 1806, the telephony information address 1807, the credit card list address 1808, the ticket list address 1809, the payment card list address 1810, the telephone card list address 1811, and the use list address 1812 respectively represent the first addresses of the areas in which are stored personal information 1706, portrait image data 1707, a user public key certificate 1708, user preference information 1709, telephony information 1710, a credit card list 1711, a ticket list 1712, a payment card list 1713, a telephone card list 1714, and a use list 1715.

The telephony information 1710 consists of three types of information: a last called number 1813, an address book address 1814, and a shortcut file address 1815. The last called number 1813 represents a telephone number employed for a prior call, and is employed when re-dialing a digital wireless telephone. The address book address 1814 and the shortcut file address 1815 respectively represent addresses in the object data area at which address book information and a shortcut file are stored.

The credit card list 1711 includes list information for credit cards that are registered by a user. In the credit card list 1711, seven types of information are entered for each credit card: a credit card name 1816, a credit card number 1817, an effective period 1818, a credit card status 1819, an image data address 1820, an object data address 1821, and an access time 1822.

The credit card status 1819 indicates whether or not the credit card is effective, and also the credit limit, while the image data address 1820 represents an address in the object data area 1716 at which image data for the credit card are stored. The object data address 1821 represents an address at which are stored object data for a program for the credit card, and the access time 1822 represents the last time that the user employed the credit card.

At the object data address 1821 is stored a local address that is an address in the object data area 1716, or a remote address that is an address in the user information server 902 of the service providing system 110. When a remote address is stored at the object data address 1821, and when the user selects a corresponding credit card, the mobile user terminal 100 downloads object data from the service providing system 110 to the temporary area 1704 (remote access), and executes a program for the credit card. In order to simply display the credit card, the image data at the image data address 1820 in the object data area 1716 are displayed, and object data are not downloaded.

An address to be stored at the object data address 1821 is determined by the service providing system 110. In the data updating process, the access times for the individual credit cards are compared, and a local address is assigned for the credit card having the latest access time.

When there is adequate space in the object data area 1716, the object data addresses of all the credit cards can be local addresses.

The list information for the electronic tickets owned by the user is stored in the ticket list area 1712. In the ticket list area 1712 are stored five types of information: ticket name information 1823, ticket ID information 1824, ticket status information 1825, electronic ticket address information 1826, and access time information 1827.

The ticket name 1823 and the ticket ID 1824 represent the name and the ID of an electronic ticket. The ticket status 1825 represents the state of an electronic ticket, concerning whether it can be employed or whether it has been examined. The electronic ticket address 1826 represents an address at which an electronic ticket is stored. And the access time 1827 is the time at which the user last accessed the electronic ticket.

The list information for electronic payment cards owned by the user is stored in the payment card list area 1713. In the payment card list area 1713 are stored six types of information: card name information 1828, card ID information 1829, card status information 1830, remaining card amount information 1831, electronic payment card address information 1832, and access time information 1833.

The card name 1828 and the card ID 1829 represent the name and the ID of an electronic payment card. The card status 1830 represents the state of an electronic payment card, concerning whether it can be employed or whether its credit is exhausted. The remaining card amount 1831 represents the remaining amount that is held by an electronic payment card. The electronic payment card address 1832 represents an address at which an electronic payment card is stored. And the access time 1832 is the time at which the user last accessed the electronic payment card.

The list information for electronic telephone cards owned by the user is stored in the telephone card list area 1714. In the telephone card list area 1714 are stored six types of information: card name information 1834, card ID information 1835, card status information 1836, remaining card amount information 1837, electronic telephone card address information 1838, and access time information 1840.

The card name 1834 and the card ID 1835 represent the name and the ID of an electronic telephone card. The card status 1836 represents the state of an electronic telephone card, concerning whether it can be employed or whether its credit is exhausted. The remaining card amount 1837 represents the remaining amount that is held by the electronic telephone card. The electronic telephone card address 1838 represents an address at which an electronic telephone card is stored. And the access time 1839 is the time at which the user last accessed the electronic telephone card.

A local address indicating an address in the object data area 1716, or a remote address indicating an address in the user information server 902 of the service providing system 110, is stored at the electronic ticket address 1826, the electronic payment card address 1832 and the electronic telephone card address 1838.

When a remote address is stored at the electronic ticket address 1826, and when the user accesses the electronic ticket, the mobile user terminal 100 downloads object data from the service providing system 110 to the temporary area 1704 (remote access) and displays the data on the LCD 303. Similarly, when a remote address is stored at the electronic payment card address 1832 or the electronic telephone card address 1837, and when the user accesses the electronic payment card or the telephone card, the mobile user terminal 100 downloads object data from the service providing system 110 to the temporary area 1704 (remote access), and displays the data on the LCD 303.

Addresses to be stored at the electronic ticket address 1826, the electronic payment card address 1832 and the electronic telephone card address 1838 are determined by the service providing system 110. In the data updating process, the access times are compared and a local address is assigned for the electronic ticket, the electronic payment card and the electronic telephone card having the latest access times. When there is adequate space available in the object data area 1716, the object data addresses of all the credit cards can be local addresses.

In the use list 1715, four types of information are stored for one mobile electronic commerce service: request number information 1840, service code information 1841, use time information 1842, and use information address information 1843. The request number 1840 uniquely represents (as regards the user) the mobile electronic commerce service provided for the user. The service code 1841 is a code number that indicates the type of service that is provided. The use time 1842 is the time at which the mobile electronic commerce service is provided. And the use information address 1843 is an address at which a receipt, or information indicating the contents of the use, is stored.

At the use information address 1843 is stored a local address, which is an address in the object data area 1716, or a remote address, which is an address in the user information server 902 of the service providing system 110. When a remote address is stored at the use information address 1843, and when the user accesses the use information, the mobile user terminal 100 downloads the use information from the service providing system 110 to the temporary area 1704 and displays it on the LCD 303.

The address stored at the use information address 1843 is also determined by the service providing system. In the data updating process, the use times for the individual use information items are compared, and a local address is assigned for the use information having the latest use time. When there is adequate space available in the object data area 1716, all the use information addresses can be local addresses.

An explanation will now be given for the data structures of an electronic ticket, an electronic payment card and an electronic telephone card.

Figure 19:
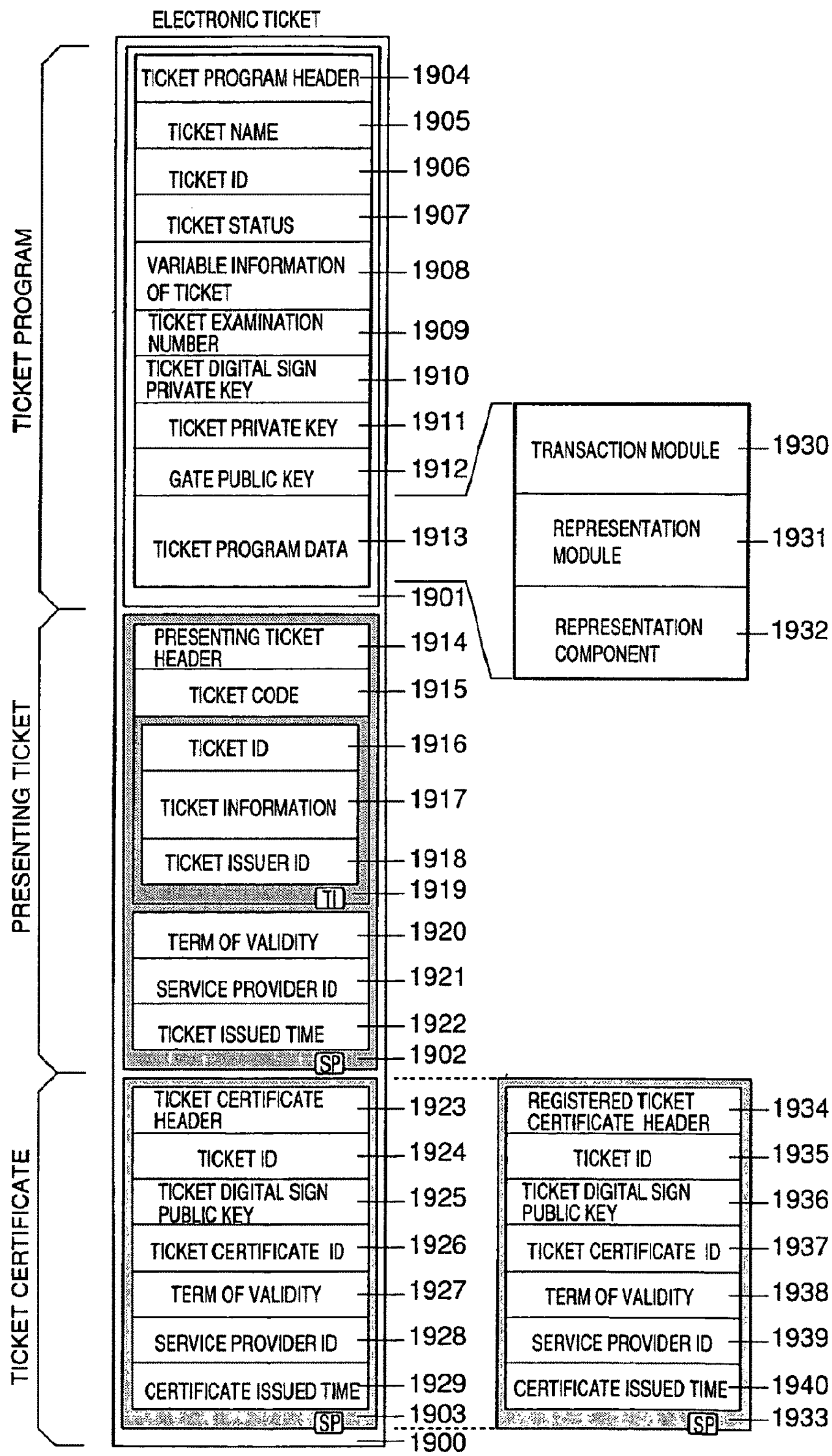
FIG. 19 is a specific diagram showing the data structure of an electronic ticket according to the embodiment of the present invention.

FIG. 19 is a specific diagram showing the data structure of an electronic ticket 1900. In FIG. 19, the electronic ticket

1900 consists of three portions: a ticket program 1901, a presentation ticket 1902 and a ticket certificate 1903 or 1933 portion. The ticket program 1901 portion is information for managing the status of a ticket and for specifying an operation inherent to a ticket. The presentation ticket 1902 portion is information that is to be presented to the gate terminal 101 as information for the contents of a ticket for the examination of an electronic ticket. The ticket certificate is issued by a service provider for an electronic ticket, and indicates that the electronic ticket is authentic. There are two types of ticket certificates: a ticket certificate 1903 for simply certifying an electronic ticket, and a registered ticket certificate 1933 for certifying that an electronic ticket is registered in the service providing system. The ticket certificate 1903 can be changed to the registered ticket certificate 1933 when the user registers an electronic ticket.

One electronic ticket includes three key types and four different keys in accordance with the public key cryptography method. One key type is a key used for a digital signature accompanying an electronic ticket, and a ticket signature private key 1910 and a ticket signature public key 1925 (1936) are provided as a private key and a corresponding public key. Another key type is a ticket private key 1911 used for the electronic ticket authorization process performed with the gate terminal 101. The other key type is a gate public key 1912 used for the authorization process for the gate terminal 101 performed by the mobile user terminal 100.

The ticket signature private key 1910 and the ticket signature public key 1925 (1936) are a key pair that differs for each electronic ticket. The ticket private key 1911 and the gate public key 1912 differ for each ticket type. The gate terminal 101 includes a ticket public key and a gate private key that correspond to the ticket private key 1911 and the gate public key 1912. The method for employing these keys will be described in detail later.

In FIG. 19, first, the ticket program 1901 includes ten items of information: ticket program header 1904, ticket name 1905, ticket ID 1906, ticket status 1907, variable ticket information 1908, ticket examination number 1909, ticket signature private key 1910, ticket private key 1911, gate public key 1912 and ticket program data 1913 information.

The ticket program header 1904 is header information indicating that the entry is a ticket program and describing the data structure of the ticket program. The ticket name 1905 and the ticket ID 1906 are the name and the ID of an electronic ticket. The ticket ID is identification information that differs for each electronic ticket.

The ticket status 1907 is information describing the status of an electronic ticket, concerning whether the electronic ticket can be used, whether it has been examined, whether it has been registered, and whether it can be transferred.

The variable ticket information 1908 is variable information that is optionally set in accordance with the electronic ticket type.

The ticket examination number 1909 is a number indicating the order for the ticket examination process, and is incremented each time the ticket examination process is performed. For each electronic ticket, an arbitrary number is set as the initial amount for the ticket examination number. The initial amount is managed by the service providing system 110, and is employed as verification data in the ticket reference process. The ticket reference process will be described in detail later.

The ticket signature private key 1910 is a digital signature private key for the electronic ticket 1900. Similarly, the ticket private key 1911 is used for the authorization process for the electronic ticket 1900, and the gate public key is used for the authorization process for the gate terminal.

The ticket signature private key 1910 is used, in the ticket examination process and the ticket transfer process, to provide a digital signature for data consisting of the ticket status 1907 and the variable ticket information 1908 for the electronic ticket 1900 in the gate terminal 101 or the mobile user terminal to which the electronic ticket is transferred.

The ticket program data 1913 is a program module for specifying an operation inherent to the electronic ticket. Various types of tickets are specified by a combination of the ticket program data 1913 and the variable ticket information 1908.

The program module for specifying a common operation for the electronic ticket is stored in the ROM 1501. The basic operations, such as the exchange of messages with the gate terminal to examine an electronic ticket, the generation of messages to be exchanged and the setting of the ticket status 1907 to be "examined," and the standard format for the display of an electronic ticket on the LCD 303, are defined by the program module that is stored in the ROM 1501.

The ticket program data 1913 is a program module for specifying the operations inherent to the ticket examination process and inherent to the display process. The ticket program data 1913 consists of three data sets: a transaction module set 1930, a representation module set 1931 and a representative component information set 1932.

The transaction module 1930 is a program module for specifying the operation inherent to a ticket in the ticket examination process. Various operations in the ticket examination process can be defined by a combination of the variable ticket information 1908 and the ticket information 1917.

For example, to define an electronic ticket that is equivalent to five coupon tickets, a program module such as the transaction module 1930 is specified, whereby an amount of "5," which corresponds to the number of coupon tickets, is set for the variable ticket information 1908, whereby, at each examination, the number of coupon tickets in the variable ticket information is decremented, and whereby, when the number of coupon tickets reaches "0," the ticket status 1907 is changed to "disabled."

Further, to specify an electronic ticket that serves as a ticket that is valid for three days from the time it is first examined, a program module is defined as the transaction module 1930, whereby, when the ticket is first examined, the date of the third day is set in the variable ticket information 1908 as the effective limit, and whereby the effective limit set in the variable ticket information is examined during each examination.

The transaction module 1930 does not have to be specified if this is not required. When the transaction module 1930 is not defined, it acts as an electronic ticket for the performance of the basic ticket examination process.

The representation module 1931 is a program module for specifying an operation on the display, such as a location on the LCD 303, data to be displayed and a display form. For example, for the above electronic ticket that serves as a coupon ticket, the location whereat the number of remaining coupon tickets (a amount set in the variable ticket information) is displayed is designated by the representation module 1931.

The representation module 1931 also does not have to be defined if such is not necessary. When the representation module 1931 is not defined, an electronic ticket is displayed in the standard display format.

The representative component information 1932 is image information comprising a component of a ticket on the display, such as an illustration, a photo, a map or a background image.

The representative component information 1932 does not have to be specified if such is not necessary. When the representative component information 1932 is not specified, the electronic ticket is displayed using only with text information, as is shown in FIG. 3C. When the representative component information 1932 is specified, the electronic ticket is displayed using the standard display format. When the representation module 1931 is specified, the image information included in the representative component information is displayed as an image 313 in accordance with the representation module 1931, as is shown in FIG. 3F.

The operations attributable to various types of tickets, and the design of an electronic ticket having a high degree of freedom can be specified by a combination consisting of the transaction module 1930, the representation module 1931 and the representative component information 1932.

The presentation ticket 1902 includes eight information items: a presentation ticket header 1914, a ticket code 1915, a ticket ID 1916, ticket information 1917, a ticket issuer ID 1918, a validity term 1920, a service provider ID 1921, and a ticket issuing date 1922. A digital signature is provided for the ticket ID 1916, the ticket information 1917 and the ticket issuer ID 1918 by the ticket issuer (1919), and a digital signature is provided for the presentation ticket 1902 by the service provider.

The presentation ticket header 1914 is header information indicating that the pertinent ticket is a presentation ticket and indicating the data structure of the presentation ticket. The ticket code 1915 is code information indicating an electronic ticket type. And the ticket ID 1916 is ID information for an electronic ticket, and is the same information as that given for the ticket ID 1906.

The ticket information 1917 is ASCII (American Standard Code for Information Interchange) information that indicates the contents of a ticket. In the ticket information 1917, a ticket title, a date, a place, a seating class, a sponsor, information as to whether an electronic ticket can be transferred, and usage condition information, such as the number of coupon tickets when the electronic ticket is used as a coupon ticket, are described using a form to which tag information are added to represent the individual information types. When the standard display format or the representation module 1931 is designated, the ticket information 1917 is displayed on the LCD 303 in accordance with the representation module 1931, as is shown in FIG. 3C or 3F.

The ticket issuer ID 1918 is ID information that identifies the ticket issuer who issued the pertinent ticket. The validity term 1920 is information concerning the period the electronic ticket 1900 is valid. The service provider ID 1921 is ID information for the service provider. And the ticket issuing date 1922 is information concerning the date on which the service provider issued the electronic ticket 1900.

The ticket certificate 1903 and the registered ticket certificate 1933 have substantially the same data structure.

The ticket certificate 1903 includes seven information items: a ticket certificate header 1923, a ticket ID 1924, a ticket signature public key 1925, a ticket certificate ID 1926, a certificate validity term 1927, a service provider ID 1928, and a ticket certificate issuing date 1929. A digital signature is provided for the ticket certificate 1903 by the service provider.

The ticket certificate header 1923 is header information labeling this as a ticket certificate and describing the data structure of the ticket certificate. The ticket ID 1924 is ID information for the electronic ticket 1900, and is the same information as that provided by the ticket ID 1906 and the ticket ID 1916.

The ticket signature public key 1925 is a public key that is paired with the ticket signature private key 1910 for use as the digital signature for the electronic ticket 1900. The ticket certificate ID 1926 is ID information for the ticket certificate 1903. The certificate validity term 1927 is information indicating the period during which the ticket certificate 1903 is valid. The service provider ID 1928 is ID information for identifying the service provider who issued the ticket certificate 1903. The ticket certificate issuing date 1929 is information providing the date on which the ticket certificate 1903 was issued.

The registered ticket certificate 1933 includes seven information items: a registered ticket certificate header 1934, a ticket ID 1935, a ticket signature public key 1936, a ticket certificate ID 1937, a certificate validity term 1938, a service provider ID 1939, and a ticket certificate issuing date 1940. A digital signature is provided for the ticket certificate 1933 by the service provider.

The registered ticket certificate header 1934 is header information labeling this as a registered ticket certificate and describing the data structure of the registered ticket certificate. The ticket ID 1935 is ID information for the electronic ticket 1900, and is the same information as that provided by the ticket ID 1906 and the ticket ID 1916.

The ticket signature public key 1936 is a public key that is paired with the ticket signature private key 1910 for use as the digital signature for the electronic ticket 1900. The paired ticket signature private key 1910 and ticket signature public key 1936 have greater lengths and provide greater security than do the paired ticket signature private key 1910 and ticket signature public key 1925.

In the ticket registration process, the paired ticket signature private key 1910 and ticket signature public key 1925 used as the digital signature for the electronic ticket are updated to the new, more secure paired ticket signature private key 1910 and ticket signature public key 1936.

The ticket certificate ID 1937 is ID information for the registered ticket certificate 1933. The certificate validity term 1938 is information concerning the term during which the registered ticket certificate 1933 is valid. The service provider ID 1939 is ID information identifying the service provider who issued the registered ticket certificate 1933. The ticket certificate issuing date 1940 is information concerning the date on which the registered ticket certificate 1933 was issued.

The ticket certificate does not constitute information for certifying the electronic ticket 1900, but instead constitutes information with which the service provider certifies the ticket signature public key 1925 (or the ticket signature public key 1936). The ticket certificate is added to the message accompanied by the digital signature for which the ticket signature private key 1910 is used, so that the legality of the message can be verified.

When the electronic ticket is purchased or transferred, the ticket status 1907 for the electronic ticket is in the disabled state. To set the ticket status 1907 to the enabled state, the electronic ticket must be registered in the service providing system 110.

When the service providing system 110 separately manages an electronic ticket to be used and an electronic ticket that is unused and is in the sleeping state, the operating cost of the electronic ticket service is reduced, and the illegal use of the electronic ticket is prevented by changing, during the registration process, the digital signature keys for the electronic ticket.

When the electronic ticket is registered, the ticket status 1907 represents the enabled state. The ticket signature private key 1910 is changed to a new ticket signature private key, and accordingly, the ticket certificate 1903 is changed to the registered ticket certificate 1933. Further, in the service providing system 110, the electronic ticket is registered in the service director information server 901 as an electronic ticket that is to be used by the user who registered the ticket.

Figure 20:
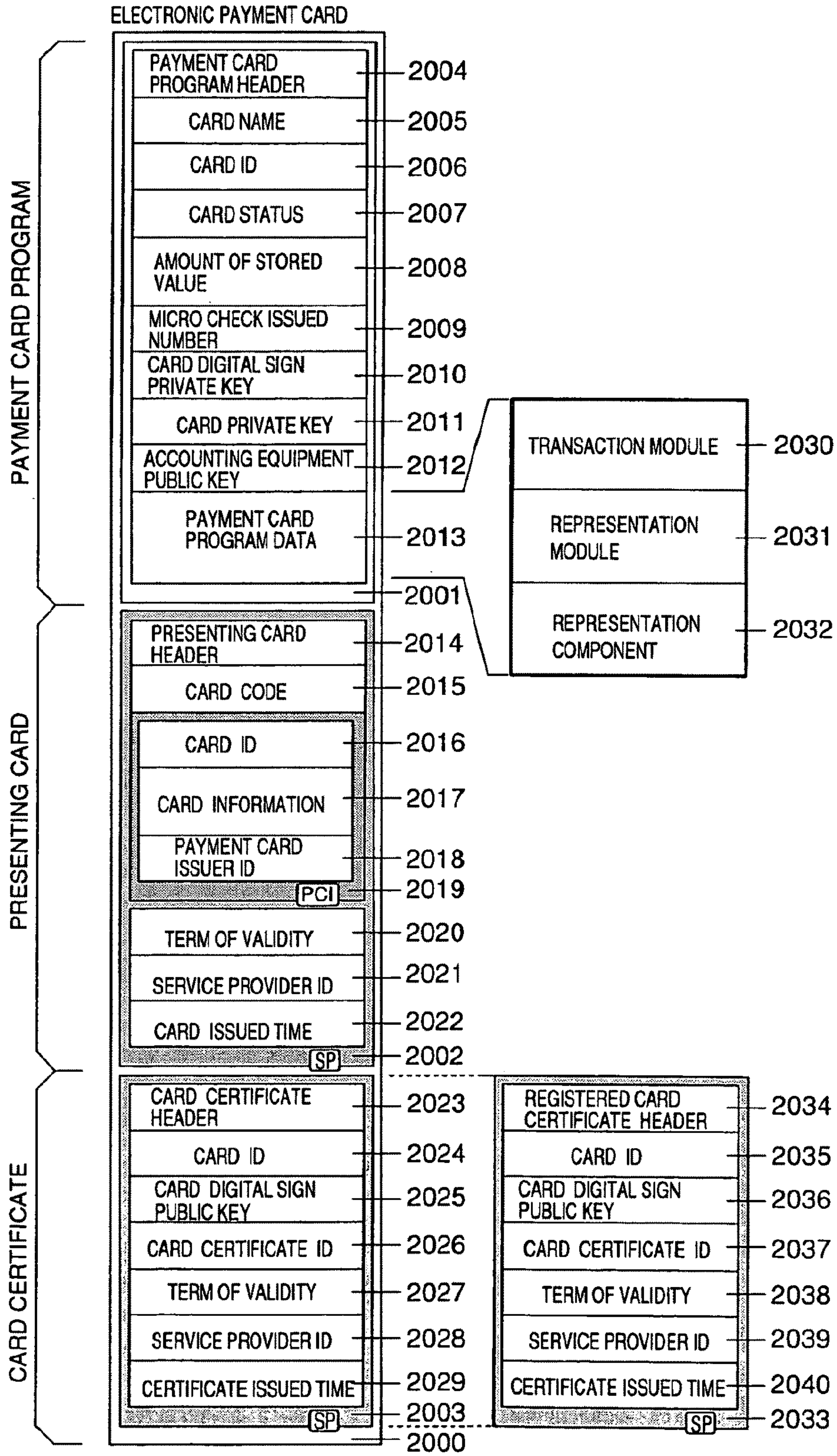
FIG. 20 is a specific diagram showing the data structure of an electronic payment card according to the embodiment of the present invention.

FIG. 20 is a specific diagram showing the data structure of an electronic payment card 2000. In FIG. 20, the electronic payment card 2000 consists of three portions: a payment card program 2001, a presentation card 2002 and a card certificate 2003 or 2033 portion. The payment card program portion is information for managing the status of a payment card and for specifying an operation inherent to a payment card. The presentation card portion is information that is to be presented to the merchant terminal 102 (or the merchant terminal 103 or the automatic vending machine 104) as information for the contents of a payment card for the settlement of a payment using an electronic payment card. The card certificate is issued by a service provider for an electronic payment card, and indicates that the electronic payment card is authentic. There are two types of card certificates: a card certificate 2003 for simply certifying an electronic payment card, and a registered card certificate 2033 for certifying that an electronic payment card is registered in the service providing system. The card certificate 2003 can be changed to the registered card certificate 2033 when the user registers an electronic payment card.

One electronic payment card, as well as one electronic ticket, includes three key types and four different keys in accordance with the public key cryptography method. One key type is a key used for a digital signature accompanying an electronic payment card, and a card signature private key 2010 and a card signature public key 2025 (2036) are provided as a private key and a corresponding public key. Another key type is a card private key 2011 used for the electronic payment card authorization process performed with the merchant terminal 102 (or the merchant terminal 103 or the automatic vending machine 104). The other key type is an accounting machine public key 2012 used for the authorization process for the merchant terminal 102 (or the merchant terminal 103 or the automatic vending machine 104) performed by the mobile user terminal 100.

The card signature private key 2010 and the card signature public key 2025 (2036) are a key pair that differs for each electronic payment card. The card private key 2011 and the accounting machine public key 2012 differ for each payment card type. The merchant terminal 102 (or the merchant terminal 103 or the automatic vending machine 104) includes a card public key and an accounting machine private key that correspond to the card private key 2011 and the accounting machine public key 2012. The method for employing these keys will be described in detail later.

In FIG. 20, first, the payment card program 2001 includes ten items of information: payment card program header 2004, card name 2005, card ID 2006, card status 2007, total remaining value 2008, micro-check issuing number 2009, card signature private key 2010, card private key 2011, accounting machine public key 2012 and payment card program data 2013 information.

The card program header 2004 is header information indicating that the entry is a payment card program and describing the data structure of the payment card program. The card name 2005 and the card ID 2006 are the name and the ID of an electronic payment card. The card ID is identification information that differs for each electronic payment card.

The card status 2007 is information describing the status of an electronic payment card, concerning whether the electronic payment card can be used, whether it is unused, whether it has been registered, and whether it can be transferred.

A remaining card amount 2008 is information providing the remaining amount that is held by the electronic payment card.

The micro-check issuing number 2009 is the issue number for a micro-check that is issued by an electronic payment card, and is incremented each time a micro-check is issued. For each electronic payment card, an arbitrary number is set as the initial number that is employed as the micro-check issue number. The initial number is managed by the service providing system 110, and is employed as verification data in the micro-check reference process. The micro-check reference process will be described in detail later.

The card signature private key 2010 is a digital signature private key for the electronic payment card 2000. Similarly, the card private key 2011 is used for the authorization process for the electronic payment card 2000, and the accounting machine public key 2012 is used for the authorization process for the merchant 102 (or the merchant 103 or the accounting machine 104).

The card signature private key 2010 is used, in the payment card clearing process and the payment card transfer process, to provide a digital signature for data consisting of the card status 2007 and the total remaining value 2008 for the electronic payment card 2000 in the merchant terminal 102 (or the merchant 103 or the automatic vending machine 104) or the mobile user terminal to which the electronic payment card is transferred.

The card program data 2013 is a program module for specifying an operation inherent to the electronic payment card.

The program module for specifying a common operation for the electronic payment card is stored in the ROM 1501. The basic operations, such as the exchange of messages with the merchant terminal 102 (or the merchant terminal 103 or the automatic vending machine 104) to clear a micro-check, the generation of messages to be exchanged and the updating of the card status 2007, and the standard format for the display of an electronic payment card on the LCD 303, are defined by the program module that is stored in the ROM 1501.

The card program data 2013 is a program module for specifying the operations inherent to the payment card clearing process and inherent to the display process. The card program data 2013 consists of three data sets: a transaction module set 2030, a representation module set 2031 and a representative component information set 2032.

The transaction module 2030 is a program module for specifying an operation inherent to the payment card settlement processing. Since the transaction module 2030 is specified, in the payment card settlement processing, messages can be exchanged among the procedures that differ from normal, or inherent information can be included in a message to be exchanged.

The transaction module 2030 does not have to be specified if this is not required. When the transaction module 2030 is not defined, it acts as an electronic payment card for the performance of the basic payment card clearing process.

The representation module 2031 is a program module for specifying an operation on the display, such as a location on the LCD 303, data to be displayed and a display form. The representation module 2031 also does not have to be defined if such is not necessary. When the representation module 2031 is not defined, an electronic payment card is displayed in the standard display format.

The representative component information 2032 is image information comprising a component of a payment card on the display, such as an illustration, a photo, a map or a background image. The representative component information 2032 does not have to be specified if such is not necessary. When the representative component information 2032 is not specified, the electronic payment card is displayed using only with text information, as is shown in FIG. 3D. When the representative component information 2032 is specified, the electronic payment card is displayed using the standard display format. When the representation module 2031 is specified, the image information included in the representative component information is displayed as an image 314 in accordance with the representation module 2031, as is shown in FIG. 3G.

The operations attributable to various types of payment cards, and the design of an electronic payment card having a high degree of freedom can be specified by a combination consisting of the transaction module 2030, the representation module 2031 and the representative component information 2032.

The presentation card 2002 includes eight information items: a presentation card header 2014, a card code 2015, a card ID 2016, card information 2017, a payment card issuer ID 2018, a validity term 2020, a service provider ID 2021, and a card issuing date 2022. A digital signature is provided for the card ID 2016, the card information 2017 and the card issuer ID 2018 by the card issuer (2019), and a digital signature is provided for the presentation card 2002 by the service provider.

The presentation card header 2014 is header information indicating that the pertinent card is a presentation card and indicating the data structure of the presentation card. The card code 2015 is code information indicating an electronic payment card type. And the card ID 2016 is ID information for an electronic payment card, and is the same information as that given for the card ID 2006.

The card information 2017 is ASCII information that indicates the contents of a payment card. In the card information 2017, a face value of a payment card when it is issued, usage condition information, an issuer, and information as to whether an electronic payment card can be transferred, are described using a form to which tag information are added to represent the individual information types. When the standard display format or the representation module 2031 is designated, the card information 2017 is displayed on the LCD 303 in accordance with the representation module 2031, as is shown in FIG. 3D or 3G.

The card issuer ID 2018 is ID information that identifies the payment card issuer who issued the pertinent payment card. The validity term 2020 is information concerning the period the electronic payment card 2000 is valid. The service provider ID 2021 is ID information for the service provider. And the payment card issuing date 2022 is information concerning the date on which the service provider issued the electronic payment card 2000.

The card certificate 2003 and the registered card certificate 2033 have substantially the same data structure.

The card certificate 2003 includes seven information items: a card certificate header 2023, a card ID 2024, a card signature public key 2025, a card certificate ID 2026, a certificate validity term 2027, a service provider ID 2028, and a card certificate issuing date 2029. A digital signature is provided for the card certificate 2003 by the service provider.

The card certificate header 2023 is header information labeling this as a card certificate and describing the data structure of the card certificate. The card ID 2024 is ID information for the electronic payment card 2000, and is the same information as that provided by the card ID 2006 and the card ID 2016.

The card signature public key 2025 is a public key that is paired with the card signature private key 2010 for use as the digital signature for the electronic payment card 2000. The card certificate ID 2026 is ID information for the card certificate 2003. The certificate validity term 2027 is information indicating the period during which the card certificate 2003 is valid. The service provider ID 2028 is ID information for identifying the service provider who issued the card certificate 2003. The card certificate issuing date 2029 is information providing the date on which the card certificate 2003 was issued.

The registered card certificate 2033 includes seven information items: a registered card certificate header 2034, a card ID 2035, a card signature public key 2036, a card certificate ID 2037, a certificate validity term 2038, a service provider ID 2039, and a card certificate issuing date 2040. A digital signature is provided for the registered card certificate 2033 by the service provider.

The registered card certificate header 2034 is header information labeling this as a registered card certificate and describing the data structure of the registered card certificate. The card ID 2035 is ID information for the electronic payment card 2000, and is the same information as that provided by the card ID 2006 and the card ID 2016.

The card signature public key 2036 is a public key that is paired with the card signature private key 2010 for use as the digital signature for the electronic payment card 2000. The paired card signature private key 2010 and card signature public key 2036 have greater lengths and provide greater security than do the paired card signature private key 2010 and card signature public key 2025.

In the payment card registration process, the paired card signature private key 2010 and card signature public key 2025 used as the digital signature for the electronic payment card are updated to the new, more secure paired card signature private key 2010 and card signature public key 2036.

The card certificate ID 2037 is ID information for the registered card certificate 2033. The certificate validity term 2038 is information concerning the term during which the registered card certificate 2033 is valid. The service provider ID 2039 is ID information identifying the service provider who issued the registered card certificate 2033. The card certificate issuing date 2040 is information concerning the date on which the registered card certificate 2033 was issued.

The card certificate does not constitute information for certifying the electronic payment card 2000, but instead constitutes information with which the service provider certifies the card signature public key 2025 (or the card signature public key 2036). The card certificate is added to the micro-check accompanied by the digital signature for which the card signature private key 2010 is used, so that the legality of the micro-check can be verified.

When the electronic payment card is purchased or transferred, the card status 2007 for the electronic payment card is in the disabled state. To set the card status 2007 to the enabled state, the electronic payment card must be registered in the service providing system 110.

When the service providing system 110 separately manages an electronic payment card to be used and an electronic payment card that is unused and is in the sleeping state, the operating cost of the electronic payment card service is reduced, and the illegal use of the electronic payment card is prevented by changing, during the registration process, the digital signature keys for the electronic payment card.

When the electronic payment card is registered, the card status 2007 represents the enabled state. The card signature private key 2010 is changed to a new card signature private key, and accordingly, the card certificate 2003 is changed to the registered card certificate 2033. Further, in the service providing system 110, the electronic payment card is registered in the service director information server 901 as an electronic payment card that is to be used by the user who registered the payment card.

Figure 21:
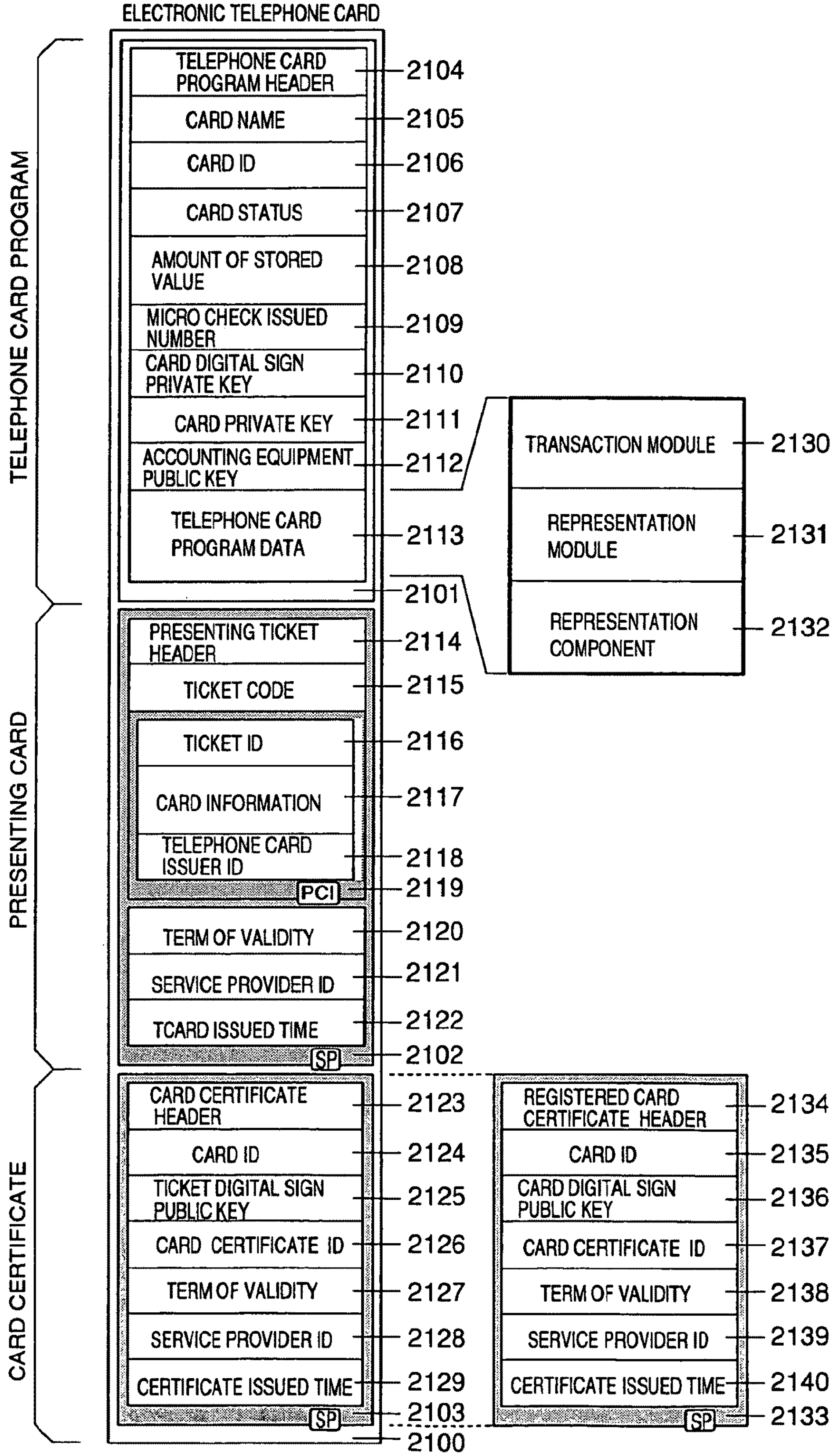
FIG. 21 is a specific diagram showing the data structure of an electronic telephone card according to the embodiment of the present invention.

FIG. 21 is a specific diagram showing the data structure of an electronic telephone card 2100. In FIG. 21, the electronic telephone card 2100 consists of three portions: a telephone card program, a presentation card and a card certificate portion. The telephone card program portion is information for managing the status of a telephone card and for specifying an operation inherent to a telephone card. The presentation telephone card portion is information that is to be presented to the electronic telephone card accounting machine 800 of the switching center 105 as information for the contents of a telephone card when a call is made using an electronic telephone card. The card certificate is issued by a service provider for an electronic telephone card, and indicates that the electronic telephone card is authentic. There are two types of card certificates: a card certificate 2103 for simply certifying an electronic telephone card, and a registered card certificate 2133 for certifying that an electronic telephone card is registered in the service providing system. The card certificate 2003 can be changed to the registered card certificate 2032 when the user registers an electronic payment card.

One electronic telephone card, as well as one electronic ticket or one electronic payment card, includes three key types and four different keys in accordance with the public key cryptography method. One key type is a key used for a digital signature accompanying an electronic telephone card, and a card signature private key 2110 and a card signature public key 2125 (2136) are provided as a private key and a corresponding public key. Another key type is a card private key 2111 used for the electronic telephone card authorization process performed with the electronic telephone card accounting machine 800 of the switching center 105. The other key type is an accounting machine public key 2112 used for the authorization process for the electronic telephone card accounting machine 800 performed by the mobile user terminal 100.

The card signature private key 2110 and the card signature public key 2125 (2136) are a key pair that differs for each electronic telephone card. The card private key 2111 and the accounting machine public key 2112 differ for each telephone card type. The electronic telephone card accounting machine 800 of the switching center 105 includes a card public key and an accounting machine private key that correspond to the card private key 2111 and the accounting machine public key 2112. The method for employing these keys will be described in detail later.

In FIG. 21, first, the telephone card program 2101 includes ten items of information: telephone card program header 2104, card name 2105, card ID 2106, card status 2107, total remaining value 2108, micro-check issuing number 2109, card signature private key 2110, card private key 2111, accounting machine public key 2112 and telephone card program data 2113 information.

The card program header 2104 is header information indicating that the entry is a telephone card program and describing the data structure of the telephone card program. The card name 2105 and the card ID 2106 are the name and the ID of an electronic telephone card. The card ID is identification information that differs for each electronic telephone card.

The card status 2107 is information describing the status of an electronic telephone card, concerning whether the electronic telephone card can be used, whether it is unused, whether it has been registered, and whether it can be transferred.

A remaining card amount 2108 is information providing the remaining amount that is held by the electronic telephone card.

The micro-check issuing number 2109 is the issue number for a micro-check that is issued by an electronic telephone card, and is incremented each time a telephone micro-check is issued. For each electronic telephone card, an arbitrary number is set as the initial number that is employed as the micro-check issuing number. The initial number is managed by the service providing system 110, and is employed as verification data in the micro-check reference process. The micro-check reference process will be described in detail later.

The card signature private key 2110 is a digital signature private key for the electronic telephone card 2100. Similarly, the card private key 2111 is used for the authorization process for the electronic telephone card 2100, and the accounting machine public key 2112 is used for the authorization process for the electronic telephone card accounting machine 800 of the switching center 105.

The card signature private key 2110 is used, in the telephone card clearing process and the telephone card transfer process, to provide a digital signature for data consisting of the card status 2107 and the total remaining value 2108 for the electronic telephone card 2100 in the electronic telephone card accounting machine 800 or the mobile user terminal to which the electronic telephone card is transferred.

The telephone card program data 2113 is a program module for specifying an operation inherent to the electronic telephone card.

The program module for specifying a common operation for the electronic telephone card is stored in the ROM 1501. The basic operations, such as the exchange of messages with the electronic telephone card accounting machine 800 of the switching center 105 to call a micro-check, the generation of messages to be exchanged and the updating of the card status 2107, and the standard format for the display of an electronic telephone card on the LCD 303, are defined by the program module that is stored in the ROM 1501.

The card program data 2113 is a program module for specifying the operations inherent to the telephone card clearing process and inherent to the display process. The card program data 2113 consists of three data sets: a transaction module set 2130, a representation module set 2131 and a representative component information set 2132.

The transaction module 2130 is a program module for specifying an operation inherent to the telephone card settlement processing. Since the transaction module 2130 is specified, in the telephone card settlement processing, messages can be exchanged among the procedures that differ from normal, or inherent information can be included in a message to be exchanged.

The transaction module 2130 does not have to be specified if this is not required. When the transaction module 2130 is not defined, it acts as an electronic telephone card for the performance of the basic telephone card clearing process.

The representation module 2131 is a program module for specifying an operation on the display, such as a location on the LCD 303, data to be displayed and a display form. The representation module 2131 also does not have to be defined if such is not necessary. When the representation module 2131 is not defined, an electronic telephone card is displayed in the standard display format.

The representative component information 2132 is image information comprising a component of a telephone card on the display, such as an illustration, a photo, a map or a background image. The representative component information 2132 does not have to be specified if such is not necessary. When the representative component information 2132 is not specified, the electronic telephone card is displayed using only with text information, as is shown in FIG. 3E. When the representative component information 2132 is specified, the electronic telephone card is displayed using the standard display format. When the representation module 2131 is specified, the image information included in the representative component information is displayed as an image 315 in accordance with the representation module 2131, as is shown in FIG. 3H.

The design of an electronic telephone card having a high degree of freedom can be specified by a combination consisting of the transaction module 2030, the representation module 2131 and the representative component information 2132.

The presentation card 2102 includes eight information items: a presentation card header 2114, a card code 2115, a card ID 2116, card information 2117, a telephone card issuer ID 2118, a validity term 2120, a service provider ID 2121, and a card issuing date 2122. A digital signature is provided for the card ID 2116, the card information 2117 and the card issuer ID 2118 by the card issuer (2119), and a digital signature is provided for the presentation card 2102 by the service provider.

The presentation card header 2114 is header information indicating that the pertinent card is a presentation card and indicating the data structure of the presentation card. The card code 2115 is code information indicating an electronic telephone card type. And the card ID 2116 is ID information for an electronic telephone card, and is the same information as that given for the card ID 2106.

The card information 2117 is ASCII information that indicates the contents of a telephone card. In the card information 2117, a face value of a telephone card when it is issued, usage condition information, an issuer, and information as to whether an electronic telephone card can be transferred, are described using a form to which tag information are added to represent the individual information types. When the standard display format or the representation module 2131 is designated, the card information 2117 is displayed on the LCD 303 in accordance with the representation module 2131, as is shown in FIG. 3E or 3H.

The card issuer ID 2118 is ID information that identifies the telephone card issuer who issued the pertinent telephone card. The validity term 2120 is information concerning the period the electronic telephone card 2100 is valid. The service provider ID 2121 is ID information for the service provider. And the telephone card issuing date 2122 is information concerning the date on which the service provider issued the electronic telephone card 2100.

The card certificate 2103 and the registered card certificate 2133 have substantially the same data structure.

The card certificate 2103 includes seven information items: a card certificate header 2123, a card ID 2124, a card signature public key 2125, a card certificate ID 2126, a certificate validity term 2127, a service provider ID 2128, and a card certificate issuing date 2129. A digital signature is provided for the card certificate 2103 by the service provider.

The card certificate header 2123 is header information labeling this as a card certificate and describing the data structure of the card certificate. The card ID 2124 is ID information for the electronic telephone card 2100, and is the same information as that provided by the card ID 2106 and the card ID 2116.

The card signature public key 2125 is a public key that is paired with the card signature private key 2110 for use as the digital signature for the electronic telephone card 2100. The card certificate ID 2126 is ID information for the card certificate 2103. The certificate validity term 2127 is information indicating the period during which the card certificate 2103 is valid. The service provider ID 2128 is ID information for identifying the service provider who issued the card certificate 2103. The card certificate issuing date 2129 is information providing the date on which the card certificate 2103 was issued.

The registered card certificate 2133 includes seven information items: a registered card certificate header 2134, a card ID 2135, a card signature public key 2136, a card certificate ID 2137, a certificate validity term 2138, a service provider ID 2139, and a card certificate issuing date 2140. A digital signature is provided for the registered card certificate 2133 by the service provider.

The registered card certificate header 2134 is header information labeling this as a registered card certificate and describing the data structure of the registered card certificate. The card ID 2135 is ID information for the electronic telephone card 2100, and is the same information as that provided by the card ID 2106 and the card ID 2116.

The card signature public key 2136 is a public key that is paired with the card signature private key 2110 for use as the digital signature for the electronic telephone card 2100. The paired card signature private key 2110 and card signature public key 2136 have greater lengths and provide greater security than do the paired card signature private key 2110 and card signature public key 2125.

In the telephone card registration process, the paired card signature private key 2110 and card signature public key 2125 used as the digital signature for the electronic telephone card are updated to the new, more secure paired card signature private key 2110 and card signature public key 2136.

The card certificate ID 2137 is ID information for the registered card certificate 2133. The certificate validity term 2138 is information concerning the term during which the registered card certificate 2133 is valid. The service provider ID 2139 is ID information identifying the service provider who issued the registered card certificate 2133. The card certificate issuing date 2140 is information concerning the date on which the registered card certificate 2133 was issued.

The card certificate does not constitute information for certifying the electronic telephone card 2000, but instead constitutes information with which the service provider certifies the card signature public key 2125 (or the card signature public key 2136). The card certificate is added to the telephone micro-check accompanied by the digital signature for which the card signature private key 2110 is used, so that the legality of the micro-check can be verified.

When the electronic telephone card is purchased or transferred, the card status 2107 for the electronic telephone card is in the disabled state. To set the card status 2107 to the enabled state, the electronic telephone card must be registered in the service providing system 110.

When the service providing system 110 separately manages an electronic telephone card to be used and an electronic telephone card that is unused and is in the sleeping state, the operating cost of the electronic telephone card service is reduced, and the illegal use of the electronic telephone card is prevented by changing, during the registration process, the digital signature keys for the electronic telephone card.

When the electronic telephone card is registered, the card status 2107 represents the enabled state. The card signature private key 2110 is changed to a new card signature private key, and accordingly, the card certificate 2103 is changed to the registered card certificate 2133. Further, in the service providing system 110, the electronic telephone card is registered in the service director information server 901 as an electronic telephone card that is to be used by the user who registered the telephone card.

As is described above, the electronic ticket 1900, the electronic payment card 2000 and the electronic telephone card 2100 have similar data structures. Especially, the electronic payment card and the electronic telephone card have basically the same data structure, so that an electronic payment card that has the functions of both an electronic payment card and an electronic telephone card can be implemented. In this case, in the payment card settlement processing and in the telephone card settlement processing, the price of a product and a communication charge are subtracted from the remaining card amount held by one electronic payment card.

Further, when information that corresponds to the remaining card amount 2008 held by the electronic payment card 2000 and the remaining card amount 2108 held by the electronic telephone card 2100 is set as a part of the variable ticket information 1908 provided for the electronic ticket 1900, a coupon ticket can be implemented that functions as a ticket, a payment card and a telephone card. This is especially effective for a travel coupon ticket in which are packaged an overseas travel ticket, a shopping ticket and a portable telephone usage right.

The internal structure of the gate terminal 101 will now be described.

Figure 22:
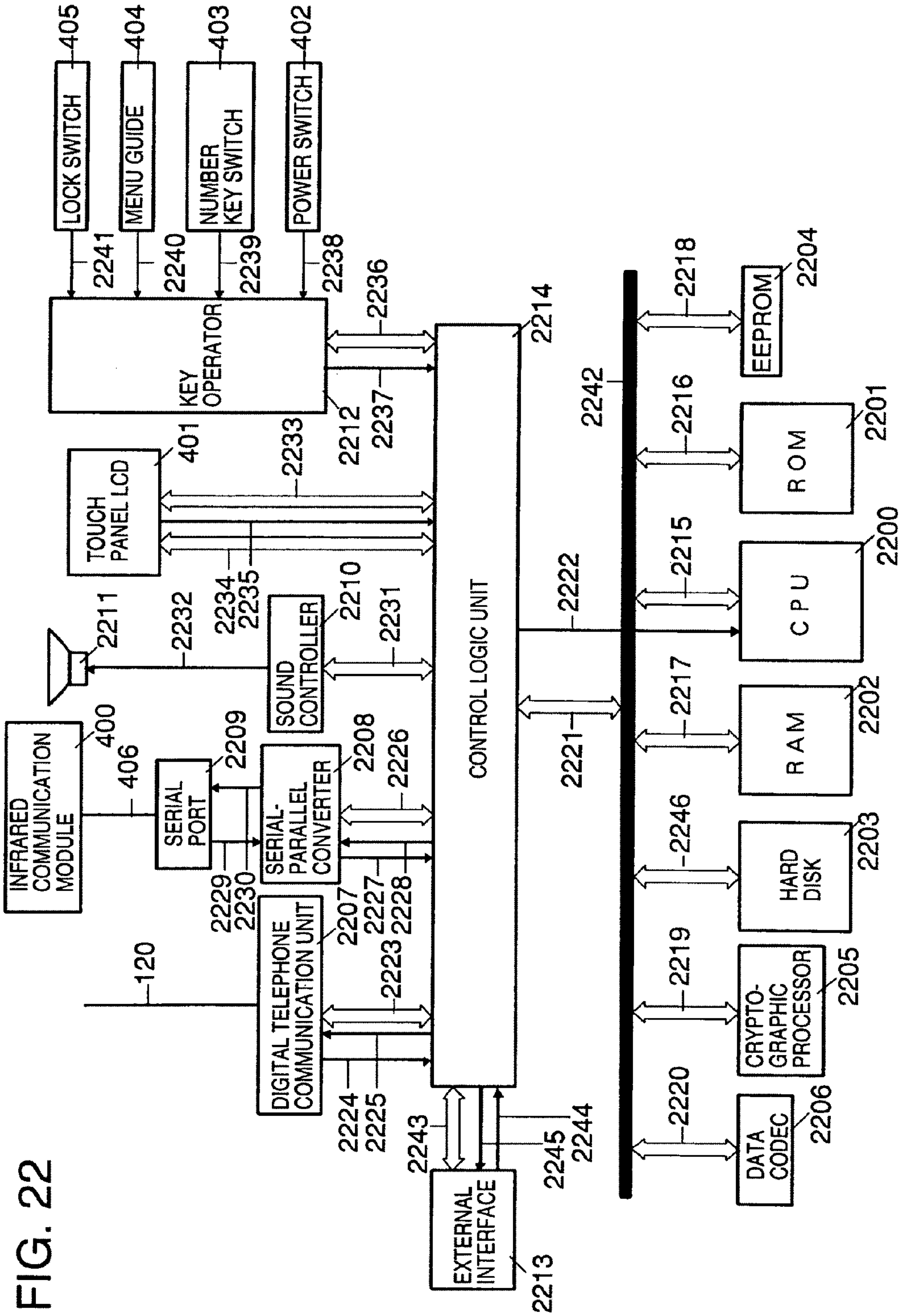
FIG. 22 is a block diagram illustrating the arrangement of a gate terminal according to the embodiment of the present invention.

FIG. 22 is a block diagram illustrating the arrangement of the gate terminal 101. The gate terminal 101 comprises: a CPU (Central Processing Unit) 2200, which processes data for transmission and reception, in accordance with a program stored in a ROM (Read Only Memory) 2201, and which controls the other components via a bus 2242; a RAM (Random Access Memory) 2202 and a hard disk 2203 on which are stored data that are to be processed and data that have been processed by the CPU 2200; a EEPROM (Electric Erasable Programmable Read Only Memory) 2204, in which are stored the gate ID of the gate terminal 101, the terminal ID and a telephone number for a telephone terminal, a merchant ID, a private key and a public key for the digital signature of a merchant, the service provider ID and the telephone number of the service providing system (the telephone number of the service provider is accompanied by the digital signature of the service provider), and the public key of the service provider; a cryptographic processor 2205, which encrypts or decrypts data under the control of the CPU 2200; a data codec 2206, which encodes data to be transmitted and decodes received data under the control of the CPU 2200; a touch panel LCD 401, which displays an image set up by the CPU 2200, and detects touch manipulation effected by a merchant; an infrared communication module 400, which provides infrared communication with the mobile user terminal 100; a serial port 2209, which is connected to the infrared communication module 400; a serial-parallel converter 2208, which performs the bidirectional conversion of parallel data and serial data; a key operator 2212, which detects a merchant's manipulation of a lock switch 405, a menu switch 404, a number key switch 403 and a power switch 402; a loudspeaker 2211, through which sounds are output to provide notification concerning the completion of the ticket examination process and the establishment of the operation; a sound controller 2210, which drives the loudspeaker 2211; a digital telephone communication unit 2207, which provides digital telephone communication with the service providing system 110 via the digital telephone communication line 120; an external interface 2213, which is an interface for the connection of an external device, such as a gate opening/closing device; and a control logic unit 2214, which processes an interrupt signal received from the key operator 2212, the touch panel LCD 401, the serial-parallel converter 2208, the digital telephone communication unit 2207 and the external interface 2213, and which serves as an interface when the CPU 2200 accesses an internal register of the key operator 2213, the touch panel LCD 401 or the sound controller 2210.

The cryptographic processor 2205 includes a secret key encryption and decryption function and a public key encryption and decryption function. The cryptographic processor 2205 employs a cryptography method determined by the CPU 2200 and the keys for the encrypting or decrypting of data set by the CPU 2200. The CPU 2200 employs the encrypting and decrypting functions of the cryptographic processor 2205 to perform a digital signature process or a closing process for a message, and to decrypt a closed and encrypted message or to verify a digital signature accompanying a message. A detailed explanation will be given later for the digital signature process, the closing process, the decryption process and the digital signature verification process.

The data codec 2206 encodes data to be transmitted or decodes received data under the control of the CPU 2200. In this case, the encoding is a process for the generation of data to be transmitted that includes communication control information and error correction information, and the decoding is a process for the performance of error correction for the received data and the removal of extra communication control information in order to obtain the data that a sender was to originally transmit. The data codec 2206 has a function for encoding or decoding data during data communication via a digital telephone, and a function for encoding or decoding data during infrared communication. The data codec 2206 performs encoding or decoding as determined by the CPU for data that are set by the CPU.

When, for example, a closed message accompanied by a digital signature is to be transmitted via digital telephone communication, the CPU 2200 employs the cryptographic processor 2205 to perform a digital signature process and a closing process for the message, employs the data codec 2206 to encode the obtained message to obtain a data communication form for a digital telephone, and transmits the resultant message through the control logic unit 2214 to the digital telephone communication unit 2207.

When a closed message accompanied by a digital signature is to be received via digital telephone communication, the CPU 2200 receives that message from the digital telephone communication unit 2207 through the control logic unit 2214, employs the data codec 2206 to decode the received message, and permits the cryptographic processor 2205 to decrypt the closed and encrypted message and to verify the digital signature accompanying the message.

Similarly, when a closed message accompanied by a digital signature is to be transmitted via infrared communication, the CPU 2200 employs the cryptographic processor 2205 to provide a digital signature for the message and to close the message, and employs the data codec 2206 to encode the obtained message to provide a data form that is suitable for infrared communication. Then, the resultant message is transmitted through the control logic unit 2214 to the serial-parallel converter 2208.

When a closed message accompanied by a digital signature is to be received via infrared communication, the CPU 2200 receives that message from the serial-parallel converter 2208 through the control logic unit 2214, employs the data codec 2206 to decode the received message, and permits the cryptographic processor 2205 to decrypt the closed and encrypted message and to verify the digital signature accompanying the message.

Figure 23A:
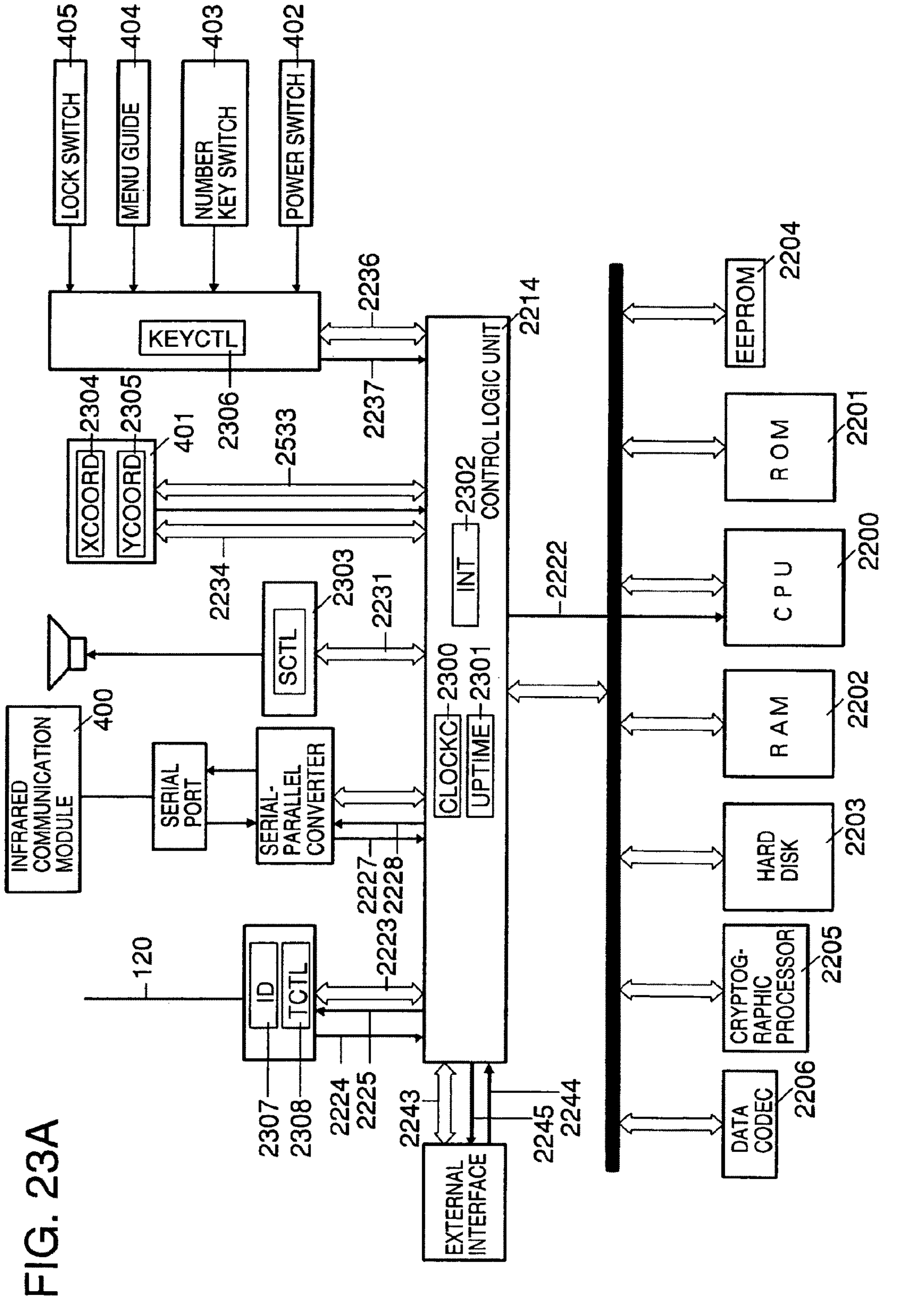
FIG. 23A is a diagram illustrating the arrangement of an internal register in the gate terminal according to the embodiment of the present invention.

When the merchant depresses either the lock switch 405, the menu switch 404, the number key switch 403, or the power switch 402, the key operator 2212 asserts, to the CPU 2200, an interrupt signal 2237 requesting the performance of a process corresponding to the manipulation of the switch. As is shown in FIG. 23A, the key operator 2212 includes a key control register (KEYCTL) 2306 for setting the valid/invalid state of each switch. And to set the valid/invalid state of each switch, The CPU 2200 accesses the key control register (KEYCTL) 2306.

As is shown in FIG. 23A, the touch panel LCD 401 includes an X coordinate register (XCOORD) 2304 and a Y coordinate register (YCOORD) 2305, which correspond to the coordinates of the point on the screen that the merchant touches. When the merchant touches the screen, the touch panel LCD 401 asserts an interrupt signal 2235 requesting the performance of a process corresponding to the manipulation of a switch. In response to the interrupt, the CPU 2200 reads the coordinate information from the X coordinate register (XCOORD) 2304 and the Y coordinate register (YCOORD) 2305 via the control logic unit 2214, and performs a process based on the coordinate information.

The sound controller 2210, as is shown in FIG. 23A, includes an audio processor control register (SCTL) 2303, for controlling the audio processing, that the CPU 2200 accesses To control the operation of the sound controller 2210. When, for example, the ticket examination process has been normally completed, the CPU 2200 accesses the audio processor control register (SCTL) 2303 to output a sound signalling that the ticket has been examined. Thus, the sound controller 2210 drives the loudspeaker 2211, through which is output the sound signalling that the ticket has been examined.

The infrared communication module 400 modulates a serial digital signal that is received via the serial cable 406 to obtain a signal that is actually to be transmitted as an infrared ray, and further changes the resultant signal to an infrared ray and emits it. Furthermore, the infrared communication module 400 changes a received infrared ray to an analog signal, and then demodulates the analog signal to obtain a digital signal and outputs it.

To transmit a message by using infrared communication, the CPU 2200 transmits the message as a digital signal 2226 to the serial-parallel converter 2208 via the control logic unit 2214. The serial-parallel converter 2208 converts the message into a serial digital signal, and transmits it via the serial port 2209 and the serial cable 406 to the infrared communication module 400, which then outputs the infrared ray.

When the infrared ray is received by the infrared communication module 400, the serial digital signal received at the infrared communication module 4300 is transmitted via the serial cable 406 and the serial port 2209 to the serial-parallel converter 2208, whereat the signal is converted into parallel data. At this time, the serial-parallel converter 2208 asserts the interrupt signal 2227 and requests that the CPU 2200 process the received data.

The digital telephone communication unit 2207 controls digital telephone communication with the service providing system 110 via the digital telephone communication line 120. As is shown in FIG. 23A, the digital telephone communication unit 2207 includes an ID register (ID) 2307, in which the terminal ID of the gate terminal 101 is stored, and a digital telephone communication unit control register (TCTL) 2308, which controls the operation of the digital telephone communication unit 2207.

The digital telephone communication unit 2207 converts data that are to be transmitted via digital telephone communication into a data format for digital telephone communication, and transmits the resultant data to the digital telephone communication line 120. The data are transmitted to the control logic unit 2214 by the CPU 2200 as a digital signal 2223.

In response to a call received along the digital telephone communication line 120, the digital telephone communication unit 2207 examines the terminal ID and receives and decodes the data. At this time, the digital telephone communication unit 2207 further asserts an interrupt signal 2224 requesting that the CPU 2200 process the received data.

The external interface 2213 is an interface circuit for connecting an external device, such as a gate opening/closing device. The CPU 2200 controls the external device via the control logic unit 2214 and the external interface 2213. A control signal 2245 is employed for the writing and reading operations performed by the CPU 2200 via the control logic unit 2214. At a low level, the control signal signifies a writing operation, while at a high level, the control signal signifies a reading operation. A data signal that is exchanged at this time by the control logic unit 2214 and the external interface 2213 is a digital signal 2243, and an interrupt signal 2244 is a control signal that is issued as an interrupt request by the external device.

The control logic unit 2214, as is shown in FIG. 23A, includes three internal registers: a clock counter (CLOCKC) 2300, an update time register (UPTIME) 2301, and an interrupt register (INT) 2302.

The clock counter is employed to measure the current time; the update time register is employed to store the time at which the gate terminal 101 will communicate with the service providing system to update data in the RAM 2202 and on the hard disk 2203; and the interrupt register is employed to indicate the reason an interrupt is generated for the CPU 2200.

When the count held by the clock counter 2300 matches the count in the update time register 2301, or when one of the interrupt signals 2224, 2227, 2235, 2237 or 2244 is asserted, the control logic unit 2214 writes the reason for the interrupt in the interrupt register (INT) 2302, and asserts an interrupt signal 2222 requesting the CPU perform an interrupt process. For the interrupt processing, the CPU 2200 reads the reason stored in the interrupt register and then performs a corresponding process.

The individual bit fields of the interrupt register (INT) are defined as is shown in FIG. 23B.

Bit 31 represents the state of the power switch. When the bit value is 0, it indicates the state is the power-OFF state, and when the bit value is 1, it indicates the state is the power-ON state.

Bit 30 represents the digital telephone communication state. When the bit value is 1, it indicates the state is one wherein digital telephone communication is in process.

Bit 29 represents the generation of a touch panel interrupt due to contact being made with the touch panel. When the bit value is 1, it indicates that touch panel interrupt has occurred. In this bit field, a 1 is set when the interrupt signal 2235 is asserted.

Bit 28 represents the generation of an infrared ray reception interrupt. When the bit value is 1, it indicates that an infrared ray has been received. In this bit field, a 1 is set when the infrared communication module 400 receives an infrared ray and the interrupt signal 2227 is asserted.

Bit 27 represents the generation of a data reception interrupt. When the bit value is 1, it indicates that data is being received. In this bit field, a 1 is set when the data-communication data are received and the interrupt signal 2224 is asserted during the course of digital telephone communication.

Bit 26 represents the generation of an update interrupt requesting the performance of a data updating process. When the bit value is 1, it indicates the generation of the update interrupt.

In this bit field, a 1 is set when the count in the clock counter matches the count in the update time register.

Bit 25 represents the generation of an external IF interrupt requesting data communication be initiated with the external device that is connected to the external interface 2213. When the bit value is 1, it signals the generation of the external IF interrupt. In this bit field, a 1 is set when the interrupt signal 2244 received from the external interface 2213 is asserted.

Bit 24 represents the generation of a key interrupt by the manipulation of the switch. When the bit value is 1, it represents the generation of the key interrupt. In this bit field, a 1 is set when the interrupt signal 2237 is asserted.

Bits 0 to 9 correspond to switches 0 to 9 for the number key switches. Bit 10 and bit 11 correspond to number key switches "*" and "#" and bits 12 to 15 correspond to function switches F1 to F4. Bits 16 to 18 respectively correspond to the power switch, the lock switch, and the menu switch. When the bit value is 1, it indicates that a switch corresponding to that bit has been depressed.

Data stored in the RAM 2202 will now be described.

Figure 24:
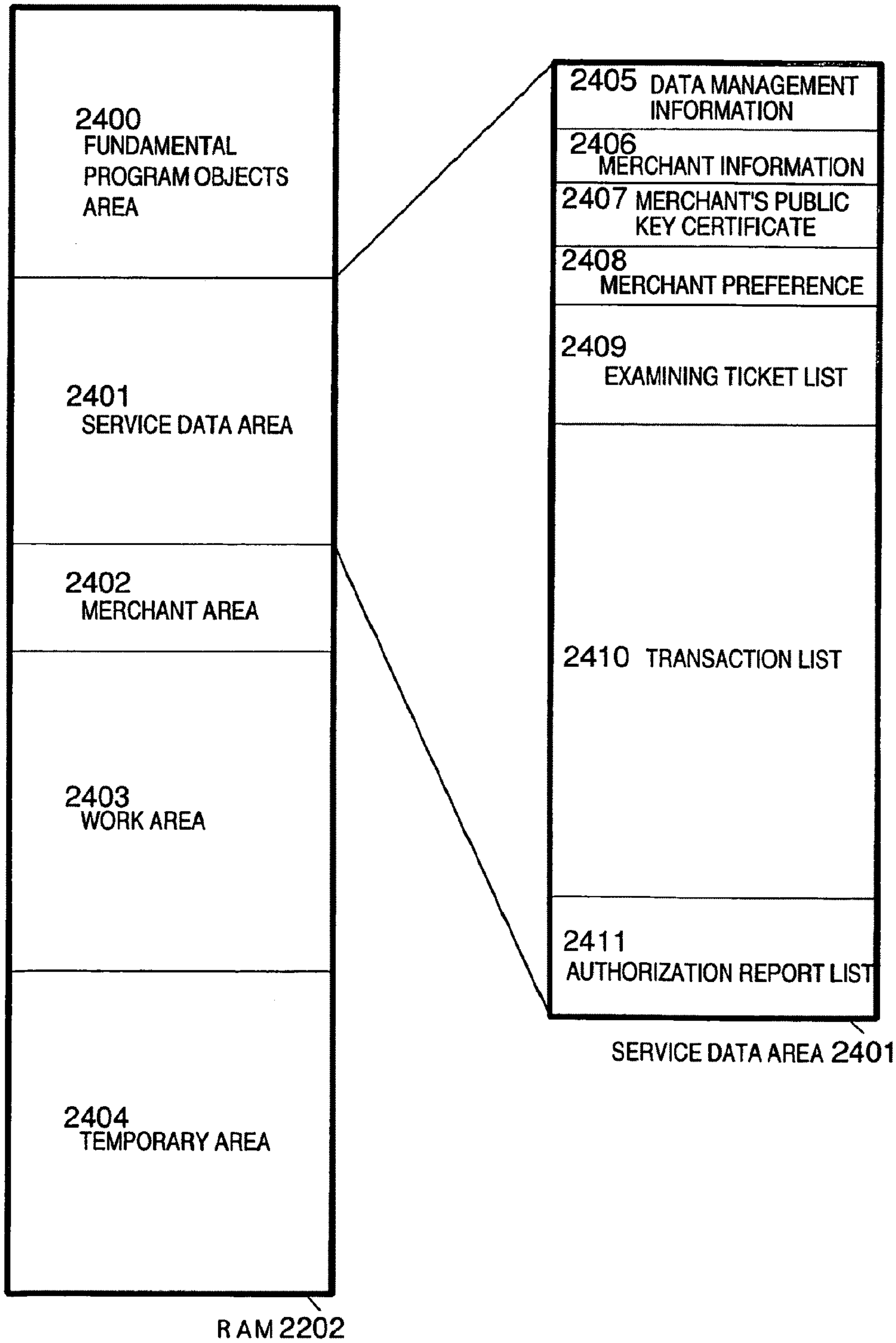
FIG. 24 is a specific diagram showing a RAM map for the gate terminal according to the embodiment of the present invention.

FIG. 24 is a specific diagram showing a RAM map for data stored in the RAM 2202.

The RAM 2202 is constituted by five areas: a fundamental program objects area 2400, a service data area 2401, a merchant area 2402, a work area 2403, and a temporary area 2404. In the fundamental program objects area 2400 are stored an upgraded module for a program stored in the ROM 2201, a patch program, and an additional program. The merchant area 2402 is an area that a merchant can freely use, the work area 2403 is a work area that the CPU 100 employs when executing a program, and the temporary area 2404 is an area in which information received by the gate terminal is stored temporarily.

The service data area 2401 is an area in which is stored contract information for the electronic commerce service, information for an electronic ticket to be examined and history information, and the data in this area are managed by the service providing system 110. The service data area 2401 is constituted by seven sub-areas: a data management information area 2405, a merchant information area 2406, a merchant public key certificate area 2407, a merchant preference area 2408, a ticket list area 2409, a transaction list area 2410 and an authorization report list area 2411.

The data management information area 2405 is an area in which is held management information for data stored in the service data area 2401; the merchant information area 2406 is an area in which is stored the name of a merchant and information concerning the contents of a contract entered into with the service provider; the merchant's public key certificate area 2407 is an area in which is stored a public key certificate for the merchant; a merchant preference area 2408 is an area in which is stored for a merchant preference information that concerns an electronic ticket service; the ticket list area 2409 is an area in which is stored list information for electronic tickets that the gate terminal examines; the transaction list area 2410 is an area in which is stored history information for the ticket examination process of the electronic ticket service; and the authorization report list area 2411 is an area in which are stored results (reference results) obtained by querying the service providing system concerning an electronic ticket that is examined.

The information stored in the service data area 2401 will now be described in detail.

Figure 25:
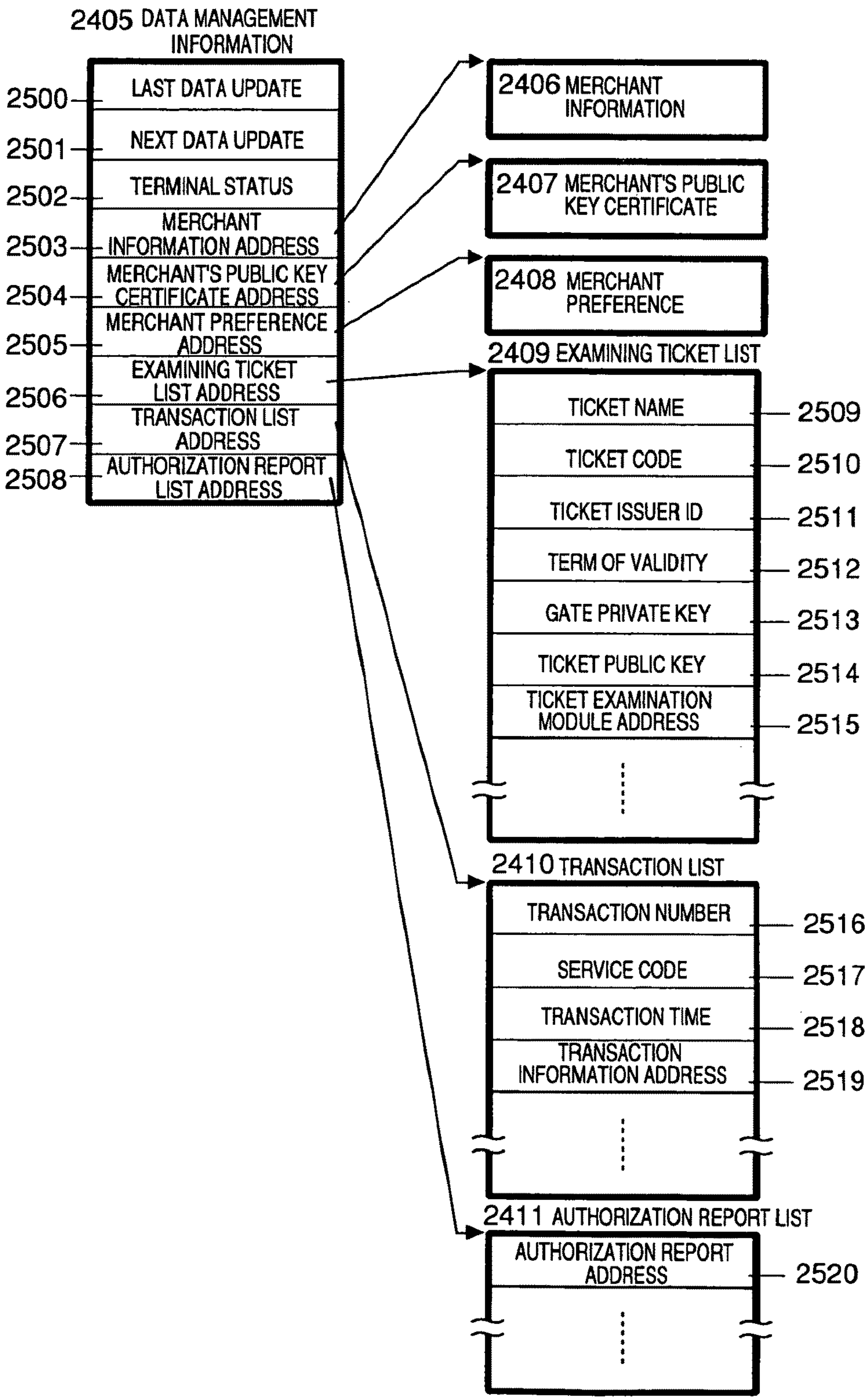
FIG. 25 is a specific diagram showing data that are stored in the service data area of the gate terminal according to the embodiment of the present invention.

FIG. 25 is a detailed, specific diagram showing the relationships established for information stored in the service data area 2401.

The data management information 2405 consists of nine types of information: a last data update date 2500, a next data update date 2501, a terminal status 2502, a merchant information address 2503, a merchant public key certificate address 2504, a merchant preference address 2505, a ticket list address 2506, a transaction list address 2507 and an authorization report list address 2508.

The last data update date 2500 represents the date on which the service providing system 110 last updated the data in the RAM 2202 and on the hard disk 2203, and the next data update date 2501 represents the date on which the service providing system 110 will next update the data in the service data area 2401. The gate terminal 101 automatically initiates an update process when the time set according to the next data update date 2401 has been reached.

The time for the next data update date 2501 is set in the update time register 2301. When the next data update date 2501 is reached, the gate terminal 101 initiates the data updating process.

During the data updating process, the service providing system 110 updates data stored in the RAM and on the hard disk. This process is performed daily at a time (e.g., late at night) at which communication traffic is not very heavy. The data updating process will be described in detail later.

The terminal status 2502 represents the status of the gate terminal. The merchant information address 2503, the merchant public key certificate address 2504, the merchant preference address 2505, the ticket list address 2506, the transaction list address 2507, and the authorization list address 2508 respectively represent the first addresses for the areas in which are stored the merchant information 2406, the merchant public key certificate 2407, the merchant preference information 2408, the ticket list 2409, the transaction list 2410, and the authorization list 2411.

List information for electronic tickets that are to be examined by the gate terminal 101 is stored in the ticket list 2409. An electronic ticket to be examined by the gate terminal 101 is set up either by the service providing system in the data updating process, or by the merchant downloading, from the service providing system, a program module (ticket examination module) for examining an electronic ticket (ticket examination setup). This setup method is determined in accordance with the contents of a contract entered into by the merchant and the service providing system.

Generally, when the usage form of the type of ticket to be examined at the gate terminal 101 must be frequently changed, for example, when, as at a stadium, the ticket to be examined is changed every day, depending on the event, or when the changing of the ticket to be examined depends on the individual gates (gate terminals), the merchant sets up the ticket to be examined. But when the type of ticket to be examined is changed less frequently and, for example, when as at a theme park a ticket to be examined is determined for each attraction, the service system providing system sets up the ticket to be examined.

In the ticket list 2409, for one electronic ticket type seven types of information are stored: a ticket name 2509, a ticket code 2510, a ticket issuer ID 2511, a validity term 2512, a gate private key 2513, a ticket public key 2514, and a ticket examination module address 2515. The ticket name 2509 is information that contains the name of an electronic ticket to be examined by the gate terminal 101; the ticket code 2510 is code information describing the type of the electronic ticket; and the validity term 2512 is the period the electronic ticket is valid for use. The gate private key 2513 and the ticket public key 2514 are encryption keys that respectively are paired with the gate public key 1912 and the ticket private key 1911 for the electronic ticket.

The ticket examination module address 2515 is an address on the hard disk 2203 whereat is stored the ticket examination module for the pertinent electronic ticket.

In the transaction list 2410, list information is stored for managing the history of the ticket examination process of the electronic ticket service. For one ticket examination process, four information items are stored in the transaction list 2410: a transaction number 2516, a service code 2517, a transaction time 2518, and a transaction information address 2519.

The transaction number 2516 is a number uniquely identifying the ticket examination process (from the view of the merchant); the service code 2517 is code information describing the type of mobile electronic commerce service that was provided for the user; and the transaction time 2518 is the time at which the ticket examination process was performed.

The transaction information address 2519 is an address at which is stored a ticket examination response 6703 that corresponds to the history information accumulated for the ticket examination process. In the transaction information address 2519 is stored a local address that points to an address on the hard disk 2203 or a remote address that points to indicates an address in the merchant information server 903 of the service providing system 110. When the remote address is stored at the transaction information address 2519, and when the merchant accesses the history information, the gate terminal 101 downloads the history information from the service providing system to the temporary area and displays it on the LCD.

The address stored at the transaction information address 2519 is determined by the service providing system. In the data updating process, the transaction times for the history information items are compared, and a local address is assigned for the history information having the latest transaction time. When there is adequate space on the hard disk 2203, all the transaction information addresses can be local addresses.

A list of authorization report addresses 2520, which are addresses at which the results of ticket references are stored, is stored in the authorization report list 2411 as list information for managing the results of the ticket reference process.

In the authorization report address 2520 is stored a local address that points to an address on the hard disk 2203 or to a remote address that points to an address in the merchant information server 903 of the service providing system 110. When the remote address is stored at the authorization report address 2520, and when the merchant accesses the authorization report, the gate terminal 101 downloads the authorization report from the service providing system to the temporary area, and displays it on the LCD.

The address stored at the authorization report address 2520 is determined by the service providing system. In the data updating process, the issue dates for the authorization reports are compared, and a local address is assigned for that information which has the latest issue date. When adequate space is available on the hard disk 2203, all the authorization report addresses can be local addresses.

The internal structure of the merchant terminal 102 will now be explained.

Figure 26:
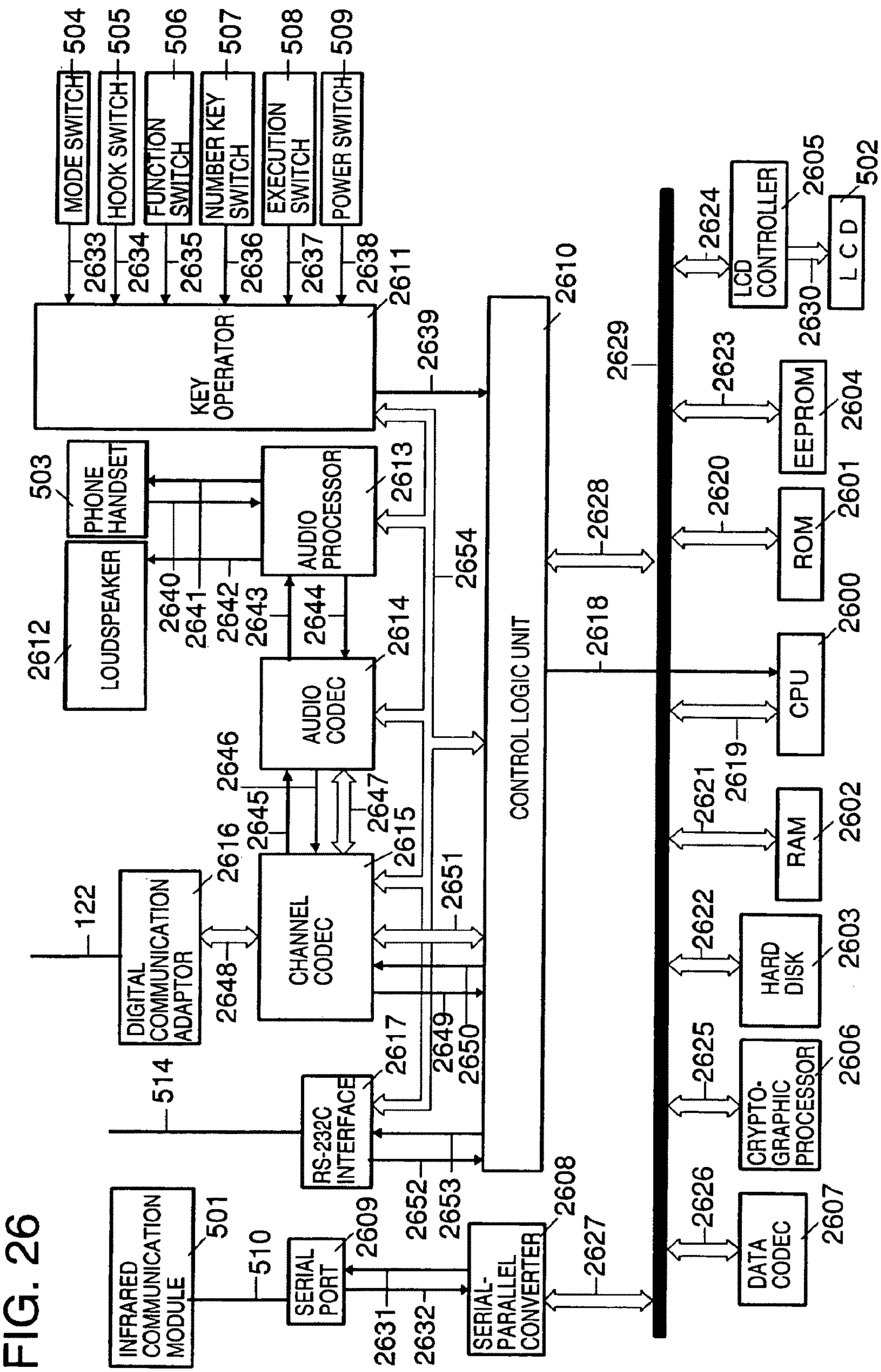
FIG. 26 is a block diagram illustrating the arrangement of a merchant terminal according to the embodiment of the present invention.

FIG. 26 is a block diagram illustrating the arrangement of the merchant terminal 102. The merchant terminal 102 comprises: a CPU (Central Processing Unit) 2600, which processes data that is to be transmitted and data that is received in accordance with a program stored in a ROM (Read Only Memory) 2601 and which controls the other components via a bus 2629; a RAM (Random Access Memory) 2602 and a hard disk 2603, whereat are stored data that are to be processed and data that have been processed by the CPU 2600; a EEPROM (Electric Erasable Programmable Read Only Memory) 2604, in which is stored the accounting machine ID of the merchant terminal 102, the terminal ID and the telephone number as a telephone terminal, a merchant ID, a private key and a public key for the digital signature of a merchant, the service provider ID, a telephone number of a service providing system (the telephone number of the service providing system is accompanied by the digital signature of a service provider), and the public key of the service provider; an LCD controller 2605, which operates the LCD 502 under the control of the CPU 2600 and which displays on the LCD 502 an image set by the CPU 2600; a cryptographic processor 2606, which encrypts or decrypts data under the control of the CPU 2600; a data codec 2607, which encodes data to be transmitted and decodes data that is received under the control of the CPU 2600; an infrared communication module 501, which performs infrared communication with the mobile user terminal 100; a serial port 2609, which is connected to the infrared communication module 501; a serial-parallel converter 2608, which performs the bidirectional conversion of parallel data and serial data; a key operator 2611, which detects the manipulation of a mode switch 504 by a merchant, a hook switch 505, a function switch 506, a number key switch 507, an execution switch 508 or a power switch 509; an audio processor 2613, which drives a loudspeaker 2612 and the receiver of a telephone handset 503, and which amplifies an analog audio signal 2444 received at the microphone of the telephone handset 503 and supplies the resultant signal to an audio codec 2614; the audio codec 2414, which encodes an analog audio signal 2644 to provide digital audio data and decodes digital audio data to provide an analog audio signal 2643; a channel codec 2615, which multiplexes digital audio data and data-communication data in order to generate data to be transmitted, and which extracts digital audio data and data-communication data from multiplexed data that are received; a digital communication adaptor 2616, which is a communication adaptor employed with the digital communication telephone line 122; an RS-232C interface 2617, which is an interface circuit for the RS-232C cable 514 connected to the cash register 511; and a control logic unit 2610, which processes an interrupt signal received from the key operator 2613, the channel codec or the RS-232C interface 2617, and which serves as an interface when the CPU 2600 accesses the internal register of the key operator 2613, the audio processor 2613, the audio codec 2614 or the channel codec.

The cryptographic processor 2606 includes a secret key encryption and decryption function and a public key encryption and decryption function. The cryptographic processor 2606 employs a cryptography method determined by the CPU 2600 and the keys to encrypt or decrypt data selected by the CPU 2600. The CPU 2600 employs the encryption and decryption functions of the cryptographic processor 2606 to perform a digital signature process or a closing process for a message, and to decrypt a closed and encrypted message or to verify a digital signature accompanying a message. A detailed explanation will be given later for the digital signature process, the closing process, the decryption process and the digital signature verification process.

The data codec 2607 encodes data to be transmitted or decodes data that are received under the control of the CPU 1500. In this case, the encoding is a process for generating data to be transmitted that includes communication control information and error correction information, and the decoding is a process for performing error correction for the received data and for removing extra communication control information in order to obtain the data that a sender was to originally transmit. The data codec 2607 has a function for encoding or decoding data during data communication using a digital wireless telephone, and a function for encoding or decoding data during infrared communication. The data codec 2607 performs encoding or decoding as determined by the CPU for data that are selected by the CPU.

When, for example, a closed message accompanied by a digital signature is to be transmitted via digital telephone communication, the CPU 2600 employs the cryptographic processor 2606 to perform a digital signature process and a closing process for the message, employs the data codec 2607 to encode the obtained message to provide a data communication form for a digital telephone, and transmits the resultant message through the control logic unit 2610 to the channel codec 2615.

When a closed message accompanied by a digital signature is received via digital telephone communication, the CPU 2600 reads that message from the channel codec 2615 through the control logic unit 2610, employs the data codec 2607 to decode the received message, and permits the cryptographic processor 2606 to decrypt the closed and encrypted message and to verify the digital signature accompanying the message.

Similarly, when a closed message accompanied by a digital signature is to be transmitted via infrared communication, the CPU 2600 employs the cryptographic processor 2606 to provide a digital signature for the message and to close the message, and employs the data codec 2607 to encode the obtained message to provide a data form suitable for infrared communication. Then, the resultant message is transmitted to the serial-parallel converter 2608.

When a closed message accompanied by a digital signature is received via infrared communication, the CPU 2600 reads that message from the serial-parallel converter 2608, employs the data codec 2607 to decode the received message, and permits the cryptographic processor 2606 to decrypt the closed and encrypted message and to verify the digital signature accompanying the message.

Figure 27A:
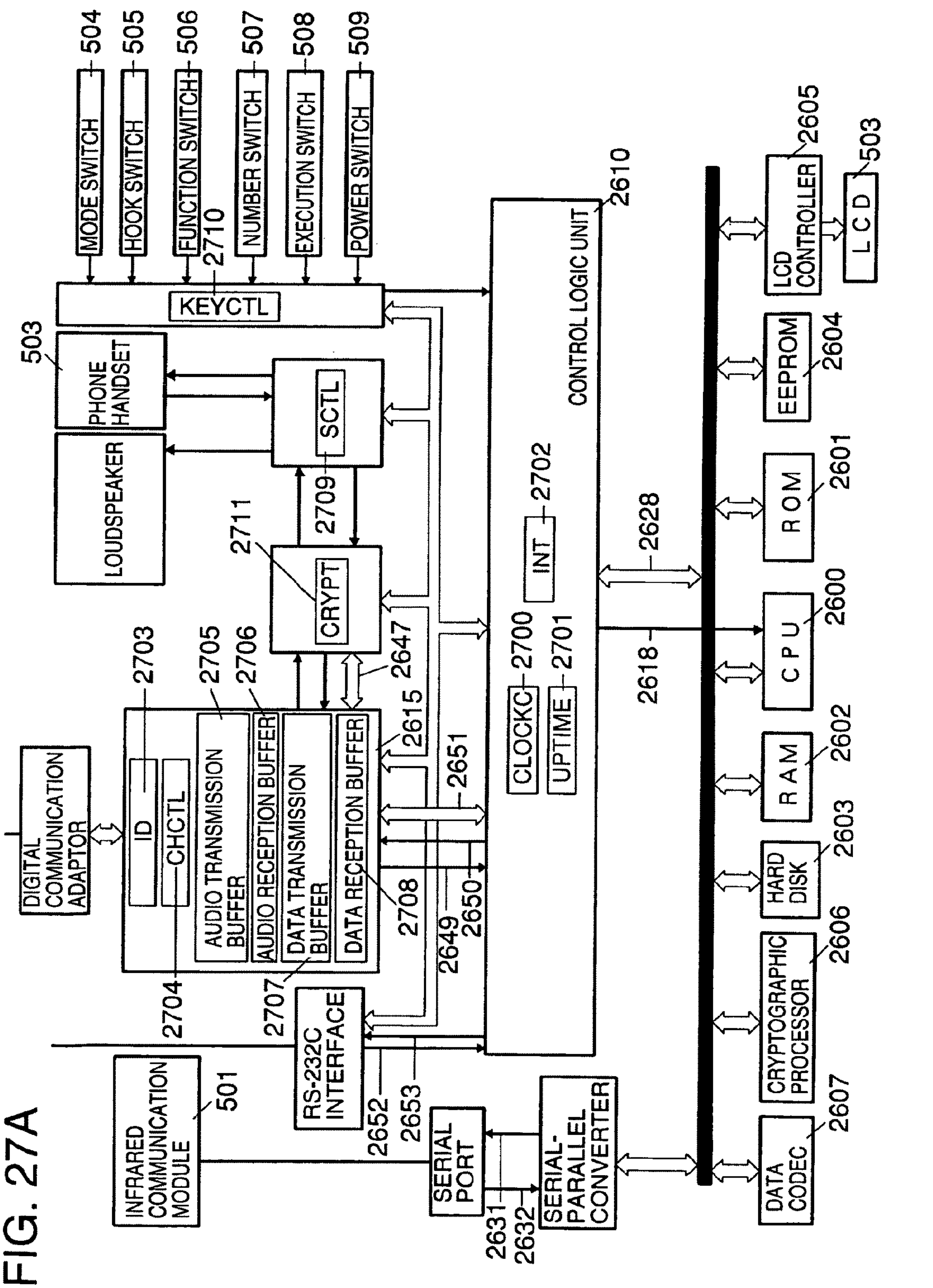
FIG. 27A is a diagram illustrating the arrangement of an internal register in the merchant terminal according to the embodiment of the present invention.

When the merchant depresses either the mode switch 504, the hook switch 505, the function switch 506, the number key switch 507, the execution switch 508 or the power switch 509, the key operator 2611 asserts an interrupt signal 2639 requesting that the CPU 2600 perform a process corresponding to the switch that was manipulated. As is shown in FIG. 27A, the key operator 2611 includes a key control register (KEYCTL) 2710 for setting a valid/invalid state for each switch. The CPU 2600 accesses the key control register (KEYCTL) 2710 to determine whether a switch is effective or not.

The audio processor 2613 includes an audio control register (SCTL) 2709 for controlling the audio process, as is shown in FIG. 27A. The CPU 2600 accesses the audio control register (SCTL) 2709 to control the operation of the audio processor 2613. When, for example, a request for a digital telephone call is received, the CPU 2600 accesses the audio control register (SCTL) 2709 to output an arrival tone for a digital call. Therefore, the audio processor 2613 drives the loudspeaker 2612 to output an arrival tone for a digital call. It should be noted, however, that when a call request is from the service providing system 110, no arrival tone is output, and the CPU 2600 initiates a process for establishing a communication session with the service providing system.

The audio codec 2614 encodes an analog audio signal 2644 received from the audio processor 2613 to provide digital audio data, and decodes digital audio data read from the channel codec 2615 to provide an analog audio signal 2643. The analog audio signal 2643 is transmitted to the audio processor 2613, which amplifies the signal 2643 and drives the receiver of the telephone handset 2613 to release sounds from the receiver. The encoded digital audio data are transmitted to the channel codec 2615, which then changes the data into data that are suitable for transmission.

In addition, the audio codec 2614 includes an audio data encryption key register (CRYPT) 2711 in which is stored an encryption key for the secret key cryptography method that is employed for the encryption and decryption of audio data. When the audio data encryption key is set to the audio data encryption key register (CRYPT) 2711 by the CPU 2600, the audio codec 2614 encodes the analog audio signal 2644 to provide digital audio data while at the same time encrypting the digital audio data, or decodes the digital audio data to provide an analog audio signal 2643 while at the same time decrypting the digital audio data.

Two types of data to be transmitted are received by the channel codec 2615: one type is digital audio data received as a digital audio signal 2647 from the audio codec 2614, and the other type is data-communication data received from the CPU via the control logic unit 2610.

The channel codec 2615 adds, as header information, identification information for the digital audio data or the data-communication data to the respective data, and multiplexes the digital audio data and the data-communication data and transmits a resultant digital signal 2616 to the digital communication adaptor 2616.

In addition, upon receiving a digital signal 2648 from the digital communication adaptor 2616, the channel codec 2615 examines a terminal ID, identifies the digital audio data and the data-communication data using the header information, and transmits these data respectively as a digital audio signal 2647 and a digital signal 2651 to the audio codec 2612 and the control logic unit 2610. Further, upon receiving a digital call or data-communication data, the channel codec 2615 asserts an interrupt signal 2649, and upon receiving digital audio data, brings a control signal 2645 low. The interrupt signal 2649 is a signal requesting that the CPU 2600 perform the process in response to the arrival of a digital call and a process for data-communication data. The control signal 2645 is a low-active signal for requesting that the audio codec 2614 process the received digital audio data.

In order to perform these processes, as is shown in FIG. 27A, the channel codec 2615 includes: an ID register (ID) 2703, in which a terminal ID is stored; a channel codec control register (CHCTL) 2704, which controls the operation of the channel codec 2615; an audio transmission buffer 2705, in which are stored digital audio data received from the audio codec 2614; an audio reception buffer 2706, in which are stored digital audio data extracted from received data; a data transmission buffer 2707, in which are stored data-communication data received from the CPU 2600 via the control logic unit 2610; and a data reception buffer 2708, in which are stored data-communication data extracted from received data.

A control signal 2646 is a control signal with which the audio codec 2614 directs the channel codec 2514 to write data to the data transmission buffer 2705 and to read data from the data reception buffer 2706. The audio codec 2614 sets the control signal 2646 low to write the digital audio data to the data transmission buffer 2705, and sets the control signal 2646 high to read the digital audio data from the data reception buffer 2706.

A control signal 2650 is a control signal with which the CPU 2600 directs the channel codec 2615 via the control logic unit 2610 to write data to the data transmission buffer 2707 and to read data from the data reception buffer 2708. When the control signal 2650 goes low, the data-communication data are written to the data transmission buffer 2707, and when the control signal 2650 goes high, the data-communication data are read from the data reception buffer 2708.

The digital communication adaptor 2616 encodes a digital signal 2648 to obtain data having a format suitable for digital telephone communication, and outputs the resultant signal to a digital telephone communication line 122. The digital communication adaptor 2616 further decodes a signal received along the digital telephone communication line 122, and supplies an obtained digital signal 2648 to the channel codec 2615.

The RS-232C interface 2617 is an interface circuit for connecting the RS-232C cable 514.

The merchant terminal 102 communicates with the cash register 511 via the RS-232C interface 2617. The RS-232C interface 2617 receives data from the cash register 511 and asserts an interrupt signal 2652. The interrupt signal 2652 is a signal requesting that the CPU 2600 exchange data with the cash register 511 via the RS-232C interface 2617.

The control logic unit 2610 internally includes three registers, as is shown in FIG. 27A: a clock counter (CLOCKC) 2700, an update time register (UPTIME) 2701, and an interrupt register (INT) 2702.

The clock counter 2700 measures the current time; the update time register 2701 is used to store the time at which the merchant terminal 102 updates data in the RAM 2602 and on the hard disk 2603 through communication conducted with the service providing system (data updating process); and the interrupt register 2702 is used to indicate the reason an interrupt for the CPU 2600 is generated.

When the count in the clock counter 2700 matches the count in the update time register 2701, and when one of the interrupt signals 2639, 2649 and 2652 is asserted, the control logic unit 2610 writes the reason the interrupt was generated in the interrupt register (INT) 2702, and asserts an interrupt signal 2618 requesting that the CPU 2600 perform the interrupt process. For the interrupt process, the CPU 2600 reads from the interrupt register the reason the interrupt was generated, and performs a corresponding process.

The individual bit fields in the interrupt register (INT) are defined as is shown in FIG. 27B.

Bit 31 represents the state of the power switch. When the bit value is 0, it represents the power-OFF state, and when the bit value is 1, it represents the power-ON state.

Bit 30 represents the digital telephone communication state. When the bit value is 0, it represents the state during which no digital telephone communication is being performed, and when the bit value is 1, it represents the state during which digital telephone communication is being performed.

Bit 28 represents the generation of a call arrival interrupt. When the bit value is 1, it signals the arrival of a digital call. In this bit field, a 1 is set when a digital telephone call is received and the interrupt signal 2649 is asserted.

Bit 27 represents the generation of a data reception interrupt. When the bit value is 1, it signals the reception of data. In this bit field, a 1 is set when the data-communication data are received and the interrupt signal 2649 is asserted during the conduct of digital telephone communication.

Bit 26 represents the generation of an update interrupt requesting the performance of a data updating process. When the bit value is 1, it signals the generation of the update interrupt. In this bit field, a 1 is set when the count in the clock counter matches the count in the update time register.

Bit 25 represents the generation of an external IF interrupt requesting that data communication with the cash register 311 be initiated. When the bit value is 1, it signals the generation of the external IF interrupt. In this bit field, a 1 is set when the interrupt signal 2652 received from the RS-232C interface 2617 is asserted.

Bit 24 represents the generation of a key interrupt by the manipulation of a switch. When the bit value is 1, it represents the generation of the key interrupt.

Bits 0 to 9 correspond to switches 0 to 9 of the number key switches. Bits 10 and 11 correspond to number key switches "*" and "#," and bits 12 to 15 correspond to function switches F1 to F4. Bits 16 to 18 respectively correspond to the power switch, the execution switch, the mode switch and the speech switch, and bit 20 corresponds to the hook switch. When a bit value is 1, it indicates that a switch corresponding to the bit has been depressed.

Data stored in the RAM 2602 will now be described.

Figure 28:
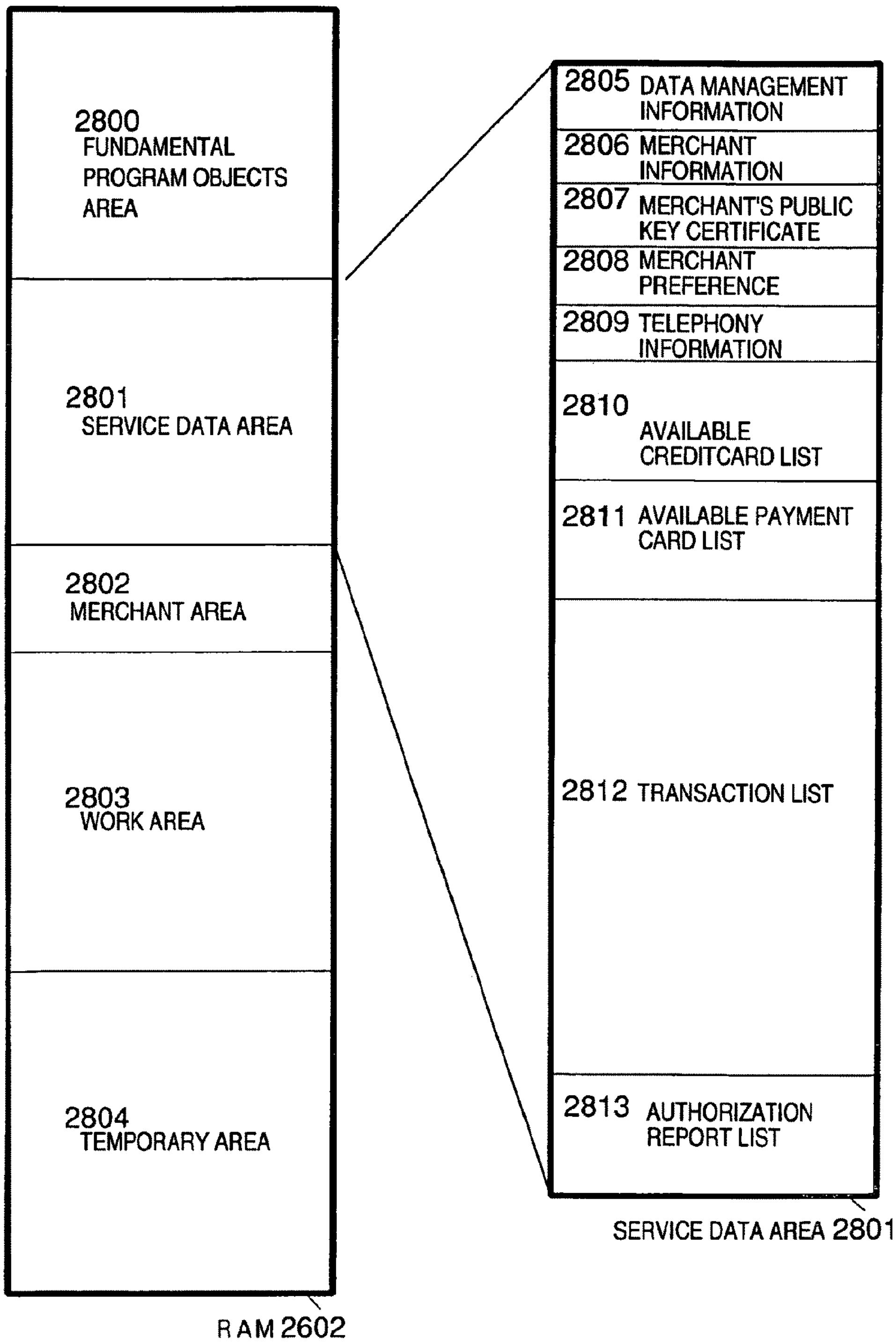
FIG. 28 is a specific diagram showing a RAM map for the merchant terminal according to the embodiment of the present invention.

FIG. 28 is a specific diagram of a RAM map for data stored in the RAM 2602.

The RAM 2602 is constituted by five areas: a fundamental program object area 2800, a service data area 2801, a merchant area 2802, a work area 2803 and a temporary area 2804. In the fundamental program object area 2800 are stored an upgraded module of a program stored in the ROM 2601, a patch program and an additional program. The merchant area 2802 is an area that a merchant can freely use, the work area 2803 is a work area that the CPU 100 employs when executing a program, and the temporary area 2804 is an area in which information received by the merchant terminal is stored temporarily.

The service data area 2801 is an area in which are stored contract information for the electronic commerce service, available credit card information, available payment card information and history information, and the data in this area are managed by the service providing system. The service data area 2801 is constituted by nine sub-areas: a data management information area 2805, a merchant information area 2806, a merchant public key certificate area 2807, a merchant preference area 2808, a telephony information area 2809, an available credit card list area 2810, an available payment card list 2811, a transaction list area 2812, and an authorization report list 2813.

The data management information area 2805 is an area in which is stored management information for data stored in the service data area 2801; the merchant information area 2806 is an area in which are stored the name of a merchant and information for the contents of a contract with a service provider; the merchant public key certificate area 2807 is an area in which a public key certificate for a merchant is stored;

the merchant preference area 2808 is an area in which preference information for a merchant is stored that concerns the mobile electronic commerce service; the telephony information area 2809 is an area in which information concerning a digital telephone is stored; the available credit card list area 2810 is an area in which is stored list information for the credit cards the merchant can handle; the available payment card list area 2811 is an area in which is stored list information for the payment cards the merchant can handle; the transaction list area 2812 is an area in which is stored sales history information for the mobile electronic commerce service; and the authorization report list area 2813 is an area in which are stored the results (micro-check reference results) that are obtained by the service providing system when it examines the micro-check that is handled.

The information stored in the service data area 2801 will now be described in detail.

Figure 29:
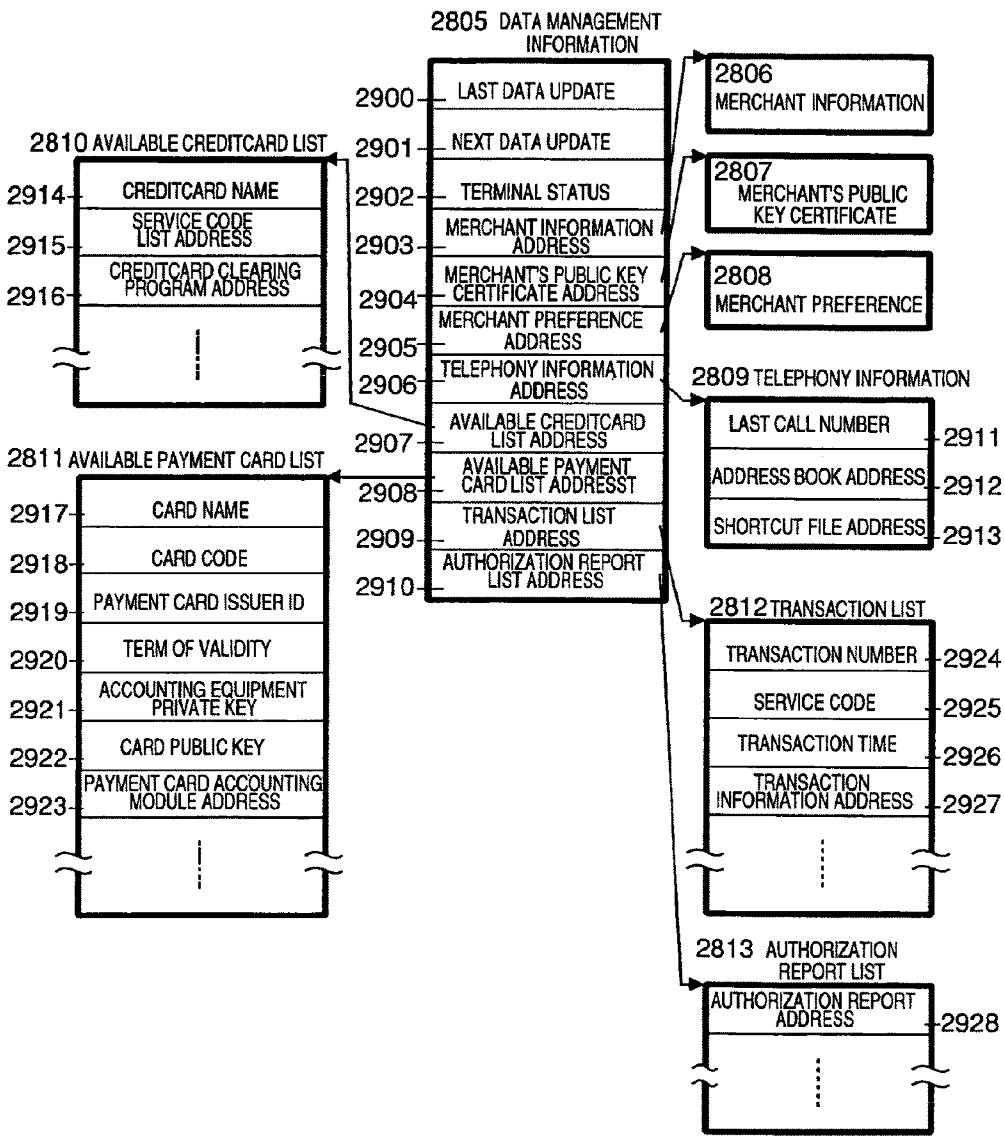
FIG. 29 is a specific diagram showing data that are stored in the service data area of the merchant terminal according to the embodiment of the present invention.

FIG. 29 is a detailed, specific diagram showing the relationships established for information stored in the service data area 2801.

The data management information 2805 consists of eleven types of information: a last data update date 2900, a next data update date 2901, a terminal status 2902, a merchant information address 2903, a merchant public key certificate address 2904, a merchant preference address 2905, a telephony information address 2906, an available credit card list address 2907, an available payment card list address 2908, a transaction list address 2909, and an authorization report list address 2910.

The last data update date 2900 represents the date on which the service providing system 110 last updated the data in the RAM 2602 and on the hard disk 2603, and the next data update date 2901 represents the date on which the service providing system 110 will next update the data in the service data area 2801. The merchant terminal 102 automatically initiates an update process when the is reached that is set according to the next data update date 2901.

The time for the next data update date 2901 is set in the update time register 2701. When the next data update date 2901 is reached, the merchant terminal 102 initiates the data updating process. During the data updating process, the service providing system 110 updates data stored in the RAM and on the hard disk. This process is performed daily during a period (e.g., late at night) in which communication traffic is not very heavy. The data updating process will be described in detail later.

The terminal status 2902 represents the status of the merchant terminal 102. The merchant information address 2903, the merchant public key certificate address 2904, the merchant preference address 2905, the telephony information address 2906, the available credit card list address 2907, the available payment card list address 2908, the transaction list address 2909 and the authorization report list address 2910 respectively represent the first addresses for the areas in which are stored the merchant information 2806, the merchant's public key certificate 2807, the merchant preference information 2808, the telephony information 2809, the available credit card list 2910, the available payment card list 2811, the transaction list 2812 and the authorization report list 2813.

The telephony information area 2809 includes three types of information: a last called number 2911, an address book address 2912 and a shortcut file address 2913. The last called number 2911 represents a telephone number for a prior call placed by the merchant, and is employed for the re-dialing of a digital telephone. The address book address 2912 and the shortcut file address 2913 respectively represent addresses on the hard disk 2603 at which address book information and a shortcut file are stored.

The available credit card list 2810 includes list information for those credit cards that can be handled by a merchant. In the available credit card list 2810, three types of information are entered for each credit card: a credit card name 2914, a service code list address 2915, and a credit card clearing program address 2916. The credit card name 2914 represents the name of a credit card that the merchant can handle, and the service code list address 2915 is an address on the hard disk 2603 at which is stored a service code list that shows the types of services that can be provided by the merchant when the electronic credit card is used. The service code list is a list of payment service codes and optional payment codes that the merchant can handle.

The credit card clearing program address 2916 is an address on the hard disk 2603 at which is stored a credit card clearing program for the pertinent electronic credit card.

The available payment card list 2811 includes list information for payment cards that can be handled by a merchant.

In the available payment card list 2811, for each payment card, seven types of information are entered: a card name 2917, a card code 2918, a payment card issuer ID 2919, a validity term 2920, an accounting machine private key 2921, a card public key 2922, and a payment card accounting module address 2923. The card name 2917 represents the name of a payment card that the merchant can handle; the card code 2918 is code information that represents the type of electronic payment card; the payment card issuer ID 2919 is ID information for a payment card issuer; and the validity term 2920 is the period during which the electronic payment card is valid. The accounting machine private key 2921 and the card public key 2922 are encryption keys that are respectively paired with the accounting machine public key 2012 and the card private key 2011 for the electronic payment card.

The payment card accounting module address 2923 is an address on the hard disk 2603 at which is stored a program module (a payment card accounting module) for clearing the electronic payment card.

In accordance with the contract entered into by the merchant and the service providing system, the service providing system sets up or updates the contents of the available payment card list 2811 in the data updating process.

In the transaction list 2812, list information is stored to manage the history information for sales through the mobile electronic commerce service. For the sales effected through one mobile electronic commerce service, in the transaction list 2812 are stored four information items: a transaction number 2924, a service code 2925, a transaction time 2926, and a transaction information address 2927.

The transaction number 2924 is a number uniquely identifying a transaction performed with a user (from the view of the merchant); the service code 2925 is code information identifying the type of mobile electronic commerce service that was provided for the user; and the transaction time 2926 is time information for the time at which a product was sold or the service was provided via the mobile electronic service.

The transaction information address 2927 is an address at which is stored a micro-check that describes the contents of the sale and a receipt. In the transaction information address 2927 is stored a local address that points to an address on the hard disk 2603 or a remote address that indicates an address in the merchant information server 903 of the service providing system 110. When the remote address is stored at the transaction information address 2927, and when the merchant accesses the sales history information, the merchant terminal

102 downloads the history information from the service providing system to the temporary area, and displays it on the LCD.

The address stored at the transaction information address 2927 is determined by the service providing system. In the data updating process, the transaction times for the sales history information items are compared, and a local address is assigned for the sales information having the latest transaction time. When there is adequate space on the hard disk 2603, all the transaction information addresses can be local addresses.

A list of authorization report addresses 2928, which are addresses at which the results of the reference of the micro-check are stored, is stored in the authorization report list area 2813 as list information for managing the results of the micro-check reference process.

In the authorization report address 2928 is stored a local address that indicates an address on the hard disk 2603 or a remote address that indicates an address in the merchant information server 903 of the service providing system 110. When the remote address is stored at the authorization report address 2928, and when the merchant accesses the authorization report, the merchant terminal 102 downloads the authorization report from the service providing system to the temporary area, and displays it on the LCD.

The address stored at the authorization report address 2928 is determined by the service providing system. In the data updating process, the issuing dates for the authorization reports are compared, and a local address is assigned for the information having the latest issuing date. When there is adequate space on the hard disk 2603, all the authorization report addresses can be local addresses.

The internal structure of the merchant terminal 103 will now be described.

Figure 30:
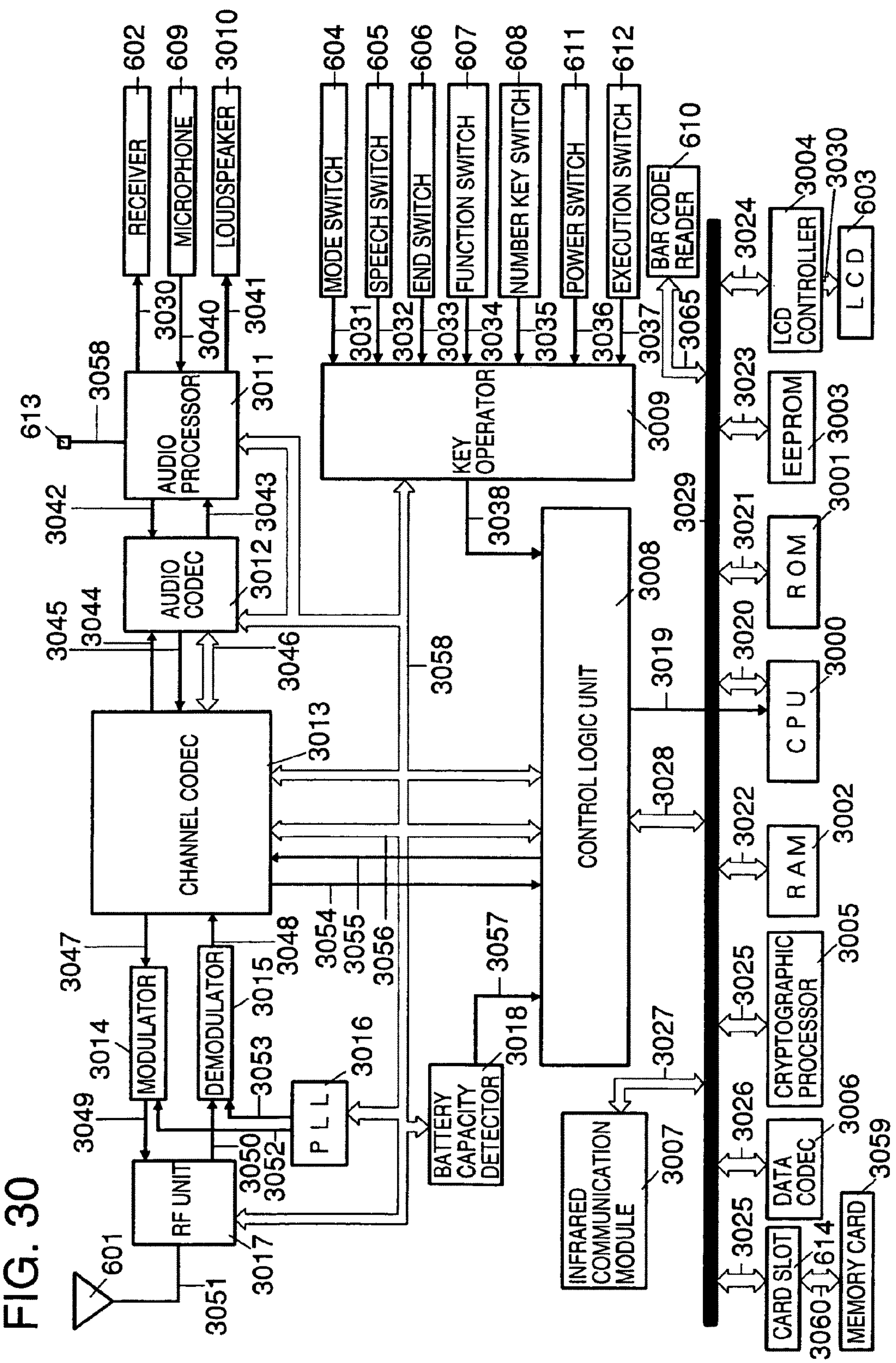
FIG. 30 is a block diagram illustrating the arrangement of a merchant terminal (digital wireless telephone type) according to the embodiment of the present invention.

FIG. 30 is a block diagram illustrating the arrangement of the merchant terminal 103. This terminal 103 comprises: a CPU (Central Processing Unit) 3000, which employs a program stored in a ROM (Read Only Memory) 3001 to process data for transmission and for reception, and to control the other components via a bus 3029; a RAM (Random Access Memory) 3002, in which are stored data that are processed and are to be processed by the CPU 3000; a EEPROM (Electric Erasable Programmable Read Only Memory) 3003, in which is stored an accounting machine ID for the merchant terminal 103, a terminal ID and a telephone number for the merchant terminal 103 when used as a wireless telephone terminal, a merchant ID, a private key and a public key for a merchant digital signature, a service provider ID, and the telephone number and the public key of the service providing system 110 (the digital signature of the service provider accompanies the telephone number of the service providing system); an LCD controller 3004, which operates the LCD 603 under the control of the CPU 3000, and which displays on the LCD an image that is selected by the CPU 3000; a cryptographic processor 3005, which encrypts and decrypts data under the control of the CPU 3000; a data codec 3006, which encodes data to be transmitted and decodes received data under the control of the CPU 3000; a memory card 3059 on which product information is recorded and a card slot 614 for the memory card; an infrared communication module 3007, which transmits and receives infrared rays during infrared communication; a bar code reader 610 for reading the bar code of a product; a key operator 3009, which detects the manipulation by the user of a mode switch 604, a speech switch 605, an end switch 606, a function switch 607, a number key switch 608, a power switch 611 and an execution switch 612; an audio processor 3011, which drives a loudspeaker 3010, a receiver 602 or a headphone set that is connected to a headphone jack 612, and which amplifies an analog audio signal that is input through a microphone 609 or the headphone head; an audio codec 3012, which encodes an analog audio signal 3042 to provide digital audio data, and which decodes digital audio data to provide an analog audio signal 3043; a channel codec 3013, which generates data to be transmitted along a radio channel, and which extracts, from received data, data that is addressed to the merchant terminal 103; a modulator 3014, which modulates a serial digital signal 3047 input by the channel codec 3013 to obtain an analog transmission signal 3049 that employs as a baseband an electric signal 3052 that is transmitted by a PLL 3016; a demodulator 3015, which demodulates an analog signal 3050 that is received while employing as a baseband an electric signal 3053 that is supplied by the PLL 3016, and which transmits a serial digital signal 3048 to the channel codec 3013; an RF unit 3017, which changes the analog transmission signal 3049 received from the modulator 3014 into a radio wave and outputs it through an antenna 601, and which, upon receiving a radio wave through the antenna 601, transmits an analog reception signal 3050 to the demodulator 3015; a battery capacity detector 3018, which detects the capacity of the battery of the merchant terminal 103; and a control logic unit 3008, which activates the channel codec 3013, the PLL 3016 and the RF unit 3017, and which processes interrupt signals that are transmitted by the key operator 3009, the channel codec 3013 and the battery capacity detector 3018, and which serves as an interface when the CPU 3000 accesses the internal registers of the key operator 3009, the audio processor 3011, the audio codec 3012 and the channel codec.

On the memory card 3059, the name of a product, a product code, a bar code and a price are recorded as product information. Based on the bar code of the product that is read by the bar code reader 610, the CPU 3000 accesses the product information on the memory card 3059 to calculate the amount of a charge.

The cryptographic processor 3005 includes a secret key encryption and decryption function and a public key encryption and decryption function. The cryptographic processor 3005 employs a cryptography method determined by the CPU 3000 and the keys to encrypt or decrypt data selected by the CPU 3000. The encryption and decryption functions of the cryptographic processor 3005 are employed to perform a digital signature process or a closing process for a message, and to decrypt a closed and encrypted message or to verify a digital signature accompanying a message. A detailed explanation will be given later for the digital signature process, the closing process, the decryption process and the digital signature verification process.

The data codec 3006 encodes data to be transmitted or decodes data that is received, under the control of the CPU 3000. In this case, the encoding is a process for generating data to be transmitted that includes communication control information and error correction information, and the decoding is a process for performing error corrections for the received data and for removing extra communication control information in order to obtain the data that a sender was to originally transmit. The data codec 3006 has a function for encoding or decoding data during data communication conducted using a digital wireless telephone, and a function for encoding or decoding data during infrared communication. The data codec 3006 performs the encoding or decoding, as determined by the CPU 3000, of data that are selected by the CPU 3000.

When, for example, a closed message accompanied by a digital signature is to be transmitted via digital wireless telephone communication, the CPU 3000 employs the cryptographic processor 3005 to perform a digital signature process and a closing process for a message, employs the data codec 3006 to encode the obtained message to provide a data communication form for a digital wireless telephone, and transmits the resultant message through the control logic unit 3008 to the channel codec 3013.

When a closed message accompanied by a digital signature is received via digital wireless telephone communication, the CPU 3000 reads that message from the channel codec 3013 through the control logic unit 3008, employs the data codec 3006 to decode the received message, and permits the cryptographic processor 3005 to decrypt the closed and encrypted message and to verify the digital signature accompanying the message.

Similarly, when a closed message accompanied by a digital signature is to be transmitted via infrared communication, the CPU 3000 employs the cryptographic processor 3005 to provide a digital signature for the message and to close the message, and employs the data codec 3006 to encode the obtained message to provide a data form that is suitable for infrared communication. Then, the resultant message is transmitted to the infrared communication module 3007.

When a closed message accompanied by a digital signature is received via infrared communication, the CPU 3000 reads that message from the infrared communication module 3007, employs the data codec 3006 to decode the received message, and permits the cryptographic processor 3005 to decrypt the closed and encrypted message and to verify the digital signature accompanying the message.

Figure 31A:
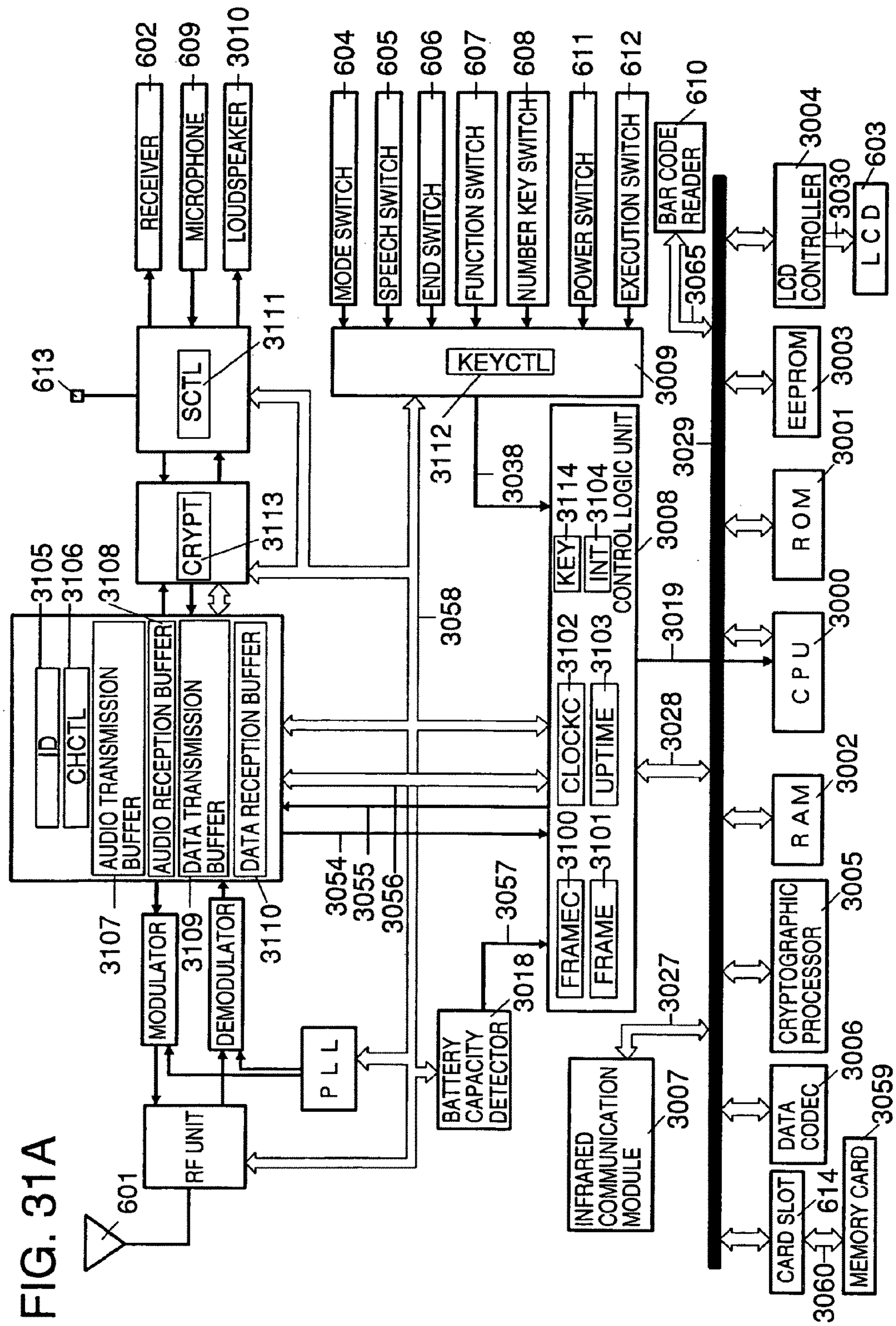
FIG. 31A is a diagram illustrating the arrangement of an internal register in the merchant terminal (digital wireless telephone type) according to the embodiment of the present invention.

When the merchant depresses either the mode switch 604, the speech switch 605, the end switch 606, the function switch 607, the number key switch 608, the power switch 611 or the execution switch 612, the key operator 3009 detects the switch manipulation by the user and asserts an interrupt signal 3038 requesting the performance of a process corresponding to the switch that was manipulated. As is shown in FIG. 31A, the key operator 3009 includes a key control register (KEYCTL) 3112 for setting the valid/invalid state of each switch. The CPU 3000 accesses the key control register (KEYCTL) 3112 to set the valid/invalid state of each switch.

The audio processor 3011 includes an audio control register (SCTL) 3111 for controlling the audio process, as is shown in FIG. 31A. The CPU 3000 accesses the audio control register (SCTL) 3111 to control the audio processor 3011. When, for example, a call request is received over a digital wireless telephone, the CPU 3000 accesses the audio control register (SCTL) 3111 to output a call tone for a digital wireless telephone. As a result, the audio processor 3011 drives the loudspeaker 3010 to release the call tone for a digital wireless telephone. It should be noted that when a call request is from the service providing system 110, no call arrival tone is output, and the CPU 3000 initiates a process for establishing a communication session with the service providing system.

The audio codec 3012 encodes an analog audio signal 3042 received from the audio processor 3011 to provide digital audio data, and decodes digital audio data received from the channel codec 3013 to provide an analog audio signal 3043. The analog audio signal 3043 is transmitted to the audio processor 3011, which amplifies the signal 3043 and drives the receiver 602 to produce sounds. The encoded digital audio data are transmitted as a digital audio signal 3046 to the channel codec 3013, which converts the data into data that can be transmitted across the radio channel.

In addition, the audio codec 3012 includes an audio data encryption key register (CRYPT) 3113 in which is stored an encryption key for the secret key cryptography method that is employed for the encryption and decryption of audio data. When the audio data encryption key is set to the audio data encryption key register (CRYPT) 3113 by the CPU 3000, the audio codec 3012 encodes the analog audio signal 3042 to provide digital audio data while at the same time encrypting the digital audio data, or decodes the digital audio data to provide an analog audio signal 3043 while at the same time decrypting the digital audio data.

Two types of data to be transmitted are received by the channel codec 3013: one type is digital audio data originating at the audio codec 3012 as a digital audio signal 3046, and the other type is data-communication data originating at the CPU 3000 that pass through the control logic unit 3008 as a digital signal 3056.

The channel codec 3013 adds identification data, as header information, to digital audio data and data-communication data, then converts the data into a serial digital signal 3047 having a data format that is suitable for a digital wireless telephone, and transmits the signal 3047 to the modulator 3014.

In addition, upon receiving a serial digital signal 3048 from the demodulator 3015, the channel codec 3013 examines a terminal ID and extracts only such data as is addressed to the channel codec 3013, removes the communication control information for the digital wireless telephone, identifies the digital audio data and the data-communication data in the header information, and transmits these data as a digital audio signal 3046 and a digital signal 3056 to the audio codec 3012 and the control logic unit 3008 respectively.

Further, upon receiving a digital wireless call or data-communication data, the channel codec 3013 asserts an interrupt signal 3054, and upon receiving digital audio data, brings the control signal 3044 low. The interrupt signal 3054 is a signal requesting that the CPU 3000 perform the process for a received digital wireless phone communication and a process for data-communication data. The control signal 3044 is a low-active signal for requesting that the audio codec 3012 process the received digital audio data.

In order to perform these processes, as is shown in FIG. 31A, the channel codec 3013 includes: an ID register (ID) 3105, in which is stored a terminal ID; a channel codec control register (CHCTL) 3106, which controls the operation of the channel codec 3013; an audio transmission buffer 3107, in which are stored digital audio data received from the audio codec 3012; an audio reception buffer 3108, in which are stored digital audio data extracted from received data; a data transmission buffer 3109, in which are stored data-communication data received from the control logic unit 3008; and a data reception buffer 3110, in which are stored data-communication data extracted from received data.

A control signal 3045 is a control signal with which the audio codec 3012 directs the channel codec 3013 to write data to the data transmission buffer 3107 and to read data from the data reception buffer 3108. When the control signal 3045 goes low, the digital audio data are written to the data transmission buffer 3107, and when the control signal 3045 goes high, the digital audio data are read from the data reception buffer 3109.

A control signal 3055 is a control signal with which the CPU 3000 directs the channel codec 3013 via the control logic unit 3008 to write data to the data transmission buffer 3109 and to read data from the data reception buffer 3110. When the control signal 3055 goes low, the data-communication data are written to the data transmission buffer 3109, and when the control signal 3055 goes high, the data-communication data are read from the data reception buffer 3110.

The modulator 3014 modulates a serial digital signal 3047 received from the channel codec 3013 to provide an analog transmission signal 3049, which is employed as a baseband for an electric signal 3052 that is supplied by the PLL 3016, and transmits the signal 3049 to the RF unit 3017. The analog transmission signal 3049 received by the RF unit 3017 is output as a radio wave through the antenna 601.

When a radio wave is received at the antenna 601, an analog reception signal 3050 is transmitted by the RF unit 3017 to the demodulator 3015. The demodulator 3015 demodulates the analog signal 3050, while employing as its baseband an electric signal 3053 that is supplied by the PLL 3016, and transmits an obtained serial digital signal 3048 to the channel codec 3013.

The battery capacity detector 3018, for detecting the capacity of a battery, asserts an interrupt signal 3057 when the remaining capacity of the battery of the merchant terminal 103 is equal to or less than an amount Q (Q>0) that is set by the CPU 3000. The interrupt signal 3057 is a signal for requesting that the CPU 3000 perform a data backup process for the RAM 3002. The amount Q is large enough to enable the merchant terminal 103 to communicate with the service providing system 110 in order to back up data in the RAM 3002 for the service providing system 110 (data backup process).

The control logic unit 3008 includes six internal registers, as is shown in FIG. 31A: a frame counter (FRAMEC) 3100, a start frame register (FRAME) 3101, a clock counter (CLOCKC) 3102, an update time register (UPTIME) 3103, an interrupt register (INT) 3104, and a key display register (KEY) 3114.

The frame counter 3100 is employed to count the number of frames for the digital wireless telephone; the start frame register 3101 is employed to store the frame number of the frame that is to be activated next; the clock counter 3102 is employed to measure the current time; the update time register 3103 is employed to store the time at which the merchant terminal 103 will communicate with the service providing system 110 to update data in the RAM 3002 (data updating process); the interrupt register 3104 is employed to indicate the type of interrupt that is generated for the CPU 3000; and the key display register (KEY) 3114 is employed to indicate the reason the interrupt is generated by key manipulation.

Generally, to receive a call, the digital wireless telephone intermittently acquires control data for a control channel and compares it with the terminal ID. The merchant terminal 103 employs the frame counter 3100 and the start frame register 3101 to intermittently acquire control data. First, the frame number of the frame to be activated next is stored in advance in the start frame register 3101, and when the count held by the frame counter 3100 equals the count held by the start frame register 3101, to acquire control data the control logic unit 3008 activates the channel codec 3013, the PLL 3016 and the RF unit 3017 via an address data signal line 3058.

When the count held by the clock counter 3102 matches the count held by the update time register 3103, or when one of the interrupt signals 3058, 3054 and 3057 is asserted, the control logic unit 3008 writes the type of and the reason for the interrupt in the interrupt register (INT) 3104 and in the key display register (KEY) 3114, and asserts an interrupt signal 3019 requesting that the CPU 3000 perform an interrupt process. For the interrupt processing, the CPU 3000 reads the type of and the reason for the interrupt that are stored in the interrupt register (INT) 3104 and the key register (KEY) 3114, and then performs a corresponding process.

The individual bit fields of the interrupt register (INT) 3104 are defined as is shown in FIG. 31B.

Bit 31 represents the state of the power switch 611. When the bit value is 0, it indicates the state is the power-OFF state, and when the bit value is 1, it indicates the state is the power-ON state.

Bit 30 represents the digital wireless telephone communication state. When the bit value is 0, it indicates the state is one where no digital wireless telephone communication is being performed, and when the bit value is 1, it indicates the state is one where digital wireless telephone communication is in process.

Bit 29 represents the generation of a frame interrupt requesting the intermittent acquisition of control data. When the bit value is 1, it indicates a condition that exists when a frame interruption has occurred. In this bit field, a 1 is set when the amount held by the frame counter 3100 equals the amount held by the start frame register 3101.

Bit 28 represents the generation of a call arrival interrupt. When the bit value is 1, it indicates that a digital wireless call has arrived. In this bit field, a 1 is set when the terminal ID is matched and the interrupt signal 3054 is asserted during the intermittent acquisition of control data for the digital wireless phone.

Bit 27 represents the generation of a data reception interrupt. When the bit value is 1, it indicates that data are being received. In this bit field, a 1 is set when the data-communication data are received and the interrupt signal 3054 is asserted during the course of a digital wireless telephone communication session.

Bit 26 represents the generation of an update interrupt requesting the performance of a data updating process. When the bit value is 1, it indicates the generation of the update interrupt.

In this bit field, a 1 is set when the count held by the clock counter 3102 matches the count held by the update time register 3103.

Bit 25 represents the generation of a battery interrupt requesting a backup process. When the bit value is 1, it represents the generation of the battery interrupt. In this bit field, a 1 is set when the interrupt signal 3057 that is received from the battery capacity detector 3018 is asserted.

Bit 24 represents the generation of a key interrupt by the manipulation of the switch. When the bit value is 1, it represents the generation of the key interrupt.

The individual bit fields in the key display register (KEY) 3114 are defined as is shown in FIG. 31C.

Bits 31 to 25 correspond to switches "=," "+," "−," "×," "÷," "." and "total" for the number key switch 608. Bits 20 to 16 correspond to the end switch 606, the speech switch 605, the mode switch 604, the execution switch 612 and the power switch 611. Bits 15 to 12 correspond to switches "F4" to "F1" for function switch 307. Bits 11 and 10 respectively correspond to switches "#" and "*" for the number key switches. Bits 9 to 0 correspond to switches 9 to 0 for the number key switches 608. When the value of a bit is 1, it indicates that a switch corresponding to that bit has been depressed.

Data stored in the RAM 3002 will now be described.

Figure 32:
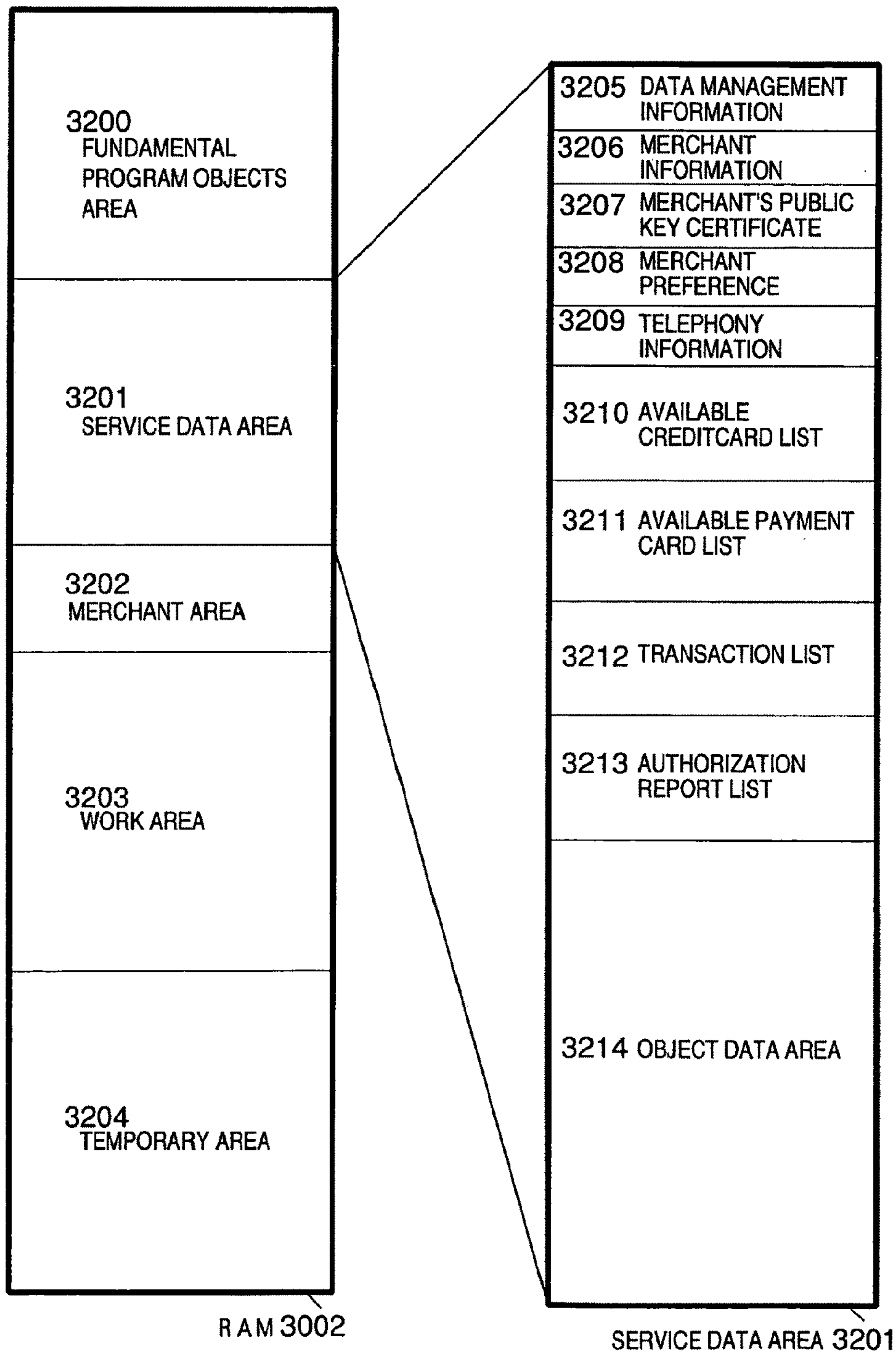
FIG. 32 is a specific diagram showing a RAM map for the merchant terminal (digital wireless telephone type) according to the embodiment of the present invention.

FIG. 32 is a specific diagram of a RAM map for data stored in the RAM 3002.

The RAM 3002 is constituted by five areas: a fundamental program object area 3200, a service data area 3201, a merchant area 3202, a work area 3203 and a temporary area 3204. In the fundamental program object area 3200 are stored an upgraded module of a program stored in the ROM 3001, a patch program and an additional program. The merchant area 3202 is an area that a merchant can freely use, the work area 3203 is a work area that the CPU 100 employs when executing a program, and the temporary area 3204 is an area in which information received by the merchant terminal is stored temporarily.

The service data area 3201 is an area in which are stored contract information for the electronic commerce service, available credit card information, available payment card information and history information, and the data in this area are managed by the service providing system. The service data area 3201 is constituted by ten sub-areas: a data management information area 3205, a merchant information area 3206, a merchant public key certificate area 3207, a merchant preference area 3208, a telephony information area 3209, an available credit card list area 3210, an available payment card list 3211, a transaction list area 3212, an authorization report list 3213, and an object data area 3214.

The data management information area 3205 is an area in which is stored management information for data stored in the service data area 3201; the merchant information area 3206 is an area in which are stored the name of a merchant and information for the contents of a contract with a service provider; the merchant public key certificate area 3207 is an area in which a public key certificate for a merchant is stored; the merchant preference area 3208 is an area in which preference information for a merchant is stored that concerns the mobile electronic commerce service; the telephony information area 3209 is an area in which information concerning a digital wireless telephone is stored; the available credit card list area 3210 is an area in which is stored list information for those credit cards the merchant can handle; the available payment card list area 3211 is an area in which is stored list information for those payment cards the merchant can handle; the transaction list area 3212 is an area in which is stored sales history information for the mobile electronic commerce service; the authorization report list area 3213 is an area in which are stored the results (micro-check reference results) that are obtained from the service providing system by examining the micro-check that is handled; and the object data area 3114 is an area in which are stored object data for the information managed in the other nine areas.

The information stored in the service data area 3201 will now be described in detail.

Figure 33:
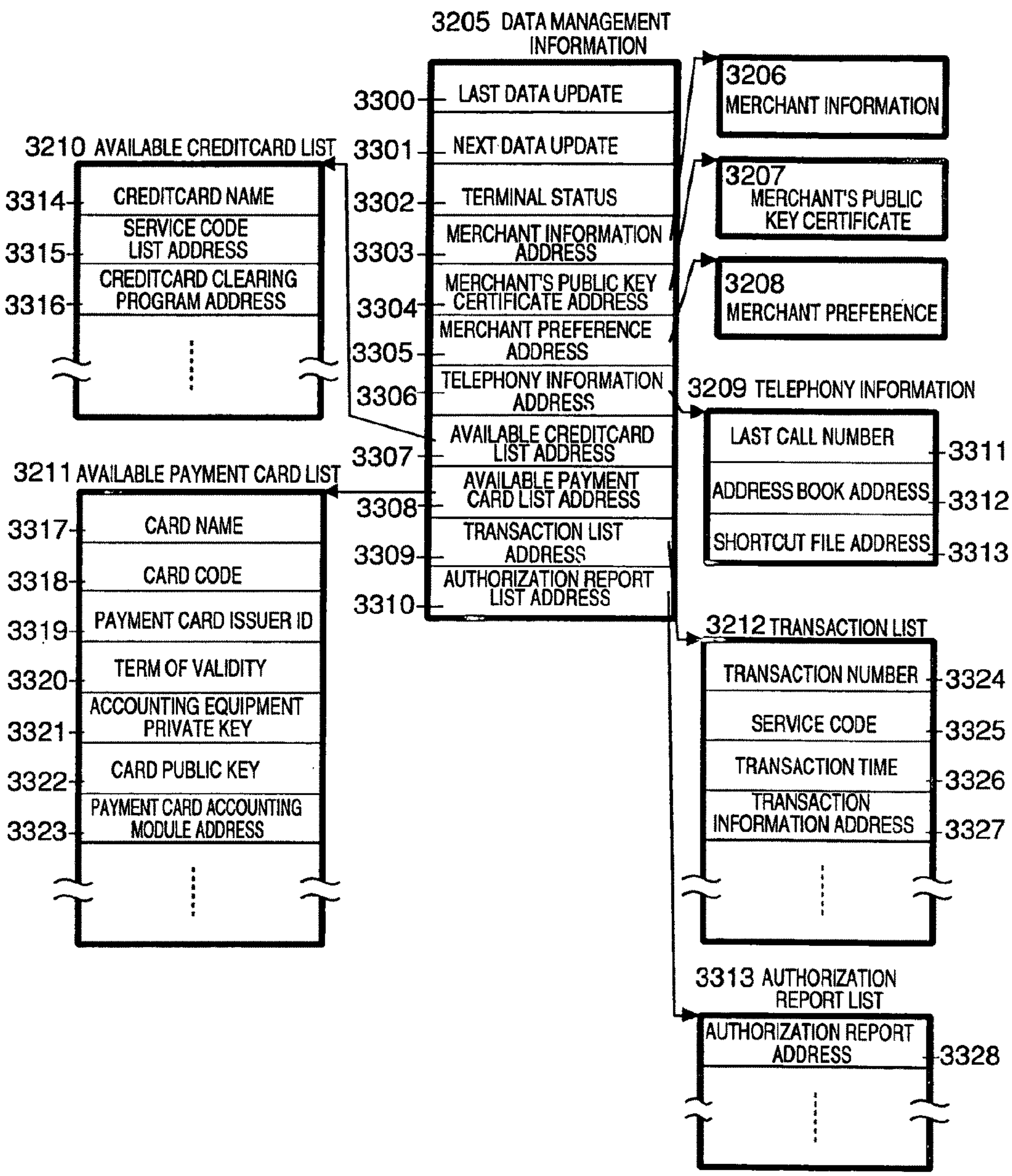
FIG. 33 is a specific diagram showing data that are stored in the service data area of the merchant terminal (digital wireless telephone type) according to the embodiment of the present invention.

FIG. 33 is a detailed, specific diagram showing the relationships established for information stored in the service data area 3201.

The data management information 3205 consists of eleven types of information: a last data update date 3300, a next data update date 3301, a terminal status 3302, a merchant information address 3303, a merchant public key certificate address 3304, a merchant preference address 3305, a telephony information address 3306, an available credit card list address 3307, an available payment card list address 3308, a transaction list address 3309, and an authorization report list address 3310.

The last data update date 3300 represents the date on which the service providing system 110 last updated the data in the RAM 3002, and the next data update date 3301 represents the date on which the service providing system 110 will next update the data in the service data area 3201. The merchant terminal 103 automatically initiates an update process when the time set according to the next data update date 3301 is reached.

The time of the next data update date 3301 is set in the update time register 3103. When the next data update date 3301 is reached, the merchant terminal 103 initiates the data updating process. During the data updating process, the service providing system 110 updates data stored in the RAM. This process is performed daily during a period (e.g., late at night) in which communication traffic is not very heavy. The data updating process will be described in detail later.

The terminal status 3302 represents the status of the merchant terminal 103. The merchant information address 3303, the merchant public key certificate address 3304, the merchant preference address 3305, the telephony information address 3306, the available credit card list address 3307, the available payment card list address 3308, the transaction list address 3309 and the authorization report list address 3310 respectively represent the first addresses for the areas in which are stored the merchant information 3206, the merchant public key certificate 3207, the merchant preference information 3208, the telephony information 3209, the available credit card list 3210, the available payment card list 3211, the transaction list 3212 and the authorization report list 3213.

The telephony information area 3209 includes three types of information: a last called number 3311, an address book address 3312 and a shortcut file address 3313. The last called number 3311 represents a telephone number for a prior call placed by the merchant, and is employed for the re-dialing of a digital wireless telephone. The address book address 3312 and the shortcut file address 3313 respectively represent addresses in the object data area 3214 at which address book information and a shortcut file are stored.

The available credit card list 3210 includes list information for credit cards that can be handled by a merchant. In the available credit card list 3210, three types of information are entered for each credit card: a credit card name 3314, a service code list address 3315 and a credit card clearing program address 3316. The credit card name 3314 represents the name of a credit card that the merchant can handle, and the service code list address 3315 is an address in the object data area 3214 at which is stored a service code list that shows the types of services that can be provided by the merchant when the electronic credit card is used. The service code list is a list of payment service codes and optional payment codes that the merchant can handle. The credit card clearing program address 3316 is an address in the object data area 3214 at which is stored a credit card clearing program for the pertinent electronic credit card.

The available payment card list 3211 includes list information for payment cards that can be handled by a merchant.

In the available payment card list 3211, for each payment card, seven types of information are entered: a card name 3317, a card code 3318, a payment card issuer ID 3319, a validity term 3320, an accounting machine private key 3321, a card public key 3322, and a payment card accounting module address 3323. The card name 3317 represents the name of a payment card that the merchant can handle; the card code 3318 is code information that represents the type of electronic payment card; the payment card issuer ID 3319 is ID information for a payment card issuer; and the validity term 3320 is the period during which the electronic payment card is valid. The accounting machine private key 3321 and the card public key 3322 are encryption keys that are respectively paired with the accounting machine public key 2012 and the card private key 2011 for the electronic payment card.

The payment card accounting module address 3323 is an address in the object data area 3214 in which is stored a program module (a payment card accounting module) for clearing the electronic payment card.

In accordance with the contract entered into by the merchant and the service providing system, the service providing system sets up or updates the contents of the available payment card list 3211 in the data updating process.

In the transaction list 3212, list information is stored to manage the history information for sales through the mobile electronic commerce service. For the sales effected through one mobile electronic commerce service, in the transaction list 3212 are stored four information items: a transaction number 3324, a service code 3325, a transaction time 3326, and a transaction information address 3327.

The transaction number 3324 is a number uniquely identifying a transaction performed with a user (from the view of the merchant); the service code 3325 is code information identifying the type of mobile electronic commerce service that was provided for the user; and the transaction time 3326 is time information for the time at which a product was sold or the service was provided via the mobile electronic service.

The transaction information address 3327 is an address at which is stored a micro-check that describes the contents of the sale and a receipt. In the transaction information address 3327 is stored a local address that points to an address in the object data area 3214 or a remote address that indicates an address in the merchant information server 903 of the service providing system 110. When the remote address is stored at the transaction information address 3327, and when the merchant accesses the sales history information, the merchant terminal 103 downloads the history information from the service providing system to the temporary area, and displays it on the LCD.

The address stored at the transaction information address 3327 is determined by the service providing system. In the data updating process, the transaction times for the sales history information items are compared, and a local address is assigned for the sales information having the latest transaction time. When there is adequate space on the ROM 3302, all the transaction information addresses can be local addresses.

A list of authorization report addresses 3328, which are addresses at which the results of the reference of the micro-check are stored, is stored in the authorization report list area 3213 as list information for managing the results of the micro-check reference process.

In the authorization report address 3228 is stored a local address that indicates an address in the object data area 3214 or a remote address that indicates an address in the merchant information server 903 of the service providing system 110. When the remote address is stored at the authorization report address 3328, and when the merchant accesses the authorization report, the merchant terminal 103 downloads the authorization report from the service providing system to the temporary area, and displays it on the LCD.

The address stored at the authorization report address 3328 is determined by the service providing system. In the data updating process, the issuing dates for the authorization reports are compared, and a local address is assigned for the information having the latest issuing date. When there is adequate space in the RAM 3002, all the authorization report addresses can be local addresses.

The internal structure of the automatic vending machine 104 will now be described.

Figure 34:
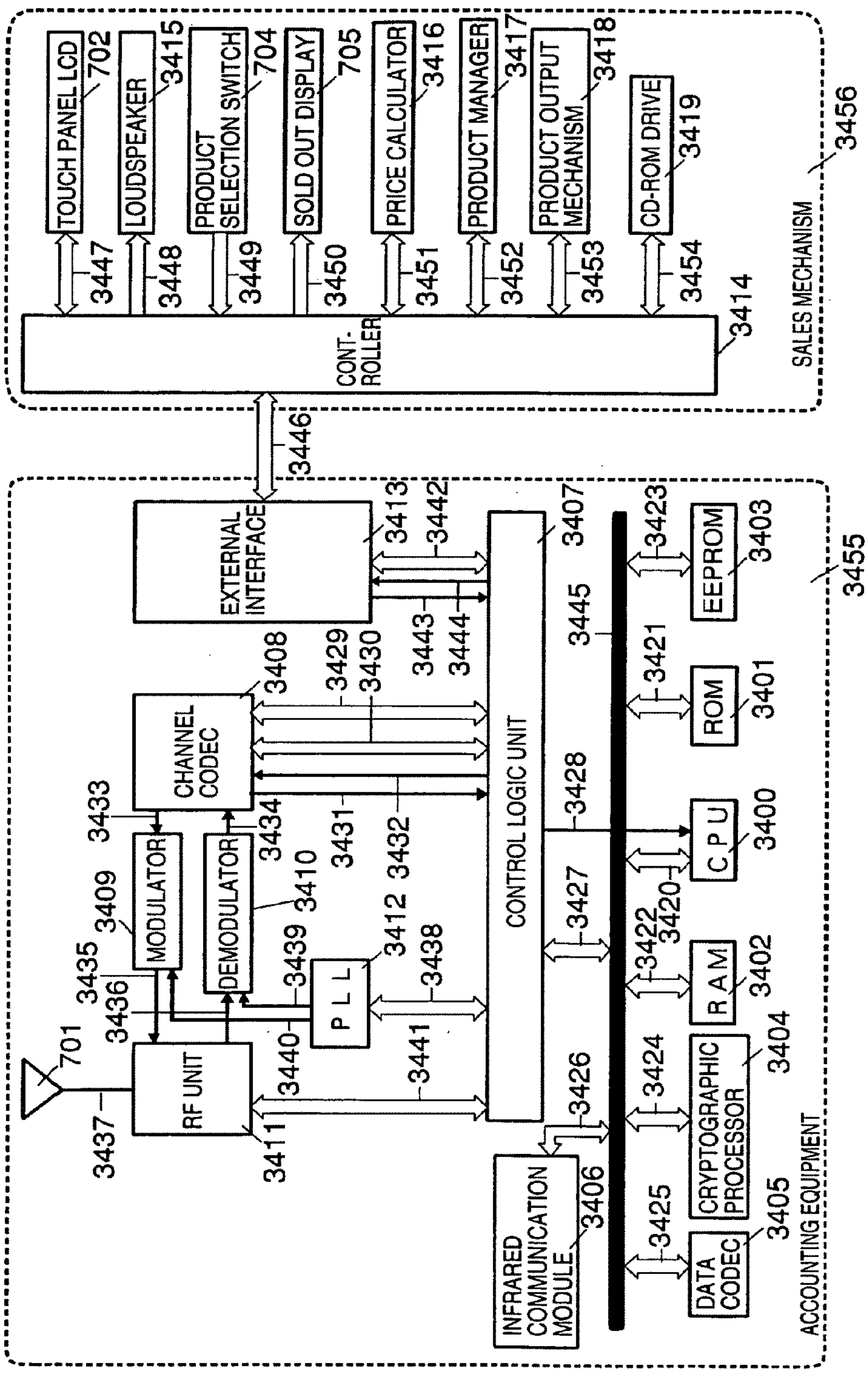
FIG. 34 is a block diagram illustrating the arrangement of an automatic vending machine according to the embodiment of the present invention.

FIG. 34 is a block diagram illustrating the arrangement of the automatic vending machine 104. The automatic vending machine 104 can be internally divided into two sections: an accounting machine 3455, and a sales mechanism 3456. The accounting machine 3455 is a unit for performing a payment card settlement process with the mobile user terminal 100, and the sales mechanism 3456 is a unit for performing another process, specifically, the calculation and display of the price of a product selected by a user, the discharge of the product to a discharge port 703, and the management of the products in stock.

In FIG. 34, the accounting machine 3455 comprises: a CPU (Central Processing Unit) 3400, which employs a program stored in a ROM (Read Only Memory) 3401 to process data for transmission and for reception and to control the other components via a bus 3445; a RAM (Random Access Memory) 3402, in which are stored data that are being processed and are to be processed by the CPU 3400; a EEPROM (Electric Erasable Programmable Read Only Memory) 3403, in which is stored an accounting machine ID for the accounting machine 3455, a terminal ID and a telephone number for the accounting machine 3455 when used as a wireless telephone terminal, a merchant ID, a private key and a public key for a merchant digital signature, a service provider ID, and the telephone number and the public key of the service providing system 110 (the digital signature of the service provider accompanies the telephone number of the service providing system); a cryptographic processor 3404, which encrypts and decrypts data under the control of the CPU 3400; a data codec 3405, which encodes data to be transmitted and decodes received data under the control of the CPU 3400; an infrared communication module 3406, which transmits and receives infrared rays during infrared communication; a channel codec 3408, which generates data to be transmitted along a radio channel, and extracts, from received data, data that is addressed to the accounting machine 3455; a modulator 3409, which modulates a serial digital signal 3433 input by the channel codec 3408 to obtain an analog transmission signal 3435 that employs as a baseband an electric signal 3440 that is transmitted by a PLL 3412; a demodulator 3410, which demodulates a received analog signal 3436 while employing as a baseband an electric signal 3439 that is supplied by the PLL 3412, and which transmits a serial digital signal 3434 to the channel codec 3408; an RF unit 3411, which changes the analog transmission signal 3435 received from the modulator 3409 into a radio wave and outputs it through an antenna 701, and which, upon receiving a radio wave through the antenna 701, transmits an analog reception signal 3436 to the demodulator 3410; an external interface 3413, which serves as an interface for the sales mechanism 3456; and a control logic unit 3407, which activates the channel codec 3408, the PLL 3412 and the RF unit 3411, and which processes interrupt signals that are transmitted by the channel codec 3408 and the external interface 3413 and serves as an interface when the CPU 3400 accesses the channel codec 3408, the PLL 3412, the RF unit 3411 or the external interface 3413.

The sales mechanism 3456 comprises: a touch panel LCD 702; a loudspeaker 3415; a product selection switch 704; a sold out display 705; a price calculator 3416, for calculating the price of a product; a product manager 3417, for managing the products in stock; a product output mechanism 3418, for outputting a selected product to the discharge port 703; a CD-ROM drive 3419; and a controller 3414, for controlling the operations of the touch panel LCD 702, the loudspeaker 3415, the sold out display (LED) 705, the price calculator 3416, the product manager 3417, the product output mechanism 3418, and the CD-ROM drive 3419.

The accounting machine 3455 and the sales mechanism 3456 communicate with each other via the external interface 3413. The accounting machine 3455 receives an accounting process request from the sales mechanism 3456, and performs the payment card settlement process for a designated amount. The amount for the payment card settlement is calculated by the price calculator 3416 of the sales mechanism 3456. That is, the accounting device 3455 performs only the payment card settlement process, and the sales mechanism 3456 performs another process as an automatic vending machine.

The sales mechanism 3456 has two primary operating modes: a purchase mode and a product information mode. The purchase mode is the mode in which the purchase of a product by a user takes place, and the product information mode is a mode in which information concerning a product is provided to a user before (or after) the product has been purchased.

An operating menu and various information are displayed on the touch panel LCD 702 by the controller 3414. Normally, the operation menu shown in FIG. 7 is displayed on the touch panel LCD 702. When a user presses "purchase" ("purchase start operation"), the sales mechanism 3456 is set to the purchase mode. When a user presses "product information," the sales mechanism 3456 is set to the product information mode.

A CD-ROM on which information concerning products is stored is loaded into the CD-ROM drive 3419. When the user presses "product information" on the operating menu and the product information mode is set, the information stored on the CD-ROM is output to the touch panel LCD 702 and through the loudspeaker 3415.

The information concerning products that is stored on the CD-ROM is multimedia information including text, images, videos and audio, and may be video information consisting of a CF (Commercial Film) of a product. Especially for a packaged media product, such as a video or a music CD (Compact Disk), or a game software product, sample information for the product is stored on the CD-ROM so that the user can try out the product in the product information mode.

When the purchase mode is set by pressing "purchase" on the operating menu, the message "Select desired product" is displayed on the touch panel LCD (display "waiting for product selection operation"), and the sales mechanism enters the product selection operation waiting state.

When the user depresses the product selection switch, the name, the volume and the total amount of the product, and a "payment" button indicating the start of the payment operation are displayed on the touch panel LCD (display "waiting for payment start operation"). At this time, the price calculator 3416 calculates the total amount, and the product manager 3417 verifies the count of the product in stock. This process is performed each time the user depresses the product selection switch. When the in stock supply of a product is exhausted, the sold out display (LED) blinks and the user can no longer select the pertinent product.

When the user depresses the "payment" button ("payment start operation"), the controller 3414 transmits, to the accounting machine 3455, an accounting processing request for an amount that corresponds to the total amount provided by the price calculator 3416, and displays, on the touch panel LCD, a message requesting the payment using an electronic payment card (display "waiting for payment operation").

When the payment card settlement process has been completed by the accounting machine 3455 and the mobile user terminal 100, the controller 3414 controls the product output mechanism 3418 so as to output a selected product at the discharge port 703, displays on the touch panel a message indicating the settlement process has been completed, and a little later, displays the operating menu again. At this time, the multimedia information stored on the CD-ROM may be output instead of the message indicating that the settlement has been completed.

The accounting machine 3455 performs the payment card settlement process that is requested by the sales mechanism 3456, and has partially the same arrangement as the merchant terminal 103. A difference from the merchant terminal 103 is that the accounting machine 3455 does not include a unit, such as an audio codec for performing audio processing, and input/output interfaces, such as number key switches, an execution switch, a bar code reader and an LCD, and instead, includes the external interface 3413 for communicating with the sales mechanism 3456.

In addition, as a functional difference, the accounting machine does not include the credit card settlement function and the digital wireless telephone communication function, which is employed for data communications with the service providing system.

The cryptographic processor 3404 includes a secret key encryption and decryption function and a public key encryption and decryption function. The cryptographic processor 3404 employs a cryptography method determined by the CPU 3400, and the keys to encrypt or decrypt data selected by the CPU 3400. The encryption and decryption functions of the cryptographic processor 3404 are employed to perform a digital signature process or a closing process for a message, and to decrypt a closed and encrypted message or to verify a digital signature accompanying a message.

The data codec 3405 encodes data to be transmitted or decodes data that was received, under the control of the CPU 3400. In this case, the encoding is a process for generating data to be transmitted that includes communication control information and error correction information, and the decoding is a process for performing error correction for the received data and for removing extra communication control information in order to obtain the data that a sender was to originally transmit. The data codec 3405 has a function for encoding or decoding data during data communication conducted using a digital wireless telephone, and a function for encoding or decoding data during infrared communication. The data codec 3405 performs the encoding or decoding as determined by the CPU 3400 for data that are selected by the CPU 3400.

When, for example, a closed message accompanied by a digital signature is to be transmitted via digital wireless telephone communication, the CPU 3400 employs the cryptographic processor 3404 to perform a digital signature process and a closing process for a message, employs the data codec 3405 to encode the obtained message to provide a data communication form that is suitable for a digital wireless telephone, and transmits the resultant message through the control logic unit 3407 to the channel codec 3408.

When a closed message accompanied by a digital signature is received via digital wireless telephone communication, the CPU 3400 reads that message from the channel codec 3408 through the control logic unit 3407, employs the data codec 3405 to decode the received message, and permits the cryptographic processor 3404 to decrypt the closed and encrypted message and to verify the digital signature accompanying the message.

Similarly, when a closed message accompanied by a digital signature is to be transmitted via infrared communication, the CPU 3400 employs the cryptographic processor 3404 to provide a digital signature for the message and to close the message, and employs the data codec 3405 to encode the obtained message to provide a data form that is suitable for infrared communication. Then, the resultant message is transmitted to the infrared communication module 3406.

When a closed message accompanied by a digital signature is received via infrared communication, the CPU 3400 reads that message from the infrared communication module 3406, employs the data codec 3405 to decode the received message, and permits the cryptographic processor 3404 to decrypt the closed and encrypted message and to verify the digital signature accompanying the message.

The channel codec 3408 adds identification data, as header information, to data-communication data that are received as a digital signal 3429 from the CPU 3400 via the control logic unit 3407, then converts the data into a serial digital signal 3433 having a data format that is suitable for a digital wireless telephone, and transmits the signal 3433 to the modulator 3409.

In addition, upon receiving a serial digital signal 3434 from the demodulator 3410, the channel codec 3408 examines a terminal ID and extracts only such data as is addressed to the channel codec 3410, removes the communication control information for the digital wireless telephone, identifies the digital audio data and the data-communication data in the header information, and transmits the data-communication data as a digital audio signal 3429 to the audio codec 3012 and the control logic unit 3407.

Further, upon receiving a digital wireless call or data-communication data, the channel codec 3408 asserts an interrupt signal 3431. The interrupt signal 3431 is a signal requesting that the CPU 3400 perform the process for a digital wireless phone communication that has been received and a process for data-communication data.

Figure 35A:
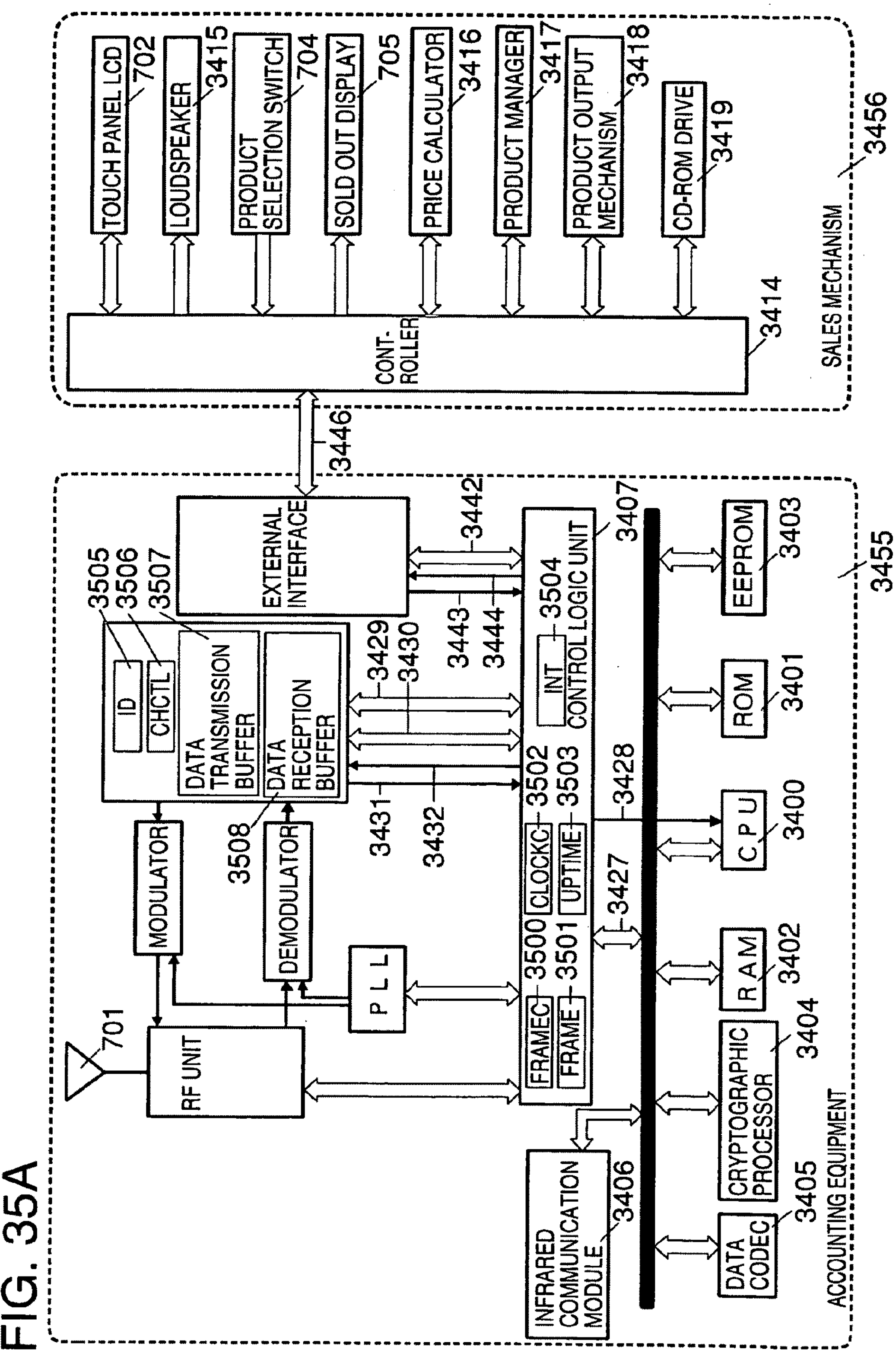
FIG. 35A is a diagram illustrating the arrangement of an internal register in the automatic vending machine according to the embodiment of the present invention.

In order to perform these processes, as is shown in FIG. 35A, the channel codec 3408 includes: an ID register (ID) 3505, in which is stored a terminal ID; a channel codec control register (CHCTL) 3506, which controls the operation of the channel codec 3408; a data transmission buffer 3507, in which are stored data-communication data received from the CPU 3400 via the control logic unit 3407; and a data reception buffer 3508, in which are stored data-communication data extracted from received data.

A control signal 3432 is a control signal with which the CPU 3400 directs the channel codec 3408 via the control logic unit 3407 in order to write data to the data transmission buffer 3507 and to read data from the data reception buffer 3508. When the control signal 3432 goes low, the data-communication data are written to the data transmission buffer 3507, and when the control signal 3432 goes high, the data-communication data are read from the data reception buffer 3508.

The modulator 3409 modulates a serial digital signal 3433 received from the channel codec 3408 to provide an analog transmission signal 3435, which is employed as a baseband for an electric signal 3440 that is supplied by the PLL 3412, and transmits the signal 3435 to the RF unit 3411. The analog transmission signal 3435 received by the RF unit 3411 is output as a radio wave through the antenna 701.

When a radio wave is received at the antenna 701, an analog reception signal 3436 is transmitted by the RF unit 3411 to the demodulator 3410. The demodulator 3410 demodulates the analog signal 3436, while employing as its baseband an electric signal 3439 that is supplied by the PLL 3412, and transmits an obtained serial digital signal 3434 to the channel codec 3408.

The external interface 3413 is an interface circuit for connecting the accounting machine 3455 to the sales mechanism 3456. An accounting process request is transmitted by the sales mechanism 3456 to the accounting machine 3455 during the interrupt process. The interrupt process is requested of the CPU 3400 when the external interface 3413 asserts an interrupt signal 3443.

The control logic unit 3407 includes five internal registers, as is shown in FIG. 35A: a frame counter (FRAMEC) 3500, a start frame register (FRAME) 3501, a clock counter (CLOCKC) 3502, an update time register (UPTIME) 3503, and an interrupt register (INT) 3504.

The frame counter 3500 is employed to count the number of frames for the digital wireless telephone; the start frame register 3501 is employed to store the frame number of the frame that is to be activated next; the clock counter 3502 is employed to measure the current time; the update time register 3503 is employed to store the time at which the automatic vending machine 104 will communicate with the service providing system 110 to update data in the RAM 3402 (data updating process); and the interrupt register 3504 is employed to indicate the type of interrupt that has been generated for the CPU 3400.

Generally, to receive a call, the digital wireless telephone intermittently acquires control data for a control channel and compares it with the terminal ID. The automatic vending machine 104 employs the frame counter 3500 and the start frame register 3501 to intermittently acquire control data. First, the frame number of the frame to be activated next is stored in advance in the start frame register 3501, and when the count held by the frame counter 3500 equals the count held by the start frame register 3501, the control logic unit 3407 activates the channel codec 3408, the PLL 3412 and the RF unit 3411 to receive control data.

When the count held by the clock counter 3502 matches the count held by the update time register 3503, or when the interrupt signal 3431 or 3443 is asserted, the control logic unit 3407 writes the type of and the reason for the interrupt in the interrupt register (INT) 3504, and asserts an interrupt signal 3428 requesting that the CPU 3400 perform an interrupt process. For the interrupt processing, the CPU 3400 reads the type of and the reason for the interrupt that are stored in the interrupt register (INT) 3504, and then performs a corresponding process.

Figure 35B:
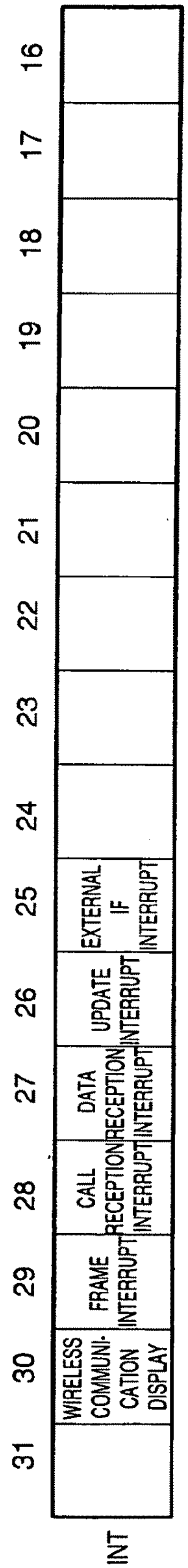
FIG. 35B is a diagram showing the bit field structure of an interrupt register in the automatic vending machine according to the embodiment of the present invention.

The individual bit fields of the interrupt register (INT) 3504 are defined as is shown in FIG. 35B.

Bit 30 represents the digital wireless telephone communication state. When the bit value is 0, it indicates the state is one where no digital wireless telephone communication is being performed, and when the bit value is 1, it indicates the state is one where digital wireless telephone communication is in progress.

Bit 29 represents the generation of a frame interrupt requesting the intermittent acquisition of control data. When the bit value is 1, it indicates a condition that exists when a frame interruption has occurred. In this bit field, a 1 is set when the count held by the frame counter 3500 equals the count held by the start frame register 3501.

Bit 28 represents the generation of a call arrival interrupt. When the bit value is 1, it indicates that a digital wireless call has arrived. In this bit field, a 1 is set when the terminal ID is matched and the interrupt signal 3432 is asserted during the intermittent acquisition of control data for the digital wireless phone.

Bit 27 represents the generation of a data reception interrupt. When the bit value is 1, it indicates that data is being received. In this bit field, a 1 is set when the data-communication data are received and the interrupt signal 3431 is asserted during the course of digital wireless telephone communication.

Bit 26 represents the generation of an update interrupt requesting the performance of a data updating process. When the bit value is 1, it indicates the generation the update interrupt. In this bit field, a 1 is set when the count held by the clock counter 3502 matches the count held by the update time register 3503.

Bit 25 represents the generation of an external IF interrupt requesting data communication be initiated with the sales mechanism 3456. When the bit value is 1, it signals the generation of the external IF interrupt. In this bit field, a 1 is set when the interrupt signal 3443 received from the external interface 3413 is asserted.

Data stored in the RAM 3402 will now be described.

Figure 36:
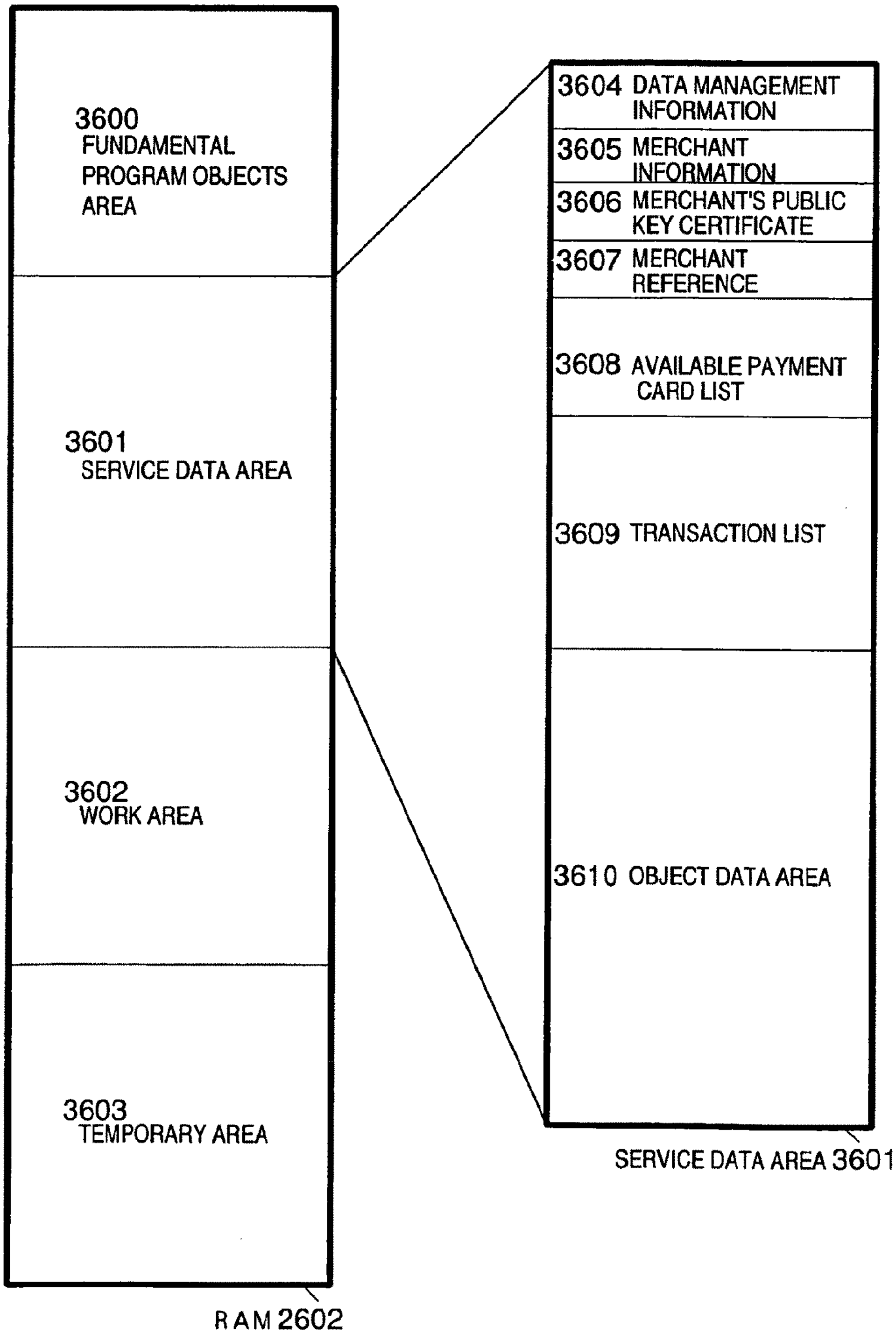
FIG. 36 is a specific diagram showing a RAM map for the accounting device according to the embodiment of the present invention.

FIG. 36 is a specific diagram of a RAM map for data stored in the RAM 3402.

The RAM 3402 is constituted by four areas: a fundamental program object area 3600, a service data area 3601, a work area 3602 and a temporary area 3603. In the fundamental program object area 3600 are stored an upgraded module of a program stored in the ROM 3401, a patch program and an additional program. The work area 3602 is a work area that the CPU 100 employs when executing a program, and the temporary area 3603 is an area in which information received by the automatic vending machine is stored temporarily.

The service data area 3601 is an area in which are stored contract information for the electronic commerce service, available payment card information and history information, and the data in this area are managed by the service providing system. The service data area 3601 is constituted by seven sub-areas: a data management information area 3604, a merchant information area 3605, a merchant public key certificate area 3606, a merchant preference area 3607, an available payment card list 3608, a transaction list area 3609 and an object data area 3610.

The data management information area 3604 is an area in which is stored management information for data stored in the service data area 3601; the merchant information area 3605 is an area in which are stored the name of a merchant and information for the contents of a contract with a service provider; the merchant public key certificate area 3606 is an area in which a public key certificate for a merchant is stored; the merchant preference area 3607 is an area in which is stored preference information for a merchant that concerns the mobile electronic commerce service; the available payment card list area 3608 is an area in which is stored list information for those payment cards that the merchant can handle; the transaction list area 3609 is an area in which sales history information for the mobile electronic commerce service is stored; and the object data area 3610 is an area in which are stored object data for the information managed in the other six areas.

The information stored in the service data area 3601 will now be described in detail.

Figure 37:
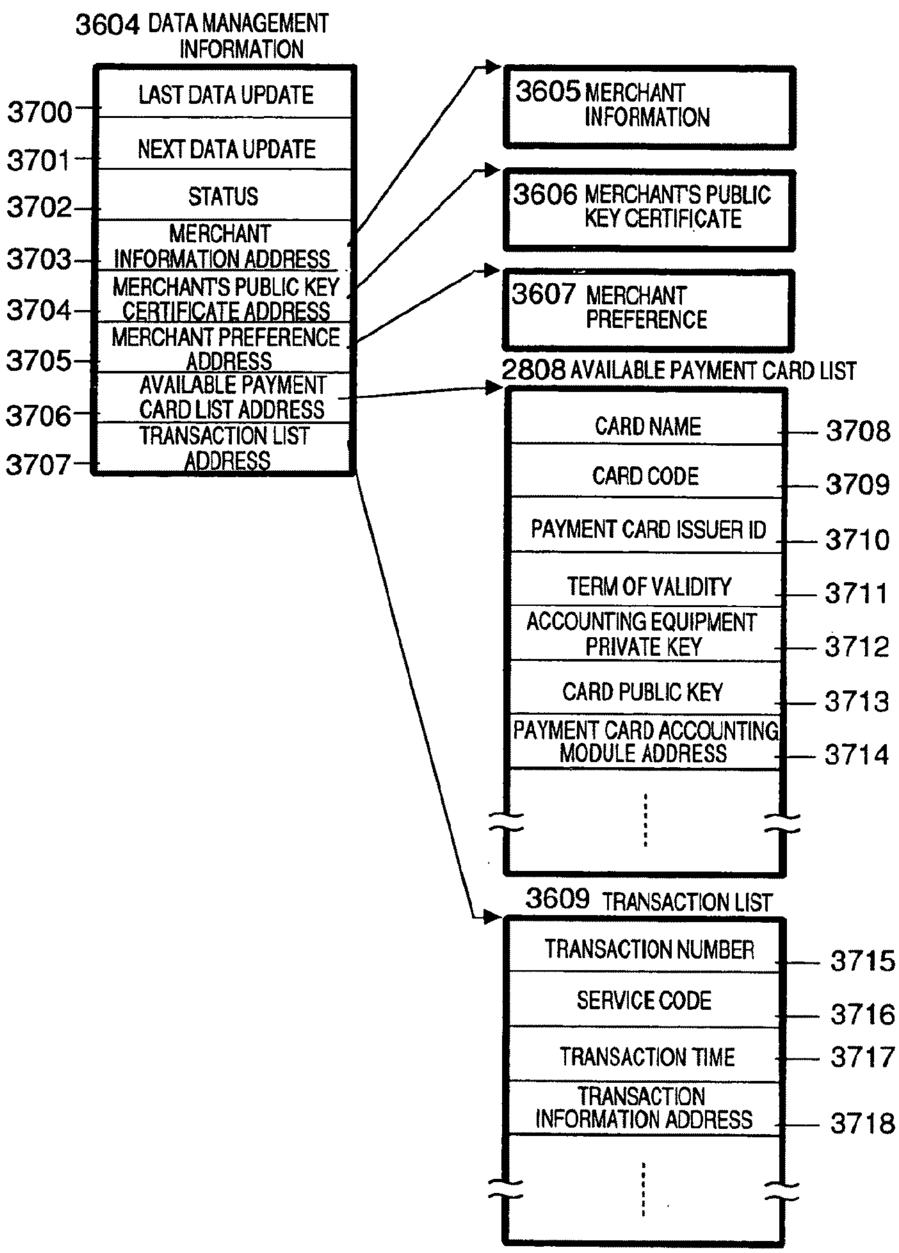
FIG. 37 is a specific diagram showing data that are stored in the service data area of the accounting device according to the embodiment of the present invention.

FIG. 37 is a detailed, specific diagram showing the relationships established for information stored in the service data area 3601.

The data management information 3604 consists of eight types of information: a last data update date 3700, a next data update date 3701, an accounting machine status 3702, a merchant information address 3703, a merchant public key certificate address 3704, a merchant preference address 3705, an available payment card list address 3706 and a transaction list address 3707.

The last data update date 3700 represents the date on which the service providing system 110 last updated the data in the RAM 3402, and the next data update date 3701 represents the date on which the service providing system 110 will next update the data in the service data area 3601. The automatic vending machine 104 automatically initiates an update process when the time set according to the next data update date 3701 is reached.

The time of the next data update date 3701 is set in the update time register 3503. When the next data update date 3701 is reached, the automatic vending machine 104 initiates the data updating process. During the data updating process, the service providing system 110 updates data stored in the RAM. This process is performed daily during a period (e.g., late at night) in which communication traffic is not very heavy. The data updating process will be described in detail later.

The accounting machine status 3702 represents the status of the accounting machine 3455. The merchant information address 3703, the merchant public key certificate address 3704, the merchant preference address 3705, the available payment card list address 3706 and the transaction list address 3707 respectively represent the first addresses for the areas in which are stored the merchant information 3605, the merchant public key certificate 3606, the merchant preference information 3607, the available payment card list 3608 and the transaction list 3609.

The available payment card list 3608 includes list information for payment cards that can be handled by a merchant.

In the available payment card list 3608, for each payment card, seven types of information are entered: a card name 3708, a card code 3709, a payment card issuer ID 3710, a validity term 3711, an accounting machine private key 3712, a card public key 3713, and a payment card accounting module address 3714. The card name 3708 represents the name of a payment card that the merchant can handle; the card code 3709 is code information that represents the type of electronic payment card; the payment card issuer ID 3710 is ID information for a payment card issuer; and the validity term 3711 is the period during which the electronic payment card is valid. The accounting machine private key 3712 and the card public key 3713 are encryption keys that are respectively paired with the accounting machine public key 2012 and the card private key 2011 for the electronic payment card.

The payment card accounting module address 3714 is an address in the object data area 3610 in which is stored a program module (a payment card accounting module) for clearing the electronic payment card.

In accordance with the contract entered into by the merchant and the service providing system, the service providing system sets up or updates the contents of the available payment card list 3608 in the data updating process.

In the transaction list 3609, list information is stored to manage the history information for sales through the mobile electronic commerce service. For the sales effected through one payment card clearing process, in the transaction list 3609 are stored four information items: a transaction number 3715, a service code 3716, a transaction time 3717, and a transaction information address 3718.

The transaction number 3715 is a number uniquely identifying a transaction performed with a user (from the view of the merchant); the service code 3716 is code information identifying the type of mobile electronic commerce service that was provided for the user; and the transaction time 3717 is time information for the time at which a product was sold or the service was provided via the mobile electronic service.

The transaction information address 3718 is an address in the object data area 3610 at which is stored a micro-check that describes the contents of the sale and a receipt.

The internal structure of the electronic telephone card accounting machine 800 will now be described.

Figure 38:
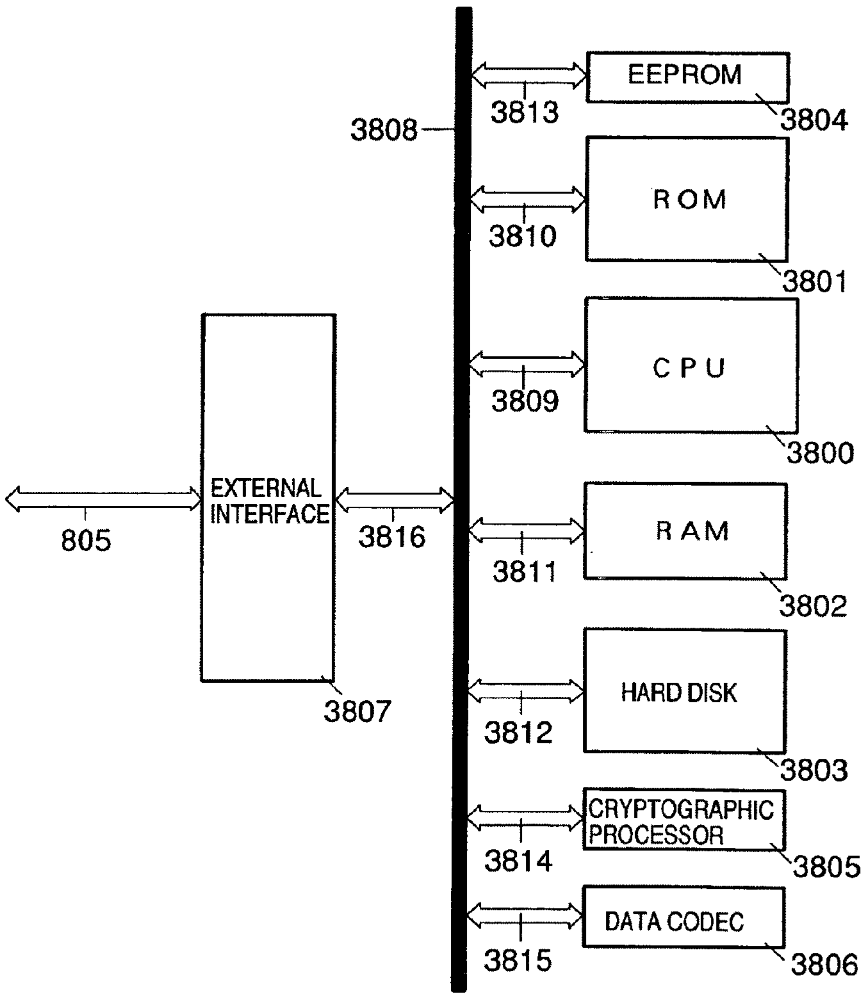
FIG. 38 is a block diagram illustrating the arrangement of an electronic telephone card automatic vending machine according to the embodiment of the present invention.

FIG. 38 is a block diagram illustrating the arrangement of the electronic telephone card accounting machine 800.

In FIG. 38, the electronic telephone card accounting machine 800 comprises: a CPU (Central Processing Unit) 3800, which employs a program stored in a ROM (Read Only Memory) 3801 to process data for transmission and for reception and to control the other components via a bus 3845; a RAM (Random Access Memory) 3802 and a hard disk 3803, whereat are stored data that have been processed and that are to be processed by the CPU 3800; a EEPROM (Electric Erasable Programmable Read Only Memory) 3804, in which is stored an accounting machine ID for the electronic telephone card accounting machine 800, a communication service provider ID, a private key and a public key for the digital signature of a communication service provider, a service provider ID, and the telephone number and the public key of the service providing system 110 (the digital signature of the service provider accompanies the telephone number of the service providing system); a cryptographic processor 3805, which encrypts and decrypts data under the control of the CPU 3800; a data codec 3806, which encodes data to be transmitted and decodes received data under the control of the CPU 3800; and an external interface 3807, which serves as an interface for the switch 801.

The electronic telephone card accounting machine 800 and the switch 801 communicate with each other via the external interface 3807. The electronic telephone card accounting machine 800 receives an accounting process request from the switch 801 and performs the telephone card settlement process for a designated value. The value for the telephone card settlement is designated by the switch 801.

For a communication (micro-check call) using the electronic telephone card, upon receiving the accounting process request from the switch 801, the electronic telephone card accounting machine 800 exchanges settlement information with the mobile user terminal 100 upon the initiation of and during the line connection process (communication in process), and performs the telephone card settlement process. The switch 801 switches the lines in accordance with the condition of the settlement process performed by the electronic telephone card accounting machine 800.

Upon the initiation of the line connection process, and upon each occurrence of the elapse of a constant period of time, the telephone card settlement process is performed for the total communication charge assessed for the communication time.

First, when the line connection process is begun, a settlement is made for the communication charge V (V>0) for a constant communication time T (T>0). Then, on each occasion that the communication time exceeds T, a settlement process is performed for a communication charge 2V for a communication time 2T, instead of for a communication charge V. Thereafter, whenever the communication time exceeds NT (N is a natural number), a settlement process is performed for a communication charge (N+1)V for a communication time (N+1)T, rather than for a communication charge NV.

When the electronic telephone card accounting machine 800 has normally completed the telephone card settlement process for the received accounting process request, the switch 801 either establishes a new line connection, or continues the current line connection. When, for a specific reason, the telephone card settlement is not successful, the switch 801 either refrains from establishing a new line connection, or disconnects the line that is currently in use.

The cryptographic processor 3805 includes a secret key encryption and decryption function and a public key encryption and decryption function. The cryptographic processor 3805 employs a cryptography method determined by the CPU 3800 and the keys to encrypt or decrypt data selected by the CPU 3800. The encryption and decryption functions of the cryptographic processor 3805 are employed to perform a digital signature process or a closing process for a message, and to decrypt a closed and encrypted message or to verify a digital signature accompanying a message.

The data codec 3806 encodes data to be transmitted or decodes data that is received, under the control of the CPU 3800. In this case, the encoding is a process for generating data to be transmitted that includes communication control information and error correction information, and the decoding is a process for performing error correction for the received data and for removing extra communication control information in order to obtain the data that a sender was to originally transmit. The data codec 3806 has a function for encoding or decoding data during data communication conducted using a digital wireless telephone, and a function for encoding or decoding data during infrared communication. The data codec 2806 performs encoding or decoding determined by the CPU 3800 for data that are selected by the CPU 3800.

When, for example, a closed message accompanied by a digital signature is to be transmitted to the mobile user terminal 100, the CPU 3800 employs the cryptographic processor 3805 to perform a digital signature process and a closing process for a message, employs the data codec 3806 to encode the obtained message to provide a data communication form that is suitable for digital telephone communication, and transmits the resultant message through the external interface 3807 to the switch 801.

When a closed message accompanied by a digital signature is received from the mobile user terminal 100, the CPU 3800 receives that message through the external interface 3807, employs the data codec 3806 to decode the received message, and permits the cryptographic processor 2805 to decrypt the closed and encrypted message and to verify the digital signature accompanying the message.

Similarly, when a closed message accompanied by a digital signature is to be transmitted to the service providing system 110, the CPU 3800 employs the cryptographic processor 3805 to provide a digital signature for the message and to close the message, and employs the data codec 3806 to encode the obtained message and produce a data form suitable for digital telephone communication. Then, the resultant message is transmitted through the external interface 3807 to the switch 801.

When a closed message accompanied by a digital signature is received from the service providing system 110, the CPU 3800 receives that message through the external interface 3807, employs the data codec 3806 to decode the received message, and permits the cryptographic processor 3805 to decrypt the closed and encrypted message and to verify the digital signature accompanying the message.

Data stored in the RAM 3802 will now be described.

Figure 39:
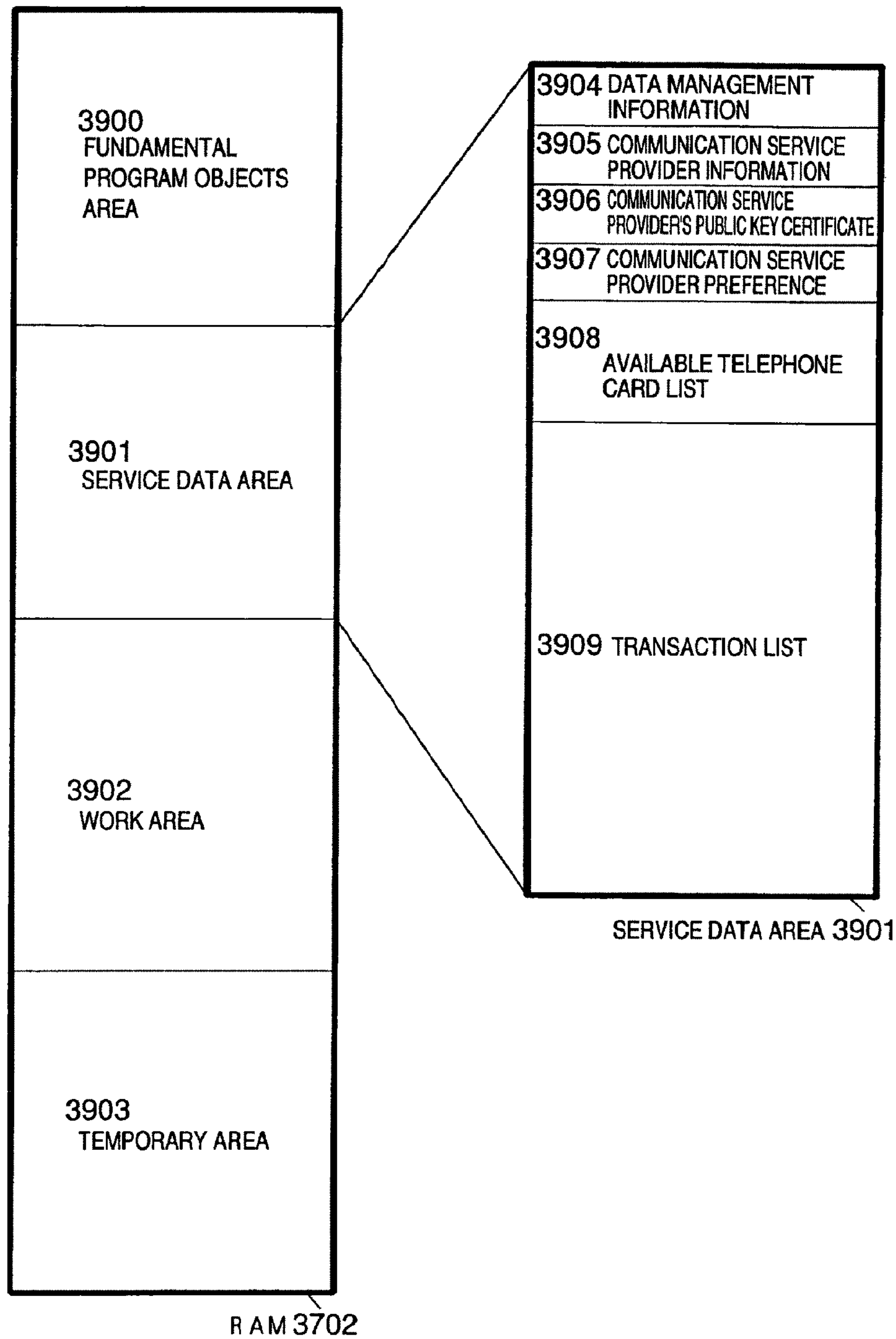
FIG. 39 is a specific diagram showing a RAM map for the electronic telephone card accounting device according to the embodiment of the present invention.

FIG. 39 is a specific diagram of a RAM map for data stored in the RAM 3802.

The RAM 3802 is constituted by four areas: a fundamental program object area 3900, a service data area 3901, a work area 3902 and a temporary area 3903. In the fundamental program object area 3900 are stored an upgraded module of a program stored in the ROM 3801, a patch program and an additional program. The work area 3902 is a work area that the CPU 100 employs when executing a program, and the temporary area 3903 is an area in which information received by the electronic telephone accounting machine is stored temporarily.

The service data area 3901 is an area in which are stored contract information for the electronic commerce service, available telephone card information and history information, and the data in this area are managed by the service providing system. The service data area 3901 is constituted by six sub-areas: a data management information area 3904, a communication service provider information area 3905, a communication service provider's public key certificate area 3906, a communication service provider preference area 3907, an available telephone card list 3908 and a transaction list area 3909.

The data management information area 3904 is an area in which is stored management information for data stored in the service data area 3901; the communication service provider information area 3905 is an area in which are stored the name of a communication service provider and information for the contents of a contract with a service provider; the communication service provider public key certificate area 3906 is an area in which a public key certificate for a communication service provider is stored; the communication service provider preference area 3907 is an area in which is stored preference information concerning the mobile electronic commerce service for a communication service provider; the available telephone card list area 3908 is an area in which is stored list information for those telephone cards the communication service provider can handle; and the transaction list area 3909 is an area in which is stored accounting history information for communication performed (micro-check call) using an electronic telephone card.

The information stored in the service data area 3901 will now be described in detail.

Figure 40:
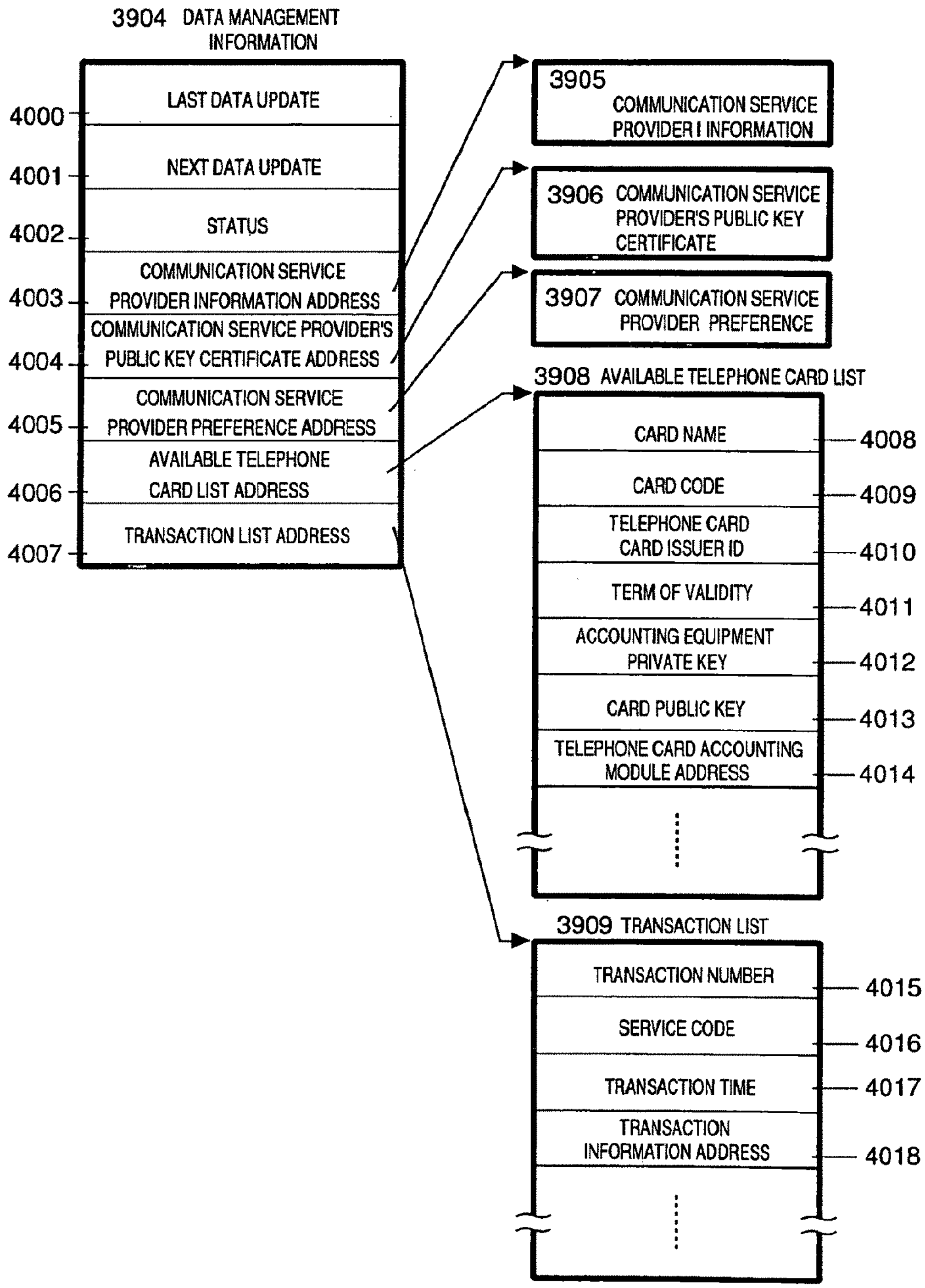
FIG. 40 is a specific diagram showing data that are stored in the service data area of the electronic telephone card accounting device according to the embodiment of the present invention.

FIG. 40 is a detailed, specific diagram showing the relationships established for information stored in the service data area 3901.

The data management information 3904 consists of eight types of information: a last data update date 4000, a next data update date 4001, an accounting machine status 4002, a communication service provider information address 4003, a communication service provider public key certificate address 4004, a communication service provider preference address 4005, an available telephone card list address 4006 and a transaction list address 4007.

The last data update date 4000 represents the date on which the service providing system 110 last updated the data in the RAM 3802 and on the hard disk 3803, and the next data update date 4001 represents the date on which the service providing system 110 will next update the data in the service data area 3901. The electronic telephone card accounting machine 800 automatically initiates an update process when the time set according to the next data update date 4001 is reached.

The accounting machine status 4002 represents the status of the electronic telephone card accounting machine 800. The communication service provider information address 4003, the communication service provider public key certificate address 4004, the communication service provider preference address 4005, the available telephone card list address 4006 and the transaction list address 4007 respectively represent the first addresses for the areas in which are stored the communication service provider information 3905, the communication service provider public key certificate 3906, the communication service provider preference information 3907, the available telephone card list 3908 and the transaction list 3909.

The available telephone card list 3908 includes list information for telephone cards that can be handled by a communication service provider.

In the available telephone card list 3908, for each telephone card, seven types of information are entered: a card name 4008, a card code 4009, a telephone card issuer ID 4010, a validity term 4011, an accounting machine private key 4012, a card public key 4013, and a telephone card accounting module address 4014. The card name 4008 represents the name of a telephone card that the communication service provider can handle; the card code 4009 is code information that represents the type of electronic telephone card; the telephone card issuer ID 4010 is ID information for a telephone card issuer; and the validity term 4011 is the period during which the electronic telephone card is valid. The accounting machine private key 4012 and the card public key 4013 are encryption keys that are respectively paired with the accounting machine public key 2012 and the card private key 2011 for the electronic telephone card.

The telephone card accounting module address 4014 is an address on the hard disk 3803 at which is stored a program module (a telephone card accounting module) for clearing the electronic telephone card.

In accordance with the contract entered into by the communication service provider and the service providing system, the service providing system sets up or updates the contents of the available telephone card list 3908 in the data updating process.

In the transaction list 3909, list information is stored to manage the history information for sales through the mobile electronic commerce service. For one communication (micro-check call) employing an electronic telephone card, in the transaction list 3909 are stored four information items: a transaction number 4015, a service code 4016, a transaction time 4017, and a transaction information address 4018.

The transaction number 4017 is a number uniquely identifying a transaction performed with a user (from the view of the communication service provider); the service code 4016 is code information identifying the type of mobile electronic commerce service (micro-check call) that was provided for the user; and the transaction time 4017 is time information for the time at which the telephone card clearing process was performed.

The transaction information address 4018 is an address on the hard disk 3803 at which is stored a telephone micro-check that describes the contents of the charge and a receipt.

An explanation will now be given for the digital signature process and the closing process performed by the mobile user terminal 100 when it generates a message to be transmitted to the gate terminal 101, the merchant terminal 102, the merchant terminal 103, the automatic vending machine 104, the switching center 105, or the service providing system 110.

Since the digital signature process and the closing process are also performed in the same manner by the gate terminal 101, the merchant terminals 102 and 103, the automatic vending machine 104, the switching center 105 and the service providing system 110, the identities of the characters in the following explanation are generalized by using the titles Mr. A and Mr. B, rather than the terms user, merchant and service provider.

In the digital signature processing, an electronic signature is provided for a message, while the characteristic of the cryptographic process is employed by using the public key, "a message encrypted using a private key is decrypted only by using a public key that corresponds to that private key."

Figure 41A:
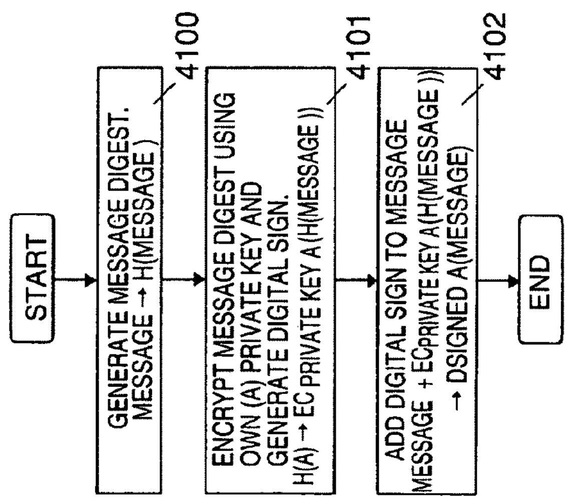
FIG. 41A is a flowchart showing the digital signature processing according to the embodiment of the present invention.
Figure 41B:
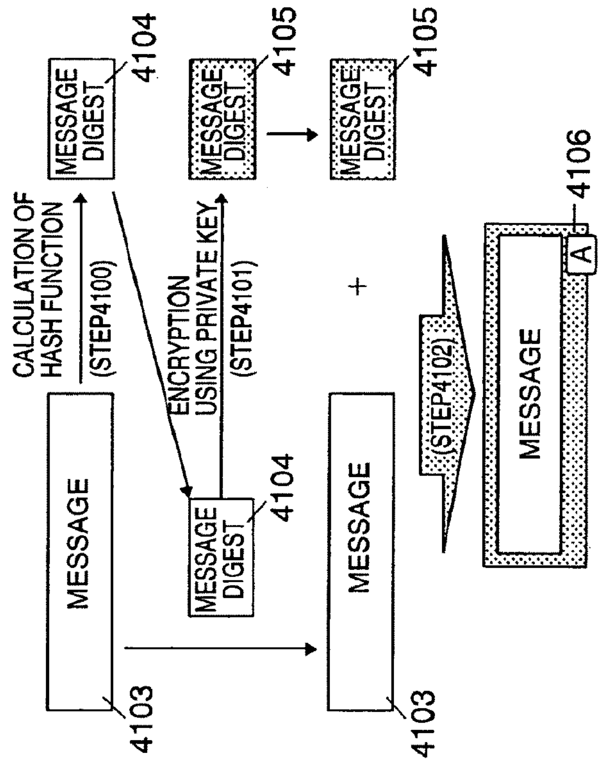
FIG. 41B is a flowchart showing the digital signature processing according to the embodiment of the present invention.

FIGS. 41A and 41B are a flowchart for the digital signature processing and a diagram for explaining it when a message (Message) is accompanied by the digital signature of Mr. A.

First, at step 4100, the CPU performs the hash function calculation for a message 4103, and generates a message digest 4104. Then, at step 4101, the CPU permits the cryptographic processor to encrypt the message digest 4104 using the private key of Mr. A, and to generate a digital signature 4105. At step 4102, the CPU adds the digital signature 4105 to the original message 4103. Through the above processing, the CPU generates a message 4106 accompanied by the digital signature of Mr. A.

Reference numeral 4106 in FIG. 41B denotes a message accompanied by the digital signature of Mr. A. Hereinafter, in the drawings, the message accompanied by the digital signature is shown as indicated by 4106.

The closing processing will now be described. In the closing process, the character of the cryptographic process using the public key, "a message encrypted using a private key is decrypted only by using a public key that corresponds to that private key," is employed to allow only a specific person to read the contents of the message.

Figure 42A:
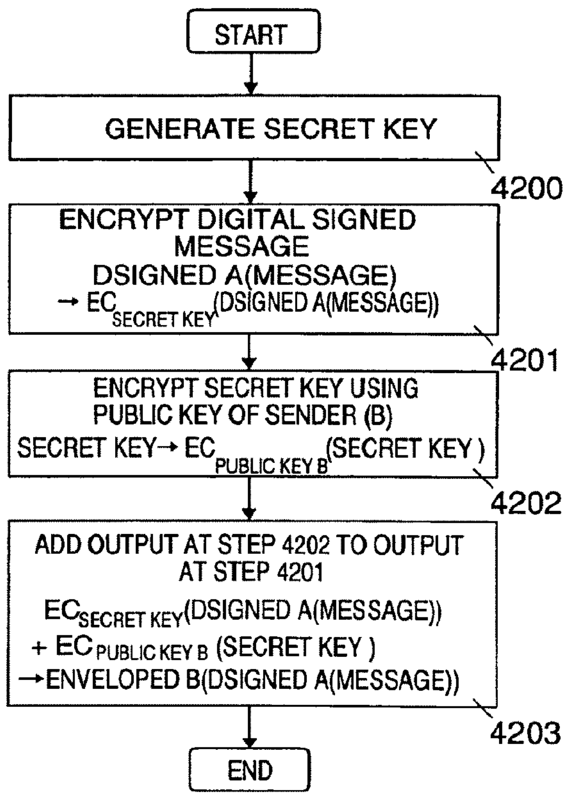
FIG. 42A is a flowchart showing the message sealing processing according to the embodiment of the present invention.
Figure 42B:
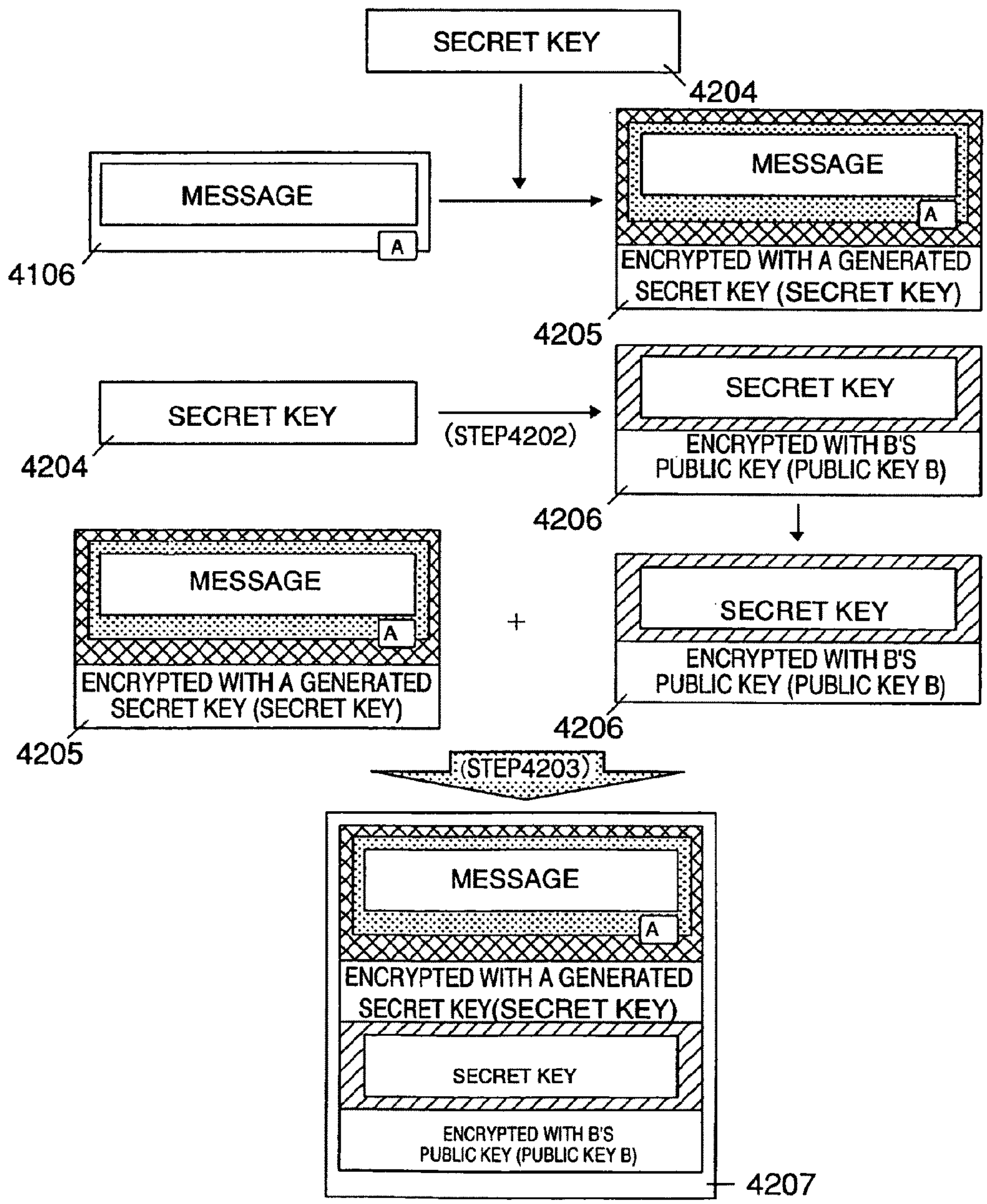
FIG. 42B is a flowchart showing the message sealing processing according to the embodiment of the present invention.

FIGS. 42A and 42B are a flowchart and a diagram for explaining the processing performed when closing a message that is accompanied by the digital signature of a Mr. A and when addressing it to a Mr. B, who is the recipient.

First, at step 4200, the CPU employs a random number function to generate a secret key 4204, which is a secret encryption key. Then, at step 4201, the CPU permits the cryptographic processor to encrypt the message 4106, which is accompanied by the digital signature, by using the private key 4204. At step 4202, the CPU permits the cryptographic processor to encrypt the secret key 4204 by using the public key of Mr. B, who is the recipient. At step 4203, the CPU adds the output 4206 produced at step 4202 to the output 4205 produced at step 4201. Through the above processing, the CPU generates a closed message 4207 that is addressed to Mr. B.

Reference numeral 4207 in FIG. 42B denotes a closed message addressed to Mr. B. Hereinafter, in the drawings, the closed message is shown as is illustrated by 4207.

An explanation will now be given for the processing performed to decrypt a closed and encrypted message, and the processing performed for the examination of a digital signature by the mobile user terminal 100, the gate terminal 101, the merchant terminal 102, the merchant terminal 103, the automatic vending machine 104, the switching center 105 or the service providing system 110 when the message is received from the service providing system. In the following explanation, characters are also generalized.

Figure 43A:
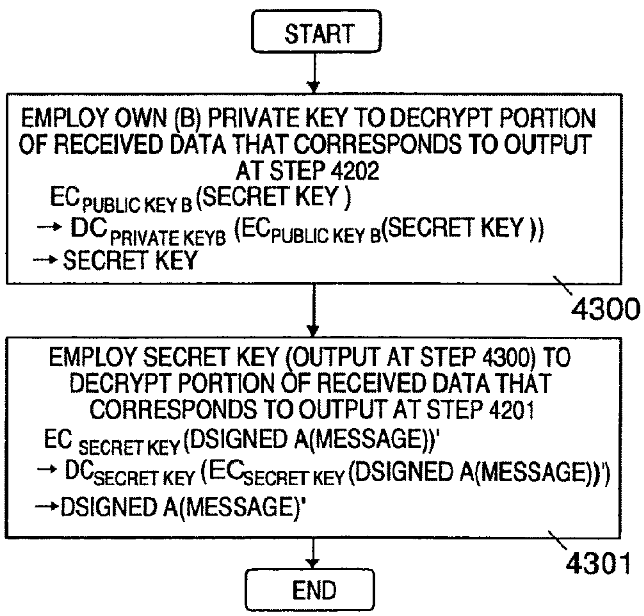
FIG. 43A is a flowchart showing the closed message decryption processing according to the embodiment of the present invention.
Figure 43B:
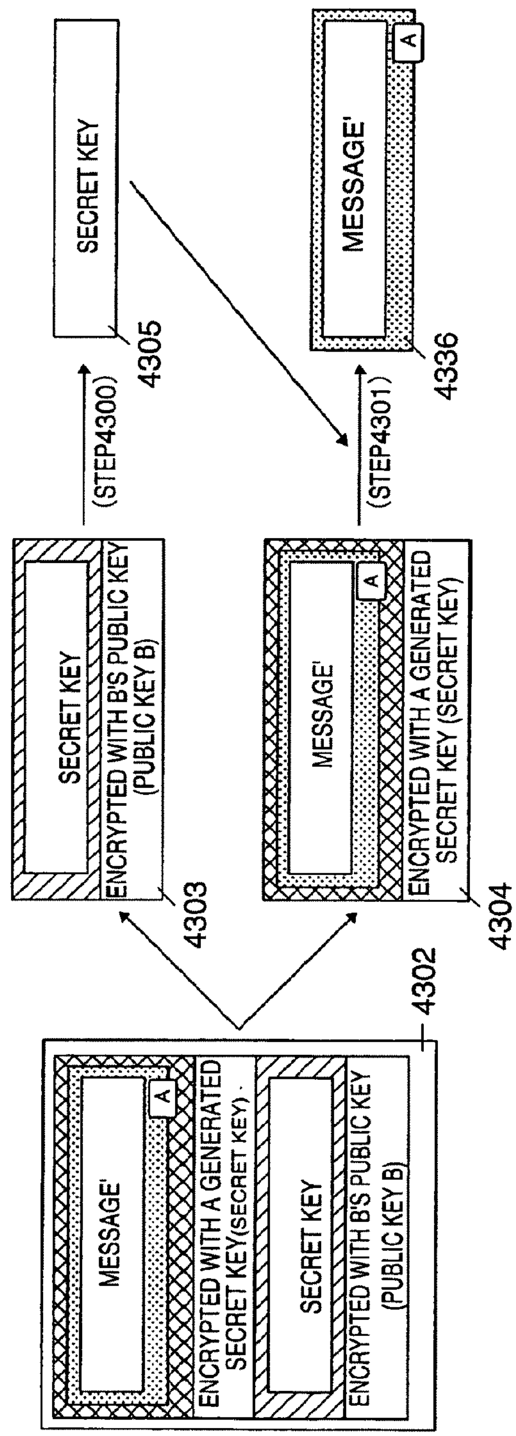
FIG. 43B is a flowchart showing the closed message decryption processing according to the embodiment of the present invention.

FIGS. 43A and 43B are a flowchart and a diagram for explaining the processing performed to decrypt a closed message addressed to Mr. B.

First, at step 4300, the CPU separates a closed message 4302 addressed to Mr. B into a portion 4303, wherein the secret key is encrypted using the public key of Mr. B, and a message portion 4304 that is encrypted using the secret key. The CPU permits the cryptographic processor to employ the private key of Mr. B to decrypt the portion 4303 wherein the secret key is encrypted using the public key of Mr. B, and to extract the secret key 4305. Then, at step 4301, the CPU permits the cryptographic processor to employ the secret key 4305 to decrypt the message portion 4304 that is encrypted using the secret key. Through the above processing, the closed message is decrypted.

The digital signature examination process will now be described.

Figure 44A:
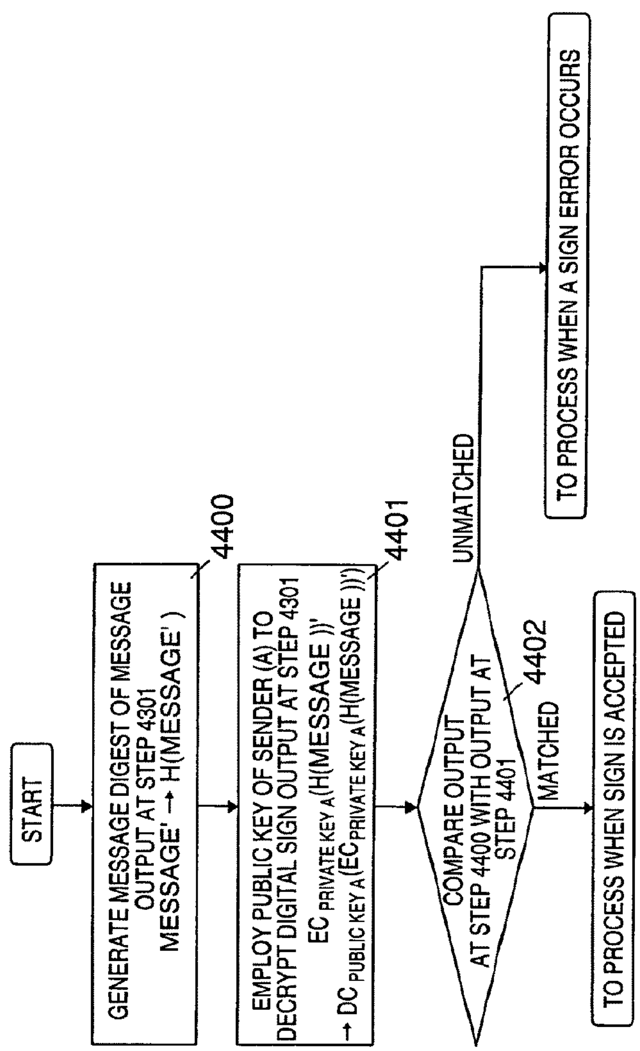
FIG. 44A is a flowchart showing the digital signature authentication processing according to the embodiment of the present invention.
Figure 44B:
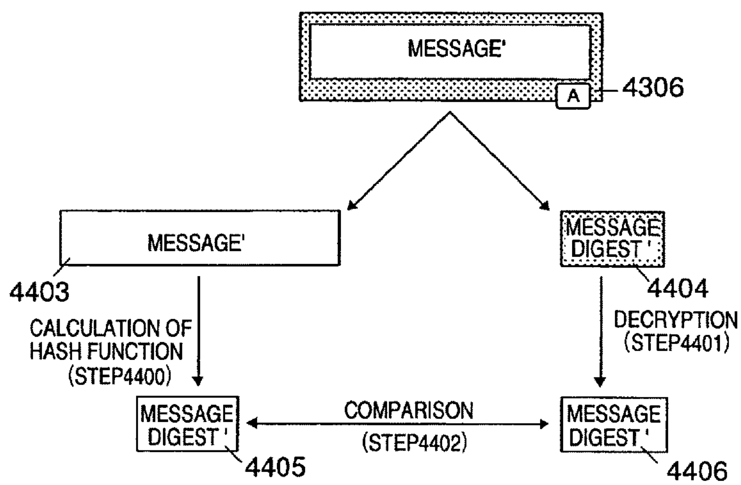
FIG. 44B is a flowchart showing the digital signature authentication processing according to the embodiment of the present invention.

FIGS. 44A and 44B are a flowchart and a diagram for explaining the processing performed when an examination of made of the digital signature of Mr. A, the sender, that accompanies a message. First, at step 4400, the CPU performs a hash function calculation for the message portion (Message 4403) in a message 4306 accompanied by a digital signature, and generates a message digest 4405. Then, at step 4401, the CPU permits the cryptographic processor to decrypt, using the public key of Mr. A, a digital signature 4404 accompanying the message 4306. At step 4402, the CPU compares the output 4405 at step 4400 with the output 4406 at step 4401. When the contents match, the CPU ascertains that the verification has been successful. When the contents do not match, the CPU ascertains that a verification error has occurred. Through the above processing, the digital signature examination process is performed.

The processing performed by the service providing system 110 will now be described.

The service providing system 110 communicates with the mobile user terminal 100, the gate terminal 101, the merchant terminal 102, the merchant terminal 103, the automatic vending machine 104, the switching center 105, the transaction processing system 106, the ticket issuing system 107, the payment card issuing system 108 and the telephone card issuing system 109, and serves as an agent for a user, a merchant, a communication service provider, a transaction processor, a ticket issuer, a payment card issuer and a telephone card issuer while providing a mobile electronic commerce service for a user, a merchant and a communication service provider.

Figure 45:
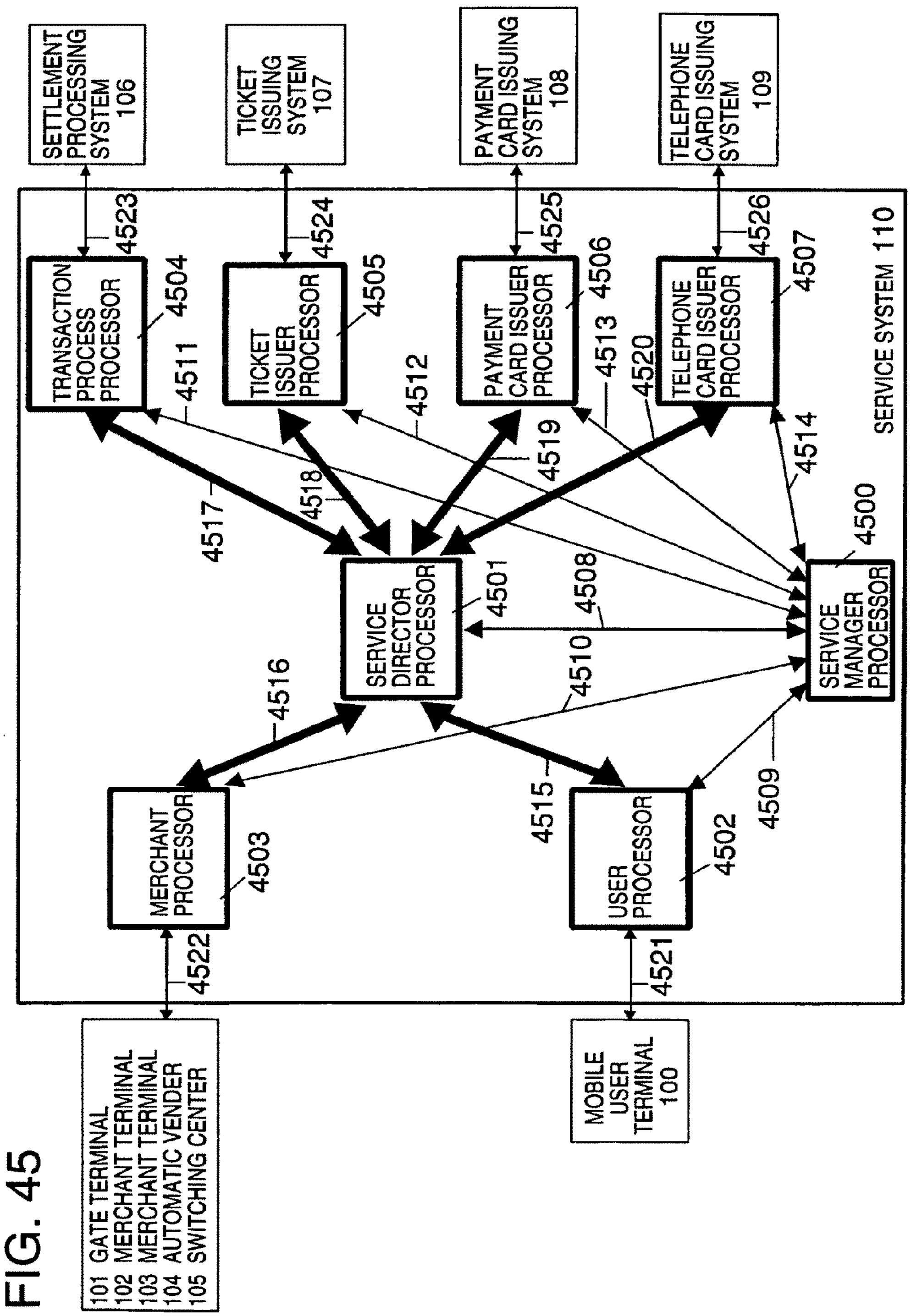
FIG. 45 is a diagram for explaining the processing architecture of the service system according to the embodiment of the present invention.

In FIG. 45 is shown the process architecture for the service providing system 110.

The service providing system 110 provides a mobile electronic commerce service through the coordinated performances of eight different processors: a user processor (UP) 4502, a merchant processor (MP) 4502, a transaction process processor (TPP) 4504, a ticket issuer processor (TIP) 4505, a payment card issuer processor (PCIP) 4506, a telephone card issuer processor (TCIP) 4507, a service director processor (SDP) 4501, and a service manager processor (SMP) 4500, all of which are generated in the service server 900.

In FIG. 45, the user processor 4502 has a one-to-one correspondence with the mobile user terminal 100, and serves as an interface for communication between the service providing system 110 and the mobile user terminal 100.

The merchant processor 4503 has a one-to-one correspondence with the gate terminal 101, the merchant terminal 102, the merchant terminal 103, the automatic vending machine 104 or the switching center 105, and serves as an interface for communication between the service providing system 110 and the gate terminal 1101, the merchant terminal 102, the merchant terminal 103, the automatic vending machine 104 or the switching center 105.

The transaction process processor 4504 corresponds to the transaction processing system 106, and serves as an interface for communication between the service providing system 110 and the transaction processing system 106. The ticket issuing processor 4505 corresponds to the ticket issuing system 107, and serves as an interface for communication between the service providing system 110 and the ticket issuing system 107. The payment card issuing processor 4506 corresponds to the payment card issuing system 108, and serves as an interface for communication between the service providing system 110 and the payment card issuing system 108. The telephone card issuing processor 4507 corresponds to the telephone card issuing system 109, and serves as an interface for communication between the service providing system 110 and the telephone card issuing system 109.

The service director processor 4501 produces a mobile electronic commerce service by communicating with the user processor 4502, the merchant processor 4503, the transaction process processor 4504, the ticket issuer processor 4505, the payment card issuer processor 4506 and the telephone card issuer processor 4507. The service manager processor 4500 manages the user processor, the merchant processor, the transaction process processor, the ticket issuer processor, the payment card issuer processor and the telephone card issuer processor, and the service director processor in the system providing service 110. The meaning of the expression "produces a personal remote credit transaction service" will be described in detail later.

The service providing system 110 may simultaneously communicate with a plurality of mobile user terminals and a plurality of gate terminals, merchant terminals (102 or 103), automatic vending machines and switching centers, may simultaneously process a plurality of mobile electronic commerce services, or may simultaneously communicate with a plurality of transaction processing systems, ticket issuing systems, payment cared issuing systems or telephone card issuing systems in order to process a plurality of mobile electronic commerce services. Accordingly, in the service server 900 there may be a plurality of user processors, merchant processors, transaction process processors, ticket issuer processors, payment card issuer processors, telephone card issuer processors and service director processors. These processors are generated or deleted by the service manager processor.

When the service server 900 is constituted by a plurality of computers, the user processor, the merchant processor, the transaction process processor, the ticket issuer processor, the payment card issuer processor, the telephone card issuer processor and the service director processor are separately generated by the plurality of computers, so that the load imposed on an individual processor can be distributed among the computers.

A set of cooperative processors for providing a single mobile electronic commerce service is determined by the service manager processor and is composed of at least one processor selected from among the user, the merchant, the transaction, the ticket issuer, the payment card issuer and the telephone card issuer processors, plus one service director processor. The set of cooperating processes is called a process group.

First, the user process 4502 will be described.

The user process 4502 is a process for controlling communication with the mobile user terminal 100, for verifying users, for encrypting data to be transmitted to the mobile user terminal 100, for decrypting data received from the mobile user terminal 100, for examining the validity of the data received from the mobile user terminal 100, and for performing a remote access process, a data updating process, a forcible data updating process and a data backup process for the mobile user terminal 100.

The user process 4502 is generated by the performance of the service manager processor 4500 when the service providing system 110 communicates with the mobile user terminal 100. In the service manager process 4500, one user process 4502 is generated for one mobile user terminal 100 that is communicating with the service providing system 110.

In the user process 4502, permission is provided only for the accessing of attribute information for the owner (the user) of the mobile user terminal 100, which is managed by the user information server 902, and data stored in the RAM 1502 of the mobile user terminal 100. In other words, other information can not be accessed during the performance of the user process 4502.

One mobile user terminal 100 corresponds to one user process 4502, and the user process 4502 can effectively engage only its corresponding mobile user terminal 100; it can not communicate directly with another mobile user terminal.

The merchant process 4503 will now be described.

The merchant process is a process for controlling communication with the gate terminal 101, the merchant terminal 102, the merchant terminal 103, the automatic vending machine 104 and the switching center 105, for verifying a merchant, for encrypting data to be transmitted to the gate terminal 101, the merchant terminal 102, the merchant terminal 103, the automatic vending machine 104 and the switching center 105, for decrypting data received from the gate terminal 101, the merchant terminal 102, the merchant terminal 103, the automatic vending machine 104 and the switching center 105, for examining the validity of the data received from the gate terminal 101, the merchant terminal 102, the merchant terminal 103, the automatic vending machine 104 and the switching center 105, for performing a data updating process or a forcible data updating process for the gate terminal 101, the merchant terminal 102, the merchant terminal 103, the automatic vending machine 104 and the switching center 105, for performing a remote access process for the gate terminal 101, the merchant terminal 102 and the merchant 103, and for performing a data backup process for the merchant terminal 103.

The merchant process 4503 is generated by the performance of the service manager process 4500 when the service providing system 110 communicates with the gate terminal 101, the merchant terminal 102, the merchant terminal 103, the automatic vending machine 104 and the switching center 105. In the service manager process 4500, one merchant process 4503 is generated for a gate terminal 101, a merchant terminal 102, a merchant terminal 103, an automatic vending machine 104 or a switching center 105 that communicates with the service providing system 110.

In the merchant process 4503, permission is provided only for the accessing of the attribute information for the merchant and the communication service provider, which are managed by the merchant information server 903, and data in the RAM and on the hard disk of the gate terminal 101, the merchant terminal 102, the merchant terminal 103, the automatic vending machine 104 and the switching center 105. In other words, other information can not be accessed during the performance of the merchant process 4503.

One gate terminal 101, one merchant terminal 102, one merchant terminal 103, one automatic vending machine 104 or one switching center 105 corresponds to one merchant process 4503, and the merchant process 4503 is effective only for a corresponding gate terminal 101, merchant terminal 102, merchant terminal 103, automatic vending machine or switching center 105; it can not communicate directly with another credit gate terminal, merchant terminal (102, 103), automatic vending machine or switching terminal.

The transaction processor process 4504 will now be described.

The transaction processor process is a process for controlling communication with the transaction processing system 106, for verifying a transaction processor, for encrypting data to be transmitted to the transaction processing system 106, for decrypting data received from the transaction processing system 106, and for examining the validity of the data received from the transaction processing system 106.

The transaction processor process 4504 is generated by the service manager processor 4500 when the service providing system 110 communicates with the transaction processing system 106. One transaction processor process 4504 is generated to control communication across one communication line between the service providing system 110 and the transaction processing system 106. The digital communication line 131 linking the service providing system 110 and the transaction processing system 106 is multiplexed so that it can serve as a plurality of communication lines. To perform communication between the service providing system 110 and the transaction processing system 106 across a plurality of communication lines during the same period, the service manager process 4500 generates multiple transaction processor processes 4504 that are equivalent in number to the communication lines.

In a transaction processor process 4504, permission is provided only for the accessing of the attribute information and transaction history information for the transaction processor in an area wherein is installed the transaction processing system 106 that is managed by the transaction processor information server 904. In other words, other information can not be accessed during the performance of the transaction processor process 4504.

The transaction processor process 4504 is effective only when employed with a corresponding transaction processing system 106, and can not communicate directly with another transaction processing system.

The ticket issuer process 4505 will now be described.

The ticket issuer process is a process for controlling communication with the ticket issuing system 107, for verifying a ticket issuer, for encrypting data to be transmitted to the ticket issuing system 107, for decrypting data received from the ticket issuing system 107, and for examining the validity of the data received from the ticket issuing system 107.

The ticket issuer process 4505 is generated by the service manager processor 4500 when the service providing system 110 communicates with the ticket issuing system 107. One ticket issuer process 4505 is generated to control communication across one communication line between the service providing system 110 and the ticket issuing system 107. The digital communication line 132 linking the service providing system 110 and the ticket issuing system 107 is multiplexed so that it can serve as a plurality of communication lines. To perform communication between the service providing system 110 and the ticket issuing system 107 across a plurality of communication lines during the same period, the service manager process 4500 generates multiple ticket issuer processes 4505 that are equivalent in number to the communication lines.

In the ticket issuer process 4505, permission is provided only for the accessing of attribute information and ticket issuance history information by the ticket issuer in the area wherein is installed the ticket issuing system 107 that is managed by the ticket issuer information server 905. In other words, other information can not be accessed during the performance of the ticket issuer process 4505.

The ticket issuer process 4505 is effective only when employed with a corresponding ticket issuing system 107, and can not communicate directly with another ticket issuing system.

The payment card issuer process 4506 will now be described.

The payment card issuer process is a process for controlling communication with the payment card issuing system 108, for verifying a payment card issuer, for encrypting data to be transmitted to the payment card issuing system 108, for decrypting data received from the payment card issuing system 108, and for examining the validity of the data received from the payment card issuing system 108.

The payment card issuer process 4506 is generated by the service manager processor 4500 when the service providing system 110 communicates with the payment card issuing system 108. One payment card issuer process 4506 is generated to control communication across one communication line between the service providing system 110 and the payment card issuing system 108. The digital communication line 133 linking the service providing system 110 and the payment card issuing system 108 is multiplexed so that it can serve as a plurality of communication lines. To perform communication between the service providing system 110 and the payment card issuing system 108 across a plurality of communication lines during the same period, the service manager process 4500 generates multiple payment card issuer processes 4506 that are equivalent in number to the communication lines.

In the payment card issuer process 4506, permission is provided only for the accessing of the attribute information and payment card issuance history information by the payment card issuer in the area wherein is installed the payment card issuing system 108 that is managed by the payment card issuer information server 906. In other words, other information can not be accessed during the performance of the payment card issuer process 4506.

The payment card issuer process 4506 is effective only when employed with a corresponding payment card issuing system 108, and can not communicate directly with another payment card issuing system.

The telephone card issuer process 4507 will now be described.

The telephone card issuer process is a process for controlling communication with the telephone card issuing system 109, for verifying a telephone card issuer, for encrypting data to be transmitted to the telephone card issuing system 109, for decrypting data received from the telephone card issuing system 109, and for examining the validity of the data received from the telephone card issuing system 109.

The telephone card issuer process 4507 is generated by the service manager processor 4500 when the service providing system 110 communicates with the telephone card issuing system 109. One telephone card issuer process 4507 is generated to control communication across one communication line between the service providing system 110 and the telephone card issuing system 109. The digital communication line 134 linking the service providing system 110 and the telephone card issuing system 109 is multiplexed to serve as a plurality of communication lines. To perform communication between the service providing system 110 and the telephone card issuing system 109 across a plurality of communication lines during the same period, the service manager process 4500 generates multiple telephone card issuer processes 4507 that are equivalent in number to the communication lines.

In the telephone card issuer process 4507, permission is provided only for the accessing of the attribute information and the telephone card issuance history information for the telephone card issuer in the area wherein is installed the telephone card issuing system 109 that is managed by the telephone card issuer information server 907. In other words, other information can not be accessed during the performance of the telephone card issuer process 4507. The telephone card issuer process 4507 is effective only when employed with a corresponding telephone card issuing system 109, and can not communicate directly with another telephone card issuing system.

The service director process 4501 will now be described.

The service director process is a process for communicating with the user process, the merchant process and the transaction processor process that belong to the same group, and for producing the mobile electronic commerce service. The expression "producing the mobile electronic commerce service" means that the service director process cooperates with the other member processes in the same process group, and takes the initiative in performing the processing for the mobile electronic commerce service.

The service director processor 4501 is generated by the service manager process 4500 when the service providing system 110 performs various processes for a mobile electronic commerce service. A specified processing sequence is employed for the individual processes for performing the mobile electronic commerce service. In accordance with the processing sequence, a message received by the performance of a member process in the same group is handled, and a message requesting a process to be performed is transmitted to each member process. Upon receiving the message via the service director process 4501, a member process performs a corresponding process. Since the service director process cooperates with the other member processes in the same group, the processing for the electronic mobile commerce service can be performed.

To purchase an electronic ticket, the service director process, the user process, the ticket issuer process and the transaction processor process are assembled into one process group. To purchase an electronic payment card, the service director process, the user process, the payment card issuer process and the transaction processor process are assembled into one process group. And to purchase an electronic telephone card, the service director process, the user process, the telephone card issuer process and the transaction processor process are assembled into one process group.

In the service director process 4501, permission is provided only for the accessing of the information that is managed by the service director information server 901, and information that a member process in the same group is permitted to access. In other words, other information can not be accessed during the performance of the service director process 4501.

The service manager process 4500 will now be described.

The service manager process is a process for generating or deleting the user process 4502, the merchant process 4503, the transaction processor process 4504, the ticket issuer process 4505, the payment card issuer process 4505, the telephone card issuer process 4505 and the service director process 4501, and for generating or deleting a process group.

The service manager process 4500 is always activated when the service providing system provides the mobile electronic commerce service. The generation and deletion of the service manager process is controlled by the management system 407.

In the service manager process 4500, permission is provided only for the accessing of information that is managed by the service director information server 901.

In other words, other information can not be accessed during the performance of the service manager process 4500.

The information stored in the user information server 902 of the service providing system 110 will now be explained.

The user information server 902 manages the user attribute information and the data in the RAM 1502 of the mobile user terminal 100.

Figure 46:
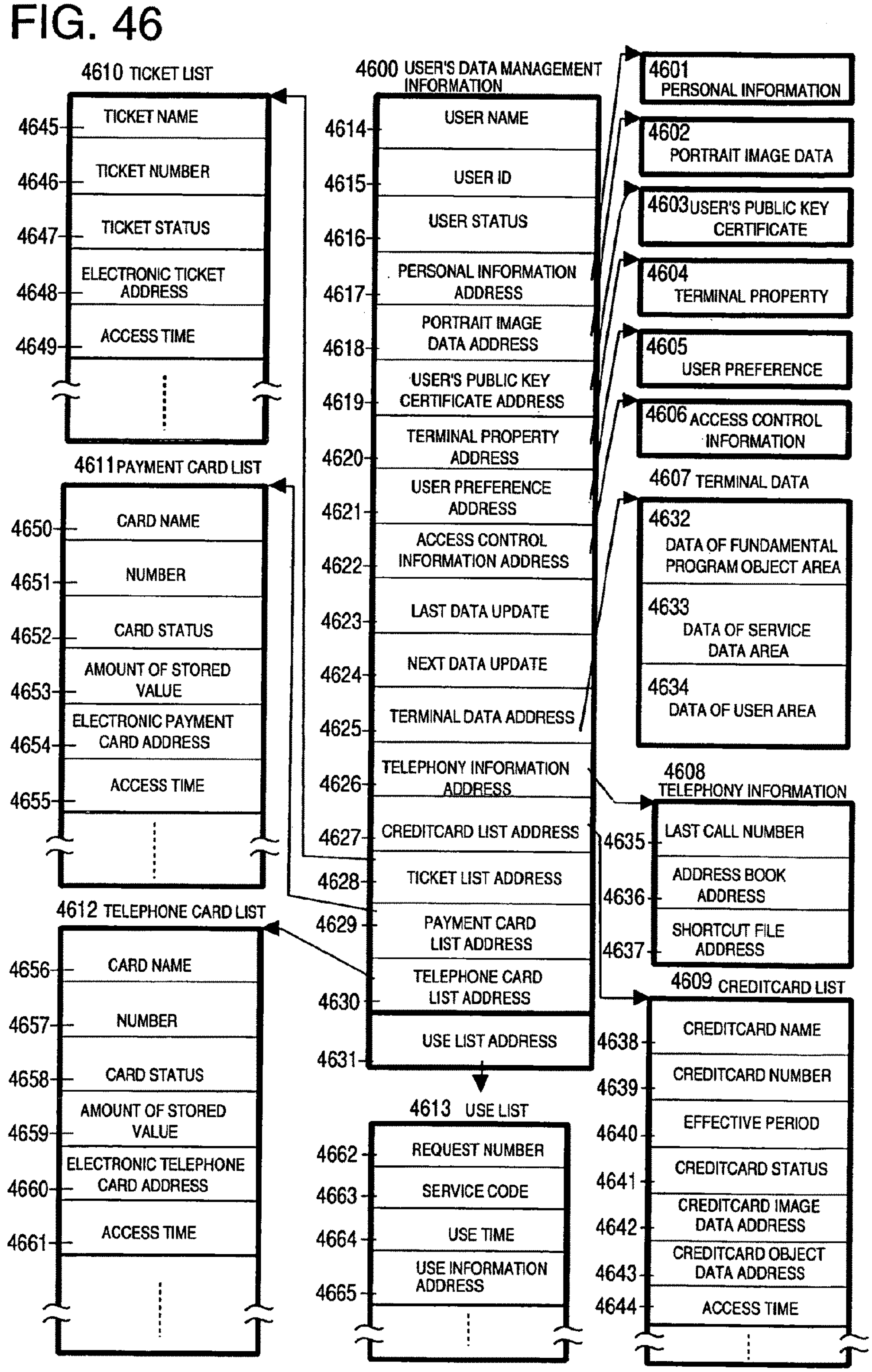
FIG. 46 is a specific diagram showing data that are stored for each user in the user information server of the service system according to the embodiment of the present invention.

FIG. 46 is a specific diagram showing information stored for each user in the user information server 902.

The user information server 902 stores 14 types of information for each user: user data management information 4600, personal information 4601, portrait image data 4602, a user public key certificate 4603, a terminal property 4604, user preference 4605, access control information 4606, terminal data 4607, telephony information 4608, a credit card list 4609, a ticket list 4610, a payment card list 4611, a telephone card list 4612, and a use list 4613.

The user data management information 4600 is management information for data to be stored for each user in the user information server 902.

The personal information 4601 is information concerning a user, such as the age, the date of birth, the occupation, the account number and the terms of a contract, and one part of this information corresponds to the personal information 1706 of the mobile user terminal 100.

The portrait image data 4602 are data for the portrait of a user; the user public key certificate 4603 is a certificate for the public key of a user; and the terminal property 4604 is attribute information for the mobile user terminal 100, such as the model number of the mobile user terminal 100, the serial number, the memory capacity of a RAM and the version of a stored program.

The user preference 4605 is preference information concerning the mobile electronic commerce service, and corresponds to the user preference 1709 in the mobile user terminal 100.

The access control information 4606 is information set by the user concerning the access control for user information and associated information; the terminal data 4607 are data in the RAM 1502 in the mobile user terminal 100; the telephony information 4608 is information concerning a digital wireless telephone, and corresponds to the telephony information 1710 of the mobile user terminal 100.

The credit card list 4609 is list information for credit cards registered by a user; the ticket list 4610 is list information for electronic tickets owned by a user; the payment card list 4611 is list information for payment cards owned by a user; the telephone card list 4612 is list information for electronic telephone cards owned by a user; and the use list 4613 is use history information for the mobile electronic commerce service.

The user data management information 4600 consists of 18 types of information: a user name 4614, a user ID 4615, a user status 4616, a personal information address 4617, a portrait image data address 4618, a user public key certificate address 4619, a terminal property address 4620, a user preference address 4621, an access control information address 4622, a last update date 4623, a next update date 4624, a terminal data address 4625, a telephony information address 4626, a credit card list address 4627, a ticket list address 4628, a payment card list address 4629, a telephone card list address 4630, and a use list address 4631.

The user status 4616 indicates the status of the mobile user terminal 100, and corresponds to the terminal status 1802 of the mobile user terminal 100. The last update date 4623 provides the last date on which the data in the service data area 1701 of the mobile user terminal 100 were updated; and the next update date 4624 provides the date on which the data in the service data area 1701 will be updated next. These dates correspond to the last update date 1800 and the next update date 1801 of the mobile user terminal 100.

The personal information address 4617, the portrait image data address 4618, the user public key certificate address 4619, the terminal property address 4620, the user preference address 4621, the access control information address 4622, the terminal data address 4625, the telephony information address 4626, the credit card list address 4627, the ticket list address 4628, the payment card list address 4629, the telephone card list address 4630, and the use list address 4631 describe addresses in the user information server 902 at which are respectively stored the personal information 4601, the portrait image data 4602, the user public key certificate 4603, the terminal property 4604, the user preference 4605, the access control information 4605, the terminal data 4607, the telephony information 4608, the credit card list 4609, the ticket list 4610, the payment card list 4611, the telephone card list 4612, and the use list 4613.

The terminal data 4607 are data stored in the RAM 1502 of the mobile user terminal 100 when the updating process was previously performed, and are used for data comparison during the next data updating process and are also employed as backup data.

The credit card list 4609, the ticket list 4610, the payment card list 4611, the telephone card list 4612 and the use list 4613 correspond to the credit card list 1711, the ticket list 1712, the payment card list 1713, the telephone card list 1714 and the use list 1715 of the mobile user terminal 100. An object data address 4623, an electronic ticket address 4648, an electronic payment card address 4654, an electronic telephone card address 4660 and a user information address 4665 are addresses in the user information server 902.

The information stored in the merchant information server 903 of the service providing system 110 will now be explained.

The merchant information server 903 manages attribute information for a merchant or a communication service provider, and data stored in the RAMs and on the hard disks of the gate terminal 101, the merchant terminal 102, the merchant terminal 103, the automatic vending machine 104 (accounting machine 3455) and the switching center 105 (electronic telephone card accounting machine 800).

Figure 47:
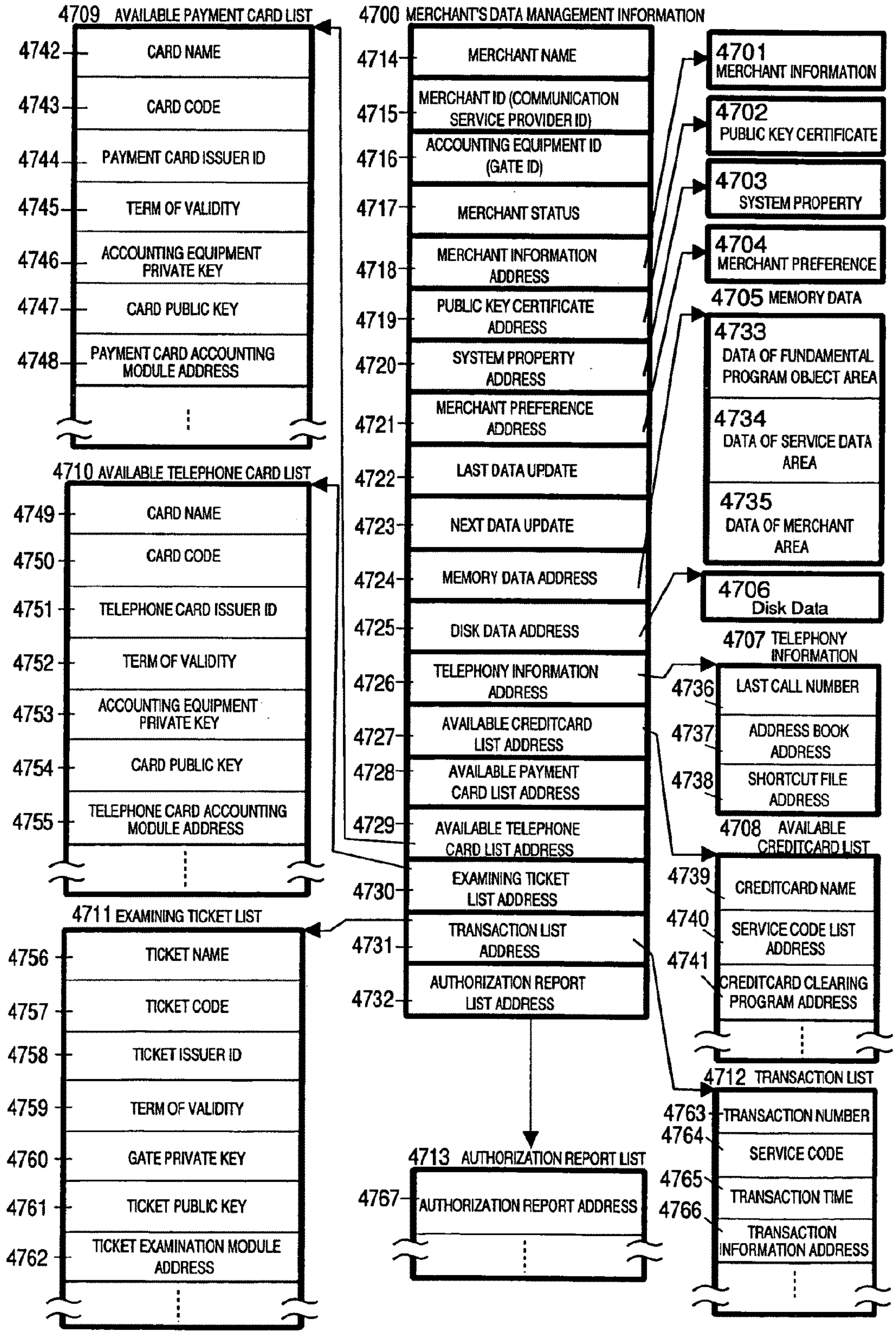
FIG. 47 is a specific diagram showing data that are stored in the merchant information server of the service system for one gate terminal, merchant terminals 102 and 103, the accounting device, and the electronic telephone card accounting device.

FIG. 47 is a specific diagram showing information stored for each merchant in the merchant information server 903.

For each gate terminal 101, each merchant terminal 102, each merchant terminal 103, each automatic vending machine 104 (accounting machine 3455) or each switching center 105 (electronic telephone card accounting machine 800), the merchant information server 903 stores 14 types of information: merchant data management information 4700, merchant information 4701, a public key certificate 4702, a system property 4703, merchant preference 4704, memory data 4705, disk data 4706, telephony information 4707, an available credit card list 4708, an available payment card list 4709, an available telephone card list 4710, a ticket list 4711, a transaction list 4712, and an authorization report list 4713.

The merchant data management information 4700 is management information for data to be stored in the merchant information server 903 for each gate terminal 101, each merchant terminal 102, each merchant terminal 103, each automatic vending machine 104 (accounting machine 3455) or each switching center 105 (electronic telephone card accounting machine 800).

The merchant information 4701 is information concerning a merchant or a communication service provider, such as an address, an account number and the terms of a contract, and one part of this information corresponds to the merchant information in the gate terminal 101, the merchant terminal 102, the merchant terminal 103 or the automatic vending machine 104 (accounting machine 3455), or the communication service provider information 4005 in the switching center 105 (electronic telephone accounting machine 800).

The public key certificate 4702 is a certificate for the public key of the merchant or the communication service provider; and the system property 4703 is attribute information for the gate terminal 101, the merchant terminal 102, the merchant terminal 103 or the automatic vending machine 104 (accounting machine 3455), or the switching center 105 (electronic telephone accounting machine 800), such as a model number, a serial number, the memory capacity of a RAM, the memory capacity of a hard disk, and the version of a stored program.

The merchant preference 4704 is preference information concerning a merchant or a communication service provider for the mobile electronic commerce service, and corresponds to the merchant preference in the gate terminal 101, the merchant terminal 102, the merchant terminal 103 or the automatic vending machine 104 (accounting machine 3455), or the communication service provider information 3906 in the switching center 105 (electronic telephone accounting machine 800).

The memory data 4705 are data in the RAM of the gate terminal 101, the merchant terminal 102, the merchant terminal 103, the automatic vending machine 104 (accounting machine 3455) or the switching center 105 (electronic telephone accounting machine 800), or data on a hard disk in the merchant terminal 102 or the switching center 105 (electronic telephone card accounting device 800).

The telephony information 4707 is information concerning a digital telephone and a digital wireless telephone, and corresponds to the telephony information 2808 of the merchant terminal 102 or the telephony information 3208 of the merchant terminal 103.

The available credit card list 4708 is list information for those credit cards the merchant can handle; the available payment card list 4709 is list information for those payment cards the merchant can handle; the available telephone card list 4710 is list information for those telephone cards the merchant can handle; and the ticket list 4711 is list information for those electronic tickets the merchant sets up as tickets to be examined.

The transaction list 4712 is history information for the mobile electronic commerce service. The authorization report list 4713 is a list of authorizations for the electronic payment card, the electronic telephone card and the electronic ticket.

The merchant data management information 4700 consists of 19 types of information: a merchant name (or communication service provider name) 4714, a merchant ID (communication service provider ID) 4715, an accounting machine ID (gate ID) 4716, a merchant status 4717, a merchant information address 4718, a merchant public key certificate address 4719, a system property address 4720, a merchant preference address 4721, a last update date 4722, a next update date 4723, a memory data address 4724, a disk data address 4725, a telephony information address 4726, an available credit card list address 4727, an available payment card address 4728, an available telephone card address 4729, a ticket list address 4730, a transaction list address 4731, and an authorization report list address 4732.

The merchant status 4717 indicates the status of the gate terminal 101, the merchant terminal 102, the merchant terminal 103, the automatic vending machine 104 (accounting machine 3455) or the switching center 105 (electronic telephone accounting machine 800), and corresponds to the terminal status of the gate terminal 101, the merchant terminal 102 or the merchant terminal 103, or the accounting machine status of the automatic vending machine 104 (accounting machine 3455) or the switching center 105 (electronic telephone card accounting machine 800).

The last update date 4722 provides the last date on which the data in the service data area were updated; and the next update date 4723 provides the date on which the data in the service data area will be updated next. These dates correspond to the last update date and the next update date of the gate terminal 101, the merchant terminal 102, the merchant terminal 103, the automatic vending machine 104 (accounting machine 3455) or the switching center 105 (electronic telephone accounting machine 800).

The merchant information address 4718, the public key certificate address 4719, the system property address 4720, the merchant preference address 4721, the memory data address 4724, the telephony information address 4726, the available credit card list address 4727, the available payment card list address 4728, the available telephone card list address 4729, the ticket list address 4730, the transaction list address 4731 and the authorization report list address 4732 indicate addresses in the merchant information server 903 at which are stored respectively the merchant information 4701, the public key certificate 4702, the system property 4703, the merchant preference 4704, the memory data 4705, the disk data 4706, the telephony information 4707, the credit card list 4708, the payment card list 4709, the telephone card list 4710, the ticket list 4711, the transaction list 4712 and the authorization report list 4713.

The available credit card list 4708, the available payment card list 4709, the available telephone card list 4710, the ticket list 4711, the transaction list 4712 and the authorization report list 4713 correspond to the credit card list, the payment card list, the telephone card list 3908, the ticket list 2409, the transaction list and the authorization report list of the gate terminal 101, the merchant terminal 102, the merchant terminal 103, the automatic vending machine 104 (accounting machine 3455) or the switching center 105 (electronic telephone accounting machine 800). The service code list address, the credit card clearing program address, the payment card clearing module address, the telephone card clearing program address, the ticket examination module address, the transaction information address and the authorization report address indicate those in the merchant information server 903.

The information stored in the transaction processor information server 904 of the service providing system 110 will now be explained.

The transaction processor information server 904 manages attribute information for the transaction processor and the transaction history information.

Figure 48:
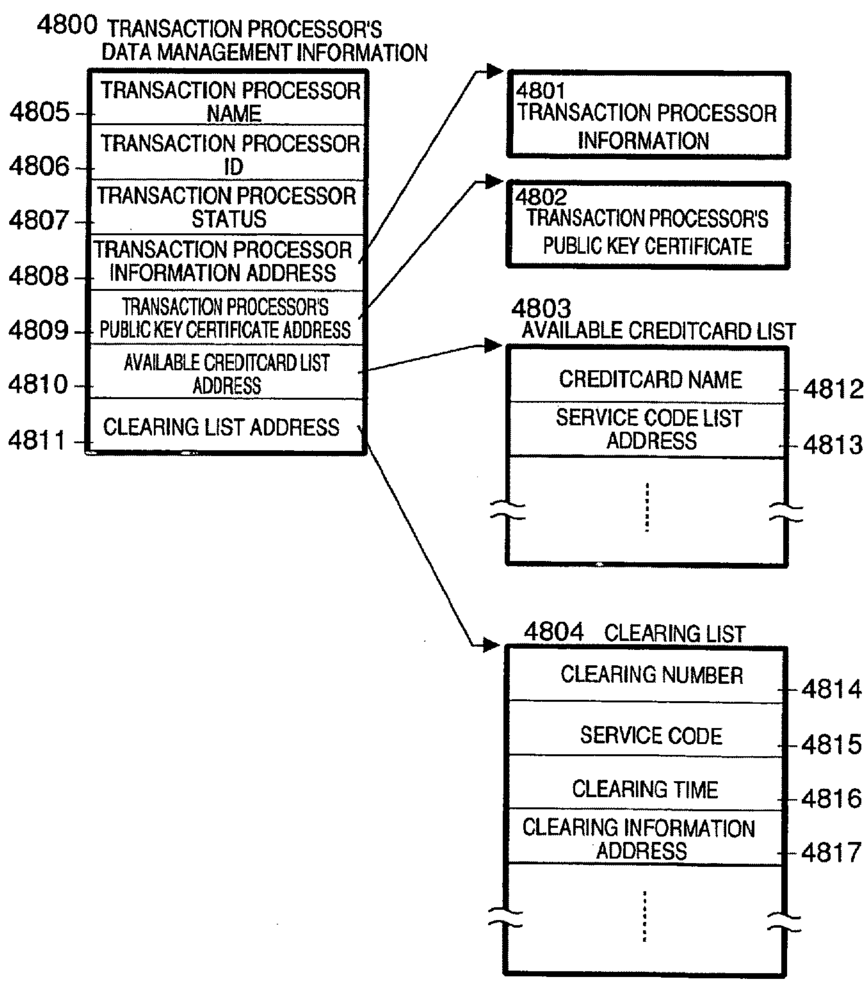
FIG. 48 is a specific diagram showing data, for each transaction processor, that are stored in the transaction processor information server of the service system according to the embodiment of the present invention.

FIG. 48 is a specific diagram showing information stored for each transaction processor in the transaction processor information server 904.

The transaction processor information server 904 stores five types of information for each transaction processor: transaction processor data management information 4800, transaction processor information 4801, a transaction processor public key certificate 4802, an available credit card list 4803 and a clearing list 4804.

The transaction processor data management information 4800 is management information for data to be stored for each transaction processor in the transaction processor information server 904. The transaction processor information 4801 is information concerning a transaction processor, such as an address, an account number and the terms of a contract; the transaction processor public key certificate 4802 is a certificate for the public key of the transaction processor; the available credit card list 4803 is list information for credit cards the transaction processor can handle; and the clearing list 4804 is clearing history information for the mobile electronic commerce service.

The transaction processor data management information 4800 consists of seven types of information: a transaction processor name 4805, a transaction processor ID 4806, a transaction processor status 4807, a transaction processor information address 4808, a transaction processor public key certificate address 4809, an available credit card list address 4811 and a clearing list address 4811.

The transaction processor status 4807 provides the service status in the settlement process of the transaction processing system 106. The transaction processor information address 4808, the transaction processor public key certificate address 4809, the available credit card list address 4810 and the clearing list address 4811 provide the addresses in the transaction processor information server 904 at which respectively are stored the transaction processor information 4801, the transaction processor public key certificate 4802, the credit card list 4803 and the clearing list 4804.

In the available credit card list 3102, two types of information are entered for each credit card: a credit card name 4812 and a service code list address 4813.

The credit card name 4812 represents the name of a credit card that the transaction processor can handle, and the service code list address 4813 is an address of the transaction processor information server 904 at which is stored a service code list that shows the types of services that can be provided by the transaction processor when the credit card is used.

In the clearing list 4803, four types of information are stored for clearing one credit transaction service: a clearing number 4814, a service code 4815, a clearing time 4816, and a clearing information address 4817.

The clearing number 4814 uniquely represents the credit card clearing process, and the service code 4815 is a code number that describes the type of credit card service that is provided for the user. The clearing time 4816 is the time at which the credit transaction service is cleared, and the clearing information address 4817 is an address of the transaction processor information server 904 at which is stored a clearing completion notification issued by the transaction processing system 106.

The information stored in the ticket issuer information server 905 of the service providing system 110 will now be explained.

The ticket issuer information server 905 manages the attribute information for the ticket issuer and the ticket issuing history information.

Figure 49:
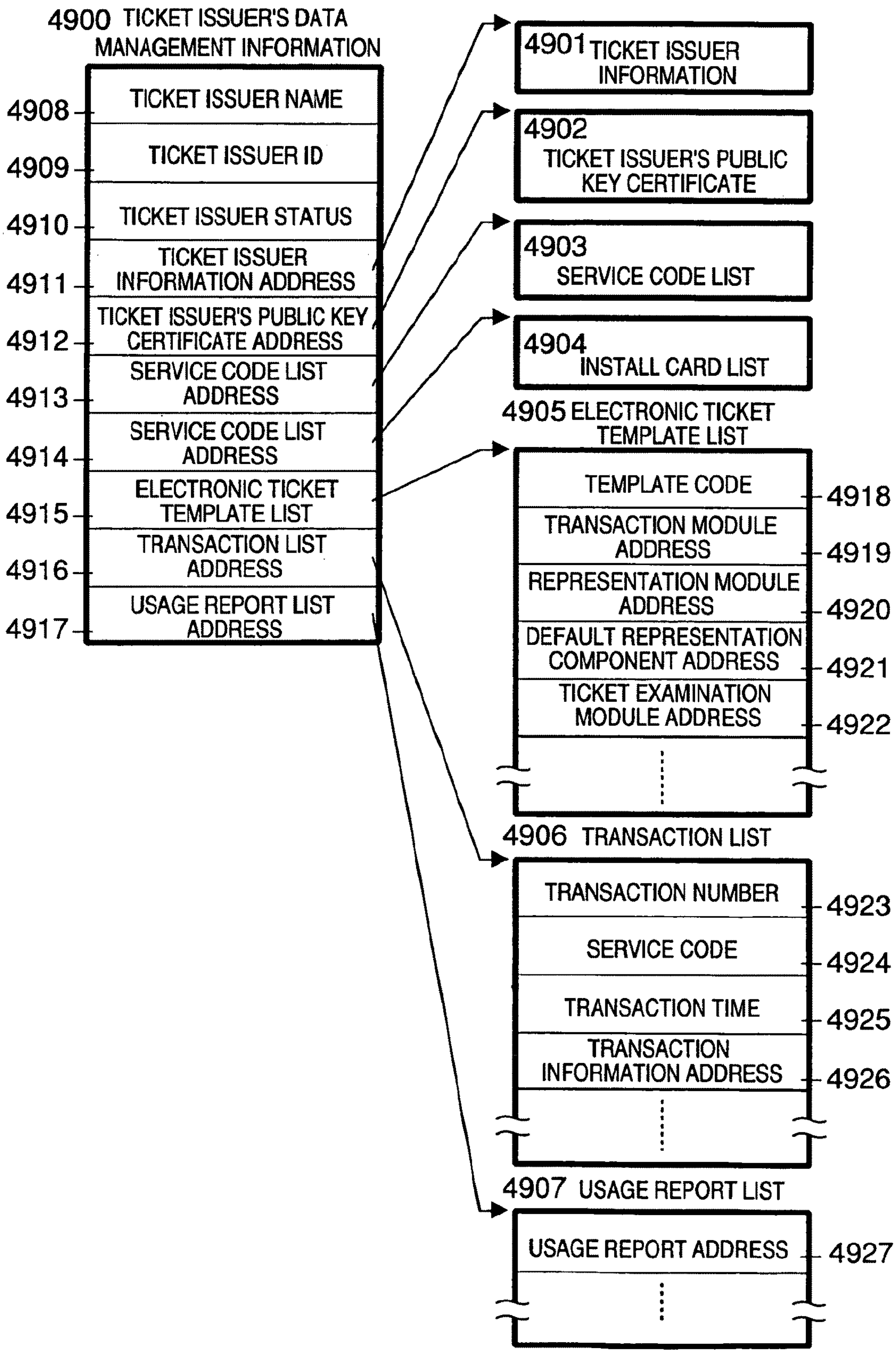
FIG. 49 is a specific diagram showing data, for each ticket issuer, that are stored in the ticket issuer information server of the service system according to the embodiment of the present invention.

FIG. 49 is a specific diagram showing information stored in the ticket issuer information server 905 for each ticket issuer.

The ticket issuer information server 905 stores eight types of information for each ticket issuer: ticket issuer data management information 4900, ticket issuer information 4901, a ticket issuer public key certificate 4902, a service code list 4903, an installation card list 4904, an electronic ticket template list 4905, a transaction list 4906, and a usage report list 4907.

The ticket issuer data management information 4900 is management information for data for each ticket issuer that is to be stored in the ticket issuer information server 905; the ticket issuer information 4901 is information concerning a ticket issuer, such as an address, an account number and the terms of a contract; the ticket issuer public key certificate 4902 is a certificate for the public key belonging to a ticket issuer; the service code list 4903 is a list of service codes indicating the type of service provided by a ticket issuer; the installation card list 4904 is list information for the installation card numbers of electronic ticket installation cards issued by a ticket issuer; the electronic ticket template list 4905 is management information for a template program for an electronic ticket that corresponds to a ticket issued by a ticket issuer; the transaction list 4906 is ticket issuing history information for a ticket issuer; and the usage report list 4907 is management information for a usage report that the service providing system 110 issued the ticket issuing system 107.

The ticket issuer data management information 4900 consists of ten types of information: a ticket issuer processor name 4908, a ticket issuer ID 4909, a ticket issuer status 4910, a ticket issuer information address 4911, a ticket issuer public key certificate address 4912, a service code list address 4913, an installation card list address 4914, an electronic ticket template list address 4915, a transaction list address 4916 and a usage report list address 4917.

The ticket issuer status 4910 specifies the service status in the settlement process of the ticket issuing system 107. The ticket issuer information address 4911, the ticket issuer public key certificate address 4912, the service code list address 4913, the installation card list address 4914, the electronic ticket template list address 4915, the transaction list address 4916 and the usage report list address 4917 represent addresses in the ticket issuer information server 905 at which respectively are stored the ticket issuer information 4901, the ticket issuer public key certificate 4902, the service code list 4903, the installation card list 4904, the electronic ticket template list 4905, the transaction list 4906 or the usage report list 4907.

The electronic ticket template program is a model for an electronic ticket issued by the service providing system, and is registered in advance in the ticket issuer information server 905 in accordance with the contract entered into by the ticket issuer and the service provider. To issue an electronic ticket, the service providing system employs the template program designated by the ticket issuing system to generate an electronic ticket, and transmits the ticket to the mobile user terminal.

The electronic template list 4905 includes five information items for one type of electronic ticket template program: a template code 4918, a transaction module address 4919, a representation module address 4920, a default representative component address 4921, and a ticket examination module address 4922.

The template code 4918 is code information describing the type of electronic ticket template program. The transaction module address 4919 is an address in the ticket issuer information server 905 at which is stored a program module that is the transaction module 1930 for an electronic ticket that is generated. The representation module address 4920 is an address in the ticket issuer information server 905 at which is stored a program module that is the representation module 1931 for an electronic ticket that is generated. The default representative component address 4921 is an address in the ticket issuer information server 905 at which default information is stored. The ticket examination module address 4922 is an address in the ticket issuer information server 905 at which is stored a ticket examination module for examining an electronic ticket that is generated. And the ticket examination module is a program module that corresponds to the transaction module.

The electronic ticket issuing commission 4903, which is a message by which the ticket issuing system requests that the service providing system request the issuance of an electronic ticket, includes not only ticket information, such as the date of an event and a seat number, but also a template code that specifies a template program and representative component information. The service providing system generates an electronic ticket using the transaction module and the representation module specified by the template code, and the representative component information that is included in the electronic ticket issuing commission.

Before the template program is registered in the ticket issuer information server 905, the operation and the safety of the mobile electronic commerce system are confirmed. Since several template programs are stored in advance, the ticket issuer can safely issue a ticket that performs various operations, as well as tickets of various designs. The procedures for issuing an electronic ticket will be described in detail later.

The transaction list 4906 includes four types of information for one ticket order or one ticket purchase: a transaction number 4923, a service code 4924, a transaction time 4925, and a transaction information address 4926.

The transaction number 4923 uniquely represents the ticket order process and the ticket purchase process; the service code 4924 represents the type of service provided by the ticket issuing system; the transaction time 4925 represents the time at which the ticket order process or the ticket purchase process was performed; and the transaction information address 4926 is an address in the ticket issuer information server 905 at which is stored a ticket order response or a receipt that was issued by the ticket issuing system 107.

The usage report list 4907 is management information for the usage report 7100 that the service providing system 110 issued to the ticket issuing system 107, and comprises a list of the usage report addresses 4927 that are located in the ticket issuer information server 905 in which the usage reports are stored.

The information stored in the payment card information server 905 of the service providing system 110 will now be explained.

The transaction processor information server 904 manages attribute information for the transaction processor and the transaction history information.

The information stored in the payment card issuer information server 906 of the service providing system 110 will now be explained.

The payment card issuer information server 906 manages the attribute information for the payment card issuer and the payment card issuing history information.

Figure 50:
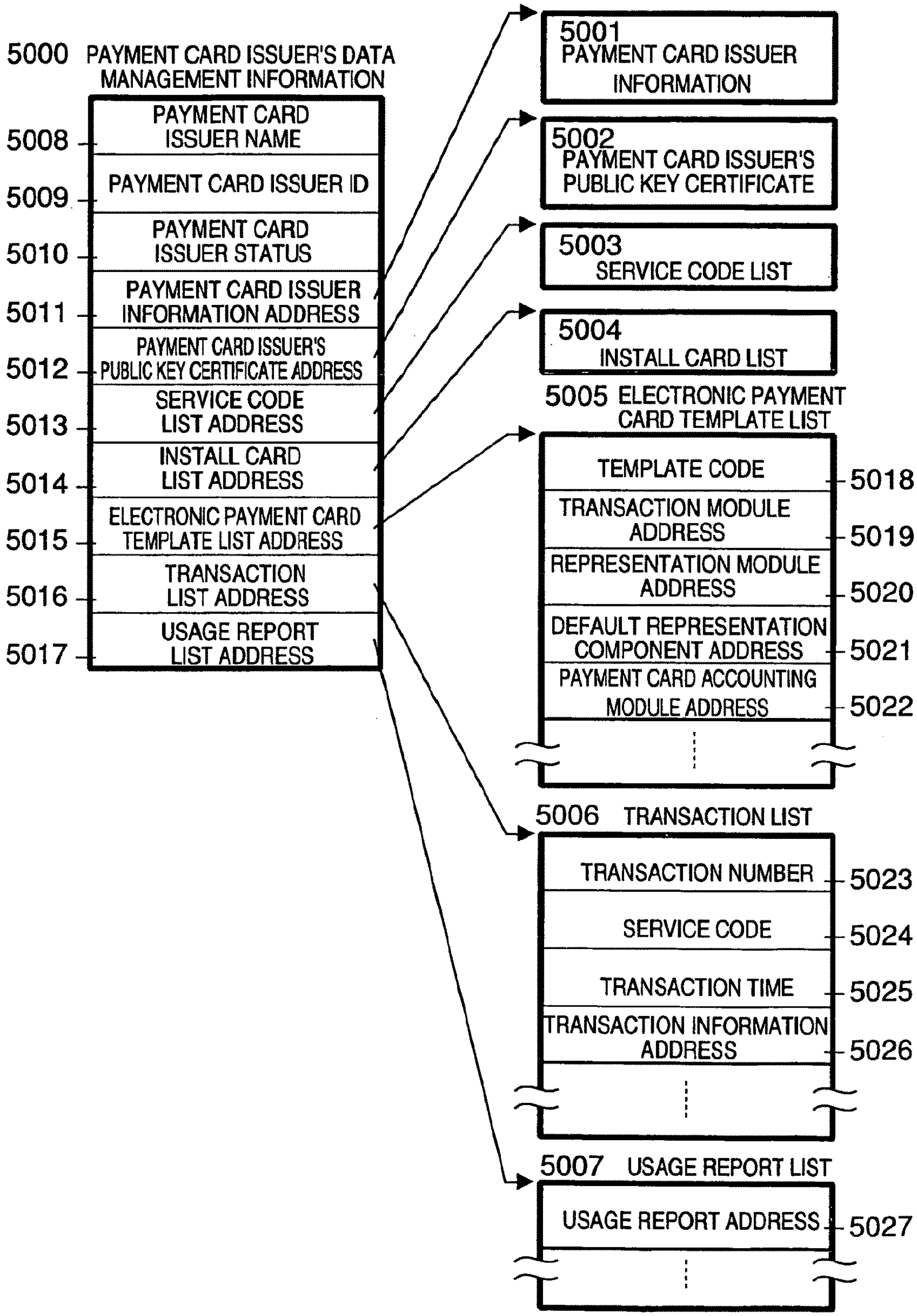
FIG. 50 is a specific diagram showing data, for each payment card issuer, that are stored in the payment card issuer information server of the service system according to the embodiment of the present invention.

FIG. 50 is a specific diagram showing information stored in the payment card issuer information server 906 for each payment card issuer.

The payment card issuer information server 906 stores eight types of information for each payment card issuer: payment card issuer data management information 5000, payment card issuer information 5001, a payment card issuer public key certificate 5002, a service code list 5003, an installation card list 5004, an electronic payment card template list 5005, a transaction list 5006, and a usage report list 5007.

The payment card issuer data management information 5000 is management information for data for each payment card issuer that is to be stored in the payment card issuer information server 906; the payment card issuer information 5001 is information concerning a payment card issuer, such as an address, an account number and the terms of a contract; the payment card issuer public key certificate 5002 is a certificate for the public key belonging to a payment card issuer; the service code list 5003 is a list of service codes indicating the type of service provided by a payment card issuer; the installation card list 5004 is list information for the installation card numbers of electronic payment card installation cards issued by a payment card issuer; the electronic payment card template list 5005 is management information for a template program for an electronic payment card that corresponds to a payment card issued by a payment card issuer; the transaction list 5006 is payment card issuing history information for a payment card issuer; and the usage report list 5007 is management information for a usage report that the service providing system 110 issued the payment card issuing system 108.

The payment card issuer data management information 5000 consists of ten types of information: a payment card issuer processor name 5008, a payment card issuer ID 5009, a payment card issuer status 5010, a payment card issuer information address 5011, a payment card issuer public key certificate address 5012, a service code list address 5013, an installation card list address 5014, an electronic payment card template list address 5015, a transaction list address 5016 and a usage report list address 5017.

The payment card issuer status 5010 specifies the service status in the issuance process of the payment card issuing system 108. The payment card issuer information address 5011, the payment card issuer public key certificate address 5012, the service code list address 5013, the installation card list address 5014, the electronic payment card template list address 5015, the transaction list address 5016 and the usage report list address 5017 represent addresses in the payment card issuer information server 906 at which respectively are stored the payment card issuer information 5001, the payment card issuer public key certificate 5002, the service code list 5003, the installation card list 5004, the electronic payment card template list 5005, the transaction list 5006 or the usage report list 5007.

The electronic payment card template program is a model for an electronic payment card issued by the service providing system, and is registered in advance in the payment card issuer information server 906 in accordance with the contract entered into by the payment card issuer and the service provider. To issue an electronic payment card, the service providing system employs the template program designated by the payment card issuing system to generate an electronic payment card, and transmits the payment card to the mobile user terminal.

The electronic template list 5005 includes five information items for one type of electronic payment card template program: a template code 5018, a transaction module address 5019, a representation module address 5020, a default representative component address 5021, and a payment card clearing module address 5022.

The template code 5018 is code information describing the type of electronic payment card template program. The transaction module address 5019 is an address in the payment card issuer information server 906 at which is stored a program module that is the transaction module 2030 for an electronic payment card that is generated. The representation module address 5020 is an address in the payment card issuer information server 906 at which is stored a program module that is the representation module 2031 for an electronic payment card that is generated. The default representative component address 5021 is an address in the payment card issuer information server 906 at which default information is stored. The payment card clearing module address 5022 is an address in the payment card issuer information server 906 at which is stored a payment card clearing module for clearing an electronic payment card that is generated. And the payment card clearing module is a program module that corresponds to the transaction module.

The electronic payment card issuing commission 6203, which is a message by which the payment card issuing system requests that the service providing system request the issuance of an electronic payment card, includes not only payment card information, such as the face value of the payment card that is issued and the usage condition, but also a template code that specifies a template program and representative component information. The service providing system generates an electronic payment card using the transaction module and the representation module specified by the template code, and the representative component information that is included in the electronic payment card issuing commission.

Before the template program is registered in the payment card issuer information server 906, the operation and the safety of the mobile electronic commerce system are confirmed. Since several template programs are stored in advance, the payment card issuer can safely issue a payment card that performs various operations, as well as payment cards of various designs. The procedures for issuing an electronic payment card will be described in detail later.

The transaction list 5006 includes four types of information for one payment card issuance: a transaction number 5023, a service code 5024, a transaction time 5025, and a transaction information address 5026.

The transaction number 5023 uniquely represents the payment card issuance process; the service code 5024 represents the type of service provided by the payment card issuing system; the transaction time 5025 represents the time at which the payment card issuance process was performed; and the transaction information address 5026 is an address in the payment card issuer information server 906 at which is stored a receipt that was issued by the payment card issuing system 108.

The usage report list 5007 is management information for the usage report that the service providing system 110 issued to the payment card issuing system 108, and comprises a list of the usage report addresses 5027 that are located in the payment card issuer information server 906 in which the usage reports 5704 are stored.

The information stored in the telephone card issuer information server 907 of the service providing system 110 will now be explained.

Figure 51:
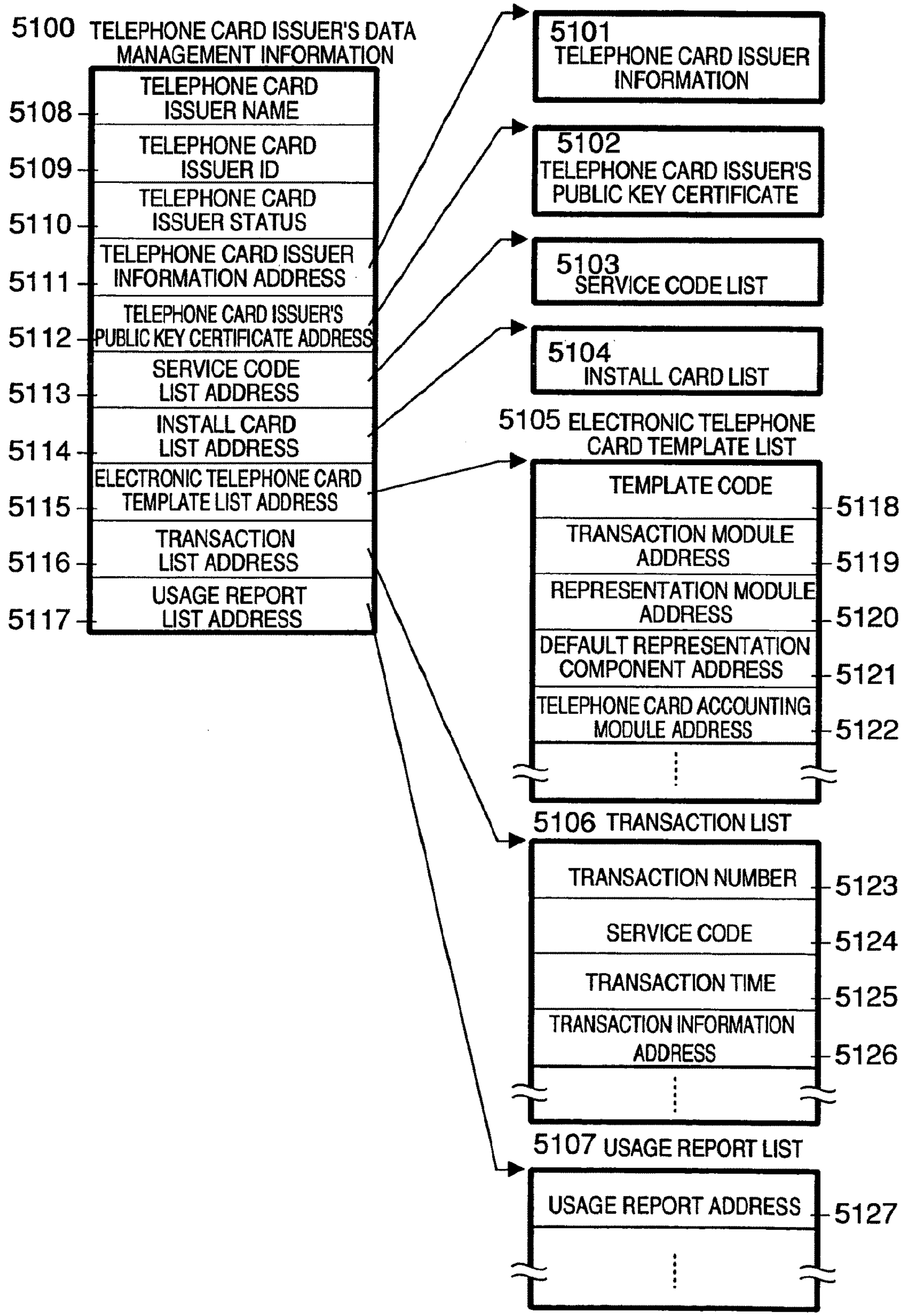
FIG. 51 is a specific diagram showing data, for each telephone card issuer, that are stored in the telephone card issuer information server of the service system according to the embodiment of the present invention.
Figure 52A:
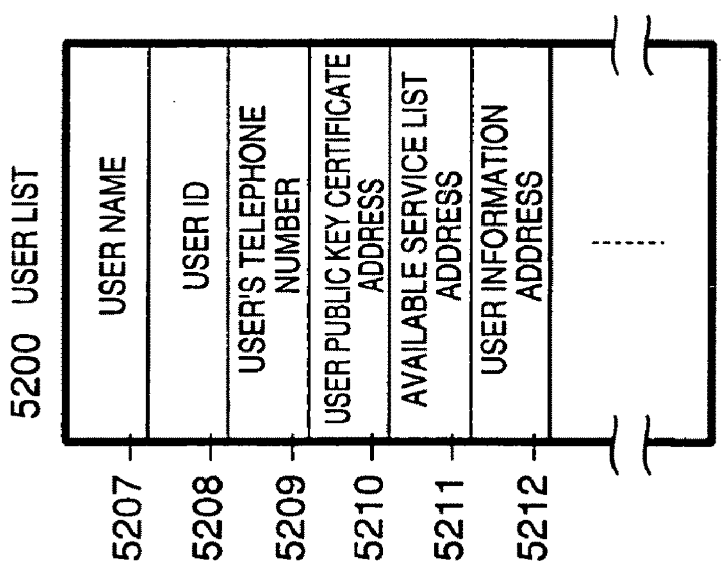
FIGS. 52A to 52G are specific diagrams showing a user list, a merchant list, a transaction processor list, a ticket issuer list, a payment card issuer list, a telephone card issuer list and a provided service list, all of which are stored in the service director information server of the service system according to the embodiment of the present invention.
Figure 52B:
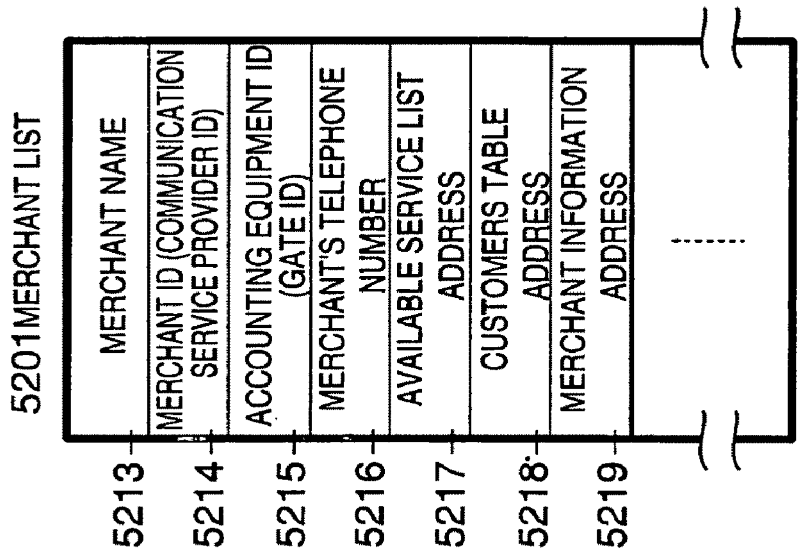
Figure 52C:
Figure 52D:
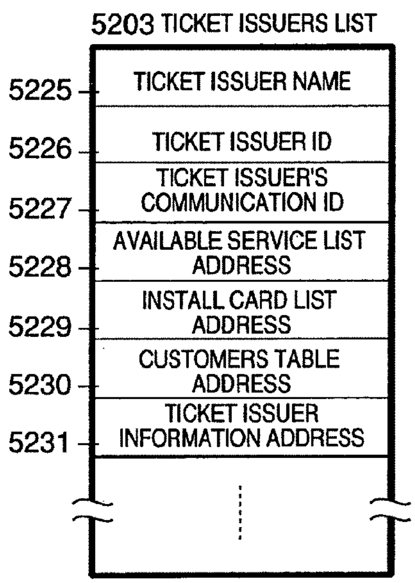
Figure 52E:
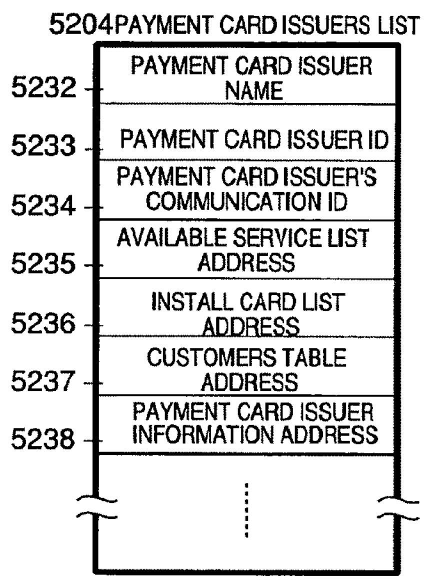
Figure 52F:
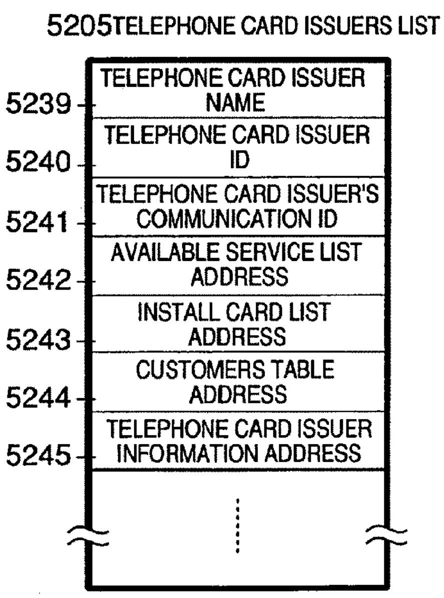
Figure 52G:
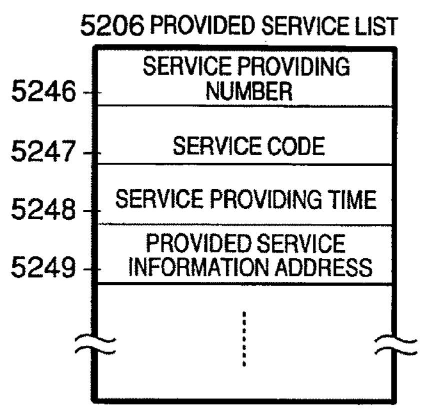

The telephone card issuer information server 907 manages the attribute information for the telephone card issuer and the telephone card issuing history information. FIG. 51 is a specific diagram showing information stored in the telephone card issuer information server 907 for each telephone card issuer.

The telephone card issuer information server 907 stores eight types of information for each telephone card issuer: telephone card issuer data management information 5100, telephone card issuer information 5101, a telephone card issuer public key certificate 5102, a service code list 5103, an installation card list 5104, an electronic telephone card template list 5105, a transaction list 5106, and a usage report list 5107.

The telephone card issuer data management information 5100 is management information for data for each telephone card issuer that is to be stored in the telephone card issuer information server 907; the telephone card issuer information 5101 is information concerning a telephone card issuer, such as an address, an account number and the terms of a contract; the payment card issuer public key certificate 5102 is a certificate for the public key belonging to a telephone card issuer; the service code list 5103 is a list of service codes indicating the type of service provided by a telephone card issuer; the installation card list 5104 is list information for the installation card numbers of electronic telephone card installation cards issued by a telephone card issuer; the electronic telephone card template list 5105 is management information for a template program for an electronic telephone card that corresponds to a telephone card issued by a telephone card issuer; the transaction list 5106 is telephone card issuing history information for a telephone card issuer; and the usage report list 5107 is management information for a usage report that the service providing system 110 issued the telephone card issuing system 109.

The telephone card issuer data management information 5100 consists of ten types of information: a telephone card issuer processor name 5108, a telephone card issuer ID 5109, a telephone card issuer status 5110, a telephone card issuer information address 5111, a telephone card issuer public key certificate address 5112, a service code list address 5113, an installation card list address 5114, an electronic telephone card template list address 5115, a transaction list address 5116 and a usage report list address 5117.

The telephone card issuer status 5110 specifies the service status in the issuance process of the telephone card issuing system 107. The telephone card issuer information address 5111, the telephone card issuer public key certificate address 5112, the service code list address 5113, the installation card list address 5114, the electronic telephone card template list address 5115, the transaction list address 5116 and the usage report list address 5117 represent addresses in the telephone card issuer information server 907 at which respectively are stored the telephone card issuer information 5101, the telephone card issuer public key certificate 5102, the service code list 5103, the installation card list 5104, the electronic telephone card template list 5105, the transaction list 5106 or the usage report list 5107.

The electronic telephone card template program is a model for an electronic telephone card issued by the service providing system, and is registered in advance in the telephone card issuer information server 907 in accordance with the contract entered into by the telephone card issuer and the service provider. To issue an electronic telephone card, the service providing system employs the template program designated by the telephone card issuing system to generate an electronic telephone card, and transmits the telephone card to the mobile user terminal.

The electronic template list 5105 includes five information items for one type of electronic telephone card template program: a template code 5118, a transaction module address 5119, a representation module address 5120, a default representative component address 5121, and a telephone card clearing module address 5122.

The template code 5118 is code information describing the type of electronic telephone card template program. The transaction module address 5119 is an address in the telephone card issuer information server 907 at which is stored a program module that is the transaction module 2030 for an electronic telephone card that is generated. The representation module address 5120 is an address in the telephone card issuer information server 907 at which is stored a program module that is the representation module 2031 for an electronic telephone card that is generated. The default representative component address 5121 is an address in the telephone card issuer information server 907 at which default information is stored. The telephone card clearing module address 5122 is an address in the telephone card issuer information server 907 at which is stored a telephone card clearing module for clearing an electronic telephone card that is generated. And the telephone card clearing module is a program module that corresponds to the transaction module.

The electronic telephone card issuing commission 6203, which is a message by which the telephone card issuing system requests that the service providing system request the issuance of an electronic telephone card, includes not only telephone card information, such as the face value of the telephone card that is issued and the usage condition, but also a template code that specifies a template program and representative component information. The service providing system generates an electronic telephone card using the transaction module and the representation module specified by the template code, and the representative component information that is included in the electronic telephone card issuing commission.

Before the template program is registered in the telephone card issuer information server 907, the operation and the safety of the mobile electronic commerce system are confirmed. Since several template programs are stored in advance, the telephone card issuer can safely issue a telephone card that performs various operations, as well as telephone cards of various designs. The procedures for issuing an electronic telephone card will be described in detail later.

The transaction list 5106 includes four types of information for one telephone card issuance: a transaction number 5123, a service code 5124, a transaction time 5125, and a transaction information address 5126.

The transaction number 5123 uniquely represents the telephone card issuance process; the service code 5124 represents the type of service provided by the telephone card issuing system; the transaction time 5125 represents the time at which the telephone card issuance process was performed; and the transaction information address 5126 is an address in the telephone card issuer information server 907 at which is stored a receipt that was issued by the telephone card issuing system 109.

The usage report list 5107 is management information for the usage report that the service providing system 110 issued to the telephone card issuing system 109, and comprises a list of the usage report addresses 5127 that are located in the telephone card issuer information server 907 in which the usage reports 5704 are stored.

The information stored in the service director information server 901 in the service providing system 110 will now be explained.

The service director information server 901 stores ten types of information: a user list 5200, a merchant list 5201, a transaction processors list 5202, a ticket issuers list 5203, a payment card issuers list 5204, a telephone card issuers list 5205, a provided service list 5206, electronic ticket management information 5300, electronic payment card management information 5400, and electronic telephone card management information 5500.

Figure 53:
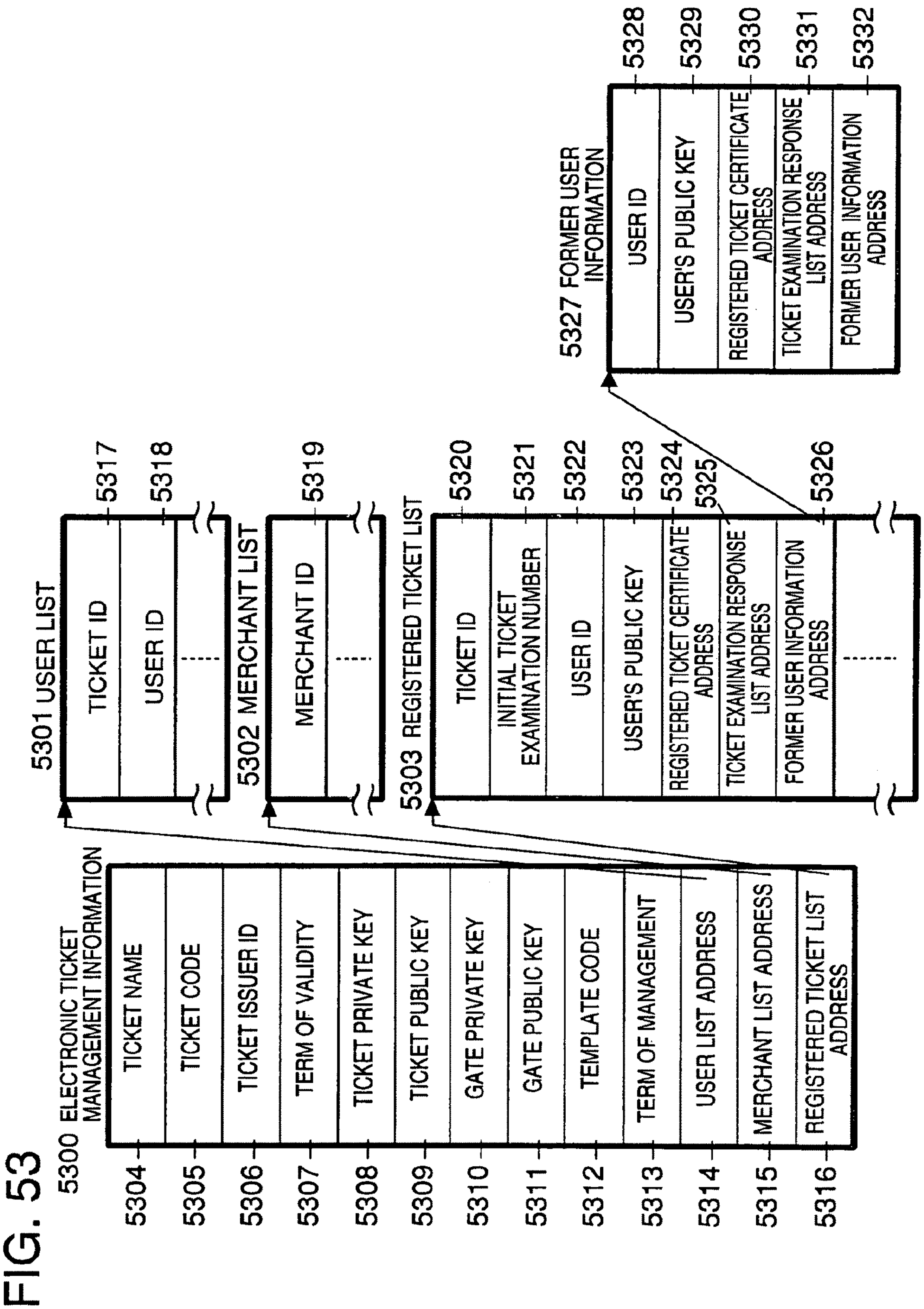
FIG. 53 is a specific diagram showing data, for each electronic ticket, that are stored in the service director information server of the service system according to the embodiment of the present invention.
Figure 54:
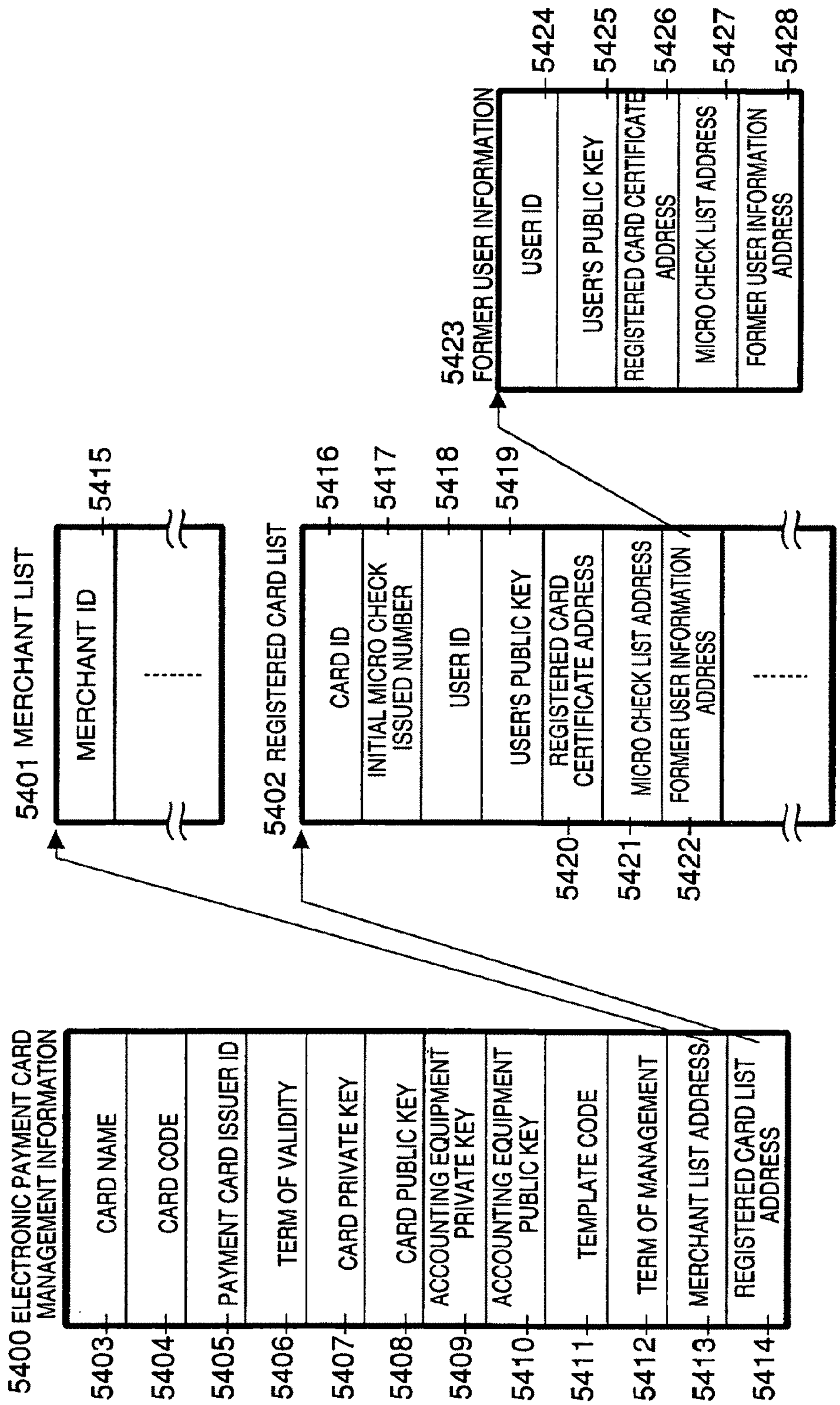
FIG. 54 is a specific diagram showing data, for each electronic payment card, that are stored in the service director information server of the service system according to the embodiment of the present invention.
Figure 55:
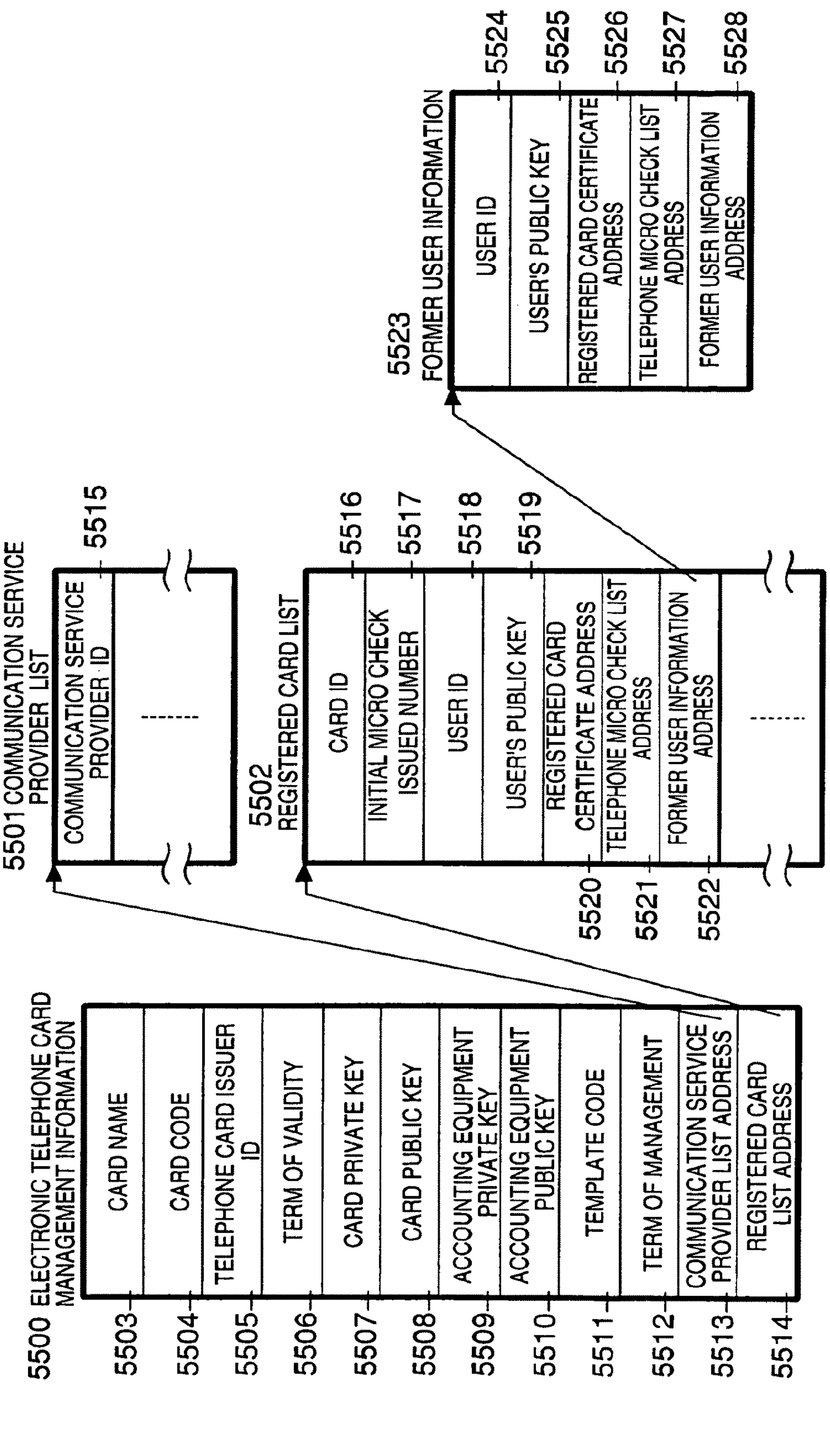
FIG. 55 is a specific diagram showing data, for each electronic telephone card, that are stored in the service director information server of the service system according to the embodiment of the present invention.

FIGS. 52A to 52G are specific diagrams showing the user list 5200, the merchant list 5201, the transaction processors list 5202, the ticket issuers list 5203, the payment card issuers list 5204, the telephone card issuers list 5205 and the provided service list 5206, all of which are in the service director information server 901. FIGS. 53 to 55 are specific diagrams respectively showing the electronic ticket management information 5300 stored for one type of electronic ticket, the electronic payment card management information 5400 stored for one type of electronic payment card, and the electronic telephone card management information 5500 stored for one type of electronic telephone card.

The user list 5200 is a list of attribute information for the mobile user terminals that have entered into contracts with a service provider; the merchant list 5201 is a list of attribution information for the gate terminals, the merchant terminals (102 or 103), the automatic vending machines (accounting machines) and the switching centers (electronic telephone card accounting machines) that have entered into contracts with the service provider; the transaction processors list 5202 is a list of the attribution information for all the transaction processors that have entered into contracts with the service provider; the ticket issuers list 5203 is a list of attribution information for all the ticket issuers who have entered into contracts with the service provider; the payment card issuers list 5204 is a list of attribution information for all the payment card issuers who have entered into contracts with the service provider; the telephone card issuers list 5205 is a list of attribution information for all the telephone card issuers who have entered into contracts with the service provider; the provided service list 5203 is a list of information for mobile electronic commerce service that has been provided by the service providing system 110; the electronic ticket management information 5300 is management information for a registered electronic ticket; the electronic payment card management information 5400 is management information for a registered electronic payment card; and the electronic telephone card management information 5500 is management information for a registered electronic telephone card.

In the user list 5200, six types of information are stored for each mobile user terminal: a user name 5207, a user ID 5208, a user telephone number 5209, a user public key certificate address 5210, an available service list address 5211, and a user information address 5212.

The user public key certificate address 5210 is an address at which a certificate for the public key of a user is stored; the available service list address 5211 is an address at which a list of service codes that the user can employ is stored; and the user information address 5212 is an address at which the user data management information 4600 for the pertinent user is stored.

In the merchant list 5201, seven types of information are stored for each gate terminal, each merchant terminal (102, 103), each automatic vending machine (accounting machine) or each switching center (electronic telephone card accounting machine): a merchant name (communication service provider name) 5213, a merchant ID (communication service provider ID) 5214, an accounting machine ID (gate ID) 5215, a merchant telephone number 5216, an available service list address 5217, a customers table address 5218, and a merchant information address 5219.

The available service list address 5217 is an address at which is stored a list of the service codes that the merchant or the service communication provider can handle. The customers table address 5218 is the address at which is stored table information (a customer table) that represents the correspondence credited to the customer number and the user ID. And the merchant information address 5219 is an address at which the merchant data management information 4700 for the pertinent merchant is stored.

In the transaction processors list 5202 five types of information are stored for each transaction processor: a transaction processor name 5220, a transaction processor ID 5221, a transaction processor communication ID 5222, an available service list address 5223, and a transaction processor information address 5224.

The transaction processor communication ID 5222 is an ID for the transaction processing system 106 used when the service providing system 110 communicates with the transaction processing system 106 via the digital communication line 131. The available service list address 5223 is an address at which is stored a list of service codes that the transaction processor can handle. And the transaction processor information address 5224 is an address in the transaction processor information server 904 at which is stored the transaction processor data management information 4800 for the pertinent transaction processor.

In the ticket issuers list 5203 seven types of information are stored for each ticket issuer: a ticket issuer name 5225, a ticket issuer ID 5226, a ticket issuer communication ID 5227, an available service list address 5228, an installation card list address 5229, a customers table address 5230, and a ticket issuer information address 5231.

The ticket issuer communication ID 5227 is an ID for the ticket issuing system 107 used when the service providing system 110 communicates with the ticket issuing system 107 via the digital communication line 132. The available service list address 5228 is an address at which is stored a list of service codes that the ticket issuer can handle. The installation card list address 5229 is an address in the service director information server 901 at which is stored a list of installation card numbers for electronic ticket installation cards that are issued by the ticket issuer. The customer table address 5230 is an address in the service director information server 901 at which is stored table information (a customer table) that represents the correspondence credited to the customer number and the user ID. And the ticket issuer information address 5231 is an address in the ticket issuer information server 905 at which is stored the ticket issuer data management information 4900 for the pertinent ticket issuer.

In the payment card issuers list 5204 seven types of information are stored for each payment card issuer: a payment card issuer name 5232, a payment card issuer ID 5233, a payment card issuer communication ID 5234, an available service list address 5235, an installation card list address 5236, a customers table address 5237, and a payment card issuer information address 5238.

The payment card issuer communication ID 5234 is an ID for the payment card issuing system 108 used when the service providing system 110 communicates with the payment card issuing system 108 via the digital communication line 133. The available service list address 5235 is an address at which is stored a list of service codes that the payment card issuer can handle. The installation card list address 5236 is an address in the service director information server 901 at which is stored a list of installation card numbers for electronic payment card installation cards that are issued by the payment card issuer. The customer table address 5237 is an address in the service director information server 901 at which is stored table information (customer table) that represents the correspondence credited to the customer number and the user ID. And the payment card issuer information address 5238 is an address in the payment card issuer information server 906 at which is stored the payment card issuer data management information 5000 for the pertinent payment card issuer.

In the telephone card issuers list 5205 seven types of information are stored for each telephone card issuer: a telephone card issuer name 5239, a telephone card issuer ID 5240, a telephone card issuer communication ID 5241, an available service list address 5242, an installation card list address 5243, a customers table address 5244, and a telephone card issuer information address 5245.

The telephone card issuer communication ID 5241 is an ID for the telephone card issuing system 109 used when the service providing system 110 communicates with the telephone card issuing system 109 via the digital communication line 134. The available service list address 5242 is an address at which is stored a list of service codes that the telephone card issuer can handle. The installation card list address 5243 is an address in the service director information server 901 at which is stored a list of installation card numbers for electronic telephone card installation cards that are issued by the telephone card issuer. The customer table address 5244 is an address in the service director information server 901 at which is stored table information (a customer table) that represents the correspondence credited to the customer number and the user ID. And the telephone card issuer information address 5246 is an address in the telephone card issuer information server 907 at which is stored the telephone card issuer data management information 5100 for the pertinent telephone card issuer.

In the provided service list 5206 four types of information are stored for each occasion on which the mobile electronic commerce service was provided: a service providing number 5246, a service code 5247, a service providing time 5248, and a provided service information address 5249.

The service providing number 5246 uniquely represents the process performed by the service providing system 110 on an occasion when service was provided. The service code 5247 is code information indicating the type of service provided. The service providing time 5248 is the time at which the mobile electronic commerce service was provided. And the provided service information address 5249 is an address in the service director information server 901 at which is stored history information for the processes performed by the service providing system 110 on an occasion when service was provided.

The electronic ticket management information 5300 is management information that is stored in the service director information server 901 for one type of electronic ticket.

In FIG. 53, 13 types of information are stored in the electronic ticket management information 5300: a ticket name 5304, a ticket code 5305, a ticket issuer ID 5306, a validity term 5307, a ticket private key 5308, a ticket public key 5309, a gate private key 5310, a gate public key 5311, a template code 5312, a management term 5313, a user list address 5314, a merchant list address 5315, and a registered ticket list address 5316.

The ticket name 5304 is information providing the name of an electronic ticket, the ticket code 5305 is code information describing the type of electronic ticket, the ticket issuer ID 5306 is ID information for a ticket issuer, and the validity term 5307 is the period during which an electronic ticket is valid. The ticket private key 5308 and the ticket public key 5309 are a pair of keys that are employed to authorize an electronic ticket in the ticket examination process, and the gate private key 5310 and the gate public key 5311 are a pair of keys that are employed to authorize a gate terminal in the ticket examination process. The service providing system employs the ticket private key 5308 and the gate public key 5311 to issue an electronic ticket, and employs the ticket public key 5309 and the gate private key 5310 to set up an electronic ticket for examination at the gate terminal.

The template code 5312 is code information that describes an electronic ticket template program and is used to generate an electronic ticket. The management term 5313 is a period during which the electronic ticket management information 5300 is managed by the service director information server 901. That is, when the management term 5313 expires, information in the electronic ticket management information 5300 is shifted to a management form or a storage medium for which a lower cost is assessed.

The user list address 5314 is an address in the service director information server 901 at which is stored the user list 5301 for a user who owns the pertinent electronic ticket. And the user list 5301 is list information in which two information entries, a ticket ID 5317 and a user ID 5318 identifying the owner of the ticket, are made for one electronic ticket.

The merchant list address 5315 is an address in the service director information server 901 at which is stored the merchant list 5302 identifying a merchant who is permitted to examine the electronic ticket. And the merchant list 5302 is list information for the merchant ID 5319 assigned to a merchant who is permitted to examine the electronic ticket.

When the contents of a ticket are to be modified, the user list 5301 and the merchant list 5302 are referred to in order to specify the owner of the ticket or the merchant who has set up the ticket examination module.

The registered ticket list address 5316 is an address in the service director information server 901 at which the registered ticket list 5303 for registered electronic tickets is stored. The registered ticket list 5303 is list information, for electronic tickets that have been registered, in which are stored seven types of information: a ticket ID 5320, an initial ticket examination number 5321, a user ID 5322, a user public key 5323, a registered ticket certificate address 5324, a ticket examination response list address 5325, and a former user information address 5326.

The user ID 5321 and the user public key 5323 are an ID and a public key for a user (the owner of an electronic ticket) who has registered an electronic ticket (the ticket ID 5320). The initial ticket examination number 5321 is the initial value of the ticket examination number for an electronic ticket. And the registered ticket certificate address 5324 is an address in the service director information server 901 at which a registered ticket certificate for an electronic ticket is stored.

The initial ticket examination number 5321 is an arbitrary number that the service providing system sets before issuing an electronic ticket. The ticket examination number is incremented each time the ticket examination process is performed. In the ticket reference process, the service providing system employs the ticket examination number to examine the ticket status 11103 and the variable ticket information 11104 that have been modified to determine whether they match.

In the ticket reference process, first, the service providing system examines the registered ticket list 5303 to determine whether the electronic ticket has been registered. Then, the service providing system employs the user public key 5323 to examine the user digital signature in the ticket examination response 6703, and employs the registered ticket certificate to examine the ticket digital signature in the ticket examination response 6703. Further, the service providing system employs the ticket examination number to examine the ticket status 11103 and the variable ticket information 11104 that have been modified to determine whether they match.

The ticket examination response list address 5325 is an address in the service director information server 901 at which is stored list information for a ticket examination response (a ticket examination response that is uploaded to the service providing system in the ticket reference process).

The former user information address 5326 is an address in the service director information server 901 at which is stored former user information 5327 concerning a preceding owner (user) of the electronic ticket. When an electronic ticket that is registered is transferred to another user, the service providing system updates the registered ticket list 5303 to reflect the new user information, and the old user information is managed as the former user information 5327.

The former user information 5327 consists of five types of information: a user ID 5328, a user public key 5329, a registered ticket certificate address 5330, a ticket examination response list address 5331, and a former user information address 5332. These addresses correspond respectively to the user ID 5322, the user public key 5323, the registered ticket certificate address 5324, the ticket examination response list address 5325 and the former user information address 5326, all of which are in the registered ticket list. In addition, when another owner preceded the present owner, the former user information address 5332 is an address of the former user information for the pertinent owner.

That is, when the electronic ticket that is registered is transferred, the user ID 5322, the user public key 5323, the registered ticket certificate address 5324, the ticket examination response list address 5325 and the former user information address 5326 are updated, and at the former user information address 5326, the information stored in those portions before the updating is pointed to as the former user information 5327

Since the electronic ticket is managed in the above described manner, the usage condition of the electronic ticket can be precisely understood even when it is transferred.

The electronic payment management information 5400 is management information that is stored in the service director information server 901 for one type of electronic payment card.

In FIG. 54, 12 types of information are stored in the electronic payment card management information 5400: a card name 5403, a card code 5404, a payment card issuer ID 5405, a validity term 5406, a card private key 5407, a card public key 5408, an accounting machine private key 5409, an accounting machine public key 5410, a template code 5411, a management term 5412, a merchant list address 5413, and a registered card list address 5414.

The card name 5403 is information providing the name of an electronic payment card, the card code 5404 is code information describing the type of electronic payment card, the payment card issuer ID 5405 is ID information for a payment card issuer, and the validity term 5406 is the period during which an electronic payment card is valid. The card private key 5407 and the card public key 5408 are a pair of keys that are employed to authorize an electronic payment card in the payment card clearing process, and the accounting machine private key 5409 and the accounting machine public key 5410 are a pair of keys that are employed to authorize the merchant terminal 102 or 103 or the automatic vending machine 104 in the payment card clearing process. The service providing system employs the card private key 5407 and the accounting machine public key 5410 to issue an electronic payment card, and employs the card public key 5408 and the accounting machine private key 5409 to set up an electronic payment card that a merchant handles at the merchant terminal 102 or 103 or the automatic vending machine 104.

The template code 5411 is code information that describes an electronic payment card template program and is used to generate an electronic payment card. The management term 5412 is a period during which the electronic payment card management information 5400 is managed by the service director information server 901. That is, when the management term 5412 expires, information in the electronic payment card management information 5400 is shifted to a management form or a storage medium for which a lower cost is assessed.

The merchant list address 5413 is an address in the service director information server 901 at which is stored the merchant list 5401 identifying a merchant who is permitted to use the electronic payment card. And the merchant list 5401 is list information for the merchant ID 5415 assigned to a merchant who is permitted to handle the electronic payment card.

The registered card list address 5414 is an address in the service director information server 901 at which the registered card list 5402 for registered electronic payment cards is stored. The registered card list 5402 is list information, for electronic payment cards that have been registered, in which are stored seven types of information: a card ID 5416, an initial micro-check issuing number 5417, a user ID 5418, a user public key 5419, a registered card certificate address 5420, a micro-check list address 5421, and a former user information address 5422.

The user ID 5418 and the user public key 5419 are an ID and a public key for a user (the owner of an electronic payment card) who has registered an electronic payment card (the card ID 5416). The initial micro-check issuing number 5417 is the initial value of the micro-check issuing number for an electronic payment card. And the registered card certificate address 5420 is an address in the service director information server 901 at which a registered card certificate for an electronic payment card is stored.

The initial micro-check issuing number 5417 is an arbitrary number that the service providing system sets before issuing an electronic payment card. The micro-check issuing number is incremented each time the payment card clearing process is performed (each time the micro-check is issued). In the payment card reference process, the service providing system employs the micro-check issuing number to examine the amount of payment 11303, the card status 11304 and the total remaining value 11305 that have been modified to determine whether they match.

In the payment card reference process, first, the service providing system examines the registered card list 5402 to determine whether the electronic payment card has been registered. Then, the service providing system employs the user public key 5419 to examine the user digital signature in the micro-check, and employs the registered card certificate to examine the card digital signature in the micro-check. Further, the service providing system employs the micro-check issuing number to examine the amount of payment 11303, the card status 11304 and the total remaining value 11305 that have been modified to determine whether they match.

The micro-check list address 5421 is an address in the service director information server 901 at which is stored list information for a micro-check (a micro-check that is uploaded to the service providing system in the payment card reference process).

The former user information address 5422 is an address in the service director information server 901 at which is stored former user information 5423 concerning a preceding owner (user) of the electronic payment card. When an electronic payment card that is registered is transferred to another user, the service providing system updates the registered card list 5402 to reflect the new user information, and the old user information is managed as the former user information 5423.

The former user information 5423 consists of five types of information: a user ID 5424, a user public key 5425, a registered card certificate address 5426, a micro-check list address 5427, and a former user information address 5428. These addresses correspond respectively to the user ID 5418, the user public key 5419, the registered card certificate address 5420, the micro-check list address 5421 and the former user information address 5422, all of which are in the registered card list. In addition, when another owner preceded the present owner, the former user information address 5428 is an address of the former user information for the pertinent owner.

That is, when the electronic payment card that is registered is transferred, the user ID 5418, the user public key 5419, the registered card certificate address 5420, the micro-check list address 5421, and the former user information address 5422 are updated, and at the former user information address 5422, the information stored in those portions before the updating is pointed to as the former user information 5423.

Since the electronic payment card is managed in the above described manner, the usage condition of the electronic payment card can be precisely understood even when it is transferred. Thus, even when the transfer of an electronic payment card that is partially used is permitted, the safety of the system is not deteriorated.

The electronic telephone management information 5500 is management information that is stored in the service director information server 901 for one type of electronic telephone card.

In FIG. 55, 12 types of information are stored in the electronic telephone card management information 5500: a card name 5503, a card code 5504, a telephone card issuer ID 5505, a validity term 5506, a card private key 5507, a card public key 5508, an accounting machine private key 5509, an accounting machine public key 5510, a template code 5511, a management term 5512, a communication service provider list address 5513, and a registered card list address 5514.

The card name 5503 is information providing the name of an electronic telephone card, the card code 5504 is code information describing the type of electronic telephone card, the telephone card issuer ID 5505 is ID information for a telephone card issuer, and the validity term 5506 is the period during which an electronic telephone card is valid. The card private key 5507 and the card public key 5508 are a pair of keys that are employed to authorize an electronic telephone card in the telephone card clearing process, and the accounting machine private key 5509 and the accounting machine public key 5510 are a pair of keys that are employed to authorize the electronic telephone card accounting machine 800 in the telephone card clearing process. The service providing system employs the card private key 5507 and the accounting machine public key 5510 to issue an electronic telephone card, and employs the card public key 5508 and the accounting machine private key 5509 to set up an electronic telephone card that a communication service provider handles at the electronic telephone card accounting machine 800.

The template code 5511 is code information that describes an electronic telephone card template program and is used to generate an electronic telephone card. The management term 5512 is a period during which the electronic telephone card management information 5500 is managed by the service director information server 901. That is, when the management term 5512 expires, information in the electronic telephone card management information 5500 is shifted to a management form or a storage medium for which a lower cost is assessed.

The communication service provider list address 5513 is an address in the service director information server 901 at which is stored the communication service provider list 5501 identifying a communication service provider who is permitted to handle the electronic telephone card. And the communication service provider list 5501 is list information for the communication service provider ID 5515 assigned to a communication service provider who is permitted to handle the electronic telephone card.

The registered card list address 5514 is an address in the service director information server 901 at which the registered card list 5502 for registered electronic telephone cards is stored.

The registered card list 5502 is list information, for electronic telephone cards that have been registered, in which are stored seven types of information: a card ID 5516, an initial micro-check issuing number 5517, a user ID 5518, a user public key 5519, a registered card certificate address 5520, a telephone micro-check list address 5521, and a former user information address 5522.

The user ID 5518 and the user public key 5519 are an ID and a public key for a user (the owner of an electronic telephone card) who has registered an electronic telephone card (the card ID 5516). The initial micro-check issuing number 5517 is the initial value of the micro-check issuing number for an electronic telephone card. And the registered card certificate address 5520 is an address in the service director information server 901 at which a registered card certificate for an electronic telephone card is stored.

The initial micro-check issuing number 5517 is an arbitrary number that the service providing system sets before issuing an electronic telephone card. The micro-check issuing number is incremented each time the telephone card clearing process is performed (each time the telephone micro-check is issued). In the telephone card reference process, the service providing system employs the micro-check issuing number to examine the amount of payment 11303, the card status 11304 and the total remaining value 11305 that have been modified to determine whether they match.

In the telephone card reference process, first, the service providing system examines the registered card list 5502 to determine whether the electronic telephone card has been registered. Then, the service providing system employs the user public key 5519 to examine the user digital signature in the telephone micro-check, and employs the registered card certificate to examine the card digital signature in the telephone micro-check. Further, the service providing system employs the micro-check issuing number to examine the amount of payment 11303, the card status 11304 and the total remaining value 11305 that have been modified to determine whether they match.

The telephone micro-check list address 5521 is an address in the service director information server 901 at which is stored list information for a telephone micro-check (a telephone micro-check that is uploaded to the service providing system in the telephone card reference process).

The former user information address 5522 is an address in the service director information server 901 at which is stored former user information 5523 concerning a preceding owner (user) of the electronic telephone card. When an electronic telephone card that is registered is transferred to another user, the service providing system updates the registered card list 5502 to reflect the new user information, and the old user information is managed as the former user information 5523.

The former user information 5523 consists of five types of information: a user ID 5524, a user public key 5525, a registered card certificate address 5526, a micro-check list address 5527, and a former user information address 5528. These addresses correspond respectively to the user ID 5518, the user public key 5519, the registered card certificate address 5520, the micro-check list address 5521 and the former user information address 5522, all of which are in the registered card list. In addition, when another owner preceded the present owner, the former user information address 5528 is an address of the former user information for the pertinent owner.

That is, when the electronic telephone card that is registered is transferred, the user ID 5518, the user public key 5519, the registered card certificate address 5520, the micro-check list address 5521, and the former user information address 5522 are updated, and at the former user information address 5522, the information stored in those portions before the updating is pointed to as the former user information 5523.

Since the electronic telephone card is managed in the above described manner, the usage condition of the electronic telephone card can be precisely understood even when it is transferred. Thus, even when the transfer of an electronic telephone card that is partially used is permitted, the safety of the system is not deteriorated.

A detailed explanation will now be given for the contents of messages that are exchanged by devices, and the operations performed by the individual devices during the mobile electronic commerce service processing.

First, an explanation will be given for the contents of messages that are exchanged by devices, and the operations performed by the devices during the individual processes performed for network hierarchical storage and management.

An explanation will now be given for the contents of messages that the mobile user terminal 100, the gate terminal 101, the merchant terminal 102 and the merchant terminal 103 exchange with the service providing system 110 in the remote access process. The remote access process is a process for the downloading of data from the service providing system 110 in order to access data at a remote address. This process is hereinafter called a remote access process.

Figure 85A:
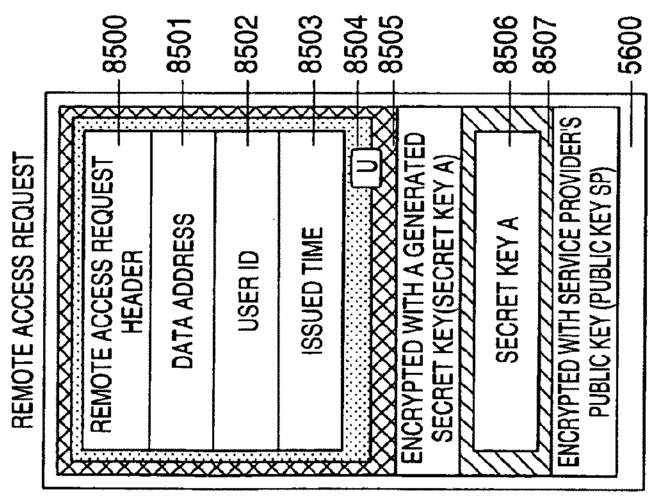
FIG. 85A is a specific diagram showing the data structure of a remote access request that is exchanged between the mobile user terminal and the gate terminal according to the embodiment of the present invention.
Figure 85B:
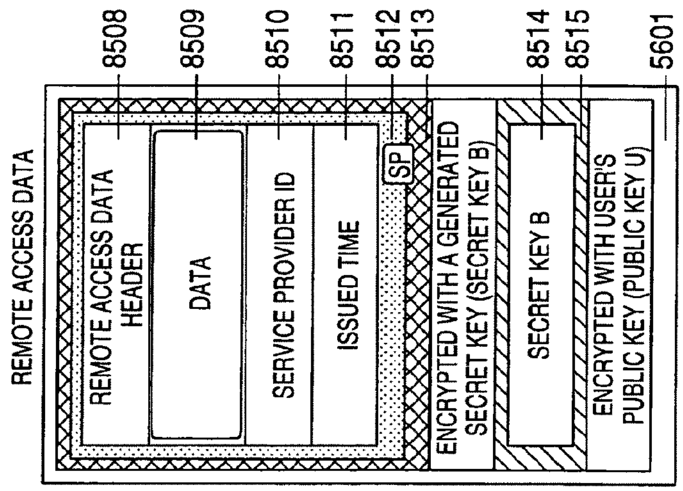
FIG. 85B is a specific diagram showing the structure of remote access data that are exchanged between the mobile user terminal and the user processor according to the embodiment of the present invention.

In FIG. 56A is shown the remote access process performed by the mobile user terminal 100, and in FIGS. 85A and 85B are shown the contents of the messages that are to be exchanged by the mobile user terminal 100 and the service providing system.

When data to be accessed is located at the remote address, the mobile user terminal 100 generates a remote access request 5600, i.e., a message requesting that the user processor in the service providing system 110 access data, and transmits it to the user processor.

As is shown in FIG. 85A, a digital signature 8504 of a user is provided for data that consists of a remote access header 8500, which is header information indicating the message is the remote access request 5600 and describing the data structure of the request; a data address 8501, which indicates a remote address; a user ID 8502; and an issued time 8503, which indicates the date when the remote access request 5600 was issued. The data are closed and are addressed to the service provider, thereby providing the remote access request 5600.

The user processor in the service providing system 110 receives the remote access request 5600, decrypts it and examines the digital signature, and generates a remote access data message 5601 and transmits it to the mobile user terminal 100.

As is shown in FIG. 85B, the digital signature of a service provider is provided for data that consist of a remote access header 8508, which is header information indicating that the message is the remote access data 5601 and describing the data structure of the remote access data; data that are requested 8509; a service provider ID 8510; and an issued time 8511, which indicates the date on which the remote access data 5601 was issued. The data are closed and addressed to the user, thereby providing the remote access data 5601.

The mobile user terminal 100 receives the remote access data 5601, decrypts it, examines the digital signature, stores it in the temporary area, and accesses the data.

Figure 86B:
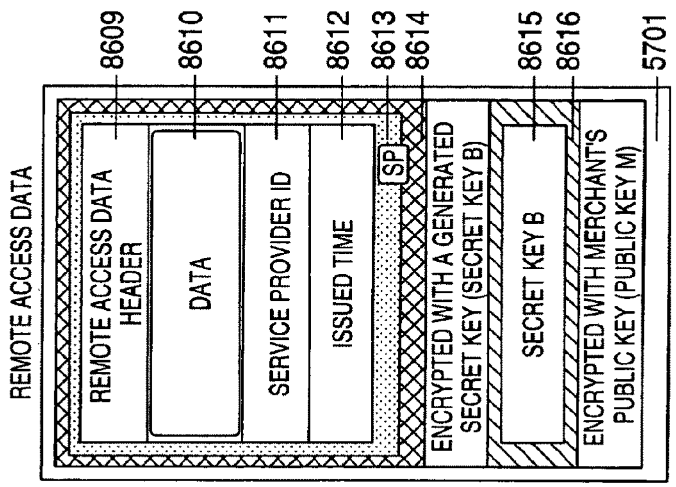
FIG. 86B is a specific diagram showing the structure of remote access data that are exchanged between the gate terminal (or the merchant terminal 102 or 103) and the merchant processor according to the embodiment of the present invention.
Figure 86A:
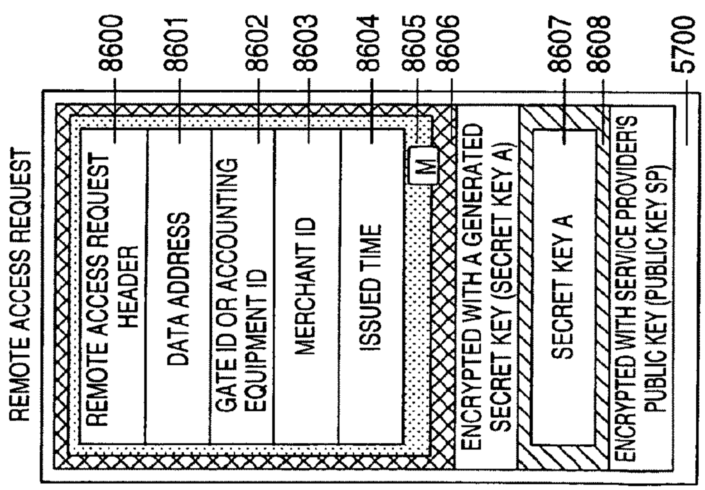
FIG. 86A is a specific diagram showing the data structure of a remote access request that is exchanged between the gate terminal (or the merchant terminal 102 or 103) and the merchant processor according to the embodiment of the present invention.

Similarly, in FIG. 57A is shown the remote access process performed by the gate terminal 101 or the merchant terminal 102 or 103, and in FIGS. 86A and 86B are shown the contents of messages that are to be exchanged by the gate terminal 101 or the merchant terminal 102 or 103 and the service providing system.

When data to be accessed is located at the remote address, the gate terminal 101 or the merchant terminal 102 or 103 generates a remote access request 5700, i.e., a message requesting that the merchant processor in the service providing system 110 access data, and transmits it to the merchant processor.

As is shown in FIG. 86A, a digital signature 8605 of a merchant is provided for data that consist of a remote access header 8600, which is header information indicating the message is the remote access request 5700 and describing the data structure of the request; a data address 8601, which indicates a remote address; a gate ID or an accounting machine ID 8602; a merchant ID 8603; and an issued time 8604, which indicates the date on which the remote access request 5700 was issued. The data are closed and are addressed to the service provider, thereby providing the remote access request 5700.

The merchant processor in the service providing system 110 receives the remote access request 5700, decrypts it and examines the digital signature, and generates a remote access data message 5701 and transmits it to the gate terminal 101 or to the merchant terminal 102 or 103.

As is shown in FIG. 86B, a digital signature of a service provider is provided for data that consist of a remote access header 8609, which is header information indicating that the message is the remote access data 5701 and describing the data structure of the remote access data; data that are requested 8610; a service provider ID 8611; and an issued time 8612, which indicates the date on which the remote access data 5701 was issued. The data are closed and are addressed to the merchant, thereby providing the remote access data 5701.

The gate terminal 101 or the merchant terminal 102 or 103 receives the remote access data 5701, decrypts it and examines the digital signature, stores it in the temporary area, and accesses the data.

Next, an explanation will be given for the contents of messages that the mobile user terminal 100, the gate terminal 101, the merchant terminal 102, the merchant terminal 103, the accounting machine 3555 (automatic vending machine 104) and the electronic telephone accounting machine 800 (switching center 105) exchange with the service providing system 110 during the data updating process. The data updating process is a process whereby the service providing system updates the data in the RAM 1502 of the mobile user terminal 100, or the RAM and the hard disk of the merchant terminal 102, the merchant terminal 103 or the accounting machine 3555 (automatic vending machine 104). This process is hereinafter called a data updating process.

In FIG. 56B is shown the data updating process performed by the mobile user terminal 100, and in FIGS. 87A to 87E are shown the contents of messages that the mobile user terminal 100 exchanges with the service providing system 110.

When the value held by the clock counter matches the value in the update time register, the mobile user terminal 100 begins the data updating process. The mobile user terminal 100 generates a data update request 5602, i.e., a message requesting that the user processor of the service providing system 110 update data, and transmits it to the user processor.

Figures 87A, 87B, 87C:
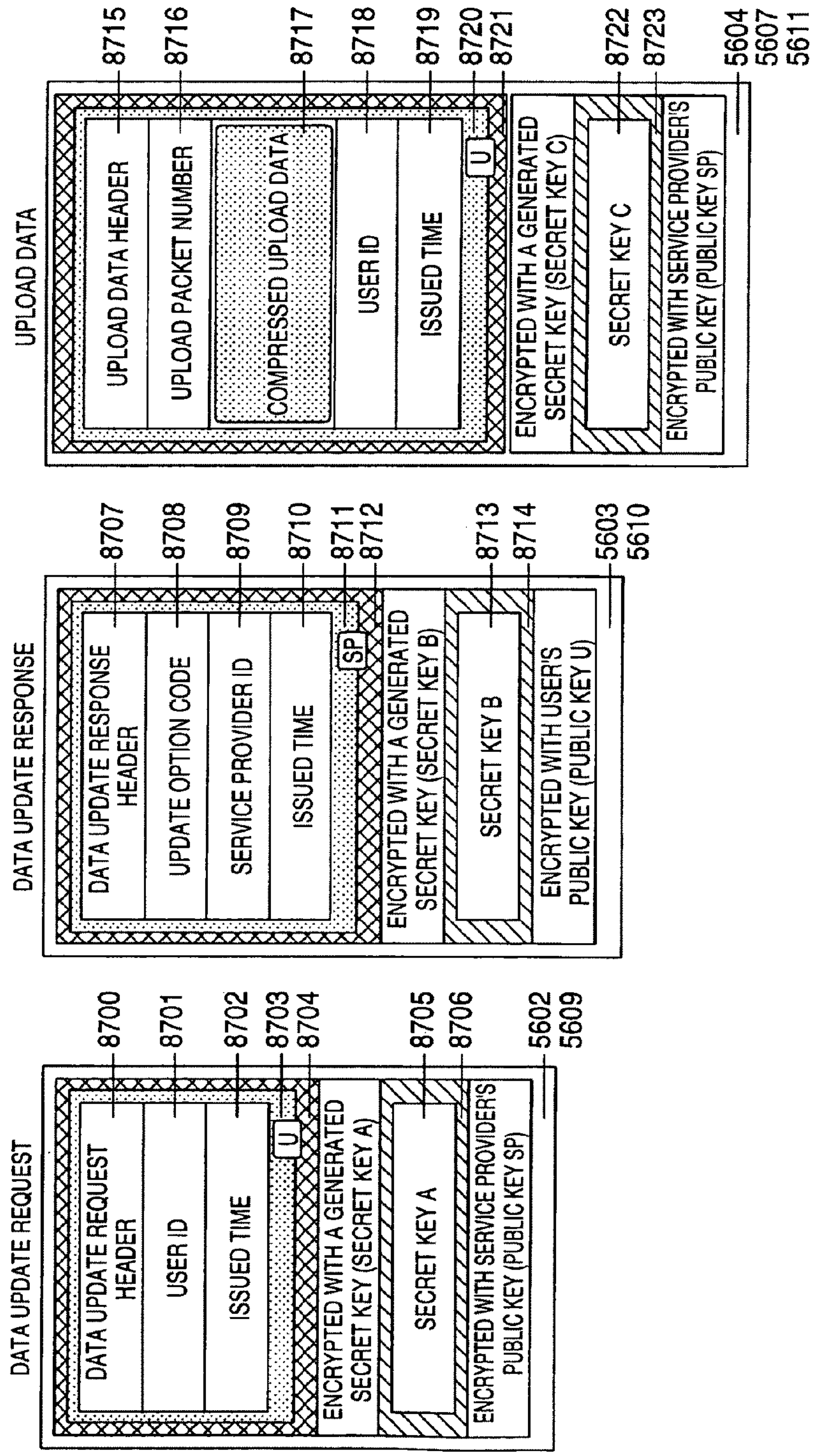
FIG. 87A is a specific diagram showing the data structure of a data update request that is exchanged between the mobile user terminal and the user processor according to the embodiment of the present invention.
FIG. 87B is a specific diagram showing the data structure of a data update response that is exchanged between the mobile user terminal and the user processor according to the embodiment of the present invention.
FIG. 87C is a specific diagram showing the structure of upload data that are exchanged between the mobile user terminal and the user processor according to the embodiment of the present invention.

As is shown in FIG. 87A, a digital signature of a user is provided for data that consists of a data update request header 8700, which is header information indicating the message is the data update request 5602 and describing the data structure of the request 5602; a user ID 8701; and an issued time 8702, which indicates the date on which the data update request 5602 was issued. The data are closed and are addressed to the service provider, thereby providing the data update request 5602.

The user processor of the service providing system 110 receives the data update request 5602, decrypts it and examines the digital signature, and generates a data update request response 5603, i.e., a message indicating the range of data to be uploaded, and transmits it to the mobile user terminal 100.

As is shown in FIG. 87B, a digital signature of a service provider is provided for data that consists of a data update request response header 8707, which is header information indicating that the message is the data update request response 5603, and describing the data structure of the response 5603; an update option code 8708 indicating the range of data to be uploaded; a service provider ID 8709; and an issued time 8710, which indicates the date on which the data update request response 5603 was issued. The data are closed and are addressed to the user, thereby providing the data update request response 5603.

The update option code 8708 is code information that indicates the range of data to be uploaded from the mobile user terminal to the service providing system. This code is employed to designate data for changing the service data area, data for changing the service data area and the user area, all the data in the service data area, all the data in the service data area and the user area, or all the data in the basic program area, the service data area and the user area. The update option code 8708 is designated by the user processor in the service providing system, and the same code is not always designated each time.

The mobile terminal 100 receives the data update request response 5603, decrypts it and examines the digital signature, and generates data that are designated with the update option code 8708. Then, the mobile user terminal 100 generates upload data 5604, i.e., a message that indicates the data that are to be uploaded to the service providing system 110, and transmits the data to the service providing system.

If a large volume of data is to be uploaded to the service system, the data are divided into a plurality of packets, which are transmitted as upload data 5604.

As is shown in FIG. 87C, a digital signature of a user is provided for data that consists of an upload data header 8715, which is header information indicating that the message is the upload data 5604 and describing the data structure; an upload packet number 8716 indicating a packet number for each of a plurality of packets; compressed upload data 8717 that are obtained by compressing the data that are to be uploaded to the service providing system; a user ID 8718; and an issued time 8719, which indicates the date on which the upload data 5604 was issued. The data are closed and are addressed to the user, thereby providing the upload data 5604.

The user processor of the service providing system receives the upload data 5604, and decrypts it and examines the digital signature. Then, the user processor decompresses the compressed upload data 8717 and compares the obtained data with the terminal data 4607 in the user information server 902 and the other data managed in the user data management information 4600. Then, the user processor generates update data 5605, which is a message for the updating of data in the RAM 1502 of the mobile user terminal 100, and transmits them to the mobile user terminal 100. If a large volume of data is to be uploaded to the service system, the data are divided into a plurality of packets, which are transmitted as upload data 5605.

Figure 87D:
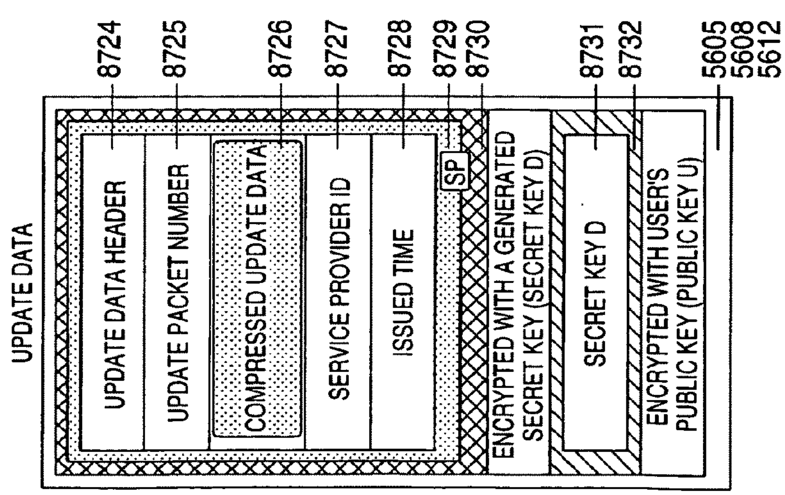

As is shown in FIG. 87D, a digital signature of a service provider is provided for data that consists of an update data header 8724, which is header information indicating that the message is the update data 5605 and describing the data structure; an update packet number 8725 indicating a packet number when the data are divided into a plurality of packets; compressed update data 8726 that are obtained by compressing update data; a service provider ID 8727; and an issued time 8728, which indicates the date on which the update data 5605 was issued. The data are closed and are addressed to the user, thereby providing the update data 5605.

The mobile user terminal 100 receives the update data 5605, decrypts it and examines the digital signature, decompresses the update data 8726, and updates the data in the RAM 1502.

In order to generate data for updating the RAM 1502, when there is no extra space in the object data area of the mobile user terminal 100, the user processor of the service providing system 110 compares the access times for the individual credit cards in the credit card list, and assigns a local address to the object data address for the credit card for which the access time is the latest; compares the access times for the individual tickets in the ticket list, and assigns a local address to the electronic ticket address for the ticket for which the access time is the latest; compares the access times for the individual payment cards in the payment card list, and assigns a local address to the electronic payment card address for the payment card for which the access time is the latest; compares the access times for the individual telephone cards in the telephone card list, and assigns a local address to the electronic telephone card address for the telephone card for which the access time is the latest; and compares the use times of the information items and assigns a local address to the use information address for the information for which the use time is the latest. When the version of the program of the mobile user terminal must be upgraded, the data in the basic program area are updated.

When the user processor of the service providing system 110 compares the upload data and finds an illegal alteration of data, the user processor generates, instead of the update data 5605, a mandatory expiration instruction 5605' that is a message for halting the function of the mobile user terminal 100, and transmits the instruction 5605' to the mobile user terminal 100.

Figure 87E:
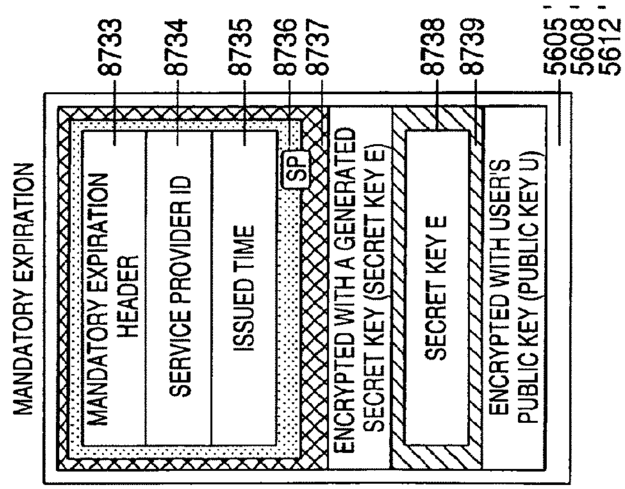

As is shown in FIG. 87E, a digital signature of a service provider is provided for data that consists of a mandatory expiration header 8733, which is header information indicating that the message is the mandatory expiration instruction 5605' and describing the data structure; a service provider ID 8734; and an issued time 8735, which indicates that the date on which the mandatory expiration instruction 5605' was issued. The data are closed and are addressed to the user, thereby providing the mandatory expiration instruction 5605'.

Upon receipt of the mandatory expiration instruction 5605', the mobile user terminal 100 decrypts it and examines the digital signature, and changes the terminal status 1802 to "use disabled." As a result, the use of the mobile user terminal 100 is inhibited.

Through the data updating process, information that is comparatively frequently used is stored in the RAM of the mobile user terminal, the latest version of the program is maintained for the mobile user terminal, and the illegal alteration of the terminal data can be prevented.

In FIG. 57B is shown the data updating process performed by the gate terminal 101, the merchant terminal 102, the merchant terminal 103, the accounting machine 3555 (automatic vending machine 104) and the electronic telephone card accounting machine 800 (switching center 105), and in FIGS. 88A to 88E are shown the contents of messages that are exchanged by the service providing system 110 and the gate terminal 101, the merchant terminal 102, the merchant terminal 103, the accounting machine 3555 or the electronic telephone card accounting machine 800.

When the value held by the clock counter matches the value in the update time register, the gate terminal 101, the merchant terminal 102, the merchant terminal 103, the accounting machine 3555 or the electronic telephone card accounting machine 800 begins the data updating process. The gate terminal 101, the merchant terminal 102, the merchant terminal 103, the accounting machine 3555 or the electronic telephone card accounting machine 800 generates a data update request 5702, i.e., a message requesting that the merchant processor of the service providing system 110 update data, and transmits it to the merchant processor.

As is shown in FIG. 88A, a digital signature of a merchant (communication service provider) is provided for data that consists of a data update request header 8800, which is header information indicating the message is the data update request 5702 and describing the data structure of the request 5702; an accounting ID (or a gate ID for the gate terminal) 8801; a merchant ID 8802 (a communication service provider ID for the electronic telephone card accounting machine) 8802; and an issued time 8803, which indicates the date on which the data update request 5702 was issued. The data are closed and are addressed to the service provider, thereby providing the data update request 5702.

The merchant processor of the service providing system 110 receives the data update request 5702, decrypts it, examines the digital signature, generates a data update request response 5703, i.e., a message indicating the range of data to be uploaded, and transmits it to the gate terminal 101, the merchant terminal 102, the merchant terminal 103, the accounting machine 3555 or the electronic telephone card accounting machine 800.

As is shown in FIG. 88B, a digital signature of a service provider is provided for data that consists of a data update request response header 8808, which is header information indicating that the message is the data update request response 5703, and describing the data structure of the response 5703; an update option code 8809 indicating the range of data to be uploaded; a service provider ID 8810; and an issued time 8811, which indicates that the date on which the data update request response 5703 was issued. The data are closed and are addressed to the merchant (communication service provider for the electronic telephone card accounting machine), thereby providing the data update request response 5703.

The update option code 8809 is code information that indicates the range of data to be uploaded to the service providing system. This code is employed to designate data for changing the service data area, data for changing the service data area and the merchant area, all the data in the service data area, all the data in the service data area and the merchant area, or all the data in the basic program area, the service data area and the merchant area. The update option code 8809 is designated by the merchant processor in the service providing system, and the same code is not always designated each time.

The gate terminal 101, the merchant terminal 102, the merchant terminal 103, the accounting machine 3555 or the electronic telephone card accounting machine 800 receives the data update request response 5703, decrypts it and examines the digital signature, and generates data that are designated with the update option code 8809. Then, the gate terminal 101, the merchant terminal 102, the merchant terminal 103, the accounting machine 3555 or the electronic telephone card accounting machine 800 generates upload data 5704, i.e., a message that indicates to upload the data to the service providing system 110, and transmits the data to the service providing system.

If a large volume of data is to be uploaded to the service system, the data are divided into a plurality of packets, which are transmitted as upload data 5704.

As is shown in FIG. 88C, a digital signature of a merchant (communication service provider) is provided for data that consists of an upload data header 8816, which is header information indicating that the message is the upload data 5704 and describing the data structure; an upload packet number 8817 indicating a packet number for each of a plurality of packets; compressed upload data 8818 that are obtained by compressing the data that are to be uploaded to the service providing system; an accounting machine ID (gate ID for the gate terminal) 8819; a merchant (communication service provider) ID 8820; and an issued time 8821, which indicates the date on which the upload data 5704 was issued. The data are closed and are addressed to the merchant (communication service provider), thereby providing the upload data 5704.

The merchant processor of the service providing system receives the upload data 5704, and decrypts it and examines the digital signature. Then, the merchant processor decompresses the compressed upload data 8818 and compares the obtained data with the memory data 4705 in the merchant information server 903 and the other data managed in the merchant data management information 4700. Then, the merchant processor generates update data 5705, which is a message for updating data in the RAM and on the hard disk of the gate terminal 101, the merchant terminal 102, the merchant terminal 103, the accounting machine 3555 or the electronic telephone card accounting machine 800, and transmits them thereto. If a large volume of data is to be uploaded to the service system, the data are divided into a plurality of packets, which are transmitted as upload data 5705.

Figure 88D:
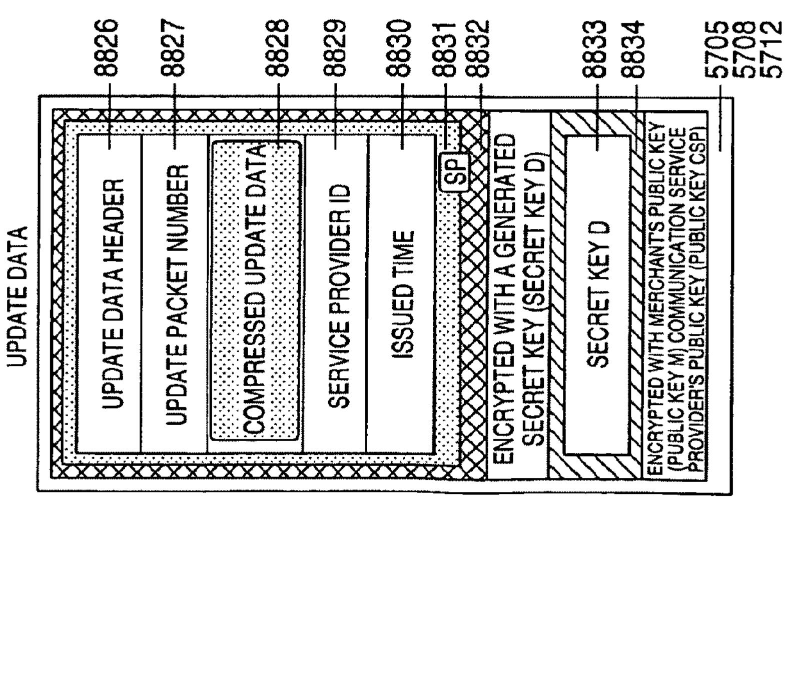

As is shown in FIG. 88D, a digital signature of a service provider is provided for data that consists of an update data header 8826, which is header information indicating that the message is the update data 5705 and describing the data structure; an update packet number 8827 indicating a packet number when the data are divided into a plurality of packets; compressed update data 8828 that are obtained by compressing update data; a service provider ID 8829; and an issued time 8830, which indicates the date on which the update data 5705 was issued. The data are closed and are addressed to the merchant (communication service provider), thereby providing the update data 5705.

The gate terminal 101, the merchant terminal 102, the merchant terminal 103, the accounting machine 3555 or the electronic telephone card accounting machine 800 receives the update data 5705, decrypts it and examines the digital signature, decompresses the update data 8828, and updates the data in the RAM and on the hard disk.

In order to generate data for updating, when there is no extra space in the object data area or in the hard disk, the merchant processor of the service providing system 110 compares the transaction times for the history information in the transaction list, and assigns a local address to the transaction information address for history information for which the transaction time is the latest. When the version of the program of the gate terminal 101, the merchant terminal 102, the merchant terminal 103, the accounting machine 3555 or the electronic telephone card accounting machine 800 must be upgraded, the data in the basic program area are updated.

When the merchant processor of the service providing system 110 compares the upload data and finds the illegal alteration of the data, the merchant processor generates, instead of the update data 5705, a mandatory expiration instruction 5705', which is a message for halting the function of the gate terminal 101, the merchant terminal 102, the merchant terminal 103, the accounting machine 3555 or the electronic telephone card accounting machine 800, and transmits the instruction 5705' thereto.

Figure 88E:
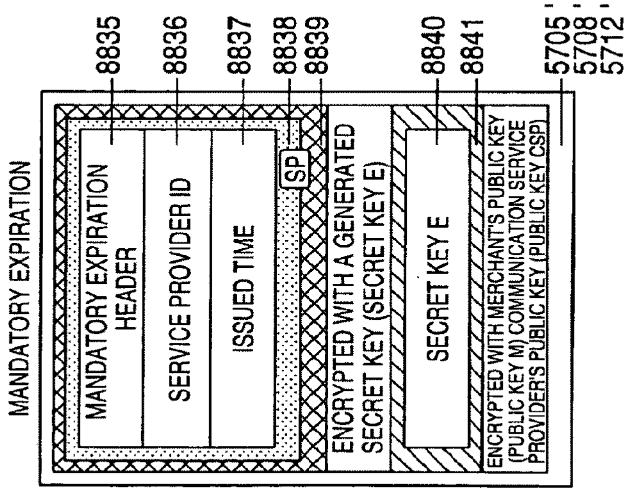
Figure 88F:
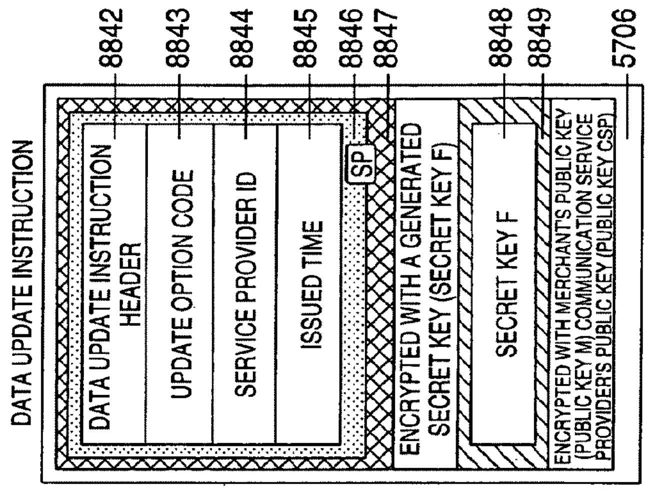

As is shown in FIG. 88E, a digital signature of a service provider is provided for data that consists of a mandatory expiration header 8835, which is header information indicating that the message is the mandatory expiration instruction 5705' and describing the data structure; a service provider ID 8836; and an issued time 8837, which indicates that the date on which the mandatory expiration instruction 5705' was issued. The data are closed and are addressed to the user, thereby providing the mandatory expiration instruction 5705'.

Upon receipt of the mandatory expiration instruction 5705', the gate terminal 101, the merchant terminal 102, the merchant terminal 103, the accounting machine 3555 or the electronic telephone card accounting machine 800 decrypts it and examines the digital signature, and changes the terminal status (or the accounting machine status) to "use disabled." As a result, the use of the gate terminal 101, the merchant terminal 102, the merchant terminal 103, the accounting machine 3555 or the electronic telephone card accounting machine 800 is inhibited.

Through the data updating process, information that is comparatively frequently used is stored in the RAM and on the hard disk of the gate terminal 101, the merchant terminal 102, the merchant terminal 103, the accounting machine 3555 or the electronic telephone card accounting machine 800, the latest version of the program is maintained for the gate terminal 101, the merchant terminal 102, the merchant terminal 103, the accounting machine 3555 or the electronic telephone card accounting machine 800, and the illegal alteration of the terminal data can be prevented.

An explanation will now be given for the contents of messages that the mobile user terminal 101 and the merchant terminal 102 exchange with the service providing system 110 during the processing for forcibly updating data. During the processing for forcibly updating data, upon the need of urgent data dating, the service providing system 110 forcibly updates the contents of the RAM 1502 of the mobile user terminal 101, or the contents of the RAM and the hard disk of the gate terminal 101, the merchant terminal 102, the merchant terminal 103, the accounting machine 3555 or the electronic telephone card accounting machine 800. This process is hereinafter called a forcible data updating process.

In FIG. 56C is shown the forcible data updating process performed by the mobile user terminal 100, and in FIGS. 87C to 87F are shown the contents of messages that are exchanged by the mobile user terminal 100 and the service providing system 110.

When the data in the RAM of the mobile user terminal 100 must be urgently updated, such as when the terms of a contract with the user are changed, the service providing system 110 generates a data update instruction 5606, i.e., a message instructing the mobile user terminal 100 to perform the forcible data updating process, and transmits it to the mobile user terminal 100.

Figure 87F:
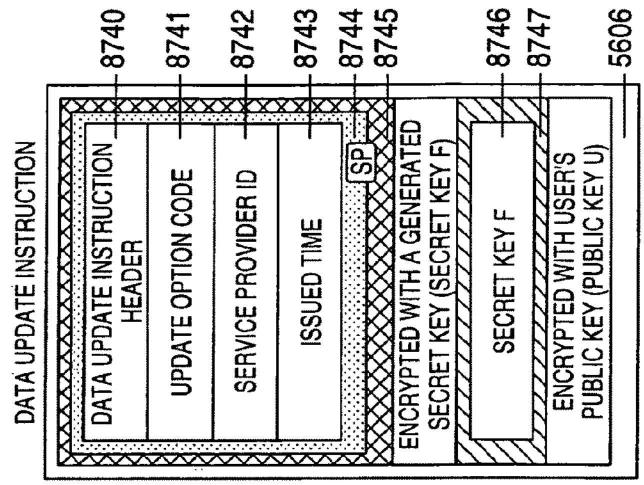

As is shown in FIG. 87F, the digital signature of a service provider is provided for data that consists of a data update instruction header 8740, which is header information indicating that the message is the data update instruction 5606 and describing the data structure; an update option code 8741; a service provider ID 8742; and an issued time 8743, which indicates the date on which the data update instruction 5606 was issued. These data are closed and addressed to the user, thereby providing the data update instruction 5606.

Upon receiving the data update instruction 5606, the mobile user terminal 100 decrypts it and examines the digital signature, and generates data as designated by the update option code 8741. Then, the mobile user 100 generates upload data 5607, which is a message for uploading the data to the service providing system 110, and transmits the data 5607 to the service providing system.

If a large volume of data is to be uploaded to the service system, the data are divided into a plurality of packets, which are transmitted as upload data 5607.

The user processor of the service providing system 110 receives the upload data 5607, decrypts it and examines the digital signature, decompresses the compressed upload data 8717 and compares the obtained data with the terminal data 4607 in the user information server 902 and the other data in user data management information 4600. Then, the service providing system 110 generates the update data 5608, which is a message for updating data in the RAM 1502 of the mobile user terminal 100, and transmits them to the mobile user terminal 100. If a large volume of data is to be transmitted to the mobile user terminal 100, the data are divided into a plurality of packets, which are transmitted as update data 5608.

The mobile user terminal 100 receives the update data 5608, decrypts it, examines the digital signature, decompresses the compressed update data 8726, and updates the data in the RAM 1502.

When the user processor of the service providing system compares the upload data with the other data and finds the illegal alteration of the data, the user processor generates, instead of the update data 5608, a mandatory expiration instruction 5608', which is a message for halting the function of the mobile user terminal 100, and transmits the instruction 5608' to the mobile user terminal 100.

Upon receipt of the mandatory expiration instruction 5608', the mobile user terminal 100 decrypts it, examines the digital signature, and changes the terminal status 1802 to "use disabled." As a result, the use of the mobile user terminal 100 is inhibited.

In FIG. 57C is shown the forcible data updating process performed by the gate terminal 101, the merchant terminal 102, the merchant terminal 103, the accounting machine 3555 (automatic vending machine 104) and the electronic telephone card accounting machine (switching center 105). In FIGS. 88C to 88F are shown the contents of messages that are exchanged by the service providing system 110 and the gate terminal 101, the merchant terminal 102, the merchant terminal 103, the accounting machine 3555, or the electronic telephone card accounting machine 800.

When the data in the RAM and on the hard disk of the gate terminal 101, the merchant terminal 102, the merchant terminal 103, the accounting machine 3555, or the electronic telephone card accounting machine 800 must be urgently updated, such as when the contents of a ticket is changed or the terms of a contract entered into by the service provider and the merchant (the communication service provider for the electronic telephone card accounting machine 800) are changed, the service providing system 110 begins the forcible data updating process.

First, the merchant processor of the service providing system 110 generates a data update instruction 5706, i.e., a message instructing the performance of the forcible data updating process, and transmits it to the gate terminal 101, the merchant terminal 102, the merchant terminal 103, the accounting machine 3555, or the electronic telephone card accounting machine 800.

As is shown in FIG. 88F, the digital signature of a service provider is provided for data that consists of a data update instruction header 8842, which is header information indicating that the message is the data update instruction 5706 and describing the data structure; an update option code 8843; a service provider ID 8844; and an issued time 8845, which indicates the date on which the data update instruction 5706 was issued. These data are closed and addressed to the user, thereby providing the data update instruction 5706.

Upon receiving the data update instruction 5706, the gate terminal 101, the merchant terminal 102, the merchant terminal 103, the accounting machine 3555, or the electronic telephone card accounting machine 800 decrypts it, examines the digital signature, and generates data as designated by the update option code 8843. Then, the gate terminal 101, the merchant terminal 102, the merchant terminal 103, the accounting machine 3555, or the electronic telephone card accounting machine 800 generates upload data 5707, which is a message for uploading the data to the service providing system 110, and transmits the data 5707 to the service providing system.

If a large volume of data is to be uploaded to the service system, the data are divided into a plurality of packets, which are transmitted as upload data 5707.

The merchant processor of the service providing system receives the upload data 5707, and decrypts it and examines the digital signature. The merchant processor then decompresses the compressed upload data 8818 and compares the obtained data with the memory data 4705 in the merchant information server 903 and the other data in merchant data management information 4700. Then, the merchant processor generates the update data 5708, which is a message for updating data in the RAM and on the hard disk of the gate terminal 101, the merchant terminal 102, the merchant terminal 103, the accounting machine 3555, or the electronic telephone card accounting machine 800, and transmits them thereto. If a large volume of data is to be transmitted to the mobile user terminal 100, the data are divided into a plurality of packets, which are transmitted as update data 5708.

The gate terminal 101, the merchant terminal 102, the merchant terminal 103, the accounting machine 3555, or the electronic telephone card accounting machine 800 receives the update data 5708, decrypts it and examines the digital signature, decompresses the compressed update data 8828, and updates the data in the RAM and on the hard disk.

When the merchant processor of the service providing system compares the upload data with the other data and finds the illegal alteration of data, the merchant processor generates, instead of the update data 5708, a mandatory expiration instruction 5708', which is a message for halting the function of the gate terminal 101, the merchant terminal 102, the merchant terminal 103, the accounting machine 3555, or the electronic telephone card accounting machine 800, and transmits the instruction 5708' thereto.

Upon receipt of the mandatory expiration instruction 5708', the gate terminal 101, the merchant terminal 102, the merchant terminal 103, the accounting machine 3555, or the electronic telephone card accounting machine 800 decrypts it and examines the digital signature, and changes the terminal status (or the accounting machine status) to "use disabled." As a result, the use of the gate terminal 101, the merchant terminal 102, the merchant terminal 103, the accounting machine 3555, or the electronic telephone card accounting machine 800 is inhibited.

An explanation will now be given for the contents of messages that the mobile user terminal 100 and the merchant terminal 104 exchange with the service providing system 110 during the processing for the data backup. During this processing, when the remaining battery capacity of the mobile user terminal 100 is small, the contents of the RAM are automatically backed up in the user information server of the service providing system. This process is hereinafter called a data backup process.

In FIG. 56D is shown the data backup process performed by the mobile user terminal 100, and in FIGS. 87A to 87E are shown the contents of messages that are exchanged by the mobile user terminal 100 and the service providing system 110. The data backup process is performed in substantially the same manner as is the data updating process. In the backup process, when the mobile user terminal 100 receives the update data 5612 and updates the data in the RAM 1502, the terminal 100 changes the terminal status 1802 to "writing disabled," and inhibits the input of new data to the RAM until there is an adequate available battery capacity.

When the battery capacity is reduced until it is equal to or smaller than Q, the mobile user terminal 100 generates a data backup request 5609, i.e., a message requesting that the user processor of the service providing system 110 perform the data backup process, and transmits it to the user processor.

The user processor of the service providing system receives the data update request 5609, decrypts it and examines the digital signature, and generates a data update request response 5610, i.e., a message indicating the range of data to be uploaded, and transmits it to the mobile user terminal 100.

The mobile user terminal 100 receives the data update request response 5610, decrypts it and examines the digital signature, and generates data designated by the update option code 8708. Then, the mobile user terminal 100 generates upload data 5611, i.e., a message that indicates to upload the data to the service providing system 110, and transmits the data 5611 to the service providing system 110.

The user processor of the service providing system 110 receives the upload data 5611, decrypts it, and examines the digital signature. Then, the user processor decompresses the compressed upload data 8717, and compares the obtained data with the terminal data 4607 in the user information server 902 and the other data in the user data management information 4600. Then, the user processor generates the update data 5612, which is a message for updating data in the RAM 1502 of the mobile user terminal 100, and transmits them to the mobile user terminal 100.

The mobile user terminal 100 receives the update data 5612, decrypts it and examines the digital signature, decompresses the compressed update data 8726, and updates the data in the RAM 1502. In addition, the mobile user terminal 100 changes the terminal status 1802 to "writing disabled," and inhibits the entry of new data in the RAM until there is an adequate battery capacity.

When the user processor of the service providing system compares the upload data with the other data and finds the illegal alteration of data, the service providing system 110 generates, instead of the update data 5612, a mandatory expiration instruction 5612', which is a message for halting the function of the mobile user terminal 100, and transmits the instruction 5612' to the mobile user terminal 100.

Upon receipt of the mandatory expiration instruction 5612', the mobile user terminal 100 decrypts it, examines the digital signature, changes the terminal status 1802 to "use disabled" and "writing disabled." As a result, the use of the mobile user terminal 100 is inhibited.

Similarly, in FIG. 57D is shown the data backup process performed by the merchant terminal 103, and in FIGS. 88A to 88E are shown the contents of messages that are exchanged by the merchant terminal 103 and the service providing system 110. The data backup process is performed in substantially the same manner as for the data updating process. In the backup process, when the merchant terminal 103 receives the update data 5712 and updates the data in the RAM 3002, the merchant terminal 103 changes the terminal status 3302 to "writing disabled," and inhibits the input of new data to the RAM until there is an adequate available battery capacity.

When the battery capacity is reduced until it is equal to or smaller than Q, the merchant terminal 103 generates a data backup request 5709, i.e., a message requesting that the merchant processor of the service providing system 110 perform the data backup process, and transmits it to the merchant processor.

The merchant processor of the service providing system receives the data update request 5709, decrypts it and examines the digital signature, and generates a data update request response 5710, i.e., a message indicating the range of data to be uploaded, and transmits it to the merchant terminal 103.

The merchant terminal 103 receives the data update request response 5710, decrypts it, examines the digital signature, and generates data designated by the update option code 8809. Then, the merchant terminal 103 generates upload data 5711, i.e., a message that indicates to upload the data to the service providing system 110, and transmits the data 5711 to the service providing system.

The merchant processor of the service providing system receives the upload data 5711, decrypts and it and examines the digital signature. Then, the merchant processor decompresses the compressed upload data 8818, and compares the obtained data with the memory data 4705 in the merchant information server 903 and the other data in the merchant data management information 4700. Then, the merchant processor generates the update data 5712, which is a message for updating data in the RAM 3002 of the merchant terminal 103, and transmits them to the merchant terminal 103.

The merchant terminal 103 receives the update data 5712, decrypts it and examines the digital signature, decompresses the compressed update data 8826, and updates the data in the RAM 3002. In addition, the merchant terminal 103 changes the terminal status 3302 to "writing disabled," and inhibits the entry of new data in the RAM until there is an adequate battery capacity.

When the merchant processor of the service providing system compares the upload data with the other data and finds the illegal alteration of the data, the merchant processor generates, instead of the update data 5712, a mandatory expiration instruction 5712', which is a message for halting the function of the merchant terminal 103, and transmits the instruction 5712' to the merchant terminal 103.

Upon receipt of the mandatory expiration instruction 5712', the merchant terminal 103 decrypts it and examines the digital signature, and changes the terminal status 3302 to "use disabled" and "writing disabled." As a result, the use of the merchant terminal 103 is inhibited.

An explanation will now be given for the contents of messages that are exchanged by devices during the ticket order processing.

In FIG. 58 are shown the procedures used for exchanging messages by the devices during the ticket order processing, and in FIGS. 89A and 89B and FIGS. 90A and 90B are shown the contents of messages that are exchanged by devices during the ticket order processing.

First, when a user displays the ticket order screen on the mobile user terminal 100 and performs a ticket order operation 5800, the mobile user terminal transmits a ticket order 5801 to the service providing system via digital wireless telephone communication.

Figure 89A:
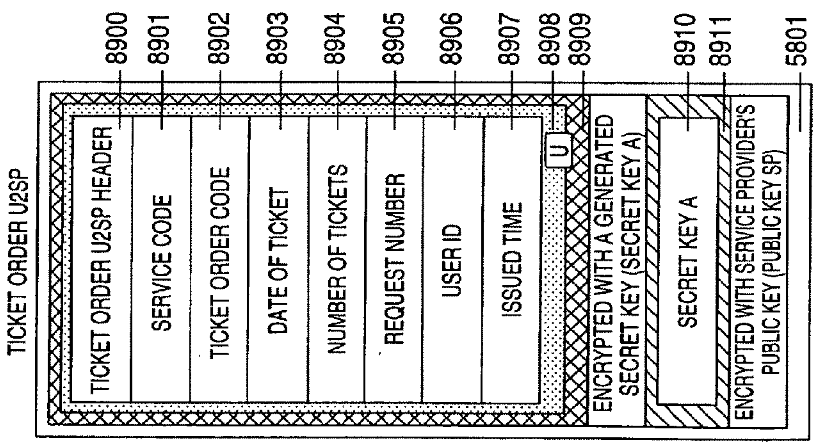

As is shown in FIG. 89A, the digital signature of a user is provided for data that consists of a ticket order header 8900, which is header information indicating that the message is the ticket order 5801 and indicating the data structure; a service code 8901, which identifies the type of service requested by the user; a ticket order code 8902, which identifies the order code of a ticket entered by the user; a desired ticket date 8903; a desired number of tickets 8904; a request number 8905, which is arbitrarily generated as a number that uniquely represents the ticket order processing; a user ID 8906; and an issued time 8907, which indicates the date on which the ticket order 5801 is issued. These data are closed and addressed to the service providing system, thereby providing the ticket order 5801. The service code 8901 identifies the ticket order for a ticket issuer selected by the user.

Upon receiving the ticket order 5801, the user processor of the service providing system 110 decrypts it and examines the digital signature, and transmits it to the service manager processor. Then, the service manager processor generates a service director processor to form a process group for processing a ticket order 8908. The service director processor refers to the ticket issuer list 5203 and generates a ticket order 8920 for the ticket issuer identified by the service code 8901. The ticket issuer processor closes the ticket order 8920 and addresses it to the ticket issuer, and transmits the resultant order as a ticket order 11402 to the ticket issuing system 107.

Figure 89B:
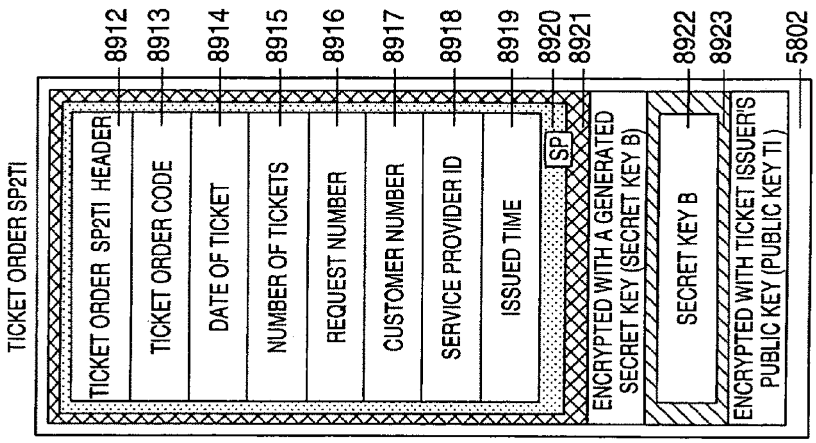

As is shown in FIG. 89B, the digital signature of a service providing system is provided for data that consist of a ticket order header 8912, which is header information indicating that the message is the ticket order 5802 and describing the data structure; a ticket order code 8913; a desired ticket date 8914; a desired number of tickets 8915; a request number 8916; a customer number 8917, which uniquely identifies a user for the ticket issuer; a service provider ID 8918; and an issued time 8919, which indicates the date on which the ticket order 5802 was issued. These data are closed and addressed to the ticket issuer, thereby providing the ticket order 5802.

The customer number 8917 is identification information for a user that is useful only to the ticket issuer, and differs from the user ID or the telephone number. When there was a previous transaction to which the user and the ticket issuer were parties, the customer number that is registered in the customer table of the ticket issuer is designated. The customer table is indicated by using the customer table address 5230 of the ticket issuer list 5203.

Upon receiving the ticket order 5802, the ticket issuing system 107 decrypts it and examines the digital signature. The ticket issuing server 1100 employs the customer information in the customer information server 1101 and the ticket issuing condition of the ticket information server 1103 to generate a ticket order response 5803, which is a message prepared as a response to the ticket order 5802, and transmits it to the service providing system.

Figure 90A:
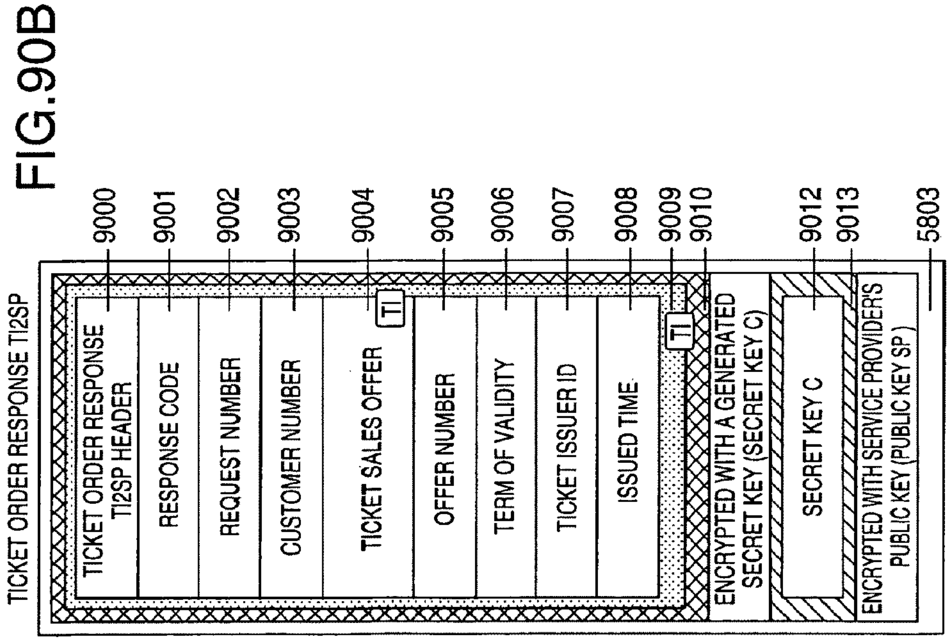

As is shown in FIG. 90A, the digital signature of a ticket issuer is provided for data that consists of a ticket order response header 9000, which is header information indicating that the message is the ticket order response 5803 and describing the data structure; a response code 9001, which identifies the type of response prepared for the ticket order 5802; a request number 9002; a customer number 9003; a ticket sales offer 9004, which constitutes an offer made by the ticket issuer to the user; an offer number 9005, which is an arbitrarily generated number that uniquely represents the offer made to the user; a validity term 9006 for the ticket sales offer 9004; a ticket issuer ID 9007; and an issued time 9008, which indicates the date on which the ticket order response 5803 was issued. These data are closed and addressed to the service provider, thereby providing the ticket order response 5803.

The response code 9001 identifies the type of response prepared for a ticket order, such as "ticket available," "sold out," "over ticket limit," or "ticket order code error."

The ticket sales offer 9004 is text information for the order received from the user, and includes the seat number for an available ticket or the price of a ticket. The digital signature of a ticket issuer is provided for the ticket sales offer. When a ticket can not be issued because all tickets have been sold, the ticket sales offer is not set.

The ticket issuing system 107 can specify a customer using the customer number 8917 that is included in the ticket order 5802. Before generating the ticket order response 5803, the ticket issuing system 107 can change the seat or the price of the ticket included in the ticket sales offer 9004 based on the purchase history of the customer.

Upon receiving the ticket order response 5803, the ticket issuer processor of the service providing system decrypts it and examines the digital signature, and transmits it to the service director processor. The service director processor uses a ticket order response 9009 to generate a ticket order response 9023. The user processor closes the ticket order response 9023 and addresses IT to the user, and transmits it as a ticket order response 5804 to the mobile user terminal.

As is shown in FIG. 90B, the digital signature of a service provider is provided for data that consists of a ticket order response header 9014, which is header information identifying the message as the ticket order response 5804 and describing the data structure; a response code 9015; a response message 9016, which comprises the contents of the response to the ticket order; a request number 9017; a ticket sales offer 9018; an offer number 9019; a validity term 9020 for the ticket sales offer 9018; a service provider ID 9021; and an issued time 9022, which indicates the date on which the ticket order response 5804 was issued. These data are closed and addressed to the user, thereby providing the ticket order response 5804.

The response message 9016 is a standardized text message that the service director processor sets in accordance with the response code 9001. When the response code 9001 is not code indicating "ticket available," a standardized message is prepared that comprises the contents of the response code.

Upon receiving the ticket order response 5804, the mobile user terminal decrypts it and examines the digital signature, and displays the contents of the ticket order response 5804 on the LCD 303. The ticket order processing is thereafter terminated. When the response code 9015 indicates "ticket available," the contents of the ticket sales offer 9018 are displayed. In the other cases, the response message 9016 is displayed.

An explanation will now be given for the contents of messages that are exchanged by devices during the ticket purchase processing.

In FIG. 59 are shown the procedures for the exchange of messages by devices during the ticket purchase processing. In FIGS. 91A and 91B, 92A and 92B, 93A and 93B, 94A and 94B, and 95A and 95B are shown the contents of messages that are exchanged by devices during the ticket purchase processing.

First, when a user performs a ticket purchase order operation 5900, the mobile user terminal transmits a ticket purchase order 5901 to the service providing system through digital wireless telephone communication.

As is shown in FIG. 91A, the digital signature of a user is provided for data that consists of a ticket purchase order header 9100, which is header information identifying the message as the ticket purchase order 5901 and describing the data structure; a response code 9101, which identifies the type of service requested by the user; a ticket sales offer 9102, which is included in the ticket order response 5804; an offer number 9103, which identifies the ticket sales offer 9102; a payment service code 9104, which identifies a credit card designated by the user; a payment value 9105; a payment option code 9106, which identifies a payment option, such as the number of payments designated by the user; a request number 9107, which is an arbitrarily generated number that uniquely represents the ticket purchase processing; a validity term 9108 for the ticket purchase order 5901; a user ID 9109; and an issued time 9110, which is the date on which the ticket purchase order 5901 was issued. These data are closed and addressed to the service provider, thereby providing the ticket purchase order 5901. The service code 9101 identifies the purchase of a ticket from a ticket issuer who issued the ticket sales offer 9102.

Upon receiving the ticket purchase order 5901, the user processor of the service providing system 110 decrypts it and examines the digital signature, and transmits it to the service manager processor. Then, the service manager processor generates a service director processor to form a process group that processes a ticket order 8908. The service director processor refers to the ticket issuer list 5203 and generates a ticket purchase order for the ticket issuer indicated by the service code 9101. The ticket issuer processor closes the ticket order and addresses it to the ticket issuer, and transmits the resultant order as a ticket purchase order 5902 to the ticket issuing system 107.

As is shown in FIG. 91B, the digital signature of a service providing system is provided for data that consists of a ticket purchase order header 9115, which is header information indicating that the message is the ticket purchase order 5902 and describing the data structure; an offer number 9116, which identifies a ticket sales offer issued by the ticket issuer; a payment service code 9117; a payment value 9118; a payment option code 9119; a request number 9120; a customer number 9121, which uniquely represents a user for the ticket issuer; a validity term 9122 for the ticket purchase order 5902; a service provider ID 9123; and an issued time 9124, which is the date on which the ticket purchase order 5902 was issued. These data are closed and addressed to the ticket issuer, thereby providing the ticket purchase order 5902.

When there was a previous transaction to which the user and the ticket issuer were parties, a customer number that is registered in the customer table of the ticket issuer is established as the customer number 9121. When there was no previous transaction, the service director processor generates for the ticket issuer a number that uniquely represents the user, establishes it as the customer number 9121, and registers that number in the customer table. The customer table is designated by using the customer table address 5230 of the ticket issuer list 5203.

Upon receiving the ticket order 5902, the ticket issuing system 107 decrypts it and examines the digital signature. The ticket issuing server 1100 updates the data in the customer information server 1101, the ticket issuing information server 1102 and the ticket information server 1103, generates ticket data (9219) for the ordered ticket, and transmits, to the service providing system, an electronic ticket issuing commission 5903, which constitutes a message requesting the process for issuing an electronic ticket that corresponds to the ticket and the process for settling the price of the ticket.

As is shown in FIG. 92A, the digital signature of a ticket issuer is provided for data that consists of an electronic ticket issuing commission header 9200, which is header information identifying the message as the electronic ticket issuing commission 5903 and describing the data structure; a transaction number 9201, which is an arbitrarily generated number that uniquely identifies a transaction to which a user is a party; a sales value 9202, which conveys the price of a ticket; a clearing option 9203, which indicates which clearing procedures apply; a request number 9204; a ticket code 9205, which identifies the type of electronic ticket that is to be issued; a template code 9206, which identifies a template program to be used for an electronic ticket that is to be issued; a number of tickets 9207, which indicates how many tickets are to be issued; ticket data 9208; representative component information 9209; a ticket issuer ID 9210; and an issued time 9210, which is the date on which the electronic ticket issuing commission 5903 was issued. These data are closed and addressed to the service provider, thereby providing the electronic ticket issuing commission 5903.

The clearing option 9203 is information by which the ticket issuing system designates, to the service providing system, the procedures to be used for clearing the price of a ticket. The clearing process is roughly divided into a spontaneous clearing process for issuing an electronic ticket to a user after the price of the ticket has been cleared, and a delayed clearing process for clearing the price of a ticket after an electronic ticket has been issued. The clearing option 9203 is used to designate either clearing process.

In the delayed clearing process, since an electronic ticket is issued to a user before the clearing process is performed, the user does not have to wait.

For example, based on a purchase history maintained for customers, the ticket issuer can designate the delayed clearing process for a customer with whom it has had dealings and who is known to be trustworthy, and can designate the spontaneous clearing for a customer with whom it has had no previous dealings.

The ticket data 9208 is ticket information issued by the ticket issuer. A number of ticket information items equivalent to the number of tickets 9207 are established as the ticket data 9208. For one ticket, the digital signature of a ticket issuer is provided for data that consist of a ticket ID 9216, ticket information 9217 and a ticket issuer ID 9218, and the ticket information is thereby provided. The ticket information 9217 is ASCII information describing the contents of a ticket. For the ticket information 9217, the title of a ticket, the date, the location, the seat class, the sponsor and whether it can be transferred, and the usage condition information, such as the number of coupon tickets, when the ticket is used as a coupon ticket, are described using a form whereby tag information representing various information types is additionally provided.

The representative component information 9209 is information that is established as the representative component information 1932 for an electronic ticket to be generated. Therefore, the representative component information 9209 may not be set for use.

The ticket issuer processor of the service providing system receives the electronic ticket issuing commission 5903, decrypts it and examines the digital signature, and transmits it to the service director processor. The service director processor performs the electronic ticket issuing process and the ticket price clearing process in accordance with the clearing procedures designated by using the clearing option 9203.

In FIG. 59 is shown the spontaneous clearing process. The delayed clearing process will be described later.

For the spontaneous clearing, the service director processor generates a clearing request 9324, which is a message requesting the clearing of the price of a ticket. The transaction processor closes the clearing request 9324 and addresses it to the transaction processor, and then transmits it as a clearing request 5904 to the transaction processing system 106.

As is shown in FIG. 93B, the digital signature of a service provider is provided for data that consists of a clearing request header 9314, which is header information indicating that the message is the clearing request 5904 and describing the data structure; a user clearing account 9315, which includes a credit card that corresponds to the payment service code designated by the user; a ticket issuer clearing account 9316, which designates the clearing account of a ticket issuer; a payment value 9317; a payment option code 9318; a request number 9319, which is issued by the mobile user terminal 100; a transaction number 9320, which is issued by the ticket issuing system; a validity term 9321, which presents the period during which the clearing request 5904 is effective; a service provider ID 9322; and an issued time 9323, which indicates the date on which the clearing request 5904 was issued. These data are closed and addressed to the transaction processor, thereby providing the clearing request 5904.

The transaction processing system 106 receives the clearing request 5904, decrypts it and examines the digital signature, and performs the clearing process. Then, the transaction processing system 106 generates a clearing completion notification 5905, and transmits it to the service providing system 110.

As is shown in FIG. 94A, the digital signature of a transaction processor is provided for data that consist of a clearing completion notification header 9400, which is header information indicating that the message is the clearing completion notification 5905 and describing the data structure; a clearing number 9401, which is an arbitrarily generated number that uniquely represents the clearing process performed by the transaction processing system 106; a user clearing account 9402; a ticket issuer clearing account 9403; a payment value 9404; a payment option code 9405; a request number 9406; a transaction number 9407; clearing information 9408 for a service provider that is accompanied by the digital signature of the transaction processor; clearing information 9409 for a ticket issuer that is accompanied by the digital signature of the transaction processor; clearing information 9410 for a user that is accompanied by the digital signature of the transaction processor; a transaction processor provider ID 9411; and an issued time 9412, which indicates the date on which the clearing completion notification was issued. These data are closed and addressed to the service provider, thereby providing the clearing completion notification 5905.

Upon receiving the clearing completion notification 5905, the transaction processor processor of the service providing system 110 decrypts it and examines the digital signature, and transmits a clearing completion notification 9413 to the service director processor. Upon receiving the clearing completion notification 9413, the service director processor generates a clearing completion notification 9430 for the ticket issuer. The ticket issuer processor closes the clearing completion notification 9430, and transmits it to the ticket issuing system 107 as a clearing completion notification 5906 for the ticket issuer.

As is shown in FIG. 94B, the digital signature of a service provider is provided for data that consist of a clearing completion notification header 9417, which is header information indicating that the message is the clearing completion notification 5906 and describing the data structure; a clearing number 9418; a customer number 9419; a ticket issuer ID 9420; a payment service code 9421; a payment value 9422; a payment option code 9423; a request number 9424; a transaction number 9425; clearing information 9426 for a ticket issuer that is accompanied by the digital signature of the transaction processor; a transaction processor ID 9427; a service provider ID 9428; and an issued time 9429, which indicates the date on which the clearing completion notification was issued. These data are closed and addressed to the ticket issuer, thereby providing the clearing completion notification 5906.

Upon receiving the clearing completion notification 5906, the ticket issuing system decrypts it and examines the digital signature, and generates a receipt 5907 and transmits it to the service providing system.

As is shown in FIG. 95A, the digital signature of a ticket issuer is provided for data that consists of a receipt header

9500, which is header information indicating that the message is the receipt 5907 and describing the data structure; a customer number 9501; ticket issuing information 9502; a payment service code 9503; a payment value 9504; a payment option code 9505; a request number 9506; a transaction number 9507; clearing information 9508; a transaction processor ID 9509; a ticket issuer ID 9510; and an issued time 9511, which indicates the date on which the receipt 5907 was issued. These data are closed and addressed to the service provider, thereby providing the receipt 5907. The ticket issuing information 9502 is information concerning the ticket issuing process performed by the ticket issuing system, and is accompanied by the digital signature of the ticket issuer.

Upon receiving the receipt 5907, the ticket issuer processor of the service providing system 110 decrypts it and examines the digital signature, and transmits a receipt 9512 to the service director processor. The service director processor employs the receipt 9512 to generate a receipt 9523 for a user.

In addition, the service director processor generates a clearing completion notification 9430 for the ticket issuing system, generates an electronic ticket to be issued to the user, and further generates an electronic ticket issuing message 9227 that includes the electronic ticket that is generated.

The user processor closes the electronic ticket issuing message 9227 and the receipt 9523 while addressing them to the user, and transmits them as an electronic ticket issuing message 5908 and a receipt 5909 to the mobile user terminal 100 via digital wireless communication.

As is shown in FIG. 92B, the digital signature of a service provider is provided for data that consist of an electronic ticket issuing header 9220, which is header information indicating that the message is the electronic ticket issuing message 5908 and describing the data structure; a transaction number 9221; a request number 9222; the number of tickets 9223; electronic ticket data 9224 that are generated; a service provider ID 9225; and an issued time 9226, which indicates the date on which the electronic ticket issuing message 5908 was issued. These data are closed and addressed to the user, thereby providing the electronic ticket issuing message 5908. The electronic ticket data 9224 includes electronic tickets 9231 equivalent in number to the number of tickets 9223.

As is shown in FIG. 95B, the digital signature of a service provider is provided for data that consists of a receipt header 9516, which is header information indicating that the message is the receipt 5909 and describing the data structure; a user ID 9517; a receipt 9518 (9512) obtained by decryption; clearing information 9519 for a user that is accompanied by the digital signature of a transaction processor; ticket issuing information 9520; a service provider ID 9521; and an issued time 9522, which indicates the date on which the receipt 5909 was issued. These data are closed and addressed to the user, thereby providing the receipt 5909. The ticket issuing information 9520 is information for the electronic ticket issuing process performed by the service providing system, and is accompanied by the digital signature of the service provider.

Upon receiving the electronic ticket issuing message 5908 and the receipt 5909, the mobile user terminal decrypts them and examines the digital signatures, enters in the ticket list 1712 an electronic ticket included in the electronic ticket issuing message 5908, enters the receipt 9523 in the use list 1715, and displays the electronic ticket on the LCD 303.

The generation of an electronic ticket by the service director processor is performed as follows.

First, the service director processor refers to the electronic ticket template list 4905 for the ticket issuer that is stored in the ticket issuer information server. Then, by using the electronic ticket template program that is identified by the template code 9206 of the electronic ticket issuing commission 5903, the service director processor generates a ticket program for an electronic ticket. Specifically, the ticket program data 1913 for an electronic ticket are generated using the transaction module and the display module, which are described as being located at the transaction module address 4919, and the display module address 4920 in the electronic ticket template list 4905, and the representative component information 9209 in the electronic ticket issuing commission 5903. When the representative component information 9209 is not present in the electronic ticket issuing commission 5903, the default representative component information located at the default representative component information address 4921 is employed as the information for an electronic ticket.

Following this and based on the usage condition information included in the ticket information 9217, the service director processor generates the ticket status 1907 and the variable ticket information 1908. Whether the ticket status 1907 can be transferred is designated, and when the ticket is used as a coupon ticket, the number of coupons is employed as the variable ticket information 1907. The service director processor generates a new pair consisting of a ticket signature private key and a ticket signature public key, and further generates the ticket program 1901 for an electronic ticket by employing the ticket private key and the gate public key that are registered in the electronic ticket management information 5300.

Furthermore, the service director processor generates an electronic ticket by employing the obtained ticket signature public key to generate the certificate 1903 for the electronic ticket, and by employing the ticket data 9219 in the electronic ticket issuing commission 5903 to generate the presentation ticket 1902 for the electronic ticket.

The procedures for the delayed clearing will now be described.

Figure 60:
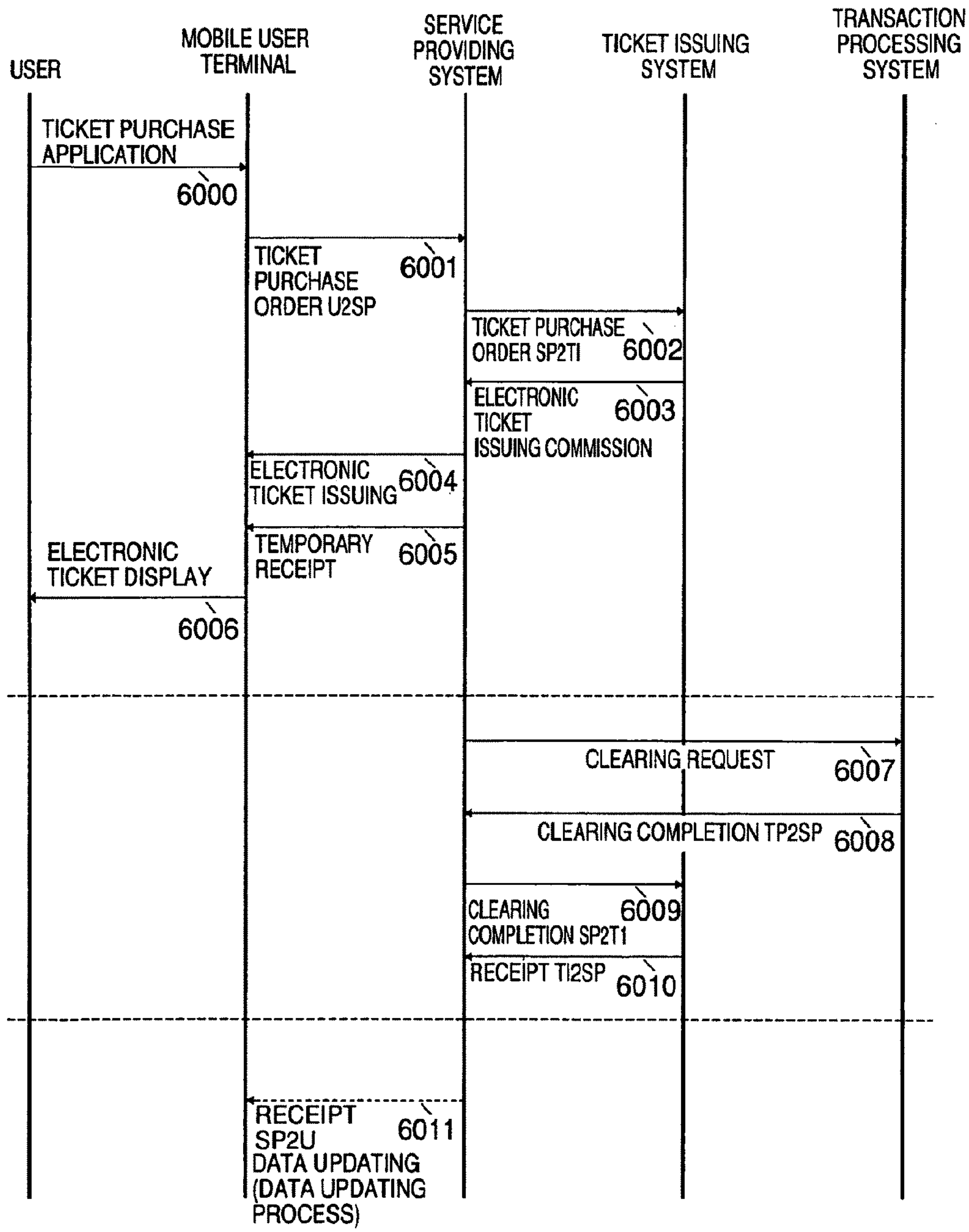
FIG. 60 is a flowchart showing ticket purchase processing (delayed settlement) according to the embodiment of the present invention.

In FIG. 60 are shown the procedures for exchanging messages between the devices in the ticket purchase process for the delayed clearing. The same process is performed as is used for the spontaneous clearing until the ticket issuing system transmits the electronic ticket issuing commission to the service providing system.

When the delayed clearing is designated by the clearing option 9203, the service director processor generates an electronic ticket to be issued to the user, and also generates the electronic ticket issuing message 9227, which includes the generated electronic ticket, and a temporary receipt message 9310, which corresponds to a temporary receipt. The generation of the electronic ticket is performed in the same manner as that used for the spontaneous clearing.

The user processor closes the electronic ticket issuing message 9227 and the temporary receipt 9310 and addresses them to the user, and transmits these messages as an electronic ticket issuing message 6004 and a temporary receipt 6005 to the mobile user terminal 100 via digital wireless telephone communication.

As is shown in FIG. 93A, the digital signature of a service provider is provided for data that consists of a temporary receipt header 9300, which is header information indicating that the message is the temporary receipt 6005 and describing the data structure; a user ID 9301; ticket issuing information 9302; a payment service code 9303; a payment value 9304; a payment option code 9305; a request number 9306; a transaction number 9307; a service provider ID 9308; and an issued time 9309, which indicates the date on which the temporary receipt 6005 was issued. These data are closed and addressed to the user, thereby providing the temporary receipt 6005. The ticket issuing information 9302 is information concerning the electronic ticket issuing process that is performed by the service providing system, and is accompanied by the digital signature of the service provider.

The data structure of the electronic ticket issuing message 6004 is the same as that used for the electronic ticket issuing message 5908.

Upon receiving the electronic ticket issuing message 6004 and the temporary receipt 6005, the mobile user terminal decrypts them and examines the digital signatures, enters an electronic ticket included in the electronic ticket issuing message 6004 in the ticket list 1712, enters the temporary receipt 9310 in the use list 1715, and displays the electronic ticket on the LCD 303.

Following this, the service director processor performs the clearing process for the price of the ticket. First, the service director processor generates a clearing request 9324, which is a message requesting the performance of the clearing process for the price of the ticket. The transaction processor closes the clearing request 9324 and addresses it to the transaction processor, and transmits it as a clearing request 6007 to the transaction processing system 106.

Upon receiving the clearing request 6007, the transaction processing system 106 decrypts it and examines the digital signature, and performs the clearing process. The transaction processing system 106 generates a clearing completion notification 6008 and transmits it to the service providing system 110.

Upon receiving the clearing completion notification 6008, the transaction processor processor of the service providing system 110 decrypts it and examines the digital signature, and transmits a clearing completion notification 9413 to the service director processor. The service director processor employs the received clearing completion notification 9413 to generate a clearing completion notification 9430 for the ticket issuer. And the ticket issuer processor closes the clearing completion notification 9430 and transmits it to the ticket issuing system 107 as a clearing completion notification 6009 for the ticket issuer.

The ticket issuing system decrypts the received clearing completion notification 6009 and examines the digital signature, and generates a receipt 6010 and transmits it to the service providing system.

The ticket issuer processor of the service providing system decrypts the received receipt 6010 and examines the digital signature, and transmits a receipt 9512 to the service director processor. The service director processor employs the receipt 9512 to generate a receipt 9523 for a user.

The receipt 9523 that is generated is not immediately transmitted to the mobile user terminal 100 of the user. When the mobile user terminal has performed the data updating process, the user processor replaces the temporary receipt 9310 in the use list 1715 with the receipt 9523, and transmits the receipt 9523 as one part of the update data 6011 to the mobile user terminal 100.

The data structures of the clearing request 6007, the clearing completion notification 6008, the clearing completion notification 6009 and the receipt 6010 for the delayed clearing are the same as those provided for the clearing request 5904, the clearing completion notification 5905, the clearing completion notification 5906 and the receipt 5907 for the spontaneous clearing.

The delayed clearing process need not be performed immediately after the electronic ticket is issued, and together with the other clearing processes, may be performed, for example, once a day.

An explanation will now be given for the contents of messages that are exchanged by the mobile user terminal 100 and the service providing system 110 during the ticket registration processing.

In FIG. 65A are shown the procedures for exchanging messages between devices in the ticket registration processing, and in FIGS. 106A and 106B are shown the contents of messages that are exchanged by the devices in the ticket registration processing.

First, when the user performs an electronic ticket registration operation 6500, the mobile user terminal generates a ticket registration request 6501 and transmits it to the service providing system via digital wireless telephone communication.

As is shown in FIG. 106A, the digital signature of a user is provided for data that consists of a ticket registration request header 10600, which is header information indicating that the message is the ticket registration request 6501 and describing the data structure; a ticket ID 10601 of a ticket to be registered; a user ID 10602; and an issued time 10603, which indicates the date on which the ticket registration request 6501 was issued. These data are closed and addressed to the service provider, thereby providing the ticket registration request 6501.

The user processor of the service providing system decrypts the received ticket registration request 6501 and examines the digital signature, and transmits the request 6501 to the service manager processor. The service manager processor generates a service director processor to form a process group that processes a ticket registration request 10604. The service director processor ascertains that the electronic ticket indicated by the ticket ID 10601 is registered in the ticket list 4610 for the user in the user information server 902, and registers that electronic ticket in the registered ticket list 5303 for electronic tickets of the service director information server 901. At this time, the service director processor newly generates a ticket signature private key and a ticket signature public key pair. Further, the service director processor generates a registered ticket certificate using the ticket signature public key, and registers it in the registered ticket list 5303. The service director processor then generates a ticket certificate issuing message 13313 using the ticket signature private key and the registered ticket certificate that has been generated. The user processor closes the ticket certificate issuing message 13313 and addresses it to the user, and transmits it as a ticket certificate issuing message 6502 to the mobile user terminal via digital wireless telephone communication.

As is shown in FIG. 106B, the digital signature of a service provider is provided for data that consists of a ticket certificate issuing header 10608, which is header information indicating that the message is the ticket certificate issuing message 6502 and describing the data structure; a ticket digital signature private key 10609; a registered ticket certificate 10610; a service provider ID 10611, and an issued time 10612, which indicates the date on which the ticket certificate issuing message 6502 was issued. These data are closed and addressed to the user, thereby providing the ticket certificate issuing message 6502.

The mobile user terminal 100 decrypts the received ticket certificate issuing message 6502 and examines the digital signature, replaces the ticket signature private key and the ticket certificate of an electronic ticket with the ticket signature private key 10609 and the registered ticket certificate 10610, both of which are included in the ticket certificate issuing message 6502, changes the registration state in the ticket status to the post-registration state, and displays on the LCD the electronic ticket that has been registered (display a ticket that is registered; 6503).

An explanation will now be given for the contents of messages that are exchanged by the gate terminal 101 and the service providing system 110 during the ticket setup processing.

In FIG. 66 are shown procedures for exchanging messages between the devices in the ticket setup processing performed when the merchant sets up, at the gate terminal 101, a ticket to be examined. In FIGS. 109A and 109B are the contents of messages that are exchanged by the devices during the ticket setup processing.

First, when the operator (merchant) of the gate terminal 101 performs a ticket setup operation 6600, the gate terminal generates a ticket setup request 6601 and transmits it to the service providing system via digital telephone communication.

As is shown in FIG. 109A, the digital signature of a merchant is provided for data that consists of a ticket setup request header 10900, which is header information indicating that the message is the ticket setup request 6601 and describing the data structure; a ticket code 10901 entered by the merchant during the ticket setup operation 6600; a gate ID 10902 for the gate terminal; a merchant ID 10903; and an issued time 10904, which indicates the date on which the ticket setup request 6601 was issued. These data are closed and addressed to the service provider, thereby providing the ticket setup request 6601.

The merchant processor of the service providing system decrypts the received ticket setup request 6601 and examines the digital signature, and transmits the request 6601 to the service manager processor. The service manager processor generates a service director processor to form a process group that processes a ticket setup request 10605. The service director processor ascertains that a merchant is registered in the merchant list 5302 for the electronic ticket that is identified by the ticket code 10901 for the service director information server 901. Then, the service director processor generates a ticket setup message 10919 by referring to the electronic ticket management information 5300, which is stored in the service director information server 901 for the pertinent electronic ticket, and the electronic ticket template list 4905, which is stored in the ticket issuer information server 905 of the pertinent ticket issuer (the ticket issuer ID 5306). Specifically, the service director processor generates the ticket setup message 10919 by using the ticket examination module, which is located at the ticket examination module address 4922 in the electronic ticket template list 4905 that is identified by the template code 5312 of the electronic ticket management information 5300, and the ticket public key 5309 and the gate private key 5310, which are registered in the electronic ticket management information 5300. The merchant processor closes the ticket setup 10919 and addresses it to the merchant, and transmits it as a ticket setup message 6602 to the gate terminal via digital telephone communication.

As is shown in FIG. 109B, the digital signature of a service provider is provided for data that consists of a ticket setup header 10909, which is header information indicating that the message is the ticket setup message 6602 and describing the data structure; a ticket name 10910 for an electronic ticket to be issued; a ticket code 10911; a ticket issuer ID 10912; a validity term 10913; a gate private key 10914; a ticket public key 10915; a ticket examination module 10916; a service provider ID 10917; and an issued time 10918, which indicates the date on which the ticket setup message 6602 was issued. These data are closed and addressed to the merchant, thereby providing the ticket setup message 6602.

The mobile user terminal decrypts the received ticket setup message 6602 and examines the digital signature, registers, in the ticket list 2409, electronic ticket examination program information that is included in the ticket setup message 6602, and displays on the touch panel LCD a message indicating that the ticket setup process has been completed (display the setup completion; 6603).

An explanation will now be given for the contents of messages that are exchanged by the mobile user terminal 100 and the gate terminal 101 during the ticket examination processing.

In FIG. 67 are shown procedures for the exchange of messages by the devices during the ticket examination processing, and in FIGS. 110A and 110B and FIGS. 111A and 111B are the contents of the messages that are exchanged by the devices during the ticket examination processing.

First, when a user performs a ticket presentation operation 6700, the mobile user terminal generates a ticket presentation message 6701 by using an electronic ticket to be examined and an arbitrarily generated test pattern, and transmits it to the gate terminal via infrared communication.

As is shown in FIG. 110A, the ticket presentation message 6701 consists of a ticket presentation header 11000, which is header information indicating that the message is the ticket presentation message 6701 and describing the data structure; a service code 11001, which identifies the request for the examination of an electronic ticket; a request number 11002, which is an arbitrarily generated number that uniquely represents the ticket examination process; a ticket 11003 for presenting an electronic ticket to be examined; a ticket certificate 11004; the current ticket status of an electronic ticket that is to be examined; variable ticket information 11006; a ticket ID 11007; an issued time 11008, which indicates the date on which the ticket presentation message 6701 was issued; and a gate test pattern 11010, which is an arbitrarily generated test pattern. The digital signature is provided, using the ticket signature private key of an electronic ticket, for the ticket status 11005, the variable ticket information 11006, the ticket ID 11007 and the issued time 11008. The gate test pattern is encrypted using the gate public key.

The presentation ticket 11003, the ticket certificate 11004, the ticket status 11005, the variable ticket information 11006, the ticket ID 11007 and the issued date 11008 specify the contents of the electronic ticket for the gate terminal, and the gate test pattern 11010 is a test pattern for authorizing the gate terminal.

Upon receiving the ticket presentation message 6701, first, the gate terminal refers to the ticket list 2409, activates a ticket examination module that corresponds to the ticket code of the electronic ticket that is presentation, examines the validity of the contents of the ticket presentation message 6701, and generates a ticket examination message 6702 and transmits it to the mobile user terminal via infrared communication.

In the verification process for the validity of the ticket presentation message 6701, the gate terminal employs the fact that the ticket certificate 11004 is a registered ticket certificate and examines the ticket status 11005 and the variable ticket information 11006 to determine whether an electronic ticket that is to be examined is valid. Then, the gate terminal examines the presentation ticket 11003, the digital signature of the service provider that is provided for the ticket certificate 11004, and the validity term. Further, the gate terminal employs the ticket signature public key of the ticket certificate 11004 to examine the digital signature of the electronic ticket that is provided for the ticket status 11005, the variable ticket information 11006, the ticket ID 11007, and the issued time 11008. Thus, the validity of the ticket presentation message 6701 is verified.

In the generation of the ticket examination message 6702, the gate terminal decrypts the gate test pattern 11010 using the gate private key, and employs the ticket public key to encrypt the ticket test pattern 11108 that is arbitrarily generated.

As is shown in FIG. 110B, the digital signature of a merchant is provided for the data that consists of a ticket examination header 11012, which is header information indicating that the message is the ticket examination message 6702 and describing the data structure; a transaction number 11013; a response message 11014; a request number 11015; a ticket ID 11016; an instruction code 11017; a gate test pattern 11018, which is decrypted; a ticket test pattern 11019, which is an arbitrarily generated test pattern; a gate ID 11021; a merchant ID 11022; and an issued time 11023, which indicates the date on which the ticket examination message 6702 was issued. Thus, the ticket examination 6702 is provided. The ticket test pattern 11019 is encrypted using the ticket public key.

The transaction number 11013 is a number, arbitrarily generated by the gate terminal, that uniquely represents the ticket examination process. When, as a result of the examination of the ticket presentation message 6701, the ticket examination process can not be performed (the electronic ticket is one that can not be examined by the pertinent gate terminal), a value of 0 is set. When the ticket examination process can be performed, a value other than 0 is set.

The response message 11014 is text information constituting the message transmitted by the merchant to the user. When the gate terminal can not examine an electronic ticket that is presented (transaction number=0), data to that effect is included in the response message. The response message is optionally set, and may not be reset.

The instruction code 11017 is command code information for an electronic ticket that indicates how the ticket status and variable ticket information of the electronic ticket can be changed. The instruction code is varied by combining the electronic ticket transaction module and the ticket examination module.

When the mobile user terminal receives the ticket examination message 6702, first, in order to verify the gate terminal the mobile user terminal compares the gate test pattern 11010 with the gate test pattern 11018 included in the ticket examination message 6702, and changes the ticket status and the variable ticket information of the electronic ticket in accordance with the instruction code 11017. Then, the mobile user terminal decrypts the ticket test pattern using the ticket private key, generates a ticket examination response 6703, and transmits it to the gate terminal via infrared communication.

As is shown in FIG. 111A, the digital signature using the ticket signature private key and the digital signature of a user are provided for the data that consist of a ticket examination response header 11100, which is header information indicating that the message is the ticket examination response 6703 and describing the data structure; a ticket examination number 11101, which indicates the order of the ticket examination process; a ticket test pattern 11102, which is decrypted; a ticket status 11103 and variable ticket information 11104, which are modified; a gate ID 11105; a merchant ID 11106; a request number 11107; a transaction number 11108; a ticket code 11109; a ticket ID 11110; and an issued time 11111, which indicates the date on which the ticket examination response 6703 was issued. In this fashion, the ticket examination response 6703 is provided.

Upon receiving the ticket examination response 6703, first, the gate terminal authorizes the electronic ticket by comparing the ticket test pattern 111019 with the ticket test pattern 11102 that is included in the ticket examination response 6703, examines the validity of the contents of the ticket examination response 6703, and generates an examination certificate 6704 and transmits it to the mobile user terminal via infrared communication.

In the verification process for the validity of the ticket examination response 6703, the gate terminal determines whether the ticket status 11103 and the variable ticket information 11104 have been changed in accordance with the instruction code 11107, and examines the digital signature of the ticket examination response 6703.

As is shown in FIG. 111B, the digital signature of a merchant is provided for the data that consist of an examination certificate header 11113, which is header information indicating that the message is the examination certificate 6704 and describing the data structure; examination information 11114, which is text information indicating the contents of the ticket examination process; a ticket ID 11115; a request number 11116; a transaction number 11117; a ticket examination number 111187; a gate ID 11119; a merchant ID 11120; and an issued time 11121, which indicates the date on which the examination certificate 6704 was issued. In this fashion, the examination certificate 6704 is provided.

Upon receiving the examination certificate 6704, the mobile user terminal increments the ticket examination number, registers the examination certificate 6704 as usage information in the use list 1715, and displays the examined electronic ticket on the LCD (display the examined ticket; 6706).

When the gate terminal has transmitted the examination certificate 6704, the gate terminal registers, in the transaction list 2510, the ticket examination response 6703 as history information for the ticket examination process, and displays the results obtained during the ticket examination process on the touch panel LCD (display the results of examination; 6705). When the gate opening/closing device is connected to the gate terminal, the gate is automatically opened (entrance permission 6707).

An explanation will now be given for the contents of messages that are exchanged by the devices during the ticket reference processing.

In FIG. 71 are shown procedures for the exchange of messages by the devices during the ticket reference processing, and in FIGS. 88A to 88D and FIG. 116A are shown the contents of messages that are exchanged during the ticket reference processing.

The ticket reference processing is not performed in accordance with a special processing sequence, but is performed in the data updating process during which the service providing system updates the data in the gate terminal.

Therefore, for the ticket reference process, the procedures for the exchange of messages by the gate terminal and the service providing system, and the contents (data structures) of the messages to be exchanged are the same as those employed for the above described data updating processing.

Compressed upload data 8818 in the upload data 5702 include a ticket examination response that is newly registered in the transaction list 2510 during the ticket examination process conducted during the period extending from the previous performance of the data updating process to the current performance of the data updating process.

During the data updating processing, the merchant processor transmits, to the service manager processor, a message requesting the reference process be performed for the ticket examination response that is uploaded from the gate terminal. The service manager processor generates a service director processor to form a process group for examining the validity of the ticket examination response.

First, the service director processor determines whether the gate ID 11105 and the merchant ID 11106 in the ticket examination response match the gate ID 5215 of the merchant and the merchant ID 5214. Then, the service director processor examines the registered ticket list 5303 in the service director information server 901 to verify that the electronic ticket for which the ticket examination response was issued is registered. The service director processor employs the user public key 5323 to examine the digital signature of the user that accompanies the ticket examination response, and employs the registered ticket certificate to examine the digital signature for the ticket that accompanies the ticket examination response. In addition, the service director processor employs the ticket examination number when examining the matching of the ticket status with the variable ticket information that has been modified, and transmits the result of the examination to the merchant processor. As a result, the ticket examination response is registered in the ticket examination response list.

The merchant processor enters the received ticket reference results in the compressed update data 8828 in the update data 5705, and transmits the data 5705 to the gate terminal.

When an error occurs in the process for verifying the validity of the ticket examination response, the service director processor transmits a message indicating that an error occurred in the management system 908.

Upon receiving the update data 5705, the gate terminal decompresses the update data 8828 and updates the data in the RAM and on the hard disk. At this time, the ticket reference results are registered in the authorization report list 2511 of the gate terminal.

If the firm represented by the merchant differs from that represented by the ticket issuer and a payment is made by the ticket issuer to the merchant who handles the ticket, or if the usage of the ticket is periodically reported to the ticket issuer in accordance with the terms of a contract, in accordance with the ticket examination response that is newly registered in the ticket examination response list, the service director processor generates weekly, for example, a usage condition notification 11606, which is a message for notifying the ticket issuer of the ticket usage condition. The ticket issuer processor closes the notification 11606 and addresses it to the ticket issuer, and transmits it as a usage report 7100 to the ticket issuing system 107.

As is shown in FIG. 116A, the digital signature of a service provider is provided for the data that consists of a usage report header 11600, which is header information indicating that the message is the usage report 7100 and describing the data structure; a ticket ID list 11601 of tickets that are employed; the merchant name 11602 and the merchant ID 11603 of a merchant that handles the ticket; a service provider ID 11604; and an issued time 11605, which indicates the date on which the usage report 7100 was issued. These data are closed and addressed to the ticket issuer, thereby providing the usage report 7100.

Upon receiving the usage report 7100, the ticket issuing system 107 decrypts it and examines the digital signature, and performs such processing as making a payment to the merchant.

An explanation will now be given for the contents of messages that are exchanged by the devices during the ticket transfer processing.

In FIG. 74 are shown procedures for the exchange of messages by the devices during the ticket transfer processing, and in FIGS. 117A and 117B, 118A and 118B, and 119A and 119B are shown the contents of messages that are exchanged during the ticket transfer processing. The ticket transfer process can be performed when the ticket status 1907 of the electronic ticket indicates the transfer enabled state, which is designated by the ticket issuer when issuing a ticket.

In FIG. 74 is shown a case where user A transfers an electronic ticket to user B. The procedures for the exchange of messages by the devices belonging to users A and B are the same for infrared communication as they are for digital wireless communication. The data structures of messages are also the same.

In FIG. 74, first, when user A performs a ticket transfer process 7400, the mobile user terminal of user A transmits a ticket transfer offer 7401, which is a message offering to transfer an electronic ticket, to the mobile user terminal of user B. When at this time the mobile user terminals of user A and user B are connected, communication between user A and user B is performed via digital wireless telephone. When the mobile user terminals are not connected, infrared communication is employed.

As is shown in FIG. 117A, the digital signature of user A is provided for the data consisting of a ticket transfer offer header 11700, which is header information indicating that the message is the ticket transfer offer 7401 and describing the data structure; a transfer offer number 11701, which is an arbitrarily generated number that uniquely represents the ticket transfer process; a presentation ticket 11702 and a ticket certificate 11703 for an electronic ticket to be transferred; a ticket status 11704; variable ticket information 11705; a ticket ID 11706; an issued time 11707, which indicates the date on which the ticket transfer offer 7401 was issued; and a user public key certificate 11709. In this fashion, the ticket transfer offer 7401 is provided. The digital signature of the electronic ticket is provided, using the ticket signature private key, for the ticket status 11704, the variable ticket information 11705, the ticket ID 11706 and the issued time 11707.

The digital signature of the service provider is provided for the data that consist of a user public key header 11710; the user public key 11711 of user A; a public key certificate ID 11712, which is ID information for the public key certificate; a certificate validity term 11713; a service provider ID 11714; and a certificate issued time 11715. In this fashion, the user public key certificate 11709 is provided.

Upon receiving the ticket transfer offer 7401, the mobile user terminal of user B examines the presentation ticket 11702, the ticket certified 11703, and the digital signature of the service provider and the validity term of the public key certificate 11709. Then, the mobile user terminal examines the digital signature of the electronic ticket that is provided for the ticket status 11704, the variable ticket information 11705, the ticket ID 11706 and the issued time 11707, and the digital signature of user A accompanying the ticket transfer offer 7401, and verifies the contents of the ticket transfer offer 7401. In accordance with the presentation ticket 11702, the ticket status 11704 and the variable ticket information 11705, the mobile user terminal then displays, on the LCD, the contents of the electronic ticket that is to be transferred (display the transfer offer; 7402).

When user B performs a transfer offer acceptance operation 7403, the mobile user terminal of user B transmits, to the mobile user terminal of user A, a ticket transfer offer response 7404, which is a response message for the ticket transfer offer 7401.

As is shown in FIG. 117B, the digital signature of user B is provided for the data that consist of a ticket transfer offer response header 11716, which is header information indicating that the message is the ticket transfer offer response 7404 and describing the data structure; an acceptance number 11717; a transfer offer number 11718; a ticket ID 11719; an issued time 11720, which indicates the date on which the ticket transfer offer response 7404 was issued; and a user public key certificate 11721. In this fashion, the ticket transfer offer response 7404 is provided.

The user public key certificate 11721 is a public key certificate for user B. To provide this certificate 11721, the digital signature of the service provider is provided for the data that consist of a user public key certificate header 11722; a user public key 11723 for user B; a public key certificate ID 11724, which is ID information for the public key certificate; a certificate validity term 11725; a service provider ID 11726; and a certificate issued time 11727.

The acceptance number 11717 is arbitrarily generated, by the mobile user terminal of user B, as a number that uniquely represents the ticket transfer processing. With this number, the mobile user terminal of user A is notified as to whether user B has accepted the ticket transfer offer 7401. When user B does not accept the ticket transfer offer 7401, a value of 0 is set as the acceptance number 11717. When user B accepts the ticket transfer offer 7401, a value other than 0 is set.

Upon receiving the ticket transfer offer response 7404, the mobile user terminal of user A displays, on the LCD, the contents of the ticket transfer offer response 7404 (display the transfer offer response; 7405). When the ticket transfer offer 7401 is accepted (acceptance number 11717≠0), the mobile user terminal of user A examines the digital signature of the service provider of the user public key certificate 11721 and the validity term. The mobile user terminal generates a ticket transfer certificate 7406, which is a message that corresponds to a transfer certificate for an electronic ticket to user B, and transmits it to the mobile user terminal of user B.

As is shown in FIG. 118A, the digital signature of the electronic ticket and the digital signature of user A are provided for the data that consist of a ticket transfer certificate header 11800, which is header information indicating that the message is the ticket transfer certificate 7406 and describing the data structure; a presentation ticket 11801 for an electronic ticket to be transferred; a ticket status 11802; variable ticket information 11803; a transfer offer number 11804; an acceptance number 11805; a public key certificate ID 11806 for the user public key certificate of user B; a public key certificate ID 11807 for the user public key certificate of user A; a ticket ID 11808; and an issued time 11809, which indicates the date on which the ticket transfer certificate 7406 was issued. These data are closed and addressed to user B, thereby providing the ticket transfer certificate 7406.

Upon receiving the ticket transfer certificate 7406, the mobile user terminal of user B decrypts it and examines the digital signature of user A and the one accompanying the electronic ticket. Further, the mobile user terminal compares the ticket ID presented by the ticket transfer offer 7401 with the ticket ID 11808, and compares the public key certificate IDs 11806 and 11807 with the public key certificates of users B and A to verify the contents of the ticket transfer certificate 7406. The mobile user terminal then generates a ticket transfer receipt 7407, which is a message indicating the electronic ticket has been received, and transmits the receipt 7407 to the mobile user terminal of user A.

As is shown in FIG. 118B, the digital signature of user B is provided for the data that consist of a ticket transfer receipt header 11815, which is header information indicating that the message is the ticket transfer receipt 7407 and describing the data structure; a ticket ID 11816; a transfer offer number 11817; an acceptance number 11818; a public key certificate ID 11819 for the user public key certificate of user A; a public key certificate ID 11820 for the user public key certificate of user B; and an issued time 11821, which indicates the date on which the ticket transfer receipt 7407 was issued. These data are closed and addressed to user A, thereby providing the ticket transfer receipt 7407.

Upon receiving the ticket transfer receipt 7407, the mobile user terminal of user A decrypts it, and examines the digital signature of user B. Further, the mobile user terminal compares the public key certificate IDs 11819 and 11820 with the public key certificates of users B and A to verify the contents of the ticket transfer receipt 7407. The mobile user terminal then erases the transferred electronic ticket from the ticket list 1712, and registers the ticket transfer receipt 11822 in use history 1715. At this time, addresses in the object data area at which the transfer offer number, the code information indicating the ticket transfer process, the issued time for the ticket transfer receipt 7407 and the ticket transfer receipt 11822 are stored are assigned to the request number 1840 in the use list 1715, the service code 1841, the use time 1842 and the use information address 1843.

The mobile user terminal of user A displays, on the LCD, a message indicating the completion of the transfer process (display the transfer process; 7408). The process at the mobile user terminal of user A (sender) is thereafter terminated.

After transmitting the ticket transfer receipt 7407, the mobile user terminal of user B displays the received ticket transfer certificate 11811 on the LCD. In addition, the mobile user terminal displays a dialogue message inquiring whether the transfer process with the service providing server (process for downloading the received electronic ticket from the service providing system) should be immediately performed (display the transfer certificate; 7409).

The dialogue message has two operating menus: "transfer process request" and "cancel." When "cancel" is selected, the transfer process performed with the service providing server is canceled, and in the process (data updating process) during which the service providing system updates the data in the mobile user terminal, an electronic ticket that has been transferred is assigned to the mobile user terminal.

When user B selects "transfer process request" (transfer process request operation; 7410), based on the ticket transfer certificate 11811 the mobile user terminal generates a ticket transfer request 7411, which is a message requesting that the transfer process be performed with the service providing system, and transmits it to the service providing system via digital wireless telephone communication.

As is shown in FIG. 119A, the digital signature of user B is provided for the data that consists of a ticket transfer request header 11900, which is header information indicating that the message is the ticket transfer request 7411 and describing the data structure; a decrypted ticket transfer certificate 11901 (11811); the user ID 11902 of user B; and an issued time 11903, which indicates the date when the ticket transfer request 7411 was issued. These data are closed and addressed to the service provider, thereby providing the ticket transfer request 7411.

Upon receiving the ticket transfer request 7411, the user processor of user B of the service providing system 110 decrypts it and examines the digital signature, and transmits it to the service manager processor. The service manager processor generates a service director processor to form a process group for processing the ticket transfer request 11904.

The service director processor, first refers to the user list 5200 and specifies the recipient (user B) and the sender (user A) of the transfer process by employing the public key certificate IDs 11806 and 11807 in the ticket transfer certificate 11901 that is included in the ticket transfer request 11904.

The service director processor examines the digital signature of the user A and the digital signature accompanying the electronic ticket, which are provided for the ticket transfer certificate 11901, and verifies the validity of the ticket transfer certificate 11901. Following this, the service director processor exchanges the user ID 5317 for the user A with that for the user B in the user list 5301 for the electronic ticket that is stored in the service director information server 901, and erases the electronic ticket to be transferred from the ticket list of the user A that is stored in the user information server 902. Then, the service director processor changes the ticket signature private key and ticket signature public key pair and the ticket certificate for a new key pair and a ticket certificate, and also changes the ticket status and the variable ticket information to the ticket status 11802 and to the variable ticket information 11803 for the ticket transfer certificate 11901. The service director processor generates an electronic ticket received from user A, and enters it in the ticket list 4610 for the user B.

When the electronic ticket that is to be transferred has already been registered, the service director processor updates the registered ticket list 5303 holding the electronic ticket. Specifically, the user ID 5322, the user public key 5323, the registered ticket certificate address 5324, the ticket examination response list address 5325 and the former user information address 5326, all of which are in the registered ticket list 5303, are updated (to the information for user B). The old information (information for user A) is pointed to at the former user information address 5326 as former user information 5327.

The service director processor generates a ticket transfer message 11915, which includes an electronic ticket transferred from user A. The user processor of user B closes the message 11915 and addresses it to the user B, and transmits it as a ticket transfer message 7412 to the mobile user terminal of user B via digital wireless telephone communication.

As is shown in FIG. 119B, the digital signature of the service provider is provided for the data that consist of a ticket transfer header 11908, which is header information indicating that the message is the ticket transfer 7412 and describing the data structure; a transfer number 11909, which is an arbitrarily generated number that represents the transfer process in the service providing system; transfer information 11910; an acceptance number 11911; an electronic ticket 11912, which is transferred; a service provider ID 11913; and an issued time 11914, which indicates the date when the ticket transfer message 7412 was issued. These data are closed and addressed to the user B, thereby providing the ticket transfer message 7412.

The transfer information 11910 is information concerning the electronic ticket transfer process performed by the service providing system, and is accompanied by the digital signature of the service provider.

The mobile user terminal of user B decrypts the received ticket transfer message 7412 and examines the digital signature, registers the electronic ticket 11912 in the ticket list 1712, and displays the electronic ticket on the LCD (display the electronic ticket; 7413). The ticket transfer process is thereafter terminated.

An explanation will now be given for the contents of messages that are exchanged by the devices during the ticket installation processing.

In FIG. 77 are shown procedures for the exchange of messages by the devices during the ticket installation processing, and in FIGS. 123A and 123B, and 124A and 124B are shown the contents of messages that are exchanged during the ticket installation processing.

First, when the user performs an electronic ticket installation operation 7700, the mobile user terminal generates an electronic ticket installation request 7701, and transmits it to the service providing system 110 via digital wireless telephone communication.

As is shown in FIG. 123A, the digital signature of the user is provided for the data that consists of an electronic ticket installation request header 12300, which is header information indicating that the message is the electronic ticket installation request 7701 and describes the data structure; an installation card number 12301 and an installation number 12302, which are entered by a user; a request number 12303, which is an arbitrarily generated number that uniquely represents the electronic ticket installation process; a user ID 12304; and an issued time 12305, which indicates the date when the electronic ticket installation request 7701 was issued. These data are closed and addressed to the service provider, thereby providing the electronic ticket installation request 7701.

Upon receiving the electronic ticket installation request 7701, the user processor of the service providing system 110 decrypts it and examines the digital signature, and transmits it to the service manager processor. The service manager processor generates a service director processor to form a process group for processing the electronic ticket installation request 12306.

First, the service director processor refers to the installation card list that is indicated by the installation card list address 5229 for the ticket issuer list 5203, and specifies a ticket issuer who issues a ticket that is represented by the installation number 12301. The service director processor generates a ticket installation request 12317, which is a message requesting that the ticket issuer issue a ticket using the installation card. The ticket issuer processor closes the request 12317 and addresses it to the ticket issuer, and transmits it as a ticket installation request 7702 to the ticket issuing system 107.

As is shown in FIG. 123B, the digital signature of the service provider is provided for the data that consist of a ticket installation request header 12310, which is header information indicating that the message is the ticket installation request 7702 and describing the data structure; an installation card number 12311; an installation number 12312; a request number 12313; a customer number 12314, which uniquely represents a user for the ticket issuer; a service provider ID 12315; and an issued time 12316, which indicates the date when the ticket installation request 7702 was issued. These data are closed and addressed to the ticket issuer, thereby providing the ticket installation request 7702.

Upon receiving the ticket installation request 7702, the ticket issuing system 107 decrypts it and examines the digital signature. The ticket issuing server 1100 compares the installation card number 12311 and the installation number 12312, which are included in the ticket installation request 7702, with the management information for the issued electronic ticket installation card that is stored in the ticket issuing information server 1102. The ticket issuing server 1100 then updates the data in the customer information server 1102 and the ticket issuing information server 1103. Furthermore, the ticket issuing server generates ticket data (12406) for a requested ticket, and transmits, to the service providing system, an electronic ticket installation commission 7703, which is a message requesting the installation of an electronic ticket that corresponds to the requested ticket.

As is shown in FIG. 124A, the digital signature of the ticket issuer is provided for the data that consists of an electronic ticket installation commission header 12400, which is header information indicating that the message is the electronic ticket installation commission 7703 and describing the data structure; a transaction number 12401, which is an arbitrarily generated number that uniquely represents the transaction with a user; ticket issuing information 12402; a request number 12403; ticket code 12404, which indicates the type of electronic ticket that is to be issued; a template code 12405, which indicates a template program for an electronic ticket to be issued; ticket data 12406; representative component information 12407; a ticket issuer ID 12408; and an issued time 12409, which indicates the date when the electronic ticket installation commission 7703 was issued. These data are closed and addressed to the service provider, thereby providing the electronic ticket installation commission 7703.

The ticket issuing information 12402 is information concerning the ticket issuing process performed by the ticket issuing system, and is accompanied by the digital signature of the ticket issuer.

The ticket data 12406 is ticket information issued by the ticket issuer, wherein the digital signature of the ticket issuer accompanies the data that consists of the ticket ID 12414, the ticket information 12415 and the ticket ID 12416.

The ticket issuer processor of the service providing system decrypts the received electronic ticket installation commission 7703 and examines the digital signature, and transmits the commission 7703 to the service director processor. In accordance with the electronic ticket installation commission 12410, the service director processor generates an electronic ticket to be issued to a user, using the same procedures as are used for the ticket purchase processing, and also generates an electronic ticket installation message 12415, which is a message directing that the electronic ticket be installed in the mobile user terminal. The user processor closes the electronic ticket installation message 12455 and addressees it to a user, and transmits it as an electronic ticket installation message 7704 to the mobile user terminal via digital wireless telephone communication.

As is shown in FIG. 124B, the digital signature of the service provider is provided for the data that consists of an electronic ticket installation header 12417, which is header information indicating that the message is the electronic ticket installation message 7704 and describing the data structure; a transaction number 12418; ticket issuing information 12419, which concerns the ticket issuing process performed by the ticket issuing system; ticket issuing information 12420, which concerns the ticket issuing process performed by the service providing system; a request number 12421; generated electronic ticket code 12422; a service provider ID 12423; and an issued time 12424, which indicates the date when the electronic ticket installation message 7704 was issued. These data are closed and addressed to the user, thereby providing the electronic ticket installation message 7704. The ticket issuing information 12419 and the ticket issuing information 12420 are accompanied by the digital signatures of the ticket issuer and the service provider.

The mobile user terminal decrypts the received electronic ticket installation message 7704 and examines the digital signature, registers, in the ticket list 1712, the electronic ticket included in the electronic ticket installation request 7704, and displays the installed electronic ticket on the LCD (display the electronic ticket; 7705).

An explanation will now be given for the contents of messages that are exchanged by the devices during the ticket modification processing.

In FIG. 80 are shown procedures for the exchange of messages by the gate terminal 101, the service providing system 110 and the ticket issuing system 107 during the processing performed to modify the ticket examination program of the gate terminal. In FIG. 129A and FIGS. 88C, 88D and 88F are shown the contents of messages that are exchanged by the gate terminal 101, the service providing system 110 and the ticket issuing system 107 during the ticket modification processing. In FIG. 81 are shown procedures for the exchange of messages by the mobile user terminal 100, the service providing system 110 and the ticket issuing system 107 during the processing performed to modify the electronic ticket of the mobile user terminal. In FIGS. 129A and 129B, and FIGS. 130A and 130B are shown the contents of messages that are exchanged by the mobile user terminal 100, the service providing system 110 and the ticket issuing system 107.

When the contents of a ticket that was issued must be altered because an event was changed or an error was found when the ticket was issued, the ticket issuing system generates a modification request 8000 or 8100, which is a message requesting the modification of a ticket that was issued, and transmits it to the service providing system.

As is shown in FIG. 129A, the digital signature of the ticket issuer is provided for the data that consist of a modification request header 12900, which is header information indicating that the message is the modification request 8000 or 8100 and describing the data structure; a modification number 12901, which is an arbitrarily generated number that uniquely represents the ticket modification processing; a modification code 12902; a modification time limit 12903, which indicates the time limit for the modification; a modification message 12904; a ticket code 12905, which indicates the type of electronic ticket that is to be modified; a template code 12906, which identifies a template program for a modified electronic ticket; a ticket count 12907 that indicates the number of electronic tickets to be modified; modified ticket data 12908; modified representative component information 12909; a ticket issuer ID 12910; and an issued time 12911, which indicates the date when the ticket modification request 8000 was issued. These data are closed and addressed to the service provider, thereby providing the ticket modification request 8000 or 8100.

The modification code 12902 is code information that identifies the type of ticket modification processing, and that indicates the modification of the electronic ticket information 1917, the modification of the representative component information 1932, the modification of the template program, or the modification accompanied by the ticket refund processing will be performed.

The modification message 12904 specifies the contents of the modification, and is accompanied by the digital signature of the ticket issuer.

The ticket data 12908 is modified ticket information for an electronic ticket to be modified. Tickets in a number equivalent to the ticket count 12907 are set as ticket data 12908. The ticket information is obtained by providing the digital signature of the ticket issuer for the data that consists of the ticket ID 12916, the ticket information 12917 and the ticket issuer ID 12918. When no modification of the electronic ticket information is to take place, the ticket data 12908 are not set.

The representative component information 10209 is set as the modified representative component information 1932 for an electronic ticket that is to be modified. When no modification is scheduled for the representative component information 1932, the representative component information 10209 is not set.

The ticket issuer processor of the service providing system 110 decrypts the received modification request 8000 or 8100 and examines the digital signature, and transmits the request to the service manager processor. The service manager processor generates a service director processor to form a process group for processing the modification request 12912. Then, the service director processor changes the electronic ticket of the mobile user terminal and the ticket examination program of the gate terminal in accordance with the modification request 12912. The ticket examination program for the gate terminal is changed when the template program is modified.

An explanation will now be given for the processing performed to change the ticket examination program for the gate terminal.

First, the service director processor generates a new ticket examination program by employing the ticket examination module, which is pointed to at the ticket examination module address 4922 in the electronic ticket template list 4905 indicated by the template code 12906, and the ticket public key 5309 and the gate private key 5310, which are registered in the electronic ticket management information 5300. Then, the service director processor refers to the examination ticket list 4711 for the gate terminal of the merchant who is registered in the merchant list 5302 to obtain the electronic ticket that is to be modified, and specifies that the gate terminal for which the electronic ticket to be modified is registered is an electronic ticket that the gate terminal is to examine. The service director processor transmits, to the merchant processor of the gate terminal that is specified, a message requesting the performance of the forcible data updating process to update the ticket examination program.

The merchant processor of the specified gate terminal performs the forcible data updating process, and modifies the ticket examination program of the gate terminal. At this time, the procedures for the exchange of messages by the gate terminal and the service providing system, and the contents (data structures) of the messages that are exchanged are the same as those employed for the forcible data updating processing that was previously described.

The merchant processor inserts the new ticket examination program into the compressed update data 8828 of the update data 5708, and transmits the resultant data to the gate terminal as the update data 5708.

Upon receiving the update data 5708, the gate terminal decompresses the update data 8828, and updates the data in the RAM and on the hard disk. At this time, the ticket examination program is also registered in the ticket list 2409 of the gate terminal.

An explanation will now be given for the processing for modifying an electronic ticket in the mobile user terminal. First, the service director processor refers to the user list 5301 for an electronic ticket to be modified, and specifies a user who owns the electronic ticket that is to be modified. The service director processor generates a modification notification 12928, which is a message for notifying the specified user of the modification of the electronic ticket. The user processor for the specified user closes the modification notification 12928, addresses it to the user, and transmits it as a modification notification 8101 to the mobile user terminal via digital wireless telephone communication.

As is shown in FIG. 129B, the digital signature of the service provider is provided for the data that consist of a modification notification header 12920, which is header information indicating that the message is the modification notice 8101 and describing the data structure; a modification number 12921; a modification code 12922; a ticket ID 12923; a modification message 12924; a reply time limit 12925, which specifies the time limit for the transmission of a replay (reaction selection 8104) by the user to the modification notice 8101; a service provider ID 12926; and an issued time 12927, which indicates the date on which the modification notice 8101 was issued. These data are closed and addressed to the user, thereby providing the modification notice 8101.

Upon receiving the modification notice 8101, the mobile user terminal decrypts it and examines the digital signature, outputs a call arrival tone to notify the user of the reception of the modification notice 8101, and displays a modification message 12924 on the LCD (display the modification notice; 8102). For example, when the date has been changed, a message to that effect and a message requesting that the user select an action, either "accept," "refuse" or "refund," in response to the modification are displayed.

When, in response to the message displayed on the LCD, the user employs the number key switches to select an action in response to the modification (reaction selection operation 8103), the mobile user terminal generates a reaction selection message 8104, which contains the response of the user to the modification notice 8101, and transmits it to the service providing system via the digital wireless telephone communication. When the user selects "refuse" or "refund," the mobile user terminal changes the ticket status 1907 of the electronic ticket to the use disabled state.

As is shown in FIG. 130B, the digital signature of the user is provided for the data that consists of a reaction selection header 13000, which is header information indicating that the message is the reaction selection message 8104 and describing the data structure; a modification number 13001; a reaction code 13002, which identifies the type of reaction to the modification that the user selected; a ticket ID 13004, which is a number that is arbitrarily generated, by the mobile user terminal, that uniquely represents the ticket modification; a user ID 13005; and an issued time 13006, which indicates the date on which the selection message 8104 was issued. These data are closed and addressed to the service provider, thereby providing the reaction selection message 8104.

The user processor of the service providing system decrypts the received reaction selection message 8104, examines the digital signature, and transmits it to the service director processor. The service director processor updates the contents of an electronic ticket, or refunds the cost of the ticket in accordance with the reaction code 13002 contained in the reaction selection message 13007. When the user selects "refuse," the service director processor changes to the use disabled state the ticket status 4647 of the corresponding electronic ticket in the ticket list 4610 for the user, which is stored in the user information server 902. When the reaction code 13002 represents "accept," in response to the modification request 8100, the service director processor generates a new electronic ticket using the same procedures as those used during the ticket purchase processing. In addition, the service director processor generates a modification instruction 13017, which is a message for instructing the modification of a ticket, and transmits it to the user processor. The user processor changes a corresponding electronic ticket in the user ticket list 4610 to an electronic ticket that is included in the modification instruction 13017. The user processor closes the modification instruction 13017 and addresses it to the user, and transmits it as a modification instruction 8105 to the mobile user terminal via digital wireless telephone communication.

As is shown in FIG. 130A, the digital signature of the service provider is provided for the data that consists of a modification reaction header 13011, which is header information indicating that the message is the modification instruction 8105 and describing the data structure; a modification number 13012; a request number 13013; new electronic ticket data 13014; a service provider ID 13015; and an issued time 13016, which indicates the date on which the modification instruction 8105 was issued. These data are closed and addressed to the user, thereby providing the modification instruction 8105.

Upon receiving the modification instruction 8105, the mobile user terminal decrypts it and examines the digital signature. Then, instead of the old electronic ticket, the mobile user terminal registers in the ticket list 1712 the new electronic ticket 13014 that is included in the modification instruction 8105, and displays the new electronic ticket on the LCD (display the ticket; 8106).

An explanation will now be given for the contents of the messages that are exchanged by the devices during the ticket refund processing.

Figure 83:
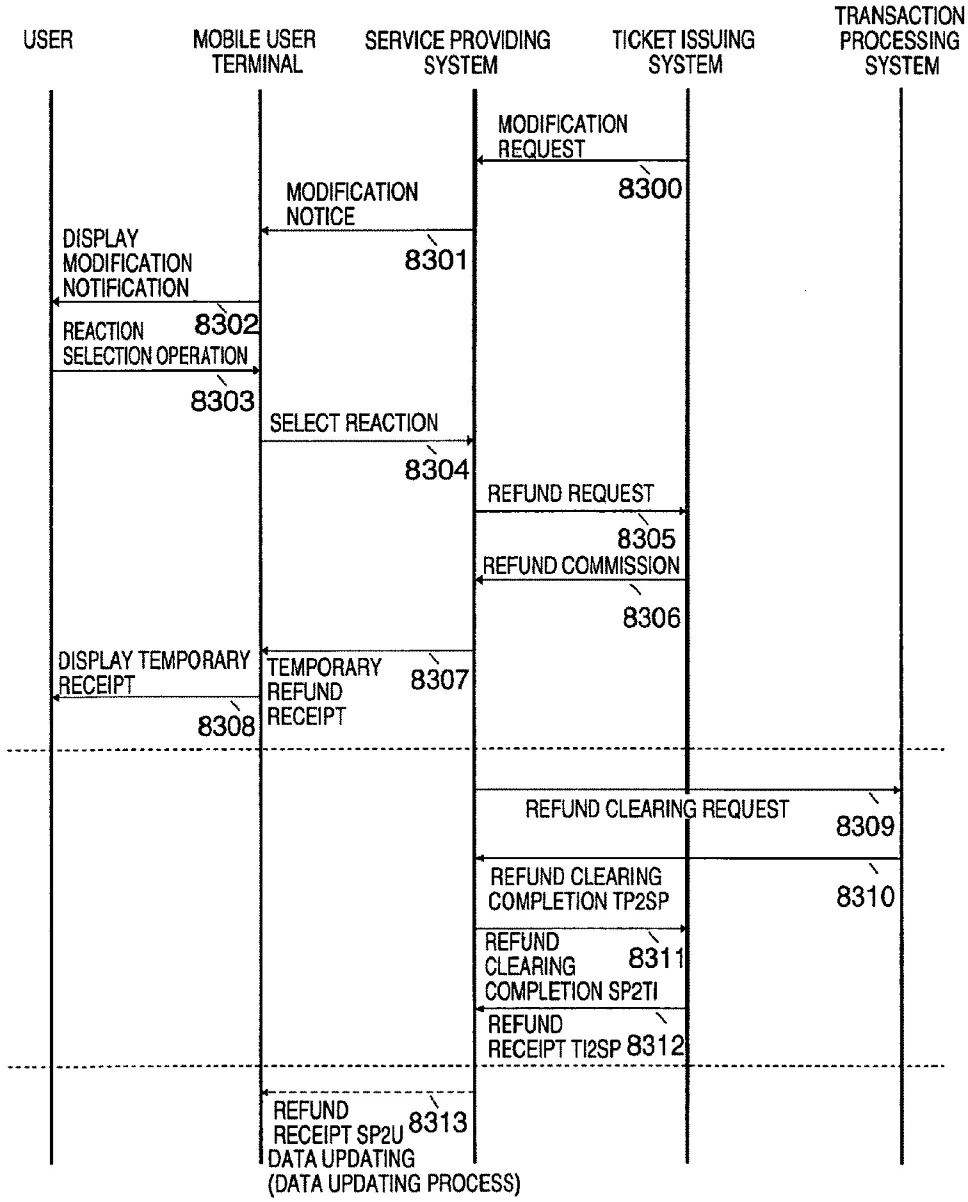
FIG. 83 is a flowchart showing ticket refund processing (delayed settlement) according to the embodiment of the present invention.

In FIG. 82 are shown procedures for exchanging messages when the ticket refund processing is performed by immediate clearing. In FIGS. 131A and 131B, 133A and 133B, and 134A and 134B are shown the contents of messages that are exchanged by the devices during the ticket refund processing. In FIG. 83 are shown procedures for exchanging messages when the ticket refund processing is performed by delayed clearing. In FIGS. 131A and 131B, 132A and 132B, 133A and 133B, and 134A and 134B are shown the contents of messages that are exchanged by the devices.

The ticket refund process is performed when the user selects "refund" during in the ticket modification process (when the reaction code 13002 of the reaction selection message 13007 represents "refund"). Therefore, the message exchanging procedures up to the reaction selection 13007 are transmitted by the user processor to the service director processor, and the contents of those messages are the same as those employed for the ticket modification processing.

When the reaction code 13002 indicates "refund," the service director processor generates a refund request 13107, which is a message requesting that the ticket issuer refund the cost of the ticket. The ticket issuer processor closes the request 13107, addressing it to the ticket issuer, and transmits it as a refund request 8205 or 8305 to the ticket issuing system.

As is shown in FIG. 131A, the digital signature of the service provider is provided for the data that consist of a refund request header 13100, which is header information indicating that the message is a refund request and describing the data structure; a modification number 13101; a ticket ID 13102 for a ticket for which the cost is to be refunded; a request number 13103; a customer number 13104; a service provider ID 13105; and an issued time 13106, which indicates the date on which the refund request was issued. These data are closed and addressed to the ticket issuer, thereby providing the refund request 8205 or 8305.

Upon receiving the refund request 8205 or 8305, the ticket issuing server 1100 of the ticket issuing system updates data in the customer information server 1101, the ticket issuing information server 1102 and the ticket information server 1103, cancels the issued ticket, generates a refund commission 8206, which is a message requesting that the service providing system perform the refund process for an electronic ticket, and transmits the commission 8206 to the service providing system.

As is shown in FIG. 131B, the digital signature of the ticket issuer is provided for the data that consists of a refund commission header 13111, which is header information indicating that the message is the refund commission and describing the data structure; a transaction number 13112, which is an arbitrarily generated number that uniquely represents the ticket refund processing; a refund amount 13113; a clearing option 13114; a ticket ID 13115; a request number 13116; a ticket issuer ID 13117; and an issued time 13118, which indicates the date when the refund commission was issued. These data are closed and addressed to the service provider, thereby providing the refund commission 8206 or 8306.

The ticket issuer processor of the service providing system decrypts the received refund commission 8206 or 8306 and examines the digital signature, and transmits it to the service director processor. When the clearing option 13114 in the refund commission 13119 represents immediate clearing, the service director processor performs the refund process using immediate clearing. When the clearing option 13114 represents delayed clearing, the service director processor performs the ticket refund process using delayed clearing.

An explanation will now be given for the ticket refund process that uses immediate clearing.

In FIG. 82, upon receiving a refund commission 13119, the service director processor generates a refund clearing request 13222, which is a message requesting the performance of the refund clearing process. The transaction processor closes the request 13222 and addresses it to the transaction processor, and transmits it as a refund clearing request 8207 to the transaction processing system 106.

As is shown in FIG. 132B, the digital signature of the service provider is provided for the data that consists of a refund clearing request header 13212, which is header information indicating that the message is the refund clearing request 8207 and describing the data structure; a user clearing account 13213; a ticket issuer clearing account 13214, which indicates the clearing account of the ticket issuer; a refund amount 13215; a refund option code 13216; a request number 13217, which is issued by the mobile user terminal 100; a transaction number 13218, which is issued by the ticket issuing system; a validity term 13219, which specifies a period during which the refund clearing request 5904 is valid; a service provider ID 13220; and an issued time 13221, which indicates the date when the refund clearing request 5904 was issued. These data are closed and addressed to the transaction processor, thereby providing the refund clearing request 8207.

Upon receiving the refund clearing request 8207, the transaction server 1000 of the transaction processing system updates data in the subscriber information server 1001, the member store information server 102 and the transaction information server 103, performs the refund clearing process, and generates for the service providing system a refund clearing completion notification 8208 that is a message indicating that the refund clearing has been completed.

As is shown in FIG. 133A, the digital signature of the transaction processor is provided for the data that consists of a refund clearing completion notification header 13300, which is header information indicating that the message is the refund clearing notification 8208 and describing the data structure; a clearing number 13301, which is an arbitrarily generated number that uniquely represents the clearing process performed by the transaction processing system 106; a user clearing account 13302; a ticket issuer clearing account 13303; a refund amount 13304; a refund option code 13305; a request number 13306; a transaction number 13307; clearing information 13308 for a service provider that is accompanied by the digital signature of the transaction processor; clearing information 13309 for a ticket issuer that is accompanied by the digital signature of the transaction processor; a transaction processor ID 13311; and an issued time 13312, which indicates the date when the refund clearing completion notification was issued. These data are closed and addressed to the service provider, thereby providing the refund clearing completion notification 8208.

The transaction processor of the service providing system 110 decrypts the received refund clearing completion notification 8208 and examines the digital signature, and transmits the refund clearing completion notification 13313 to the service director processor. The service director processor employs the refund clearing completion notification 13313 to generate a refund clearing completion notification 13329 for the ticket issuer. The ticket issuer processor closes the notification 13329, addresses it to the ticket issuer, and transmits it as a refund clearing completion notification 8209 to the ticket issuing system 107.

As is shown in FIG. 133B, the digital signature of the service provider is provided for the data that consist of a refund clearing completion notification header 13317, which is header information indicating that the message is the refund clearing notification 8209 and describing the data structure; a clearing number 13318; a customer number 13319; a ticket issuer ID 13320; a refund amount 13321; a clearing option 13322; a request number 13323; a transaction number 13324; clearing information 13325 for a ticket issuer that is accompanied by the digital signature of the transaction processor; a transaction processor ID 13326; a service provider ID 13327; and an issued time 13328, which indicates the date when the refund clearing completion notification was issued. These data are closed and addressed to the ticket issuer, thereby providing the refund clearing completion notification 8209.

The ticket issuing system decrypts the received refund clearing completion notification 8209 and examines the digital signature, generates a refund receipt 8210, and transmits it to the service providing system.

As is shown in FIG. 134A, the digital signature of the ticket issuer is provided for the data that consists of a refund receipt header 13400, which is header information indicating that the message is the refund receipt 8210 and describing the data structure; a customer number 13201; refund information 13402; a refund amount 13403; a request number 13404; a transaction number 13405; a clearing number 13406; a transaction processor ID 13407; a ticket issuer ID 13408; and an issued time 13409, which indicates the date when the refund receipt 8210 was issued. These data are closed and addressed to the service provider, thereby providing the refund receipt 8210. The refund information 13402 concerns the refund process performed by the ticket issuing system, and is accompanied by the digital signature of the ticket issuer.

The ticket issuer processor of the service providing system 110 decrypts the received refund receipt 8210 and examines the digital signature, and transmits the refund receipt 13410 to the service director processor. The service director processor employs the refund receipt 13410 to generate a refund receipt 13421 to be transmitted to the user.

When the service director processor has transmitted the refund clearing completion notification 13329 to the ticket issuing system, the service director processor erases from the user ticket list 4610 stored in the user information server 902 the electronic ticket for which the refund was effected.

The user processor closes the refund receipt 13421, addressing it to the user, and transmits it as a refund receipt 8211 to the mobile user terminal 100 via digital wireless telephone communication.

As is shown in FIG. 134B, the digital signature of the service provider is provided for the data that consists of a refund receipt header 13414, which is header information indicating that the message is the refund receipt 8211 and describing the data structure; a user ID 13415; a decrypted refund receipt 13416 (13410); clearing information 13417 for a user that is accompanied by the digital signature of the transaction processor; refund information 13418; a service provider ID 13419; and an issued time 13420, which indicates the date when the refund receipt 8211 was issued. These data are closed and addressed to the user, thereby providing the refund receipt 8211. The refund information 13418 concerns the electronic ticket refund process performed by the service providing system, and is accompanied by the digital signature of the service provider.

The mobile user terminal decrypts the received refund receipt 8211 and examines the digital signature, erases from the check list 1712 the electronic ticket for which the refund was effected, registers the refund receipt 13421 in the use list 1715, and displays the refund receipt 13421 on the LCD 303 (display the refund receipt; 8212).

An explanation will now be given for the ticket refund processing performed with the delayed clearing. In FIG. 83, the procedures up to the time the ticket issuing system transmits a refund commission to the service providing system are the same as are those for the immediate clearing.

When the delayed clearing is designated in accordance with the clearing option 13114, the service director processor generates a temporary refund receipt 13208 that corresponds to a temporary receipt for the refund process. The user processor closes the temporary refund receipt 13208, addressing it to the user, and transmits it as a temporary refund receipt 8307 to the mobile user terminal 100 via digital wireless telephone communication.

As is shown in FIG. 132A, the digital signature of the service provider is provided for the data that consist of a temporary refund receipt header 13200, which is header information indicating that the message is the temporary refund receipt 8307 and describe the data structure; a user ID 13201; refund information 13202; a refund amount 13203; a request number 13204; a transaction number 13205; a service provider ID 13206; and an issued time 13207, which indicates the date when the temporary refund receipt 8307 was issued. These data are closed and addressed to the user, thereby providing the temporary refund receipt 8307. The refund information 13202 concerns the electronic ticket refund process performed by the service providing system, and is accompanied by the digital signature of the service provider.

The mobile user terminal decrypts the received temporary refund receipt 8307 and examines the digital signature, erases the electronic ticket that is refund from the check list 1712, registers the temporary refund receipt 13208 to the use list 1715, and displays the temporary refund receipt 13208 on the LCD 303 (display the refund receipt; 8308).

The service director processor thereafter performs the refund clearing processing.

First, the service director processor generates the refund clearing request 13222, which is a message requesting the performance of the refund clearing process. The transaction processor processor closes the request 13222, addressing it to the transaction processor, and transmits it as a refund clearing request 8309 to the transaction processing system 106.

The transaction processing system 106 decrypts the received refund clearing request 8309 and examines the digital signature, and performs the refund clearing process. Then, the transaction processing system 106 generates a refund clearing completion notification 8310, and transmits it to the service providing system 110.

The transaction processor of the service providing system 110 decrypts the received refund clearing completion notification 8310 and examines the digital signature, and transmits a refund clearing completion notification 13313 to the service director processor. The service director processor employs the refund clearing completion notification 13313 to generate the refund clearing completion notification 13329 for the ticket issuer. The ticket issuer processor closes the notification 13329, addressing it to the ticket issuer, and transmits it to the ticket issuing system 107 as a refund clearing completion notification 8311 for the ticket issuer.

The ticket issuing system decrypts the received refund clearing completion notification 8311 and examines the digital signature, and generates a refund receipt 8312 and transmits it to the service providing system.

The ticket issuer processor of the service providing system 110 decrypts the received refund receipt 8312 and examines the digital signature, and transmits a refund receipt 13410 to the service director processor. The service director processor employs the refund receipt 13410 to generate a refund receipt 13412 for the user.

The generated refund receipt 13412 is not immediately transmitted to the mobile user terminal 100 of the user, but when the mobile user terminal 100 performs the data updating process, the user processor replaces the temporary refund receipt 13208 in the use list 1715 with the refund receipt 13421, and transmits it as a part of the update data 8313 to the mobile user terminal 100.

The data structures of the refund clearing request 8309, the refund clearing completion notification 8310, the refund clearing completion notification 8311 and the refund receipt 8312 for the delayed clearing are the same as those used for the refund clearing request 8207, the refund clearing completion notification 8208, the refund clearing completion notification 8209 and the refund receipt 8210 for the immediate clearing.

The refund clearing process with the delayed clearing is not necessarily performed immediately after the temporary refund receipt is issued, and may be performed, for example, once a day with another clearing process.

An explanation will now be given for the contents of messages that are exchanged by devices in various processes for electronic payment card service.

First, an explanation will be given for the contents of messages that are exchanged by devices during the payment card purchase processing.

In FIG. 61 are shown the procedures for the exchange of messages by devices during the payment card purchase processing. In FIGS. 96A and 96B, 97A and 97B, 98A and 98B, 99A and 99B, and 100A and 100B are shown the contents of messages that are exchanged by devices during the payment card purchase processing.

First, when a user performs a payment card purchase order operation 6100, the mobile user terminal transmits a payment card purchase order 6101 to the service providing system through digital wireless telephone communication.

As is shown in FIG. 96A, the digital signature of a user is provided for data that consists of a payment card purchase order header 9600, which is header information identifying the message as the payment card purchase order 6101 and describing the data structure; a response code 9601, which identifies the type of service requested by the user; a card order code 9602, which identifies an order code for a payment card that is entered by the user; a number of payment cards 9603 that the user has entered; a payment service code 9604, which identifies a credit card designated by the user; a payment value 9605; a payment option code 9606, which identifies a payment option, such as the number of payments designated by the user; a request number 9607, which is an arbitrarily generated number that uniquely represents the payment card purchase processing; a validity term 9608 for the payment card purchase order 6101; a user ID 9609; and an issued time 9610, which is the date on which the payment card purchase order 6101 was issued. These data are closed and addressed to the service provider, thereby providing the payment card purchase order 6101. The service code 8901 identifies the purchase order of a payment card to a payment card issuer who is selected by the user.

Upon receiving the payment card purchase order 6101, the user processor of the service providing system 110 decrypts it and examines the digital signature, and transmits it to the service manager processor. Then, the service manager processor generates a service director processor to form a process group that processes a payment card order 9611. The service director processor refers to the payment card issuer list 5204 and generates a payment card purchase order 9626 for the payment card issuer indicated by the service code 9601. The payment card issuer processor closes the payment card order and addresses it to the payment card issuer, and transmits the resultant order as a payment card purchase order 6102 to the payment card issuing system 108.

As is shown in FIG. 96B, the digital signature of a service providing system is provided for data that consists of a payment card purchase order header 9615, which is header information indicating that the message is the payment card purchase order 6102 and describing the data structure; a card order code 9616; a number of cards 9617 that are purchased; a payment service code 9618; a payment value 9619; a payment option code 9620; a request number 9621; a customer number 9622, which uniquely represents a user for the payment card issuer; a validity term 9623 for the payment card purchase order 6102; a service provider ID 9624; and an issued time 9625, which is the date on which the payment card purchase order 6102 was issued. These data are closed and addressed to the payment card issuer, thereby providing the payment card purchase order 6102.

When there was a previous transaction to which the user and the payment card issuer were parties, a customer number that is registered in the customer table of the payment card issuer is established as the customer number 9622. When there was no previous transaction, the service director processor generates for the payment card issuer a number that uniquely represents the user, establishes it as the customer number 9622, and registers that number in the customer table. The customer table is designated by using the customer table address 5237 of the payment card issuer list 5204.

Upon receiving the payment card purchase order 6102, the payment card issuing system 108 decrypts it and examines the digital signature. The payment card issuing server 1200 updates the data in the customer information server 1201, the payment card issuing information server 1202 and the payment card information server 1203, generates payment card data (9719) for the ordered payment card, and transmits, to the service providing system, an electronic payment card issuing commission 6103, which constitutes a message requesting the process for issuing an electronic payment card that corresponds to the payment card and the process for settling the price of the payment card.

As is shown in FIG. 97A, the digital signature of a payment card issuer is provided for data that consists of an electronic payment card issuing commission header 9700, which is header information identifying the message as the electronic payment card issuing commission 6103 and describing the data structure; a transaction number 9701, which is an arbitrarily generated number that uniquely identifies a transaction to which a user is a party; a sales value 9702, which conveys the price of a payment card; a clearing option 9703, which indicates which clearing procedures apply; a request number 9704; a payment card code 9705, which identifies the type of electronic payment card that is to be issued; a template code 9706, which identifies a template program to be used for an electronic payment card that is to be issued; a number of payment cards 9707, which indicates how many payment cards are to be issued; payment card data 9708; representative component information 9709; a payment card issuer ID 9710; and an issued time 9711, which is the date on which the electronic payment card issuing commission 6103 was issued. These data are closed and addressed to the service provider, thereby providing the electronic payment card issuing commission 6103.

The clearing option 9703 is information by which the payment card issuing system designates, to the service providing system, the procedures to be used for clearing the price of a payment card. The clearing process is roughly divided into a spontaneous clearing process for issuing an electronic payment card to a user after the price of the payment card has been cleared, and a delayed clearing process for clearing the price of a payment card after an electronic payment card has been issued. The clearing option 9703 is used to designate either clearing process.

In the delayed clearing process, since an electronic payment card is issued to a user before the clearing process is performed, the user does not have to wait.

For example, based on a purchase history maintained for customers, the payment card issuer can designate the delayed clearing process for a customer with whom it has had dealings and who is known to be trustworthy, and can designate the spontaneous clearing for a customer with whom it has had no previous dealings.

The payment card data 9708 is payment card information issued by the payment card issuer. A number of payment card information items equivalent to the number of payment cards 9707 are established as the payment card data 9708. For one payment card, the digital signature of a payment card issuer is provided for data that consist of a card ID 9716, card information 9717 and a payment card issuer ID 9718, and the payment card information is thereby provided. The payment card information 9717 is ASCII information describing the contents of a payment card. For the payment card information 9717, the title of a payment card, the face value of the payment card that is issued, the usage condition, an issuer, and whether it can be transferred, are described using a form whereby tag information representing information types is additionally provided.

The representative component information 9709 is information that is established as the representative component information 2032 for an electronic payment card to be generated. Therefore, the representative component information 9709 may not be set for use.

The payment card issuer processor of the service providing system receives the electronic payment card issuing commission 6103, decrypts it and examines the digital signature, and transmits it to the service director processor. The service director processor performs the electronic payment card issuing process and the payment card price clearing process in accordance with the clearing procedures designated by using the clearing option 9703.

In FIG. 61 is shown the spontaneous clearing process. The delayed clearing process will be described later.

For the spontaneous clearing, the service director processor generates a clearing request 9824, which is a message requesting the clearing of the price of a payment card. The transaction processor closes the clearing request 9824 and addresses it to the transaction processor, and then transmits it as a clearing request 6104 to the transaction processing system 106.

As is shown in FIG. 98B, the digital signature of a service provider is provided for data that consists of a clearing request header 9814, which is header information indicating that the message is the clearing request 6104 and describing the data structure; a user clearing account 9815, which includes a credit card that corresponds to the payment service code designated by the user; a payment card issuer clearing account 9816, which designates the clearing account of a payment card issuer; a payment value 9817; a payment option code 9818; a request number 9819, which is issued by the mobile user terminal 100; a transaction number 9820, which is issued by the payment card issuing system; a validity term 9821, which presents the period during which the clearing request 6104 is effective; a service provider ID 9822; and an issued time 9823, which indicates the date on which the clearing request 6104 was issued. These data are closed and addressed to the transaction processor, thereby providing the clearing request 6104.

The transaction processing system 106 receives the clearing request 6104, decrypts it and examines the digital signature, and performs the clearing process. Then, the transaction processing system 106 generates a clearing completion notification 6105, and transmits it to the service providing system 110.

As is shown in FIG. 99A, the digital signature of a transaction processor is provided for data that consist of a clearing completion notification header 9900, which is header information indicating that the message is the clearing completion notification 6105 and describing the data structure; a clearing number 9901, which is an arbitrarily generated number that uniquely represents the clearing process performed by the transaction processing system 106; a user clearing account 9902; a payment card issuer clearing account 9903; a payment value 9904; a payment option code 9905; a request number 9906; a transaction number 9907; clearing information 9908 for a service provider that is accompanied by the digital signature of the transaction processor; clearing information 9909 for a payment card issuer that is accompanied by the digital signature of the transaction processor; clearing information 9910 for a user that is accompanied by the digital signature of the transaction processor; a transaction processor provider ID 9911; and an issued time 9912, which indicates the date on which the clearing completion notification was issued. These data are closed and addressed to the service provider, thereby providing the clearing completion notification 6105.

Upon receiving the clearing completion notification 6105, the transaction processor processor of the service providing system 110 decrypts it and examines the digital signature, and transmits a clearing completion notification 9913 to the service director processor. Upon receiving the clearing completion notification 9913, the service director processor generates a clearing completion notification 9930 for the payment card issuer. The payment card issuer processor closes the clearing completion notification 9930, and transmits it to the payment card issuing system 107 as a clearing completion notification 6106 for the payment card issuer.

As is shown in FIG. 99B, the digital signature of a service provider is provided for data that consist of a clearing completion notification header 9917, which is header information indicating that the message is the clearing completion notification 6106 and describing the data structure; a clearing number 9918; a customer number 9919; a payment card issuer ID 9920; a payment service code 9921; a payment value 9922; a payment option code 9923; a request number 9924; a transaction number 9925; clearing information 9926 for a payment card issuer that is accompanied by the digital signature of the transaction processor; a transaction processor ID 9927; a service provider ID 9928; and an issued time 9929, which indicates the date on which the clearing completion notification was issued. These data are closed and addressed to the payment card issuer, thereby providing the clearing completion notification 6106.

Upon receiving the clearing completion notification 6106, the payment card issuing system decrypts it and examines the digital signature, and generates a receipt 6107 and transmits it to the service providing system.

As is shown in FIG. 100A, the digital signature of a payment card issuer is provided for data that consists of a receipt header 10000, which is header information indicating that the message is the receipt 6107 and describing the data structure; a customer number 10001; payment card issuing information 10002; a payment service code 10003; a payment value 10004; a payment option code 10005; a request number 10006; a transaction number 10007; clearing information 10008; a transaction processor ID 10009; a payment card issuer ID 10010; and an issued time 10011, which indicates the date on which the receipt 6107 was issued. These data are closed and addressed to the service provider, thereby providing the receipt 6107. The payment card issuing information 10002 is information concerning the payment card issuing process performed by the payment card issuing system, and is accompanied by the digital signature of the payment card issuer.

Upon receiving the receipt 6107, the payment card issuer processor of the service providing system 110 decrypts it and examines the digital signature, and transmits a receipt 10012 to the service director processor. The service director processor employs the receipt 10012 to generate a receipt 10023 for a user.

In addition, the service director processor generates a clearing completion notification 9930 for the payment card issuing system, generates an electronic payment card to be issued to the user, and further generates an electronic payment card issuing message 9227 that includes the electronic payment card that is generated.

The user processor closes the electronic payment card issuing message 9227 and the receipt 10023 while addressing them to the user, and transmits them as an electronic payment card issuing message 6108 and a receipt 6109 to the mobile user terminal 100 via digital wireless communication.

As is shown in FIG. 97B, the digital signature of a service provider is provided for data that consist of an electronic payment card issuing header 9720, which is header information indicating that the message is the electronic payment card issuing message 6108 and describing the data structure; a transaction number 9721; a request number 9722; the number of payment cards 9723; electronic payment card data 9724 that are generated; a service provider ID 9725; and an issued time 9726, which indicates the date on which the electronic payment card issuing message 6108 was issued. These data are closed and addressed to the user, thereby providing the electronic payment card issuing message 6108. The electronic payment card data 9724 includes electronic payment cards 9731 equivalent in number to the number of payment cards 9723.

As is shown in FIG. 100B, the digital signature of a service provider is provided for data that consists of a receipt header 10016, which is header information indicating that the message is the receipt 6109 and describing the data structure; a user ID 10017; a receipt 10018 (10012) obtained by decryption; clearing information 10019 for a user that is accompanied by the digital signature of a transaction processor; payment card issuing information 10020; a service provider ID 10021; and an issued time 10022, which indicates the date on which the receipt 6109 was issued. These data are closed and addressed to the user, thereby providing the receipt 6109. The payment card issuing information 10020 is information for the electronic payment card issuing process performed by the service providing system, and is accompanied by the digital signature of the service provider.

Upon receiving the electronic payment card issuing message 6108 and the receipt 6109, the mobile user terminal decrypts them and examines the digital signatures, enters in the payment card list 1713 an electronic payment card included in the electronic payment card issuing message 6108, enters the receipt 10023 in the use list 1715, and displays the electronic payment card on the LCD 303.

The generation of an electronic payment card by the service director processor is performed as follows.

First, the service director processor refers to the electronic payment card template list 5005 for the payment card issuer that is stored in the payment card issuer information server. Then, by using the electronic payment card template program that is identified by the template code 9706 of the electronic payment card issuing commission 6103, the service director processor generates a payment card program for an electronic payment card. Specifically, the payment card program data 2013 for an electronic payment card are generated using the transaction module and the representation module, which are described as being located at the transaction module address 5019, and the representation module address 5020 in the electronic payment card template list 5005, and the representative component information 9709 in the electronic payment card issuing commission 6103. When the representative component information 9709 is not present in the electronic payment card issuing commission 6103, the default representative component information located at the default representative component information address 5021 is employed as the information for an electronic payment card.

Following this and based on the payment card information included in the card information 9717, the service director processor generates the card status 2007 and the total remaining value 2008. Whether the card status 2007 can be transferred is designated, and the face value of the payment card that is issued is set as the total remaining value 2007. The service director processor generates a new pair consisting of a card signature private key and a card signature public key, and further generates the payment card program 2001 for an electronic payment card by employing the card private key and the accounting machine public key that are registered in the electronic payment card management information 5400.

Furthermore, the service director processor generates an electronic payment card by employing the obtained card signature public key to generate the certificate 2003 for the electronic payment card, and by employing the payment card data 9719 in the electronic payment card issuing commission 6103 to generate the presentation card 2002 for the electronic payment card.

The procedures for the delayed clearing will now be described.

Figure 62:
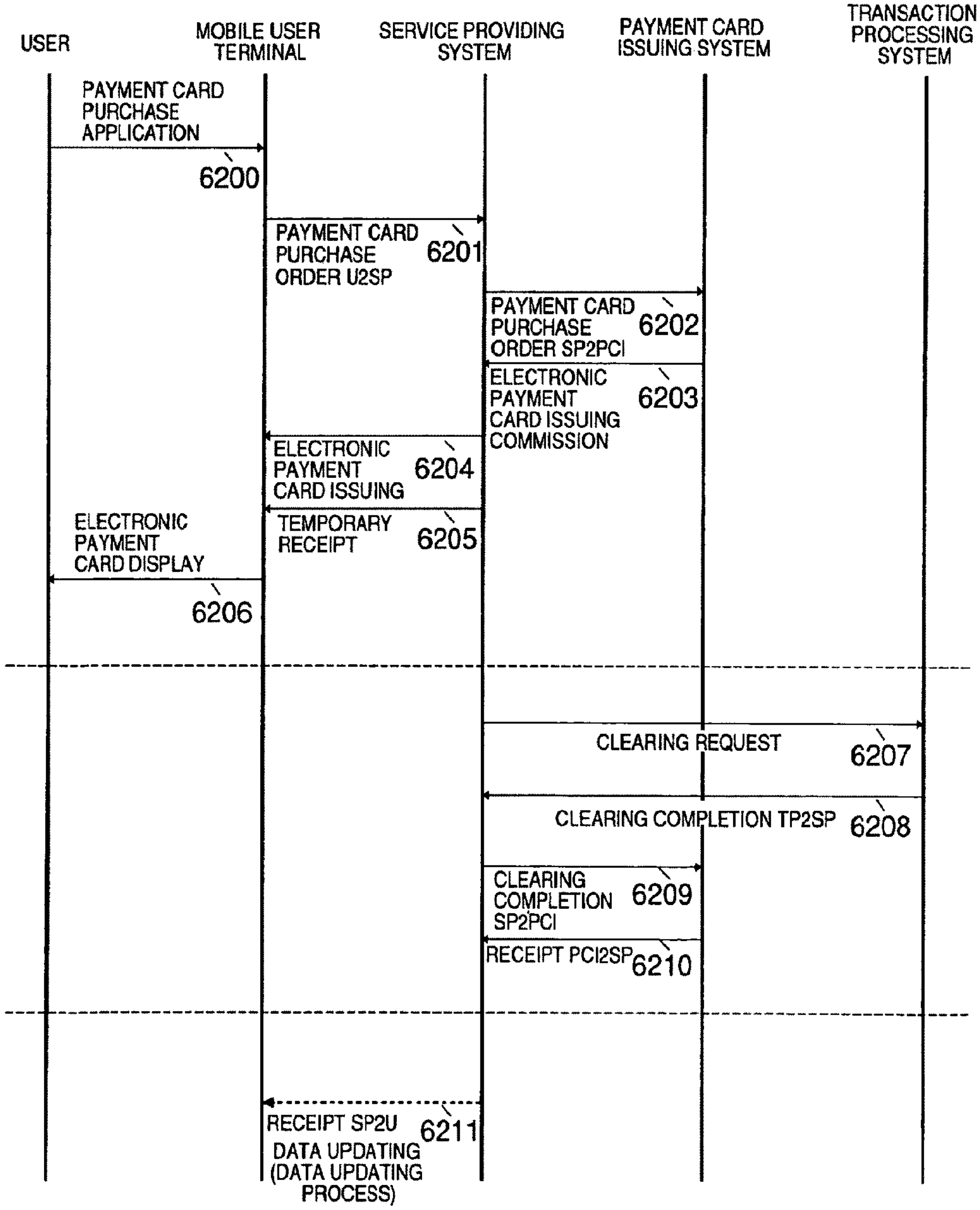
FIG. 62 is a flowchart showing payment card purchase processing (delayed settlement) according to the embodiment of the present invention.

In FIG. 62 are shown the procedures for exchanging messages between the devices in the payment card purchase process for the delayed clearing. The same process is performed as is used for the spontaneous clearing until the payment card issuing system transmits the electronic payment card issuing commission to the service providing system.

When the delayed clearing is designated by the clearing option 9703, the service director processor generates an electronic payment card to be issued to the user, and also generates the electronic payment card issuing message 9727, which includes the generated electronic payment card, and a temporary receipt message 9810, which corresponds to a temporary receipt. The generation of the electronic payment card is performed in the same manner as that used for the spontaneous clearing.

The user processor closes the electronic payment card issuing message 9727 and the temporary receipt 9810 and addresses them to the user, and transmits these messages as an electronic payment card issuing message 6204 and a temporary receipt 6205 to the mobile user terminal 100 via digital wireless telephone communication.

As is shown in FIG. 98A, the digital signature of a service provider is provided for data that consists of a temporary receipt header 9800, which is header information indicating that the message is the temporary receipt 6205 and describing the data structure; a user ID 9801; payment card issuing information 9802; a payment service code 9803; a payment value 9804; a payment option code 9805; a request number 9806; a transaction number 9807; a service provider ID 9808; and an issued time 9809, which indicates the date on which the temporary receipt 6205 was issued. These data are closed and addressed to the user, thereby providing the temporary receipt 6205. The payment card issuing information 9802 is information concerning the electronic payment card issuing process that is performed by the service providing system, and is accompanied by the digital signature of the service provider.

The data structure of the electronic payment card issuing message 6204 is the same as that used for the electronic payment card issuing message 6108.

Upon receiving the electronic payment card issuing message 6204 and the temporary receipt 6205, the mobile user terminal decrypts them and examines the digital signatures, enters an electronic payment card included in the electronic payment card issuing message 6204 in the payment card list 1713, enters the temporary receipt 9810 in the use list 1715, and displays the electronic payment card on the LCD 303.

Following this, the service director processor performs the clearing process for the price of the payment card. First, the service director processor generates a clearing request 9824, which is a message requesting the performance of the clearing process for the price of the payment card. The transaction processor closes the clearing request 9824 and addresses it to the transaction processor, and transmits it as a clearing request 6207 to the transaction processing system 106.

Upon receiving the clearing request 6207, the transaction processing system 106 decrypts it and examines the digital signature, and performs the clearing process. The transaction processing system 106 generates a clearing completion notification 6208 and transmits it to the service providing system 110.

Upon receiving the clearing completion notification 6208, the transaction processor processor of the service providing system 110 decrypts it and examines the digital signature, and transmits a clearing completion notification 9913 to the service director processor. The service director processor employs the received clearing completion notification 9913 to generate a clearing completion notification 9930 for the payment card issuer. And the payment card issuer processor closes the clearing completion notification 9930 and transmits it to the payment card issuing system 108 as a clearing completion notification 6209 for the payment card issuer.

The payment card issuing system decrypts the received clearing completion notification 6209 and examines the digital signature, and generates a receipt 6210 and transmits it to the service providing system.

The payment card issuer processor of the service providing system decrypts the received receipt 6210 and examines the digital signature, and transmits a receipt 10012 to the service director processor. The service director processor employs the receipt 10012 to generate a receipt 10023 for a user.

The receipt 10023 that is generated is not immediately transmitted to the mobile user terminal 100 of the user. When the mobile user terminal has performed the data updating process, the user processor replaces the temporary receipt 9810 in the use list 1715 with the receipt 10023, and transmits the receipt 10023 as one part of the update data 6211 to the mobile user terminal 100.

The data structures of the clearing request 6207, the clearing completion notification 6208, the clearing completion notification 6209 and the receipt 6210 for the delayed clearing are the same as those provided for the clearing request 6104, the clearing completion notification 6105, the clearing completion notification 6106 and the receipt 6107 for the spontaneous clearing.

The delayed clearing process need not be performed immediately after the electronic payment card is issued, and together with the other clearing processes, may be performed, for example, once a day.

An explanation will now be given for the contents of messages that are exchanged by the mobile user terminal 100 and the service providing system 110 during the payment card registration processing.

In FIG. 65B are shown the procedures for exchanging messages between devices in the payment card registration processing, and in FIGS. 107A and 107B are shown the contents of messages that are exchanged by the devices in the payment card registration processing.

First, when the user performs an electronic payment card registration operation 6504, the mobile user terminal generates a payment card registration request 6505 and transmits it to the service providing system via digital wireless telephone communication.

As is shown in FIG. 107A, the digital signature of a user is provided for data that consists of a payment card registration request header 10700, which is header information indicating that the message is the payment card registration request 6505 and describing the data structure; a card ID 10701 of a payment card to be registered; a user ID 10702; and an issued time 10703, which indicates the date on which the payment card registration request 6505 was issued. These data are closed and addressed to the service provider, thereby providing the payment card registration request 6505.

The user processor of the service providing system decrypts the received payment card registration request 6505 and examines the digital signature, and transmits the request 6505 to the service manager processor. The service manager processor generates a service director processor to form a process group that processes a payment card registration request 10704. The service director processor ascertains that the electronic payment card indicated by the card ID 10701 is registered in the payment card list 4611 for the user in the user information server 902, and registers that electronic payment card in the registered card list 5402 for electronic payment cards of the service director information server 901. At this time, the service director processor newly generates a card signature private key and a card signature public key pair. Further, the service director processor generates a registered card certificate using the card signature public key, and registers it in the registered card list 5402. The service director processor then generates a card certificate issuing message 10713 using the card signature private key and the registered card certificate that has been generated. The user processor closes the card certificate issuing message 10713 and addresses it to the user, and transmits it as a payment card certificate issuing message 6506 to the mobile user terminal via digital wireless telephone communication.

As is shown in FIG. 107B, the digital signature of a service provider is provided for data that consists of a card certificate issuing header 10708, which is header information indicating that the message is the payment card certificate issuing message 6506 and describing the data structure; a card digital signature private key 10709; a registered card certificate 10710; a service provider ID 10711, and an issued time 10712, which indicates the date on which the payment card certificate issuing message 6506 was issued. These data are closed and addressed to the user, thereby providing the payment card certificate issuing message 6506.

The mobile user terminal 100 decrypts the received payment card certificate issuing message 6506 and examines the digital signature, replaces the card signature private key and the card certificate of an electronic payment card with the card signature private key 10709 and the registered card certificate 10710, both of which are included in the payment card certificate issuing message 6506, changes the registration state in the card status to the post-registration state, and displays on the LCD the electronic payment card that has been registered (display a payment card that is registered; 6507).

An explanation will now be given for the contents of messages that are exchanged by the service providing system 110 and the merchant terminal 102, the merchant terminal 103, or the accounting machine 3555 (automatic vending machine 104) during the payment card setup processing.

The payment card setup processing is not performed in accordance with a special processing sequence, but is performed in the data updating process during which the service providing system updates the data in the merchant terminal 102 (or the merchant terminal 103 or the accounting machine 3555).

Therefore, for the payment card setup process, the procedures for the exchange of messages by the service providing system and the merchant terminal 102 (or the merchant terminal 103 or the accounting machine 3555), and the contents (data structures) of the messages to be exchanged are the same as those used for the above described data updating processing (FIGS. 57 and 88).

It should be noted, however, that the payment card setup process is not performed each time the data updating process is performed, but when the payment card list 4609 for the merchant stored in the merchant information server 903 is updated by the service director processor.

When the payment card list 4609 is updated, the merchant processor includes updated data in the payment card list 4609 for the compressed update data 8828 in the update data 5705, and transmits the resultant data as update data 5705 to the merchant terminal 102 (or the merchant terminal 103 or the accounting machine 3555).

Upon receiving the update data 5705, the merchant terminal 102 (the merchant terminal 103 or the accounting machine 3555) decompresses the update data 8828, and updates the data in the RAM and on the hard disk. At this time, the payment card list 2811 (3211 or 3608) in the merchant terminal 102 (or the merchant terminal 103 or the accounting machine 3555) is updated, and an electronic payment card that is handled by the merchant terminal 102 (or the merchant terminal 103 or the accounting machine 3555) is updated.

An explanation will now be given for the contents of messages that are exchanged by between the mobile user terminal 100 and the merchant terminal 102, the merchant terminal 103, or the accounting machine 3555 (automatic vending machine 104) during the payment card clearing processing.

In FIG. 68 are shown procedures for the exchange of messages by the mobile user terminal 100 and the merchant terminal 102 or 103 during the payment card clearing processing, and in FIG. 69 are shown procedures for the exchange of by the mobile user terminal 100 and the accounting machine 3555. In FIGS. 112A and 112B and FIGS. 113A and 113B are shown the contents of messages that are exchanged by the devices during the payment card clearing processing. For the payment card clearing processing, the same procedures are employed for the exchange of messages by the mobile user terminal 100 and the merchant terminal 102, the merchant terminal 103 or the accounting machine 3555, and the same contents (data structures) are included in the messages to be exchanged.

First, when a user performs a payment offer operation 6804 or 6906, the mobile user terminal employs a payment card that is to be used for payment and an arbitrarily generated test pattern and produces a payment offer message 6805 or 6907, which is a message for offering the merchant the payment of a price. The mobile user terminal transmits the message 6805 or 6907 to the merchant terminal 102 (or the merchant terminal 103 or the accounting machine 3555) via infrared communication.

As is shown in FIG. 112A, the payment offer message 6805 or 6907 consists of a payment offer header 11200, which is header information indicating that the message is the payment offer message 6805 or 6907 and describes the data structure; a service code 11201, which identifies the request for payment using an electronic payment card; a request number 11202, which is an arbitrarily generated number that uniquely represents the payment card clearing process; an amount of payment 11203 that is entered by the user; a presentation card 11203 for presenting an electronic payment card to be used for the payment; a card certificate 11205; a current card status 11206 for an electronic payment card to be used for the payment; a total remaining value 11207; a card ID 11208; an issued time 11209, which indicates the date on which the payment offer message 6805 or 6907 was issued; and an accounting machine test pattern 11211, which is an arbitrarily generated test pattern. The digital signature is provided, using the card signature private key of an electronic payment card, for the card status 11206, the total remaining value 11207, the card ID 11208 and the issued time 11209. The accounting machine test pattern 11211 is encrypted using the accounting machine public key.

The presentation card 11204, the card certificate 11205, the card status 11206, the total remaining value 11207, the card ID 11208 and the issued date 11209 specify the contents of the electronic payment card for the merchant terminal 102 (or the merchant terminal 103 or the accounting machine 3555), and the accounting machine test pattern 11211 is a test pattern for authorizing the merchant terminal 102 (or the merchant terminal 103 or the accounting machine 3555).

Upon receiving the payment offer 6805 or 6907, first, the merchant terminal 102 (or the merchant terminal 103 or the accounting machine 3555) refers to the payment card list 2811 (3211 or 3608) and activates a payment card clearing module that corresponds to the card code (included in a presentation card) for the electronic payment card that is presented. Then, the merchant terminal 102 (or the merchant terminal 103 or the accounting machine 3555) examines the validity of the contents of the payment offer 6805 or 6907, generates a payment offer response 6806 or 6908, which is a response message for the payment offer, and transmits it to the mobile user terminal via infrared communication. When the electronic payment card that is presented is not registered in the payment card list 2811 (3211 or 3608), the payment offer response 6806 or 6907 is transmitted, which indicates that the pertinent electronic payment card is not available.

In the verification processing for determining the validity of the payment offer message 6805 or 6907, first, the merchant terminal 102 (or the merchant terminal 103 or the accounting machine 3555) verifies that for the sale the amount of payment 11203 designated by the user is adequate. The merchant terminal 102 employs the fact that the card certificate 11205 is a registered card certificate, and examines the card status 11206 and the total remaining value 11207 to determine whether the electronic payment card is valid and can be used as a payment card for the payment. Then, the merchant terminal 102 examines the presentation card 11204, the digital signature of the service provider that is provided for the card certificate 11205, and the validity term. Further, the merchant terminal employs the card signature public key of the card certificate 11205 to examine the digital signature of the electronic payment card that is provided for the card status 11206, the total remaining value 11207, the card ID 11208 and the issued time 11209. In this fashion, the validity of the payment offer 6805 or 6907 is verified.

In the generation of the payment offer response 6806 or 6908, the merchant terminal 102 (or the merchant terminal 103 or the accounting machine 3555) decrypts the accounting machine test pattern 11211 using the accounting machine private key, and employs the card public key to encrypt the card test pattern 11211 that is arbitrarily generated.

As is shown in FIG. 112B, the digital signature of a merchant is provided for the data that consists of a payment offer response header 11213, which is header information indicating that the message is the payment offer response 6806 or 6908 and describing the data structure; a transaction number 11214; a response message 11215; a request number 11216; a card ID 11217; an instruction code 11218; an amount of sales 11219, which indicates the price that is charged or the cost of the service that is calculated by the merchant terminal 102 (or the merchant terminal 103 or the accounting machine 3555); an accounting machine test pattern 11220, which is decrypted; a card test pattern 11221, which is an arbitrarily generated test pattern; an accounting machine ID 11223; a merchant ID 11224; and an issued time 11225, which indicates the date on which the payment offer response 6805 or 6908 was issued. In this fashion, the payment offer response 6806 or 6908 is provided. The card test pattern 11221 is encrypted using the card public key.

The transaction number 11214 is a number that is arbitrarily generated, by the merchant terminal 102 (or the merchant terminal 103 or the accounting machine 3555), and that uniquely represents the payment card clearing process. When, as a result of the examination of the payment offer 6805 or 6907, the payment card clearing process can not be performed (the amount of the payment entered by the user is not sufficient, or when an electronic payment card is one that can not be handled by the pertinent merchant terminal 102 (or the merchant terminal 103 or the accounting machine 3555)), a value of 0 is set. When the payment card clearing process can be performed, a value other than 0 is set.

The response message 11215 is text information constituting the message transmitted by the merchant to the user. When the merchant terminal 102 (or the merchant terminal 103 or the accounting machine 3555) can not handle an electronic payment card that has been presented (transaction number=0), data to that effect is included in the response message. The response message is prepared optionally, and may not be prepared.

The instruction code 11218 is command code information for an electronic payment card, and is used when a value equivalent to the amount of sales 11219 is subtracted from the total remaining value held by the electronic payment card. The instruction code is varied by combining the electronic payment card transaction module and the payment card clearing module.

When the mobile user terminal receives the payment offer response 6806 or 6908, first, for verification of to verify the merchant terminal 102 (or the merchant terminal 103 or the accounting machine 3555), it compares the accounting machine test pattern 11211 with the accounting machine test pattern 11220 included in the payment offer response 6806 or 6908. The mobile user terminal ascertains whether the amount of sales 1219 is equal to or smaller than the amount of payment 11203 entered by the user, and subtracts the amount of sales 11219 from the total remaining value held by the electronic payment card in accordance with the instruction code 11218. Then, the mobile user terminal decrypts the card test pattern using the card private key, and generates a micro-check message 6807 or 6909, which corresponds to a check that has as its face value the amount of the sale. The check is transmitted via infrared communication to the merchant terminal 102 (or to the merchant terminal 103 or the accounting machine 3555).

As is shown in FIG. 113A, the digital signature using the card signature private key and the digital signature of a user are provided for the data that consists of a micro-check header 11300, which is header information indicating that the message is the micro check 6807 or 6909 and describing the data structure; a micro-check issuing number 11301, which indicates the order of the payment card clearing process; a card test pattern 11302, which is decrypted; an amount of payment 11303, which indicates the obtained value that is subtracted from the total remaining value; a card status 11304; a total remaining value 11305 available after the subtraction; an accounting machine ID 11306; a merchant ID 11307; a request number 11308; a transaction number 11309; a card code 11310; a card ID 11311; and an issued time 11312, which indicates the date on which the micro-check 6807 or 6909 was issued. In this fashion, the micro-check 6807 or 6909 is provided.

Upon receiving the micro-check 6807 or 6909, first, the merchant terminal 102 (or the merchant terminal 103 or the accounting machine 3555) authorizes the electronic payment card by comparing the card test pattern 11221 with the card test pattern 11302 that is included in the micro-check 6807 or 6909, examines the validity of the contents of the micro-check 6807 or 6909, and generates a receipt 6808 or 6910 and transmits it to the mobile user terminal via infrared communication.

In the verification process for the validity of the micro-check 6807 or 6909, the merchant terminal 102 (or the merchant terminal 103 or the accounting machine 3555) determines whether the amount of payment 11303 represented by the micro-check 6807 or 6909 is adequate for the value of the sale. Also, the merchant terminal 102 (or the merchant terminal 103 or the accounting machine 3555) determines whether the value obtained by subtracting the total remaining value 11305 from the total remaining value 11207, which represents the payment offer, is equal to the amount of payment 11303 represented by the micro-check. Finally, the merchant terminal 102 examines the digital signature of the electronic payment card accompanying the micro-check 6807 or 6909.

As is shown in FIG. 113B, the digital signature of a merchant is provided for the data that consists of a receipt header 11314, which is header information indicating that the message is the receipt 6808 or 6910 and describing the data structure; sales information 11315; a card ID 11316; a total receipt value 11317, which indicates the same value as the amount of payment 11303 represented by the micro-check that is received by the merchant; a request number 11318; a transaction number 11319; a micro-check issuing number 11320; an accounting machine ID 11321; a merchant ID 11322; and an issued time 11323, which indicates the date on which the receipt 6808 or 6910 was issued. In this fashion, the receipt 6808 or 6910 is provided.

The sales information 11315 is text information constituting the contents of a transaction acquired during the payment card clearing process, and corresponds to the specifications for the products that are traded or for the service that is provided, or for a statement of account.

Upon receiving the receipt 6808 or 6910, the mobile user terminal verifies that the total receipt value 11317 is equal to the amount of payment 11303 of represented by the micro-check, and increments the micro-check issuing number. The mobile user terminal then registers the receipt 6808 or 6910 as usage information in the use list 1715, and displays the receipt 6808 or 6910 on the LCD (display the receipt; 6810 or 6911).

When the merchant terminal 102 (or the merchant terminal 103 or the accounting machine 3555) has transmitted the receipt 6808 or 6910, it registers, in the transaction list 2812 (3212 or 3609), the micro-check 6807 or 6909 and the receipt 6808 or 6910 as history information for the payment card clearing process.

The merchant terminal 102 or the merchant terminal 103 displays, on the LCD, a message that indicates the termination of the payment card clearing process (display the clearing completion; 6809), and the product is delivered by the merchant to the user (deliver the product; 6811). Thereafter, the accounting machine 3555 (automatic vending machine 104) discharges the product to the discharge port 703.

When the mobile user terminal receives the payment offer, and the amount of payment 11203 entered by the user is greater than the amount of sales 11219, the dialogue message for asking the user for the value of the payment is displayed on the LCD 303. When the user again enters a payment value that is greater than the amount of sales 11219, a micro-check having the entered value as the payment value 11303 may be issued. In this case, a value that corresponds to the difference between the amount of payment 11303 and the amount of sales 11219 can be paid as a commission to the merchant.

An explanation will now be given for the contents of messages that are exchanged by the devices during the payment card reference processing.

In FIG. 72 are shown procedures for the exchange of messages by the devices during the payment card reference processing, and in FIGS. 88A to 88D and FIG. 116B are shown the contents of messages that are exchanged during the payment card reference processing. The payment card reference processing is not performed in accordance with a special processing sequence, but is performed in the data updating process during which the service providing system updates the data in the merchant terminal 102 (or the merchant terminal 103 or the accounting machine 3555).

Therefore, for the payment card reference process, the procedures for the exchange of messages by the merchant terminal 102 (or the merchant terminal 103 or the accounting machine 3555) and the service providing system, and the contents (data structures) of the messages to be exchanged are the same as those employed for the above described data updating processing.

Compressed upload data 8818 in the upload data 5702 include a micro-check that is newly registered in the transaction list 2510 during the payment card clearing process conducted during the period extending from the previous performance of the data updating process to the current performance of the data updating process.

During the data updating processing, the merchant processor transmits, to the service manager processor, a message requesting the reference process be performed for the micro-check that is uploaded from the merchant terminal 102 (or the merchant terminal 103 or the accounting machine 3555). The service manager processor generates a service director processor to form a process group for examining the validity of the micro-check.

First, the service director processor determines whether the accounting machine ID 11306 and the merchant ID 11307 in the micro-check match the accounting machine ID 5215 of the merchant and the merchant ID 5214. Then, the service director processor examines the registered card list 5402 in the service director information server 901 to verify that the electronic payment card for which the micro-check was issued is registered. The service director processor employs the user public key 5419 to examine the digital signature of the user that accompanies the micro-check, and employs the registered card certificate to examine the digital signature for the payment card that accompanies the micro-check. In addition, the service director processor employs the micro-check issuing number when examining the matching of the amount of payment with the total remaining value, and transmits the result of the examination to the merchant processor. As a result, the micro-check is registered in the micro-check list.

The merchant processor enters the received payment card reference results in the compressed update data 8828 in the update data 5705, and transmits the data 5705 to the merchant terminal 102 (or the merchant terminal 103).

When an error occurs in the process for verifying the validity of the micro-check, the service director processor transmits a message indicating that an error occurred in the management system 908.

Upon receiving the update data 5705, the merchant terminal 102 (or the merchant terminal 103) decompresses the update data 8828 and updates the data in the RAM and on the hard disk. At this time, the payment card reference results are registered in the authorization report list 2813 (3213) of the merchant terminal 102 (the merchant terminal 103).

If the firm represented by the merchant differs from that represented by the payment card issuer, and a payment for the merchant who handles the payment card is made by the payment card issuer, or if the usage of the payment card is periodically reported to the payment card issuer in accordance with the terms of a contract, in accordance with the micro-check that is newly registered in the micro-check list, the service director processor generates weekly, for example, a usage condition notification 11616, which is a message for notifying the payment card issuer of the payment card usage condition. The payment card issuer processor closes the notification 11616 and addresses it to the payment card issuer, and transmits it as a usage report 7200 to the payment card issuing system 108.

As is shown in FIG. 116B, the digital signature of a service provider is provided for the data that consists of a usage report header 11610, which is header information indicating that the message is the usage report 7200 and describing the data structure; a card ID and payment value list 11611 of payment cards that are employed; the merchant name 11612 and the merchant ID 11613 of a merchant that handles the payment card; a service provider ID 11614; and an issued time 11615, which indicates the date on which the usage report 7200 was issued. These data are closed and addressed to the payment card issuer, thereby providing the usage report 7200.

Upon receiving the usage report 7200, the payment card issuing system 108 decrypts it and examines the digital signature, and performs such processing as making a payment to the merchant.

An explanation will now be given for the contents of messages that are exchanged by the devices during the payment card transfer processing.

In FIG. 75 are shown procedures for the exchange of messages by the devices during the payment card transfer processing, and in FIGS. 120A and 120B, 121A and 121B, and 122A and 122B are shown the contents of messages that are exchanged during the payment card transfer processing.

The payment card transfer process can be performed when the card status 2007 of the electronic payment card indicates the transfer enabled state, which is designated by the payment card issuer when issuing a payment card.

In FIG. 75 is shown a case where user A transfers an electronic payment card to user B. The procedures for the exchange of messages by the devices belonging to users A and B are the same for infrared communication as they are for digital wireless communication. The data structures of messages are also the same.

In FIG. 75, first, when user A performs a payment card transfer process 7500, the mobile user terminal of user A transmits a payment card transfer offer 7501, which is a message offering to transfer an electronic payment card, to the mobile user terminal of user B. When at this time the mobile user terminals of user A and user B are connected, communication between user A and user B is performed via digital wireless telephone. When the mobile user terminals are not connected, infrared communication is employed.

As is shown in FIG. 120A, the digital signature of user A is provided for the data consisting of a card transfer offer header 12000, which is header information indicating that the message is the card transfer offer 7501 and describing the data structure; a transfer offer number 12001, which is an arbitrarily generated number that uniquely represents the payment card transfer process; a presentation card 12002 and a card certificate 12003 for an electronic payment card to be transferred; a card status 12004; a total remaining value 12005; a card ID 12006; an issued time 12007, which indicates the date on which the card transfer offer 7501 was issued; and a user public key certificate 12009. In this fashion, the card transfer offer 7501 is provided. The digital signature of the electronic payment card is provided, using the card signature private key, for the card status 12004, the variable card information 12005, the card ID 12006 and the issued time 12007.

The digital signature of the service provider is provided for the data that consist of a user public key header 12010; the user public key 12011 of user A; a public key certificate ID 12012, which is ID information for the public key certificate; a certificate validity term 12013; a service provider ID 12014; and a certificate issued time 12015. In this fashion, the user public key certificate 12009 is provided.

Upon receiving the card transfer offer 7501, the mobile user terminal of user B examines the presentation card 12002, the card certified 12003, and the digital signature of the service provider and the validity term of the public key certificate 12009. Then, the mobile user terminal examines the digital signature of the electronic payment card that is provided for the card status 12004, the total remaining value 12005, the card ID 12006 and the issued time 12007, and the digital signature of user A accompanying the card transfer offer 7501, and verifies the contents of the card transfer offer 7501.

In accordance with the presentation card 12002, the card status 12004 and the total remaining value 12005, the mobile user terminal then displays, on the LCD, the contents of the electronic payment card that is to be transferred (display the transfer offer; 7502).

When user B performs a transfer offer acceptance operation 7503, the mobile user terminal of user B transmits, to the mobile user terminal of user A, a card transfer offer response 7504, which is a response message for the card transfer offer 7501.

As is shown in FIG. 120B, the digital signature of user B is provided for the data that consist of a card transfer offer response header 12016, which is header information indicating that the message is the card transfer offer response 7504 and describing the data structure; an acceptance number 12017; a transfer offer number 12018; a card ID 12019; an issued time 12020, which indicates the date on which the card transfer offer response 7504 was issued; and a user public key certificate 12021. In this fashion, the card transfer offer response 7504 is provided.

The user public key certificate 12021 is a public key certificate for user B. To provide this certificate 12021, the digital signature of the service provider is provided for the data that consist of a user public key certificate header 12022; a user public key 12023 for user B; a public key certificate ID 12024, which is ID information for the public key certificate; a certificate validity term 12025; a service provider ID 12026; and a certificate issued time 12027.

The acceptance number 12017 is arbitrarily generated, by the mobile user terminal of user B, as a number that uniquely represents the payment card transfer processing. With this number, the mobile user terminal of user A is notified as to whether user B has accepted the card transfer offer 7501. When user B does not accept the card transfer offer 7501, a value of 0 is set as the acceptance number 12017. When user B accepts the card transfer offer 7501, a value other than 0 is set.

Upon receiving the card transfer offer response 7504, the mobile user terminal of user A displays, on the LCD, the contents of the card transfer offer response 7504 (display the transfer offer response; 7505). When the card transfer offer 7501 is accepted (acceptance number 12017≠0), the mobile user terminal of user A examines the digital signature of the service provider of the user public key certificate 12021 and the validity term. The mobile user terminal generates a card transfer certificate 7506, which is a message that corresponds to a transfer certificate for an electronic payment card to user B, and transmits it to the mobile user terminal of user B.

As is shown in FIG. 121A, the digital signature of the electronic payment and the digital signature of user A are provided for the data that consist of a card transfer certificate header 12100, which is header information indicating that the message is the card transfer certificate 7506 and describing the data structure; a presentation card 12101 for an electronic payment card to be transferred; a card status 12102; a total remaining value 12103; a transfer offer number 12104; an acceptance number 12105; a public key certificate ID 12106 for the user public key certificate of user B; a public key certificate ID 12107 for the user public key certificate of user A; a card ID 12108; and an issued time 12109, which indicates the date on which the card transfer certificate 7506 was issued. These data are closed and addressed to user B, thereby providing the card transfer certificate 7506.

Upon receiving the card transfer certificate 7506, the mobile user terminal of user B decrypts it and examines the digital signature of user A and the one accompanying the electronic payment card. Further, the mobile user terminal compares the card ID presented by the card transfer offer 7501 with the card ID 12108, and compares the public key certificate IDs 12106 and 12107 with the public key certificates of users B and A to verify the contents of the card transfer certificate 7506. The mobile user terminal then generates a card transfer receipt 7507, which is a message indicating the electronic payment card has been received, and transmits the receipt 7507 to the mobile user terminal of user A.

As is shown in FIG. 121B, the digital signature of user B is provided for the data that consist of a card transfer receipt header 12115, which is header information indicating that the message is the card transfer receipt 7507 and describing the data structure; a card ID 12116; a transfer offer number 12117; an acceptance number 12118; a public key certificate ID 12119 for the user public key certificate of user A; a public key certificate ID 12120 for the user public key certificate of user B; and an issued time 12121, which indicates the date on which the card transfer receipt 7507 was issued. These data are closed and addressed to user A, thereby providing the card transfer receipt 7507.

Upon receiving the card transfer receipt 7507, the mobile user terminal of user A decrypts it, and examines the digital signature of user B. Further, the mobile user terminal compares the public key certificate IDs 12119 and 12120 with the public key certificates of users B and A to verify the contents of the card transfer receipt 7507. The mobile user terminal then erases the transferred electronic payment card from the card list 1713, and registers the card transfer receipt 12122 in use history 1715. At this time, addresses in the object data area at which the transfer offer number, the code information indicating the card transfer process, the issued time for the card transfer receipt 7507 and the card transfer receipt 12122 are stored are assigned to the request number 1840 in the use list 1715, the service code 1841, the use time 1842 and the use information address 1843.

The mobile user terminal of user A displays, on the LCD, a message indicating the completion of the transfer process (display the transfer process; 7508). The process at the mobile user terminal of user A (sender) is thereafter terminated.

After transmitting the card transfer receipt 7507, the mobile user terminal of user B displays the received card transfer certificate 12111 on the LCD. In addition, the mobile user terminal displays a dialogue message inquiring whether the transfer process with the service providing server (process for downloading the received electronic payment card from the service providing system) should be immediately performed (display the transfer certificate; 7509).

The dialogue message has two operating menus: "transfer process request" and "cancel." When "cancel" is selected, the transfer process performed with the service providing server is canceled, and in the process (data updating process) during which the service providing system updates the data in the mobile user terminal, an electronic payment card that has been transferred is assigned to the mobile user terminal.

When user B selects "transfer process request" (transfer process request operation; 7510), based on the card transfer certificate 12111 the mobile user terminal generates a card transfer request 7511, which is a message requesting that the transfer process be performed with the service providing system, and transmits it to the service providing system via digital wireless telephone communication.

As is shown in FIG. 122A, the digital signature of user B is provided for the data that consists of a card transfer request header 12200, which is header information indicating that the message is the card transfer request 7511 and describing the data structure; a decrypted card transfer certificate 12201 (12111); the user ID 12202 of user B; and an issued time 12203, which indicates the date when the card transfer request 7511 was issued. These data are closed and addressed to the service provider, thereby providing the card transfer request 7511.

Upon receiving the card transfer request 7511, the user processor of user B of the service providing system 110 decrypts it and examines the digital signature, and transmits it to the service manager processor. The service manager processor generates a service director processor to form a process group for processing the card transfer request 12204.

The service director processor, first refers to the user list 5200 and specifies the recipient (user B) and the sender (user A) of the transfer process by employing the public key certificate IDs 12106 and 12107 in the card transfer certificate 12201 that is included in the card transfer request 12204. The service director processor examines the digital signature of the user A and the digital signature accompanying the electronic payment card, which are provided for the card transfer certificate 12201, and verifies the validity of the card transfer certificate 12201. Following this, the service director processor erases the electronic payment card to be transferred from the card list 4611 of the user A that is stored in the user information server 902. Then, the service director processor changes the card signature private key and card signature public key pair and the card certificate for a new key pair and a card certificate, and also changes the card status and the total remaining value to the card status 12102 and to the total remaining value 12103 for the card transfer certificate 12201. The service director processor generates an electronic payment card received from user A, and enters it in the card list 4611 for the user B.

When the electronic payment card that is to be transferred has already been registered, the service director processor updates the registered card list 5402 holding the electronic payment card.

Specifically, the user ID 5418, the user public key 5419, the registered card certificate address 5420, the micro-check list address 5421 and the former user information address 5422, all of which are in the registered card list 5402, are updated (to the information for user B). The old information (information for user A) is pointed to at the former user information address 5422 as former user information 5423.

The service director processor generates a payment card transfer message 12215, which includes an electronic payment card transferred from user A. The user processor of user B closes the message 12215 and addresses it to the user B, and transmits it as a payment card transfer message 7512 to the mobile user terminal of user B via digital wireless telephone communication.

As is shown in FIG. 122B, the digital signature of the service provider is provided for the data that consist of a payment card transfer header 12208, which is header information indicating that the message is the card transfer 7512 and describing the data structure; a transfer number 12209, which is an arbitrarily generated number that represents the transfer process in the service providing system; transfer information 12210; an acceptance number 12211; an electronic payment card 12212, which is transferred; a service provider ID 12213; and an issued time 12214, which indicates the date when the payment card transfer message 7512 was issued. These data are closed and addressed to the user B, thereby providing the card transfer message 7512.

The transfer information 12210 is information concerning the electronic payment card transfer process performed by the service providing system, and is accompanied by the digital signature of the service provider.

The mobile user terminal of user B decrypts the received payment card transfer message 7512 and examines the digital signature, registers the electronic payment card 12212 in the card list 1713, and displays the electronic payment card on the LCD (display the electronic payment card; 7513). The card transfer process is thereafter terminated.

An explanation will now be given for the contents of messages that are exchanged by the devices during the electronic payment card installation processing.

In FIG. 78 are shown procedures for the exchange of messages by the devices during the electronic payment card installation processing, and in FIGS. 125A and 125B, and 125A and 125B are shown the contents of messages that are exchanged during the electronic payment installation processing.

First, when the user performs an electronic payment card installation operation 7800, the mobile user terminal generates an electronic payment card installation request 7801, and transmits it to the service providing system 110 via digital wireless telephone communication.

As is shown in FIG. 125A, the digital signature of the user is provided for the data that consists of an electronic payment card installation request header 12500, which is header information indicating that the message is the electronic payment card installation request 7801 and describes the data structure; an installation card number 12501 and an installation number 12502, which are entered by a user; a request number 12503, which is an arbitrarily generated number that uniquely represents the electronic payment card installation process; a user ID 12504; and an issued time 12505, which indicates the date when the electronic payment card installation request 7801 was issued. These data are closed and addressed to the service provider, thereby providing the electronic payment card installation request 7801.

Upon receiving the electronic payment card installation request 7801, the user processor of the service providing system 110 decrypts it and examines the digital signature, and transmits it to the service manager processor. The service manager processor generates a service director processor to form a process group for processing the electronic payment card installation request 12506.

First, the service director processor refers to the installation card list that is indicated by the installation card list address 5236 for the payment card issuer list 5204, and specifies a payment card issuer who issues a payment card that is represented by the installation number 12501. The service director processor generates a payment card installation request 12517, which is a message requesting that the payment card issuer issue a payment card using the installation card. The payment card issuer processor closes the request 12517 and addresses it to the payment card issuer, and transmits it as a payment card installation request 7802 to the payment card issuing system 108.

As is shown in FIG. 125B, the digital signature of the service provider is provided for the data that consist of a payment card installation request header 12510, which is header information indicating that the message is the payment card installation request 7802 and describing the data structure; an installation card number 12511; an installation number 12512; a request number 12513; a customer number 12514, which uniquely represents a user for the payment card issuer; a service provider ID 12515; and an issued time 12516, which indicates the date when the payment card installation request 7802 was issued. These data are closed and addressed to the payment card issuer, thereby providing the payment card installation request 7802.

Upon receiving the payment card installation request 7802, the payment card issuing system 108 decrypts it and examines the digital signature. The payment card issuing server 1200 compares the installation card number 12511 and the installation number 12512, which are included in the payment card installation request 7802, with the management information for the issued electronic payment card installation card that is stored in the payment card issuing information server 1202. The payment card issuing server 1200 then updates the data in the customer information server 1202 and the payment card issuing information server 1203. Furthermore, the payment card issuing server generates payment card data (12606) for a requested payment card, and transmits, to the service providing system, an electronic payment card installation commission 7803, which is a message requesting the installation of an electronic payment card that corresponds to the requested payment card.

As is shown in FIG. 126A, the digital signature of the payment card issuer is provided for the data that consists of an electronic payment card installation commission header 12600, which is header information indicating that the message is the electronic payment card installation commission 7803 and describing the data structure; a transaction number 12601, which is an arbitrarily generated number that uniquely represents the transaction with a user; payment card issuing information 12602; a request number 12603; card code 12604, which indicates the type of electronic payment card that is to be issued; a template code 12605, which indicates a template program for an electronic payment card to be issued; payment card data 12606; representative component information 12607; a payment card issuer ID 12608; and an issued time 12609, which indicates the date when the electronic payment card installation commission 7803 was issued. These data are closed and addressed to the service provider, thereby providing the electronic payment card installation commission 7803.

The payment card issuing information 12602 is information concerning the payment card issuing process performed by the payment card issuing system, and is accompanied by the digital signature of the payment card issuer.

The payment card data 12606 is payment card information issued by the payment card issuer, wherein the digital signature of the payment card issuer accompanies the data that consists of the card ID 12614, the payment card information 12615 and the card ID 12616.

The payment card issuer processor of the service providing system decrypts the received electronic payment card installation commission 7803 and examines the digital signature, and transmits the commission 7803 to the service director processor. In accordance with the electronic payment card installation commission 12610, the service director processor generates an electronic payment card to be issued to a user, using the same procedures as are used for the payment card purchase processing, and also generates an electronic payment card installation message 12615, which is a message directing that the electronic payment card be installed in the mobile user terminal. The user processor closes the electronic payment card installation message 12655 and addressees it to a user, and transmits it as an electronic payment card installation message 7804 to the mobile user terminal via digital wireless telephone communication.

As is shown in FIG. 126B, the digital signature of the service provider is provided for the data that consists of an electronic payment card installation header 12617, which is header information indicating that the message is the electronic payment card installation message 7804 and describing the data structure; a transaction number 12618; payment card issuing information 12619, which concerns the payment card issuing process performed by the payment card issuing system; payment card issuing information 12620, which concerns the payment card issuing process performed by the service providing system; a request number 12621; generated electronic payment card data 12622; a service provider ID 12623; and an issued time 12624, which indicates the date when the electronic payment card installation message 7804 was issued. These data are closed and addressed to the user, thereby providing the electronic payment card installation message 7804. The payment card issuing information 12619 and the payment card issuing information 12620 are accompanied by the digital signatures of the payment card issuer and the service provider.

The mobile user terminal decrypts the received electronic payment card installation message 7804 and examines the digital signature, registers, in the card list 1713, the electronic payment card included in the electronic payment card installation request 7804, and displays the installed electronic payment card on the LCD (display the electronic payment card; 7805).

An explanation will now be given for the contents of messages that are exchanged by devices in various processes for electronic telephone card service.

First, an explanation will be given for the contents of messages that are exchanged by devices during the telephone card purchase processing.

In FIG. 63 are shown the procedures for the exchange of messages by devices during the telephone card purchase processing. In FIGS. 101A and 101B, 102A and 102B, 103A and 103B, 104A and 104B, and 105A and 105B are shown the contents of messages that are exchanged by devices during the telephone card purchase processing.

First, when a user performs a telephone card purchase order operation 6300, the mobile user terminal transmits a telephone card purchase order 6301 to the service providing system through digital wireless telephone communication.

As is shown in FIG. 101A, the digital signature of a user is provided for data that consists of a telephone card purchase order header 10100, which is header information identifying the message as the telephone card purchase order 6301 and describing the data structure; a response code 10101, which identifies the type of service requested by the user; a card order code 10102, which identifies an order code for a telephone card that is entered by the user; a number of telephone cards 10103 that the user has entered; a payment service code 10104, which identifies a credit card designated by the user; a payment value 10105; a payment option code 10106, which identifies a payment option, such as the number of payments designated by the user; a request number 10107, which is an arbitrarily generated number that uniquely represents the telephone card purchase processing; a validity term 10108 for the telephone card purchase order 6301; a user ID 10109; and an issued time 10110, which is the date on which the telephone card purchase order 6301 was issued. These data are closed and addressed to the service provider, thereby providing the telephone card purchase order 63@01. The service code 8901 identifies the purchase order of a telephone card to a telephone card issuer who is selected by the user.

Upon receiving the telephone card purchase order 6301, the user processor of the service providing system 110 decrypts it and examines the digital signature, and transmits it to the service manager processor. Then, the service manager processor generates a service director processor to form a process group that processes a telephone card order 10111. The service director processor refers to the telephone card issuer list 5205 and generates a telephone card purchase order 10126 for the telephone card issuer indicated by the service code 10101. The telephone card issuer processor closes the telephone card order and addresses it to the telephone card issuer, and transmits the resultant order as a telephone card purchase order 6302 to the telephone card issuing system 109.

As is shown in FIG. 101B, the digital signature of a service providing system is provided for data that consists of a telephone card purchase order header 10115, which is header information indicating that the message is the telephone card purchase order 6302 and describing the data structure; a card order code 10116; a number of cards 10117 that are purchased; a payment service code 10118; a payment value 10119; a payment option code 10120; a request number 10121; a customer number 10122, which uniquely represents a user for the telephone card issuer; a validity term 10123 for the telephone card purchase order 6302; a service provider ID 10124; and an issued time 10125, which is the date on which the telephone card purchase order 6302 was issued. These data are closed and addressed to the telephone card issuer, thereby providing the telephone card purchase order 6302.

When there was a previous transaction to which the user and the telephone card issuer were parties, a customer number that is registered in the customer table of the telephone card issuer is established as the customer number 10122. When there was no previous transaction, the service director processor generates for the telephone card issuer a number that uniquely represents the user, establishes it as the customer number 10122, and registers that number in the customer table. The customer table is designated by using the customer table address 5244 of the telephone card issuer list 5205.

Upon receiving the telephone card purchase order 6302, the telephone card issuing system 109 decrypts it and examines the digital signature. The telephone card issuing server 1300 updates the data in the customer information server 1301, the telephone card issuing information server 1302 and the telephone card information server 1303, generates telephone card data (10219) for the ordered telephone card, and transmits, to the service providing system, an electronic telephone card issuing commission 6303, which constitutes a message requesting the process for issuing an electronic telephone card that corresponds to the telephone card and the process for settling the price of the telephone card.

As is shown in FIG. 102A, the digital signature of a telephone card issuer is provided for data that consists of an electronic telephone card issuing commission header 10200, which is header information identifying the message as the electronic telephone card issuing commission 6303 and describing the data structure; a transaction number 10201, which is an arbitrarily generated number that uniquely identifies a transaction to which a user is a party; a sales value 10202, which conveys the price of a telephone card; a clearing option 10203, which indicates which clearing procedures apply; a request number 10204; a telephone card code 10205, which identifies the type of electronic telephone card that is to be issued; a template code 10206, which identifies a template program to be used for an electronic telephone card that is to be issued; a number of telephone cards 10207, which indicates how many telephone cards are to be issued; telephone card data 10208; representative component information 10209; a telephone card issuer ID 10210; and an issued time 10211, which is the date on which the electronic telephone card issuing commission 6303 was issued. These data are closed and addressed to the service provider, thereby providing the electronic telephone card issuing commission 6303.

The clearing option 10203 is information by which the telephone card issuing system designates, to the service providing system, the procedures to be used for clearing the price of a telephone card. The clearing process is roughly divided into a spontaneous clearing process for issuing an electronic telephone card to a user after the price of the telephone card has been cleared, and a delayed clearing process for clearing the price of a telephone card after an electronic telephone card has been issued. The clearing option 10203 is used to designate either clearing process.

In the delayed clearing process, since an electronic telephone card is issued to a user before the clearing process is performed, the user does not have to wait.

For example, based on a purchase history maintained for customers, the telephone card issuer can designate the delayed clearing process for a customer with whom it has had dealings and who is known to be trustworthy, and can designate the spontaneous clearing for a customer with whom it has had no previous dealings.

The telephone card data 10208 is telephone card information issued by the telephone card issuer. A number of telephone card information items equivalent to the number of telephone cards 10207 are established as the telephone card data 10208. For one telephone card, the digital signature of a telephone card issuer is provided for data that consist of a card ID 10216, card information 10217 and a telephone card issuer ID 10218, and the telephone card information is thereby provided. The telephone card information 10217 is ASCII information describing the contents of a telephone card. For the telephone card information 10217, the title of a telephone card, the face value of the telephone card that is issued, the usage condition, an issuer, and whether it can be transferred, are described using a form whereby tag information representing information types is additionally provided.

The representative component information 10209 is information that is established as the representative component information 2132 for an electronic telephone card to be generated. Therefore, the representative component information 10209 may not be set for use.

The telephone card issuer processor of the service providing system receives the electronic telephone card issuing commission 6303, decrypts it and examines the digital signature, and transmits it to the service director processor. The service director processor performs the electronic telephone card issuing process and the telephone card price clearing process in accordance with the clearing procedures designated by using the clearing option 10203.

In FIG. 63 is shown the spontaneous clearing process. The delayed clearing process will be described later.

For the spontaneous clearing, the service director processor generates a clearing request 10324, which is a message requesting the clearing of the price of a telephone card. The transaction processor closes the clearing request 10324 and addresses it to the transaction processor, and then transmits it as a clearing request 6304 to the transaction processing system 106.

As is shown in FIG. 103B, the digital signature of a service provider is provided for data that consists of a clearing request header 10314, which is header information indicating that the message is the clearing request 6304 and describing the data structure; a user clearing account 10315, which includes a credit card that corresponds to the payment service code designated by the user; a telephone card issuer clearing account 10316, which designates the clearing account of a telephone card issuer; a payment value 10317; a payment option code 10318; a request number 10319, which is issued by the mobile user terminal 100; a transaction number 10320, which is issued by the telephone card issuing system; a validity term 10321, which presents the period during which the clearing request 6304 is effective; a service provider ID 10322; and an issued time 10323, which indicates the date on which the clearing request 6304 was issued. These data are closed and addressed to the transaction processor, thereby providing the clearing request 6304.

The transaction processing system 106 receives the clearing request 6304, decrypts it and examines the digital signature, and performs the clearing process. Then, the transaction processing system 106 generates a clearing completion notification 6305, and transmits it to the service providing system 110.

As is shown in FIG. 104A, the digital signature of a transaction processor is provided for data that consist of a clearing completion notification header 10400, which is header information indicating that the message is the clearing completion notification 6305 and describing the data structure; a clearing number 10401, which is an arbitrarily generated number that uniquely represents the clearing process performed by the transaction processing system 106; a user clearing account 10402; a telephone card issuer clearing account 10403; a payment value 10404; a payment option code 10405; a request number 10406; a transaction number 10407; clearing information 10408 for a service provider that is accompanied by the digital signature of the transaction processor; clearing information 10409 for a telephone card issuer that is accompanied by the digital signature of the transaction processor; clearing information 10410 for a user that is accompanied by the digital signature of the transaction processor; a transaction processor provider ID 10411; and an issued time 10412, which indicates the date on which the clearing completion notification was issued. These data are closed and addressed to the service provider, thereby providing the clearing completion notification 6305.

Upon receiving the clearing completion notification 6305, the transaction processor processor of the service providing system 110 decrypts it and examines the digital signature, and transmits a clearing completion notification 10413 to the service director processor. Upon receiving the clearing completion notification 10413, the service director processor generates a clearing completion notification 10430 for the telephone card issuer. The telephone card issuer processor closes the clearing completion notification 10430, and transmits it to the telephone card issuing system 109 as a clearing completion notification 6306 for the telephone card issuer.

As is shown in FIG. 104B, the digital signature of a service provider is provided for data that consist of a clearing completion notification header 10417, which is header information indicating that the message is the clearing completion notification 6306 and describing the data structure; a clearing number 10418; a customer number 10419; a telephone card issuer ID 10420; a payment service code 10421; a payment value 10422; a payment option code 10423; a request number 10424; a transaction number 10425; clearing information 10426 for a telephone card issuer that is accompanied by the digital signature of the transaction processor; a transaction processor ID 10427; a service provider ID 10428; and an issued time 10429, which indicates the date on which the clearing completion notification was issued. These data are closed and addressed to the telephone card issuer, thereby providing the clearing completion notification 6306.

Upon receiving the clearing completion notification 6306, the telephone card issuing system decrypts it and examines the digital signature, and generates a receipt 6307 and transmits it to the service providing system.

As is shown in FIG. 105A, the digital signature of a telephone card issuer is provided for data that consists of a receipt header 10500, which is header information indicating that the message is the receipt 6307 and describing the data structure;

a customer number 10501; telephone card issuing information 10502; a payment service code 10503; a payment value 10504; a payment option code 10505; a request number 10506; a transaction number 10507; clearing information 10508; a transaction processor ID 10509; a telephone card issuer ID 10510; and an issued time 10511, which indicates the date on which the receipt 6307 was issued. These data are closed and addressed to the service provider, thereby providing the receipt 6307. The telephone card issuing information 10502 is information concerning the telephone card issuing process performed by the telephone card issuing system, and is accompanied by the digital signature of the telephone card issuer.

Upon receiving the receipt 6307, the telephone card issuer processor of the service providing system 110 decrypts it and examines the digital signature, and transmits a receipt 10512 to the service director processor. The service director processor employs the receipt 10512 to generate a receipt 10523 for a user.

In addition, the service director processor generates a clearing completion notification 10430 for the telephone card issuing system, generates an electronic telephone card to be issued to the user, and further generates an electronic telephone card issuing message 10227 that includes the electronic telephone card that is generated.

The user processor closes the electronic telephone card issuing message 10227 and the receipt 10523 while addressing them to the user, and transmits them as an electronic telephone card issuing message 6308 and a receipt 6309 to the mobile user terminal 100 via digital wireless communication.

Figure 102B:
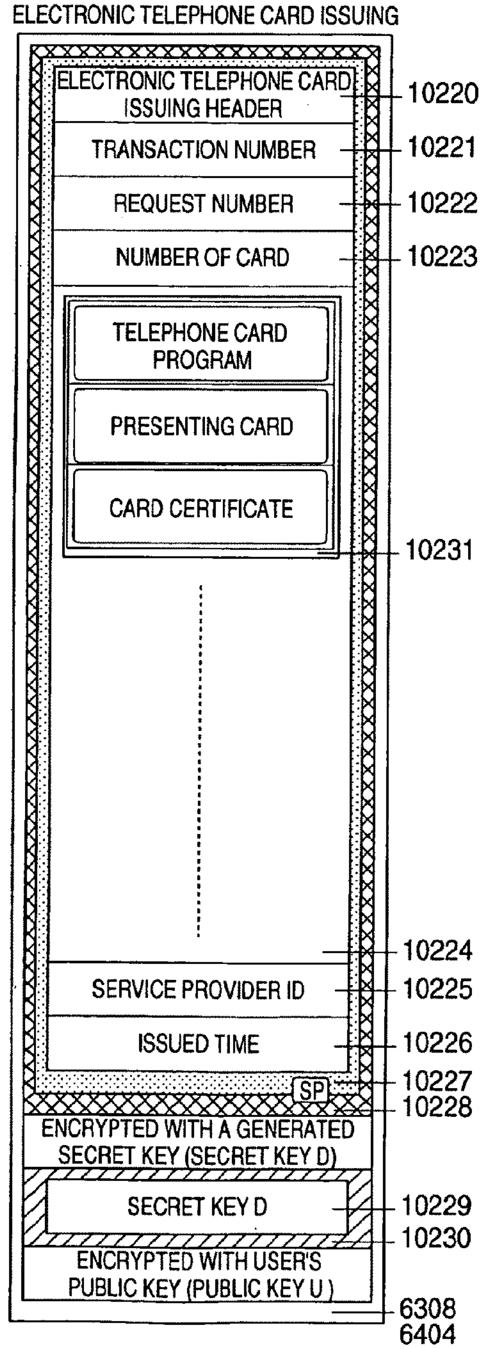

As is shown in FIG. 102B, the digital signature of a service provider is provided for data that consist of an electronic telephone card issuing header 10220, which is header information indicating that the message is the electronic telephone card issuing message 6308 and describing the data structure; a transaction number 10221; a request number 10222; the number of telephone cards 10223; electronic telephone card data 10224 that are generated; a service provider ID 10225; and an issued time 10226, which indicates the date on which the electronic telephone card issuing message 6308 was issued. These data are closed and addressed to the user, thereby providing the electronic telephone card issuing message 6308. The electronic telephone card data 10224 includes electronic telephone cards 10231 equivalent in number to the number of telephone cards 10223.

As is shown in FIG. 105B, the digital signature of a service provider is provided for data that consists of a receipt header 10516, which is header information indicating that the message is the receipt 6309 and describing the data structure; a user ID 10517; a receipt 10518 (10512) obtained by decryption; clearing information 10519 for a user that is accompanied by the digital signature of a transaction processor; telephone card issuing information 10520; a service provider ID 10521; and an issued time 10522, which indicates the date on which the receipt 6309 was issued. These data are closed and addressed to the user, thereby providing the receipt 6309. The telephone card issuing information 10520 is information for the electronic telephone card issuing process performed by the service providing system, and is accompanied by the digital signature of the service provider.

Upon receiving the electronic telephone card issuing message 6308 and the receipt 6309, the mobile user terminal decrypts them and examines the digital signatures, enters in the telephone card list 1714 an electronic telephone card included in the electronic telephone card issuing message 6308, enters the receipt 10523 in the use list 1715, and displays the electronic telephone card on the LCD 303.

The generation of an electronic telephone card by the service director processor is performed as follows.

First, the service director processor refers to the electronic telephone card template list 5105 for the telephone card issuer that is stored in the telephone card issuer information server. Then, by using the electronic telephone card template program that is identified by the template code 10206 of the electronic telephone card issuing commission 6303, the service director processor generates a telephone card program for an electronic telephone card. Specifically, the telephone card program data 2113 for an electronic telephone card are generated using the transaction module and the representation module, which are described as being located at the transaction module address 5119, and the representation module address 5120 in the electronic telephone card template list 5105, and the representative component information 10209 in the electronic telephone card issuing commission 6303. When the representative component information 10209 is not present in the electronic telephone card issuing commission 6303, the default representative component information located at the default representative component information address 5121 is employed as the information for an electronic telephone card.

Following this and based on the telephone card information included in the card information 10217, the service director processor generates the card status 2107 and the total remaining value 2108. Whether the card status 2107 can be transferred is designated, and the face value of the telephone card that is issued is set as the total remaining value 2107. The service director processor generates a new pair consisting of a card signature private key and a card signature public key, and further generates the telephone card program 2101 for an electronic telephone card by employing the card private key and the accounting machine public key that are registered in the electronic telephone card management information 5500.

Furthermore, the service director processor generates an electronic telephone card by employing the obtained card signature public key to generate the certificate 2103 for the electronic telephone card, and by employing the telephone card data 10219 in the electronic telephone card issuing commission 6303 to generate the presentation card 2102 for the electronic telephone card.

The procedures for the delayed clearing will now be described.

Figure 64:
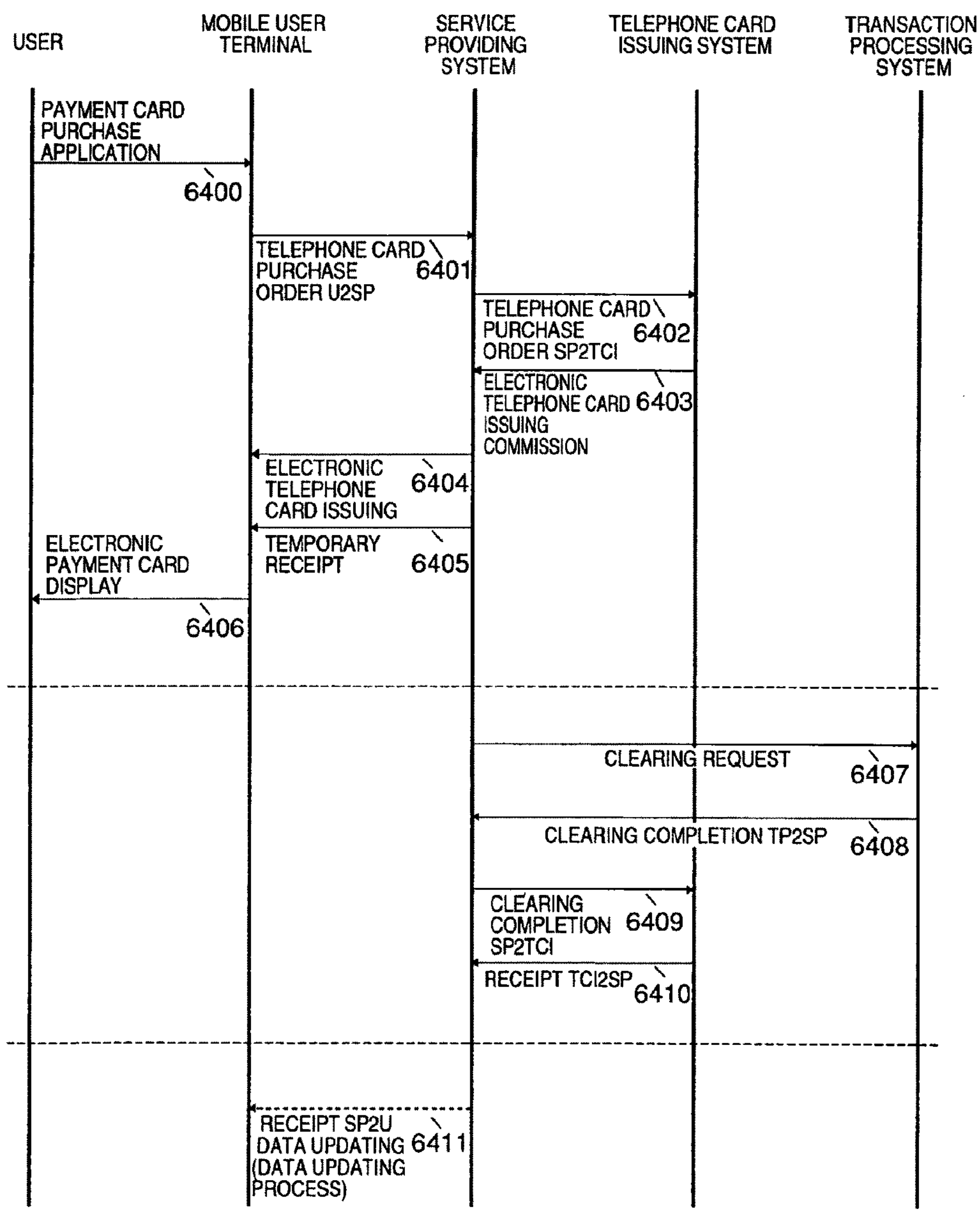
FIG. 64 is a flowchart showing telephone card purchase processing (delayed settlement) according to the embodiment of the present invention.

In FIG. 64 are shown the procedures for exchanging messages between the devices in the telephone card purchase process for the delayed clearing. The same process is performed as is used for the spontaneous clearing until the telephone card issuing system transmits the electronic telephone card issuing commission to the service providing system.

When the delayed clearing is designated by the clearing option 10203, the service director processor generates an electronic telephone card to be issued to the user, and also generates the electronic telephone card issuing message 10227, which includes the generated electronic telephone card, and a temporary receipt message 10310, which corresponds to a temporary receipt. The generation of the electronic telephone card is performed in the same manner as that used for the spontaneous clearing.

The user processor closes the electronic telephone card issuing message 10227 and the temporary receipt 9810 and addresses them to the user, and transmits these messages as an electronic telephone card issuing message 6404 and a temporary receipt 6405 to the mobile user terminal 100 via digital wireless telephone communication.

As is shown in FIG. 103A, the digital signature of a service provider is provided for data that consists of a temporary receipt header 10300, which is header information indicating that the message is the temporary receipt 6405 and describing the data structure; a user ID 10301; telephone card issuing information 10302; a payment service code 10303; a payment value 10304; a payment option code 10305; a request number 10306; a transaction number 10307; a service provider ID 10308; and an issued time 10309, which indicates the date on which the temporary receipt 6405 was issued. These data are closed and addressed to the user, thereby providing the temporary receipt 6405. The telephone card issuing information 10302 is information concerning the electronic telephone card issuing process that is performed by the service providing system, and is accompanied by the digital signature of the service provider.

The data structure of the electronic telephone card issuing message 6404 is the same as that used for the electronic telephone card issuing message 6308.

Upon receiving the electronic telephone card issuing message 6404 and the temporary receipt 6405, the mobile user terminal decrypts them and examines the digital signatures, enters an electronic telephone card included in the electronic telephone card issuing message 6404 in the telephone card list 1714, enters the temporary receipt 10310 in the use list 1715, and displays the electronic payment card on the LCD 303.

Following this, the service director processor performs the clearing process for the price of the telephone card. First, the service director processor generates a clearing request 10324, which is a message requesting the performance of the clearing process for the price of the telephone card. The transaction processor closes the clearing request 10324 and addresses it to the transaction processor, and transmits it as a clearing request 6407 to the transaction processing system 106.

Upon receiving the clearing request 6407, the transaction processing system 106 decrypts it and examines the digital signature, and performs the clearing process. The transaction processing system 106 generates a clearing completion notification 6408 and transmits it to the service providing system 110.

Upon receiving the clearing completion notification 6408, the transaction processor of the service providing system 110 decrypts it and examines the digital signature, and transmits a clearing completion notification 10413 to the service director processor. The service director processor employs the received clearing completion notification 10413 to generate a clearing completion notification 10430 for the telephone card issuer. And the telephone card issuer processor closes the clearing completion notification 10430 and transmits it to the telephone card issuing system 109 as a clearing completion notification 6409 for the telephone card issuer.

The telephone card issuing system decrypts the received clearing completion notification 6409 and examines the digital signature, and generates a receipt 6410 and transmits it to the service providing system.

The telephone card issuer processor of the service providing system decrypts the received receipt 6410 and examines the digital signature, and transmits a receipt 10512 to the service director processor. The service director processor employs the receipt 10512 to generate a receipt 10523 for a user.

The receipt 10523 that is generated is not immediately transmitted to the mobile user terminal 100 of the user. When the mobile user terminal has performed the data updating process, the user processor replaces the temporary receipt 10310 in the use list 1715 with the receipt 10523, and transmits the receipt 10523 as one part of the update data 6411 to the mobile user terminal 100.

The data structures of the clearing request 6407, the clearing completion notification 6408, the clearing completion notification 6409 and the receipt 6410 for the delayed clearing are the same as those provided for the clearing request 6304, the clearing completion notification 6305, the clearing completion notification 6306 and the receipt 6307 for the spontaneous clearing.

The delayed clearing process need not be performed immediately after the electronic telephone card is issued, and together with the other clearing processes, may be performed, for example, once a day.

An explanation will now be given for the contents of messages that are exchanged by the mobile user terminal 100 and the service providing system 110 during the telephone card registration processing.

In FIG. 65C are shown the procedures for exchanging messages between devices in the telephone card registration processing, and in FIGS. 108A and 108B are shown the contents of messages that are exchanged by the devices in the telephone card registration processing.

First, when the user performs an electronic telephone card registration operation 6508, the mobile user terminal generates a telephone card registration request 6509 and transmits it to the service providing system via digital wireless telephone communication.

As is shown in FIG. 108A, the digital signature of a user is provided for data that consists of a telephone card registration request header 10800, which is header information indicating that the message is the telephone card registration request 6509 and describing the data structure; a card ID 10801 of a telephone card to be registered; a user ID 10802; and an issued time 10803, which indicates the date on which the telephone card registration request 6509 was issued. These data are closed and addressed to the service provider, thereby providing the telephone card registration request 6509.

The user processor of the service providing system decrypts the received telephone card registration request 6509 and examines the digital signature, and transmits the request 6509 to the service manager processor. The service manager processor generates a service director processor to form a process group that processes a telephone card registration request 10804. The service director processor ascertains that the electronic telephone card indicated by the card ID 10801 is registered in the telephone card list 4612 for the user in the user information server 902, and registers that electronic telephone card in the registered card list 5502 for electronic telephone cards of the service director information server 901. At this time, the service director processor newly generates a card signature private key and a card signature public key pair. Further, the service director processor generates a registered card certificate using the card signature public key, and registers it in the registered card list 5502. The service director processor then generates a card certificate issuing message 10813 using the card signature private key and the registered card certificate that has been generated. The user processor closes the card certificate issuing message 10813 and addresses it to the user, and transmits it as a telephone card certificate issuing message 6510 to the mobile user terminal via digital wireless telephone communication.

As is shown in FIG. 108B, the digital signature of a service provider is provided for data that consists of a telephone card certificate issuing header 10808, which is header information indicating that the message is the telephone card certificate issuing message 6510 and describing the data structure; a card digital signature private key 10809; a registered card certificate 10810; a service provider ID 10811, and an issued time 10812, which indicates the date on which the telephone card certificate issuing message 6510 was issued. These data are closed and addressed to the user, thereby providing the telephone card certificate issuing message 6510.

The mobile user terminal 100 decrypts the received card certificate issuing message 6510 and examines the digital signature, replaces the card signature private key and the card certificate of an electronic telephone card with the card signature private key 10809 and the registered card certificate 10810, both of which are included in the telephone card certificate issuing message 6510, changes the registration state in the card status to the post-registration state, and displays on the LCD the electronic telephone card that has been registered (display a telephone card that is registered; 6511).

An explanation will now be given for the contents of messages that are exchanged by the service providing system 110 and the electronic telephone card accounting machine 800 (switching center 105) during the telephone card setup processing.

The telephone card setup processing is not performed in accordance with a special processing sequence, but is performed in the data updating process during which the service providing system updates the data in the electronic telephone card accounting machine 800.

Therefore, for the telephone card setup process, the procedures for the exchange of messages by the service providing system and the electronic telephone card accounting machine 800, and the contents (data structures) of the messages to be exchanged are the same as those used for the above described data updating processing.

It should be noted, however, that the telephone card setup process is not performed each time the data updating process is performed, but when the telephone card list 4610 for the merchant stored in the merchant information server 903 is updated by the service director processor.

When the telephone card list 4610 is updated, the merchant processor includes updated data in the telephone card list 4610 for the compressed update data 8828 in the update data 5705, and transmits the resultant data as update data 5705 to the electronic telephone card accounting machine 800.

Upon receiving the update data 5705, the electronic telephone accounting machine decompresses the update data 8828, and updates the data in the RAM and on the hard disk. At this time, the telephone card list 3908 in the electronic telephone card accounting machine 800 is updated, and an electronic telephone card that is handled by the electronic telephone card accounting machine 800 is updated.

An explanation will now be given for the contents of messages that are exchanged by between the mobile user terminal 100 and the electronic telephone card accounting machine 800 (switching center 105) during the telephone card clearing processing.

In FIG. 70 are shown procedures for the exchange of messages by the mobile user terminal 100 and the electronic telephone card accounting machine 800 (switching center 105) during the telephone card clearing processing, and in FIGS. 114A and 114B and FIGS. 115A and 115B are shown the contents of messages that are exchanged by the mobile user terminal 100 and the electronic telephone card accounting machine 800 (switching center 105) during the telephone card clearing processing.

First, when a user displays an electronic telephone card used for communication and performs a calling operation 7000, the mobile user terminal employs a telephone card that is to be used for communication and an arbitrarily generated test pattern and produces a micro-check call request 7001, which is a message for requesting that a telephone number entered by a user be dialed by using the electronic telephone card. The mobile user terminal transmits the request 7001 to the switching center 105 via infrared communication.

As is shown in FIG. 114A, the micro-check call request 7001 consists of a micro-check call request header 11400, which is header information indicating that the message is the micro-check call request 7001 and describes the data structure; a service code 11401, which identifies the request for communication using an electronic telephone card; a request number 11402, which is an arbitrarily generated number that uniquely represents the telephone card clearing process; an telephone number 11403 that is a telephone number entered by the user; a presentation card 11403 for presenting an electronic telephone card to be used for the communication; a card certificate 11405; a current card status 11406 for an electronic telephone card to be used for the communication; a total remaining value 11407; a card ID 11408; an issued time 11409, which indicates the date on which the micro-check call request 7001 was issued; and an accounting machine test pattern 11411, which is an arbitrarily generated test pattern. The digital signature is provided, using the card signature private key of an electronic telephone card, for the card status 11406, the total remaining value 11407, the card ID 11408 and the issued time 11409. The accounting machine test pattern 11411 is encrypted using the accounting machine public key.

The presentation card 11404, the card certificate 11405, the card status 11406, the total remaining value 11407, the card ID 11408 and the issued date 11409 specify the contents of the electronic telephone card for the electronic telephone card accounting machine 800, and the accounting machine test pattern 11411 is a test pattern for authorizing the electronic telephone card accounting machine 800.

Upon receiving the micro-check call request 7001 at the switching center 105, first, the electronic telephone card accounting machine 800 refers to the telephone card list 3908 and activates a telephone card clearing module that corresponds to the card code (included in a presentation card) for the electronic telephone card that is presented. Then, the electronic telephone card accounting machine 800 examines the validity of the contents of the micro-check call request 7001, generates a micro-check call response 7002, which charges a communication fee V (V<0) for a predetermined communication T (T>0), and transmits it to the mobile user terminal via digital wireless telephone communication. When the electronic telephone card that is presented is not registered in the telephone card list 3908, the micro-check call response 3908 is transmitted, which indicates that the pertinent electronic telephone card is not available.

In the verification processing for determining the validity of the micro-check call request 7001, first, the electronic telephone card accounting machine 800 employs the fact that the card certificate 11405 is a registered card certificate, and examines the card status 11406 and the total remaining value 11407 to determine whether the electronic telephone card is valid and can be used as a telephone card for the payment of the communication charge. Then, the electronic telephone card accounting machine 800 examines the presentation card 11404, the digital signature of the service provider that is provided for the card certificate 11405, and the validity term. Further, the merchant terminal employs the card signature public key of the card certificate 11405 to examine the digital signature of the electronic telephone card that is provided for the card status 11406, the total remaining value 11407, the card ID 11408 and the issued time 11409. In this fashion, the validity of the micro-check call request 7001 is verified.

In the generation of the micro-check call response 7002, the electronic telephone card accounting machine 800 decrypts the accounting machine test pattern 11411 using the accounting machine private key, and employs the card public key to encrypt the card test pattern 11411 that is arbitrarily generated.

As is shown in FIG. 114B, the digital signature of a communication service provider is provided for the data that consists of a micro-check call response header 11413, which is header information indicating that the message is the micro-check call response 7002 and describing the data structure; a transaction number 11414; a response message 11415; a request number 11416; a card ID 11417; an instruction code 11418; an amount of charge 11419, which indicates the communication fee V for the communication time T; an accounting machine test pattern 11420, which is decrypted; a card test pattern 11421, which is an arbitrarily generated test pattern; an accounting machine ID 11423; a communication service provider ID 11424; and an issued time 11425, which indicates the date on which the micro-check call response 7002 was issued. In this fashion, the micro-check call response 7002 is provided. The card test pattern 11421 is encrypted using the card public key.

The transaction number 11414 is a number that is arbitrarily generated, by the electronic telephone card accounting machine 800, and that uniquely represents the telephone card clearing process. When, as a result of the examination of the micro-check call request 7001, the telephone card clearing process can not be performed (when an electronic telephone card is one that can not be handled by the pertinent electronic telephone card accounting machine 800), a value of 0 is set. When the telephone card clearing process can be performed, a value other than 0 is set.

The response message 11415 is text information constituting the message transmitted by the communication service provider to the user. When the electronic telephone card accounting machine 800 can not handle an electronic telephone card that has been presented (transaction number=0), data to that effect is included in the response message. The response message is prepared optionally, and may not be prepared.

The instruction code 11418 is command code information for an electronic telephone card, and is used when a value equivalent to the amount of charge 11419 is subtracted from the total remaining value held by the electronic telephone card. The instruction code is varied by combining the electronic telephone card transaction module and the telephone card clearing module.

When the mobile user terminal receives the micro-check call response 7002, first, for verification of to verify the electronic telephone card accounting machine 800, it compares the accounting machine test pattern 11411 with the accounting machine test pattern 11420 included in the micro-check call response 7002 in order to verify the electronic telephone card accounting machine 800. The mobile user terminal subtracts the amount of sales 11419 from the total remaining value held by the electronic telephone card in accordance with the instruction code 11418. Then, the mobile user terminal decrypts the card test pattern using the card private key, and generates a telephone micro-check message 7003, which corresponds to a check that has as its face value the amount of the charge. The check is transmitted via digital wireless telephone communication to the electronic telephone card accounting machine 800 (switching center 105). Further, the mobile user terminal displays, on the LCD, a message indicating a call is on process (display a call on process; 6704)

As is shown in FIG. 115A, the digital signature using the card signature private key and the digital signature of a user are provided for the data that consists of a telephone micro-check header 11500, which is header information indicating that the message is the telephone micro-check 7003 and describing the data structure; a micro-check issuing number 11501, which indicates the order of the telephone card clearing process; a card test pattern 11502, which is decrypted; an amount of payment 11503, which indicates the obtained value that is subtracted from the total remaining value; a card status 11504; a total remaining value 11505 available after the subtraction; an accounting machine ID 11506; a communication service provider ID 11507; a request number 11508; a transaction number 11509; a card code 11510; a card ID 11511; and an issued time 11512, which indicates the date on which the telephone micro-check 7003 was issued. In this fashion, the telephone micro-check 7003 is provided.

Upon receiving the telephone micro-check 7003 at the switching center 105, first, the electronic telephone card accounting machine 800 authorizes the electronic telephone card by comparing the card test pattern 11421 with the card test pattern 11502 that is included in the telephone micro-check 7003, and examines the validity of the contents of the telephone micro-check 7003. In the verification process for the validity of the telephone micro-check 7003, the electronic telephone accounting machine 800 determines whether the amount of payment 11503 represented by the telephone micro-check 7003 is equal to the value of the charge. Also, the electronic telephone card accounting machine 800 determines whether the value obtained by subtracting the total remaining value 11505 from the total remaining value 11407, which represents the micro-check call request, is equal to the amount of payment 11503 represented by the telephone micro-check. Finally, the electronic telephone card accounting machine 800 examines the digital signature of the electronic telephone card accompanying the telephone micro-check 7003.

The switch 801 transmits, to the telephone terminal 115, a call arrival request 7005, which is a message for calling the telephone terminal 115 that corresponds to the telephone number 11403. Upon receiving the call arrival request 7005, the telephone terminal 115 outputs a call tone to notify the owner (call receiver) of the telephone terminal 115 that a call has arrived (display the arrival of a call; 7006). When the recipient raises the handset (communication operation 7007), the telephone terminal 115 transmits, to the switch 801, a call response 7008, which is a message to permit the call.

When the switch 801 receives the call response 7008, the electronic telephone card accounting machine 800 generates a receipt message 7009 that corresponds to a receipt for the telephone micro-check 7003 that is paid, and transmits the message to the mobile user terminal via digital wireless telephone communication. The switch 801 connects the lines of the mobile user terminal 100 and the telephone terminal 115, so that the user can communicate with the call recipient.

As is shown in FIG. 115B, the digital signature of a merchant is provided for the data that consists of a receipt header 11514, which is header information indicating that the message is the receipt 7009 and describing the data structure; provided service information 11515; a card ID 11516; a total receipt value 11517, which reflects the same value as the amount of payment 11503 remitted by the telephone micro-check that is received; a request number 11518; a transaction number 11519; a telephone micro-check issuing number 11520; an accounting machine ID 11521; a communication service provider ID 11522; and an issued time 11523, which indicates the date on which the receipt 7009 was issued. In this fashion, the receipt 7009 is provided.

The provided service information 11515 is text information that represents the contents of the communication service provided through the telephone card clearing process, and corresponds to the specifications or the statement of accounts for the services that are provided.

Upon receiving the receipt 7009, the mobile user terminal verifies that the total receipt value 11517 is equal to the amount of payment 11503 remitted using the telephone micro-check, registers the receipt 7009 as usage information in the usage list 1715, and changes the display on the LCD to a display indicating the connection state (the telephone number used for communication, the elapsed communication time and the total remaining value of an electronic telephone card) (display the connection state; 7010).

When the mobile user terminal 100 does not receive the receipt 7009 after it has transmitted the telephone micro-check 7003, for example, when the user presses the end switch 306 while the ringing is in progress and cancels the call before the receipt 7009 is received, the mobile user terminal 100 adds the amount of sales 11419 to the total remaining value of the electronic telephone card, and returns the value to what it was before the subtraction was performed.

When the communication time exceeds T, instead of the telephone micro-check 7003 having the face value V, the electronic telephone accounting machine transmits a communication charge message 7011, which is a charge requiring the submission of a telephone micro-check having a face value that equals a communication fee 2V charged for a communication time 2T, to the mobile user terminal via digital wireless telephone communication.

As is shown in FIG. 115C, the digital signature of a communication service provider is provided for the data that consists of a communication charge response header 11524, which is header information indicating that the message is the communication charge 7011 and describing the data structure; a transaction number 11515; a request number 11526; a card ID 11527; an instruction code 11528; an amount of charge 11529, which accesses an additional charge value V; an accounting machine ID 11530; a communication service provider ID 11531; and an issued time 11532, which indicates the date on which the communication charge 7011 was issued. In this fashion, the communication charge 7011 is provided. The transaction number 11525 is the same as the transaction number 11414 provided for the micro-check call response 7002, the transaction number 11509 for the telephone micro-check 7003, and the transaction number 11519 for the receipt 7009.

Upon receiving the communication charge 7011, the mobile user terminal subtracts the amount of charge 11529 (the additional charge value V) from the total remaining value of the electronic telephone card. Instead of the telephone micro-check 7003, the mobile user terminal generates a telephone micro-check 7012, which has a face value of 2V that corresponds to the total value subtracted from the total remaining value, and transmits it to the electronic telephone accounting machine 800 (switching center 105) via digital wireless telephone communication.

As is shown in FIG. 115A, the data structure of the telephone micro-check 7012 is the same as that of the telephone micro-check 7003. The amount of payment 11503 remitted by the telephone micro-check 7012 is 2V, which corresponds to the total value subtracted from the total remaining value, and the total remaining value 11505 is the total remaining value after the amount of charge 11529 has been subtracted.

The same numbers as are used for the telephone micro-check 7003 are also employed as the micro-check issuing number 11501, the request number 11508 and the transaction number 11509 in the telephone micro-check 7012, which identify the telephone micro-check that is issued as the replacement for the telephone micro-check 7003.

Upon receiving the telephone micro-check 7012, the electronic telephone card accounting machine verifies the validity of the telephone micro-check 7012, and generates a receipt message 7013 that corresponds to a receipt for the telephone micro-check 7012 that has been issued and transmits it to the mobile user terminal via the digital wireless telephone terminal.

During the process of examining the validity of the telephone micro-check 7012, first, the electronic telephone card accounting machine 800 ascertains that the amount of payment 11503 reflected by the telephone micro-check 7012 is equal to the total amount charged, and ascertains that the result obtained by subtracting the total remaining value 11505, indicated by the telephone micro-check 7012, from the amount of stored value 11407, indicated by the macro check call request, is equal to the total amount of payment 11503 reflected by the telephone micro-check. Then, the accounting machine 800 examines the digital signature that is provided for the telephone micro-check 7012 using the electronic telephone card.

As is shown in FIG. 115A, the data structure of the receipt 7013 is the same as that used for the receipt 7009. The total receipt value 11517 of the receipt 7013 is equal to the amount of payment 11503 reflected by the telephone micro-check 7012.

Upon receiving the receipt 7013, the mobile user terminal verifies that the total receipt value 11517 is equal to the amount of payment 11503 reflected by the telephone micro-check 7012, registers the receipt 7013, instead of the receipt 7009, as usage information in the usage list 1715, and updates the total remaining amount of the electronic telephone card that is displayed on the LCD (display the accounts; 7014).

When the mobile user terminal 100 does not receive the receipt 7013 after it has transmitted the telephone micro-check 7012, such as when, for example, the communication is terminated before the receipt 7013 is received, the mobile user terminal 100 adds the amount of charge 1529 to the total remaining value of the electronic telephone card, and returns the value to what it was before the amount of charge 11529 was subtracted.

Each time the communication time exceeds NT (T is a natural number), instead of the telephone micro-check having the face value NV, the electronic telephone accounting machine 800 transmits a communication charge message 7015, which includes a charge for a telephone micro-check having as a face value a communication fee (N+1)V that is assessed for a communication time (N+1)T, to the mobile user terminal via digital wireless telephone communication. As is shown in FIG. 115C, the data structure of the communication charge 7015 is the same as that used for the communication charge 7011.

The mobile user terminal further subtracts the amount of charge 11529 (additional communication charge value V) from the total remaining value of the electronic telephone card, generates a telephone micro-check 7016 having a face value of (N+1)V, which corresponds to the total value subtracted from the total remaining value, and transmits it to the electronic telephone card accounting machine 800 (switching center 105) via digital wireless telephone communication.

As is shown in FIG. 115A, the data structure of the telephone micro-check 7016 is the same as that used for the telephone micro-check 7003 or 7012. The amount of payment 11503 reflected by the telephone micro-check 7016 is (N+1) V, which corresponds to the total value subtracted from the total remaining value, and the total remaining value 11505 is that which is available after the amount of charge 11529 has been subtracted.

Upon receiving the telephone micro-check 7016, the electronic telephone card accounting machine 800 examines the validity of the telephone micro-check 7016, and generates a receipt message 7017 that corresponds to a receipt for the telephone micro-check 7016 that has been paid and transmits it to the mobile user terminal via digital wireless telephone communication.

During the process of examining the validity of the telephone micro-check 7016, first, the electronic telephone card accounting machine 800 ascertains that the amount of payment 11503 reflected by the telephone micro-check 7016 is equal to the total amount of the charge, and ascertains that the result obtained by subtracting the total remaining value 11505, indicated by the telephone micro-check, from the total remaining value 11407, indicated by the macro check call request, is equal to the total amount of payment 11503 reflected by the telephone micro-check. Then, the accounting machine 800 uses the electronic telephone card to examine the digital signature that is provided for the telephone micro-check 7016.

As is shown in FIG. 115B, the data structure of the receipt 7017 is the same as that used for the receipt 7013. The total receipt value 11517 of the receipt 7017 is equal to the amount of payment 11503 of the telephone micro-check 7016.

Upon receiving the receipt 7017, the mobile user terminal verifies that the total receipt value 11517 is equal to the amount of payment 11503 reflected by the telephone micro-check 7016, registers the receipt 7017, instead of the receipt having type same request number (the previously registered receipt), as usage information in the usage list 1715, and updates the total remaining amount of the electronic telephone card that is displayed on the LCD (display the accounts; 7018).

When the mobile user terminal 100 does not receive the receipt 7017 after it has transmitted the telephone micro-check 7016, such as when, for example, the communication is terminated before the receipt 7017 is received, the mobile user terminal 100 adds the amount of charge 11529 transmitted in the communication charge message 7015 to the total remaining value of the electronic telephone card, and returns the value to what it was before the amount of charge 11529 was subtracted.

When a communication session using the electronic telephone card is terminated, the mobile user terminal 100 increments the micro-check issue number of the electronic telephone card.

At the termination of a communication session, the electronic telephone card accounting machine 800 registers, in the transaction list 3909, the receipt that has been transmitted to the mobile user terminal and the corresponding telephone micro-check as history information for the telephone card clearing process.

The contents of the call arrival request 7005 and the call response 7008, which are messages exchanged by the switching center 105 and the telephone terminal 115, depend on the protocol for the line connection established between the switching center 105 and the telephone terminal 115.

An explanation will now be given for the contents of messages that are exchanged by the devices during the telephone card reference processing.

In FIG. 73 are shown procedures for the exchange of messages by the devices during the telephone card reference processing, and in FIGS. 88A to 88D and FIG. 116B are shown the contents of messages that are exchanged during the telephone card reference processing.

The telephone card reference processing is not performed in accordance with a special processing sequence, but is performed in the data updating process during which the service providing system updates the data in the electronic telephone card accounting machine 800.

Therefore, for the telephone card reference process, the procedures for the exchange of messages by the electronic telephone card accounting machine 800 and the service providing system, and the contents (data structures) of the messages to be exchanged are the same as those employed for the above described data updating processing.

Compressed upload data 8818 in the upload data 5704 include a telephone micro-check that is newly registered in the transaction list 3909 during the telephone card clearing process conducted during the period extending from the previous performance of the data updating process to the current performance of the data updating process.

During the data updating processing, the merchant processor transmits, to the service manager processor, a message requesting the reference process be performed for the telephone micro-check that is uploaded from the electronic telephone card accounting machine 800. The service manager processor generates a service director processor to form a process group for examining the validity of the telephone micro-check.

First, the service director processor determines whether the accounting machine ID 11505 and the communication service provider ID 11506 in the telephone micro-check match the accounting machine ID 5215 of the communication service provider and the communication service provider ID 5214. Then, the service director processor examines the registered card list 5502 in the service director information server 901 to verify that the electronic telephone card for which the telephone micro-check was issued is registered. The service director processor employs the user public key 5519 to examine the digital signature of the user that accompanies the telephone micro-check, and employs the registered card certificate to examine the digital signature for the telephone card that accompanies the telephone micro-check. In addition, the service director processor employs the telephone micro-check issuing number when examining the matching of the amount of payment with the total remaining value, and transmits the result of the examination to the merchant processor. As a result, the telephone micro-check that is ascertained to be valid is registered in the telephone micro-check list.

When an error occurs in the process for verifying the validity of the telephone micro-check, the service director processor transmits a message indicating that an error occurred in the management system 908.

Upon receiving the update data 5705, the electronic telephone card accounting machine 800 decompresses the update data 8828 and updates the data in the RAM and on the hard disk.

If the firm represented by the communication service provider differs from that represented by the telephone card issuer, and a payment for the communication service provider who handles the telephone card is made by the telephone card issuer, or if the usage of the telephone card is periodically reported to the telephone card issuer in accordance with the terms of a contract, in accordance with the telephone micro-check that is newly registered in the telephone micro-check list, the service director processor generates weekly, for example, a usage condition notification 11626, which is a message for notifying the telephone card issuer of the telephone card usage condition. The telephone card issuer processor closes the notification 11626 and addresses it to the telephone card issuer, and transmits it as a usage report 7300 to the telephone card issuing system 109.

As is shown in FIG. 116C, the digital signature of a service provider is provided for the data that consists of a usage report header 11620, which is header information indicating that the message is the usage report 7300 and describing the data structure; a card ID and payment value list 11621 of telephone cards that are employed; the communication service provider name 11622 and the communication service provider ID 11623 of a communication service provider that handles the telephone card; a service provider ID 11624; and an issued time 11625, which indicates the date on which the usage report 7300 was issued. These data are closed and addressed to the telephone card issuer, thereby providing the usage report 7300.

Upon receiving the usage report 7300, the telephone card issuing system 109 decrypts it and examines the digital signature, and performs such processing as making a payment to the merchant.

An explanation will now be given for the contents of messages that are exchanged by the devices during the telephone card transfer processing.

In FIG. 76 are shown procedures for the exchange of messages by the devices during the telephone card transfer processing, and in FIGS. 120A and 120B, 121A and 121B, and 122A and 122C are shown the contents of messages that are exchanged during the telephone card transfer processing.

The telephone card transfer process can be performed when the card status 2107 of the electronic telephone card indicates the transfer enabled state, which is designated by the telephone card issuer when issuing a telephone card.

In FIG. 76 is shown a case where user A transfers an electronic telephone card to user B. The procedures for the exchange of messages by the devices belonging to users A and B are the same for infrared communication as they are for digital wireless communication. The data structures of messages are also the same.

In FIG. 76, first, when user A performs a telephone card transfer process 7600, the mobile user terminal of user A transmits a telephone card transfer offer 7601, which is a message offering to transfer an electronic telephone card, to the mobile user terminal of user B. When at this time the mobile user terminals of user A and user B are connected, communication between user A and user B is performed via digital wireless telephone. When the mobile user terminals are not connected, infrared communication is employed.

As is shown in FIG. 120A, the digital signature of user A is provided for the data consisting of a card transfer offer header 12000, which is header information indicating that the message is the card transfer offer 7601 and describing the data structure; a transfer offer number 12001, which is an arbitrarily generated number that uniquely represents the telephone card transfer process; a presented card 12002 and a card certificate 12003 for an electronic telephone card to be transferred; a card status 12004; a total remaining value 12005; a card ID 12006; an issued time 12007, which indicates the date on which the card transfer offer 7601 was issued; and a user public key certificate 12009. In this fashion, the card transfer offer 7501 is provided. The digital signature of the electronic telephone card is provided, using the card signature private key, for the card status 12004, the variable card information 12005, the card ID 12006 and the issued time 12007.

The digital signature of the service provider is provided for the data that consist of a user public key header 12010; the user public key 12011 of user A; a public key certificate ID 12012, which is ID information for the public key certificate; a certificate validity term 12013; a service provider ID 12014; and a certificate issued time 12015. In this fashion, the user public key certificate 12009 is provided.

Upon receiving the card transfer offer 7601, the mobile user terminal of user B examines the presented card 12002, the card certified 12003, and the digital signature of the service provider and the validity term of the public key certificate 12009. Then, the mobile user terminal examines the digital signature of the electronic telephone card that is provided for the card status 12004, the total remaining value 12005, the card ID 12006 and the issued time 12007, and the digital signature of user A accompanying the card transfer offer 7601, and verifies the contents of the card transfer offer 7501. In accordance with the presented card 12002, the card status 12004 and the total remaining value 12005, the mobile user terminal then displays, on the LCD, the contents of the electronic telephone card that is to be transferred (display the transfer offer; 7602).

When user B performs a transfer offer acceptance operation 7603, the mobile user terminal of user B transmits, to the mobile user terminal of user A, a card transfer offer response 7604, which is a response message for the card transfer offer 7601.

As is shown in FIG. 120B, the digital signature of user B is provided for the data that consist of a card transfer offer response header 12016, which is header information indicating that the message is the card transfer offer response 7604 and describing the data structure; an acceptance number 12017; a transfer offer number 12018; a card ID 12019; an issued time 12020, which indicates the date on which the card transfer offer response 7604 was issued; and a user public key certificate 12021. In this fashion, the card transfer offer response 7604 is provided.

The user public key certificate 12021 is a public key certificate for user B. To provide this certificate 12021, the digital signature of the service provider is provided for the data that consist of a user public key certificate header 12022; a user public key 12023 for user B; a public key certificate ID 12024, which is ID information for the public key certificate; a certificate validity term 12025; a service provider ID 12026; and a certificate issued time 12027.

The acceptance number 12017 is arbitrarily generated, by the mobile user terminal of user B, as a number that uniquely represents the telephone card transfer processing. With this number, the mobile user terminal of user A is notified as to whether user B has accepted the card transfer offer 7601. When user B does not accept the card transfer offer 7601, a value of 0 is set as the acceptance number 12017. When user B accepts the card transfer offer 7601, a value other than 0 is set.

Upon receiving the card transfer offer response 7604, the mobile user terminal of user A displays, on the LCD, the contents of the card transfer offer response 7604 (display the transfer offer response; 7605). When the card transfer offer 7601 is accepted (acceptance number 12017≠0), the mobile user terminal of user A examines the digital signature of the service provider of the user public key certificate 12021 and the validity term. The mobile user terminal generates a card transfer certificate 7606, which is a message that corresponds to a transfer certificate for an electronic telephone card to user B, and transmits it to the mobile user terminal of user B.

As is shown in FIG. 121A, the digital signature of the electronic payment and the digital signature of user A are provided for the data that consist of a card transfer certificate header 12100, which is header information indicating that the message is the card transfer certificate 7506 and describing the data structure; a presentation card 12101 for an electronic telephone card to be transferred; a card status 12102; a total remaining value 12103; a transfer offer number 12104; an acceptance number 12105; a public key certificate ID 12106 for the user public key certificate of user B; a public key certificate ID 12107 for the user public key certificate of user A; a card ID 12108; and an issued time 12109, which indicates the date on which the card transfer certificate 7606 was issued. These data are closed and addressed to user B, thereby providing the card transfer certificate 7606.

Upon receiving the card transfer certificate 7606, the mobile user terminal of user B decrypts it and examines the digital signature of user A and the one accompanying the electronic telephone card. Further, the mobile user terminal compares the card ID presented by the card transfer offer 7601 with the card ID 12108, and compares the public key certificate IDs 12106 and 12107 with the public key certificates of users B and A to verify the contents of the card transfer certificate 7606. The mobile user terminal then generates a card transfer receipt 7607, which is a message indicating the electronic telephone card has been received, and transmits the receipt 7607 to the mobile user terminal of user A.

As is shown in FIG. 121B, the digital signature of user B is provided for the data that consist of a card transfer receipt header 12115, which is header information indicating that the message is the card transfer receipt 7607 and describing the data structure; a card ID 12116; a transfer offer number 12117; an acceptance number 12118; a public key certificate ID 12119 for the user public key certificate of user A; a public key certificate ID 12120 for the user public key certificate of user B; and an issued time 12121, which indicates the date on which the card transfer receipt 7607 was issued. These data are closed and addressed to user A, thereby providing the card transfer receipt 7607.

Upon receiving the card transfer receipt 7607, the mobile user terminal of user A decrypts it, and examines the digital signature of user B. Further, the mobile user terminal compares the public key certificate IDs 12119 and 12120 with the public key certificates of users B and A to verify the contents of the card transfer receipt 7607. The mobile user terminal then erases the transferred electronic telephone card from the card list 1714, and registers the card transfer receipt 12122 in use history 1715. At this time, addresses in the object data area at which the transfer offer number, the code information indicating the card transfer process, the issued time for the card transfer receipt 7607 and the card transfer receipt 12122 are stored are assigned to the request number 1840 in the use list 1715, the service code 1841, the use time 1842 and the use information address 1843.

The mobile user terminal of user A displays, on the LCD, a message indicating the completion of the transfer process (display the transfer process; 7608). The process at the mobile user terminal of user A (sender) is thereafter terminated.

After transmitting the card transfer receipt 7607, the mobile user terminal of user B displays the received card transfer certificate 12111 on the LCD. In addition, the mobile user terminal displays a dialogue message inquiring whether the transfer process with the service providing server (process for downloading the received electronic telephone card from the service providing system) should be immediately performed (display the transfer certificate; 7609).

The dialogue message has two operating menus: "transfer process request" and "cancel." When "cancel" is selected, the transfer process performed with the service providing server is canceled, and in the process (data updating process) during which the service providing system updates the data in the mobile user terminal, an electronic telephone card that has been transferred is assigned to the mobile user terminal.

When user B selects "transfer process request" (transfer process request operation; 7610), based on the card transfer certificate 12111 the mobile user terminal generates a card transfer request 7611, which is a message requesting that the transfer process be performed with the service providing system, and transmits it to the service providing system via digital wireless telephone communication.

As is shown in FIG. 122A, the digital signature of user B is provided for the data that consists of a card transfer request header 12200, which is header information indicating that the message is the card transfer request 7611 and describing the data structure; a decrypted card transfer certificate 12201 (12111); the user ID 12202 of user B; and an issued time 12203, which indicates the date when the card transfer request 7611 was issued. These data are closed and addressed to the service provider, thereby providing the card transfer request 7611.

Upon receiving the card transfer request 7611, the user processor of user B of the service providing system 110 decrypts it and examines the digital signature, and transmits it to the service manager processor. The service manager processor generates a service director processor to form a process group for processing the card transfer request 12204.

The service director processor, first refers to the user list 5200 and specifies the recipient (user B) and the sender (user A) of the transfer process by employing the public key certificate IDs 12106 and 12107 in the card transfer certificate 12201 that is included in the card transfer request 12204. The service director processor examines the digital signature of the user A and the digital signature accompanying the electronic telephone card, which are provided for the card transfer certificate 12201, and verifies the validity of the card transfer certificate 12201. Following this, the service director processor erases the electronic telephone card to be transferred from the card list 4612 of the user A that is stored in the user information server 902. Then, the service director processor changes the card signature private key and card signature public key pair and the card certificate for a new key pair and a card certificate, and also changes the card status and the total remaining value to the card status 12102 and to the total remaining value 12103 for the card transfer certificate 12201. The service director processor generates an electronic telephone card received from user A, and enters it in the card list 4612 for the user B.

When the electronic telephone card that is to be transferred has already been registered, the service director processor updates the registered card list 5502 holding the electronic telephone card. Specifically, the user ID 5518, the user public key 5519, the registered card certificate address 5520, the telephone micro-check list address 5521 and the former user information address 5522, all of which are in the registered card list 5502, are updated (to the information for user B). The old information (information for user A) is pointed to at the former user information address 5522 as former user information 5523.

The service director processor generates a telephone card transfer message 12226, which includes an electronic telephone card transferred from user A. The user processor of user B closes the message 12226 and addresses it to the user B, and transmits it as a telephone card transfer message 7612 to the mobile user terminal of user B via digital wireless telephone communication.

As is shown in FIG. 122C, the digital signature of the service provider is provided for the data that consist of a telephone card transfer header 12219, which is header information indicating that the message is the card transfer 7612 and describing the data structure; a transfer number 12220, which is an arbitrarily generated number that represents the transfer process in the service providing system; transfer information 12221; an acceptance number 12222; an electronic telephone card 12223, which is transferred; a service provider ID 12224; and an issued time 12225, which indicates the date when the telephone card transfer message 7612 was issued. These data are closed and addressed to the user B, thereby providing the card transfer message 7612.

The transfer information 12221 is information concerning the electronic telephone card transfer process performed by the service providing system, and is accompanied by the digital signature of the service provider. The mobile user terminal of user B decrypts the received telephone card transfer message 7612 and examines the digital signature, registers the electronic telephone card 12223 in the card list 1714, and displays the electronic telephone card on the LCD (display the electronic telephone card; 7613). The card transfer process is thereafter terminated.

An explanation will now be given for the contents of messages that are exchanged by the devices during the electronic telephone card installation processing.

In FIG. 79 are shown procedures for the exchange of messages by the devices during the electronic telephone card installation processing, and in FIGS. 127A and 127B, and 128A and 128B are shown the contents of messages that are exchanged during the electronic payment installation processing.

First, when the user performs an electronic telephone card installation operation 7900, the mobile user terminal generates an electronic telephone card installation request 7901, and transmits it to the service providing system 110 via digital wireless telephone communication.

As is shown in FIG. 127A, the digital signature of the user is provided for the data that consists of an electronic telephone card installation request header 12700, which is header information indicating that the message is the electronic telephone card installation request 7901 and describes the data structure; an installation card number 12701 and an installation number 12702, which are entered by a user; a request number 12703, which is an arbitrarily generated number that uniquely represents the electronic telephone card installation process; a user ID 12704; and an issued time 12705, which indicates the date when the electronic telephone card installation request 7901 was issued. These data are closed and addressed to the service provider, thereby providing the electronic telephone card installation request 7901.

Upon receiving the electronic telephone card installation request 7901, the user processor of the service providing system 110 decrypts it and examines the digital signature, and transmits it to the service manager processor. The service manager processor generates a service director processor to form a process group for processing the electronic telephone card installation request 12706.

First, the service director processor refers to the installation card list that is indicated by the installation card list address 5243 for the telephone card issuer list 5205, and specifies a telephone card issuer who issues a telephone card that is represented by the installation number 12701. The service director processor generates a telephone card installation request 12717, which is a message requesting that the telephone card issuer issue a telephone card using the installation card. The telephone card issuer processor closes the request 12717 and addresses it to the telephone card issuer, and transmits it as a telephone card installation request 7902 to the telephone card issuing system 108.

As is shown in FIG. 127B, the digital signature of the service provider is provided for the data that consist of a telephone card installation request header 12710, which is header information indicating that the message is the telephone card installation request 7902 and describing the data structure; an installation card number 12711; an installation number 12712; a request number 12713; a customer number 12714, which uniquely represents a user for the telephone card issuer; a service provider ID 12715; and an issued time 12716, which indicates the date when the telephone card installation request 7902 was issued. These data are closed and addressed to the telephone card issuer, thereby providing the telephone card installation request 7902.

Upon receiving the telephone card installation request 7902, the telephone card issuing system 109 decrypts it and examines the digital signature. The telephone card issuing server 1300 compares the installation card number 12711 and the installation number 12712, which are included in the telephone card installation request 7902, with the management information for the issued electronic telephone card installation card that is stored in the telephone card issuing information server 1302. The telephone card issuing server 1300 then updates the data in the customer information server 1302 and the telephone card issuing information server 1303. Furthermore, the telephone card issuing server generates telephone card data (12806) for a requested telephone card, and transmits, to the service providing system, an electronic telephone card installation commission 7903, which is a message requesting the installation of an electronic telephone card that corresponds to the requested telephone card.

As is shown in FIG. 128A, the digital signature of the telephone card issuer is provided for the data that consists of an electronic telephone card installation commission header 12800, which is header information indicating that the message is the electronic telephone card installation commission 7903 and describing the data structure; a transaction number 12801, which is an arbitrarily generated number that uniquely represents the transaction with a user; telephone card issuing information 12802; a request number 12803; card code 12804, which indicates the type of electronic telephone card that is to be issued; a template code 12805, which indicates a template program for an electronic telephone card to be issued; telephone card data 12806; representative component information 12807; a telephone card issuer ID 12808; and an issued time 12809, which indicates the date when the electronic telephone card installation commission 7903 was issued. These data are closed and addressed to the service provider, thereby providing the electronic telephone card installation commission 7903.

The telephone card issuing information 12802 is information concerning the telephone card issuing process performed by the telephone card issuing system, and is accompanied by the digital signature of the telephone card issuer.

The telephone card data 12806 is telephone card information issued by the telephone card issuer, wherein the digital signature of the telephone card issuer accompanies the data that consists of the card ID 12814, the telephone card information 12815 and the card ID 12816.

The telephone card issuer processor of the service providing system decrypts the received electronic telephone card installation commission 7903 and examines the digital signature, and transmits the commission 7903 to the service director processor. In accordance with the electronic telephone card installation commission 12810, the service director processor generates an electronic telephone card to be issued to a user, using the same procedures as are used for the telephone card purchase processing, and also generates an electronic telephone card installation message 12815, which is a message directing that the electronic telephone card be installed in the mobile user terminal. The user processor closes the electronic telephone card installation message 12855 and addressees it to a user, and transmits it as an electronic telephone card installation message 7904 to the mobile user terminal via digital wireless telephone communication.

As is shown in FIG. 128B, the digital signature of the service provider is provided for the data that consists of an electronic telephone card installation header 12817, which is header information indicating that the message is the electronic telephone card installation message 7904 and describing the data structure; a transaction number 12818; telephone card issuing information 12819, which concerns the telephone card issuing process performed by the telephone card issuing system; telephone card issuing information 12820, which concerns the telephone card issuing process performed by the service providing system; a request number 12821; generated electronic telephone card data 12822; a service provider ID 12823; and an issued time 12824, which indicates the date when the electronic telephone card installation message 7904 was issued. These data are closed and addressed to the user, thereby providing the electronic telephone card installation message 7904. The telephone card issuing information 12819 and the telephone card issuing information 12820 are accompanied by the digital signatures of the telephone card issuer and the service provider.

The mobile user terminal decrypts the received electronic telephone card installation message 7904 and examines the digital signature, registers, in the card list 1714, the electronic telephone card included in the electronic telephone card installation request 7904, and displays the installed electronic telephone card on the LCD (display the electronic telephone card; 7905).

An explanation will now be given for the contents of messages that are exchanged by the devices during the real credit clearing process for electronic credit card service.

In FIG. 84 are shown procedures for the exchange of messages by the devices during the real credit clearing processing, and in FIGS. 135A to 135F, 136A to 136C, and 137A and 137B are shown the contents of the messages that are exchanged by the devices during the real credit clearing processing.

First, when the merchant presses the switch on the cash register for the credit card clearing (8401), the merchant terminal 102 or 103 generates multiple types of payment offer responses 8406 and enters the wait state for a payment offer 8405.

The payment offer responses 8406 are those used when an amount of payment entered by a user is insufficient, when a credit card or a payment option designated by the user is not available, or when the payment offer 8405 is accepted.

When the user performs a payment operation 8404, the mobile user terminal 100 generates the payment offer 8405 and transits it to the merchant terminal 102 or 103 via infrared communication.

As is shown in FIG. 135A, the digital signature of a user is provided for data that consists of a payment offer header 13500, which is header information indicating that the message is the payment offer 8405 and describing the data structure; a payment service code 13501, which is a service code used to identify the type of electronic credit card designated by a user; a request number 13502, which is an arbitrarily generated number that uniquely represents the transaction with a merchant; an amount of payment 13504, which is entered by a user; a payment option code 13505, which is a payment option, such as the number of payments, entered by a user; an effective period 13506 for the payment offer 8405; and an issued time 13507, which indicates the date on which the payment offer 8405 was issued. Thus, the payment offer 8405 is provided.

Upon receiving the payment offer 8405, the merchant terminal 102 or 103 examines the payment service code 13501, the amount of payment 13504 and the payment option 13505, and selects an appropriate payment offer response 8406 from among multiple types of responses 8406 and transmits it to the mobile user terminal via infrared communication. Further, the terminal 102 or 103 generates an authorization request 8409 and transmits it to the merchant processor of the service providing system 110.

As is shown in FIG. 135B, the digital signature of a merchant is provided for the data that consists of a payment offer response header 13508, which is header information indicating that the message is the payment offer response 8406 and describing the data structure; a response message 13509, which is displayed on the LCD 303 when the mobile user terminal 100 receives the payment offer response 8406; a transaction number 13510, which is an arbitrarily generated number that uniquely represents the transaction with a user; an amount of sales 13511; a service provider telephone number 13512, which is the telephone number of the service providing system in the service area of the merchant; an effective period 13513 for the payment offer response 8406; a merchant ID 13514; and an issued time 13515, which indicates the date on which the payment offer response 8406 was issued. In this fashion, the payment offer response 8406 is provided.

The service provider telephone number 13512 is accompanied by the digital signature of the service provider. The response message 13509 is a text message that is optionally selected by the merchant, and may not always be selected.

When the amount of payment designated by the user is insufficient, or when a credit card or a payment option entered by the user can not be accepted, the merchant terminal sets for the transaction number 13510 a value of "0," thus notifying the mobile user terminal that the payment offer 8405 can not be accepted.

As is shown in FIG. 135C, the digital signature of a merchant is provided for the data that consists of an authorization request header 13516, which is header information indicating that the message is the authorization request 8409 and describing the data structure; a payment offer 8405; a payment offer response 8406; an accounting machine ID 13517; a merchant ID 13518; and an issued time 13519, which indicates the date on which the authorization request 8409 was issued. These data are closed and addressed to the service provider, thereby providing the authorization request 8409.

The mobile user terminal 100 receives the payment offer response 8406, compares the amount of payment 13504 with the amount of sale 13511, generates a payment request 8410, and transmits it to the user processor of the service providing system via digital wireless telephone communication.

As is shown in FIG. 135D, the digital signature of a user is provided for the data that consists of a payment request header 13524, which is header information indicating that the message is the payment request 8410 and describing the data structure; a payment offer 8405; a payment offer response 8406; a user ID 13525; and an issued time 13526, which indicates the date on which the payment request 8410 was issued. These data are closed and addressed to the service provider, thereby providing the payment request 8410.

Either the transmission of the authorization request 8409 by the merchant terminal 102 or 103, or the transmission of the payment request 8410 by the mobile user terminal may be performed first, or the two of them may be performed at the same time.

The merchant processor and the user processor of the service providing system 110 receive the authorization request 8409 and the payment request 8410, decrypt them and examine the digital signatures, and transmit an authorization request 13520 and a payment request 13527 to the service manager processor. The service manager processor compares the request number, the transaction number and the merchant ID to obtain a correlation between the authorization request and the payment request, and generates the service director processor to form a process group for handling the authorization request 13520 and the payment request 13527. The service director processor compares the contents of the authorization request 13520 with those of the payment request 13527, authorizes the user and generates an authorization response 13540. The merchant processor closes the response 13540, addresses it to the merchant and transmits it as an authorization response 8411 to the merchant terminal.

As is shown in FIG. 135E, the digital signature of a service provider is provided for the data that consists of an authorization response header 13531, which is header information indicating that the message is the authorization response 8411 and describing the data structure; a transaction number 13532; an authorization number 13533, which is an arbitrarily generated number that uniquely represents the authorization processing; user personal data 13535; a customer number 13536; an effective period 13537, which designates a period during which the authorization response 8411 is effective; a service provider ID 13538; and an issued time 13539, which indicates the date on which the authorization response 8404 was issued. These data are closed and addressed to the merchant, thereby providing the authorization response 8411.

When, as the result of the authorization process, it is determined that the credit condition of the user is not satisfactory, the user personal data 13534 are not set. The customer number 13536 is set only when a transaction was previously made between the user and the merchant through an electronic commerce service.

The merchant terminal 102 or 103 decrypts the received authorization response 8411 and examines the digital signature, and displays the results of the authorization process on the LCD.

When an operator (merchant) performs a clearing request operation 8413, the merchant terminal generates a clearing request 8415 and transmits it to the merchant processor. As is shown in FIG. 135F, the digital signature of a merchant is provided for the data that consist of a clearing request header 13544, which is header information indicating that the message is the clearing request 8415 and describing the data structure; a payment offer 8405; a payment offer response 8406; an authorization number 13545, which is issued by the service providing system 110; an effective period 13546, which indicates a period during which the clearing request 8415 is effective; an accounting machine ID 13547; a merchant ID 13548; and an issued time 13549, which indicates the date on which the clearing request 8415 was issued. These data are closed and addressed to the service provider, thereby providing the clearing request 8415.

Upon receiving the clearing request 8415, the merchant processor of the service providing system 110 decrypts it and examines the digital signature, and transmits a clearing request 8450 to the service director processor. The service director processor compares the clearing request 8450 with the payment request 8427, and generates a clearing request 13610 for the transaction processor. The transaction processor closes the request 13610, addresses it to the transaction processor, and transmits it as a clearing request 8416 to the transaction processing system.

As is shown in FIG. 136A, the digital signature of a service provider is provided for data that consist of a clearing request header 13600, which is header information indicating that the message is the clearing request 8416 and describing the data structure; a user clearing account 13601, which indicates a credit card that corresponds to the payment service code designated by the user; a request number 13602, which is issued by the mobile user terminal 100; an amount of payment 13603; a payment option code 13604; a merchant clearing account 13605, which indicates a clearing account for the merchant; a transaction number 13606, which is issued by the merchant terminal; an effective period 13607, which indicates the period wherein the clearing request 8416 is effective; a service provider ID 13608; and an issued time 13609, which indicates the date on which the clearing request 8416 was issued. These data are closed and addressed to the transaction processor, thereby providing the clearing request 8416.

The transaction processing system 106 receives the clearing request 8416, decrypts it and examines the digital signature, and performs the clearing process. Then, the transaction processing system 106 generates a clearing completion notification 8417 and transmits it to the service providing system 110.

As is shown in FIG. 136B, the digital signature of a transaction processor is provided for data that consist of a clearing completion notification header 13614, which is header information indicating that the message is the clearing completion notification 8417 and describing the data structure; a clearing number 13615, which is an arbitrarily generated number that uniquely represents the clearing process performed by the transaction processing system 106; a user clearing account 13616; a request number 13617; an amount of payment 13618; a payment option code 13619; a merchant clearing account 13620; a transaction number 13621; clearing information 13622 for a service provider that is accompanied by the digital signature of the transaction processor; clearing information 13623 for a merchant that is accompanied by the digital signature of the transaction processor; clearing information 13624 for a user that is accompanied by the digital signature of the transaction processor; a transaction processor provider ID 13625; and an issued time 13626, which indicates the date on which the clearing completion notification was issued. These data are closed and addressed to the service provider, thereby providing the clearing completion notification 8417.

Upon receiving the clearing completion notification 8417, the transaction processor processor of the service providing system 110 decrypts it and examines the digital signature, and transmits a clearing completion notification 13627 to the service director processor. Upon receiving the clearing completion notification 13627, the service director processor generates a clearing completion notification 13637 for the merchant. The merchant processor closes the clearing completion notification 13637, addresses it to the merchant, and transmits it to the merchant terminal as a clearing completion notification 8418 for the merchant.

As is shown in FIG. 136C, the digital signature of a service provider is provided for data that consist of a clearing completion notification header 13631, which is header information indicating that the message is the clearing completion notification 8418 and describing the data structure; a clearing number 13632; clearing information 13623 for a merchant that is accompanied by the digital signature of the transaction processor; a customer number 13633, which is an arbitrarily generated number that uniquely represents a user for a merchant; a decrypted clearing request 13550; provided service information 13634, which concerns the process performed by the service providing system 110; a service provider ID 13635; and an issued time 13636, which indicates the date on which the clearing completion notification 8418 was issued. These data are closed and addressed to the merchant, thereby providing the clearing completion notification 8418. The provided service information 13634 is set optionally by the service provider, and may not always be set.

Upon receiving the clearing completion notification 8418, the merchant terminal decrypts it and examines the digital signature, and generates a receipt 8419 and transmits it to the merchant processor.

As is shown in FIG. 137A, the digital signature of a merchant is provided for data that consist of a receipt header 13700, which is header information indicating that the message is the receipt 8419 and describing the data structure; an item name 13701, which indicates a product that is sold; sales information 13702, which is additional information concerning the transaction transmitted by the merchant to the user; a clearing number 13703; transaction information 13704; a payment offer 8405; an accounting machine ID 13705; a merchant ID 13706; and an issued time 13707, which indicates the date on which the receipt 8419 was issued. These data are closed and addressed to the service provider, thereby providing the receipt 8419. The sales information 13702 is set optionally by the merchant, and may not always be set.

Upon receiving the receipt 8419, the merchant processor of the service providing system 110 decrypts it and examines the digital signature, and transmits a receipt 13708 to the service director processor. The service director processor employs the receipt 13708 to generate a receipt 13717 for a user. The service director processor closes the receipt 13717 and addresses it to the user, and transmits it as a receipt 8421 to the mobile user terminal 100 via digital wireless telephone communication.

As is shown in FIG. 137B, the digital signature of a service provider is provided for data that consist of a receipt header 13712, which is header information indicating that the message is the receipt 8421 and describing the data structure; a user ID 13713; a decrypted receipt 13708; clearing information 13709 for a user that is accompanied by the digital signature of the transaction processor; provided service information 13714, which concerns the process performed by the service providing system 110; a service provider ID 13715; and an issued time 13716, which indicates the date on which the receipt 8421 was issued. These data are closed and addressed to the user, thereby providing the receipt 8421. The provided service information 13713 is set optionally by the service provider, and may not always be set.

Upon receiving the receipt 8421, the mobile user terminal 100 decrypts it and examines the digital signature, and displays the contents on the LCD 303. The real credit clearing process is thereafter terminated.

In the mobile user terminal 100, the ROM 1501 and the EEPROM 1503 may be replaced by ferroelectric nonvolatile memory as a memory device for storing a program executed by the CPU 1500 and the public key of the service provider. This memory device can store data without a battery being required, while like EEPROM or flash memory, data can be written to it. In addition, the reading and writing speeds of the ferroelectric nonvolatile memory are higher than those of EEPROM and flash memory, and the power consumption is low.

When the ferroelectric nonvolatile memory is employed instead of the ROM 1501 and the EEPROM 1503, in the same manner, for example, as in the data updating process, the program for the mobile user terminal 100 can be extensively updated, and the public key of the service provider can be periodically updated within a comparatively short period of time with little battery service life loss.

Furthermore, a ferroelectric nonvolatile memory may be used as the RAM 1502 to store the data that are to be processed and the data that are processed by the CPU 1500. Since data are not lost even when the battery power has been exhausted, a data backup process is not required, and the power supply required for storing the data resident in the RAM is not needed. As a result, the power consumed by the mobile user terminal can be reduced.

Also, a ferroelectric nonvolatile memory may used instead of the ROM 3001 and the EEPROM 3003 in the merchant terminal 103, or the RAM 3002. In this case, the same effects are acquired as are obtained with the mobile user terminal 100.

In the above explanation, the mobile user terminal 100, the gate terminal 101 and the merchant terminals 102 and 103, which together constitute the mobile electronic commerce system, include an optimal hardware arrangement with which to implement the individual functions needed to provide the mobile electronic commerce service. These components can be constituted by a wireless telephone communication function, an infrared communication function, and a computer that comprises a display device, a keyboard (or an input pen), a microphone and a loudspeaker, and that further comprises a bar code reader for the merchant terminal 103.

In this case, functionally corresponding hardware components of the mobile user terminal 100, the gate terminal 101, or the merchant terminal 102 or 103 are modified for inclusion in a program for the hardware components that are not included in the computer (e.g., a data codec, a cryptographic processor and a logic control unit). This program, together with a program stored in the ROM 1501 (or 2201, 2601 or 3001), is converted so that it can be operated by the OS (Operating System) of a personal computer. The resultant program is then stored at a location (e.g., on a hard disk) where it can be accessed by the computer.

A second embodiment of the present invention will now be described while referring to FIGS. 139 and 140.

In the mobile electronic commerce system in the second embodiment, instead of the EEPROM 1503 an SIM (Subscriber Identify Module) card is employed for the mobile user terminal 100 in the first embodiment.

FIGS. 139A and 139B are a front view and a rear view of a mobile user terminal 13900 for the second embodiment, and FIG. 140 is a block diagram illustrating the arrangement of the mobile user terminal 13900. The arrangement of the mobile user terminal 13900 is the same as that of the mobile user terminal 100, except that an SIM card 14000 and an SIM card reader/writer 14001 are provided instead of the EEPROM 1503. The external appearance of the mobile user terminal 13900 is also the same as that of the mobile user terminal 100, except that an SIM card attachment section 13901 is provided on the reverse side for attaching the SIM card 14000.

The same information as is stored in the EEPROM 1503 in the first embodiment is stored in the nonvolatile memory of the SIM card 149000: the terminal ID and the telephone number of the mobile user terminal 13900 when used as a wireless telephone terminal; a user ID; a user code number; a private key and a public key used for a digital signature; a service provider ID; the telephone number of the service providing system 110 (which is accompanied by the digital signature of the service provider); and the public key of the service provider.

The SIM card 14000 can be carried separately from the mobile user terminal 13900. But without the SIM card 14000, if it has been removed, the mobile user terminal 13900 can not be operated. When the SIM card 14000 is attached to the SIM card reader/writer 14001, the CPU 1500 of the mobile user terminal 13900 accesses the information stored on the SIM card 14000 via the SIM card reader/writer 14001 and a bus 1529. The mobile user terminal 13900 then performs the same operations as does the mobile user terminal 100 in the first embodiment.

Further, to remove the SIM card 14000 from the mobile user terminal 13900, the following operation must be performed.

First, when a user depresses the power switch and holds it down for five seconds (removal operation 1 for the SIM card 14000), the mobile user terminal 13900 displays, on the LCD 303, a dialogue message requesting confirmation that the SIM card will be removed. Then, when the user depresses the execution switch (removal operation 2 for the SIM card 14000), the mobile user terminal 13900 performs a data updating process with the service providing system 110, and uploads the data from the RAM 1502 of the mobile user terminal 13900 to the user information server 902. When the user removes the SIM card 14000 from the SIM card reader/writer 14001 (removal operation 3 for the SIM card 14000), the mobile user terminal 13900 deletes all the data held in the RAM 1502.

Specifically, when the SIM card is removed from the mobile user terminal, the data, such as those for the electronic ticket and electronic payment card, that are stored in the RAM of the mobile user terminal are uploaded to the user information server 902 of the service providing system 110.

The following operation is performed when the SIM card 14000 is attached to the mobile user terminal 13900.

When the SIM card 14000 is connected to the SIM card reader/writer 14001, the mobile user terminal 13900 displays, on the LCD 303, a screen which permits the entry of a code number.

When the user enters the code number and presses the execution switch, the code number stored in the nonvolatile memory of the SIM card 14000 is compared with the code number that was entered. When the two numbers do not match, the mobile user terminal 13900 again displays on the LCD 303 which permits the entry of the code number. When the two code numbers match, access to the SIM card 14000 is permitted. The mobile user terminal 13900 reads, from the SIM card 14000, the user ID, the private key used for the digital signature, the telephone number of the service providing system 110 and the public key of the service provider, and performs a data updating process with the service providing system 110 in order to update the data in the RAM 1502 of the mobile user terminal 13900. At this time, the data for the mobile user terminal in the user information server 902 are stored in the RAM 1502 of the mobile user terminal 13900, in accordance with the user ID stored on the SIM card 14000.

Specifically, the data for the mobile user terminal, such as the data for the electronic ticket or for the electronic payment card that are uploaded to the user information server 902 of the service providing system 110, are downloaded to the mobile user terminal to which the SIM card is attached. When, for example, an SIM card is attached to a mobile user terminal that differs from the mobile user terminal to which the SIM card was previously attached, the same data as those stored in the RAM of the mobile user terminal to which the SIM card was previously attached are stored in the RAM of the mobile user terminal to which the SIM card is currently attached.

Therefore, the user can carry the SIM card 14000 on which the user ID is stored, and can employ an arbitrary mobile user terminal as his or her own by attaching the SIM card to that mobile user terminal.

In the mobile user terminal 13900, not only the areas used for storing the user ID and the code number, but also areas that correspond to the basic program area 1700 of the RAM 1502, the service data area 1701, the user area 1702 and the temporary area 1704 may be provided for the nonvolatile memory of the SIM card 14000, so that the data stored in these areas in the RAM 1502 may be stored in the nonvolatile memory of the SIM card 14000. In this case, the data for the electronic ticket or the electronic payment card are stored in the nonvolatile memory of the SIM card 14000, and the RAM 1502 is a work area that is used by the CPU 1500 when executing a program.

Since the data stored in the RAM 1502, other than in the work area 1703 of the mobile user terminal 100 of the first embodiment, are held in the nonvolatile memory of the SIM card 14000, the data updating process, which is performed when the SIM card is attached and removed, is not required, and as a power source for holding data is also not required, the power consumed by the mobile user terminal can be reduced.

A ferroelectric memory may be used as the nonvolatile memory for the SIM card 14000. Since the reading and writing speeds of the ferroelectric nonvolatile memory are higher than are those of EEPROM and flash memory, and since the power consumption is low, the processing speed of the mobile user terminal can be increased and its power consumption can be reduced.

A third embodiment will now be described while referring to FIGS. 141 to 143.

According to the third embodiment, a mobile electronic commerce system is provided that includes an IC card reader/writer and that employs, as a mobile user terminal, a portable wireless telephone terminal wherein an electronic ticket, an electronic payment card or an electronic telephone card that the user obtains is stored in an IC card loaded into the telephone terminal.

FIGS. 141A and 141B are a front view and a rear view of a mobile user terminal 14100 according to the third embodiment, and FIG. 142 is a block diagram illustrating the arrangement of the mobile user terminal 14100. The external appearance of the mobile user terminal 13900 is the same as that of the mobile user terminal 100, except that an IC card insertion slot 14101 is formed in the reverse side for loading the IC card 14100. The arrangement of the mobile user terminal 14100 is the same as that of the mobile user terminal 100, except that the cryptographic processor 1505 is replaced by an IC card reader/writer 14200. When the IC card 14102 is loaded into the IC card reader/writer 14200, the mobile user terminal 14100 performs the same operations as does the mobile user terminal 100 in the first embodiment for the other devices, such as the service providing system 110, the gate terminal 101, the merchant terminals 102 and 103, the automatic vending machine 104 and the switching center 105.

It should be noted that the mobile user terminal 14100 performs the following operation when the IC card 14102 is loaded therein.

When the IC card 14102 is loaded in the IC card reader/writer 14200, the mobile user terminal 14100 displays, on the LCD 303, a screen permitting the entry of a code number. When the user enters the code number and presses the execution switch, the code number stored in the IC card 14102 is compared with the code number that was entered. When the two numbers do not match, the mobile user terminal 14100 again displays, on the LCD 303, the screen permitting the entry of a code number. When the two code numbers match, access to the IC card 14102 is permitted.

For the mobile user terminal 14100, the user ID and the user code number, the private key and the public key used for a digital signature, the service provider ID, the telephone number of the service providing system 110 and the public key of the service provider are stored in the IC card 14102, while the terminal ID and the telephone number of the mobile user terminal 14100 when used as a wireless telephone terminal are stored in the EEPROM 1503.

In addition, an additional program and the data for the electronic ticket or the electronic payment card, which are stored in the basic program area 1700, the service data area 1701, the user area 1702 and the temporary area 1704 in the RAM 1502 of the mobile user terminal 100 of the first embodiment, are stored on the IC card 14102 of the mobile user terminal 14100. The RAM 1502 of the mobile user terminal 14100 serves as a work area that is used by the CPU 1500 when executing a program.

Furthermore, the mobile user terminal 14100 employs the IC card 14100 loaded into the IC card reader/writer 14200 to perform one part of the data processing for the messages that are exchanged with the service providing system 110, the gate terminal 101, the merchant terminals 102 and 103, the automatic vending machine 104 or the switching center 105 for the mobile electronic commerce service.

FIG. 143 is a block diagram illustrating the arrangement of the IC card 14102.

The IC card 14102 includes two interfaces, one for a contact type IC card and one for a non-contact IC card. This IC card comprises: a CPU (Central Processing Unit) 14300, which processes data to be transmitted and data that are received in accordance with a program stored in a ROM (Read Only Memory) 14301, and which controls the other components across a bus 14318; a RAM (Random Access Memory) 14302, in which are stored data that are to be processed and that are being processed by the CPU 14300; an FeRAM (Ferroelectric Random Access Memory) 14303, in which are stored a user ID and a code number for a user, a private key and a public key for a digital signature, a service provider ID, the telephone number of the service providing system 110, the public key of the service provider, and an additional program or data such as those for an electronic ticket or for an electronic payment card, which are stored in the basic program area 1700, the service data area 1701, the user area 1702 and the temporary area 1704 of the RAM 1502 for the first embodiment; a cryptographic processor 14304, which encrypts or decrypts data under the control of the CPU 14300; an input/output circuit 14305, which converts and controls a signal that is input or output at a contact 14306 of a non-contact IC card under the control of the CPU 14300; and an RF modem 14307, which converts and controls radio waves that are input or output by an antenna 14308 of a non-contact IC card under the control of the CPU 14300.

The cryptographic processor 14304, which corresponds to the cryptographic processor 1505 of the mobile user terminal 100 in the first embodiment, includes an encryption and decryption function that uses a secret key method and an encryption and decryption function for a public key system. The cryptographic processor 14304 employs the cryptograph method and keys that are set by the CPU 14300 to encrypt or decrypt data as designated by the CPU 14300. The cryptographic function of the cryptographic processor 14304 is employed for the process for providing a digital signature for a message or the process for closing the message, and the process for decrypting the closed message or the process for verifying a digital signature accompanying the message.

To transmit, via a digital wireless telephone communication, a message that is closed and is accompanied by a digital signature, first, the CPU 14300 employs the cryptographic processor 14304 to perform the digital signature provision process and the message closing process, and transmits the resultant message to the input/output circuit 14305. The message, which is closed and is accompanied by the digital signature, is converted into an electric signal by the input/output circuit 14305, and the electric signal is output at the contact point 14306. Through the IC card reader/writer 14200 and the bus 1529, the CPU 1500 reads, as a message, the electric signal that is output at the contact 14306. The CPU 14300 employs the data codec 1506 to encode the message that is closed and accompanied by the digital signature to obtain a data form for digital wireless telephone communication, and transmits the coded message via the control logic unit 1508 to the channel codec 1513.

When a message that is closed and is accompanied by a digital signature is received via digital wireless telephone communication, the CPU 1500 reads the received message from the channel codec 1513 through the control logic unit 1508, employs the data codec 1506 to decrypt the received message, and transmits the decrypted message to the IC card 14102 via the bus 1529 and the IC card reader/writer 14200. The CPU 14300 receives a message via the contact point 14306 and the input/output circuit 14305, and employs the cryptographic processor 14304 to decrypt the closed and encrypted message and to examine the digital signature accompanying the message.

Similarly, to transmit via infrared communication a message that is closed and is accompanied by a digital signature, first, the CPU 14300 employs the cryptographic processor 14304 to perform the digital signature provision process and the message closing process, and transmits the resultant message to the input/output circuit 14305. The message that is closed and is accompanied by the digital signature is converted into an electric signal by the input/output circuit 14305, and the electric signal is output at the contact point 14306. Through the IC card reader/writer 14200 and the bus 1529, the CPU 1500, reads, as a message, the electric signal that is output at the contact 14306. The CPU 14300 employs the data codec 1506 to encode the message that is closed and is accompanied by the digital signature to obtain a data form for infrared communication, and transmits the coded message to the infrared communication module 1507.

When a message that is closed and is accompanied by a digital signature is received via infrared communication, the CPU 1500 reads the received message from the infrared communication module 1507, employs the data codec 1506 to decrypt the received message, and transmits the decrypted message to the IC card 14102 via the bus 1529 and the IC card reader/writer 14200. The CPU 14300 receives a message via the contact point 14306 and the input/output circuit 14305, and employs the cryptographic processor 14304 to decrypt the closed and encrypted message and to examine the digital signature accompanying the message.

In FIG. 144 is shown a memory map for the FeRAM 14303. The FeRAM 14303 includes five areas: a security area 14400, a basic program area 14401, a service data area 14402, a user area 14403 and a temporary area 14403. The security area 14400 is used to store a user ID, a user code number, a private key and a public key for a digital signature, a service provider ID, the telephone number of the service providing system (that is accompanied by the digital signature of the service provider), and the public key of the service provider. The basic program area 14401, the service data area 14402, the user area 14403 and the temporary area 14404 correspond to the basic program area 1700, the service data area 1701, the user area 1702 and the temporary area 1704 in the RAM 1502 of the mobile user terminal 100 for the first embodiment, and the same data are stored in these areas as are stored in the first embodiment. That is, all the information used for the mobile electronic commerce service, such as the user ID, the keys for the digital signature, or the electronic ticket or the electronic payment card that the user obtained, are stored on the IC card 14102.

Therefore, the user can carry the IC card 14102 in which the user ID is stored, and can perform the electronic commerce service function, while using an arbitrary mobile user terminal that is regarded as his or her own, by loading the IC card 14102 into that mobile user terminal.

In addition, since the mobile user terminal 14100 can not access the IC card 14102 when it is not loaded, the mobile user terminal 14100 can not process message data obtained through the mobile electronic commerce service. Therefore, in this case, the mobile electronic commerce service function of the mobile user terminal 100 can not be employed, and only the digital wireless telephone function can be used.

In FIG. 141C is shown the screen that is displayed on the LCD 303 in the digital wireless telephone mode when the IC card 14102 is not loaded, and in FIG. 141D is shown the screen that is displayed on the LCD 303 in the credit card mode when the IC card 14102 is loaded.

INDUSTRIAL USABILITY

As is apparent from the above description, the mobile electronic commerce system according to the present invention can download to the electronic wallet an electronic negotiable card, such as a payment card, a telephone card or a ticket, through the communication means, and can easily obtain such a card. When the electronic payment card, the electronic telephone card or the electronic ticket is to be used, the settlement process or the examination process is quickly and precisely performed, so that safety and usability for a business transaction can be provided.

The performance of an illegal activity during a business transaction can be prevented, and the secrecy of personal information can be maintained.

The electronic payment card, the electronic telephone card and the electronic ticket can be delivered along a distribution route as a form of printed matter or as a recording medium, and wide distribution if possible.

In addition, the usability in the mobile environment can be improved, and, particularly in the certain aspects of the invention, a system appropriate to the environment in which it is to be used can be obtained.

According to another aspect of the invention, cash is not required to purchase a product from an automatic vending machine, and the usability can be improved.

According to another aspect of the invention, the operator is able to manipulate the electronic payment card clearing means and to present, to a person in charge, the data stored in the electronic payment card clearing means. Thus, the usability of the electronic payment card clearing means is improved.

According to another aspect of the invention, since the calculation of the price of a product and the settlement process can be preformed, the usability is improved.

According to another aspect of the invention, since the process beginning with the promotion of a product an continuing until the product is sold is automated, the usability is improved.

According to another aspect of the invention, the provision of a communication service and the collection of a communication charge for that service can be performed at the same time, and the collection rate for the communication charge can be improved.

According to another aspect of the invention, the operator is able to operate the electronic ticket means and to present, to a person in charge, the data stored in the electronic ticket means. Thus, the usability of the electronic ticket means is improved.

According to another aspect of the invention, the service providing means can efficiently manage the electronic wallet and the electronic payment card clearing means, and can provide the electronic payment card service, the electronic telephone card service and the electronic ticket service.

According to another aspect of the invention, the settlement means can efficiently perform the settlement means.

According to another aspect of the invention, the payment card issuing means can efficiently issue a payment card.

According to another aspect of the invention, the telephone card issuing means can efficiently issue a telephone card.

According to another aspect of the invention, the ticket issuing means can efficiently issue a ticket.

According to another aspect of the invention, the owner of the electronic wallet purchases, as an electronic payment card, a payment card that is issued by the payment card issuing means, and can download the payment card to the electronic wallet and use it. Thus, the usability is improved.

According to another aspect of the invention, since the owner of the electronic wallet designates the amount of a payment, an illegal act by a store can be prevented.

According to another aspect of the invention, the owner of the electronic wallet can confirm the contents of a trading session, and as a statement of account printed on paper need not be exchanged, a sale can be handled more efficiently.

According to another aspect of the invention, the owner of an electronic wallet can purchase anywhere, as an electronic telephone card, a telephone card that is issued by the telephone card issuing means, and can use the telephone card by downloading it to the electronic wallet. Thus, the usability is improved.

According to another aspect of the invention, a wireless communication service using a payment card clearing method can be received, and the usability is improved.

According to another aspect of the invention, the owner of an electronic wallet can confirm the contents of the wireless communication service that is employed.

According to another aspect of the invention, the owner of an electronic wallet can purchase anywhere, as an electronic ticket, a ticket that is issued by the ticket issuing means, and can use the ticket by downloading it to the electronic wallet. Thus, the usability is improved.

According to another aspect of the invention, the ticket can be examined accurately and efficiently.

According to another aspect of the invention, since an electronic payment card can be transferred to another person, the usability is improved.

According to another aspect of the invention, an electronic payment card can be precisely transferred and trouble that may accompany the transfer can be prevented.

According to another aspect of the invention, since an electronic telephone card can be transferred to another person, the usability is improved.

According to another aspect of the invention, an electronic telephone card can be precisely transferred and trouble that may accompany the transfer can be prevented.

According to another aspect of the invention, since an electronic ticket can be transferred to another person, the usability is improved.

According to another aspect of the invention, an electronic ticket can be precisely transferred and trouble that may accompany the transfer can be prevented.

According to another aspect of the invention, the owner of an electronic wallet can install an electronic payment card in the electronic wallet anywhere.

According to another aspect of the invention, an electronic payment card that the owner of the electronic wallet designates can be installed in the electronic wallet anywhere.

According to another aspect of the invention, the owner of the electronic wallet can install an electronic telephone card in the electronic wallet anywhere.

According to another aspect of the invention, an electronic telephone card that the owner of the electronic wallet designates can be installed in the electronic wallet anywhere.

According to another aspect of the invention, the owner of the electronic wallet can install an electronic ticket in the electronic wallet anywhere.

According to another aspect of the invention, an electronic ticket that the owner of the electronic wallet designates can be installed in the electronic wallet anywhere.

According to another aspect of the invention, an illegal installation due to immorality can be prevented.

According to another aspect of the invention, a maximum one hundred million types of electronic payment cards, electronic telephone cards and electronic tickets, and 10 to the 32nd power of cards or tickets of for each type can be identified by simple numerical entry.

According to another aspect of the invention, the owner of the electronic wallet can reduce the communication costs for a purchase, and can also receive, as a gift, an electronic payment card, an electronic telephone card or an electronic ticket. As a result, the distribution and employment of an electronic payment card, an electronic telephone card or an electronic ticket can be accelerated.

According to another aspect of the invention, the distribution and employment of the electronic payment card, the electronic telephone card or the electronic ticket can be accelerated.

According to another aspect of the invention, the contents of a ticket that has been issued can be changed at a low cost.

According to another aspect of the invention, the modification of the contents of an event can be reported to the owner of the electronic ticket, and the electronic ticket can be updated.

According to another aspect of the invention, the owner of the electronic ticket does not have to go to a ticket store for a refund, and can receive the refund anywhere.

According to another aspect of the invention, the calculation function of a computer system can be efficiently distributed to individual information processing means.

According to another aspect of the invention, an electronic payment card to be used and an electronic payment card in the sleeping state can be managed separately, and an efficient service operation is enabled.

According to another aspect of the invention, since an electronic payment card must be registered to be used, even when an unregistered electronic payment card in the sleeping state is stolen, illegal use of that card will not occur.

According to another aspect of the invention, an electronic telephone card to be used and an electronic telephone card in the sleeping state can be managed separately, and an efficient service operation is enabled.

According to another aspect of the invention, since an electronic telephone card must be registered to be used, even when an unregistered electronic telephone card in the sleeping state is stolen, illegal use of that card will not occur.

According to another aspec tof the invention, an electronic ticket to be used and an electronic ticket in the sleeping state can be managed separately, and an efficient service operation is enabled.

According to another aspect of the invention, since an electronic ticket must be registered for use, even when an unregistered electronic ticket in the sleeping state is stolen, illegal use of that card will not occur.

According to another aspect of the invention, clearing of the electronic payment card and the transfer of the electronic payment card can be safely performed.

According to another aspect of the invention, the verification process can be mutually performed by the electronic wallet and the electronic payment card clearing means, and the safety of payment card clearing is improved.

According to another aspect of the invention, various types of electronic payment cards can be safely issued.

According to another aspect of the invention, various types of electronic payment cards can be safely issued by individual payment card issuers.

According to another aspect of the invention, settlement of the communication charge using the electronic telephone card and the transfer of the electronic telephone card can be safely performed.

According to another aspect of the invention, a message generated by the electronic telephone card can be accompanied by the digital signature of the electronic telephone card, and the validity of the message can be verified.

According to another aspect of the invention, the verification process can be mutually performed by the electronic wallet and the electronic telephone card clearing means, and the safety of telephone card clearing is improved.

According to certain aspects of the invention, various types of electronic telephone cards can be safely issued.

According to another aspect of the invention, various types of electronic telephone cards can be safely issued by individual telephone card issuers.

According to another aspect of the invention, the examination of an electronic ticket and the transfer of the electronic ticket can be safely performed.

According to another aspect of the invention, a message generated by the electronic ticket can be accompanied by the digital signature of the electronic ticket, and the validity of the message can be verified.

According to another aspect of the invention, the verification process can be mutually performed by the electronic wallet and the electronic ticket examination means, and the safety of ticket examination is improved.

According to another aspect of the invention, various types of electronic tickets can be safely issued.

According to another aspect of the invention, various types of electronic tickets can be safely issued by individual ticket issuers.

According to another aspect of the invention, a payment method can be selected when an electronic payment card is purchased, and the usability is improved.

According to another aspect of the invention, the payment card issuing means can designate a template program that is used for the electronic payment card, and various types of electronic payment cards can be issued.

According to another aspect of the invention, the representative component information can be designated when an electronic payment card is issued, and various types of electronic payment cards having a high degree of freedom can be issued.

According to another aspect of the invention, since the signature key of the electronic payment card is updated by registering the card, the safety is improved.

According to another aspect of the invention, an electronic payment card that is to be used can be selected, and the usability is improved.

According to another aspect of the invention, since a value that is equal to or greater than the amount of a payment designated by the owner of the electronic wallet is not paid, the safety is improved.

According to another aspect of the invention, since the contents of an electronic payment card used for the payment are precisely represented for the electronic payment card clearing means, the electronic payment card clearing means can determine whether the pertinent electronic payment card is valid.

According to another aspect of the invention, the amount of a payment and a person who is to receive the payment are guaranteed, and an illegal charge by a store can be prevented.

According to another aspect of the invention, whether a micro-check is issued by the owner of the electronic payment card is determined, and the validity of the micro-check can be exactly verified.

According to another aspect of the invention, the generation order for a micro-check and the matching of the remaining value can be examined, and further, the validity of the micro-check can be precisely examined.

According to another aspect of the invention, a used micro-check can be automatically collected, and its validity can be examined.

According to another aspect of the invention, the transferring side and the recipient side can negotiate the contents to be transferred.

According to another aspect of the invention, the recipient side can confirm the contents of an electronic payment card to be transferred.

According to another aspect of the invention, since the recipient is guaranteed, even when a payment card transfer certificate message is stolen, the payment card will not be illegally employed.

According to another aspect of the invention, a payment method can be selected when an electronic telephone card is purchased, and the usability is improved.

According to another aspect of the invention, the telephone card issuing means can designate a template program that is used for the electronic telephone card, and various types of electronic telephone cards can be issued.

According to another aspect of the invention, the representative component information can be designated when an electronic telephone card is issued, and various types of electronic telephone cards having a high degree of freedom can be issued.

According to another aspect of the invention, since the signature key of the electronic telephone card is updated by registering the card, the safety is improved.

According to another aspect of the invention, an electronic telephone card that is to be used can be selected, and the usability is improved.

According to another aspect of the invention, the communication service provider can charge a fee in accordance with a wireless communication service that is provided.

According to another aspect of the invention, only a small amount of history information is required, even when the settlement of additional charges is performed many times during a communication session.

According to another aspect of the invention, since the contents of an electronic telephone card used for payment are precisely represented for the electronic telephone card clearing means, the electronic telephone card clearing means can determine whether the pertinent electronic telephone card is valid.

According to another aspect of the invention, the amount of a payment and a person who is to receive the payment are guaranteed, and an illegal charge by the owner of the electronic telephone card can be prevented.

According to another aspect of the invention, whether a telephone micro-check is issued by the owner of the electronic telephone card is determined, and the validity of the telephone micro-check can be exactly verified.

According to another aspect of the invention, the generation order for a telephone micro-check and the matching of the remaining value can be examined, and the validity of the telephone micro-check can be further precisely examined.

According to another aspect of the invention, a used telephone micro-check can be automatically collected, and the validity can be examined.

According to another aspect of the invention, the transferring side and the recipient side can negotiate the contents to be transferred.

According to another aspect of the invention, the recipient side can confirm the contents of an electronic telephone card that is to be transferred.

According to another aspect of the invention, since the recipient is guaranteed, even when a payment card transfer certificate message is stolen, the payment card will not be illegally employed.

According to another aspect of the invention, a payment method can be selected when an electronic ticket is purchased, and the usability is improved.

According to another aspect of the invention, the ticket issuing means can designate a template program that is used for the electronic ticket, and various types of electronic tickets can be issued.

According to another aspect of the invention, the representative component information can be designated when an electronic ticket is issued, and various types of electronic tickets having a high degree of freedom can be issued.

According to another aspect of the invention, since the signature key of the electronic ticket is updated by registering the ticket, the safety is improved.

According to another aspect of the invention, an electronic ticket that is to be used can be selected, and the usability is improved.

According to another aspect of the invention, the electronic ticket examination means can perform the examination process in accordance with a ticket that is presented.

According to another aspect of the invention, since the contents of an electronic ticket to be used are precisely represented for the electronic ticket examination means, the electronic ticket examination means can determine whether the pertinent electronic ticket is valid.

According to another aspect of the invention, the contents of the electronic ticket that is examined is guaranteed, and an illegal charge by the owner of the electronic ticket can be prevented.

According to another aspect of the invention, whether a ticket examination response message is issued by the owner of the electronic ticket is determined, and the validity of the ticket examination response can be exactly verified.

According to another aspect of the invention, the generation order for a ticket examination response message and the matching of the changes of the statuses can be examined, and the validity of the ticket examination response message can be precisely examined.

According to another aspect of the invention, a ticket examination response can be automatically collected, and the validity can be examined.

According to another aspect of the invention, the transferring side and the recipient side can negotiate the contents to be transferred.

According to another aspect of the invention, the recipient side can confirm the contents of an electronic ticket that is to be transferred.

According to another aspect of the invention, since the recipient is guaranteed, even when a ticket transfer certificate message is stolen, the ticket will not be illegally employed.

According to another aspect of the invention, the payment card issuer, the telephone card issuer and the ticket issuer can designate the procedures for clearing.

According to another aspect of the invention, an electronic payment card, an electronic telephone card and an electronic ticket can be issued without keeping a purchaser waiting.

According to another aspect of the invention, an electronic payment card, an electronic telephone card and an electronic ticket can be issued without keeping a purchaser waiting.

According to another aspect of the invention, a plurality of electronic payment cards, electronic telephone cards and electronic tickets, and history information can also be managed in the memory of an electronic wallet that has a limited capability.

According to another aspect of the invention, the service life of a battery for the electronic wallet or for the electronic payment card clearing means can be extended.

According to another aspect of the invention, the counterfeiting of printed material can be prevented. Further, according to the invention for a recording medium on which are stored various programs, such as a control program for the central processing unit of the electronic wallet, these programs can be distributed in a portable form.

According to another aspect of the invention, the third storage means for storing the identification information and authorization information for a user is loaded into an arbitrary electronic wallet, so that the electronic wallet can be used as the electronic wallet of that user.

According to another aspect of the invention, communication with the service providing means is not required when the third storage means is to be loaded into and unloaded from the electronic wallet.

According to another aspect of the invention, an electronic negotiable card that is obtained using the electronic wallet can be carried while stored in the IC card.

According to the invention of printed material on which is printed electronic payment installation information, electronic telephone card installation information or electronic ticket installation information, and a recording medium on which such information is stored, an electronic payment card, an electronic telephone card or an electronic ticket can be transmitted along a distribution route.

The printed material to which the removable coating is applied can be prevent the leakage of installation information before this printed material is purchased.

What is claimed is:

1. A mobile user terminal for use in an electronic commerce system, said electronic commerce system comprising at least the mobile user terminal, a service providing system and an examination terminal, said mobile user terminal comprising:

a remote communication section that communicates with said service providing system via public wireless communication equipment;

a local communication section that communicates with said examination terminal by proximity wireless communication equipment;

an acquisition section configured to transmit, via said remote communication section, a request for electronic value card information to the service providing system and configured to receive the electronic value card information from the service providing system, said electronic value card information including at least a first key data differing for each type of the electronic value card information and a second key data differing for each type of the electronic value card information;

a mutual authentication section configured to exchange messages, via said local communication section, with the examination terminal to execute a first process authenticating the examination terminal and at same time to exchange messages as a part of a second process for authentication by the examination terminal, wherein in the first process authenticating the examination terminal, the mutual authentication section is configured:

to encrypt first data with the first key data included in said electronic value card information to transmit a message including said encrypted first data to the examination terminal to receive a first response from the examination terminal to collate the response with said first data, wherein in the second process authenticated by the examination terminal, the mutual authentication section is configured to decrypt encrypted second data received from the examination terminal with the second key data included in said electronic value card information and to transmit a second response including said second data to the examination terminal.

2. The mobile user terminal according to claim 1, the electronic value card information further including variable value data and the mobile user terminal further comprising an update section that updates the variable value data included in said electronic value card information in accordance with an instruction received from the examination terminal after the mutual authentication section authenticates the examination terminal successfully.

3. A secure transaction method performed by a mobile user terminal in an electronic commerce system, said electronic commerce system comprising at least the mobile user terminal, a service providing system and an examination terminal, said method comprising:

generating a request for electronic value card information and transmitting the request to the service providing system, via public wireless communication equipment;

receiving the electronic value card information from the service providing system, said electronic value card information including at least first key data differing for each type of the electronic value card information and second key data differing for each type of the electronic value card information;

transmitting, by proximity wireless communication equipment, a message to the examination terminal and executing a first process authenticating the examination terminal on receipt of a first response from the examination terminal and at same time executing a second process for authentication by the examination terminal and transmitting a second response to the examination terminal, wherein in the first process authenticating the examination terminal, the mobile user terminal is configured:

to encrypt first data with the first key data included in said electronic value card information, to transmit a message including said encrypted first data to the examination terminal, to receive the first response from the examination terminal and to collate the first response with said first data, wherein in the second process authenticated by the examination terminal, the mobile user terminal is configured:

to decrypt encrypted second data received from the examination terminal with the second key data included in said electronic value card information and to transmit the second response including said second data to the examination terminal.

4. A secure transaction method performed by a mobile user terminal in an electronic commerce system, said electronic commerce system comprising at least the mobile user terminal, a service providing system and an examination terminal, said method comprising:

generating a request for electronic value card information and, via public wireless communication equipment, transmitting the request to the service providing system;

receiving the electronic value card information from the service providing system, said electronic value card information including at least first key data differing for each type of the electronic value card information and second key data differing for each type of the electronic value card information and variable value data;

transmitting, by proximity wireless communication equipment, a message to the examination terminal and executing a first process authenticating the examination terminal on receipt of a first response from the examination terminal and at same time executing a second process for authenticating the mobile user terminal by the examination terminal;

updating the variable value data included in said electronic value card information in accordance with an instruction received from the examination terminal and transmitting a second response to the examination terminal if the first process authenticating the examination terminal is successfully executed, wherein in the first process authenticating the examination terminal, the mobile user terminal configured to encrypt a first data with the first key data included in said electronic value card information, to transmit a message including said encrypted first data to the examination terminal, to receive the first response from the examination terminal and to collate the first response with said first data, wherein in the second process authenticated by the examination terminal, the mobile user terminal is configured to decrypt encrypted second data received from the examination terminal with the second key data included in said electronic value card information and to transmit the second response including said second data to the examination terminal.

* * * * *